United States Patent
Berliner et al.

(10) Patent No.: US 11,402,871 B1
(45) Date of Patent: Aug. 2, 2022

(54) KEYBOARD MOVEMENT CHANGES VIRTUAL DISPLAY ORIENTATION

(71) Applicant: MULTINARITY LTD, Tel Aviv (IL)

(72) Inventors: Tamir Berliner, Tel Aviv (IL); Tomer Kahan, Ramat Hasharon (IL); Orit Dolev, Tel Aviv (IL); Doron Assayas Terre, Holon (IL); Aviv Burshtein, Hod Hasharon (IL)

(73) Assignee: MULTINARITY LTD, Tel Aviv (IL)

( * ) Notice: Subject to any disclaimer, the term of this patent is extended or adjusted under 35 U.S.C. 154(b) by 0 days.

(21) Appl. No.: 17/657,670

(22) Filed: Apr. 1, 2022

Related U.S. Application Data

(63) Continuation of application No. PCT/US2022/015546, filed on Feb. 8, 2022.

(60) Provisional application No. 63/307,207, filed on Feb. 7, 2022, provisional application No. 63/307,203, filed on Feb. 7, 2022, provisional application No. 63/307,217, filed on Feb. 7, 2022, provisional application No. 63/300,005, filed on Jan. 16, 2022, provisional application No. 63/226,977, filed on Jul. 29, 2021, provisional application No. 63/216,335, filed on Jun. 29, 2021, provisional application No. 63/215,500, filed on Jun. 27, 2021, provisional application No. 63/213,019, filed on Jun. 21, 2021,
(Continued)

(51) Int. Cl.
*G06F 1/16* (2006.01)
*G02B 27/01* (2006.01)

(52) U.S. Cl.
CPC ........... *G06F 1/163* (2013.01); *G02B 27/017* (2013.01); *G06F 1/1662* (2013.01); *G02B 2027/0178* (2013.01)

(58) Field of Classification Search
CPC ...... G06F 1/1639; G06F 1/1662; G06F 1/163; G02B 27/017; G02B 27/18; G02B 27/0179
See application file for complete search history.

(56) References Cited

U.S. PATENT DOCUMENTS

| | | |
|---|---|---|
| 9,613,448 B1 | 4/2017 | Margolin |
| 2004/0100556 A1 | 5/2004 | Stromme |

(Continued)

*Primary Examiner* — Mark Edwards
*Assistant Examiner* — Chayce R Bibbee
(74) *Attorney, Agent, or Firm* — Finnegan, Henderson, Farabow, Garrett & Dunner, L.L.P.

(57) ABSTRACT

Systems, methods, and non-transitory computer readable media containing instructions for causing at least one processor to perform operations for integrating a moveable input device with a virtual display projected via a wearable extended reality appliance. In one implementation, the processor is configured to perform operations comprising receiving motion signals associated with the moveable input device, the motion signals reflecting physical movement; outputting during a first time period, first display signals to the reality appliance, the first display signals being configured to cause the wearable extended reality appliance to virtually present content in a first orientation; outputting during a second time period, second display signals to the wearable extended reality appliance, the second display signals being configured to cause the wearable extended reality appliance to virtually present the content in a second orientation; and switching between the output of the first display signals and the output of the second display signals.

20 Claims, 78 Drawing Sheets

Related U.S. Application Data provisional application No. 63/173,095, filed on Apr. 9, 2021, provisional application No. 63/157,768, filed on Mar. 7, 2021, provisional application No. 63/147,051, filed on Feb. 8, 2021.

(56) References Cited

U.S. PATENT DOCUMENTS

| | | |
|---|---|---|
| 2008/0270947 A1 | 10/2008 | Elber et al. |
| 2009/0183125 A1 | 7/2009 | Magal et al. |
| 2010/0034457 A1 | 2/2010 | Berliner et al. |
| 2012/0202569 A1 | 8/2012 | Maizels et al. |
| 2012/0204133 A1 | 8/2012 | Guendelman et al. |
| 2012/0242603 A1 | 9/2012 | Engelhardt et al. |
| 2012/0249741 A1 | 10/2012 | Maciocci et al. |
| 2013/0106692 A1 | 5/2013 | Maizels et al. |
| 2013/0107021 A1 | 5/2013 | Maizels et al. |
| 2013/0283208 A1 | 10/2013 | Bychkov et al. |
| 2013/0321265 A1 | 12/2013 | Bychkov et al. |
| 2013/0321271 A1 | 12/2013 | Bychkov et al. |
| 2013/0342570 A1 | 12/2013 | Kinnebrew et al. |
| 2014/0028548 A1 | 1/2014 | Bychkov et al. |
| 2014/0123077 A1 | 5/2014 | Kutliroff et al. |
| 2014/0152552 A1 | 6/2014 | Berliner et al. |
| 2014/0327611 A1* | 11/2014 | Ono ............ G06F 3/0425 345/156 |
| 2015/0160825 A1 | 6/2015 | Dolbier et al. |
| 2015/0206349 A1 | 7/2015 | Rosenthal et al. |
| 2015/0324001 A1 | 11/2015 | Yanai et al. |
| 2016/0041625 A1 | 2/2016 | Maizels et al. |
| 2016/0209928 A1* | 7/2016 | Kandur Raja ....... H04N 9/3179 |
| 2016/0370860 A1 | 12/2016 | Bychkov et al. |
| 2017/0109516 A1 | 4/2017 | Engelhardt et al. |
| 2017/0153866 A1 | 6/2017 | Grinberg et al. |
| 2018/0314329 A1 | 11/2018 | Bychkov et al. |
| 2019/0107991 A1 | 4/2019 | Spivack et al. |

* cited by examiner

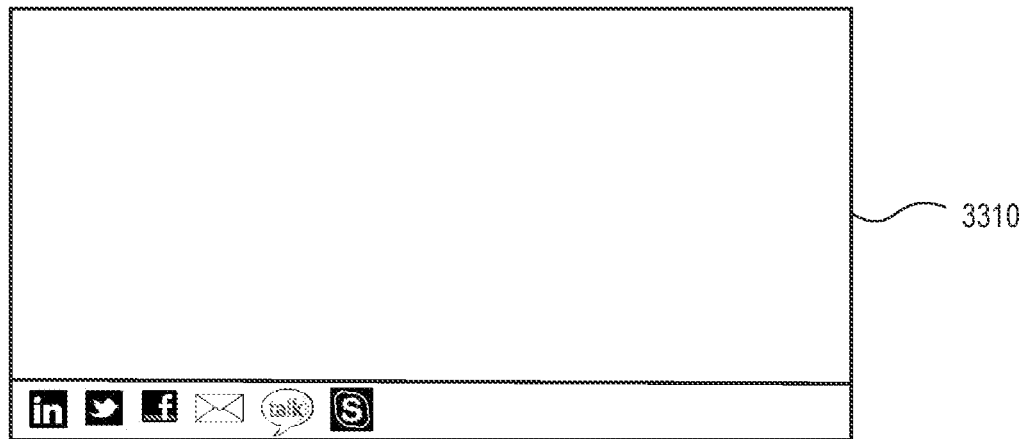
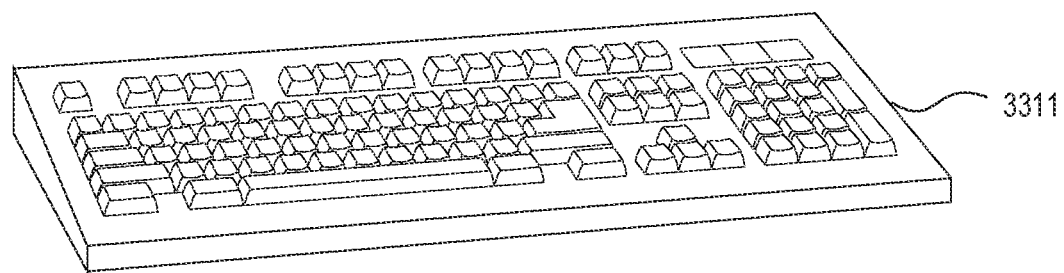
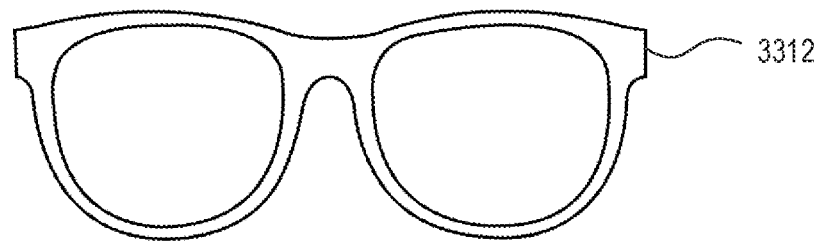
FIG. 33

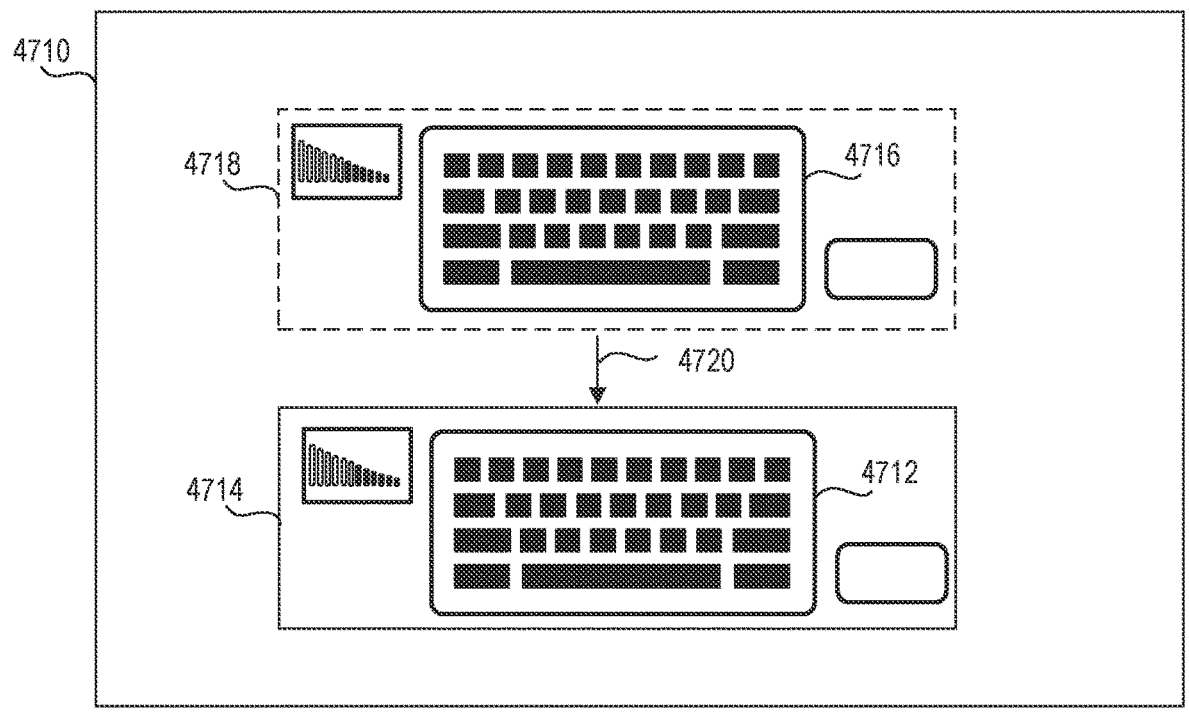
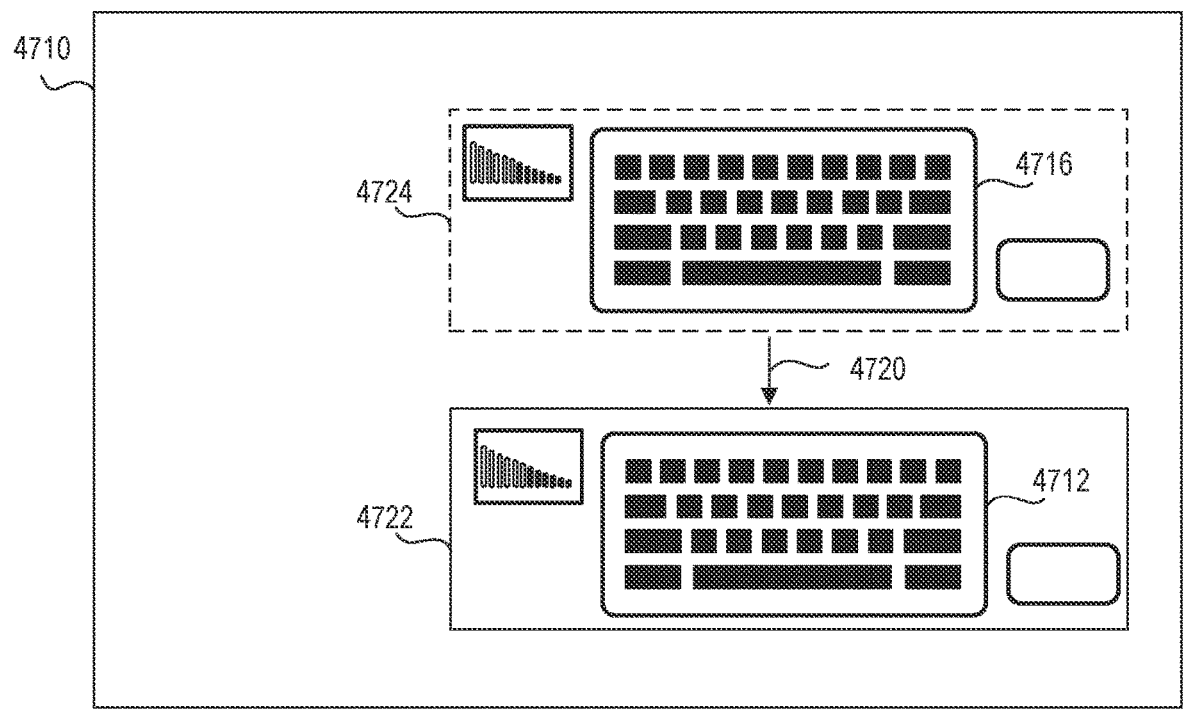
FIG. 47

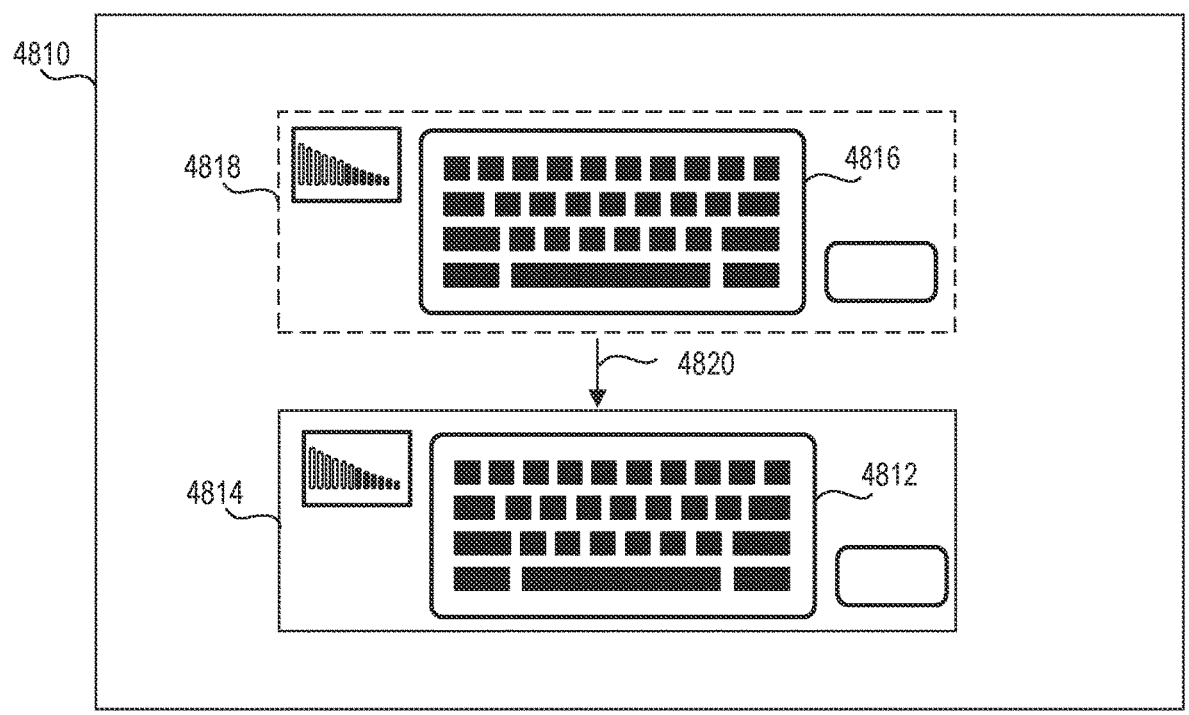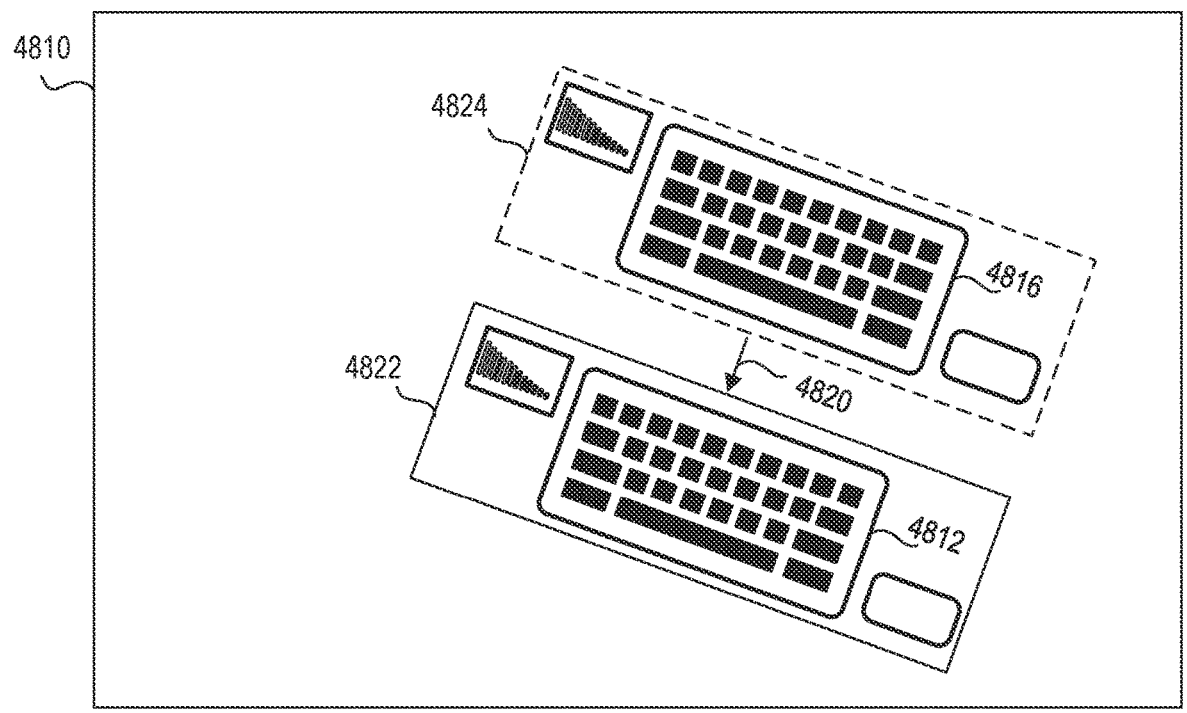
FIG. 48

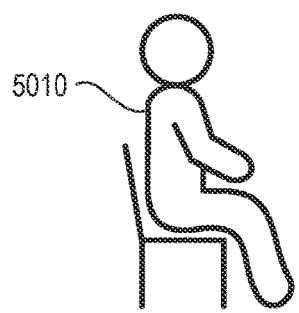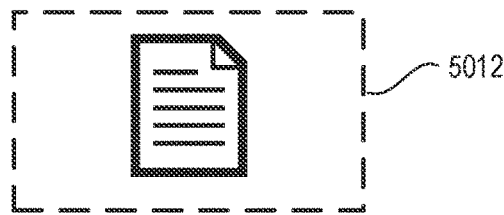
FIG. 50A
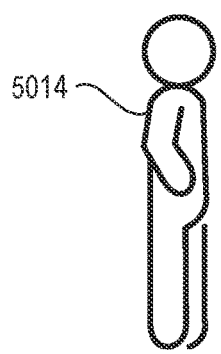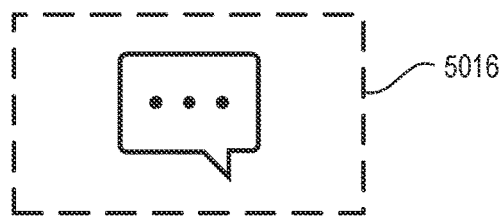
FIG. 50B
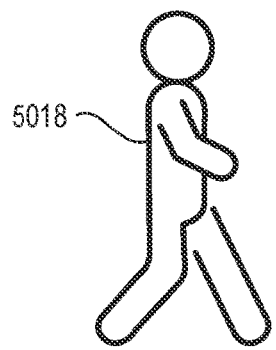
FIG. 50C
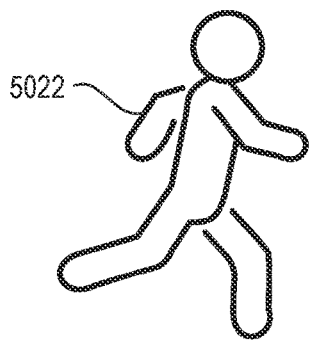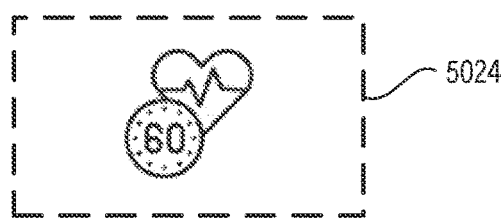
FIG. 50D

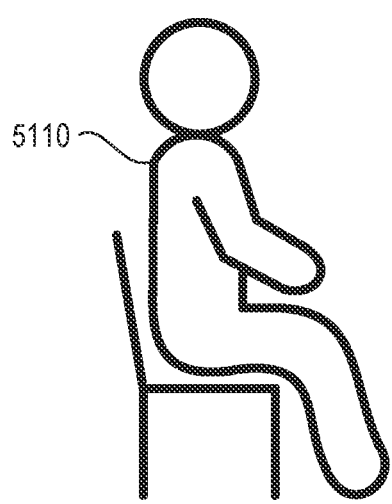
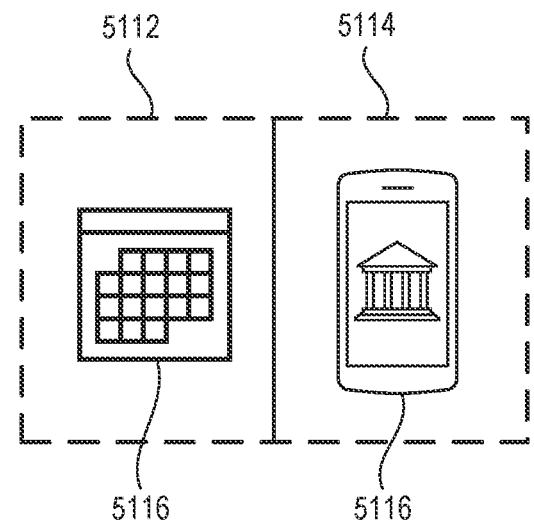
FIG. 51A
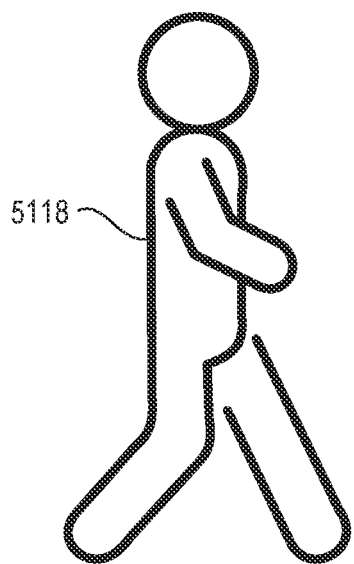
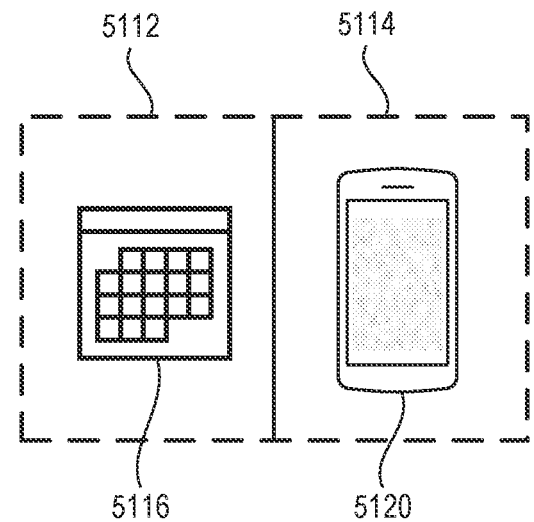
FIG. 51B

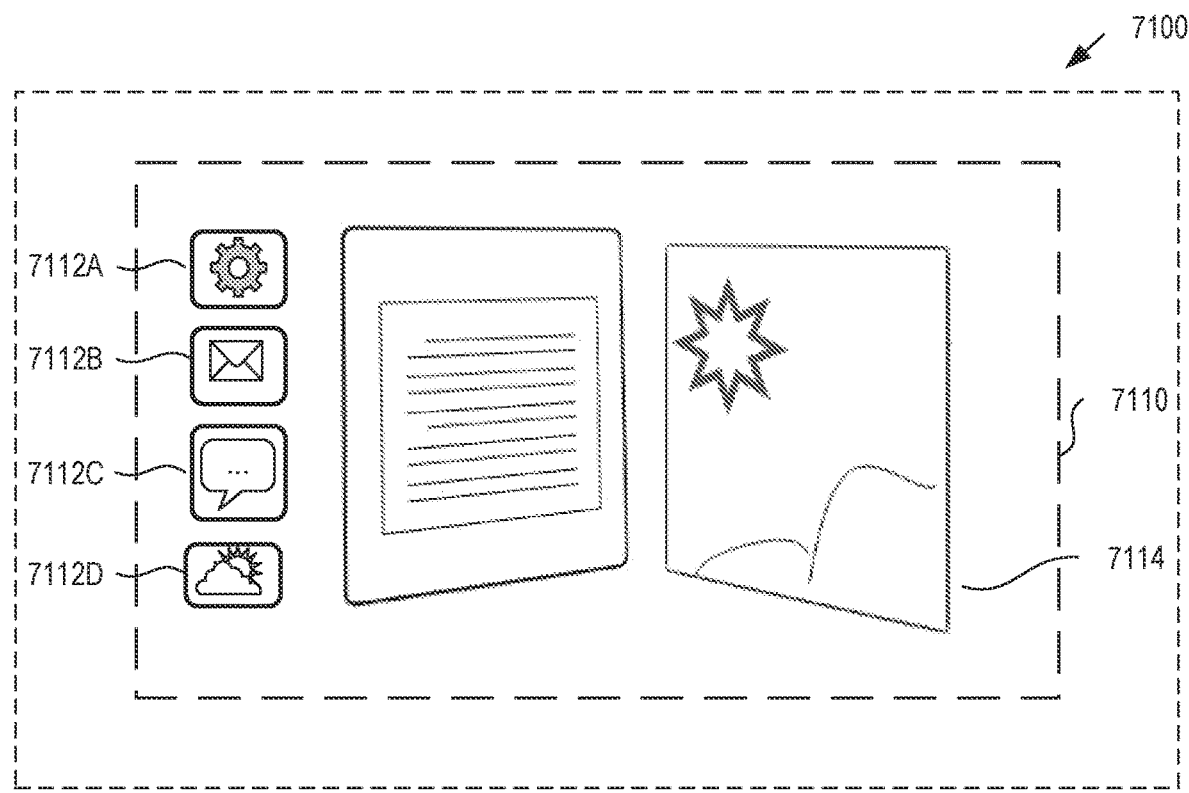
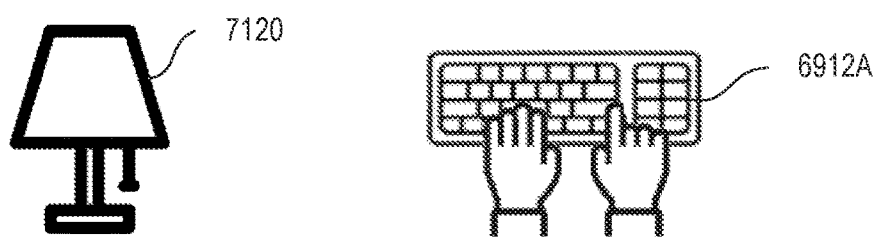
FIG. 71

KEYBOARD MOVEMENT CHANGES VIRTUAL DISPLAY ORIENTATION

CROSS REFERENCES TO RELATED APPLICATIONS

This application is a continuation of PCT International Application No. PCT/US2022/015546, filed Feb. 8, 2022, which claims the benefit of priority of U.S. Provisional Patent Application No. 63/147,051, filed on Feb. 8, 2021, U.S. Provisional Patent Application No. 63/157,768, filed on Mar. 7, 2021, U.S. Provisional Patent Application No. 63/173,095, filed on Apr. 9, 2021, U.S. Provisional Patent Application No. 63/213,019, filed on filed on Jun. 21, 2021, U.S. Provisional Patent Application No. 63/215,500, filed on Jun. 27, 2021, U.S. Provisional Patent Application No. 63/216,335, filed on Jun. 29, 2021, U.S. Provisional Patent Application No. 63/226,977, filed on Jul. 29, 2021, U.S. Provisional Patent Application No. 63/300,005, filed on Jan. 16, 2022, U.S. Provisional Patent Application No. 63/307,207, filed on Feb. 7, 2022, U.S. Provisional Patent Application No. 63/307,203, filed on Feb. 7, 2022, and U.S. Provisional Patent Application No. 63/307,217, filed on Feb. 7, 2022 all of which are incorporated herein by reference in their entirety.

BACKGROUND

I. Technical Field

The present disclosure generally relates to the field of extended reality. More specifically, the present disclosure relates to systems, methods, and devices for providing productivity applications using an extended reality environment.

II. Background Information

For many years, PC users were faced with a productivity dilemma: either to limit their mobility (when selecting a desktop computer) or to limit their screen size (when selecting a laptop computer). One partial solution to this dilemma is using a docking station. A docking station is an interface device for connecting a laptop computer with other devices. By plugging the laptop computer into the docking station, laptop users can enjoy the increased visibility provided by a larger monitor. But because the large monitor is stationary, the mobility of the user—while improved—is still limited. For example, even laptop users with docking stations do not have the freedom of using two 32" screens anywhere they want.

Some of the disclosed embodiments are directed to providing a new approach for solving the productivity dilemma, one that uses extended reality (XR) to provide a mobile environment that enables users to experience the comfort of a stationary workspace anywhere they want by providing virtual desktop-like screens.

SUMMARY

Embodiments consistent with the present disclosure provide systems, methods, and devices for providing and supporting productivity applications using an extended reality environment.

Some disclosed embodiments may include an integrated computational interface device may include a portable housing having a key region and a non-key region; a keyboard associated with the key region of the housing; and a holder associated with the non-key region of the housing. The holder may be configured for selective engagement with and disengagement from a wearable extended reality appliance, such that when the wearable extended reality appliance is selectively engaged with the housing via the holder, the wearable extended reality appliance is transportable with the housing.

Some disclosed embodiments may include an integrated computational interface device includes a housing, at least one image sensor, and a foldable protective cover. The housing may have a key region and a non-key region, and a keyboard associated with the key region. The foldable protective cover incorporates the at least one image sensor. The protective cover may be configured to be manipulated into a plurality of folding configurations, including a first folding configuration, wherein the protective cover may be configured to encase the key region and at least a portion of the non-key region, and a second folding configuration, wherein the protective cover may be configured to stand in a manner that causes an optical axis of the at least one image sensor to generally face a user of the integrated computational interface device while the user types on the keyboard.

Some disclosed embodiments may include a case for an integrated computational interface device includes at least one image sensor and a foldable protective cover incorporating the at least one image sensor. The protective cover may be configured to be manipulated into a plurality of folding configurations. In a first folding configuration, the protective cover may be configured to encase a housing of the integrated computational interface device having a key region and a non-key region. In a second folding configuration, the protective cover may be configured to stand in a manner that causes an optical axis of the at least one image sensor to generally face a user of the integrated computational interface device while the user types on a keyboard associated with the key region.

Some disclosed embodiments may include systems, methods and non-transitory computer readable media for changing display of virtual content based on temperature. Some of these embodiments may involve displaying virtual content via a wearable extended reality appliance, wherein during displaying of the virtual content, heat is generated by at least one component of the wearable extended reality appliance; receiving information indicative of a temperature associated with the wearable extended reality appliance; determining a need to change display settings of the virtual content based on the received information; and based on the determination, changing the display settings of the virtual content to achieve a target temperature.

Some disclosed embodiments may include systems, methods and non-transitory computer readable media for implementing hybrid virtual keys in an extended reality environment. Some of these embodiments may involve receiving, during a first time period, first signals corresponding to positions on a touch-sensitive surface of a plurality of virtual activatable elements virtually projected by a wearable extended reality appliance on the touch-sensitive surface; determining from the first signals the positions of the plurality of virtual activatable elements on the touch-sensitive surface; receiving a touch input of a user via the touch-sensitive surface, wherein the touch input includes second signals generated as a result of interactions with at least one sensor within the touch-sensitive surface; determining a coordinate location associated with the touch input based on the second signals generated as the result of the interactions with the at least one sensor within the touch-sensitive surface; comparing the coordinate location of the touch input with at least one of the determined positions to identify one of the plurality of virtual activatable elements corresponding to the touch input; and causing a change in a virtual content associated with the wearable extended reality appliance, wherein the change corresponds to the identified one of the plurality of virtual activatable elements.

Some disclosed embodiments may include systems, methods and non-transitory computer readable media for controlling a virtual display using a keyboard and a wearable extended reality appliance combination. Some of these embodiments may involve receiving, from a first hand-position sensor associated with the wearable extended reality appliance, first signals representing first hand-movements; receiving, from a second hand-position sensor associated with the keyboard, second signals representing second hand-movements, wherein the second hand-movements include actions other than interactions with a feedback component; and controlling the virtual display based on the first signals and the second signals.

Some disclosed embodiments may include systems, methods and non-transitory computer readable media for integrating a moveable input device with a virtual display projected via a wearable extended reality appliance. Some of these embodiments may involve receiving motion signals associated with the moveable input device, the motion signals reflecting physical movement of the moveable input device; outputting during a first time period, first display signals to the wearable extended reality appliance, the first display signals being configured to cause the wearable extended reality appliance to virtually present content in a first orientation; outputting during a second time period different from the first time period, second display signals to the wearable extended reality appliance, the second display signals being configured to cause the wearable extended reality appliance to virtually present the content in a second orientation different from the first orientation; and switching between the output of the first display signals and the output of the second display signals based on the received motions signals of the moveable input device.

Some disclosed embodiments may include systems, methods and non-transitory computer readable media for virtually extending a physical keyboard. Some of these embodiments may involve receiving image data from an image sensor associated with a wearable extended reality appliance, the image data representing a keyboard placed on a surface; determining that the keyboard is paired with the wearable extended reality appliance; receiving an input for causing a display of a virtual controller in conjunction with the keyboard; displaying, via the wearable extended reality appliance, the virtual controller in a first location on the surface, wherein in the first location, the virtual controller has an original spatial orientation relative to the keyboard; detecting a movement of the keyboard to a different location on the surface; and in response to the detected movement of the keyboard, presenting the virtual controller in a second location on the surface, wherein in the second location, a subsequent spatial orientation of the virtual controller relative to the keyboard corresponds to the original spatial orientation.

Some disclosed embodiments may include systems, methods and non-transitory computer readable media for coordinating virtual content display with mobility status. Some of these embodiments may involve accessing rules associating a plurality of user mobility statuses with a plurality of display modes for presenting virtual content via a wearable extended reality appliance; receiving first sensor data from at least one sensor associated with the wearable extended reality appliance, the first sensor data being reflective of a mobility status of a user of the wearable extended reality appliance during a first time period; based on the first sensor data, determining that during the first time period the user of the wearable extended reality appliance is associated with a first mobility status; implementing at least a first accessed rule to generate a first display of the virtual content via the wearable extended reality appliance associated with the first mobility status; receiving second sensor data from the at least one sensor, the second sensor data being reflective of the mobility status of the user during a second time period; based on the second sensor data, determining that during the second time period the user of the wearable extended reality appliance is associated with a second mobility status; and implementing at least a second accessed rule to generate a second display of the virtual content via the wearable extended reality appliance associated with the second mobility status, wherein the second display of the virtual content differs from the first display of the virtual content.

Some disclosed embodiments may include systems, methods and non-transitory computer readable media for modifying display of virtual objects docked to a movable input device. Some of these embodiments may involve receiving image data from an image sensor associated with a wearable extended reality appliance, the image data representing an input device placed at a first location on a supporting surface; causing the wearable extended reality appliance to generate a presentation of at least one virtual object in proximity to the first location; docking the at least one virtual object to the input device; determining that the input device is in a second location on the support surface; in response to the determination that the input device is in the second location, updating the presentation of the at least one virtual object such that the at least one virtual object appears in proximity to the second location; determining that the input device is in a third location removed from the support surface; and in response to the determination that the input device is removed from the support surface, modifying the presentation of the at least one virtual object.

Some disclosed embodiments may include systems, methods and non-transitory computer readable media for docking virtual objects to virtual display screens in an extended reality environment. Some of these embodiments may involve generating virtual content for presentation via a wearable extended reality appliance, where the virtual content includes a virtual display and a plurality of virtual objects located outside the virtual display; receiving a selection of at least one virtual object from the plurality of virtual objects; docking the at least one virtual object to the virtual display; after docking the at least one virtual object to the virtual display, receiving an input indicative of an intent to change a location of the virtual display without an expression of an intent to move the at least one virtual object; changing the location of the virtual display in response to the input; and wherein changing the location of the virtual display, causes the at least one virtual object to move with the virtual display as a result of the docking of the at least one virtual object to the virtual display.

Some disclosed embodiments may include systems, methods and non-transitory computer readable media for implementing selective virtual object display changes. Some of these embodiments may involve generating an extended reality environment via a wearable extended reality appliance, the extended reality environment including a first virtual plane associated with a physical object and a second virtual plane associated with an item, the second virtual plane extending in a direction transverse to the first virtual plane; accessing a first instruction for docking a first set of virtual objects in first positions associated with the first virtual plane; accessing a second instruction for docking a second set of virtual objects in second positions associated the second virtual plane; receiving a first input associated with a movement of the physical object; in response to receiving the first input, causing a change in a display of the first set of virtual objects in a manner corresponding the movement of the physical object while maintaining the second set of virtual objects in the second positions; receiving a second input associated with a movement of the item; and in response to receiving the second input, causing a change in a display of the second set of virtual objects in a manner corresponding the movement of the item while maintaining the first positions of the first set of virtual objects.

Some disclosed embodiments may include systems, methods and non-transitory computer readable media for determining a display configuration for presenting virtual content. Some of these embodiments may involve receiving image data from an image sensor associated with a wearable extended reality appliance, wherein the wearable extended reality appliance is configured to be paired with multiple input devices and each input device is associated with default display settings; analyzing the image data to detect a particular input device placed on a surface; determining a value of at least one use parameter for the particular input device; retrieving from memory default display settings associated with the particular input device; determining a display configuration for presenting virtual content based on the value of the at least one use parameter and the retrieved default display settings; and causing a presentation of the virtual content via the wearable extended reality appliance according to the determined display configuration.

Some disclosed embodiments may include systems, methods and non-transitory computer readable media for augmenting a physical display with a virtual display. Some of these embodiments may involve receiving first signals representative of a first object fully presented on a physical display; receiving second signals representative of a second object having a first portion presented on the physical display and a second portion extending beyond a border of the physical display; receiving third signals representative of a third object initially presented on the physical display and subsequently wholly moved beyond the border of the physical display; in response to receipt of the second signals, causing the second portion of the second object to be presented via a wearable extended reality appliance in a virtual space while the first portion of the second object is presented on the physical display; and in response to receipt of the third signals, causing the third object to be wholly presented via the wearable extended reality appliance in the virtual space following the third object having been wholly presented on the physical display.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 33 illustrates an example of a keyboard and a wearable extended reality appliance combination to control a virtual display, consistent with some embodiments of the present disclosure.

FIG. 47 illustrates an example of a keyboard and a virtual controller moved from one location to another location, consistent with some embodiments of the present disclosure.

FIG. 48 illustrates another example of a keyboard and a virtual controller moved from one location to another location, consistent with some embodiments of the present disclosure.

FIGS. 50A to 50D illustrate examples of various virtual content displays coordinated with different mobility statuses, consistent with some embodiments of the present disclosure.

FIGS. 51A and 51B illustrate examples of different display modes associated with different types of virtual objects for differing mobility statuses, consistent with some embodiments of the present disclosure.

FIG. 71 shows a schematic illustrating another exemplary display configuration, consistent with some embodiments of the present disclosure.

DETAILED DESCRIPTION

Figure 1:
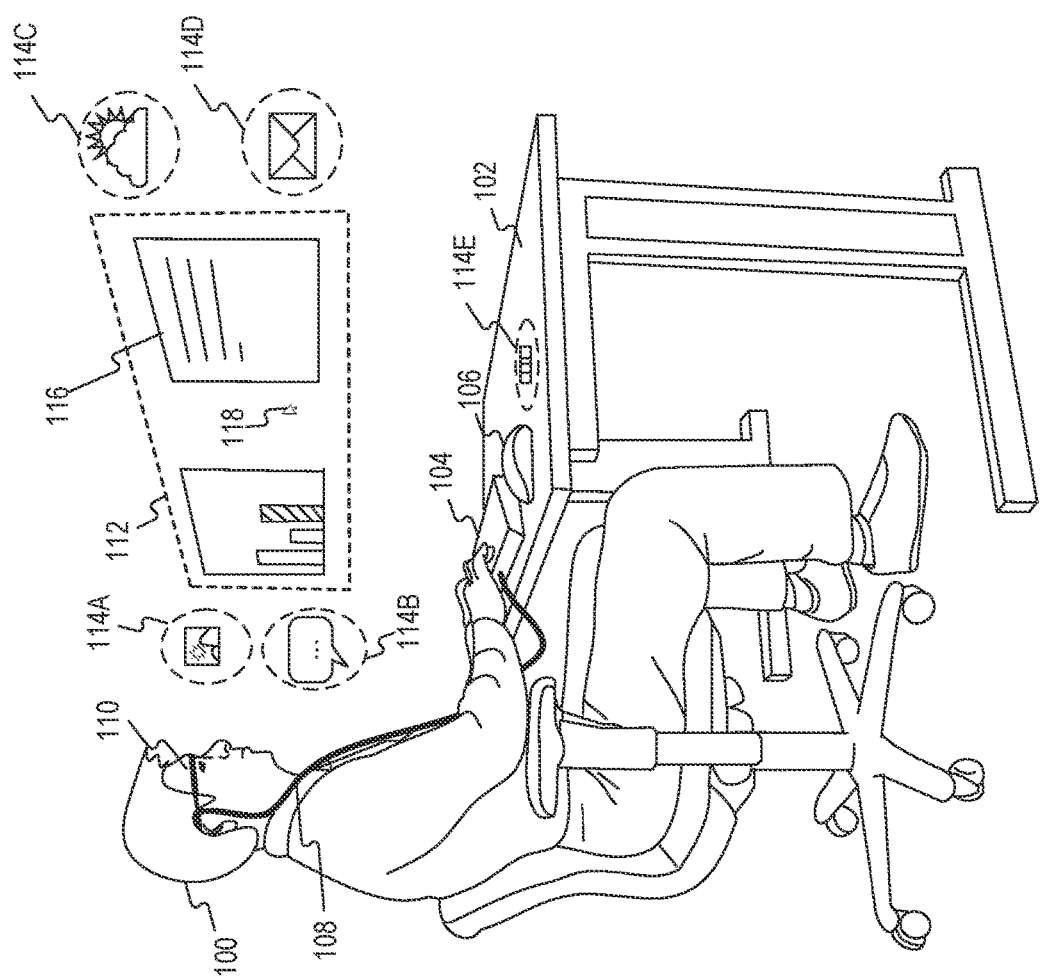
FIG. 1 is a schematic illustration of a user, using an example extended reality system, consistent with some embodiments of the present disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the specific embodiments and examples, but is inclusive of general principles described herein and illustrated in the figures in addition to the general principles encompassed by the appended claims.

The present disclosure is directed to systems and methods for providing users an extended reality environment. The term "extended reality environment," which may also be referred to as "extended reality," "extended reality space," or "extended environment," refers to all types of real-and-virtual combined environments and human-machine interactions at least partially generated by computer technology. The extended reality environment may be a completely simulated virtual environment or a combined real-and-virtual environment that a user may perceive from different perspectives. In some examples, the user may interact with elements of the extended reality environment. One non-limiting example of an extended reality environment may be a virtual reality environment, also known as "virtual reality" or a "virtual environment." An immersive virtual reality environment may be a simulated non-physical environment which provides to the user the perception of being present in the virtual environment. Another non-limiting example of an extended reality environment may be an augmented reality environment, also known as "augmented reality" or "augmented environment." An augmented reality environment may involve live direct or indirect view of a physical real-world environment that is enhanced with virtual computer-generated perceptual information, such as virtual objects that the user may interact with. Another non-limiting example of an extended reality environment is a mixed reality environment, also known as "mixed reality" or a "mixed environment." A mixed reality environment may be a hybrid of physical real-world and virtual environments, in which physical and virtual objects may coexist and interact in real time. In some examples, both augmented reality environments and mixed reality environments may include a combination of real and virtual worlds, real-time interactions, and accurate 3D registration of virtual and real objects. In some examples, both augmented reality environment and mixed reality environments may include constructive overlaid sensory information that may be added to the physical environment. In other examples, both augmented reality environment and mixed reality environments may include destructive virtual content that may mask at least part of the physical environment.

In some embodiments, the systems and methods may provide the extended reality environment using an extended reality appliance. The term extended reality appliance may include any type of device or system that enables a user to perceive and/or interact with an extended reality environment. The extended reality appliance may enable the user to perceive and/or interact with an extended reality environment through one or more sensory modalities. Some non-limiting examples of such sensory modalities may include visual, auditory, haptic, somatosensory, and olfactory. One example of the extended reality appliance is a virtual reality appliance that enables the user to perceive and/or interact with a virtual reality environment. Another example of the extended reality appliance is an augmented reality appliance that enables the user to perceive and/or interact with an augmented reality environment. Yet another example of the extended reality appliance is a mixed reality appliance that enables the user to perceive and/or interact with a mixed reality environment.

Consistent with one aspect of the disclosure, the extended reality appliance may be a wearable device, such as a head-mounted device, for example, smart glasses, smart contact lens, headsets or any other device worn by a human for purposes of presenting an extended reality to the human. Other extended reality appliances may include holographic projector or any other device or system capable of providing an augmented reality (AR), virtual reality (VR), mixed reality (MR), or any immersive experience. Typical components of wearable extended reality appliances may include at least one of: a stereoscopic head-mounted display, a stereoscopic head-mounted sound system, head-motion tracking sensors (such as gyroscopes, accelerometers, magnetometers, image sensors, structured light sensors, etc.), head mounted projectors, eye-tracking sensors, and additional components described below. Consistent with another aspect of the disclosure, the extended reality appliance may be a non-wearable extended reality appliance. Specifically, the non-wearable extended reality appliance may include multi-projected environment appliances. In some embodiments, an extended reality appliance may be configured to change the viewing perspective of the extended reality environment in response to movements of the user and in response to head movements of the user in particular. In one example, a wearable extended reality appliance may change the field-of-view of the extended reality environment in response to a change of the head pose of the user, such as by changing the spatial orientation without changing the spatial position of the user in the extended reality environment. In another example, a non-wearable extended reality appliance may change the spatial position of the user in the extended reality environment in response to a change in the position of the user in the real world, for example, by changing the spatial position of the user in the extended reality environment without changing the direction of the field-of-view with respect to the spatial position.

According to some embodiments, an extended reality appliance may include a digital communication device configured to at least one of: receiving virtual content data configured to enable a presentation of the virtual content, transmitting virtual content for sharing with at least one external device, receiving contextual data from at least one external device, transmitting contextual data to at least one external device, transmitting of usage data indicative of usage of the extended reality appliance, and transmitting of data based on information captured using at least one sensor included in the extended reality appliance. In additional embodiments, the extended reality appliance may include memory for storing at least one of virtual data configured to enable a presentation of virtual content, contextual data, usage data indicative of usage of the extended reality appliance, sensor data based on information captured using at least one sensor included in the extended reality appliance, software instructions configured to cause a processing device to present the virtual content, software instructions configured to cause a processing device to collect and analyze the contextual data, software instructions configured to cause a processing device to collect and analyze the usage data, and software instructions configured to cause a processing device to collect and analyze the sensor data. In additional embodiments, the extended reality appliance may include a processing device configured to perform at least one of rendering of virtual content, collecting and analyzing contextual data, collecting and analyzing usage data, and collecting and analyzing sensor data. In additional embodiments, the extended reality appliance may include one or more sensors. The one or more sensors may include one or more image sensors (e.g., configured to capture images and/or videos of a user of the appliance or of an environment of the user), one or more motion sensors (such as an accelerometer, a gyroscope, a magnetometer, etc.), one or more positioning sensors (such as GPS, outdoor positioning sensor, indoor positioning sensor, etc.), one or more temperature sensors (e.g., configured to measure the temperature of at least part of the appliance and/or of the environment), one or more contact sensors, one or more proximity sensors (e.g., configured to detect whether the appliance is currently worn), one or more electrical impedance sensors (e.g., configured to measure electrical impedance of the user), one or more eye tracking sensors, such as gaze detectors, optical trackers, electric potential trackers (e.g., electrooculogram (EOG) sensors), video-based eye-trackers, infra-red/near infra-red sensors, passive light sensors, or any other technology capable of determining where a human is looking or gazing.

In some embodiments, the systems and methods may use an input device to interact with the extended reality appliance. The term input device may include any physical device configured to receive input from a user or an environment of the user, and to provide the data to a computational device. The data provided to the computational device may be in a digital format and/or in an analog format. In one embodiment, the input device may store the input received from the user in a memory device accessible by a processing device, and the processing device may access the stored data for analysis. In another embodiment, the input device may provide the data directly to a processing device, for example, over a bus or over another communication system configured to transfer data from the input device to the processing device. In some examples, the input received by the input device may include key presses, tactile input data, motion data, position data, gestures based input data, direction data, or any other data for supply for computation. Some examples of the input device may include a button, a key, a keyboard, a computer mouse, a touchpad, a touchscreen, a joystick, or another mechanism from which input may be received. Another example of an input device may include an integrated computational interface device that includes at least one physical component for receiving input from a user. The integrated computational interface device may include at least a memory, a processing device, and the at least one physical component for receiving input from a user. In one example, the integrated computational interface device may further include a digital network interface that enables digital communication with other computing devices. In one example, the integrated computational interface device may further include a physical component for outputting information to the user. In some examples, all components of the integrated computational interface device may be included in a single housing, while in other examples the components may be distributed among two or more housings. Some non-limiting examples of physical components for receiving input from users that may be included in the integrated computational interface device may include at least one of a button, a key, a keyboard, a touchpad, a touchscreen, a joystick, or any other mechanism or sensor from which computational information may be received. Some non-limiting examples of physical components for outputting information to users may include at least one of a light indicator (such as a LED indicator), a screen, a touchscreen, a beeper, an audio speaker, or any other audio, video, or haptic device that provides human-perceptible outputs.

In some embodiments, image data may be captured using one or more image sensors. In some examples, the image sensors may be included in the extended reality appliance, in a wearable device, in the wearable extended reality device, in the input device, in an environment of a user, and so forth. In some examples, the image data may be read from memory, may be received from an external device, may be generated (for example, using a generative model), and so forth. Some non-limiting examples of image data may include images, grayscale images, color images, 2D images, 3D images, videos, 2D videos, 3D videos, frames, footages, data derived from other image data, and so forth. In some examples, the image data may be encoded in any analog or digital format. Some non-limiting examples of such formats may include raw formats, compressed formats, uncompressed formats, lossy formats, lossless formats, JPEG, GIF, PNG, TIFF, BMP, NTSC, PAL, SECAM, MPEG, MPEG-4 Part 14, MOV, WMV, FLV, AVI, AVCHD, WebM, MKV, and so forth.

In some embodiments, the extended reality appliance may receive digital signals, for example, from the input device. The term digital signals refers to a series of digital values that are discrete in time. The digital signals may represent, for example, sensor data, textual data, voice data, video data, virtual data, or any other form of data that provides perceptible information. Consistent with the present disclosure, the digital signals may be configured to cause the extended reality appliance to present virtual content. In one embodiment, the virtual content may be presented in a selected orientation. In this embodiment, the digital signals may indicate a position and an angle of a viewpoint in an environment, such as an extended reality environment. Specifically, the digital signals may include an encoding of the position and angle in six degree-of-freedom coordinates (e.g., forward/back, up/down, left/right, yaw, pitch, and roll). In another embodiment, the digital signals may include an encoding of the position as three-dimensional coordinates (e.g., x, y, and z), and an encoding of the angle as a vector originating from the encoded position. Specifically, the digital signals may indicate the orientation and an angle of the presented virtual content in an absolute coordinates of the environment, for example, by encoding yaw, pitch and roll of the virtual content with respect to a standard default angle. In another embodiment, the digital signals may indicate the orientation and the angle of the presented virtual content with respect to a viewpoint of another object (e.g., a virtual object, a physical object, etc.), for example, by encoding yaw, pitch, and roll of the virtual content with respect a direction corresponding to the viewpoint or to a direction corresponding to the other object. In another embodiment, such digital signals may include one or more projections of the virtual content, for example, in a format ready for presentation (e.g., image, video, etc.). For example, each such projection may correspond to a particular orientation or a particular angle. In another embodiment, the digital signals may include a representation of virtual content, for example, by encoding objects in a three-dimensional array of voxels, in a polygon mesh, or in any other format in which virtual content may be presented.

In some embodiments, the digital signals may be configured to cause the extended reality appliance to present virtual content. The term virtual content may include any type of data representation that may be displayed by the extended reality appliance to the user. The virtual content may include a virtual object, inanimate virtual content, animate virtual content configured to change over time or in response to triggers, virtual two-dimensional content, virtual three dimensional content, a virtual overlay over a portion of a physical environment or over a physical object, a virtual addition to a physical environment or to a physical object, a virtual promotion content, a virtual representation of a physical object, a virtual representation of a physical environment, a virtual document, a virtual character or persona, a virtual computer screen, a virtual widget, or any other format for displaying information virtually. Consistent with the present disclosure, the virtual content may include any visual presentation rendered by a computer or a processing device. In one embodiment, the virtual content may include a virtual object that is a visual presentation rendered by a computer in a confined region and configured to represent an object of a particular type (such as an inanimate virtual object, an animate virtual object, virtual furniture, a virtual decorative object, virtual widget, or other virtual representation.). The rendered visual presentation may change to reflect changes to a status object or changes in the viewing angle of the object, for example, in a way that mimics changes in the appearance of physical objects. In another embodiment, the virtual content may include a virtual display (also referred to as a "virtual display screen" or a "virtual screen" herein), such as a virtual computer screen, a virtual tablet screen or a virtual smartphone screen, configured to display information generated by an operating system, in which the operating system may be configured to receive textual data from a physical keyboard and/or a virtual keyboard and to cause a display of the textual content in the virtual display screen. In one example, illustrated in FIG. 1, the virtual content may include a virtual environment that includes a virtual computer screen and a plurality of virtual objects. In some examples, a virtual display may be a virtual object mimicking and/or extending the functionality of a physical display screen. For example, the virtual display may be presented in an extended reality environment (such as a mixed reality environment, an augmented reality environment, a virtual reality environment, etc.), using an extended reality appliance. In one example, a virtual display may present content produced by a regular operating system that may be equally presented on a physical display screen. In one example, a textual content entered using a keyboard (for example, using a physical keyboard, using a virtual keyboard, etc.) may be presented on a virtual display in real time as the textual content is typed. In one example, a virtual cursor may be presented on a virtual display, and the virtual cursor may be controlled by a pointing device (such as a physical pointing device, a virtual pointing device, a computer mouse, a joystick, a touchpad, a physical touch controller, and so forth). In one example, one or more windows of a graphical user interface operating system may be presented on a virtual display. In another example, content presented on a virtual display may be interactive, that is, it may change in reaction to actions of users. In yet another example, a presentation of a virtual display may include a presentation of a screen frame, or may include no presentation of a screen frame.

Some disclosed embodiments may include and/or access a data structure or a database. The terms data structure and a database, consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, Entity-Relationship model, a graph, a hypergraph, a matrix, a tensor, and so forth. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure does not require information to be co-located. It may be distributed across multiple servers, for example, that may be owned or operated by the same or different entities. Thus, the term data structure in the singular is inclusive of plural data structures.

In some embodiments, the system may determine the confidence level in received input or in any determined value. The term confidence level refers to any indication, numeric or otherwise, of a level (e.g., within a predetermined range) indicative of an amount of confidence the system has at determined data. For example, the confidence level may have a value between 1 and 10. Alternatively, the confidence level may be expressed as a percentage or any other numerical or non-numerical indication. In some cases, the system may compare the confidence level to a threshold. The term threshold may denote a reference value, a level, a point, or a range of values. In operation, when the confidence level of determined data exceeds the threshold (or is below it, depending on a particular use case), the system may follow a first course of action and, when the confidence level is below it (or above it, depending on a particular use case), the system may follow a second course of action. The value of the threshold may be predetermined for each type of examined object or may be dynamically selected based on different considerations.

System Overview

Reference is now made to FIG. 1, which illustrates a user that uses an example extended reality system consistent with various embodiments of the present disclosure. FIG. 1 is an exemplary representation of just one embodiment, and it is to be understood that some illustrated elements might be omitted and others added within the scope of this disclosure. As shown, a user 100 is sitting behind table 102, supporting a keyboard 104 and mouse 106. Keyboard 104 is connected by wire 108 to a wearable extended reality appliance 110 that displays virtual content to user 100. Alternatively or additionally to wire 108, keyboard 104 may connect to wearable extended reality appliance 110 wirelessly. For illustration purposes, the wearable extended reality appliance is depicted as a pair of smart glasses, but, as described above, wearable extended reality appliance 110 may be any type of head-mounted device used for presenting an extended reality to user 100. The virtual content displayed by wearable extended reality appliance 110 includes a virtual screen 112 (also referred to as a "virtual display screen" or a "virtual display" herein) and a plurality of virtual widgets 114. Virtual widgets 114A-114D are displayed next to virtual screen 112 and virtual widget 114E is displayed on table 102. User 100 may input text to a document 116 displayed in virtual screen 112 using keyboard 104; and may control virtual cursor 118 using mouse 106. In one example, virtual cursor 118 may move anywhere within virtual screen 112. In another example, virtual cursor 118 may move anywhere within virtual screen 112 and may also move to any one of virtual widgets 114A-114D but not to virtual widget 114E. In yet another example, virtual cursor 118 may move anywhere within virtual screen 112 and may also move to any one of virtual widgets 114A-114E. In an additional example, virtual cursor 118 may move anywhere in the extended reality environment including virtual screen 112 and virtual widgets 114A-114E. In yet another example, virtual cursor may move on all available surfaces (i.e., virtual surfaces or physical surfaces) or only on selected surfaces in the extended reality environment. Alternatively or additionally, user 100 may interact with any one of virtual widgets 114A-114E, or with selected virtual widgets, using hand gestures recognized by wearable extended reality appliance 110. For example, virtual widget 114E may be an interactive widget (e.g., a virtual slider controller) that may be operated with hand gestures.

Figure 2:
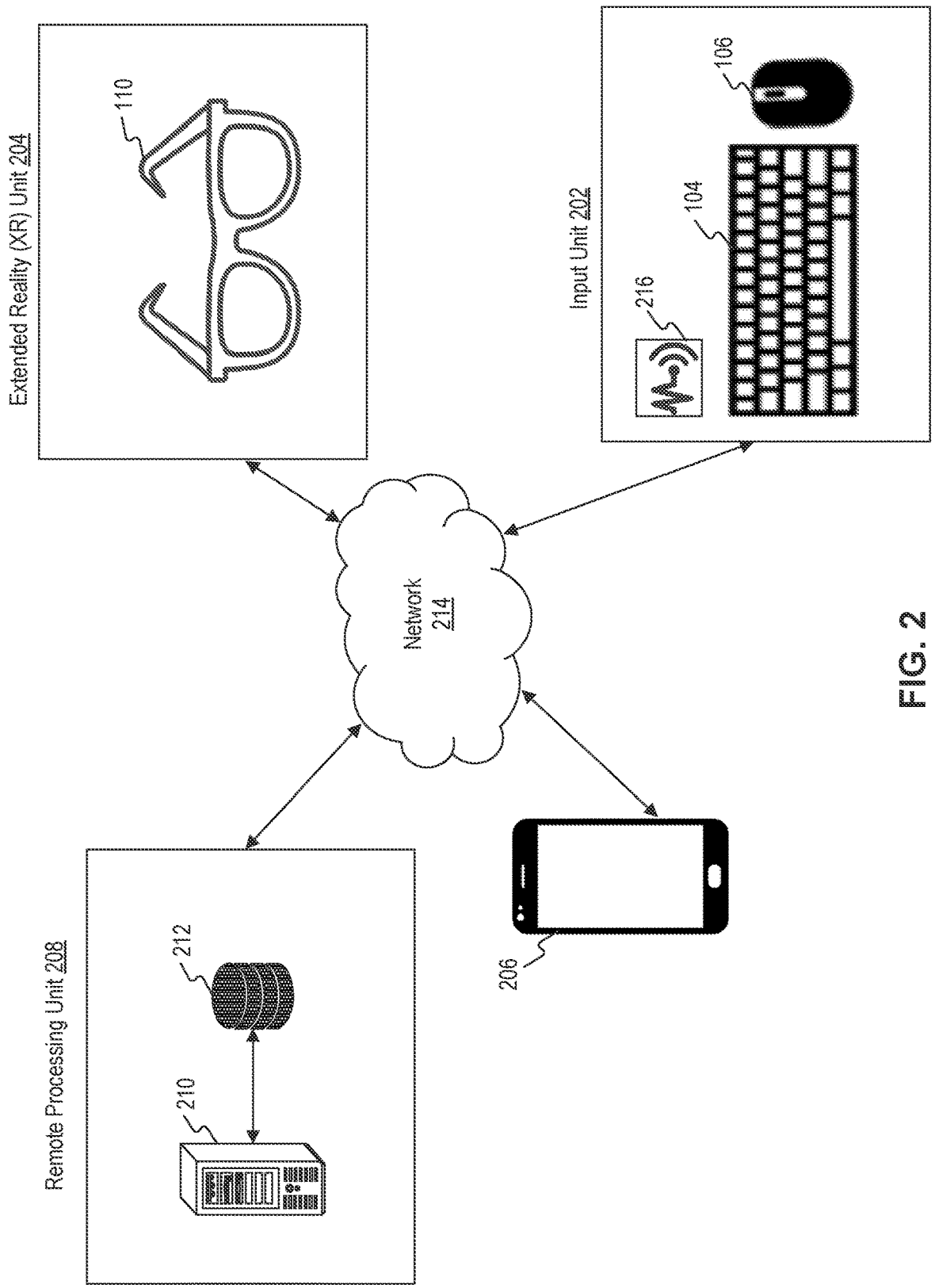
FIG. 2 is a schematic illustration of the main components of the example extended reality system of FIG. 1, consistent with some embodiments of the present disclosure.

FIG. 2 illustrates an example of a system 200 that provides extended reality (XR) experience to users, such as user 100. FIG. 2 is an exemplary representation of just one embodiment, and it is to be understood that some illustrated elements might be omitted and others added within the scope of this disclosure. System 200 may be computer-based and may include computer system components, wearable appliances, workstations, tablets, handheld computing devices, memory devices, and/or internal network(s) connecting the components. System 200 may include or be connected to various network computing resources (e.g., servers, routers, switches, network connections, storage devices, etc.) for supporting services provided by system 200. Consistent with the present disclosure, system 200 may include an input unit 202, an XR unit 204, a mobile communications device 206, and a remote processing unit 208. Remote processing unit 208 may include a server 210 coupled to one or more physical or virtual storage devices, such as a data structure 212. System 200 may also include or be connected to a communications network 214 that facilitates communications and data exchange between different system components and the different entities associated with system 200.

Consistent with the present disclosure, input unit 202 may include one or more devices that may receive input from user 100. In one embodiment, input unit 202 may include a textual input device, such as keyboard 104. The textual input device may include all possible types of devices and mechanisms for inputting textual information to system 200. Examples of textual input devices may include mechanical keyboards, membrane keyboards, flexible keyboards, QWERTY keyboards, Dvorak keyboards, Colemak keyboards, chorded keyboards, wireless keyboards, keypads, key-based control panels, or other arrays of control keys, vision input devices, or any other mechanism for inputting text, whether the mechanism is provided in physical form or is presented virtually. In one embodiment, input unit 202 may also include a pointing input device, such as mouse 106. The pointing input device may include all possible types of devices and mechanisms for inputting two-dimensional or three-dimensional information to system 200. In one example, two-dimensional input from the pointing input device may be used for interacting with virtual content presented via the XR unit 204. Examples of pointing input devices may include a computer mouse, trackball, touchpad, trackpad, touchscreen, joystick, pointing stick, stylus, light pen, or any other physical or virtual input mechanism. In one embodiment, input unit 202 may also include a graphical input device, such as a touchscreen configured to detect contact, movement, or break of movement. The graphical input device may use any of a plurality of touch sensitivity technologies, including, but not limited to, capacitive, resistive, infrared, and surface acoustic wave technologies as well as other proximity sensor arrays or other elements for determining one or more points of contact. In one embodiment, input unit 202 may also include one or more voice input devices, such as a microphone. The voice input device may include all possible types of devices and mechanisms for inputting voice data to facilitate voice-enabled functions, such as voice recognition, voice replication, digital recording, and telephony functions. In one embodiment, input unit 202 may also include one or more image input devices, such as an image sensor, configured to capture image data. In one embodiment, input unit 202 may also include one or more haptic gloves configured to capture hands motion and pose data. In one embodiment, input unit 202 may also include one or more proximity sensors configured to detect presence and/or movement of objects in a selected region near the sensors.

In accordance with some embodiments, the system may include at least one sensor configured to detect and/or measure a property associated with the user, the user's action, or user's environment. One example of the at least one sensor, is sensor 216 included in input unit 202. Sensor 216 may be a motion sensor, a touch sensor, a light sensor, an infrared sensor, an audio sensor, an image sensor, a proximity sensor, a positioning sensor, a gyroscope, a temperature sensor, a biometric sensor, or any other sensing devices to facilitate related functionalities. Sensor 216 may be integrated with, or connected to, the input devices or it may be separated from the input devices. In one example, a thermometer may be included in mouse 106 to determine the body temperature of user 100. In another example, a positioning sensor may be integrated with keyboard 104 to determine movement of user 100 relative to keyboard 104. Such positioning sensor may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, image based positioning technology, indoor positioning technology, outdoor positioning technology, or any other positioning technology.

In accordance with some embodiments, the system may include one or more sensors for identifying a position and/or a movement of a physical device (such as a physical input device, a physical computing device, keyboard 104, mouse 106, wearable extended reality appliance 110, and so forth). The one or more sensors may be included in the physical device or may be external to the physical device. In some examples, an image sensor external to the physical device (for example, an image sensor included in another physical device) may be used to capture image data of the physical device, and the image data may be analyzed to identify the position and/or the movement of the physical device. For example, the image data may be analyzed using a visual object tracking algorithm to identify the movement of the physical device, may be analyzed using a visual object detection algorithm to identify the position of the physical device (for example, relative to the image sensor, in a global coordinates system, etc.), and so forth. In some examples, an image sensor included in the physical device may be used to capture image data, and the image data may be analyzed to identify the position and/or the movement of the physical device. For example, the image data may be analyzed using visual odometry algorithms to identify the position of the physical device, may be analyzed using an ego-motion algorithm to identify movement of the physical device, and so forth. In some examples, a positioning sensor, such as an indoor positioning sensor or an outdoor positioning sensor, may be included in the physical device and may be used to determine the position of the physical device. In some examples, a motion sensor, such as an accelerometer or a gyroscope, may be included in the physical device and may be used to determine the motion of the physical device. In some examples, a physical device, such as a keyboard or a mouse, may be configured to be positioned on a physical surface. Such physical device may include an optical mouse sensor (also known as non-mechanical tracking engine) aimed towards the physical surface, and the output of the optical mouse sensor may be analyzed to determine movement of the physical device with respect to the physical surface.

Consistent with the present disclosure, XR unit 204 may include a wearable extended reality appliance configured to present virtual content to user 100. One example of the wearable extended reality appliance is wearable extended reality appliance 110. Additional examples of wearable extended reality appliance may include a Virtual Reality (VR) device, an Augmented Reality (AR) device, a Mixed Reality (MR) device, or any other device capable of generating extended reality content. Some non-limiting examples of such devices may include Nreal Light, Magic Leap One, Varjo, Quest 1/2, Vive, and others. In some embodiments, XR unit 204 may present virtual content to user 100. Generally, an extended reality appliance may include all real-and-virtual combined environments and human-machine interactions generated by computer technology and wearables. As mentioned above, the term "extended reality" (XR) refers to a superset which includes the entire spectrum from "the complete real" to "the complete virtual." It includes representative forms such as augmented reality (AR), mixed reality (MR), virtual reality (VR), and the areas interpolated among them. Accordingly, it is noted that the terms "XR appliance," "AR appliance," "VR appliance," and "MR appliance" may be used interchangeably herein and may refer to any device of the variety of appliances listed above.

Consistent with the present disclosure, the system may exchange data with a variety of communication devices associated with users, for example, mobile communications device 206. The term "communication device" is intended to include all possible types of devices capable of exchanging data using digital communications network, analog communication network or any other communications network configured to convey data. In some examples, the communication device may include a smartphone, a tablet, a smartwatch, a personal digital assistant, a desktop computer, a laptop computer, an IoT device, a dedicated terminal, a wearable communication device, and any other device that enables data communications. In some cases, mobile communications device 206 may supplement or replace input unit 202. Specifically, mobile communications device 206 may be associated with a physical touch controller that may function as a pointing input device. Moreover, mobile communications device 206 may also, for example, be used to implement a virtual keyboard and replace the textual input device. For example, when user 100 steps away from table 102 and walks to the break room with his smart glasses, he may receive an email that requires a quick answer. In this case, the user may select to use his or her own smartwatch as the input device and to type the answer to the email while it is virtually presented by the smart glasses.

Consistent with the present disclosure, embodiments of the system may involve the usage of a cloud server. The term "cloud server" refers to a computer platform that provides services via a network, such as the Internet. In the example embodiment illustrated in FIG. 2, server 210 may use virtual machines that may not correspond to individual hardware. For example, computational and/or storage capabilities may be implemented by allocating appropriate portions of desirable computation/storage power from a scalable repository, such as a data center or a distributed computing environment. Specifically, in one embodiment, remote processing unit 208 may be used together with XR unit 204 to provide the virtual content to user 100. In one example configuration, server 210 may be a cloud server that functions as the operation system (OS) of the wearable extended reality appliance. In one example, server 210 may implement the methods described herein using customized hard-wired logic, one or more Application Specific Integrated Circuits (ASICs), Field Programmable Gate Arrays (FPGAs), firmware, and/or program logic which, in combination with the computer system, cause server 210 to be a special-purpose machine.

In some embodiments, server 210 may access data structure 212 to determine, for example, virtual content to display user 100. Data structure 212 may utilize a volatile or non-volatile, magnetic, semiconductor, tape, optical, removable, non-removable, other type of storage device or tangible or non-transitory computer-readable medium, or any medium or mechanism for storing information. Data structure 212 may be part of server 210 or separate from server 210, as shown. When data structure 212 is not part of server 210, server 210 may exchange data with data structure 212 via a communication link. Data structure 212 may include one or more memory devices that store data and instructions used to perform one or more features of the disclosed methods. In one embodiment, data structure 212 may include any of a plurality of suitable data structures, ranging from small data structures hosted on a workstation to large data structures distributed among data centers. Data structure 212 may also include any combination of one or more data structures controlled by memory controller devices (e.g., servers) or software.

Consistent with the present disclosure, communications network may be any type of network (including infrastructure) that supports communications, exchanges information, and/or facilitates the exchange of information between the components of a system. For example, communications network 214 in system 200 may include, for example, a telephone network, an extranet, an intranet, the Internet, satellite communications, off-line communications, wireless communications, transponder communications, a Local Area Network (LAN), wireless network (e.g., a Wi-Fi/ 302.11 network), a Wide Area Network (WAN), a Virtual Private Network (VPN), digital communication network, analog communication network, or any other mechanism or combinations of mechanism that enable data transmission.

The components and arrangements of system 200 shown in FIG. 2 are intended to be exemplary only and are not intended to limit any embodiment, as the system components used to implement the disclosed processes and features may vary.

Figure 3:
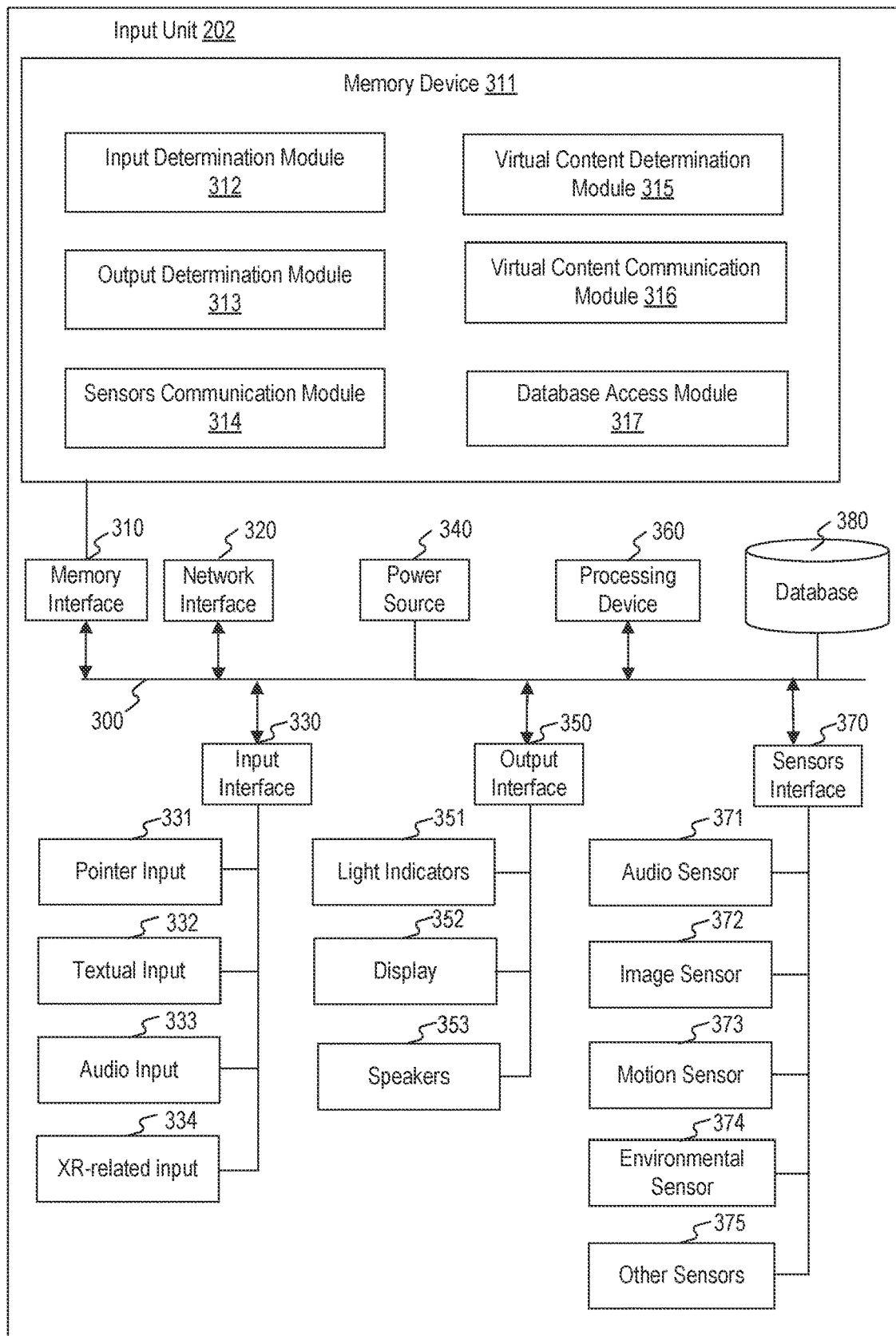
FIG. 3 is a block diagram illustrating some of the components of an input unit, consistent with some embodiments of the present disclosure.

FIG. 3 is a block diagram of an examplary configuration of input unit 202. FIG. 3 is an exemplary representation of just one embodiment, and it is to be understood that some illustrated elements might be omitted and others added within the scope of this disclosure. In the embodiment of FIG. 3, input unit 202 may directly or indirectly access a bus 300 (or other communication mechanism) that interconnects subsystems and components for transferring information within input unit 202. For example, bus 300 may interconnect a memory interface 310, a network interface 320, an input interface 330, a power source 340, an output interface 350, a processing device 360, a sensors interface 370, and a database 380.

Memory interface 310, shown in FIG. 3, may be used to access a software product and/or data stored on a non-transitory computer-readable medium. Generally, a non-transitory computer-readable storage medium refers to any type of physical memory on which information or data readable by at least one processor can be stored. Examples include Random Access Memory (RAM), Read-Only Memory (ROM), volatile memory, nonvolatile memory, hard drives, CD ROMs, DVDs, flash drives, disks, any other optical data storage medium, any physical medium with patterns of holes, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within an input unit or at a remote location. Additionally, one or more computer-readable storage mediums can be utilized in implementing a computer-implemented method. Accordingly, the term computer-readable storage medium should be understood to include tangible items and exclude carrier waves and transient signals. In the specific embodiment illustrated in FIG. 3, memory interface 310 may be used to access a software product and/or data stored on a memory device, such as memory device 311. Memory device 311 may include high-speed random-access memory and/or non-volatile memory, such as one or more magnetic disk storage devices, one or more optical storage devices, and/or flash memory (e.g., NAND, NOR). Consistent with the present disclosure, the components of memory device 311 may be distributed in more than units of system 200 and/or in more than one memory device.

Memory device 311, shown in FIG. 3, may contain software modules to execute processes consistent with the present disclosure. In particular, memory device 311 may include an input determination module 312, an output determination module 313, a sensors communication module 314, a virtual content determination module 315, a virtual content communication module 316, and a database access module 317. Modules 312-317 may contain software instructions for execution by at least one processor (e.g., processing device 360) associated with input unit 202. Input determination module 312, output determination module 313, sensors communication module 314, virtual content determination module 315, virtual content communication module 316, and database access module 317 may cooperate to perform various operations. For example, input determination module 312 may determine text using data received from, for example, keyboard 104. Thereafter, output determination module 313 may cause presentation of the recent inputted text, for example on a dedicated display 352 physically or wirelessly coupled to keyboard 104. This way, when user 100 types, he can see a preview of the typed text without constantly moving his head up and down to look at virtual screen 112. Sensors communication module 314 may receive data from different sensors to determine a status of user 100. Thereafter, virtual content determination module 315 may determine the virtual content to display, based on received input and the determined status of user 100. For example, the determined virtual content may be a virtual presentation of the recent inputted text on a virtual screen virtually located adjacent to keyboard 104. Virtual content communication module 316 may obtain virtual content that is not determined by virtual content determination module 315 (e.g., an avatar of another user). The retrieval of the virtual content may be from database 380, from remote processing unit 208, or any other source.

In some embodiments, input determination module 312 may regulate the operation of input interface 330 in order to receive pointer input 331, textual input 332, audio input 333, and XR-related input 334. Details on the pointer input, the textual input, and the audio input are described above. The term "XR-related input" may include any type of data that may cause a change in the virtual content displayed to user 100. In one embodiment, XR-related input 334 may include image data of user 100, a wearable extended reality appliance (e.g., detected hand gestures of user 100). In another embodiment, XR-related input 334 may include wireless communication indicating a presence of another user in proximity to user 100. Consistent with the present disclosure, input determination module 312 may concurrently receive different types of input data. Thereafter, input determination module 312 may further apply different rules based on the detected type of input. For example, a pointer input may have precedence over voice input.

In some embodiments, output determination module 313 may regulate the operation of output interface 350 in order to generate output using light indicators 351, display 352, and/or speakers 353. In general, the output generated by output determination module 313 does not include virtual content to be presented by a wearable extended reality appliance. Instead, the output generated by output determination module 313 include various outputs that relates to the operation of input unit 202 and/or the operation of XR unit 204. In one embodiment, light indicators 351 may include a light indicator that shows the status of a wearable extended reality appliance. For example, the light indicator may display green light when wearable extended reality appliance 110 are connected to keyboard 104, and blinks when wearable extended reality appliance 110 has low battery. In another embodiment, display 352 may be used to display operational information. For example, the display may present error messages when the wearable extended reality appliance is inoperable. In another embodiment, speakers 353 may be used to output audio, for example, when user 100 wishes to play some music for other users.

In some embodiments, sensors communication module 314 may regulate the operation of sensors interface 370 in order to receive sensor data from one or more sensors, integrated with, or connected to, an input device. The one or more sensors may include: audio sensor 371, image sensor 372, motion sensor 373, environmental sensor 374 (e.g., a temperature sensor, ambient light detectors, etc.), and other sensors 375. In one embodiment, the data received from sensors communication module 314 may be used to determine the physical orientation of the input device. The physical orientation of the input device may be indicative of a state of the user and may be determined based on combination of a tilt movement, a roll movement, and a lateral movement. Thereafter, the physical orientation of the input device may be used by virtual content determination module 315 to modify display parameters of the virtual content to match the state of the user (e.g., attention, sleepy, active, sitting, standing, leaning backwards, leaning forward, walking, moving, riding, etc.).

In some embodiments, virtual content determination module 315 may determine the virtual content to be displayed by the wearable extended reality appliance. The virtual content may be determined based on data from input determination module 312, sensors communication module 314, and other sources (e.g., database 380). In some embodiments, determining the virtual content may include determining the distance, the size, and the orientation of the virtual objects. The determination of the position of the virtual objects may be determined based on the type of the virtual objects. Specifically, with regards to the example illustrated in FIG. 1, the virtual content determination module 315 may determine to place four virtual widgets 114A-114D on the sides of virtual screen 112 and to place virtual widget 114E on table 102 because virtual widget 114E is a virtual controller (e.g., volume bar). The determination of the position of the virtual objects may further be determined based on user's preferences. For example, for left-handed users, virtual content determination module 315 may determine placing a virtual volume bar left of keyboard 104; and for right-handed users, virtual content determination module 315 may determine placing the virtual volume bar right of keyboard 104.

In some embodiments, virtual content communication module 316 may regulate the operation of network interface 320 in order to obtain data from one or more sources to be presented as virtual content to user 100. The one or more sources may include other XR units 204, the user's mobile communications device 206, remote processing unit 208, publicly available information, etc. In one embodiment, virtual content communication module 316 may communicate with mobile communications device 206 in order to provide a virtual representation of mobile communications device 206. For example, the virtual representation may enable user 100 to read messages and interact with applications installed on the mobile communications device 206. Virtual content communication module 316 may also regulate the operation of network interface 320 in order to share virtual content with other users. In one example, virtual content communication module 316 may use data from input determination module to identify a trigger (e.g., the trigger may include a gesture of the user) and to transfer content from the virtual display to a physical display (e.g., TV) or to a virtual display of a different user.

In some embodiments, database access module 317 may cooperate with database 380 to retrieve stored data. The retrieved data may include, for example, privacy levels associated with different virtual objects, the relationship between virtual objects and physical objects, the user's preferences, the user's past behavior, and more. As described above, virtual content determination module 315 may use the data stored in database 380 to determine the virtual content. Database 380 may include separate databases, including, for example, a vector database, raster database, tile database, viewport database, and/or a user input database. The data stored in database 380 may be received from modules 314-317 or other components of system 200. Moreover, the data stored in database 380 may be provided as input using data entry, data transfer, or data uploading.

Modules 312-317 may be implemented in software, hardware, firmware, a mix of any of those, or the like. In some embodiments, any one or more of modules 312-317 and data associated with database 380 may be stored in XR unit 204, mobile communications device 206, or remote processing unit 208. Processing devices of system 200 may be configured to execute the instructions of modules 312-317. In some embodiments, aspects of modules 312-317 may be implemented in hardware, in software (including in one or more signal processing and/or application specific integrated circuits), in firmware, or in any combination thereof, executable by one or more processors, alone, or in various combinations with each other. Specifically, modules 312-317 may be configured to interact with each other and/or other modules of system 200 to perform functions consistent with Some disclosed embodiments. For example, input unit 202 may execute instructions that include an image processing algorithm on data from XR unit 204 to determine head movement of user 100. Furthermore, each functionality described throughout the specification, with regards to input unit 202 or with regards to a component of input unit 202, may correspond to a set of instructions for performing said functionality. These instructions need not be implemented as separate software programs, procedures, or modules. Memory device 311 may include additional modules and instructions or fewer modules and instructions. For example, memory device 311 may store an operating system, such as ANDROID, iOS, UNIX, OSX, WINDOWS, DARWIN, RTXC, LINUX or an embedded operating system such as VXWorkS. The operating system can include instructions for handling basic system services and for performing hardware-dependent tasks.

Network interface 320, shown in FIG. 3, may provide two-way data communications to a network, such as communications network 214. In one embodiment, network interface 320 may include an Integrated Services Digital Network (ISDN) card, cellular modem, satellite modem, or a modem to provide a data communication connection over the Internet. As another example, network interface 320 may include a Wireless Local Area Network (WLAN) card. In another embodiment, network interface 320 may include an Ethernet port connected to radio frequency receivers and transmitters and/or optical (e.g., infrared) receivers and transmitters. The specific design and implementation of network interface 320 may depend on the communications network or networks over which input unit 202 is intended to operate. For example, in some embodiments, input unit 202 may include network interface 320 designed to operate over a GSM network, a GPRS network, an EDGE network, a Wi-Fi or WiMax network, and a Bluetooth network. In any such implementation, network interface 320 may be configured to send and receive electrical, electromagnetic, or optical signals that carry digital data streams or digital signals representing various types of information.

Input interface 330, shown in FIG. 3, may receive input from a variety of input devices, for example, a keyboard, a mouse, a touch pad, a touch screen, one or more buttons, a joystick, a microphone, an image sensor, and any other device configured to detect physical or virtual input. The received input may be in the form of at least one of: text, sounds, speech, hand gestures, body gestures, tactile information, and any other type of physically or virtually input generated by the user. In the depicted embodiment, input interface 330 may receive pointer input 331, textual input 332, audio input 333, and XR-related input 334. In additional embodiment, input interface 330 may be an integrated circuit that may act as bridge between processing device 360 and any of the input devices listed above.

Power source 340, shown in FIG. 3, may provide electrical energy to power input unit 202 and optionally also power XR unit 204. Generally, a power source included in the any device or system in the present disclosure may be any device that can repeatedly store, dispense, or convey electric power, including, but not limited to, one or more batteries (e.g., a lead-acid battery, a lithium-ion battery, a nickel-metal hydride battery, a nickel-cadmium battery), one or more capacitors, one or more connections to external power sources, one or more power convertors, or any combination of them. With reference to the example illustrated in FIG. 3, the power source may be mobile, which means that input unit 202 can be easily carried by a hand (e.g., the total weight of power source 340 may be less than a pound). The mobility of the power source enables user 100 to use input unit 202 in a variety of situations. In other embodiments, power source 340 may be associated with a connection to an external power source (such as an electrical power grid) that may be used to charge power source 340. In addition, power source 340 may be configured to charge one or more batteries included in XR unit 204; for example, a pair of extended reality glasses (e.g., wearable extended reality appliance 110) may be charged (e.g., wirelessly or not wirelessly) when they are placed on or in proximity to the input unit 202.

Output interface 350, shown in FIG. 3, may cause output from a variety of output devices, for example, using light indicators 351, display 352, and/or speakers 353. In one embodiment, output interface 350 may be an integrated circuit that may act as bridge between processing device 360 and at least one of the output devices listed above. Light indicators 351 may include one or more light sources, for example, a LED array associated with different colors. Display 352 may include a screen (e.g., LCD or dot-matrix screen) or a touch screen. Speakers 353 may include audio headphones, a hearing aid type device, a speaker, a bone conduction headphone, interfaces that provide tactile cues, vibrotactile stimulators, and more.

Processing device 360, shown in FIG. 3, may include at least one processor configured to execute computer programs, applications, methods, processes, or other software to perform embodiments described in the present disclosure. Generally, a processing device included in the any device or system in the present disclosure may include one or more integrated circuits, microchips, microcontrollers, microprocessors, all or part of a central processing unit (CPU), graphics processing unit (GPU), digital signal processor (DSP), field programmable gate array (FPGA), or other circuits suitable for executing instructions or performing logic operations. The processing device may include at least one processor configured to perform functions of the disclosed methods such as a microprocessor manufactured by Intel™. The processing device may include a single core or multiple core processors executing parallel processes simultaneously. In one example, the processing device may be a single core processor configured with virtual processing technologies. The processing device may implement virtual machine technologies or other technologies to provide the ability to execute, control, run, manipulate, store, etc., multiple software processes, applications, programs, etc. In another example, the processing device may include a multiple-core processor arrangement (e.g., dual, quad core, etc.) configured to provide parallel processing functionalities to allow a device associated with the processing device to execute multiple processes simultaneously. It is appreciated that other types of processor arrangements could be implemented to provide the capabilities disclosed herein.

Sensors interface 370, shown in FIG. 3, may obtain sensor data from a variety of sensors, for example, audio sensor 371, image sensor 372, motion sensor 373, environmental sensor 374, and other sensors 375. In one embodiment, sensors interface 370 may be an integrated circuit that may act as bridge between processing device 360 and at least one of the sensors listed above.

Audio sensor 371 may include one or more audio sensors configured to capture audio by converting sounds to digital information. Some examples of audio sensors may include: microphones, unidirectional microphones, bidirectional microphones, cardioid microphones, omnidirectional microphones, onboard microphones, wired microphones, wireless microphones, or any combination of the above. Consistent with the present disclosure, processing device 360 may modify a presentation of virtual content based on data received from audio sensor 371 (e.g., voice commands).

Image sensor 372 may include one or more image sensors configured to capture visual information by converting light to image data. Consistent with the present disclosure, an image sensor may be included in the any device or system in the present disclosure and may be any device capable of detecting and converting optical signals in the near-infrared, infrared, visible, and ultraviolet spectrums into electrical signals. Examples of image sensors may include digital cameras, phone cameras, semiconductor Charge-Coupled Devices (CCDs), active pixel sensors in Complementary Metal-Oxide-Semiconductor (CMOS), or N-type metal-oxide-semiconductor (NMOS, Live MOS). The electrical signals may be used to generate image data. Consistent with the present disclosure, the image data may include pixel data streams, digital images, digital video streams, data derived from captured images, and data that may be used to construct one or more 3D images, a sequence of 3D images, 3D videos, or a virtual 3D representation. The image data acquired by image sensor 372 may be transmitted by wired or wireless transmission to any processing device of system 200. For example, the image data may be processed in order to: detect objects, detect events, detect action, detect face, detect people, recognize a known person, or any other information that may be used by system 200. Consistent with the present disclosure, processing device 360 may modify a presentation of virtual content based on image data received from image sensor 372.

Motion sensor 373 may include one or more motion sensors configured to measure motion of input unit 202 or motion of objects in the environment of input unit 202. Specifically, the motion sensors may perform at least one of the following: detect motion of objects in the environment of input unit 202, measure the velocity of objects in the environment of input unit 202, measure the acceleration of objects in the environment of input unit 202, detect the motion of input unit 202, measure the velocity of input unit 202, measure the acceleration of input unit 202, etc. In some embodiments, motion sensor 373 may include one or more accelerometers configured to detect changes in proper acceleration and/or to measure proper acceleration of input unit 202. In other embodiments, motion sensor 373 may include one or more gyroscopes configured to detect changes in the orientation of input unit 202 and/or to measure information related to the orientation of input unit 202. In other embodiments, motion sensor 373 may include one or more using image sensors, LIDAR sensors, radar sensors, or proximity sensors. For example, by analyzing captured images the processing device may determine the motion of input unit 202, for example, using ego-motion algorithms. In addition, the processing device may determine the motion of objects in the environment of input unit 202, for example, using object tracking algorithms. Consistent with the present disclosure, processing device 360 may modify a presentation of virtual content based on the determined motion of input unit 202 or the determined motion of objects in the environment of input unit 202. For example, causing a virtual display to follow the movement of input unit 202.

Environmental sensor 374 may include one or more sensors from different types configured to capture data reflective of the environment of input unit 202. In some embodiments, environmental sensor 374 may include one or more chemical sensors configured to perform at least one of the following: measure chemical properties in the environment of input unit 202, measure changes in the chemical properties in the environment of input unit 202, detect the present of chemicals in the environment of input unit 202, measure the concentration of chemicals in the environment of input unit 202. Examples of such chemical properties may include: pH level, toxicity, and temperature. Examples of such chemicals may include: electrolytes, particular enzymes, particular hormones, particular proteins, smoke, carbon dioxide, carbon monoxide, oxygen, ozone, hydrogen, and hydrogen sulfide. In other embodiments, environmental sensor 374 may include one or more temperature sensors configured to detect changes in the temperature of the environment of input unit 202 and/or to measure the temperature of the environment of input unit 202. In other embodiments, environmental sensor 374 may include one or more barometers configured to detect changes in the atmospheric pressure in the environment of input unit 202 and/or to measure the atmospheric pressure in the environment of input unit 202. In other embodiments, environmental sensor 374 may include one or more light sensors configured to detect changes in the ambient light in the environment of input unit 202. Consistent with the present disclosure, processing device 360 may modify a presentation of virtual content based on input from environmental sensor 374. For example, automatically reducing the brightness of the virtual content when the environment of user 100 becomes darker.

Other sensors 375 may include a weight sensor, a light sensor, a resistive sensor, an ultrasonic sensor, a proximity sensor, a biometric sensor, or other sensing devices to facilitate related functionalities. In a specific embodiment, other sensors 375 may include one or more positioning sensors configured to obtain positioning information of input unit 202, to detect changes in the position of input unit 202, and/or to measure the position of input unit 202. Alternatively, GPS software may permit input unit 202 to access an external GPS receiver (e.g., connecting via a serial port or Bluetooth). Consistent with the present disclosure, processing device 360 may modify a presentation of virtual content based on input from other sensors 375. For example, presenting private information only after identifying user 100 using data from a biometric sensor.

The components and arrangements shown in FIG. 3 are not intended to limit any embodiment. As will be appreciated by a person skilled in the art having the benefit of this disclosure, numerous variations and/or modifications may be made to the depicted configuration of input unit 202. For example, not all components may be essential for the operation of an input unit in all cases. Any component may be located in any appropriate part of an input unit, and the components may be rearranged into a variety of configurations while providing the functionality of various embodiments. For example, some input units may not include all of the elements as shown in input unit 202.

Figure 4:
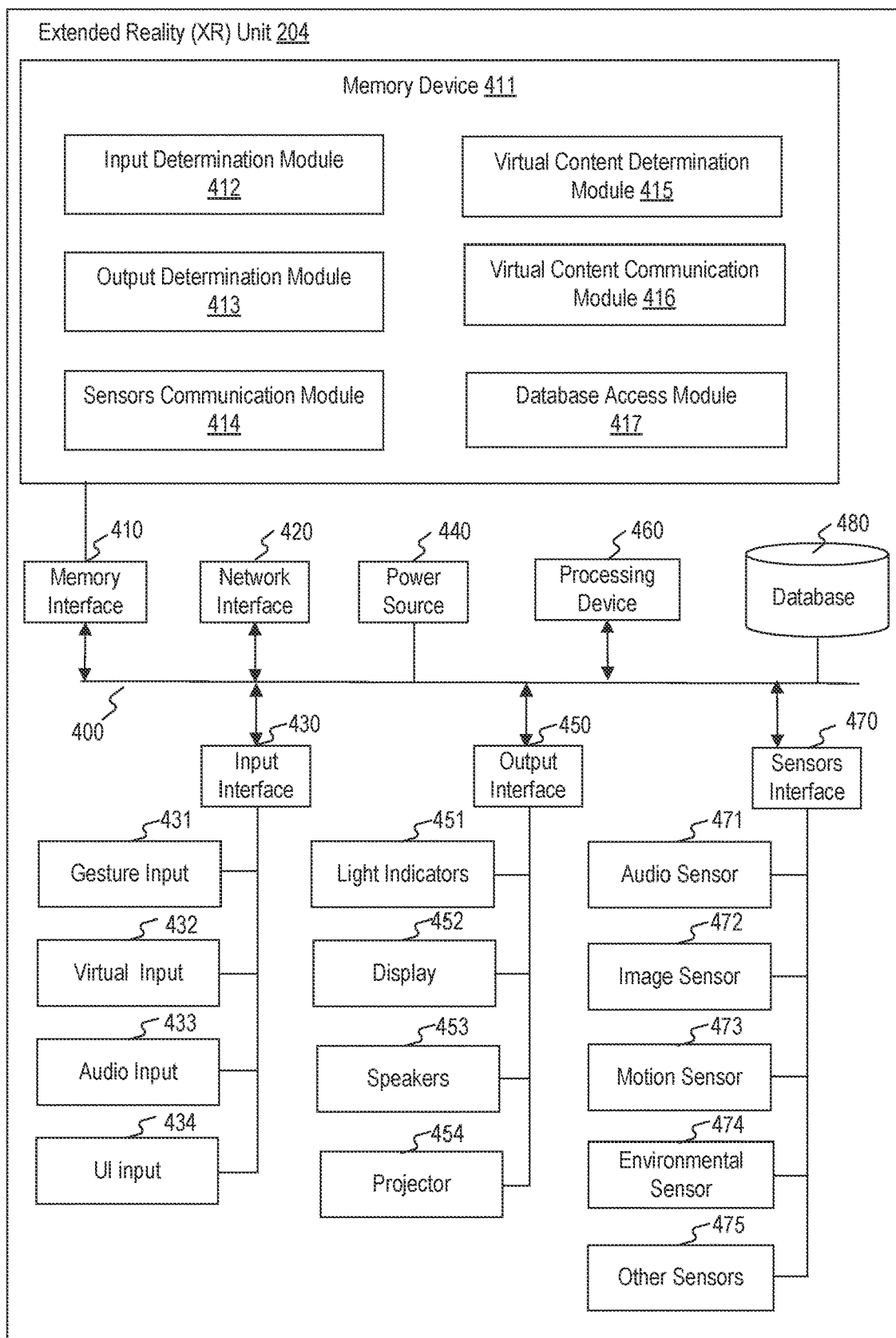
FIG. 4 is a block diagram illustrating some of the components of an extended reality unit, consistent with some embodiments of the present disclosure.

FIG. 4 is a block diagram of an examplary configuration of XR unit 204. FIG. 4 is an exemplary representation of just one embodiment, and it is to be understood that some illustrated elements might be omitted and others added within the scope of this disclosure. In the embodiment of FIG. 4, XR unit 204 may directly or indirectly access a bus 400 (or other communication mechanism) that interconnects subsystems and components for transferring information within XR unit 204. For example, bus 400 may interconnect a memory interface 410, a network interface 420, an input interface 430, a power source 440, an output interface 450, a processing device 460, a sensors interface 470, and a database 480.

Memory interface 410, shown in FIG. 4, is assumed to have similar functionality as the functionality of memory interface 310 described above in detail. Memory interface 410 may be used to access a software product and/or data stored on a non-transitory computer-readable medium or on memory devices, such as memory device 411. Memory device 411 may contain software modules to execute processes consistent with the present disclosure. In particular, memory device 411 may include an input determination module 412, an output determination module 413, a sensors communication module 414, a virtual content determination module 415, a virtual content communication module 416, and a database access module 417. Modules 412-417 may contain software instructions for execution by at least one processor (e.g., processing device 460) associated with XR unit 204. Input determination module 412, output determination module 413, sensors communication module 414, virtual content determination module 415, virtual content communication module 416, and database access module 417 may cooperate to perform various operations. For example, input determination module 412 may determine User Interface (UI) input received from input unit 202. At the same time, sensors communication module 414 may receive data from different sensors to determine a status of user 100. Virtual content determination module 415 may determine the virtual content to display based on received input and the determined status of user 100. Virtual content communication module 416 may retrieve virtual content not determined by virtual content determination module 415. The retrieval of the virtual content may be from database 380, database 480, mobile communications device 206, or from remote processing unit 208. Based on the output of virtual content determination module 415, output determination module 413 may cause a change in a virtual content displayed to user 100 by projector 454.

In some embodiments, input determination module 412 may regulate the operation of input interface 430 in order to receive gesture input 431, virtual input 432, audio input 433, and UI input 434. Consistent with the present disclosure, input determination module 412 may concurrently receive different types of input data. In one embodiment, input determination module 412 may apply different rules based on the detected type of input. For example, gesture input may have precedence over virtual input. In some embodiments, output determination module 413 may regulate the operation of output interface 450 in order to generate output using light indicators 451, display 452, speakers 453, and projector 454. In one embodiment, light indicators 451 may include a light indicator that shows the status of the wearable extended reality appliance. For example, the light indicator may display green light when the wearable extended reality appliance 110 are connected to input unit 202, and blinks when wearable extended reality appliance 110 has low battery. In another embodiment, display 452 may be used to display operational information. In another embodiment, speakers 453 may include a bone conduction headphone used to output audio to user 100. In another embodiment, projector 454 may present virtual content to user 100.

The operations of a sensors communication module, a virtual content determination module, a virtual content communication module, and a database access module are described above with reference to FIG. 3, details of which are not repeated herein. Modules 412-417 may be implemented in software, hardware, firmware, a mix of any of those, or the like.

Network interface 420, shown in FIG. 4, is assumed to have similar functionality as the functionality of network interface 320, described above in detail. The specific design and implementation of network interface 420 may depend on the communications network(s) over which XR unit 204 is intended to operate. For example, in some embodiments, XR unit 204 is configured to be selectively connectable by wire to input unit 202. When connected by wire, network interface 420 may enable communications with input unit 202; and when not connected by wire, network interface 420 may enable communications with mobile communications device 206.

Input interface 430, shown in FIG. 4, is assumed to have similar functionality as the functionality of input interface 330 described above in detail. In this case, input interface 430 may communicate with an image sensor to obtain gesture input 431 (e.g., a finger of user 100 pointing to a virtual object), communicate with other XR units 204 to obtain virtual input 432 (e.g., a virtual object shared with XR unit 204 or a gesture of avatar detected in the virtual environment), communicate with a microphone to obtain audio input 433 (e.g., voice commands), and communicate with input unit 202 to obtain UI input 434 (e.g., virtual content determined by virtual content determination module 315).

Power source 440, shown in FIG. 4, is assumed to have similar functionality as the functionality of power source 340 described above, only it provides electrical energy to power XR unit 204. In some embodiments, power source 440 may be charged by power source 340. For example, power source 440 may be wirelessly changed when XR unit 204 is placed on or in proximity to input unit 202.

Output interface 450, shown in FIG. 4, is assumed to have similar functionality as the functionality of output interface 350 described above in detail. In this case, output interface 450 may cause output from light indicators 451, display 452, speakers 453, and projector 454. Projector 454 may be any device, apparatus, instrument, or the like capable of projecting (or directing) light in order to display virtual content onto a surface. The surface may be part of XR unit 204, part of an eye of user 100, or part of an object in proximity to user 100. In one embodiment, projector 454 may include a lighting unit that concentrates light within a limited solid angle by means of one or more mirrors and lenses, and provides a high value of luminous intensity in a defined direction.

Processing device 460, shown in FIG. 4, is assumed to have similar functionality as the functionality of processing device 360 described above in detail. When XR unit 204 is connected to input unit 202, processing device 460 may work together with processing device 360. Specifically, processing device 460 may implement virtual machine technologies or other technologies to provide the ability to execute, control, run, manipulate, store, etc., multiple software processes, applications, programs, etc. It is appreciated that other types of processor arrangements could be implemented to provide the capabilities disclosed herein.

Sensors interface 470, shown in FIG. 4, is assumed to have similar functionality as the functionality of sensors interface 370 described above in detail. Specifically sensors interface 470 may communicate with audio sensor 471, image sensor 472, motion sensor 473, environmental sensor 474, and other sensors 475. The operations of an audio sensor, an image sensor, a motion sensor, an environmental sensor, and other sensors are described above with reference to FIG. 3, details of which are not repeated herein. It is appreciated that other types and combination of sensors may be used to provide the capabilities disclosed herein.

The components and arrangements shown in FIG. 4 are not intended to limit any embodiment. As will be appreciated by a person skilled in the art having the benefit of this disclosure, numerous variations and/or modifications may be made to the depicted configuration of XR unit 204. For example, not all components may be essential for the operation of XR unit 204 in all cases. Any component may be located in any appropriate part of system 200, and the components may be rearranged into a variety of configurations while providing the functionality of various embodiments. For example, some XR units may not include all of the elements in XR unit 204 (e.g., wearable extended reality appliance 110 may not have light indicators 451).

Figure 5:
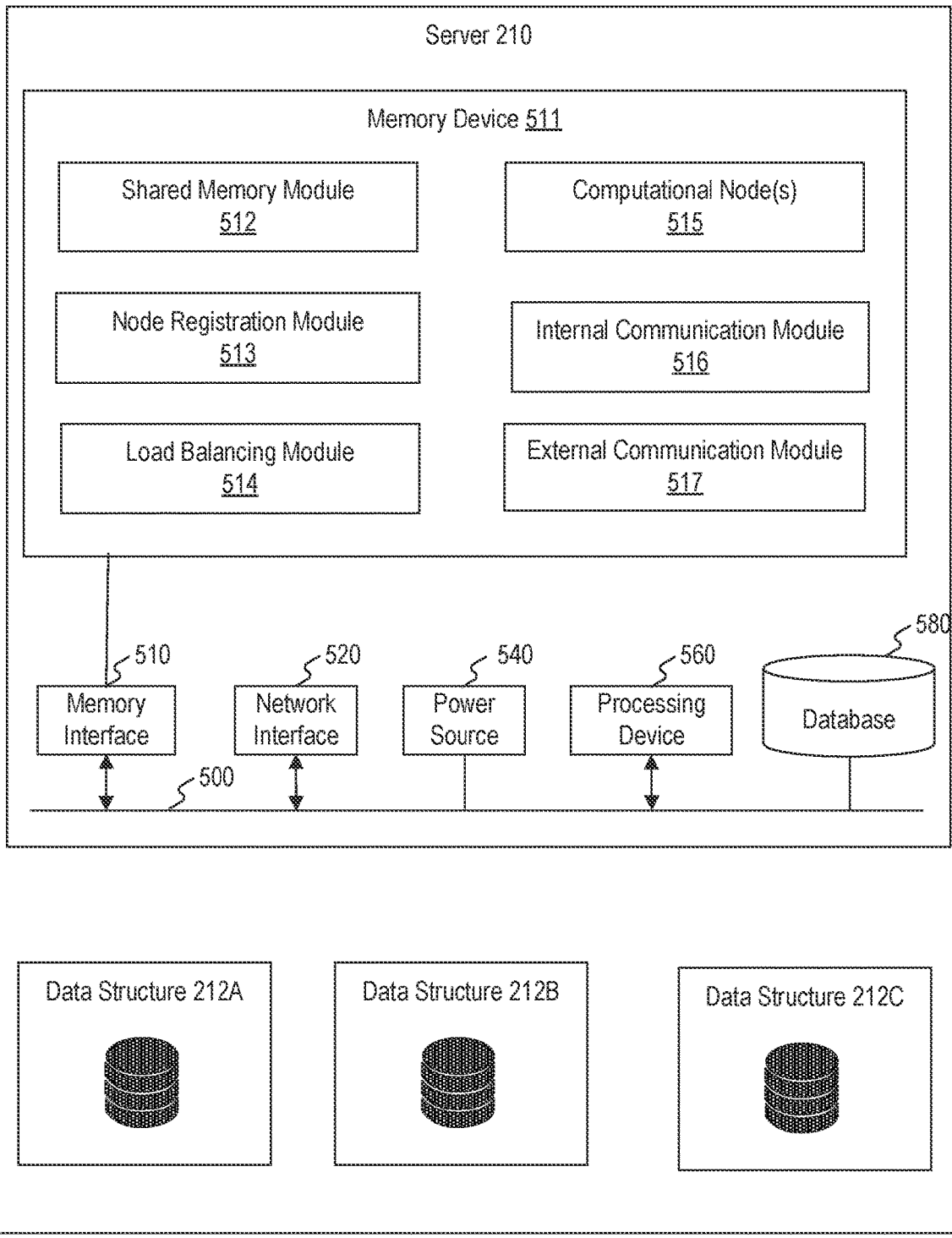
FIG. 5 is a block diagram illustrating some of the components of a remote processing unit, consistent with some embodiments of the present disclosure.

FIG. 5 is a block diagram of an examplary configuration of remote processing unit 208. FIG. 5 is an exemplary representation of just one embodiment, and it is to be understood that some illustrated elements might be omitted, and others added within the scope of this disclosure. In the embodiment of FIG. 5, remote processing unit 208 may include a server 210 that directly or indirectly accesses a bus 500 (or other communication mechanism) interconnecting subsystems and components for transferring information within server 210. For example, bus 500 may interconnect a memory interface 510, a network interface 520, a power source 540, a processing device 560, and a database 580. Remote processing unit 208 may also include a one or more data structures. For example, data structures 212A, 212B, and 212C.

Memory interface 510, shown in FIG. 5, is assumed to have similar functionality as the functionality of memory interface 310 described above in detail. Memory interface 510 may be used to access a software product and/or data stored on a non-transitory computer-readable medium or on other memory devices, such as memory devices 311, 411, 511, or data structures 212A, 212B, and 212C. Memory device 511 may contain software modules to execute processes consistent with the present disclosure. In particular, memory device 511 may include a shared memory module 512, a node registration module 513, a load balancing module 514, one or more computational nodes 515, an internal communication module 516, an external communication module 517, and a database access module (not shown). Modules 512-517 may contain software instructions for execution by at least one processor (e.g., processing device 560) associated with remote processing unit 208. Shared memory module 512, node registration module 513, load balancing module 514, computational module 515, and external communication module 517 may cooperate to perform various operations.

Shared memory module 512 may allow information sharing between remote processing unit 208 and other components of system 200. In some embodiments, shared memory module 512 may be configured to enable processing device 560 (and other processing devices in system 200) to access, retrieve, and store data. For example, using shared memory module 512, processing device 560 may perform at least one of: executing software programs stored on memory device 511, database 580, or data structures 212A-C; storing information in memory device 511, database 580, or data structures 212A-C; or retrieving information from memory device 511, database 580, or data structures 212A-C.

Node registration module 513 may be configured to track the availability of one or more computational nodes 515. In some examples, node registration module 513 may be implemented as: a software program, such as a software program executed by one or more computational nodes 515, a hardware solution, or a combined software and hardware solution. In some implementations, node registration module 513 may communicate with one or more computational nodes 515, for example, using internal communication module 516. In some examples, one or more computational nodes 515 may notify node registration module 513 of their status, for example, by sending messages: at startup, at shutdown, at constant intervals, at selected times, in response to queries received from node registration module 513, or at any other determined times. In some examples, node registration module 513 may query about the status of one or more computational nodes 515, for example, by sending messages: at startup, at constant intervals, at selected times, or at any other determined times.

Load balancing module 514 may be configured to divide the workload among one or more computational nodes 515. In some examples, load balancing module 514 may be implemented as: a software program, such as a software program executed by one or more of the computational nodes 515, a hardware solution, or a combined software and hardware solution. In some implementations, load balancing module 514 may interact with node registration module 513 in order to obtain information regarding the availability of one or more computational nodes 515. In some implementations, load balancing module 514 may communicate with one or more computational nodes 515, for example, using internal communication module 516. In some examples, one or more computational nodes 515 may notify load balancing module 514 of their status, for example, by sending messages: at startup, at shutdown, at constant intervals, at selected times, in response to queries received from load balancing module 514, or at any other determined times. In some examples, load balancing module 514 may query about the status of one or more computational nodes 515, for example, by sending messages: at startup, at constant intervals, at pre-selected times, or at any other determined times.

Internal communication module 516 may be configured to receive and/or to transmit information from one or more components of remote processing unit 208. For example, control signals and/or synchronization signals may be sent and/or received through internal communication module 516. In one embodiment, input information for computer programs, output information of computer programs, and/or intermediate information of computer programs may be sent and/or received through internal communication module 516. In another embodiment, information received though internal communication module 516 may be stored in memory device 511, in database 580, in data structures 212A-C, or other memory device in system 200. For example, information retrieved from data structure 212A may be transmitted using internal communication module 516. In another example, input data may be received using internal communication module 516 and stored in data structure 212B.

External communication module 517 may be configured to receive and/or to transmit information from one or more components of system 200. For example, control signals may be sent and/or received through external communication module 517. In one embodiment, information received though external communication module 517 may be stored in memory device 511, in database 580, in data structures 212A-C, and or any memory device in the system 200. In another embodiment, information retrieved from any of data structures 212A-C may be transmitted using external communication module 517 to XR unit 204. In another embodiment, input data may be transmitted and/or received using external communication module 517. Examples of such input data may include data received from input unit 202, information captured from the environment of user 100 using one or more sensors (e.g., audio sensor 471, image sensor 472, motion sensor 473, environmental sensor 474, other sensors 475), and more.

In some embodiments, aspects of modules 512-517 may be implemented in hardware, in software (including in one or more signal processing and/or application specific integrated circuits), in firmware, or in any combination thereof, executable by one or more processors, alone, or in various combinations with each other. Specifically, modules 512-517 may be configured to interact with each other and/or other modules of system 200 to perform functions consistent with embodiments of the present disclosure. Memory device 511 may include additional modules and instructions or fewer modules and instructions.

Network interface 520, power source 540, processing device 560, and database 580, shown in FIG. 5, are assumed to have similar functionality as the functionality of similar elements described above with reference to FIGS. 4 and 5. The specific design and implementation of the above-mentioned components may vary based on the implementation of system 200. In addition, remote processing unit 208 may include more or fewer components. For example, remote processing unit 208 may include an input interface configured to receive direct input from one or more input devices.

Consistent with the present disclosure, a processing device of system 200 (e.g., processor within mobile communications device 206, a processor within a server 210, a processor within a wearable extended reality appliance, such as, wearable extended reality appliance 110, and/or a processor within an input device associated with wearable extended reality appliance 110, such as keyboard 104) may use machine learning algorithms in order to implement any of the methods disclosed herein. In some embodiments, machine learning algorithms (also referred to as machine learning models in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recurrent neural network algorithms, linear machine learning models, non-linear machine learning models, ensemble algorithms, and more. For example, a trained machine learning algorithm may comprise an inference model, such as a predictive model, a classification model, a data regression model, a clustering model, a segmentation model, an artificial neural network (such as a deep neural network, a convolutional neural network, a recurrent neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters may be set manually by a person or automatically by a process external to the machine learning algorithm (such as a hyper parameter search algorithm), and the parameters of the machine learning algorithm may be set by the machine learning algorithm based on the training examples. In some implementations, the hyper-parameters may be set based on the training examples and the validation examples, and the parameters may be set based on the training examples and the selected hyper-parameters. For example, given the hyper-parameters, the parameters may be conditionally independent of the validation examples.

In some embodiments, trained machine learning algorithms (also referred to as machine learning models and trained machine learning models in the present disclosure) may be used to analyze inputs and generate outputs, for example in the cases described below. In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value corresponding to the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value corresponding to an item depicted in the image (such as an estimated property of the item, such as size, volume, age of a person depicted in the image, distance from an item depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

Consistent with the present disclosure, a processing device of system 200 may analyze image data captured by an image sensor (e.g., image sensor 372, image sensor 472, or any other image sensor) in order to implement any of the methods disclosed herein. In some embodiments, analyzing the image data may comprise analyzing the image data to obtain a preprocessed image data, and subsequently analyzing the image data and/or the preprocessed image data to obtain the desired outcome. One of ordinary skill in the art will recognize that the followings are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to: edges; corners; blobs; ridges; Scale Invariant Feature Transform (SIFT) features; temporal features; and so forth. In some examples, analyzing the image data may include calculating at least one convolution of at least a portion of the image data, and using the calculated at least one convolution to calculate at least one resulting value and/or to make determinations, identifications, recognitions, classifications, and so forth.

Consistent with another aspects of the disclosure, a processing device of system 200 may analyze image data in order to implement any of the methods disclosed herein. In some embodiments, analyzing the image may comprise analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result, and more. In some embodiments, analyzing image data (for example by the methods, steps and modules described herein) may comprise analyzing pixels, voxels, point cloud, range data, etc. included in the image data.

A convolution may include a convolution of any dimension. A one-dimensional convolution is a function that transforms an original sequence of numbers to a transformed sequence of numbers. The one-dimensional convolution may be defined by a sequence of scalars. Each particular value in the transformed sequence of numbers may be determined by calculating a linear combination of values in a subsequence of the original sequence of numbers corresponding to the particular value. A result value of a calculated convolution may include any value in the transformed sequence of numbers. Likewise, an n-dimensional convolution is a function that transforms an original n-dimensional array to a transformed array. The n-dimensional convolution may be defined by an n-dimensional array of scalars (known as the kernel of the n-dimensional convolution). Each particular value in the transformed array may be determined by calculating a linear combination of values in an n-dimensional region of the original array corresponding to the particular value. A result value of a calculated convolution may include any value in the transformed array. In some examples, an image may comprise one or more components (such as color components, depth component, etc.), and each component may include a two-dimensional array of pixel values. In one example, calculating a convolution of an image may include calculating a two-dimensional convolution on one or more components of the image. In another example, calculating a convolution of an image may include stacking arrays from different components to create a three-dimensional array, and calculating a three-dimensional convolution on the resulting three-dimensional array. In some examples, a video may comprise one or more components (such as color components, depth component, etc.), and each component may include a three-dimensional array of pixel values (with two spatial axes and one temporal axis). In one example, calculating a convolution of a video may include calculating a three-dimensional convolution on one or more components of the video. In another example, calculating a convolution of a video may include stacking arrays from different components to create a four-dimensional array, and calculating a four-dimensional convolution on the resulting four dimensional array.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples, but is inclusive of general principles described herein and illustrated in the figures in addition to the general principles encompassed by the appended claims.

The present disclosure is directed to systems and methods for providing users an extended reality environment. The term "extended reality environment," which may also be referred to as "extended reality," "extended reality space," or "extended environment," refers to all types of real-and-virtual combined environments and human-machine interactions at least partially generated by computer technology. The extended reality environment may be a completely simulated virtual environment or a combined real-and-virtual environment that a user may perceive from different perspectives. In some examples, the user may interact with elements of the extended reality environment. One non-limiting example of an extended reality environment may be a virtual reality environment, also known as "virtual reality" or a "virtual environment." An immersive virtual reality environment may be a simulated non-physical environment which provides to the user the perception of being present in the virtual environment. Another non-limiting example of an extended reality environment may be an augmented reality environment, also known as "augmented reality" or "augmented environment." An augmented reality environment may involve live direct or indirect view of a physical real-world environment that is enhanced with virtual computer-generated perceptual information, such as virtual objects that the user may interact with. Another non-limiting example of an extended reality environment is a mixed reality environment, also known as "mixed reality" or a "mixed environment." A mixed reality environment may be a hybrid of physical real-world and virtual environments, in which physical and virtual objects may coexist and interact in real time. In some examples, both augmented reality environments and mixed reality environments may include a combination of real and virtual worlds, real-time interactions, and accurate 3D registration of virtual and real objects. In some examples, both augmented reality environment and mixed reality environments may include constructive overlaid sensory information that may be added to the physical environment. In other examples, both augmented reality environment and mixed reality environments may include destructive virtual content that may mask at least part of the physical environment.

In some embodiments, the systems and methods may provide the extended reality environment using an extended reality appliance. The term extended reality appliance may include any type of device or system that enables a user to perceive and/or interact with an extended reality environment. The extended reality appliance may enable the user to perceive and/or interact with an extended reality environment through one or more sensory modalities. Some non-limiting examples of such sensory modalities may include visual, auditory, haptic, somatosensory, and olfactory. One example of the extended reality appliance is a virtual reality appliance that enables the user to perceive and/or interact with a virtual reality environment. Another example of the extended reality appliance is an augmented reality appliance that enables the user to perceive and/or interact with an augmented reality environment. Yet another example of the extended reality appliance is a mixed reality appliance that enables the user to perceive and/or interact with a mixed reality environment.

Consistent with one aspect of the disclosure, the extended reality appliance may be a wearable device, such as a head-mounted device, for example, smart glasses, smart contact lens, headsets or any other device worn by a human for purposes of presenting an extended reality to the human. Other extended reality appliances may include holographic projector or any other device or system capable of providing an augmented reality (AR), virtual reality (VR), mixed reality (MR), or any immersive experience. Typical components of wearable extended reality appliances may include at least one of: a stereoscopic head-mounted display, a stereoscopic head-mounted sound system, head-motion tracking sensors (such as gyroscopes, accelerometers, magnetometers, image sensors, structured light sensors, etc.), head mounted projectors, eye-tracking sensors, and additional components described below. Consistent with another aspect of the disclosure, the extended reality appliance may be a non-wearable extended reality appliance. Specifically, the non-wearable extended reality appliance may include multi-projected environment appliances. In some embodiments, an extended reality appliance may be configured to change the viewing perspective of the extended reality environment in response to movements of the user and in response to head movements of the user in particular. In one example, a wearable extended reality appliance may change the field-of-view of the extended reality environment in response to a change of the head pose of the user, such as by changing the spatial orientation without changing the spatial position of the user in the extended reality environment. In another example, a non-wearable extended reality appliance may change the spatial position of the user in the extended reality environment in response to a change in the position of the user in the real world, for example, by changing the spatial position of the user in the extended reality environment without changing the direction of the field-of-view with respect to the spatial position.

According to some embodiments, an extended reality appliance may include a digital communication device configured to at least one of: receiving virtual content data configured to enable a presentation of the virtual content, transmitting virtual content for sharing with at least one external device, receiving contextual data from at least one external device, transmitting contextual data to at least one external device, transmitting of usage data indicative of usage of the extended reality appliance, and transmitting of data based on information captured using at least one sensor included in the extended reality appliance. In additional embodiments, the extended reality appliance may include memory for storing at least one of virtual data configured to enable a presentation of virtual content, contextual data, usage data indicative of usage of the extended reality appliance, sensor data based on information captured using at least one sensor included in the wearable extended reality appliance, software instructions configured to cause a processing device to present the virtual content, software instructions configured to cause a processing device to collect and analyze the contextual data, software instructions configured to cause a processing device to collect and analyze the usage data, and software instructions configured to cause a processing device to collect and analyze the sensor data. In additional embodiments, the extended reality appliance may include a processing device configured to perform at least one of rendering of virtual content, collecting and analyzing contextual data, collecting and analyzing usage data, and collecting and analyzing sensor data. In additional embodiments, the extended reality appliance may include one or more sensors. The one or more sensors may include one or more image sensors (e.g., configured to capture images and/or videos of a user of the appliance or of an environment of the user), one or more motion sensors (such as an accelerometer, a gyroscope, a magnetometer, etc.), one or more positioning sensors (such as GPS, outdoor positioning sensor, indoor positioning sensor, etc.), one or more temperature sensors (e.g., configured to measure the temperature of at least part of the appliance and/or of the environment), one or more contact sensors, one or more proximity sensors (e.g., configured to detect whether the appliance is currently worn), one or more electrical impedance sensors (e.g., configured to measure electrical impedance of the user), one or more eye tracking sensors, such as gaze detectors, optical trackers, electric potential trackers (e.g., electrooculogram (EOG) sensors), video-based eye-trackers, infra-red/near infra-red sensors, passive light sensors, or any other technology capable of determining where a human is looking or gazing.

In some embodiments, the systems and methods may use an input device to interact with the extended reality appliance. The term input device may include any physical device configured to receive input from a user or an environment of the user, and to provide the data to a computational device. The data provided to the computational device may be in a digital format and/or in an analog format. In one embodiment, the input device may store the input received from the user in a memory device accessible by a processing device, and the processing device may access the stored data for analysis. In another embodiment, the input device may provide the data directly to a processing device, for example, over a bus or over another communication system configured to transfer data from the input device to the processing device. In some examples, the input received by the input device may include key presses, tactile input data, motion data, position data, gestures based input data, direction data, or any other data for supply for computation. Some examples of the input device may include a button, a key, a keyboard, a computer mouse, a touchpad, a touchscreen, a joystick, or another mechanism from which input may be received. Another example of an input device may include an integrated computational interface device that includes at least one physical component for receiving input from a user. The integrated computational interface device may include at least a memory, a processing device, and the at least one physical component for receiving input from a user. In one example, the integrated computational interface device may further include a digital network interface that enables digital communication with other computing devices. In one example, the integrated computational interface device may further include a physical component for outputting information to the user. In some examples, all components of the integrated computational interface device may be included in a single housing, while in other examples the components may be distributed among two or more housings. Some non-limiting examples of physical components for receiving input from users that may be included in the integrated computational interface device may include at least one of a button, a key, a keyboard, a touchpad, a touchscreen, a joystick, or any other mechanism or sensor from which computational information may be received. Some non-limiting examples of physical components for outputting information to users may include at least one of a light indicator (such as a LED indicator), a screen, a touchscreen, a beeper, an audio speaker, or any other audio, video, or haptic device that provides human-perceptible outputs.

In some embodiments, image data may be captured using one or more image sensors. In some examples, the image sensors may be included in the extended reality appliance, in a wearable device, in the wearable extended reality device, in the input device, in an environment of a user, and so forth. In some examples, the image data may be read from memory, may be received from an external device, may be generated (for example, using a generative model), and so forth. Some non-limiting examples of image data may include images, grayscale images, color images, 2D images, 3D images, videos, 2D videos, 3D videos, frames, footages, data derived from other image data, and so forth. In some examples, the image data may be encoded in any analog or digital format. Some non-limiting examples of such formats may include raw formats, compressed formats, uncompressed formats, lossy formats, lossless formats, JPEG, GIF, PNG, TIFF, BMP, NTSC, PAL, SECAM, MPEG, MPEG-4 Part 14, MOV, WMV, FLV, AVI, AVCHD, WebM, MKV, and so forth.

In some embodiments, the extended reality appliance may receive digital signals, for example, from the input device. The term digital signals may refer to a series of digital values that are discrete in time. The digital signals may represent, for example, sensor data, textual data, voice data, video data, virtual data, or any other form of data that provides perceptible information. Consistent with the present disclosure, the digital signals may be configured to cause the extended reality appliance to present virtual content. In one embodiment, the virtual content may be presented in a selected orientation. In this embodiment, the digital signals may indicate a position and an angle of a viewpoint in an environment, such as an extended reality environment. Specifically, the digital signals may include an encoding of the position and angle in six degree-of-freedom coordinates (e.g., forward/back, up/down, left/right, yaw, pitch, and roll). In another embodiment, the digital signals may include an encoding of the position as three-dimensional coordinates (e.g., x, y, and z), and an encoding of the angle as a vector originating from the encoded position. Specifically, the digital signals may indicate the orientation and an angle of the presented virtual content in an absolute coordinates of the environment, for example, by encoding yaw, pitch and roll of the virtual content with respect to a standard default angle. In another embodiment, the digital signals may indicate the orientation and the angle of the presented virtual content with respect to a viewpoint of another object (e.g., a virtual object, a physical object, etc.), for example, by encoding yaw, pitch, and roll of the virtual content with respect a direction corresponding to the viewpoint or to a direction corresponding to the other object. In another embodiment, such digital signals may include one or more projections of the virtual content, for example, in a format ready for presentation (e.g., image, video, etc.). For example, each such projection may correspond to a particular orientation or a particular angle. In another embodiment, the digital signals may include a representation of virtual content, for example, by encoding objects in a three-dimensional array of voxels, in a polygon mesh, or in any other format in which virtual content may be presented.

In some embodiments, the digital signals may be configured to cause the extended reality appliance to present virtual content. The term virtual content may include any type of data representation that may be displayed by the extended reality appliance to the user. The virtual content may include a virtual object, inanimate virtual content, animate virtual content configured to change over time or in response to triggers, virtual two-dimensional content, virtual three dimensional content, a virtual overlay over a portion of a physical environment or over a physical object, a virtual addition to a physical environment or to a physical object, a virtual promotion content, a virtual representation of a physical object, a virtual representation of a physical environment, a virtual document, a virtual character or persona, a virtual computer screen, a virtual widget, or any other format for displaying information virtually. Consistent with the present disclosure, the virtual content may include any visual presentation rendered by a computer or a processing device. In one embodiment, the virtual content may include a virtual object that is a visual presentation rendered by a computer in a confined region and configured to represent an object of a particular type (such as an inanimate virtual object, an animate virtual object, virtual furniture, a virtual decorative object, virtual widget, or other virtual representation.). The rendered visual presentation may change to reflect changes to a status object or changes in the viewing angle of the object, for example, in a way that mimics changes in the appearance of physical objects. In another embodiment, the virtual content may include a virtual display (also referred to as a "virtual display screen" or a "virtual screen" herein), such as a virtual computer screen, a virtual tablet screen or a virtual smartphone screen, configured to display information generated by an operating system, in which the operating system may be configured to receive textual data from a physical keyboard and/or a virtual keyboard and to cause a display of the textual content in the virtual display screen. In one example, illustrated in FIG. 1, the virtual content may include a virtual environment that includes a virtual computer screen and a plurality of virtual objects. In some examples, a virtual display may be a virtual object mimicking and/or extending the functionality of a physical display screen. For example, the virtual display may be presented in an extended reality environment (such as a mixed reality environment, an augmented reality environment, a virtual reality environment, etc.), using an extended reality appliance. In one example, a virtual display may present content produced by a regular operating system that may be equally presented on a physical display screen. In one example, a textual content entered using a keyboard (for example, using a physical keyboard, using a virtual keyboard, etc.) may be presented on a virtual display in real time as the textual content is typed. In one example, a virtual cursor may be presented on a virtual display, and the virtual cursor may be controlled by a pointing device (such as a physical pointing device, a virtual pointing device, a computer mouse, a joystick, a touchpad, a physical touch controller, and so forth). In one example, one or more windows of a graphical user interface operating system may be presented on a virtual display. In another example, content presented on a virtual display may be interactive, that is, it may change in reaction to actions of users. In yet another example, a presentation of a virtual display may include a presentation of a screen frame, or may include no presentation of a screen frame.

Some disclosed embodiments may include and/or access a data structure or a database. The terms data structure and a database, consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, Entity-Relationship model, a graph, a hypergraph, a matrix, a tensor, and so forth. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, does not require information to be co-located. It may be distributed across multiple servers, for example, that may be owned or operated by the same or different entities. Thus, the term data structure in the singular is inclusive of plural data structures.

In some embodiments, the system may determine the confidence level in received input or in any determined value. The term confidence level refers to any indication, numeric or otherwise, of a level (e.g., within a predetermined range) indicative of an amount of confidence the system has at determined data. For example, the confidence level may have a value between 1 and 10. Alternatively, the confidence level may be expressed as a percentage or any other numerical or non-numerical indication. In some cases, the system may compare the confidence level to a threshold.

The term threshold may denote a reference value, a level, a point, or a range of values. In operation, when the confidence level of determined data exceeds the threshold (or is below it, depending on a particular use case), the system may follow a first course of action and, when the confidence level is below it (or above it, depending on a particular use case), the system may follow a second course of action. The value of the threshold may be predetermined for each type of examined object or may be dynamically selected based on different considerations.

Reference is now made to FIG. 1, which illustrates a user that uses an example extended reality system consistent with embodiments of the present disclosure FIG. 1 is an exemplary representation of just one embodiment, and it is to be understood that some illustrated elements might be omitted and others added within the scope of this disclosure. As shown, a user 100 is sitting behind table 102, supporting a keyboard 104 and mouse 106. Keyboard 104 is connected by wire 108 to a wearable extended reality appliance 110 that displays virtual content to user 100. Alternatively or additionally to wire 108, keyboard 104 may connect to wearable extended reality appliance 110 wirelessly. For illustration purposes, the wearable extended reality appliance is depicted a pair of smart glasses, but, as described above, wearable extended reality appliance 110 may be any type of head-mounted device used for presenting an extended reality to user 100. The virtual content displayed by wearable extended reality appliance 110 includes a virtual screen 112 (also referred to as a "virtual display screen" or a "virtual display" herein) and a plurality of virtual widgets 114. Virtual widgets 114A-114D are displayed next to virtual screen 112 and virtual widget 114E is displayed on table 102. User 100 may input text to a document 116 displayed in virtual screen 112 using keyboard 104; and may control virtual cursor 118 using mouse 106. In one example, virtual cursor 118 may move anywhere within virtual screen 112. In another example, virtual cursor 118 may move anywhere within virtual screen 112 and may also move to any one of virtual widgets 114A-114D but not to virtual widget 114E. In yet another example, virtual cursor 118 may move anywhere within virtual screen 112 and may also move to any one of virtual widgets 114A-114E. In an additional example, virtual cursor 118 may move anywhere in the extended reality environment including virtual screen 112 and virtual widgets 114A-114E. In yet another example, virtual cursor may move on all available surfaces (i.e., virtual surfaces or physical surfaces) or only on selected surfaces in the extended reality environment. Alternatively or additionally, user 100 may interact with any one of virtual widgets 114A-114E, or with selected virtual widgets, using hand gestures recognized by wearable extended reality appliance 110. For example, virtual widget 114E may be an interactive widget (e.g., a virtual slider controller) that may be operated with hand gestures.

FIG. 2 illustrates an example of a system 200 that provides extended reality (XR) experience to users, such as user 100. FIG. 2 is an exemplary representation of just one embodiment, and it is to be understood that some illustrated elements might be omitted and others added within the scope of this disclosure. System 200 may be computer-based and may include computer system components, wearable appliances, workstations, tablets, handheld computing devices, memory devices, and/or internal network(s) connecting the components. System 200 may include or be connected to various network computing resources (e.g., servers, routers, switches, network connections, storage devices, etc.) for supporting services provided by system 200. Consistent with the present disclosure, system 200 may include an input unit 202, an XR unit 204, a mobile communications device 206, and a remote processing unit 208. Remote processing unit 208 may include a server 210 coupled to one or more physical or virtual storage devices, such as a data structure 212. System 200 may also include or be connected to a communications network 214 that facilitates communications and data exchange between different system components and the different entities associated with system 200.

Consistent with the present disclosure, input unit 202 may include one or more devices that may receive input from user 100. In one embodiment, input unit 202 may include a textual input device, such as keyboard 104. The textual input device may include all possible types of devices and mechanisms for inputting textual information to system 200. Examples of textual input devices may include mechanical keyboards, membrane keyboards, flexible keyboards, QWERTY keyboards, Dvorak keyboards, Colemak keyboards, chorded keyboards, wireless keyboards, keypads, key-based control panels, or other arrays of control keys, vision input devices, or any other mechanism for inputting text, whether the mechanism is provided in physical form or is presented virtually. In one embodiment, input unit 202 may also include a pointing input device, such as mouse 106. The pointing input device may include all possible types of devices and mechanisms for inputting two-dimensional or three-dimensional information to system 200. In one example, two-dimensional input from the pointing input device may be used for interacting with virtual content presented via the XR unit 204. Examples of pointing input devices may include a computer mouse, trackball, touchpad, trackpad, touchscreen, joystick, pointing stick, stylus, light pen, or any other physical or virtual input mechanism. In one embodiment, input unit 202 may also include a graphical input device, such as a touchscreen configured to detect contact, movement, or break of movement. The graphical input device may use any of a plurality of touch sensitivity technologies, including, but not limited to, capacitive, resistive, infrared, and surface acoustic wave technologies as well as other proximity sensor arrays or other elements for determining one or more points of contact. In one embodiment, input unit 202 may also include one or more voice input devices, such as a microphone. The voice input device may include all possible types of devices and mechanisms for inputting voice data to facilitate voice-enabled functions, such as voice recognition, voice replication, digital recording, and telephony functions. In one embodiment, input unit 202 may also include one or more image input devices, such as an image sensor, configured to capture image data. In one embodiment, input unit 202 may also include one or more haptic gloves configured to capture hands motion and pose data. In one embodiment, input unit 202 may also include one or more proximity sensors configured to detect presence and/or movement of objects in a selected region near the sensors.

In accordance with some embodiments, the system may include at least one sensor configured to detect and/or measure a property associated with the user, the user's action, or user's environment. One example of the at least one sensor, is sensor 216 included in input unit 202. Sensor 216 may be a motion sensor, a touch sensor, a light sensor, an infrared sensor, an audio sensor, an image sensor, a proximity sensor, a positioning sensor, a gyroscope, a temperature sensor, a biometric sensor, or any other sensing devices to facilitate related functionalities. Sensor 216 may be integrated with, or connected to, the input devices or it may be separated from the input devices. In one example, a thermometer may be included in mouse 106 to determine the body temperature of user 100. In another example, a positioning sensor may be integrated with keyboard 104 to determine movement of user 100 relative to keyboard 104. Such positioning sensor may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, image based positioning technology, indoor positioning technology, outdoor positioning technology, or any other positioning technology.

In accordance with some embodiments, the system may include one or more sensors for identifying a position and/or a movement of a physical device (such as a physical input device, a physical computing device, keyboard 104, mouse 106, wearable extended reality appliance 110, and so forth). The one or more sensors may be included in the physical device or may be external to the physical device. In some examples, an image sensor external to the physical device (for example, an image sensor included in another physical device) may be used to capture image data of the physical device, and the image data may be analyzed to identify the position and/or the movement of the physical device. For example, the image data may be analyzed using a visual object tracking algorithm to identify the movement of the physical device, may be analyzed using a visual object detection algorithm to identify the position of the physical device (for example, relative to the image sensor, in a global coordinates system, etc.), and so forth. In some examples, an image sensor included in the physical device may be used to capture image data, and the image data may be analyzed to identify the position and/or the movement of the physical device. For example, the image data may be analyzed using visual odometry algorithms to identify the position of the physical device, may be analyzed using an ego-motion algorithm to identify movement of the physical device, and so forth. In some examples, a positioning sensor, such as an indoor positioning sensor or an outdoor positioning sensor, may be included in the physical device and may be used to determine the position of the physical device. In some examples, a motion sensor, such as an accelerometer or a gyroscope, may be included in the physical device and may be used to determine the motion of the physical device. In some examples, a physical device, such as a keyboard or a mouse, may be configured to be positioned on a physical surface. Such physical device may include an optical mouse sensor (also known as non-mechanical tracking engine) aimed towards the physical surface, and the output of the optical mouse sensor may be analyzed to determine movement of the physical device with respect to the physical surface.

Consistent with the present disclosure, XR unit 204 may include a wearable extended reality appliance configured to present virtual content to user 100. One example of the wearable extended reality appliance is wearable extended reality appliance 110. Additional examples of wearable extended reality appliance may include a Virtual Reality (VR) device, an Augmented Reality (AR) device, a Mixed Reality (MR) device, or any other device capable of generating extended reality content. Some non-limiting examples of such devices may include Nreal Light, Magic Leap One, Varjo, Quest 1/2, Vive, and others. In some embodiments, XR unit 204 may present virtual content to user 100. Generally, an extended reality appliance may include all real-and-virtual combined environments and human-machine interactions generated by computer technology and wearables. As mentioned above, the term "extended reality" (XR) refers to a superset which includes the entire spectrum from "the complete real" to "the complete virtual." It includes representative forms such as augmented reality (AR), mixed reality (MR), virtual reality (VR), and the areas interpolated among them. Accordingly, it is noted that the terms "XR appliance," "AR appliance," "VR appliance," and "MR appliance" may be used interchangeably herein and may refer to any device of the variety of appliances listed above.

Consistent with the present disclosure, the system may exchange data with a variety of communication devices associated with users, for example, mobile communications device 206. The term "communication device" is intended to include all possible types of devices capable of exchanging data using digital communications network, analog communication network or any other communications network configured to convey data. In some examples, the communication device may include a smartphone, a tablet, a smartwatch, a personal digital assistant, a desktop computer, a laptop computer, an IoT device, a dedicated terminal, a wearable communication device, and any other device that enables data communications. In some cases, mobile communications device 206 may supplement or replace input unit 202. Specifically, mobile communications device 206 may be associated with a physical touch controller that may function as a pointing input device. Moreover, mobile communications device 206 may also, for example, be used to implement a virtual keyboard and replace the textual input device. For example, when user 100 steps away from table 102 and walks to the break room with his smart glasses, he may receive an email that requires a quick answer. In this case, the user may select to use his or her own smartwatch as the input device and to type the answer to the email while it is virtually presented by the smart glasses.

Consistent with the present disclosure, embodiments of the system may involve the usage of a cloud server. The term "cloud server" refers to a computer platform that provides services via a network, such as the Internet. In the example embodiment illustrated in FIG. 2, server 210 may use virtual machines that may not correspond to individual hardware. For example, computational and/or storage capabilities may be implemented by allocating appropriate portions of desirable computation/storage power from a scalable repository, such as a data center or a distributed computing environment. Specifically, in one embodiment, remote processing unit 208 may be used together with XR unit 204 to provide the virtual content to user 100. In one example configuration, server 210 may be a cloud server that functions as the operation system (OS) of the wearable extended reality appliance. In one example, server 210 may implement the methods described herein using customized hard-wired logic, one or more Application Specific Integrated Circuits (ASICs), Field Programmable Gate Arrays (FPGAs), firmware, and/or program logic which, in combination with the computer system, cause server 210 to be a special-purpose machine.

In some embodiments, server 210 may access data structure 212 to determine, for example, virtual content to display user 100. Data structure 212 may utilize a volatile or non-volatile, magnetic, semiconductor, tape, optical, removable, non-removable, other type of storage device or tangible or non-transitory computer-readable medium, or any medium or mechanism for storing information. Data structure 212 may be part of server 210 or separate from server 210, as shown. When data structure 212 is not part of server 210, server 210 may exchange data with data structure 212 via a communication link. Data structure 212 may include one or more memory devices that store data and instructions used to perform one or more features of the disclosed methods. In one embodiment, data structure 212 may include any of a plurality of suitable data structures, ranging from small data structures hosted on a workstation to large data structures distributed among data centers. Data structure 212 may also include any combination of one or more data structures controlled by memory controller devices (e.g., servers) or software.

Consistent with the present disclosure, communications network may be any type of network (including infrastructure) that supports communications, exchanges information, and/or facilitates the exchange of information between the components of a system. For example, communications network 214 in system 200 may include, for example, a telephone network, an extranet, an intranet, the Internet, satellite communications, off-line communications, wireless communications, transponder communications, a Local Area Network (LAN), wireless network (e.g., a Wi-Fi/ 302.11 network), a Wide Area Network (WAN), a Virtual Private Network (VPN), digital communication network, analog communication network, or any other mechanism or combinations of mechanism that enable data transmission.

The components and arrangements of system 200 shown in FIG. 2 are intended to be exemplary only and are not intended to limit the disclosed embodiments, as the system components used to implement the disclosed processes and features may vary.

FIG. 3 is a block diagram of an examplary configuration of input unit 202. FIG. 3 is an exemplary representation of just one embodiment, and it is to be understood that some illustrated elements might be omitted and others added within the scope of this disclosure. In the embodiment of FIG. 3, input unit 202 may directly or indirectly access a bus 300 (or other communication mechanism) that interconnects subsystems and components for transferring information within input unit 202. For example, bus 300 may interconnect a memory interface 310, a network interface 320, an input interface 330, a power source 340, an output interface 350, a processing device 360, a sensors interface 370, and a database 380.

Memory interface 310, shown in FIG. 3, may be used to access a software product and/or data stored on a non-transitory computer-readable medium. Generally, a non-transitory computer-readable storage medium refers to any type of physical memory on which information or data readable by at least one processor can be stored. Examples include Random Access Memory (RAM), Read-Only Memory (ROM), volatile memory, nonvolatile memory, hard drives, CD ROMs, DVDs, flash drives, disks, any other optical data storage medium, any physical medium with patterns of holes, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within an input unit or at a remote location. Additionally, one or more computer-readable storage mediums can be utilized in implementing a computer-implemented method. Accordingly, the term computer-readable storage medium should be understood to include tangible items and exclude carrier waves and transient signals. In the specific embodiment illustrated in FIG. 3, memory interface 310 may be used to access a software product and/or data stored on a memory device, such as memory device 311. Memory device 311 may include high-speed random-access memory and/or non-volatile memory, such as one or more magnetic disk storage devices, one or more optical storage devices, and/or flash memory (e.g., NAND, NOR). Consistent with the present disclosure, the components of memory device 311 may be distributed in more than units of system 200 and/or in more than one memory device.

Memory device 311, shown in FIG. 3, may contain software modules to execute processes consistent with the present disclosure. In particular, memory device 311 may include an input determination module 312, an output determination module 313, a sensors communication module 314, a virtual content determination module 315, a virtual content communication module 316, and a database access module 317. Modules 312-317 may contain software instructions for execution by at least one processor (e.g., processing device 360) associated with input unit 202. Input determination module 312, output determination module 313, sensors communication module 314, virtual content determination module 315, virtual content communication module 316, and database access module 317 may cooperate to perform various operations. For example, input determination module 312 may determine text using data received from, for example, keyboard 104. Thereafter, output determination module 313 may cause presentation of the recent inputted text, for example on a dedicated display 352 physically or wirelessly coupled to keyboard 104. This way, when user 100 types, he can see a preview of the typed text without constantly moving his head up and down to look at virtual screen 112. Sensors communication module 314 may receive data from different sensors to determine a status of user 100. Thereafter, virtual content determination module 315 may determine the virtual content to display, based on received input and the determined status of user 100. For example, the determined virtual content may be a virtual presentation of the recent inputted text on a virtual screen virtually located adjacent to keyboard 104. Virtual content communication module 316 may obtain virtual content that is not determined by virtual content determination module 315 (e.g., an avatar of another user). The retrieval of the virtual content may be from database 380, from remote processing unit 208, or any other source.

In some embodiments, input determination module 312 may regulate the operation of input interface 330 in order to receive pointer input 331, textual input 332, audio input 333, and XR-related input 334. Details on the pointer input, the textual input, and the audio input are described above. The term "XR-related input" may include any type of data that may cause a change in the virtual content displayed to user 100. In one embodiment, XR-related input 334 may include image data of user 100, a wearable extended reality appliance (e.g., detected hand gestures of user 100). In another embodiment, XR-related input 334 may include wireless communication indicating a presence of another user in proximity to user 100. Consistent with the present disclosure, input determination module 312 may concurrently receive different types of input data. Thereafter, input determination module 312 may further apply different rules based on the detected type of input. For example, a pointer input may have precedence over voice input.

In some embodiments, output determination module 313 may regulate the operation of output interface 350 in order to generate output using light indicators 351, display 352, and/or speakers 353. In general, the output generated by output determination module 313 does not include virtual content to be presented by a wearable extended reality appliance. Instead, the output generated by output determination module 313 include various outputs that relates to the operation of input unit 202 and/or the operation of XR unit 204. In one embodiment, light indicators 351 may include a light indicator that shows the status of a wearable extended reality appliance. For example, the light indicator may display green light when wearable extended reality appliance 110 are connected to keyboard 104, and blinks when wearable extended reality appliance 110 has low battery. In another embodiment, display 352 may be used to display operational information. For example, the display may present error messages when the wearable extended reality appliance is inoperable. In another embodiment, speakers 353 may be used to output audio, for example, when user 100 wishes to play some music for other users.

In some embodiments, sensors communication module 314 may regulate the operation of sensors interface 370 in order to receive sensor data from one or more sensors, integrated with, or connected to, an input device. The one or more sensors may include: audio sensor 371, image sensor 372, motion sensor 373, environmental sensor 374 (e.g., a temperature sensor, ambient light detectors, etc.), and other sensors 375. In one embodiment, the data received from sensors communication module 314 may be used to determine the physical orientation of the input device. The physical orientation of the input device may be indicative of a state of the user and may be determined based on combination of a tilt movement, a roll movement, and a lateral movement. Thereafter, the physical orientation of the input device may be used by virtual content determination module 315 to modify display parameters of the virtual content to match the state of the user (e.g., attention, sleepy, active, sitting, standing, leaning backwards, leaning forward, walking, moving, riding, etc.).

In some embodiments, virtual content determination module 315 may determine the virtual content to be displayed by the wearable extended reality appliance. The virtual content may be determined based on data from input determination module 312, sensors communication module 314, and other sources (e.g., database 380). In some embodiments, determining the virtual content may include determining the distance, the size, and the orientation of the virtual objects. The determination of the position of the virtual objects may be determined based on the type of the virtual objects. Specifically, with regards to the example illustrated in FIG. 1, the virtual content determination module 315 may determine to place four virtual widgets 114A-114D on the sides of virtual screen 112 and to place virtual widget 114E on table 102 because virtual widget 114E is a virtual controller (e.g., volume bar). The determination of the position of the virtual objects may further be determined based on user's preferences. For example, for left-handed users, virtual content determination module 315 may determine placing a virtual volume bar left of keyboard 104; and for right-handed users, virtual content determination module 315 may determine placing the virtual volume bar right of keyboard 104.

In some embodiments, virtual content communication module 316 may regulate the operation of network interface 320 in order to obtain data from one or more sources to be presented as virtual content to user 100. The one or more sources may include other XR units 204, the user's mobile communications device 206, remote processing unit 208, publicly available information, etc. In one embodiment, virtual content communication module 316 may communicate with mobile communications device 206 in order to provide a virtual representation of mobile communications device 206. For example, the virtual representation may enable user 100 to read messages and interact with applications installed on the mobile communications device 206. Virtual content communication module 316 may also regulate the operation of network interface 320 in order to share virtual content with other users. In one example, virtual content communication module 316 may use data from input determination module to identify a trigger (e.g., the trigger may include a gesture of the user) and to transfer content from the virtual display to a physical display (e.g., TV) or to a virtual display of a different user.

In some embodiments, database access module 317 may cooperate with database 380 to retrieve stored data. The retrieved data may include, for example, privacy levels associated with different virtual objects, the relationship between virtual objects and physical objects, the user's preferences, the user's past behavior, and more. As described above, virtual content determination module 315 may use the data stored in database 380 to determine the virtual content. Database 380 may include separate databases, including, for example, a vector database, raster database, tile database, viewport database, and/or a user input database. The data stored in database 380 may be received from modules 314-317 or other components of system 200. Moreover, the data stored in database 380 may be provided as input using data entry, data transfer, or data uploading.

Modules 312-317 may be implemented in software, hardware, firmware, a mix of any of those, or the like. In some embodiments, any one or more of modules 312-317 and data associated with database 380 may be stored in XR unit 204, mobile communications device 206, or remote processing unit 208. Processing devices of system 200 may be configured to execute the instructions of modules 312-317. In some embodiments, aspects of modules 312-317 may be implemented in hardware, in software (including in one or more signal processing and/or application specific integrated circuits), in firmware, or in any combination thereof, executable by one or more processors, alone, or in various combinations with each other. Specifically, modules 312-317 may be configured to interact with each other and/or other modules of system 200 to perform functions consistent with disclosed embodiments. For example, input unit 202 may execute instructions that include an image processing algorithm on data from XR unit 204 to determine head movement of user 100. Furthermore, each functionality described throughout the specification, with regards to input unit 202 or with regards to a component of input unit 202, may correspond to a set of instructions for performing said functionality. These instructions need not be implemented as separate software programs, procedures, or modules. Memory device 311 may include additional modules and instructions or fewer modules and instructions. For example, memory device 311 may store an operating system, such as ANDROID, iOS, UNIX, OSX, WINDOWS, DARWIN, RTXC, LINUX or an embedded operating system such as VXWorkS. The operating system can include instructions for handling basic system services and for performing hardware-dependent tasks.

Network interface 320, shown in FIG. 3, may provide two-way data communications to a network, such as communications network 214. In one embodiment, network interface 320 may include an Integrated Services Digital Network (ISDN) card, cellular modem, satellite modem, or a modem to provide a data communication connection over the Internet. As another example, network interface 320 may include a Wireless Local Area Network (WLAN) card. In another embodiment, network interface 320 may include an Ethernet port connected to radio frequency receivers and transmitters and/or optical (e.g., infrared) receivers and transmitters. The specific design and implementation of network interface 320 may depend on the communications network or networks over which input unit 202 is intended to operate. For example, in some embodiments, input unit 202 may include network interface 320 designed to operate over a GSM network, a GPRS network, an EDGE network, a Wi-Fi or WiMax network, and a Bluetooth network. In any such implementation, network interface 320 may be configured to send and receive electrical, electromagnetic, or optical signals that carry digital data streams or digital signals representing various types of information.

Input interface 330, shown in FIG. 3, may receive input from a variety of input devices, for example, a keyboard, a mouse, a touch pad, a touch screen, one or more buttons, a joystick, a microphone, an image sensor, and any other device configured to detect physical or virtual input. The received input may be in the form of at least one of: text, sounds, speech, hand gestures, body gestures, tactile information, and any other type of physically or virtually input generated by the user. In the depicted embodiment, input interface 330 may receive pointer input 331, textual input 332, audio input 333, and XR-related input 334. In additional embodiment, input interface 330 may be an integrated circuit that may act as bridge between processing device 360 and any of the input devices listed above.

Power source 340, shown in FIG. 3, may provide electrical energy to power input unit 202 and optionally also power XR unit 204. Generally, a power source included in the any device or system in the present disclosure may be any device that can repeatedly store, dispense, or convey electric power, including, but not limited to, one or more batteries (e.g., a lead-acid battery, a lithium-ion battery, a nickel-metal hydride battery, a nickel-cadmium battery), one or more capacitors, one or more connections to external power sources, one or more power convertors, or any combination of them. With reference to the example illustrated in FIG. 3, the power source may be mobile, which means that input unit 202 can be easily carried by a hand (e.g., the total weight of power source 340 may be less than a pound). The mobility of the power source enables user 100 to use input unit 202 in a variety of situations. In other embodiments, power source 340 may be associated with a connection to an external power source (such as an electrical power grid) that may be used to charge power source 340. In addition, power source 340 may be configured to charge one or more batteries included in XR unit 204; for example, a pair of extended reality glasses (e.g., wearable extended reality appliance 110) may be charged (e.g., wirelessly or not wirelessly) when they are placed on or in proximity to the input unit 202.

Output interface 350, shown in FIG. 3, may cause output from a variety of output devices, for example, using light indicators 351, display 352, and/or speakers 353. In one embodiment, output interface 350 may be an integrated circuit that may act as bridge between processing device 360 and at least one of the output devices listed above. Light indicators 351 may include one or more light sources, for example, a LED array associated with different colors. Display 352 may include a screen (e.g., LCD or dot-matrix screen) or a touch screen. Speakers 353 may include audio headphones, a hearing aid type device, a speaker, a bone conduction headphone, interfaces that provide tactile cues, vibrotactile stimulators, and more.

Processing device 360, shown in FIG. 3, may include at least one processor configured to execute computer programs, applications, methods, processes, or other software to perform embodiments described in the present disclosure. Generally, a processing device included in the any device or system in the present disclosure may include one or more integrated circuits, microchips, microcontrollers, microprocessors, all or part of a central processing unit (CPU), graphics processing unit (GPU), digital signal processor (DSP), field programmable gate array (FPGA), or other circuits suitable for executing instructions or performing logic operations. The processing device may include at least one processor configured to perform functions of the disclosed methods such as a microprocessor manufactured by Intel™. The processing device may include a single core or multiple core processors executing parallel processes simultaneously. In one example, the processing device may be a single core processor configured with virtual processing technologies. The processing device may implement virtual machine technologies or other technologies to provide the ability to execute, control, run, manipulate, store, etc., multiple software processes, applications, programs, etc. In another example, the processing device may include a multiple-core processor arrangement (e.g., dual, quad core, etc.) configured to provide parallel processing functionalities to allow a device associated with the processing device to execute multiple processes simultaneously. It is appreciated that other types of processor arrangements could be implemented to provide the capabilities disclosed herein.

Sensors interface 370, shown in FIG. 3, may obtain sensor data from a variety of sensors, for example, audio sensor 371, image sensor 372, motion sensor 373, environmental sensor 374, and other sensors 375. In one embodiment, sensors interface 370 may be an integrated circuit that may act as bridge between processing device 360 and at least one of the sensors listed above.

Audio sensor 371 may include one or more audio sensors configured to capture audio by converting sounds to digital information. Some examples of audio sensors may include: microphones, unidirectional microphones, bidirectional microphones, cardioid microphones, omnidirectional microphones, onboard microphones, wired microphones, wireless microphones, or any combination of the above. Consistent with the present disclosure, processing device 360 may modify a presentation of virtual content based on data received from audio sensor 371 (e.g., voice commands).

Image sensor 372 may include one or more image sensors configured to capture visual information by converting light to image data. Consistent with the present disclosure, an image sensor may be included in the any device or system in the present disclosure and may be any device capable of detecting and converting optical signals in the near-infrared, infrared, visible, and ultraviolet spectrums into electrical signals. Examples of image sensors may include digital cameras, phone cameras, semiconductor Charge-Coupled Devices (CCDs), active pixel sensors in Complementary Metal-Oxide-Semiconductor (CMOS), or N-type metal-oxide-semiconductor (NMOS, Live MOS). The electrical signals may be used to generate image data. Consistent with the present disclosure, the image data may include pixel data streams, digital images, digital video streams, data derived from captured images, and data that may be used to construct one or more 3D images, a sequence of 3D images, 3D videos, or a virtual 3D representation. The image data acquired by image sensor 372 may be transmitted by wired or wireless transmission to any processing device of system 200. For example, the image data may be processed in order to: detect objects, detect events, detect action, detect face, detect people, recognize a known person, or any other information that may be used by system 200. Consistent with the present disclosure, processing device 360 may modify a presentation of virtual content based on image data received from image sensor 372.

Motion sensor 373 may include one or more motion sensors configured to measure motion of input unit 202 or motion of objects in the environment of input unit 202. Specifically, the motion sensors may perform at least one of the following: detect motion of objects in the environment of input unit 202, measure the velocity of objects in the environment of input unit 202, measure the acceleration of objects in the environment of input unit 202, detect the motion of input unit 202, measure the velocity of input unit 202, measure the acceleration of input unit 202, etc. In some embodiments, motion sensor 373 may include one or more accelerometers configured to detect changes in proper acceleration and/or to measure proper acceleration of input unit 202. In other embodiments, motion sensor 373 may include one or more gyroscopes configured to detect changes in the orientation of input unit 202 and/or to measure information related to the orientation of input unit 202. In other embodiments, motion sensor 373 may include one or more using image sensors, LI DAR sensors, radar sensors, or proximity sensors. For example, by analyzing captured images the processing device may determine the motion of input unit 202, for example, using ego-motion algorithms. In addition, the processing device may determine the motion of objects in the environment of input unit 202, for example, using object tracking algorithms. Consistent with the present disclosure, processing device 360 may modify a presentation of virtual content based on the determined motion of input unit 202 or the determined motion of objects in the environment of input unit 202. For example, causing a virtual display to follow the movement of input unit 202.

Environmental sensor 374 may include one or more sensors from different types configured to capture data reflective of the environment of input unit 202. In some embodiments, environmental sensor 374 may include one or more chemical sensors configured to perform at least one of the following: measure chemical properties in the environment of input unit 202, measure changes in the chemical properties in the environment of input unit 202, detect the present of chemicals in the environment of input unit 202, measure the concentration of chemicals in the environment of input unit 202. Examples of such chemical properties may include: pH level, toxicity, and temperature. Examples of such chemicals may include: electrolytes, particular enzymes, particular hormones, particular proteins, smoke, carbon dioxide, carbon monoxide, oxygen, ozone, hydrogen, and hydrogen sulfide. In other embodiments, environmental sensor 374 may include one or more temperature sensors configured to detect changes in the temperature of the environment of input unit 202 and/or to measure the temperature of the environment of input unit 202. In other embodiments, environmental sensor 374 may include one or more barometers configured to detect changes in the atmospheric pressure in the environment of input unit 202 and/or to measure the atmospheric pressure in the environment of input unit 202. In other embodiments, environmental sensor 374 may include one or more light sensors configured to detect changes in the ambient light in the environment of input unit 202. Consistent with the present disclosure, processing device 360 may modify a presentation of virtual content based on input from environmental sensor 374. For example, automatically reducing the brightness of the virtual content when the environment of user 100 becomes darker.

Other sensors 375 may include a weight sensor, a light sensor, a resistive sensor, an ultrasonic sensor, a proximity sensor, a biometric sensor, or other sensing devices to facilitate related functionalities. In a specific embodiment, other sensors 375 may include one or more positioning sensors configured to obtain positioning information of input unit 202, to detect changes in the position of input unit 202, and/or to measure the position of input unit 202. Alternatively, GPS software may permit input unit 202 to access an external GPS receiver (e.g., connecting via a serial port or Bluetooth). Consistent with the present disclosure, processing device 360 may modify a presentation of virtual content based on input from other sensors 375. For example, presenting private information only after identifying user 100 using data from a biometric sensor.

The components and arrangements shown in FIG. 3 are not intended to limit the disclosed embodiments. As will be appreciated by a person skilled in the art having the benefit of this disclosure, numerous variations and/or modifications may be made to the depicted configuration of input unit 202. For example, not all components may be essential for the operation of an input unit in all cases. Any component may be located in any appropriate part of an input unit, and the components may be rearranged into a variety of configurations while providing the functionality of the disclosed embodiments. For example, some input units may not include all of the elements as shown in input unit 202.

FIG. 4 is a block diagram of an examplary configuration of XR unit 204. FIG. 4 is an exemplary representation of just one embodiment, and it is to be understood that some illustrated elements might be omitted and others added within the scope of this disclosure. In the embodiment of FIG. 4, XR unit 204 may directly or indirectly access a bus 400 (or other communication mechanism) that interconnects subsystems and components for transferring information within XR unit 204. For example, bus 400 may interconnect a memory interface 410, a network interface 420, an input interface 430, a power source 440, an output interface 450, a processing device 460, a sensors interface 470, and a database 480.

Memory interface 410, shown in FIG. 4, is assumed to have similar functionality as the functionality of memory interface 310 described above in detail. Memory interface 410 may be used to access a software product and/or data stored on a non-transitory computer-readable medium or on memory devices, such as memory device 411. Memory device 411 may contain software modules to execute processes consistent with the present disclosure. In particular, memory device 411 may include an input determination module 412, an output determination module 413, a sensors communication module 414, a virtual content determination module 415, a virtual content communication module 416, and a database access module 417. Modules 412-417 may contain software instructions for execution by at least one processor (e.g., processing device 460) associated with XR unit 204. Input determination module 412, output determination module 413, sensors communication module 414, virtual content determination module 415, virtual content communication module 416, and database access module 417 may cooperate to perform various operations. For example, input determination module 412 may determine User Interface (UI) input received from input unit 202. At the same time, sensors communication module 414 may receive data from different sensors to determine a status of user 100. Virtual content determination module 415 may determine the virtual content to display based on received input and the determined status of user 100. Virtual content communication module 416 may retrieve virtual content not determined by virtual content determination module 415. The retrieval of the virtual content may be from database 380, database 480, mobile communications device 206, or from remote processing unit 208. Based on the output of virtual content determination module 415, output determination module 413 may cause a change in a virtual content displayed to user 100 by projector 454.

In some embodiments, input determination module 412 may regulate the operation of input interface 430 in order to receive gesture input 431, virtual input 432, audio input 433, and UI input 434. Consistent with the present disclosure, input determination module 412 may concurrently receive different types of input data. In one embodiment, input determination module 412 may apply different rules based on the detected type of input. For example, gesture input may have precedence over virtual input. In some embodiments, output determination module 413 may regulate the operation of output interface 450 in order to generate output using light indicators 451, display 452, speakers 453, and projector 454. In one embodiment, light indicators 451 may include a light indicator that shows the status of the wearable extended reality appliance. For example, the light indicator may display green light when the wearable extended reality appliance 110 are connected to input unit 202, and blinks when wearable extended reality appliance 110 has low battery. In another embodiment, display 452 may be used to display operational information. In another embodiment, speakers 453 may include a bone conduction headphone used to output audio to user 100. In another embodiment, projector 454 may present virtual content to user 100.

The operations of a sensors communication module, a virtual content determination module, a virtual content communication module, and a database access module are described above with reference to FIG. 3, details of which are not repeated herein. Modules 412-417 may be implemented in software, hardware, firmware, a mix of any of those, or the like.

Network interface 420, shown in FIG. 4, is assumed to have similar functionality as the functionality of network interface 320, described above in detail. The specific design and implementation of network interface 420 may depend on the communications network(s) over which XR unit 204 is intended to operate. For example, in some embodiments, XR unit 204 is configured to be selectively connectable by wire to input unit 202. When connected by wire, network interface 420 may enable communications with input unit 202; and when not connected by wire, network interface 420 may enable communications with mobile communications device 206.

Input interface 430, shown in FIG. 4, is assumed to have similar functionality as the functionality of input interface 330 described above in detail. In this case, input interface 430 may communicate with an image sensor to obtain gesture input 431 (e.g., a finger of user 100 pointing to a virtual object), communicate with other XR units 204 to obtain virtual input 432 (e.g., a virtual object shared with XR unit 204 or a gesture of avatar detected in the virtual environment), communicate with a microphone to obtain audio input 433 (e.g., voice commands), and communicate with input unit 202 to obtain UI input 434 (e.g., virtual content determined by virtual content determination module 315).

Power source 440, shown in FIG. 4, is assumed to have similar functionality as the functionality of power source 340 described above, only it provides electrical energy to power XR unit 204. In some embodiments, power source 440 may be charged by power source 340. For example, power source 440 may be wirelessly changed when XR unit 204 is placed on or in proximity to input unit 202.

Output interface 450, shown in FIG. 4, is assumed to have similar functionality as the functionality of output interface 350 described above in detail. In this case, output interface 450 may cause output from light indicators 451, display 452, speakers 453, and projector 454. Projector 454 may be any device, apparatus, instrument, or the like capable of projecting (or directing) light in order to display virtual content onto a surface. The surface may be part of XR unit 204, part of an eye of user 100, or part of an object in proximity to user 100. In one embodiment, projector 454 may include a lighting unit that concentrates light within a limited solid angle by means of one or more mirrors and lenses, and provides a high value of luminous intensity in a defined direction.

Processing device 460, shown in FIG. 4, is assumed to have similar functionality as the functionality of processing device 360 described above in detail. When XR unit 204 is connected to input unit 202, processing device 460 may work together with processing device 360. Specifically, processing device 460 may implement virtual machine technologies or other technologies to provide the ability to execute, control, run, manipulate, store, etc., multiple software processes, applications, programs, etc. It is appreciated that other types of processor arrangements could be implemented to provide the capabilities disclosed herein.

Sensors interface 470, shown in FIG. 4, is assumed to have similar functionality as the functionality of sensors interface 370 described above in detail. Specifically sensors interface 470 may communicate with audio sensor 471, image sensor 472, motion sensor 473, environmental sensor 474, and other sensors 475. The operations of an audio sensor, an image sensor, a motion sensor, an environmental sensor, and other sensors are described above with reference to FIG. 3, details of which are not repeated herein. It is appreciated that other types and combination of sensors may be used to provide the capabilities disclosed herein.

The components and arrangements shown in FIG. 4 are not intended to limit the disclosed embodiments. As will be appreciated by a person skilled in the art having the benefit of this disclosure, numerous variations and/or modifications may be made to the depicted configuration of XR unit 204. For example, not all components may be essential for the operation of XR unit 204 in all cases. Any component may be located in any appropriate part of system 200, and the components may be rearranged into a variety of configurations while providing the functionality of the disclosed embodiments. For example, some XR units may not include all of the elements in XR unit 204 (e.g., wearable extended reality appliance 110 may not have light indicators 451).

FIG. 5 is a block diagram of an examplary configuration of remote processing unit 208. FIG. 5 is an exemplary representation of just one embodiment, and it is to be understood that some illustrated elements might be omitted and others added within the scope of this disclosure. In the embodiment of FIG. 5, remote processing unit 208 may include a server 210 that directly or indirectly accesses a bus 500 (or other communication mechanism) interconnecting subsystems and components for transferring information within server 210. For example, bus 500 may interconnect a memory interface 510, a network interface 520, a power source 540, a processing device 560, and a database 580. Remote processing unit 208 may also include a one or more data structures. For example, data structures 212A, 212B, and 212C.

Memory interface 510, shown in FIG. 5, is assumed to have similar functionality as the functionality of memory interface 310 described above in detail. Memory interface 510 may be used to access a software product and/or data stored on a non-transitory computer-readable medium or on other memory devices, such as memory devices 311, 411, 511, or data structures 212A, 212B, and 212C. Memory device 511 may contain software modules to execute processes consistent with the present disclosure. In particular, memory device 511 may include a shared memory module 512, a node registration module 513, a load balancing module 514, one or more computational nodes 515, an internal communication module 516, an external communication module 517, and a database access module (not shown). Modules 512-517 may contain software instructions for execution by at least one processor (e.g., processing device 560) associated with remote processing unit 208. Shared memory module 512, node registration module 513, load balancing module 514, computational module 515, and external communication module 517 may cooperate to perform various operations.

Shared memory module 512 may allow information sharing between remote processing unit 208 and other components of system 200. In some embodiments, shared memory module 512 may be configured to enable processing device 560 (and other processing devices in system 200) to access, retrieve, and store data. For example, using shared memory module 512, processing device 560 may perform at least one of: executing software programs stored on memory device 511, database 580, or data structures 212A-C; storing information in memory device 511, database 580, or data structures 212A-C; or retrieving information from memory device 511, database 580, or data structures 212A-C.

Node registration module 513 may be configured to track the availability of one or more computational nodes 515. In some examples, node registration module 513 may be implemented as: a software program, such as a software program executed by one or more computational nodes 515, a hardware solution, or a combined software and hardware solution. In some implementations, node registration module 513 may communicate with one or more computational nodes 515, for example, using internal communication module 516. In some examples, one or more computational nodes 515 may notify node registration module 513 of their status, for example, by sending messages: at startup, at shutdown, at constant intervals, at selected times, in response to queries received from node registration module 513, or at any other determined times. In some examples, node registration module 513 may query about the status of one or more computational nodes 515, for example, by sending messages: at startup, at constant intervals, at selected times, or at any other determined times.

Load balancing module 514 may be configured to divide the workload among one or more computational nodes 515. In some examples, load balancing module 514 may be implemented as: a software program, such as a software program executed by one or more of the computational nodes 515, a hardware solution, or a combined software and hardware solution. In some implementations, load balancing module 514 may interact with node registration module 513 in order to obtain information regarding the availability of one or more computational nodes 515. In some implementations, load balancing module 514 may communicate with one or more computational nodes 515, for example, using internal communication module 516. In some examples, one or more computational nodes 515 may notify load balancing module 514 of their status, for example, by sending messages: at startup, at shutdown, at constant intervals, at selected times, in response to queries received from load balancing module 514, or at any other determined times. In some examples, load balancing module 514 may query about the status of one or more computational nodes 515, for example, by sending messages: at startup, at constant intervals, at pre-selected times, or at any other determined times.

Internal communication module 516 may be configured to receive and/or to transmit information from one or more components of remote processing unit 208. For example, control signals and/or synchronization signals may be sent and/or received through internal communication module 516. In one embodiment, input information for computer programs, output information of computer programs, and/or intermediate information of computer programs may be sent and/or received through internal communication module 516. In another embodiment, information received though internal communication module 516 may be stored in memory device 511, in database 580, in data structures 212A-C, or other memory device in system 200. For example, information retrieved from data structure 212A may be transmitted using internal communication module 516. In another example, input data may be received using internal communication module 516 and stored in data structure 212B.

External communication module 517 may be configured to receive and/or to transmit information from one or more components of system 200. For example, control signals may be sent and/or received through external communication module 517. In one embodiment, information received though external communication module 517 may be stored in memory device 511, in database 580, in data structures 212A-C, and or any memory device in the system 200. In another embodiment, information retrieved from any of data structures 212A-C may be transmitted using external communication module 517 to XR unit 204. In another embodiment, input data may be transmitted and/or received using external communication module 517. Examples of such input data may include data received from input unit 202, information captured from the environment of user 100 using one or more sensors (e.g., audio sensor 471, image sensor 472, motion sensor 473, environmental sensor 474, other sensors 475), and more.

In some embodiments, aspects of modules 512-517 may be implemented in hardware, in software (including in one or more signal processing and/or application specific integrated circuits), in firmware, or in any combination thereof, executable by one or more processors, alone, or in various combinations with each other. Specifically, modules 512-517 may be configured to interact with each other and/or other modules of system 200 to perform functions consistent with disclosed embodiments. Memory device 511 may include additional modules and instructions or fewer modules and instructions.

Network interface 520, power source 540, processing device 560, and database 580, shown in FIG. 5, are assumed to have similar functionality as the functionality of similar elements described above with reference to FIGS. 4 and 5. The specific design and implementation of the above-mentioned components may vary based on the implementation of system 200. In addition, remote processing unit 208 may include more or fewer components. For example, remote processing unit 208 may include an input interface configured to receive direct input from one or more input devices.

Consistent with the present disclosure, a processing device of system 200 (e.g., processor within mobile communications device 206, a processor within a server 210, a processor within a wearable extended reality appliance, such as, wearable extended reality appliance 110, and/or a processor within an input device associated with wearable extended reality appliance 110, such as keyboard 104) may use machine learning algorithms in order to implement any of the methods disclosed herein. In some embodiments, machine learning algorithms (also referred to as machine learning models in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recurrent neural network algorithms, linear machine learning models, non-linear machine learning models, ensemble algorithms, and more. For example, a trained machine learning algorithm may comprise an inference model, such as a predictive model, a classification model, a data regression model, a clustering model, a segmentation model, an artificial neural network (such as a deep neural network, a convolutional neural network, a recurrent neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters may be set manually by a person or automatically by an process external to the machine learning algorithm (such as a hyper parameter search algorithm), and the parameters of the machine learning algorithm may be set by the machine learning algorithm based on the training examples. In some implementations, the hyper-parameters may be set based on the training examples and the validation examples, and the parameters may be set based on the training examples and the selected hyper-parameters. For example, given the hyper-parameters, the parameters may be conditionally independent of the validation examples.

In some embodiments, trained machine learning algorithms (also referred to as machine learning models and trained machine learning models in the present disclosure) may be used to analyze inputs and generate outputs, for example in the cases described below. In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value corresponding to the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value corresponding to an item depicted in the image (such as an estimated property of the item, such as size, volume, age of a person depicted in the image, distance from an item depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

Consistent with the present disclosure, a processing device of system 200 may analyze image data captured by an image sensor (e.g., image sensor 372, image sensor 472, or any other image sensor) in order to implement any of the methods disclosed herein. In some embodiments, analyzing the image data may comprise analyzing the image data to obtain a preprocessed image data, and subsequently analyzing the image data and/or the preprocessed image data to obtain the desired outcome. One of ordinary skill in the art will recognize that the followings are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to: edges; corners; blobs; ridges; Scale Invariant Feature Transform (SIFT) features; temporal features; and so forth. In some examples, analyzing the image data may include calculating at least one convolution of at least a portion of the image data, and using the calculated at least one convolution to calculate at least one resulting value and/or to make determinations, identifications, recognitions, classifications, and so forth.

Consistent with other aspects of the disclosure, a processing device of system 200 may analyze image data in order to implement any of the methods disclosed herein. In some embodiments, analyzing the image may comprise analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result, and more. In some embodiments, analyzing image data (for example by the methods, steps and modules described herein) may comprise analyzing pixels, voxels, point cloud, range data, etc. included in the image data.

A convolution may include a convolution of any dimension. A one-dimensional convolution is a function that transforms an original sequence of numbers to a transformed sequence of numbers. The one-dimensional convolution may be defined by a sequence of scalars. Each particular value in the transformed sequence of numbers may be determined by calculating a linear combination of values in a subsequence of the original sequence of numbers corresponding to the particular value. A result value of a calculated convolution may include any value in the transformed sequence of numbers. Likewise, an n-dimensional convolution is a function that transforms an original n-dimensional array to a transformed array. The n-dimensional convolution may be defined by an n-dimensional array of scalars (known as the kernel of the n-dimensional convolution). Each particular value in the transformed array may be determined by calculating a linear combination of values in an n-dimensional region of the original array corresponding to the particular value. A result value of a calculated convolution may include any value in the transformed array. In some examples, an image may comprise one or more components (such as color components, depth component, etc.), and each component may include a two-dimensional array of pixel values. In one example, calculating a convolution of an image may include calculating a two-dimensional convolution on one or more components of the image. In another example, calculating a convolution of an image may include stacking arrays from different components to create a three-dimensional array, and calculating a three dimensional convolution on the resulting three dimensional array. In some examples, a video may comprise one or more components (such as color components, depth component, etc.), and each component may include a three-dimensional array of pixel values (with two spatial axes and one temporal axis). In one example, calculating a convolution of a video may include calculating a three-dimensional convolution on one or more components of the video. In another example, calculating a convolution of a video may include stacking arrays from different components to create a four-dimensional array, and calculating a four dimensional convolution on the resulting four dimensional array.

In some embodiments, an integrated computational interface device may include a portable housing having a key region and a non-key region. A housing of the integrated computational interface device may include an outer covering or shell that may include one or more components associated with the integrated computational interface device. The disclosed exemplary housing may surround the components of the integrated computational interface device and may cover some or all components of the integrated computational interface device. It is contemplated that the disclosed exemplary housing may have one or more openings that may expose certain components (e.g., USB or other ports) of the integrated computational interface device or may allow certain components (e.g., keys of a keyboard) to protrude from the housing. The housing may support certain components of the integrated computational interface device (e.g., a circuit board) in an interior portion of the housing. The housing may include additional structural features that may permit one or more components of the integrated computational interface device to be attached to the housing. The housing may be square, rectangular, or other shape sized to fit on a user's desk, lap, or other suitable work surface. The housing may be made of plastic, metal, a combination of plastic and metal, or other suitable material.

The housing of the integrated computational device may include a key region and a non-key region distinct from the key region. The key region of the integrated computational interface device may include one or more keys that may allow a user to enter alphanumeric or other characters as inputs. For example, in some embodiments, a keyboard may be associated with the key region of the housing. The keyboard may be a standard typewriter-style keyboard (e.g., a QWERTY-style keyboard) or other suitable keyboard layout, such as a Dvorak layout or a chorded layout. The keyboard may include any suitable number of keys; for example, a "full size" keyboard may include up to 104 or 105 keys. In some embodiments, the keyboard may include at least 30 keys. In other embodiments, the keyboard may include less than ten keys, at least ten keys, at least 20 keys, at least 50 keys, at least 80 keys, at least 100 keys, and so forth.

The key region may include alphanumeric keys, function keys, modifier keys, cursor keys, system keys, multimedia control keys, or other physical keys that perform a computer-specific function when pressed. The key region may also include virtual or programmable keys, such that the function of the key changes depending on a function or application to be performed on the integrated computational interface device.

In some embodiments, the keyboard may include a dedicated input key for executing actions by the wearable extended reality appliance. The dedicated input key may permit a user to interact with a virtual widget viewed through the wearable extended reality appliance. The dedicated input key may take a picture of one or more virtual widgets viewed through the wearable extended reality appliance (i.e., a "screenshot"). If the wearable extended reality appliance includes a camera, the dedicated input key may take a picture by the camera. In an embodiment, the picture may include what the user sees through the wearable extended reality device with any virtual widgets included in the picture (i.e., a picture with virtual overlay). The keyboard may include multiple dedicated input keys for executing actions, with each key configured to perform a different action. In an embodiment, the dedicated input keys may be programmable by the user to perform one or more actions (e.g., a "macro"). It is noted that the above examples of actions executed by the dedicated input key are not limiting and other actions may be performed by the dedicated input key.

In some embodiments, the keyboard may include a dedicated input key for changing illumination of a virtual display projected by the wearable extended reality appliance. The illumination of the virtual display may be adjusted by turning the virtual display on or off or by increasing or decreasing the brightness, contrast, or other color settings of the virtual display. In an embodiment, the keyboard may include multiple dedicated input keys for adjusting different settings of the virtual display. The settings of the virtual display that may be adjusted may include, for example: picture settings, such as brightness, contrast, sharpness, or display mode (e.g., a game mode with predefined settings); color settings, such as color component levels or other color adjustment settings; a position of the virtual display relative to a location of the user's head; or other settings that may enhance the user's view of the virtual display.

The non-key region of the portable housing may be a region of the housing that does not include any keys. The non-key region may be a region of the housing that does not include any keys and may exist to complete a desired shape of the housing that extends beyond the key region of the housing in any direction. The non-key region may be a region that may include an input device, such as a track pad, a touchscreen, a touch bar, or other form of cursor control for the integrated computational interface device. The non-key region may be subdivided into multiple different non-key regions, such as the track pad or other cursor control, an extension of the housing, or a cover or grille for one or more speakers or other audio output devices included within the housing. The non-key region may include a display for displaying information to the user, may include one or more openings to permit air to circulate through the housing (e.g., for cooling components contained within the housing), or may include one or more doors or access ports to permit access to an interior portion of the housing (e.g., a battery compartment configured to retain a removable battery therein or to permit certain components to be installed into and/or removed from the interior portion of the housing).

In some embodiments, a holder may be associated with the non-key region of the housing. The holder may be a depression that extends below a surface of the housing or may rest entirely above the surface of the housing. The holder may be located in any portion of the non-key region of the housing. In some embodiments, the holder may be located in a non-key region of the housing adjacent to the key region of the housing. The holder may include one or more structural features to selectively engage with one or more items such as writing instruments, wires or cables, dongles, papers (i.e., to permit the holder to function like a copy stand), or other items that the user may wish to easily access or store.

In some embodiments, the holder may be configured for selective engagement with and disengagement from a wearable extended reality appliance, such that when the wearable extended reality appliance is selectively engaged with the housing via the holder, the wearable extended reality appliance is transportable with the housing. In some embodiments, the structural features of the holder may be configured to selectively engage with a wearable extended reality appliance such that the wearable extended reality appliance may be snap-fit, force-fit, or pressure-fit into at least a portion of the holder. When the wearable extended reality appliance is selectively engaged with the housing via the holder, the wearable extended reality appliance may be transportable with the housing by being securely connected to the housing via the holder.

Figure 6:
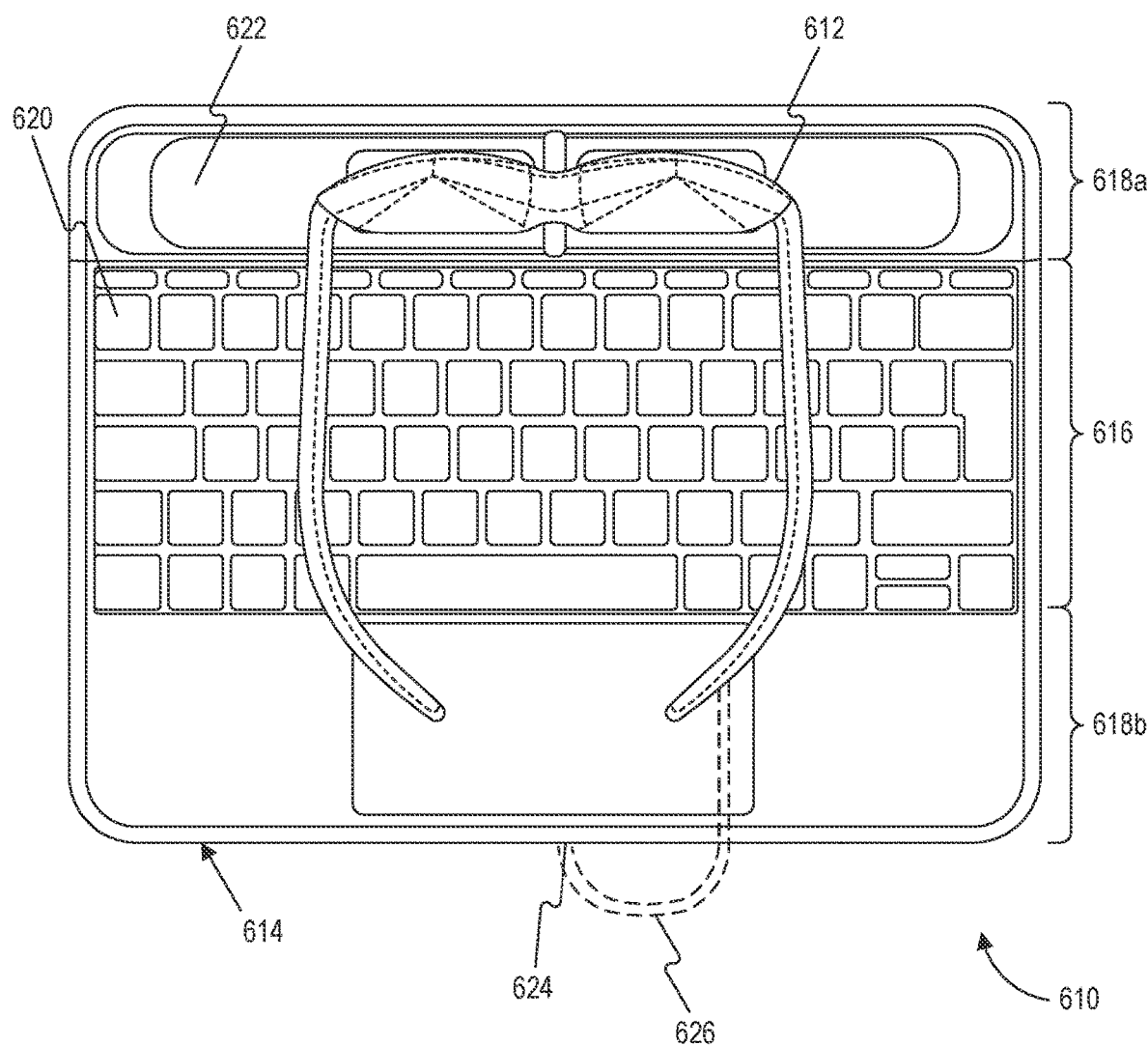
FIG. 6 is a top view of an exemplary first embodiment of an integrated computational interface device with a wearable extended reality appliance selectively engaged with the integrated computational interface device.

FIG. 6 is a top view of an exemplary embodiment of an integrated computational interface device 610 with a wearable extended reality appliance 612 selectively engaged with integrated computational interface device 610. FIG. 6 is an exemplary representation of just one embodiment, and it is to be understood that some illustrated elements might be omitted and others added within the scope of this disclosure.

Integrated computational interface device 610 may include housing 614. Housing 614 may include key region 616 and non-key regions 618a and 618b. As shown in FIG. 6, non-key region 618a may include a region positioned above key region 616 and non-key region 618b may include a region positioned below key region 616. Housing 614 may include only one non-key region (e.g., only either non-key region 618a or non-key region 618b), may have non-key region 618a and non-key region 618b located next to each other, or may have more than two non-key regions.

Key region 616 may include a keyboard 620. Key region 616 may be subdivided into multiple key regions, and the key regions may be contiguous or may be separated from each other.

Integrated computational interface device 610 may include holder 622 that may be configured for selective engagement with wearable extended reality appliance 612. In some embodiments, wearable extended reality appliance may include a pair of smart glasses. As shown in FIG. 6, wearable extended reality appliance 612 may be a pair of smart glasses. Smart glasses may appear similar to traditional eyeglasses and may include "smart" functionality such as a camera positioned to take pictures of what the user is presently viewing or one or more displays configured to project images onto lenses of the smart glasses. In some embodiments, wearable extended reality appliance 612 may take other forms that may include one or more lenses, such as goggles or other form of wearable device.

In some embodiments, integrated computational interface device may include a track pad associated with the housing. The track pad may enable the user of the integrated computational interface device to control a cursor, select items, or activate items on the integrated computational interface device. The track pad may include a single surface or a segmented surface, such as a cursor control portion and one or more button portions.

In an embodiment where the wearable extended reality appliance is a pair of smart glasses, the integrated computational interface device is configured such that when the pair of smart glasses is selectively engaged with the housing via the holder, temples of the smart glasses contact the track pad. Thus, for example, the holder may be located at a first portion of the housing and the track pad may be located at a second portion of the housing, the first portion of the housing being spaced apart from the second portion of the housing. The holder may be spaced apart from the track pad by a distance approximately equal to the length of the temple portion of the pair of smart glasses.

The temples of the pair of smart glasses may each include an elastic track pad protector on a distal end thereof. The temples may extend away from the lenses of the smart glasses in one direction and in parallel to each other to enable the smart glasses to be worn by the user. In some examples, the pair of smart glasses may include at least two temples and at least one lens. Each temple may include a temple tip, and each temple tip may include an elastic track pad protector outer part. In some examples, the pair of smart glasses may include at least two temples and at least one lens, each temple may include an elastic track pad protector. The track pad protector may protect the distal ends the temples of the smart glasses from being damaged when the smart glasses are selectively engaged with the holder and the distal ends of the temples are proximate to the surface of the housing (e.g., the track pad). The track pad protector may include a sleeve that slides over the distal end of the temple or may be integrally formed with the distal end of the temple. The track pad protector may be made of a soft or flexible material such that the distal end of the temples of the pair of smart glasses does not scratch or damage the track pad when the pair of smart glasses is selectively engaged with the housing via the holder and the distal end of the temples of the pair of smart glasses contacts the track pad.

Figure 7A:
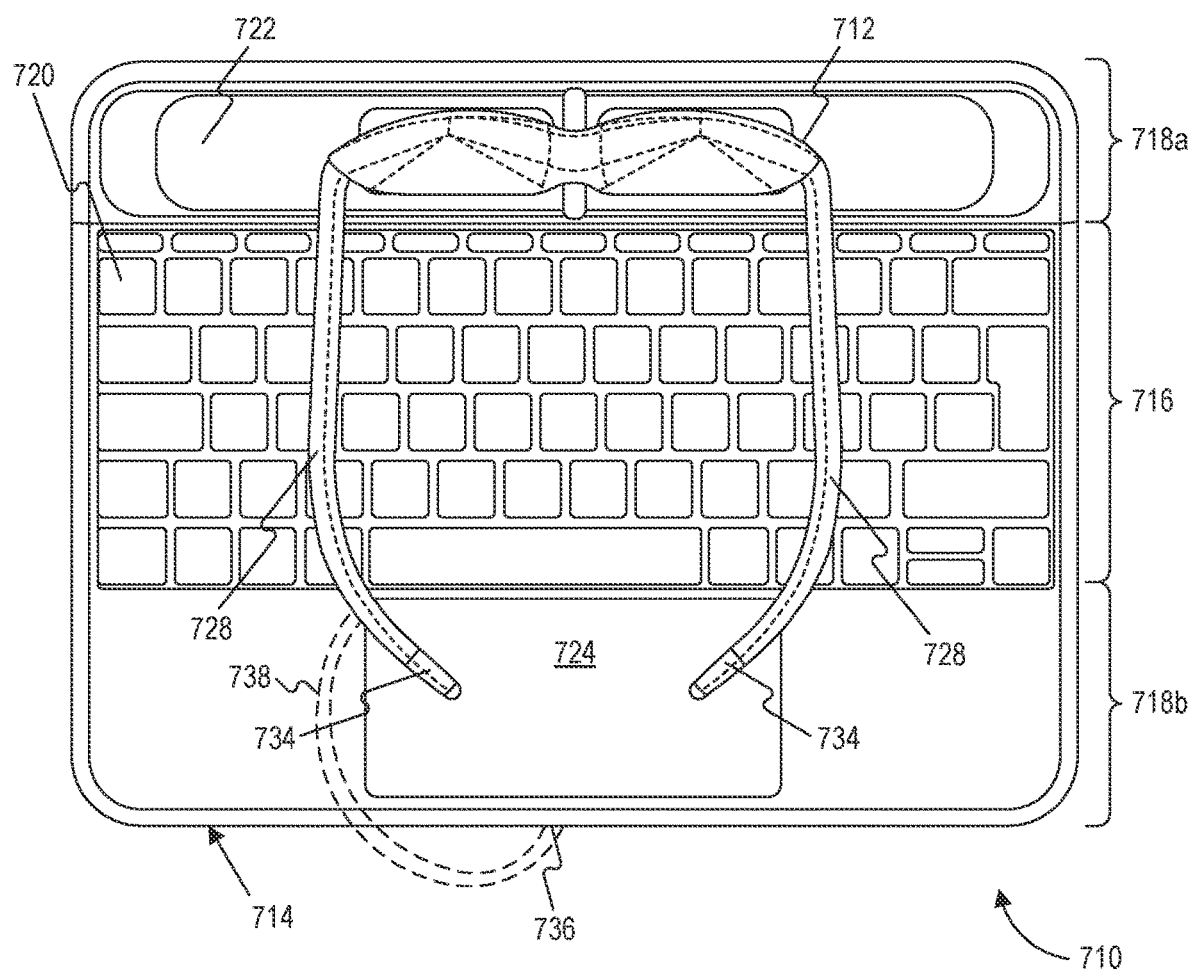
FIG. 7A is a top view of an exemplary second embodiment of an integrated computational interface device with a wearable extended reality appliance selectively engaged with the integrated computational interface device.
Figure 7B:
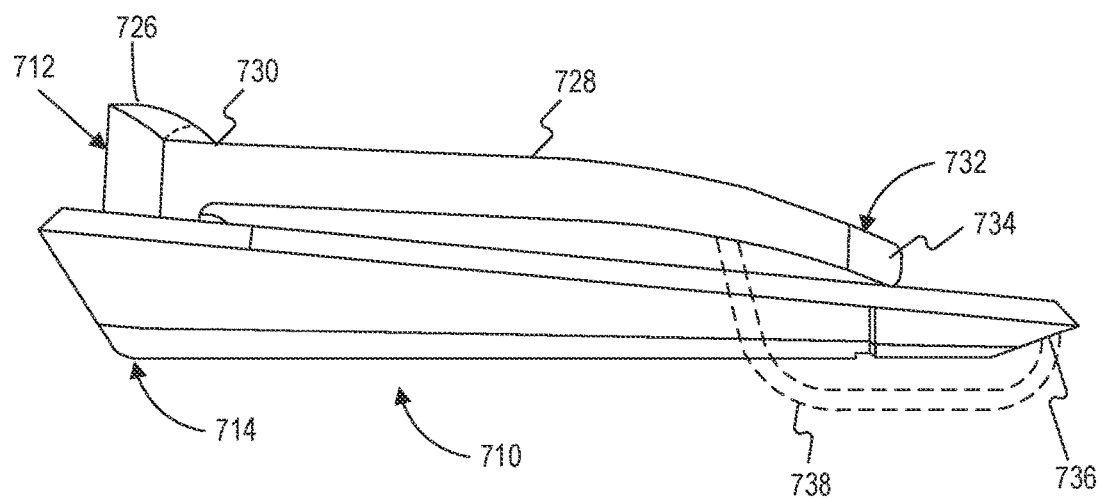
FIG. 7B is a left side view of the second exemplary embodiment of the integrated computational interface device shown in FIG. 7A.

FIG. 7A is a top view and FIG. 7B is a left side view of a second exemplary embodiment of integrated computational interface device 710 with a wearable extended reality appliance in the form of a pair of smart glasses 712 selectively engaged with integrated computational interface device 710. FIGS. 7A and 7B are exemplary representations of just one embodiment, and it is to be understood that some illustrated elements might be omitted and others added within the scope of this disclosure.

Integrated computational interface device 710 may include housing 714. Housing 714 may include key region 716 and non-key regions 718a and 718b. Key region 716 may include a keyboard 720. Integrated computational interface device 710 may include holder 722 that is configured for selective engagement with the pair of smart glasses 712. Non-key region 718b may be positioned below keyboard 720 and may include track pad 724. Integrated computational interface device 710 shown in FIGS. 7A and 7B may have similar structural and functional characteristics as integrated computational interface device 610 shown in FIG. 6. For example, integrated computational interface device 710 may include all or some of the elements of integrated computational interface device 610.

The pair of smart glasses 712 may include lens portion 726 and two temples 728, one temple on each end of lens portion 726. Each temple 728 may include proximal end 730 that connects temple 728 to lens portion 726 and distal end 732 located at an opposite end of temple 728. Distal end 732 may include elastic track pad protector 734. As noted above, elastic track pad protector 734 may be positioned over distal end 732 or may be integrally formed with distal end 732.

In some embodiments, the holder of the integrated computational interface device may include at least two grasping elements configured for selective engagement with the temples of the pair of smart glasses. In some embodiments, the grasping elements may be configured for selective engagement with different parts of the smart glasses, such as one or both lenses, a bridge between the lenses, or other portions of the smart glasses. The grasping elements may be integrally formed with the holder, may be individually removable from the holder, or may be jointly removable from the holder. For example, the grasping elements may be integrally formed with each other and may be removable as a unit from the holder. The grasping elements may be spring-biased towards each other, either by virtue of their shape or by using a spring or spring-like member.

Each grasping element may include a protuberance from a surface of the integrated computational interface device. The protuberance may extend perpendicularly away from the surface of the integrated computational interface device. A depression may be formed within the protuberance and may be configured to hold the temple. The depression may be in a side of the protuberance opposite to the surface of the integrated computational interface device, such that the temple is positioned on a top surface of the protuberance. The depression may be in a side of the protuberance parallel to the surface of the integrated computational interface device, such that the temple is positioned on a side surface of the protuberance. The holder may be made of a flexible material, a rigid or semi-rigid material, or a rigid or semi-rigid material with a flexible depression. The flexible depression may be integrally formed with the protuberance or may be a flexible material covering the depression.

Figure 8A:
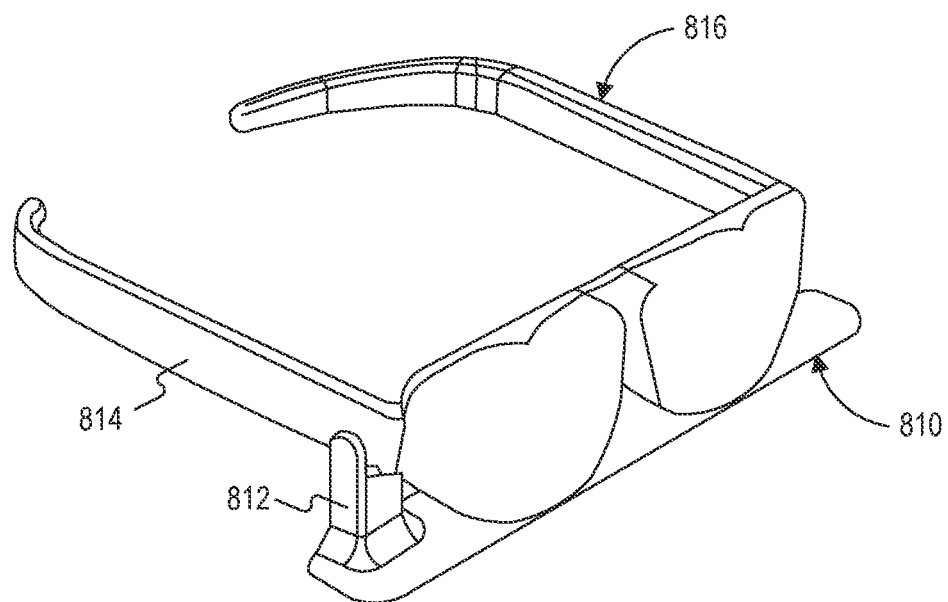
FIG. 8A is a front perspective view of a wearable extended reality appliance selectively engaged with a first exemplary embodiment of a holder.
Figure 8B:
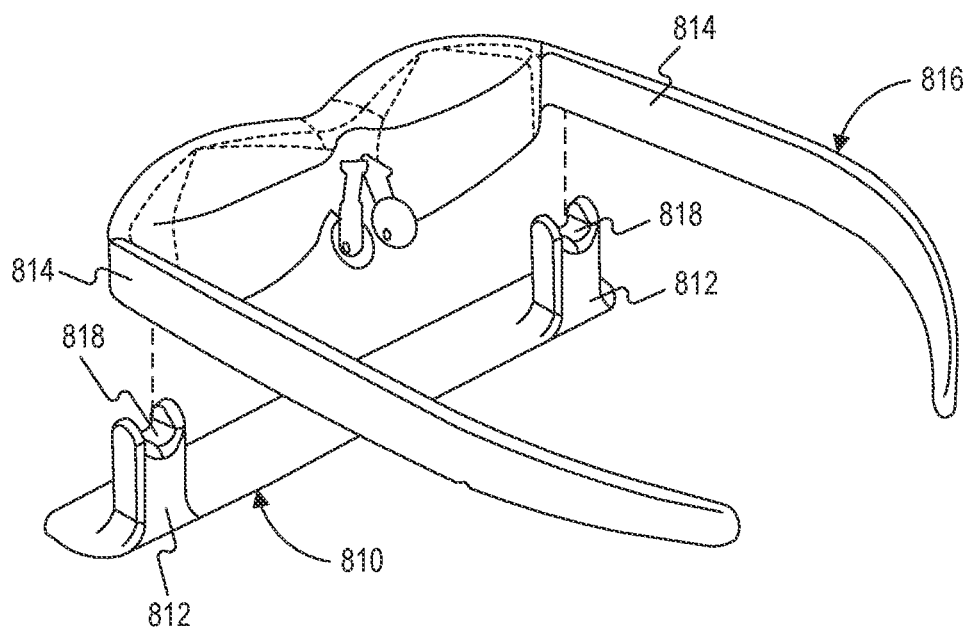
FIG. 8B is a rear perspective view of the wearable extended reality appliance selectively disengaged from the first exemplary embodiment of the holder shown in FIG. 8A.

FIG. 8A is a front perspective view of a wearable extended reality appliance selectively engaged with a first embodiment of a holder. FIG. 8B is a rear perspective view of the wearable extended reality appliance selectively disengaged from the first embodiment of the holder shown in FIG. 8A. FIGS. 8A and 8B are an exemplary representation of just one embodiment, and it is to be understood that some illustrated elements might be omitted and others added within the scope of this disclosure.

Holder 810 may include two grasping elements 812 spaced apart from each other and configured to selectively engage temple 814 of wearable extended reality appliance 816, which is shown in FIGS. 8A and 8B as a pair of smart glasses. In one example, holder 810 may be part of holder 622 and/or of holder 722 and/or of holder 1218a. In some embodiments, there may be other configurations of grasping elements 812, such as only one grasping element 812 or the two grasping elements 812 may be located on a same side of holder 810.

In some embodiments, each grasping element 812 may include depression 818 on a top surface to engage temple 814. In some embodiments, each grasping element 812 may have a flat top surface to engage temple 814. As shown in FIG. 8B, depression 818 may be U-shaped to partially surround temple 814. In some embodiments, depression 818 may be shaped differently to engage temple 814.

In some embodiments, the holder of the integrated computational interface device may include a clip for selectively connecting the wearable extended reality appliance with the housing. Selectively connecting the wearable extended reality appliance with the housing is one example of selectively engaging the wearable extended reality appliance with the housing. The clip may be positioned in any portion of the holder and may include a protuberance from a surface of the integrated computational interface device. The clip may selectively engage with any portion of the wearable extended reality appliance to connect the wearable extended reality appliance to the holder. In an embodiment where the wearable extended reality appliance is a pair of smart glasses, the clip may selectively engage with a temple, a portion of a lens, a portion of a rim surrounding a lens, a bridge, or a nose pad. The holder may include additional features to selectively engage with other portions of the wearable extended reality appliance that are not selectively engaged by the clip. The additional features may include one or more additional protuberances extending from a surface of the holder. The holder may be made of a flexible material, a rigid or semi-rigid material, or a rigid or semi-rigid material with a flexible clip or a flexible protuberance. The flexible clip or the flexible protuberance may be integrally formed with the holder, may be detachable from the holder, or may be a flexible material covering the clip or the protuberance.

Figure 9A:
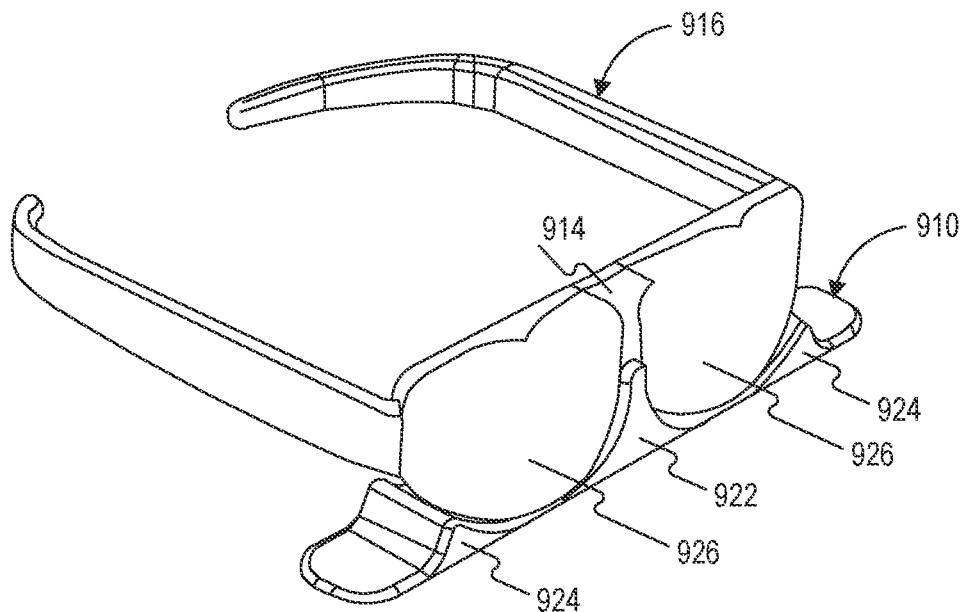
FIG. 9A is a front perspective view of a wearable extended reality appliance selectively engaged with a second exemplary embodiment of a holder.
Figure 9B:
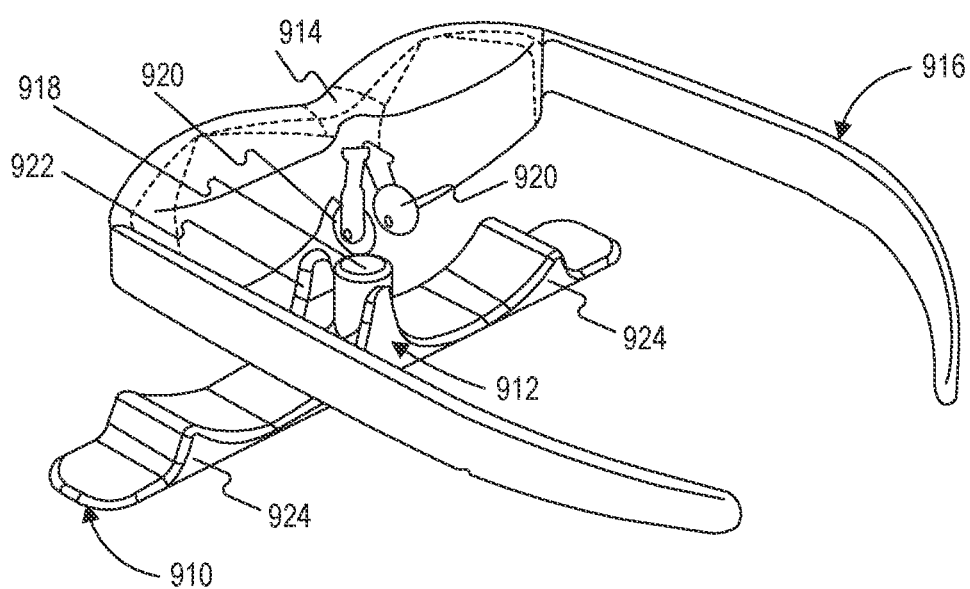
FIG. 9B is a rear perspective view of the wearable extended reality appliance selectively disengaged from the second exemplary embodiment of the holder shown in FIG. 9A.

FIG. 9A is a front perspective view of a wearable extended reality appliance selectively engaged with a second exemplary embodiment of a holder. FIG. 9B is a rear perspective view of the wearable extended reality appliance selectively disengaged from the second embodiment of the holder shown in FIG. 9A. FIGS. 9A and 9B are an exemplary representation of just one embodiment, and it is to be understood that some illustrated elements might be omitted and others added within the scope of this disclosure.

Holder 910 may include clip 912 configured to selectively engage bridge 914 of wearable extended reality appliance 916. As shown in FIGS. 9A and 9B, wearable extended reality appliance 916 may include a pair of smart glasses. In one example, holder 910 may be part of holder 622 and/or of holder 722 and/or of holder 1218a. In one exemplary embodiment as illustrated in FIG. 9B, clip 912 may include post 918 configured to fit between nose pads 920 of wearable extended reality appliance 916. As shown in FIG. 9B, post 918 may have a round or cylindrical shape. Post 918 may be in other shapes (e.g., having a square, rectangular, elliptical, or polygonal cross-section) such that nose pads 920 of wearable extended reality appliance 916 fit around post 918 to selectively engage post 918.

Clip 912 may include bridge protuberance 922 configured to contact a front portion of bridge 914. Bridge protuberance 922 may be spaced apart from post 918 such that a portion of bridge 914 is located between bridge protuberance 922 and post 918 when wearable extended reality appliance 916 is selectively engaged with holder 910.

Holder 910 may include at least two lens protuberances 924. Lens protuberances 924 are spaced apart from clip 912 such that each lens protuberance 924 selectively engages an outer portion of a lens 926 of wearable extended reality appliance 916. As shown in FIG. 9A, bridge protuberance 922 may be shaped such that an inner portion of lenses 926 of wearable extended reality appliance 916 selectively engage bridge protuberance 922.

In some embodiments, clip 912 may only include post 918. In some embodiments, holder 910 may include only clip 912 and not lens protuberances 924. In some embodiments, holder 910 may include only lens protuberances 924 and not clip 912.

In some embodiments, the holder of the integrated computational interface device may include a compartment for selectively enclosing at least a portion of the wearable extended reality appliance when the wearable extended reality appliance is selectively engaged with the holder. The compartment may include a depression or sleeve in the housing to receive one or more portions of the wearable extended reality appliance. The compartment may include a protuberance from a surface of the holder and may be shaped such that the wearable extended reality appliance does not slide front-to-back or side-to-side within the compartment when the wearable extended reality appliance is selectively engaged with the holder. The protuberances may include one or more walls extending above the surface of the holder such that the walls enclose a portion of the wearable extended reality appliance. The walls may be configured to accommodate different shapes of the wearable extended reality appliance. For example, if the wearable extended reality appliance is a pair of smart glasses, the walls may include a cut-out portion such that a nose pad of the smart glasses does not contact the walls. The walls may also taper towards the surface of the holder to accommodate the lenses of the smart glasses such that a bottom portion of the lenses contacts the surface of the holder. The holder may be made of a flexible material, a rigid or semi-rigid material, or a rigid or semi-rigid material with a flexible compartment. The flexible compartment may be integrally formed with the holder or may be a flexible material covering the compartment.

Figure 10A:
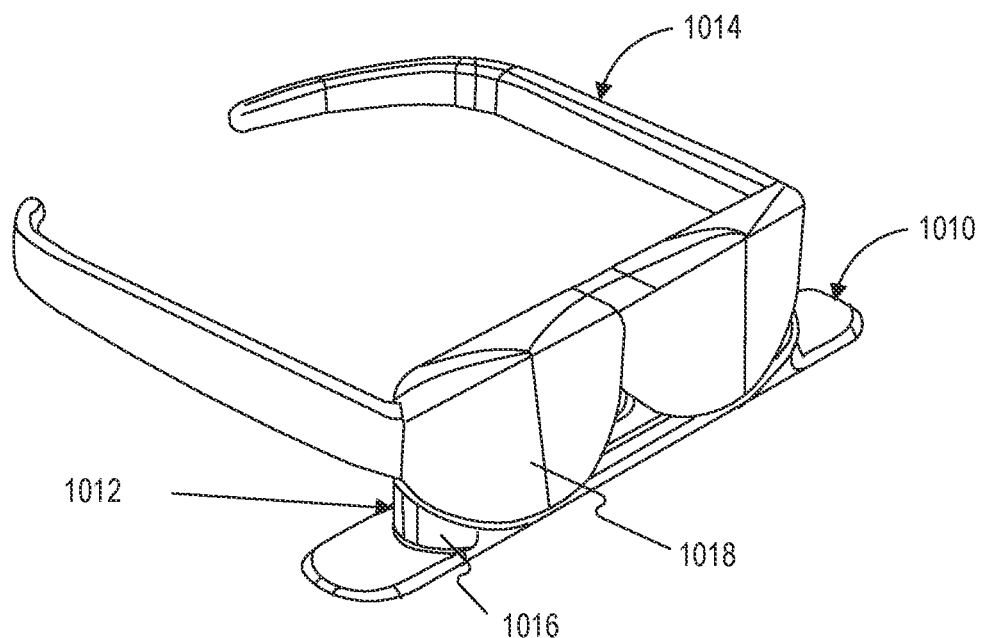
FIG. 10A is a front perspective view of a wearable extended reality appliance selectively engaged with a third exemplary embodiment of a holder.
Figure 10B:
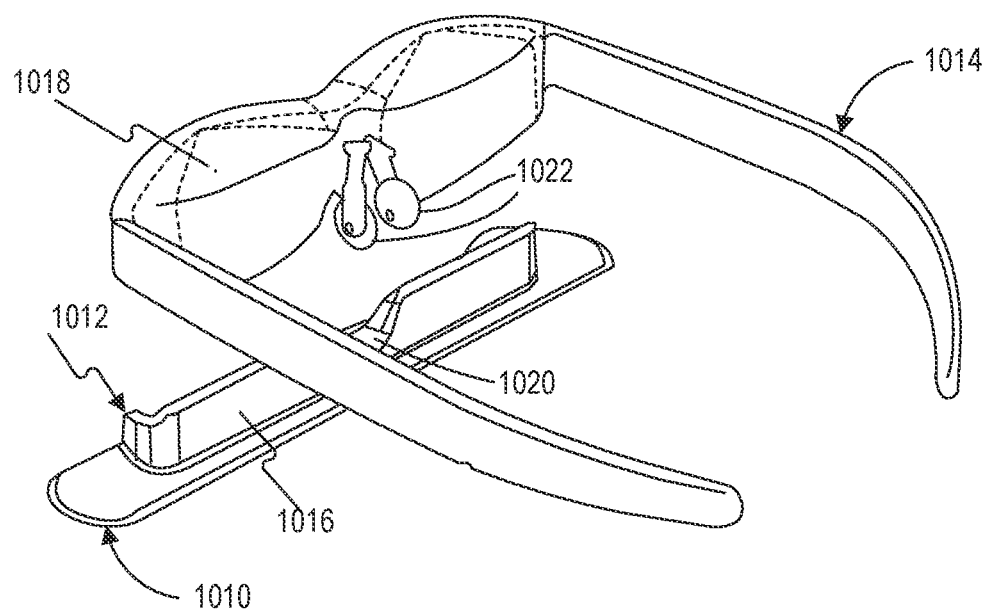
FIG. 10B is a rear perspective view of the wearable extended reality appliance selectively disengaged from the third exemplary embodiment of the holder shown in FIG. 10A.

FIG. 10A is a front perspective view of a wearable extended reality appliance selectively engaged with a third exemplary embodiment of a holder. FIG. 10B is a rear perspective view of the wearable extended reality appliance selectively disengaged from the third exemplary embodiment of the holder shown in FIG. 10A. FIGS. 10A and 10B are an exemplary representation of just one embodiment, and it is to be understood that some illustrated elements might be omitted and others added within the scope of this disclosure.

Holder 1010 may include compartment 1012 configured to selectively enclose at least a portion of wearable extended reality appliance 1014. In one example, holder 1010 may be part of holder 622 and/or of holder 722 and/or of holder 1218a. Compartment 1012 may include wall 1016 that extends along a portion a surface of holder 1010 such that wall 1016 defines an outer periphery of compartment 1012. As shown in FIG. 10A, wall 1016 may taper toward a center of holder 1010 and the surface of holder 1010 such that a lens 1018 of wearable extended reality appliance 1014 contacts the surface of holder 1010 when wearable extended reality appliance 1014 is selectively engaged with holder 1010. Based on this exemplary shape, wall 1016 may contact a user-facing side of lens 1018 and not an outward-facing side of lens 1018. In some embodiments, wall 1016 may not taper such that wall 1016 is of approximately even height on all sides, to define a slot configured to receive lens 1018. As shown in FIG. 10B, wall 1016 may include cut-out portion 1020 to accommodate nose pads 1022 of wearable extended reality appliance 1014 such that nose pads 1022 do not contact wall 1016.

In some embodiments, the holder of the integrated computational interface device may include at least one indentation corresponding to a shape of a portion of the wearable extended reality appliance. In an embodiment where the wearable extended reality appliance is a pair of smart glasses, the holder may include one or more indentations that may be shaped to correspond to shapes of the lenses of the smart glasses. In an embodiment where the wearable extended reality appliance is a goggle, the one or more indentations may be shaped to correspond to a shape of the lens of the goggle. The one or more indentations may extend below a surface of the holder such that the one or more indentations extend into a portion of the housing. A bottom portion of the one or more indentations may contact a surface of the housing such that at least a portion of the holder extends above the surface of the housing. The holder may be made of a flexible material, a rigid or semi-rigid material, or a rigid or semi-rigid material with a flexible indentation. The flexible indentation may be integrally formed with the holder or may be a flexible material covering the indentation.

Figure 11A:
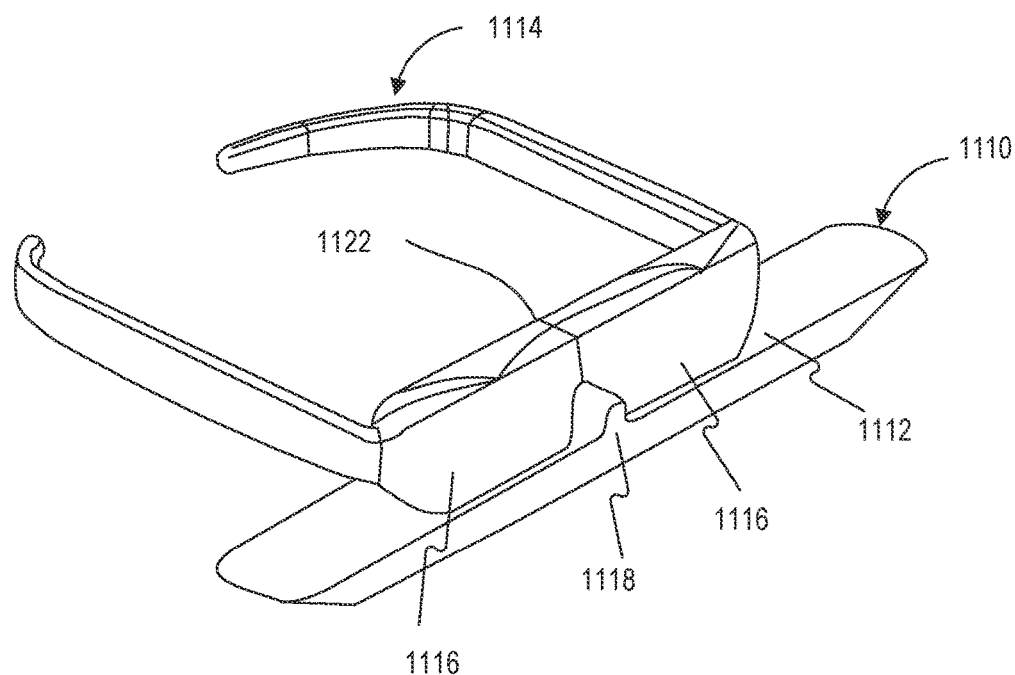
FIG. 11A is a front perspective view of a wearable extended reality appliance selectively engaged with a fourth exemplary embodiment of a holder.
Figure 11B:
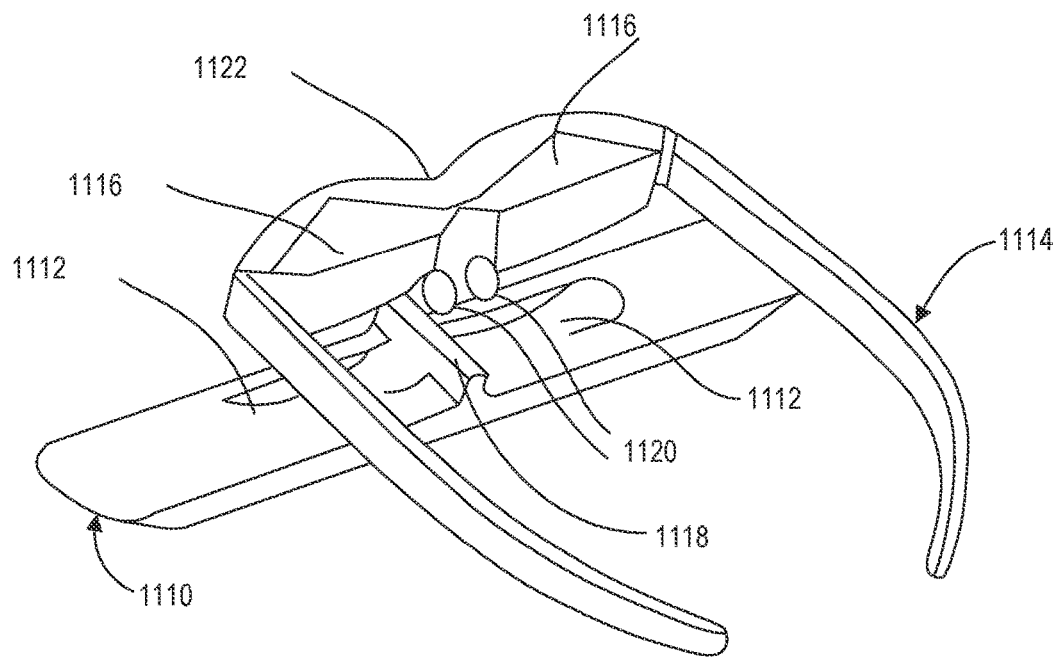
FIG. 11B is a rear perspective view of the wearable extended reality appliance selectively disengaged from the fourth exemplary embodiment of the holder shown in FIG. 11A.

FIG. 11A is a front perspective view of a wearable extended reality appliance selectively engaged with a fourth exemplary embodiment of a holder. FIG. 11B is a rear perspective view of the wearable extended reality appliance selectively disengaged from the fourth exemplary embodiment of the holder shown in FIG. 11A. FIGS. 11A and 11B are an exemplary representation of just one embodiment, and it is to be understood that some illustrated elements might be omitted and others added within the scope of this disclosure.

Holder 1110 may include indentation 1112 corresponding to a shape of a portion of wearable extended reality appliance 1114. In one example, holder 1110 may be part of holder 622 and/or of holder 722 and/or of holder 1218*a*. As shown in FIGS. 11A and 11B, wearable extended reality appliance 1114 may include a pair of smart glasses and there may be two indentations 1112 spaced apart from each other in holder 1110, each indentation 1112 corresponding to a shape of lens 1116 of the smart glasses.

In some embodiments, the holder may also include a nose bridge projection. In an embodiment where the wearable extended reality appliance includes a pair of extended reality glasses, the at least one indentation may include two indentations on opposite sides of the nose bridge projection, to receive lenses of the extended reality glasses. It is noted that the terms "extended reality glasses" and "smart glasses" may be used interchangeably herein. The nose bridge projection may be a protuberance extending away from a surface of the holder and may be configured to support nose pads or a bridge of the smart glasses. The two indentations may each be shaped to receive one lens, the rim surrounding the lens, or a portion of the frame surrounding the lens. The holder may be made of a flexible material, a rigid or semi-rigid material, or a rigid or semi-rigid material with a flexible nose bridge projection. The flexible nose bridge projection may be integrally formed with the holder or may be a flexible material covering the nose bridge projection.

Referring back to FIGS. 11A and 11B, wearable extended reality appliance 1114 is a pair of smart glasses. Holder 1110 may include nose bridge projection 1118 configured to support nose pads 1120 or bridge 1122 of the smart glasses.

In an embodiment where the wearable extended reality appliance includes a pair of smart glasses, the holder may be configured such that when lenses of the smart glasses are located on one side of the keyboard, temples of the smart glasses extend over the keyboard with distal ends thereof located on a side of the keyboard opposite the lenses. The holder may include features to help position temples of the smart glasses above a surface of the housing. The features may include protuberances extending upward from the housing to engage the temples of the smart glasses. The protuberances may be located in the key region or the non-key region of the housing.

In some embodiments, the holder may include a protuberance located near the keyboard (e.g., between the holder and the key region) and may be configured to create a gap between temples of the smart glasses and the keyboard such that when the smart glasses are selectively engaged with the holder, the temples of the smart glasses extend over the keyboard with distal ends of the temples located on a side of the keyboard opposite the lenses. The distal ends of the temples may not contact the housing because the protuberance may elevate the distal ends above a surface of the housing. The protuberance may be made of elastic or other compressible material such that when the temples of the smart glasses contact the protuberance, the temples are not damaged or scratched.

Figure 12A:
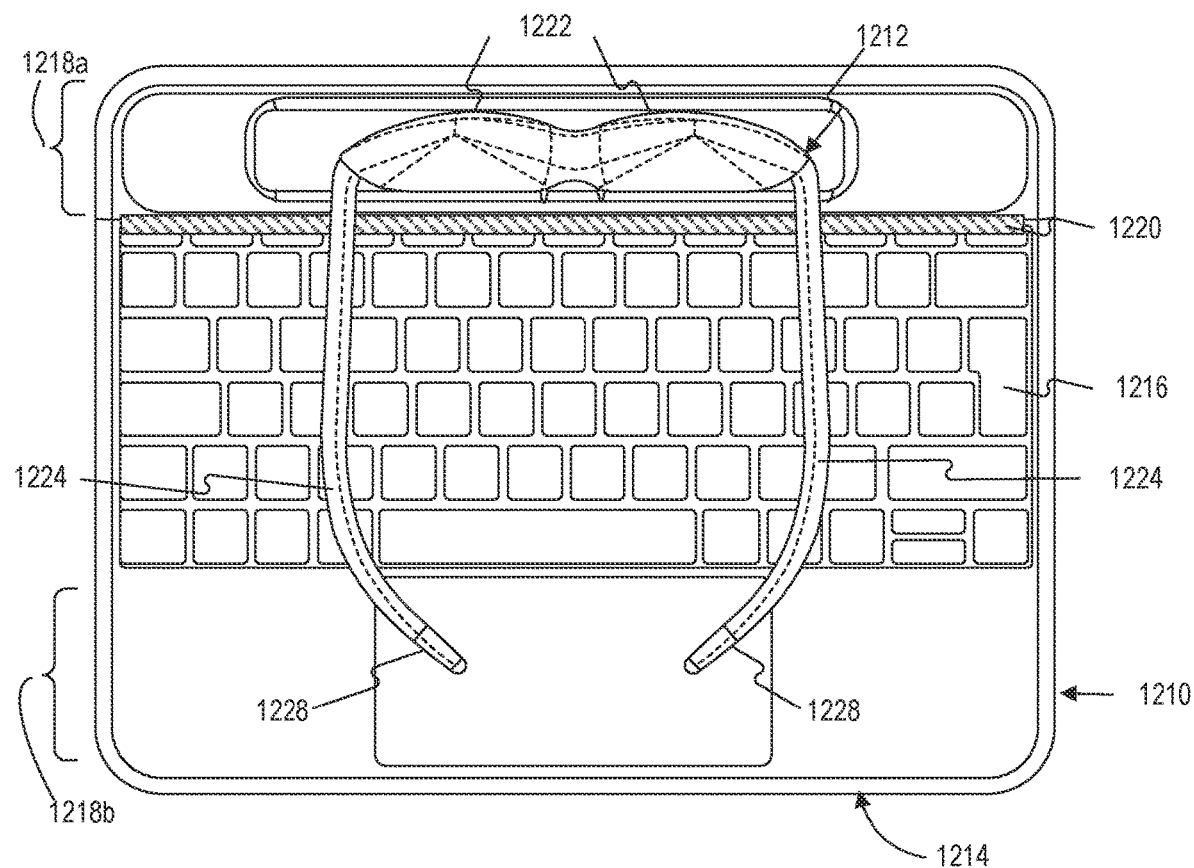
FIG. 12A is a top view of a third exemplary embodiment of an integrated computational interface device with a wearable extended reality appliance selectively engaged with the integrated computational interface device.
Figure 12B:
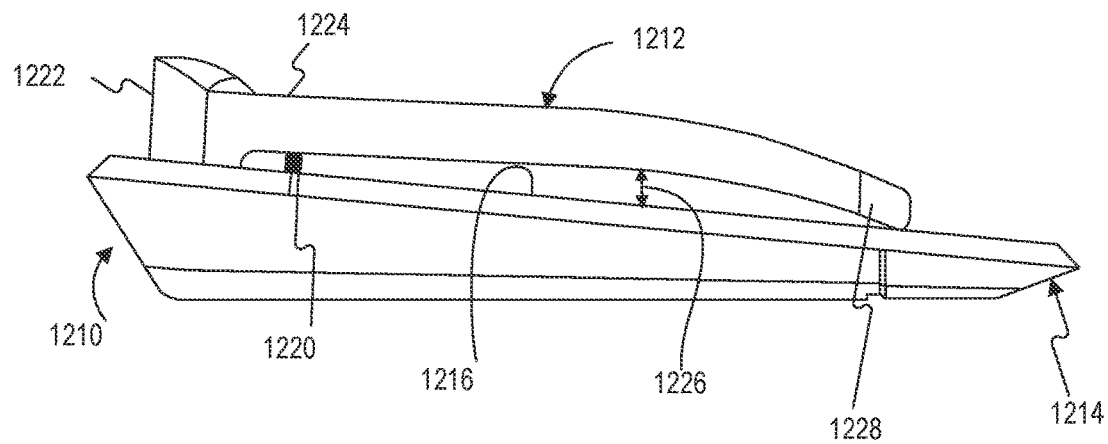
FIG. 12B is a left side view of the third exemplary embodiment of the integrated computational interface device shown in FIG. 12A.

FIG. 12A is a top view and FIG. 12B is a left side view of a third embodiment of an integrated computational interface device 1210 with a wearable extended reality appliance in the form of a pair of smart glasses 1212 selectively engaged with the integrated computational interface device 1210. FIGS. 12A and 12B are exemplary representations of just one embodiment, and it is to be understood that some illustrated elements might be omitted and others added within the scope of this disclosure. Integrated computational interface device 1210 shown in FIGS. 12A and 12B may have similar structural and functional characteristics as integrated computational interface device 610 shown in FIG. 6 and/or as integrated computational interface device 710 shown in FIGS. 7A and 7B. For example, integrated computational interface device 1210 may include all or some of the elements of integrated computational interface device 610. In another example, integrated computational interface device 1210 may include all or some of the elements of integrated computational interface device 710.

Integrated computational interface device 1210 may include housing 1214. Housing 1214 may include keyboard 1216 and holder 1218*a* that may be configured for selective engagement with smart glasses 1212. Holder 1218*a* may include protuberance 1220 located near keyboard 1216. When lenses 1222 of smart glasses 1212 are selectively engaged with holder 1218*a*, temples 1224 may contact protuberance 1220 to thereby create gap 1226 between temples 1224 and keyboard 1216. When lenses 1222 of smart glasses 1212 are selectively engaged with holder 1218*a*, temples 1224 may extend over keyboard 1216 such that distal ends 1228 of temples 1224 are located on a side of keyboard 1216 opposite lenses 1222. Distal ends 1228 may be spaced apart from housing 1214 such that distal ends 1228 do not contact housing 1214 when smart glasses 1212 are selectively engaged with holder 1218*a*.

In some embodiments, the integrated computational interface device may further include a charger associated with the housing. The charger may be configured to charge the wearable extended reality appliance when the wearable extended reality appliance is selectively engaged with the holder. In such embodiments, the wearable extended reality appliance may include a battery or other power source to be charged. The charger may supply a DC voltage or current to charge the battery of the wearable extended reality appliance. The battery may be charged by a wired connection or by a wireless connection. The housing and the wearable extended reality appliance may be configured for wireless charging of the wearable extended reality appliance by the charger. The charger may be located in any suitable portion of the housing such that the charger can supply power to the wearable extended reality appliance when the wearable extended reality appliance is selectively engaged with the holder.

The wearable extended reality appliance may include one or more electrical contacts and the housing may include one or more corresponding electrical contacts to engage to charge the wearable extended reality appliance when engaged with the holder. In some examples, the one or more electrical contacts included in the wearable extended reality appliance may be located in one or both of the lenses, one or both of the temples, or a portion of the frame near where the lenses and the temples connect. In some examples, the one or more corresponding electrical contacts included in the housing may be located in the holder or in the housing adjacent to the holder such that when the wearable extended reality appliance is selectively engaged with the holder, the one or more electrical contacts of the wearable extended reality appliance are sufficiently close that wireless charging may occur. The wireless charging may be performed by a wireless charging standard, such as Qi, AirFuel Resonant, near-field magnetic coupling (NFMC), radio frequency (RF), or other suitable wireless charging protocol. In some embodiments, the number of electrical contacts included in the housing does not have to match the number of electrical contacts included in the wearable extended reality appliance.

In an embodiment where the wearable extended reality appliance is a pair of smart glasses, each lens may include an electrical contact and the housing may include one or more corresponding electrical contacts. When the smart glasses are selectively engaged with the housing, the electrical contacts in the lenses may be positioned sufficiently close to the one or more corresponding electrical contacts in the housing to complete a wireless charging circuit.

For example, in the embodiment shown in FIGS. 8A and 8B, the electrical contacts may be located in temples 814 of smart glasses 816. Corresponding electrical contacts may be located in grasping elements 812 of holder 810.

As another example, in the embodiment shown in FIGS. 9A and 9B, the electrical contacts may be located in bridge 914 and/or nose pads 920 of wearable extended reality appliance 916. Corresponding electrical contacts may be located in clip 912 and/or post 918 of holder 910. In another implementation of the embodiment shown in FIGS. 9A and 9B, the electrical contacts may be located in or around lenses 926 of wearable extended reality appliance 916. Corresponding electrical contacts may be located in lens protuberances 924 and/or in a portion of holder 910 under lenses 926.

As another example, in the embodiment shown in FIGS. 10A and 10B, the electrical contacts may be located in or around lenses 1018 of wearable extended reality appliance 1014. Corresponding electrical contacts may be located in wall 1016.

As another example, in the embodiment shown in FIGS. 11A and 11B, the electrical contacts may be located in or around lenses 1116 of wearable extended reality appliance 1114. Corresponding electrical contacts may be located in indentations 1112 of holder 1110. In another implementation of the embodiment shown in FIGS. 11A and 11B, the electrical contacts may be located in nose pads 1120 or bridge 1122 of wearable extended reality appliance 1114. Corresponding electrical contacts may be located in nose bridge projection 1118 of holder 1110.

In some embodiments, the housing may also include a wire port configured to receive a wire extending from the wearable extended reality appliance. The wire may be any type of wire suitable for providing power and/or data between the integrated computation interface device and the wearable extended reality appliance. For example, the wire may be a Universal Serial Bus (USB) type wire with appropriate connectors for the wire port and the wearable extended reality appliance if the wire is detachable from the wearable extended reality appliance. The wire port may be located on any part of the housing that is readily accessible to a user of the integrated computation interface device. The wire may extend from any part of the wearable extended reality appliance. The wire may be fixedly attached to the wearable extended reality appliance or may be detachable from the wearable extended reality appliance. In an embodiment where the wearable extended reality appliance is a pair of smart glasses, the wire may extend from the temple. The wire may be located at any point along a length of the temple such that the wire may not interfere with a user's vision or may not affect the user's ability to wear the smart glasses.

In some embodiments, the wire port may be located at a front side of the integrated computational interface device configured to face the user while the user types on the keyboard. In one example, the wire port may be located substantially at a center of the front side of the integrated computational interface device (for example, less than 1 cm from the center, less than 2 cm from the center, less than 4 cm from the center, less than 8 cm from the center, and so forth). In another example, the wire port may be located away from the center. In another example, the wire port may be located at a side of the front side of the integrated computational interface device (such as a left side, a right side, etc.), for example less than 1 cm from the side edge of the front side, less than 2 cm from the side edge, less than 4 cm from the side edge, less than 8 cm from the side edge, and so forth.

For example, in the embodiment shown in FIG. 6, wire port 624 may be located in housing 614. Wire port 624 may be located in non-key region 618*b* near a user of integrated computation interface device 610 while the user types on keyboard 620. Wire 626 may be connected to wearable extended reality appliance 612 and may be received by wire port 624. Wire 626 may be optional and is shown in dashed outline in FIG. 6. In some examples, wire 626 may be selectively attached and detached from wearable extended reality appliance 612. In other examples, wire 626 may be permanently connected to wearable extended reality appliance 612. In some examples, wire 626 may be selectively attached and detached from wire port 624. In other examples, wire 626 may be permanently connected to wire port 624. In some examples, wire 626 may be completely or partly retracted into housing 610 and/or into a compartment created by housing 610. When wire 626 is in a complete or a partial retracted state, wire 626 may be pulled out of housing 610 and/or out of the compartment, for example by a user.

As another example, in the embodiment shown in FIGS. 7A and 7B, wire port 736 may be located in housing 714. Wire port 736 may be located in non-key region 718*b* near a user of integrated computation interface device 710 while the user types on keyboard 720. Wire 738 may be connected to smart glasses 712 and may be received by wire port 736. Locating wire port 736 in non-key region 718*b* may permit the user to type on keyboard 720 while wire 738 is connected to wire port 736. Wire 738 is optional and is shown in dashed outline in FIGS. 7A and 7B. In some examples, wire 738 may be selectively attached and detached from wearable extended reality appliance 712. In other examples, wire 738 may be permanently connected to wearable extended reality appliance 712. In some examples, wire 738 may be selectively attached and detached from wire port 736. In other examples, wire 738 may be permanently connected to wire port 736. In some examples, wire 738 may be completely or partly retracted into housing 710 and/or into a compartment created by housing 710. When wire 738 is in a complete or a partial retracted state, wire 738 may be pulled out of housing 710 and/or out of the compartment, for example by a user.

In some embodiments, the wire may be configured to electrically charge the wearable extended reality appliance when the wire is connected to the wire port. The wire may be any type of wire suitable for providing power to the wearable extended reality appliance. For example, the wire may be a Universal Serial Bus (USB) type wire with appropriate connectors for the wire port and the wearable extended reality appliance.

In some embodiments, the integrated computational interface device may also include at least one processor located in the housing. The wire may be configured to enable digital data communication between the wearable extended reality appliance and the at least one processor. The processor may include any processing device suitable for digital data communication. In addition to enabling digital data communication, the processing device may be configured to execute computer programs on the integrated computational interface device. The wire may be any type of wire suitable to enable digital data communication between the wearable extended reality appliance and the at least one processor. For example, the wire may be a Universal Serial Bus (USB) type wire with appropriate connectors for the wire port and the wearable extended reality appliance.

In some embodiments, the integrated computational interface device may also include a processor located in the housing. The processor may be configured to wirelessly pair with the wearable extended reality appliance. Wireless pairing is a process to wirelessly link the integrated computational interface device and the wearable extended reality appliance, to enable wireless data communication between the integrated computational interface device and the wearable extended reality appliance. The processor may include any processing device suitable for implementing a wireless pairing protocol between the integrated computational interface device and the wearable extended reality appliance. The wireless pairing protocol may be WiFi (IEEE 802.11-based), radio frequency (RF, such as ZigBee or ZWave), radio frequency identification (RFID, such as Active Reader Passive Tag or Active Reader Active Tag), Bluetooth, Near Field Communication (NFC), or any other wireless pairing protocol usable for short-range communication. The integrated computational interface device may include a visual marker adjacent to the keyboard to facilitate wireless pairing with the wearable extended reality appliance. The visual marker may help ensure that the wearable extended reality appliance is within wireless communication range of the integrated computational interface device. In some embodiments, the keyboard may include a dedicated function key to begin the wireless pairing process.

In some embodiments, the integrated computational interface device may also include at least one motion sensor located within the housing and at least one processor operatively connected thereto. The at least one processor may be programmed to implement a mode of operation based on input received from the at least one motion sensor. In some embodiments, the motion sensor may determine whether the integrated computational interface device is being moved and may adjust a mode of operation of the integrated computational interface device based on the movement. In some embodiments, the motion sensor may determine whether the wearable extended reality appliance is moving relative to the integrated computational interface device or with the integrated computational interface device and may adjust a mode of operation of the integrated computational interface device or of the wearable extended reality appliance based on the movement. For example, if the user of the wearable extended reality appliance is walking, the number of items displayed to the user may be limited to prevent distracting the user.

The at least one motion sensor may include an accelerometer, a gyroscope, a magnetometer, a motion sensor implemented using an image sensor and by analyzing images captured using the image sensor with an egomotion algorithm, or other type of sensor configured to measure motion of objects in the environment of the integrated computational interface device. For example, the at least one motion sensor may be the motion sensor 373 described above in connection with FIG. 3. The at least one processor may include any processing device configured for receiving input from the at least one motion sensor and configured to be programmed to implement a mode of operation based on the input.

In some embodiments, the at least one processor may be further programmed to automatically adjust settings of a virtual display presented by the wearable extended reality appliance based on the input received from the at least one motion sensor. The at least one processor may include any processing device configured to be programmed to automatically adjust one or more settings of the virtual display presented by the wearable extended reality appliance. The settings of the virtual display may be adjusted based on an environment where the user is located (e.g., moving from indoors in low light to outdoors in bright light). The settings of the virtual display that may be adjusted may include: picture settings, such as brightness, contrast, sharpness, or display mode (for example, a game mode with predefined settings); color settings, such as color component levels or other color adjustment settings; a position of the virtual display relative to a location of the user's head; or other settings that may enhance the user's view of the virtual display. In the embodiment shown in FIG. 1, the settings of the virtual screen 112 may be automatically adjusted by the at least one processor.

In some embodiments, the at least one processor may be further programmed to output a notice when the integrated computational interface device is moved by more than a threshold distance while the wearable extended reality appliance is disengaged from the holder. The at least one processor may include any processing device configured to be programmed to output a notice when the integrated computational interface device is moved by more than a threshold distance while the wearable extended reality appliance is disengaged from the holder. For example, the notice may be provided to the user to alert the user that they may be moving the wearable extended reality appliance out of wireless communication range, such that interaction with the integrated computational interface device will be interrupted unless the user moves closer than the threshold distance. As another example, if the wearable extended reality appliance is connected to the integrated computational interface device by a wire, the notice may be provided if the user is about to move farther away from the integrated computational interface device than the length of the wire, which may cause the wire to become disconnected, the wearable extended reality appliance to be accidentally removed from the user's head, or the integrated computational interface device to be knocked off a surface where the integrated computational interface device is located.

The notice may include an alert, an alarm, or other audio and/or visual indicator. The notice may be output via any of the devices connected to output interface 350 shown in FIG. 3 (for example, light indicators 351, display 352, and/or speakers 353) or output interface 450 shown in FIG. 4 (for example, light indicators 451, display 452, speakers 453, and/or projector 454). The threshold distance may be a percentage of a length of a wire connected between the integrated computational interface device and the wearable extended reality appliance, a fixed distance relative to the length of the wire, a fixed distance from the integrated computational interface device, a percentage of a distance range of a wireless communication protocol between the integrated computational interface device and the wearable extended reality appliance, a fixed distance relative to the distance range of the wireless communication protocol, or any other distance that would take the wearable extended reality appliance away from the integrated computational interface device.

In some embodiments, the integrated computational interface device may further include at least one sensor within the housing and at least one processor operatively connected thereto. The at least one sensor may be configured to provide input indicative of whether the wearable extended reality appliance is engaged with the holder. The at least one processor may be programmed to use the received input to implement a mode of operation based on whether the wearable extended reality appliance is engaged with the holder. For example, in response to an input indicative of the wearable extended reality appliance being engaged with the holder, the at least one processor may implement a first mode of operation, and in response to an input indicative of the wearable extended reality appliance not being engaged with the holder, the at least one processor may implement a second mode of operation, the second mode of operation may differ from the first mode of operation. In some examples, the at least one processor may be programmed to automatically adjust settings of a virtual display presented by the wearable extended reality appliance based on whether the wearable extended reality appliance is engaged with the holder, for example as described herein with relation to the adjustment of the settings based on the input from the at least one motion sensor. In some examples, the at least one processor may be programmed to output an audible indication when at least one of the wearable extended reality appliance engages with the holder or the wearable extended reality appliance disengages from the holder occurs. In some examples, the mode of operation may be or may include a power mode of at least one of: the at least one processor, a communication device included in the integrated computational interface device, or the wearable extended reality appliance. In one example, when the wearable extended reality appliance is engaged with the holder, the power mode may be a turned-off mode, a sleep mode, a hibernation mode, and so forth. In another example, the power mode when the wearable extended reality appliance is engaged with the holder may be associated with lower power consumption than the power mode when the wearable extended reality appliance is not engaged with the holder (for example, using less hardware components when the wearable extended reality appliance is engaged with the holder, using lower clock-speed when the wearable extended reality appliance is engaged with the holder, and so forth).

In some examples, the mode of operation may include a display mode for presentation of virtual content via the wearable extended reality appliance. In one example, in one mode of operation, no virtual content may be presented via the wearable extended reality appliance (for example, when the wearable extended reality appliance is engaged with the holder), while in another mode of operation, a selected virtual content may be presented via the wearable extended reality appliance (for example, when the wearable extended reality appliance is not engaged with the holder). In another example, in one mode of operation, virtual content may be presented via the wearable extended reality appliance at a smaller size (for example, when the wearable extended reality appliance is engaged with the holder), while in another mode of operation the selected virtual content may be presented via the wearable extended reality appliance at a larger size (for example, when the wearable extended reality appliance is not engaged with the holder). In another example, in one mode of operation, virtual content may be presented via the wearable extended reality appliance at a lower opacity (for example, when the wearable extended reality appliance is engaged with the holder), while in another mode of operation the selected virtual content may be presented via the wearable extended reality appliance at a higher opacity (for example, when the wearable extended reality appliance is not engaged with the holder). In another example, in one mode of operation, virtual content may be presented via the wearable extended reality appliance at a lower brightness (for example, when the wearable extended reality appliance is engaged with the holder), while in another mode of operation the selected virtual content may be presented via the wearable extended reality appliance at a higher brightness (for example, when the wearable extended reality appliance is not engaged with the holder).

In some examples, when the wearable extended reality appliance is engaged with the holder, the mode of operation may be selected based on virtual content presented via the wearable extended reality appliance before the engagement of the wearable extended reality appliance with the holder. For example, in response to a first virtual content (such as, virtual content related hardware maintenance, virtual content related to high priority tasks, etc.), a first mode of operation may be selected, and in response to a second virtual content (such as, virtual content requiring an involvement of a user, virtual content related to low priority tasks, etc.), a second mode of operation may be selected, the second mode may differ from the first mode. In some examples, when the wearable extended reality appliance is engaged with the holder, the mode of operation may be selected based on an analysis of image data captured using at least one image sensor (for example, at least one image sensor included in the wearable extended reality appliance, included in the integrated computational interface device, and so forth). For example, the image data may be analyzed using a visual classification algorithm to classify the physical environment of the integrated computational interface to a particular class out of a plurality of alternative classes, and the mode of operation may be selected based on the particular class. Some non-limiting examples of such classes may include "outdoor," "indoor," "office," "home," "meeting room," "at least one person in the environment," "at least two persons in the environment," "no person in the environment," and so forth. In another example, the image data may be analyzed using a visual motion recognition algorithm to detect motion in the physical environment of the integrated computational interface, and the mode of operation may be selected based on whether motion towards the integrated computational interface is identified.

In some embodiments, the integrated computational interface device may also include a protective cover. The cover may protect a portion of the housing from damage during transportation, for example, a portion of the housing including the key region, the non-key region, and the holder. The protective cover may be completely removable from the housing or may be attached by one or more sides thereof to the housing. One side of the protective cover may be fixedly attached to the housing. The protective cover may include two layers of a soft material (such as a non-woven textile) encasing a second material (such as silicon). The protective cover may include a first layer of a soft material (such as a non-woven textile) and a second layer of a second material (such as silicon). The protective cover may be made of any number of layers or of different types of materials to provide bump, shock, or impact protection to the keyboard and/or the housing and/or the wearable extended reality appliance when the wearable extended reality appliance is selectively engaged with the holder.

The protective cover may be operable in two encasing modes. In a first encasing mode, the protective cover may be configured to overlie the wearable extended reality appliance in the housing. For example, in the first encasing mode, the protective cover may provide bump, shock, or impact protection to the keyboard and/or the housing and/or the wearable extended reality appliance when the wearable extended reality appliance is selectively engaged with the holder. The protective cover may include one or more features, such as one or more protrusions, configured to hold the wearable extended reality appliance in the first encasing mode. For example, the protective cover may include one or more fold lines to allow the protective cover to bend over the wearable extended reality appliance when the wearable extended reality appliance is selectively engaged with the holder, and to bend differently when the wearable extended reality appliance is selectively disengaged from the holder.

In a second encasing mode, the protective cover may be configured to elevate the housing. For example, in the second encasing mode, the protective cover may allow the housing to be elevated relative to a surface where the housing is placed, such as a table, a desk, or a user's lap. To elevate the housing, the protective cover may be segmented such that the protective cover may be folded into different positions whereby the housing may be elevated to one or more distances above the surface on which the housing is placed. In the second encasing mode, the protective cover may not overlie the wearable extended reality appliance.

Figure 13A:
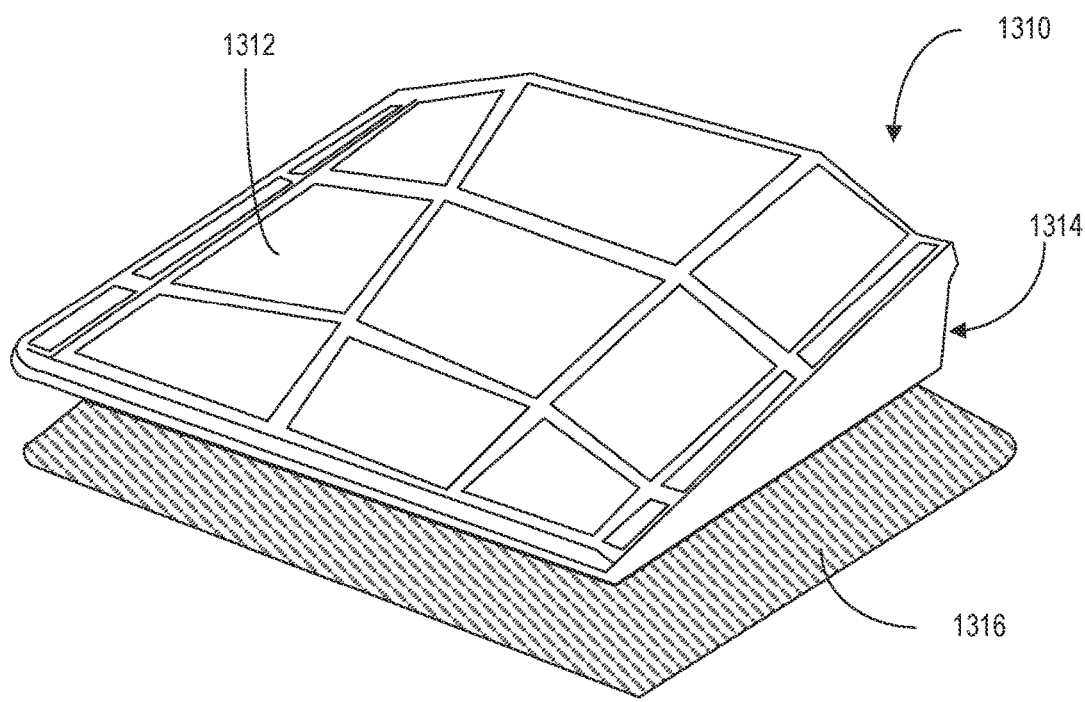
FIG. 13A is a side perspective view of an exemplary integrated computational interface device having a protective cover in a first encasing mode, consistent with some embodiments of the present disclosure.

FIG. 13A is a right side perspective view of integrated computational interface device 1310 having protective cover 1312 in a first encasing mode. FIG. 13A is an exemplary representation of just one embodiment, and it is to be understood that some illustrated elements might be omitted and others added within the scope of this disclosure. Protective cover 1312 may cover an upper portion of housing 1314 while a bottom surface of housing 1314 contacts surface 1316 where integrated computational interface device 1310 may be placed. In some non-limiting examples, integrated computational interface device 1310 may include all or some of the elements of at least one of integrated computational interface device 610, integrated computational interface device 710, or integrated computational interface device 1210.

Figure 13B:
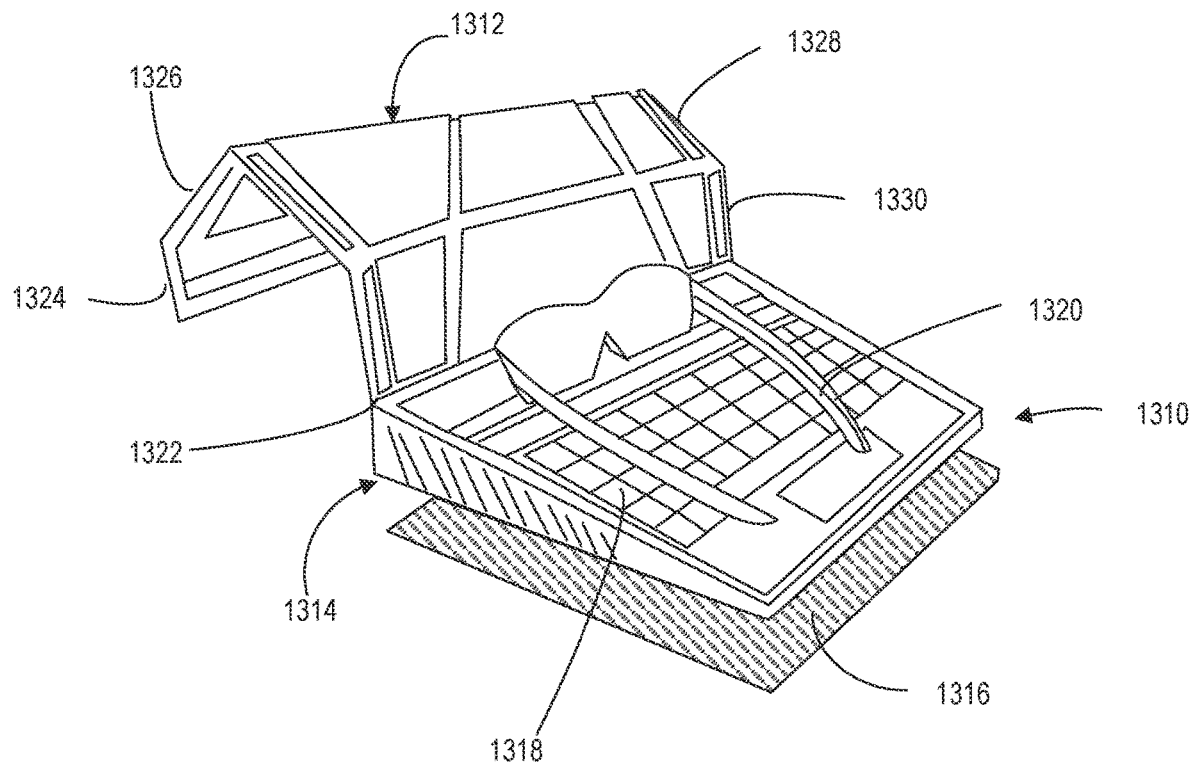
FIG. 13B is a left side perspective view of the integrated computational interface device of FIG. 13A having a protective cover in a second encasing mode, consistent with some embodiments of the present disclosure.

FIG. 13B is a left side perspective view of integrated computational interface device 1310 of FIG. 13A having protective cover 1312 in a second encasing mode. FIG. 13B is an exemplary representation of just one embodiment, and it is to be understood that some illustrated elements might be omitted and others added within the scope of this disclosure. When protective cover 1312 is in the second encasing mode, protective cover 1312 may be at least partially separated from housing 1314 to permit access to keyboard 1318, wearable extended reality appliance 1320, and holder 1322 for wearable extended reality appliance 1320. Protective cover 1312 may be segmented to create individual segments (such as segments 1324, 1326, 1328, and 1330) such that protective cover 1312 may be folded to elevate at least a portion of housing 1314 above surface 1316. The housing may be elevated by placing the folded protective cover 1312 under one end of the housing to elevate that end of the housing. It is noted that the number of segments 1324-1330 shown in FIG. 13B is exemplary and that protective cover 1312 may have fewer segments or more segments.

The protective cover may also include at least one camera associated therewith. For example, the protective cover may include one or more cameras or other types of imaging devices configured to capture images of the keyboard, the user, or the environment around the user. The one or more cameras may include one or more selfie cameras, back cameras, or other cameras associated with the protective cover such that the camera may be usable when the protective cover is in the second encasing mode.

The protective cover may also include at least one protrusion on at least two sides of the at least one camera. For example, the protective cover may include two protrusions from two sides of the at least one camera, one protrusion encircling the at least one camera from at least two sides, or another number of protrusions such that the at least one protrusion is configured to prevent the at least one camera from contacting a flat surface when the cover is positioned on the flat surface with the camera facing the flat surface.

Figure 14:
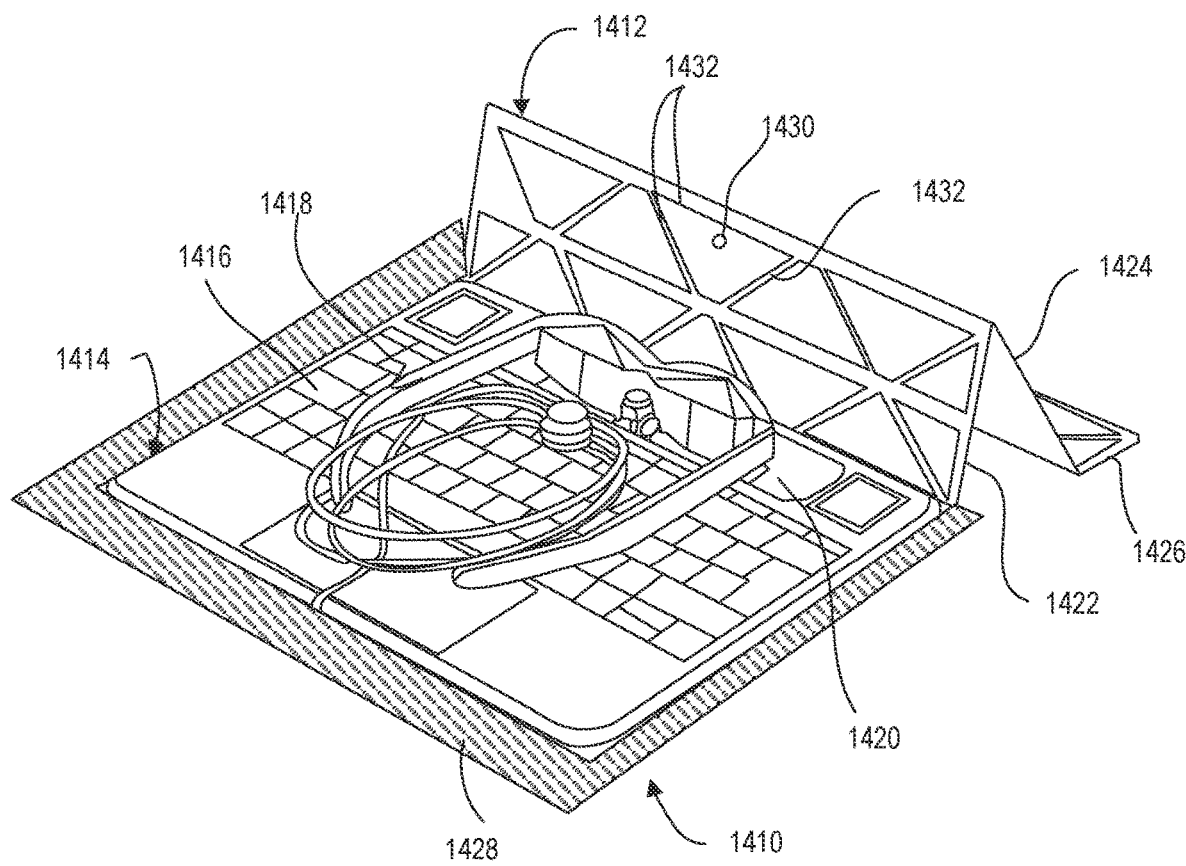
FIG. 14 is a side perspective view of a second exemplary embodiment of an integrated computational interface device having a protective cover in a second encasing mode.

FIG. 14 is a right side perspective view of another embodiment of integrated computational interface device 1410 having protective cover 1412 in a second encasing mode. FIG. 14 is an exemplary representation of just one embodiment, and it is to be understood that some illustrated elements might be omitted and others added within the scope of this disclosure.

When protective cover 1412 is in the second encasing mode, protective cover 1412 is at least partially separated from housing 1414 to permit access to keyboard 1416, wearable extended reality appliance 1418, and holder 1420 for wearable extended reality appliance 1418. Protective cover 1412 may be segmented to create individual segments (such as segments 1422, 1424, and 1426) such that protective cover 1412 may be folded to elevate at least a portion of housing 1414 above surface 1428. It is noted that the number of segments 1422-1426 shown in FIG. 14 is exemplary and that protective cover 1412 may have fewer segments or more segments.

Camera 1430 may be positioned in protective cover 1412 in segment 1422. It is noted that camera 1430 may be positioned in any portion of protective cover 1412. Three protrusions 1432 extend outward from protective cover 1412 to form a triangular shape around camera 1430. Protrusions 1432 are configured to prevent camera 1430 from contacting surface 1428 when protective cover 1412 is positioned on surface 1428 with camera 1430 facing surface 1428.

Traditionally, cameras are located on a top frame of a laptop screen. This position enables the camera to face the user when the laptop is used from an elevated position in relation to the surface that the laptop is placed on. This elevated position allows for a desirable viewing angle of the user. Some disclosed embodiments allow for a laptop without a significant physical screen using an extended reality appliance. However, this raises the problem of camera position. Positioning the camera on the keyboard creates an undesirable viewing angle of the user that users are not accustomed to. Therefore, it is desirable to position the camera in an elevated position in relation to the keyboard. One solution provided by some disclosed embodiments includes locating the camera in a foldable cover of the keyboard, configured to be folded to a configuration in which the camera is elevated above the keyboard and faces the user.

In some embodiments, an integrated computational interface device may include a housing having a key region and a non-key region. An integrated computational interface may include any device that has a number of functional components. The device may serve as an interface in permitting human interaction with a machine such as a computer. In one example, an integrated computational interface device may include a computing device configured to work with a wearable extended reality appliance external to the integrated computational interface device, for example to enable a presentation of an extended reality environment via the wearable extended reality appliance. In one example, an integrated computational interface device may include, for example in a single housing, a computing device (such as a processor, a CPU, etc.), integrated with an input device (such as a keyboard, a touchscreen, a touchpad, etc.), a digital communication device configured to connect the integrated computational interface device to a digital communication network (such as Ethernet, cellular network, the Internet, etc.), and a communication port configured to connect a wearable extended reality appliance external to the integrated computational interface device.

A housing may include any physical structure in which one or more components are contained or housed. Such a housing may have a key region, such as a general area where keys are located and a non-key region, generally devoid of keys. A key may include any button, switch, trigger, toggle, or any other element capable of activation via physical manipulation. In some embodiments, keys may be mechanical in nature (e.g., mechanical push button(s) such as found on a typical computer keyboard). In other instances, keys may be soft (e.g., a touch display on which images of key(s) are simulated). By way of example, a key region may cover an area of an alphanumeric keyboard or a numeric keyboard, while a non-key region may be another area of the interface lacking keys. In some examples, the key region and/or the non-key region may be regions of an external surface (or of an upper external surface) of the integrated computational interface device. In some embodiments, an integrated computational interface device may include a housing having an input region and a non-input region. In one example, the input region may be an external surface area (or an upper external surface area) of the integrated computational interface device including a touchscreen. In another example, the input region may be an external surface area (or an upper external surface area) of the integrated computational interface device including a touchpad. In yet another example, the input region may be and/or include a key region as described above. In one example, the non-input region may be an external surface area (or an upper external surface area) of the interface lacking any input device. In another example, the input region may be an external surface area (or an upper external surface area) of the integrated computational interface device including an input device of a particular type, and the non-input region may be another external surface area (or another top external surface area) of the integrated computational interface device lacking input devices of the particular type.

A housing may include an outer covering or shell. The housing may surround components of the integrated computational interface device and may cover some or all components of the integrated computational interface device. It is contemplated that the housing may have one or more openings that may expose certain components (e.g., USB or other ports or an image sensor) of the integrated computational interface device or may allow certain components (e.g., keys of a keyboard) to protrude from the housing. The housing may support certain components of the integrated computational interface device (e.g., a circuit board) in an interior portion of the housing.

The housing of the integrated computational device may include a key region and a non-key region distinct from the key region. As previously discussed in greater detail, the key region may include one or more keys that may allow a user to enter alphanumeric or other characters as inputs. For example, in some embodiments, a keyboard may be associated with the key region of the housing. The keyboard may be a standard typewriter-style keyboard (e.g., a QWERTY-style keyboard) or other suitable keyboard layout, such as a Dvorak layout or a chorded layout. The keyboard may include any suitable number of keys; for example, a "full size" keyboard may include up to 104 or 105 keys. In one example, the keyboard may include at least 10 keys, at least 30 keys, at least 80 keys, at least 100 keys, and so forth. In one example, the keyboard may be included in the integrated computational interface device, in an external surface area of the integrated computational interface device, in an upper external surface area of the integrated computational interface device, in the housing, in an external surface of the housing, in an upper external surface of the housing, in the key region, and so forth. In some embodiments, an input device may be associated with the input region of the housing. Some non-limiting examples of such an input device may include a touchscreen, a touchpad, a keyboard as described above, and so forth. For example, the input device may be a touchscreen, and the touchscreen may have a diagonal length of at least 1 inch, at least 5 inches, at least 10 inches, and so forth. In another example, the input device may be a touchpad, and the touchpad may have a diagonal length of at least 1 inch, at least 5 inches, at least 10 inches, and so forth. In one example, the input device may be included in the integrated computational interface device, in an external surface area of the integrated computational interface device, in the housing, in an external surface of the housing, in an upper external surface area of the integrated computational interface device, in the housing, in an upper external surface of the housing, in the key region, and so forth.

As previously discussed in greater detail, the non-key region may be a region of the housing that does not include any keys and may exist to complete a desired shape of the housing that extends beyond the key region of the housing in any direction. The non-key region may be an area that may include an input element, such as a track pad, a track ball, a touchscreen, a touch bar, or other form of cursor control for the integrated computational interface device. The non-key region may be subdivided into multiple different non-key regions, such as the track pad or other cursor control, an extension of the housing, or a cover or grille for one or more speakers or other audio output devices included within the housing. In some embodiments, the housing may include two or more non-key regions. For example, a first non-key region may be positioned at a top edge of the key region and a second non-key region may be positioned at a bottom edge of the key region. In some embodiments, the non-key region may just be a portion of the housing, without any function other than to serve as a portion of the housing. In some examples, as previously discussed in greater detail, the non-input region may be a region of the housing that does not include any input device, or that does not include any input device of a particular type, and may exist to complete a desired shape of the housing that extends beyond the input region of the housing in any direction. In some embodiments, the housing may include two or more non-input regions.

In some embodiments, the integrated computational interface device may include at least one image sensor. An image sensor may include a device that converts photons (i.e., light) into electrical signals for interpretation. For example, an image sensor may incorporate a charge-coupled device (CCD) or an active-pixel sensor (CMOS sensor), fabricated in complementary MOS (CMOS) or N-type MOS (NMOS or Live MOS) technologies. The at least one image sensor may be configured to capture images and/or videos of a user of the integrated computational interface device or may otherwise be located in a physical environment of the user. As previously described, an image sensor may be configured to capture visual information by converting light to image data. In some embodiments, the at least one image sensor may be at least one of: a color image sensor, a monochromatic image sensor, a stereo image sensor, an infrared image sensor, or a depth image sensor.

In some examples, image data captured using the at least one image sensor included in the integrated computational interface device may be analyzed to determine whether a user of a wearable extended reality device is approaching the integrated computational interface device. For example, the image data may be analyzed using a visual classification algorithm to determine whether a user of a wearable extended reality device is approaching the integrated computational interface device, whether a person approaching the integrated computational interface device is a user of a wearable extended reality device or not, and so forth. In some examples, the image data may be analyzed to identify the wearable extended reality device used by a person approaching the integrated computational interface device. For example, a unique visual code may be presented on the wearable extended reality device (for example, in a sticker or on a display screen on an external side of the wearable extended reality device), the image data may be analyzed to detect and recognize the unique visual code, and a data structure associating wearable extended reality devices with visual codes may be accessed based on the identified visual code to identify the wearable extended reality device. Further, in some examples, pairing of the integrated computational interface device with the identified wearable extended reality device may be initiated upon the identification of the wearable extended reality device.

In some embodiments, the integrated computational interface device may include a foldable protective cover incorporating the at least one image sensor wherein the protective cover may be configured to be manipulated into a plurality of folding configurations. A cover may be considered foldable if it has a non-rigid structure, enabling it to at least somewhat adjust or conform to a structure positioned beneath the cover. By way of example, a foldable cover may have distinct fold lines or creases, or may be generally flexible without specific creases. Foldability may be facilitated through creases in the cover, and/or may be facilitated based on its material composition. For example, the cover may be made of a flexible material that enables it to fold.

In some folding configurations, the cover may protect a portion of the housing from damage during transportation, such as a portion of the housing including the key region and at least a portion of the non-key region (or the input region and at least a portion of the non-input region). In some embodiments, if the housing has multiple non-key regions, the cover may not cover all non-key regions. For example, in some embodiments, the cover may not extend over a non-key region positioned at a bottom edge of the key region or may cover only a portion of the non-key region positioned at the bottom edge of the key region. In some embodiments, if the housing has multiple non-input regions, the cover may not cover all non-input regions. For example, in some embodiments, the cover may not extend over a non-input region positioned at a bottom edge of the input region or may cover only a portion of the non-input region positioned at the bottom edge of the input region.

The cover may incorporate an image sensor. For example, an aperture in the cover may expose a lens of the image sensor, the image sensor may be embedded within layers of the cover (with an aperture in at least one layer for exposing a lens of the image sensor), the image sensor may be affixed to an external surface of the cover, or the image sensor may be configured for connection or association with the cover in any other way.

In some embodiments, the protective cover may have a quadrilateral shape with one side connected to the housing. In some embodiments, the cover shape may not be perfectly quadrilateral. For example, the corners and/or edges of the cover may be rounded, beveled, or chamfered as a result of its fabrication process. In some embodiments, the protective cover may have a similar shape as a top surface of the housing such that the protective cover completely covers the top surface of the housing, including covering the key region and the at least a portion of the non-key region (or including covering the input region and the at least a portion of the non-input region). In some embodiments, the cover may be configured to extend beyond one or more edges of the top surface of the housing such that the cover may at least partially wrap around one or more sides of the housing.

In some embodiments, the at least one image sensor may be located closer to a first side of the protective cover connected to the housing than to a second side of the protective cover, opposite the first side. In some embodiments, the first side of the protective cover may be connected to the housing by being fixedly attached to the housing. For example, the first side of the protective cover may be attached or coupled to the housing by a hinge mechanism. A rotating hinge may be employed, or the hinge might be made of a flexible plastic or fabric material. These are just a few examples.

Any type of hinge mechanism known in the art may be used. Although not a requirement, in some embodiments, the hinge mechanism may be made of a flexible material, with a first edge of the flexible material fixedly attached to the housing and a second edge, opposite the first edge, fixedly attached to the protective cover. In some embodiments, the flexible material may include fabric, silicone, rubber, or other polymeric or elastomeric material. In some embodiments, the hinge mechanism may include one or more knuckles (e.g., rigid or semi-rigid loop structures) connected to and extending away from the protective cover, one or more knuckles connected to and extending away from the housing, and a pin inserted through all of the knuckles to create the hinge, such that the protective cover may rotate or pivot around the pin. When assembled together prior to inserting the pin, the knuckles of the protective cover and the knuckles of the housing may be aligned or interleaved.

In some embodiments, the first side of the protective cover may be removably connected to the housing. For example, the first side of the protective cover may include one or more magnets and the housing may include a ferromagnetic material to enable interaction with the magnets such that the protective cover may be removably connected to the housing. As another example, the first side of the protective cover may include a ferromagnetic material and the housing may include one or more magnets such that the protective cover may be removably connected to the housing.

In some embodiments, the protective cover may include multiple (e.g., two) layers of a relatively soft material (such as a polymeric sheet, fabric, non-woven textile, or similar soft material) encasing a second material (such as silicone). In some embodiments, the protective cover may include a first layer of a first material (for example, a non-woven textile) and a second layer of a second material (for example, silicone). In some embodiments, the protective cover may be made of any number of layers or of different types of materials to provide bump, shock, or impact protection to the keyboard and/or the input device and/or the housing.

In some embodiments, electronics of the at least one image sensor may be sandwiched between a first external layer of the protective cover and a second external layer of the protective cover. The sandwiching may occur through stitching, gluing, bonding, or any other form of fixation between at least some portions of adjacent layers. In some embodiments, the at least one image sensor may be mounted in an image sensor housing to protect the at least one image sensor from bumps, shocks, or vibrations. Electronics of the at least one image sensor may support one or more operations of the at least one image sensor. For example, the electronics may include some or substantially all the components of the at least one image sensor that enables it to function in an intended manner. In some embodiments, the electronics may include, for example, a power connection to supply power to the at least one image sensor and a data connection to transfer data from the at least one image sensor to other components of the integrated computational interface device. In some embodiments, the power connection and the data connection may be provided by a single wire. In some embodiments, the power connection may be provided by a separate wire from the data connection. In some embodiments, the image sensor housing may be configured to hold one image sensor or multiple image sensors. In embodiments with multiple image sensors, each image sensor may have a separate power connection and data connection or may share a power connection and/or a data connection via a bus connection, with each image sensor connected to the bus to share the power connection and/or the data connection. In some embodiments, the electronics may be contained in the image sensor housing.

In some embodiments, when the protective cover is in a first folding configuration, the first external layer of the protective cover may face the housing and the second external layer of the protective cover may be on an opposite side of the protective cover, such that the second external layer faces away from the housing. In some embodiments, the at least one image sensor may be located between the first external layer and the second external layer, to "sandwich" the at least one image sensor between the first external layer and the second external layer to support the at least one image sensor and to provide protection to the at least one image sensor against bumps, shocks, or vibrations. In such a configuration, the first external layer may include an opening such that the at least one image sensor is not covered by the first external layer and that the at least one image sensor may capture images. In some embodiments, the image sensor housing may be located between the first external layer and the second external layer.

In some embodiments, each of the first external layer and the second external layer may be made from a single continuous material and wherein the electronics may be located on an intermediate layer made from a plurality of separated elements. In some embodiments, the first external layer and the second external layer may each made of a single piece of material and may be connected to each other around the respective edges thereof, for example, by stitching, compression, melting, an adhesive, or other methods of fusing the edges together such that the plurality of separated elements of the intermediate layer are contained between the first external layer and the second external layer.

In some embodiments, the plurality of separated elements may be surrounded on opposite sides by the first external layer and the second external layer, wherein the plurality of separated elements is sandwiched between the first external layer and the second external layer. In some embodiments, the plurality of separated elements may be positioned in "pockets" formed between the first external layer and the second external layer, such that each separated element is in a separate pocket. In some embodiments, the plurality of separated elements may permit the protective cover to be flexible and formed in a plurality of configurations, including a flat configuration and one or more three-dimensional configurations. Additional details about possible shapes of the protective cover will be described below.

In some embodiments, the electronics of the at least one image sensor may be attached to one of the plurality of separated elements. For example, the electronics may be attached to one of the plurality of separated elements by an adhesive. Any suitable type of adhesive may be used. As another example, the electronics may be positioned in a first support element and one of the plurality of separated elements may include a second support element, such that the first support element and the second support element interact (e.g., by a tongue and groove arrangement, a slide-fit arrangement, a snap-fit arrangement, or a press-fit arrangement) to attach the first support element to the second support element. In some embodiments, the first support element may include the image sensor housing previously described and the second support element may include a bracket configured to interact with the image sensor housing to attach the image sensor housing to one of the plurality of separated elements. In some embodiments, the electronics may be permanently attached to one of the plurality of separated elements. In some embodiments, the electronics may be removably attached to one of the plurality of separated elements. In some embodiments, the electronics may be integrally formed with one of the plurality of separated elements. For example, one of the plurality of separated elements may be molded or formed around the electronics to contain the electronics therein.

In some embodiments, at least some of the plurality of separated elements may have triangular shapes. In some embodiments, at least some of the plurality of separated elements may have quadrilateral shapes. In some embodiments, the quadrilateral shaped elements may have rounded, chamfered, or beveled edges and/or corners. In some embodiments, at least some of the plurality of separated elements may have other shapes, such as circular, semicircular, elliptical, oval, or another shape. In general, the separated elements may have any shape with linear or non-linear (e.g., curved) sides. In some embodiments, all of the plurality of separated elements may have substantially the same shape. In some embodiments, some of the plurality of separated elements may have a first shape and other separated elements may have a second shape different from the first shape. In some embodiments, at least some of the plurality of separated elements may have substantially the same shape in different sizes. For example, some of the plurality of separated elements may have substantially triangular shapes of different sizes; e.g., small triangular shapes and large triangular shapes. The described shapes for the plurality of separated elements are approximate in that each of the elements may have rounded, chamfered, or beveled edges and/or corners.

In some embodiments, the first external layer and the second external layer may be made from a first material and the intermediate layer may include a second material that differs from the first material. In some embodiments, the first external layer may be made of a different material than the second external layer. In some embodiments, the second material of the intermediate layer may be a different material than either the first external layer or the second external layer.

In some embodiments, the first material and the second material may include plastic materials, silicon, carbon-fiber, polycarbonate, fabric, or leather. For example, the first material may be a polycarbonate material and the second material may be silicon or fabric. As another example, the first material may be a first type of fabric and the second material may be a second type of fabric. As another example, the second material may be at least one of glass, ceramic, epoxy, plastic, or polytetrafluoroethylene. In some embodiments, the first material may be more durable than the second material. In some embodiments, the second material may be softer than the first material. In some embodiments, the second material may be a dielectric material.

In some embodiments, the first material may be more rigid than the second material. In some embodiments, the first material may be rigid or semi-rigid. In some embodiments, the second material may be more rigid than the first material. In some embodiments, the second material may be rigid or semi-rigid.

In some embodiments, in a first folding configuration, the protective cover may be configured to encase the key region and at least a portion of the non-key region. In some embodiments, in the first folding configuration, the protective cover may encase an entire upper surface of the housing, including the key region and the entire non-key region. For example, if the protective cover may be connected to the housing by one side, and in the first folding configuration, the protective cover may extend from a side of the housing where the protective cover is connected to an opposite side of the housing away from where the protective cover is connected. In another example, in the first folding configuration, the protective cover may encase a portion of the upper surface of the housing, including the key region and at least a portion of the non-key region. In some embodiments, in the first folding configuration, the protective cover may be configured to encase the input region and at least a portion of the non-input region. For example, the protective cover may encase a portion of the upper surface of the housing, including the input region and at least a portion of the non-input region. In some embodiments, the protective cover may lay flat across the upper surface of the housing.

In some embodiments, the protective cover may be removably connected to the housing at the opposite side of the housing, for example, by a magnetic connection. In some examples, the integrated computational interface device may include a sensor, and data captured using the sensor may be indicative of whether the protective cover is in the first folding configuration. Some non-limiting examples of such a sensor may include a proximity sensor, a magnetic sensor, a physical button (functioning as a switch), and so forth. Further, in some examples, the integrated computational interface device may be configured to withhold image and/or video capturing using the at least one image sensor when the protective cover is in the first folding configuration. In other examples, the integrated computational interface device may be configured to change operational power mode (such as sleep, hibernate, regular, etc.) based on whether the protective cover is in the first folding configuration.

In some embodiments, in a second folding configuration, the protective cover may be configured to stand in a manner that causes an optical axis of the at least one image sensor to generally face a user of the integrated computational interface device while the user types on the keyboard. For example, when the cover is folded to a second configuration where at least a portion of the cover no longer covers the interface device, at least that portion of the cover may be configured to assume an elevated position where the image sensor faces in a direction of the user while the user interacts with the interface device (e.g., uses the device, for example, types on the keyboard). In some embodiments, the protective cover may be folded into one or more sectors, with at least some sectors assisting in supporting the protective cover in the second folding configuration. In some embodiments, when in the second folding configuration, the protective cover may be folded into a substantially triangular shape. The optical axis of the at least one image sensor may be a virtual line through the center of a lens of the image sensor and may help to define an angle of view of the image sensor such that the image sensor may capture an image of the user, for example while the user types on the keyboard. In some embodiments, in the second folding configuration, the protective cover may be configured to stand in a manner that causes an optical axis of the at least one image sensor to generally face a user of the integrated computational interface device while the user physically interacts with the input device. One non-limiting example of such physical interaction with the input device may include touching the input device (for example, touching the touchscreen, touching the touchpad, and so forth).

In some embodiments, in the second folding configuration, when the housing rests on a surface, a sector of the protective cover opposing the side of the quadrilateral shape connected to the housing may also be configured to rest on the surface. In some embodiments, the sector of the protective cover that rests on the surface helps the protective cover to stand in the second folding configuration. In some embodiments, the sector of the protective cover extends away from the housing while resting on the surface. In some embodiments, the sector of the protective cover extends toward the housing while resting on the surface.

In some embodiments, an area of the sector of the protective cover configured to rest on the surface in the second folding configuration may be at least 10% of an overall area of the protective cover. In some embodiments, the area of the sector of the protective cover that rests on the surface in the second folding configuration may be larger or smaller than 10% of the overall area of the protective cover, such that the area of the protective cover that rests on the surface assists the protective cover in staying in the second folding configuration.

In some embodiments, a side of the sector of the protective cover that rests on the surface may include a non-slip portion such that the sector does not slide when resting on the surface. For example, the non-slip portion may include a textured portion, such as ribbed, grooved, or pebble grained. As another example, the non-slip portion may be made of a non-slip material, such as a hard plastic or rubber. In some embodiments, a size of the non-slip portion is less than the area of the sector of the protective cover that rests on the surface.

In some embodiments, the protective cover may include flexible sections that enable folding the protective cover along a plurality of predefined folding lines. Such folding lines may, for example, be creases in the cover. In some embodiments, the flexible sections may be between one or more of the plurality of separated elements of the intermediate layer of the protective cover. In some embodiments, the flexible sections may be between each of the plurality of separated elements of the intermediate layer of the protective cover. In some embodiments, the flexible sections may be formed in locations where the first external layer and the second external layer of the protective cover meet. In some embodiments, the predefined folding lines may correspond to the flexible sections of the protective cover. For example, any flexible section of the protective cover may be a predefined folding line. In some embodiments, the flexible sections may permit the protective cover to be folded in a plurality of shapes, including one or more three-dimensional shapes. In some embodiments, a predefined folding line may be a portion of the protective cover along which the protective cover may be folded.

In some embodiments, at least some of the folding lines may be non-parallel to each other and the flexible sections may enable folding the protective cover to form a three-dimensional shape that includes a compartment for selectively enclosing a wearable extended reality appliance. In some embodiments, the wearable extended reality appliance may include a pair of smart glasses or goggles, as previously described. Smart glasses may appear similar to traditional eyeglasses and may include "smart" functionality such as a camera positioned to take pictures of what the user is presently viewing or one or more displays configured to project images onto lenses of the smart glasses. In some embodiments, wearable extended reality appliance may take other forms that may include one or more lenses, such as goggles or other form of wearable device.

In some embodiments, the wearable extended reality appliance may be placed on the non-key region and/or the key region of the housing, and in the first folding configuration, the protective cover may enclose the wearable extended reality appliance while placed on the non-key region and/or the key region. The compartment formed in the protective cover may provide room between an inner surface of the protective cover and a surface of the housing including the non-key region and the key region such that the wearable extended reality appliance may be enclosed therein.

In some examples, the integrated computational interface device may further include at least one projector, and the foldable protective cover may further incorporate the at least one projector. For example, the at least one projector may be configured to emit at least one of visible light, infrared light, or near infrared light. In one example, the optical axis of the at least one image sensor may be parallel to a central direction of the at least one projector. In one example, an active stereo camera may be implemented using the at least one projector and the at least one image sensor. In another example, a time-of-flight camera may be implemented using the at least one projector and the at least one image sensor. In some examples, the at least one projector may be activated when the protective cover is in the second folding configuration and may be deactivated when the protective cover is in the first folding configuration and/or is in the third folding configuration. In some examples, the at least one projector may be activated when the protective cover is in the third folding configuration and may be deactivated when the protective cover is in the first folding configuration and/or is in the second folding configuration. In some examples, the at least one projector may include a first projector positioned at a first distance from the at least one image sensor and a second projector positioned at a second distance from the at least one image sensor, the second distance may be larger than the first distance. In one example, in the second folding configuration, the first projector may be activated and the second projector may be deactivated, and in the third folding configuration, the second projector may be activated and the first projector may be deactivated.

In some embodiments, the plurality of predefined folding lines may include at least two traversing folding lines and at least two non-traversing folding lines. In some embodiments, a traversing folding line may be a folding line that crosses one or more other folding lines. In some embodiments, a non-traversing folding line may be a folding line that does not cross another folding line (e.g., non-traversing folding lines may be parallel to each other). In some embodiments, the traversing folding lines and the non-traversing folding lines may enable the protective cover to be folded into the first folding configuration, into the second folding configuration, and into one or more three-dimensional shapes.

In some examples, in a third folding configuration, the protective cover may be configured to be in a position that causes an optical axis of the at least one image sensor to generally face away from the user. For example, in the third folding configuration, the cover may be adjacent to a rear surface of the housing of the integrated computational interface device (for example, opposite to the keyboard). In some examples, the integrated computational interface device may include a sensor, and data captured using the sensor may be indicative of whether the protective cover is in the third folding configuration. Some non-limiting examples of such sensor may include a proximity sensor, a magnetic sensor, a physical button (functioning as a switch), and so forth. In some examples, the integrated computational interface device may adjust at least one image capturing parameter of the at least one image sensor based on whether the protective cover is in the third folding configuration. For example, when the protective cover is in the third folding configuration, the at least one image capturing parameter (such as focus, field of view, resolution, and so forth) may be adjusted for capturing images of farther objects. In one example, the at least one image capturing parameter may include at least one of field of view, zoom, resolution, focus, frame rate, or color correction.

Figure 15:
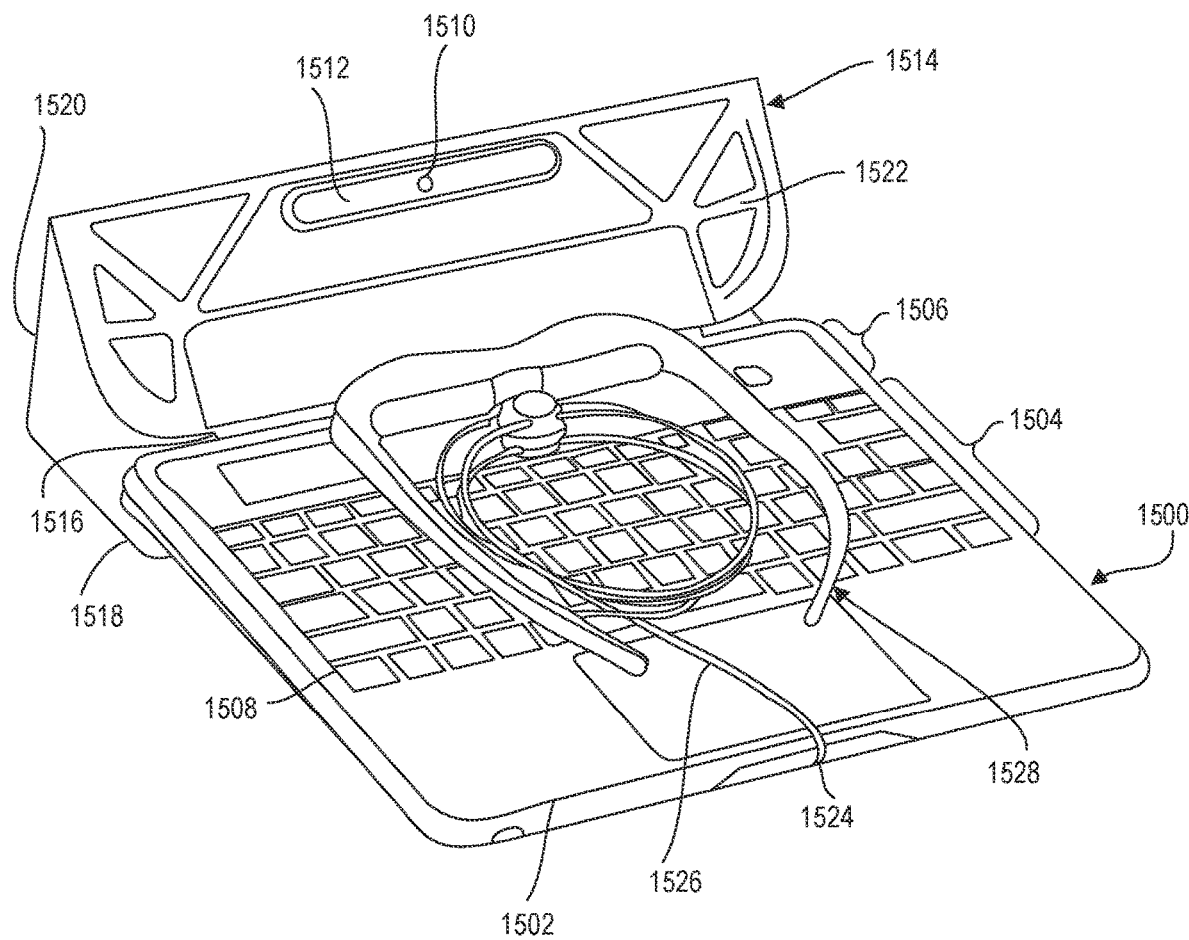
FIG. 15 is a front perspective view of a first exemplary embodiment of an integrated computational interface device.

FIG. 15 is a front perspective view of a first exemplary embodiment of an integrated computational interface device 1500. FIG. 15 is an exemplary representation of just one embodiment, and it is to be understood that some illustrated elements might be omitted and others added within the scope of this disclosure. In some examples, computational interface device 1500 may include elements of computational interface devices 1600, 1700, 1800, 2000, 2100, and 2200 that are not described herein in relation to computational interface device 1500 and/or that are not shown in FIG. 15.

Integrated computational interface device 1500 includes a housing 1502 having a key region 1504 and a non-key region 1506. A keyboard 1508 may be associated with key region 1504. An image sensor 1510 may be included in integrated computational interface device 1500. It is noted that while FIG. 15 shows one image sensor 1510, additional image sensors may be provided. In some embodiments, image sensor 1510 may be included in an image sensor housing 1512.

Integrated computational interface device 1500 may include a foldable protective cover 1514. Foldable protective cover 1514 may incorporate image sensor 1510 and/or image sensor housing 1512. As shown in FIG. 15, foldable protective cover 1514 is in a second folding configuration, such that foldable protective cover 1514 is configured to stand and that image sensor 1510 may generally face a user of integrated computational interface device 1500 while the user types on keyboard 1508. Foldable protective cover 1514 may be connected to housing 1502 by a connector 1516. As described herein, connector 1516 may include a fixed connection (e.g., a hinge mechanism) or a detachable connection (e.g., a magnetic connection).

Foldable protective cover 1514 may include multiple sectors. As shown in FIG. 15, foldable protective cover 1514 may include a first sector 1518, a second sector 1520, and a third sector 1522. Sectors 1518, 1520, and 1522 may enable foldable protective cover 1514 to stand in the second folding configuration. First sector 1518 is shown in FIG. 15 as resting on a surface where housing 1502 is resting and being folded under a portion of housing 1502. Third sector 1522 may be connected to housing 1502 by connector 1516. In this example, image sensor 1510 and/or image sensor housing 1512 may be included in sector 1522.

Figure 16:
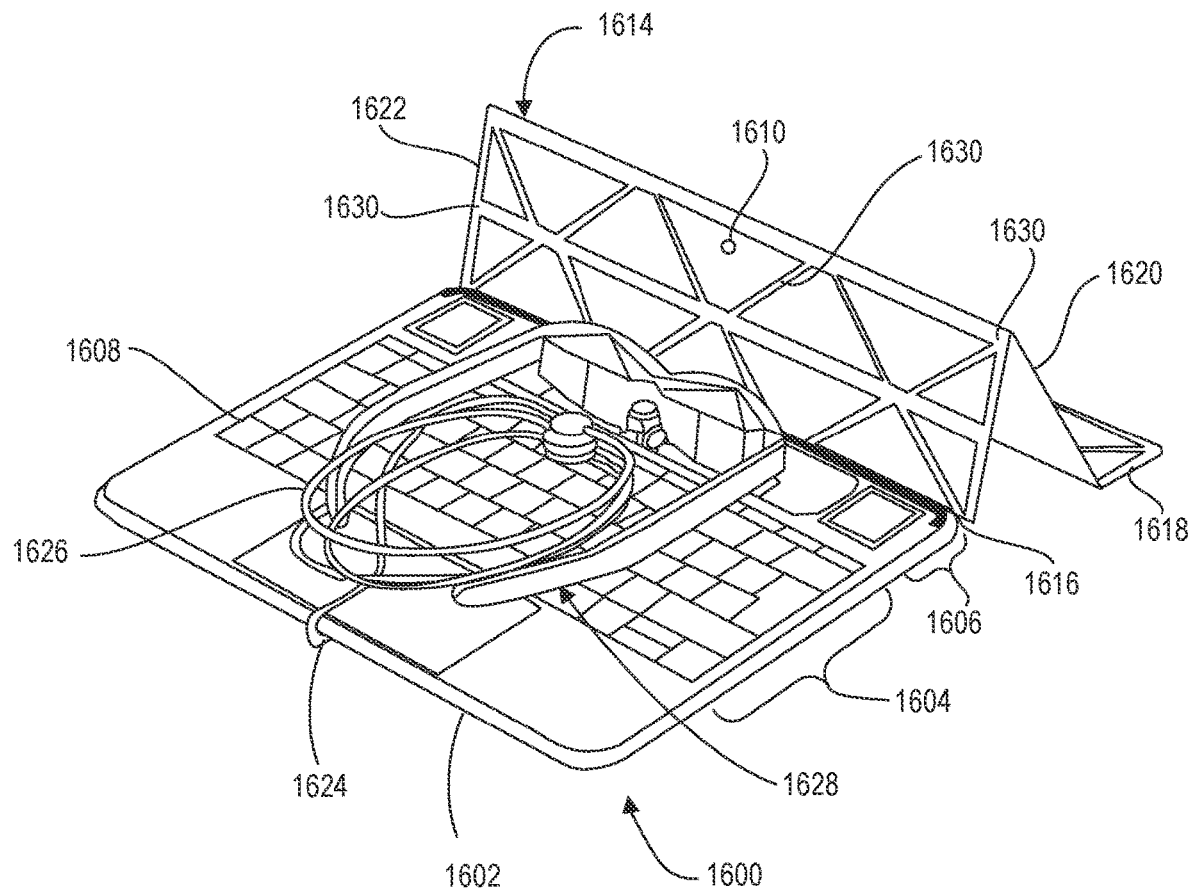
FIG. 16 is a front perspective view of a second exemplary embodiment of an integrated computational interface device.

FIG. 16 is a front perspective view of a second exemplary embodiment of an integrated computational interface device 1600. FIG. 16 is an exemplary representation of just one embodiment, and it is to be understood that some illustrated elements might be omitted and others added within the scope of this disclosure. For ease of description, elements shown in FIG. 16 that are similar to elements shown in FIG. 15 are referenced with similar reference numerals. For example, integrated computational interface device 1600 may include key region 1604 similar to key region 1504, non-key region 1606 similar to non-key region 1506, wire port 1624 similar to wire port 1524, and so forth. In one example, computational interface device 1600 may be linked with wire 1626 similar to wire 1526, wearable extended reality appliance 1628 similar to wearable extended reality appliance 1528, and so forth. In some examples, computational interface device 1600 may include elements of computational interface devices 1500, 1700, 1800, 2000, 2100, and 2200 that are not described herein in relation to computational interface device 1600 and/or that are not shown in FIG. 16.

Integrated computational interface device 1600 may include a foldable protective cover 1614. Foldable protective cover 1614 may incorporate image sensor 1610. As shown in FIG. 16, foldable protective cover 1614 is in a second folding configuration, such that foldable protective cover 1614 is configured to stand and that image sensor 1610 may generally face a user of integrated computational interface device 1600 while the user types on keyboard 1608. Foldable protective cover 1614 may be connected to housing 1602 by a connector 1616.

Foldable protective cover 1614 may include multiple sectors. As shown in FIG. 16, foldable protective cover 1614 may include a first sector 1618, a second sector 1620, and a third sector 1622. Sectors 1618, 1620, and 1622 may enable foldable protective cover 1614 to stand in the second folding configuration. First sector 1618 is shown in FIG. 16 as resting on a surface where housing 1602 is resting and being folded away from housing 1602. Third sector 1622 may be connected to housing 1602 by connector 1616.

Foldable protective cover 1614 may include predefined folding lines 1630. A predefined folding line may be any line predisposed, during manufacture, for folding. Predefined folding lines 1630 may separate foldable protective cover 1614 into sectors 1618, 1620, and 1622. Some predefined folding lines 1630 may extend across a full distance of foldable protective cover 1614 and may be parallel to one another. Other predefined folding lines 1630 may extend in different directions. A pattern may be created by predefined folding lines 1630 to enable foldable protective cover 1614 to be folded into one or more three-dimensional shapes.

Figure 17:
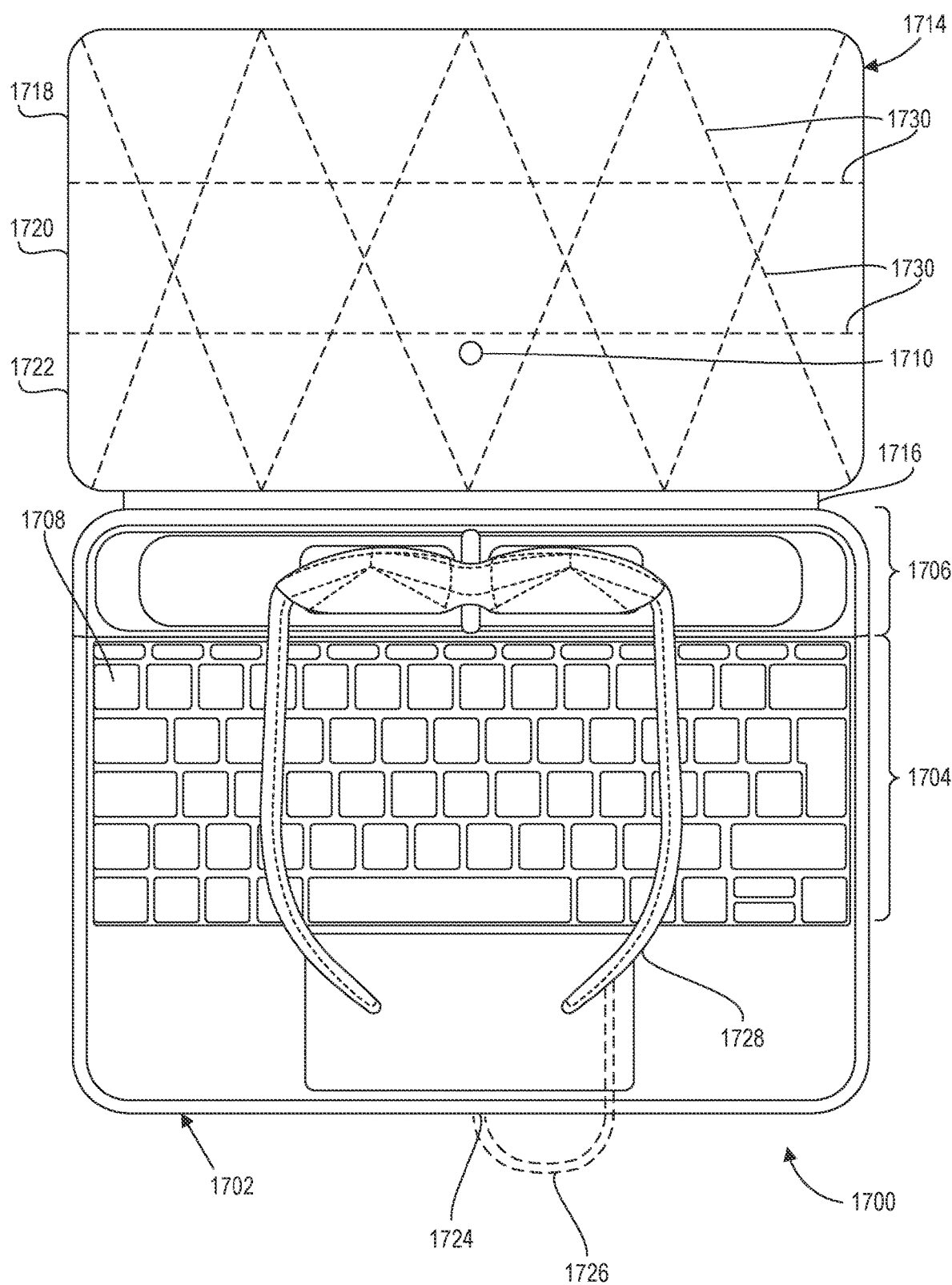
FIG. 17 is a top view of a third exemplary embodiment of an integrated computational interface device.

FIG. 17 is a top view of a third exemplary embodiment of an integrated computational interface device 1700. FIG. 17 is an exemplary representation of just one embodiment, and it is to be understood that some illustrated elements might be omitted and others added within the scope of this disclosure. For ease of description, elements shown in FIG. 17 that are similar to elements shown in FIG. 15 are referenced with similar reference numerals. For example, integrated computational interface device 1700 may include key region 1704 similar to key region 1504, non-key region 1706 similar to non-key region 1506, keyboard 1708 similar to keyboard 1508, wire port 1724 similar to wire port 1524, and so forth. In one example, computational interface device 1700 may be linked with wire 1726 similar to wire 1526, wearable extended reality appliance 1728 similar to wearable extended reality appliance 1528, and so forth. In some examples, computational interface device 1700 may include elements of computational interface devices 1500, 1600, 1800, 2000, 2100, and 2200 that are not described herein in relation to computational interface device 1700 and/or that are not shown in FIG. 17.

Integrated computational interface device 1700 may include a foldable protective cover 1714. Foldable protective cover 1714 may incorporate image sensor 1710. Foldable protective cover 1714 may be connected to housing 1702 by a connector 1716. Foldable protective cover 1714 may include multiple sectors, such as a first sector 1718, a second sector 1720, and a third sector 1722. Sectors 1718, 1720, and 1722 may enable foldable protective cover 1714 to stand in the second folding configuration.

Foldable protective cover 1714 may include predefined folding lines 1730, which are shown in FIG. 17 as dashed lines. Predefined folding lines 1730 may separate foldable protective cover 1714 into sectors 1718, 1720, and 1722. Some predefined folding lines 1730 may extend across a full distance of foldable protective cover 1714 and may be parallel to one another. Other predefined folding lines 1730 may extend in different directions. A pattern may be created by predefined folding lines 1730 to enable foldable protective cover 1714 to be folded into one or more three-dimensional shapes.

Figure 18:
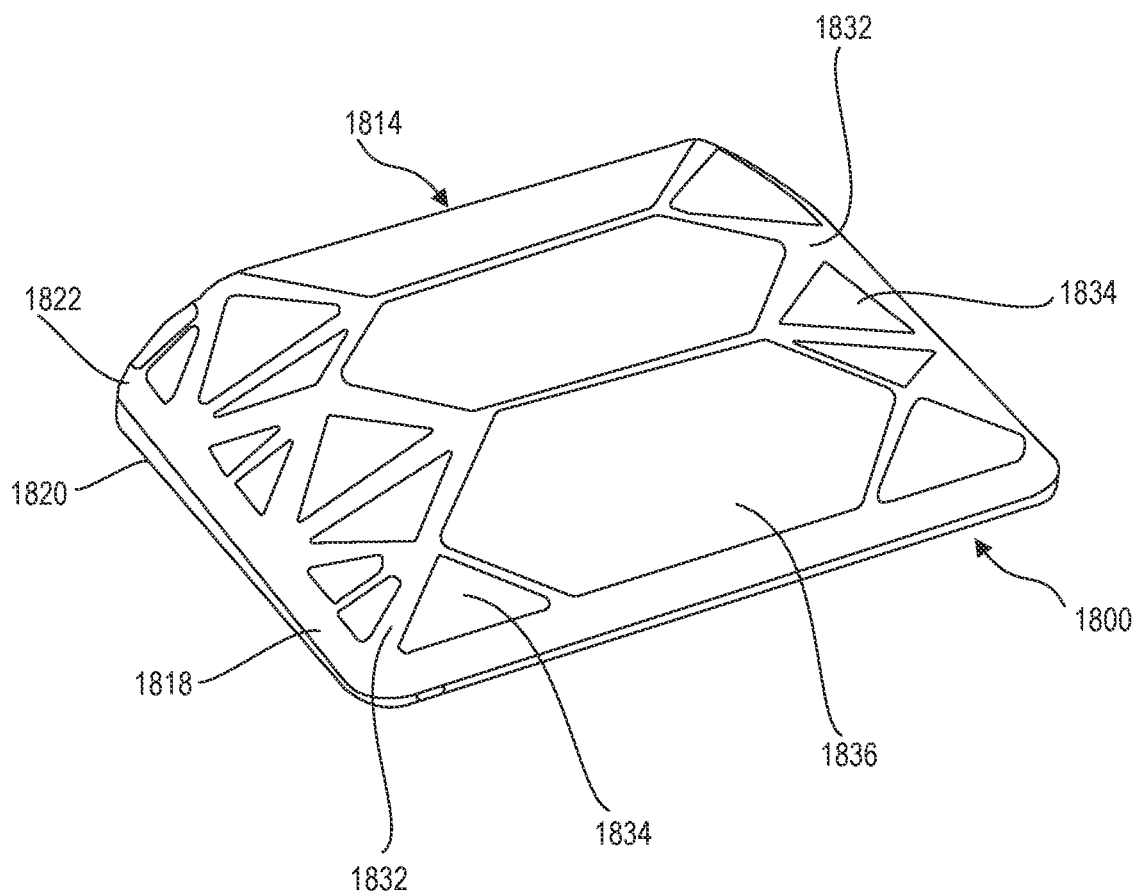
FIG. 18 is a front perspective view of a fourth exemplary embodiment of an integrated computational interface device with a foldable protective cover in a first folding configuration.

FIG. 18 is a front perspective view of a fourth exemplary embodiment of an integrated computational interface device 1800 with a foldable protective cover 1814 in a first folding configuration. FIG. 18 is an exemplary representation of just one embodiment, and it is to be understood that some illustrated elements might be omitted and others added within the scope of this disclosure. As shown in FIG. 18, foldable protective cover 1814 may form a three-dimensional shape. For ease of description, elements shown in FIG. 18 that are similar to elements shown in FIG. 15 are referenced with similar reference numerals. In some examples, computational interface device 1800 may include elements of computational interface devices 1500, 1600, 1700, 2000, 2100, and 2200 that are not described herein in relation to computational interface device 1800 and/or that are not shown in FIG. 18.

Foldable protective cover 1814 may include multiple sectors, such as a first sector 1818, a second sector 1820, and a third sector 1822. Foldable protective cover 1814 may include one or more flexible sections 1832 that enable folding foldable protective cover 1814. Foldable protective cover 1814 may include a plurality of separated elements, such as one or more triangular elements 1834 and one or more polygonal elements 1836. The plurality of separated elements 1834, 1836 may be connected to each other by flexible sections 1832.

Figure 19:
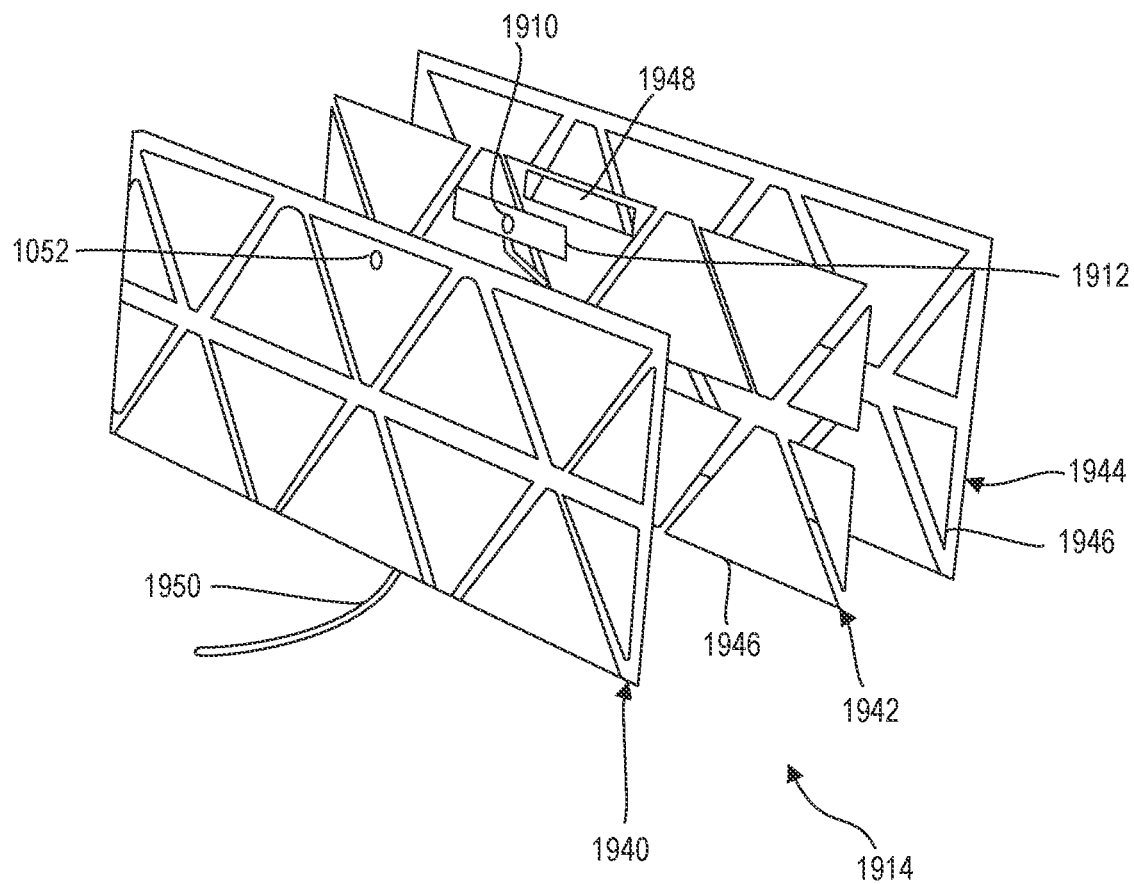
FIG. 19 is an exploded view of a portion of an exemplary embodiment of a foldable protective cover.

FIG. 19 is an exploded view of a portion of an exemplary embodiment of a foldable protective cover 1914. FIG. 19 is an exemplary representation of just one embodiment, and it is to be understood that some illustrated elements might be omitted and others added within the scope of this disclosure. For ease of description, elements shown in FIG. 19 that are similar to elements shown in FIG. 15 are referenced with similar reference numerals.

Foldable protective cover 1914 may include a first external layer 1940, an intermediate layer 1942, and a second external layer 1944. When foldable protective cover 1914 is in a first folding configuration, first external layer 1940 may face the housing of the integrated computational interface device and second external layer 1944 may be on an opposite side of foldable protective cover 1914, such that second external layer 1944 faces away from the housing. In some embodiments, intermediate layer 1942 may be located between first external layer 1940 and second external layer 1944, to "sandwich" intermediate layer 1942 between first external layer 1940 and second external layer 1944 to support intermediate layer 1942.

First external layer 1940 and second external layer 1944 may be made from a single continuous material, such as a soft material (e.g., a non-woven textile). First external layer 1940 may include an opening 1952 such that an image sensor 1910 may receive image data without being obstructed by first external layer 1940.

Intermediate layer 1942 may be made of a plurality of separated elements 1946. In some embodiments, each separated element 1946 may be enclosed in a pocket created by first external layer 1940 and second external layer 1944, such that the separated elements 1946 do not contact one another.

The plurality of separated elements 1946 may be made of a rigid or semi-rigid material such that the plurality of separated elements 1946 may support an image sensor housing 1912 that contains at least one image sensor 1910. Image sensor housing 1912 may be configured to interact with a support element 1948 that is connected to one of the plurality of separated elements 1946 to enable the image sensor housing 1912 to be connected to support element 1948. A wire 1950 may be connected to image sensor 1910 to provide power to image sensor 1910 and/or to receive image data from image sensor 1910. While one wire 1950 is shown in FIG. 19, more than one wire may be provided, with one wire providing power to image sensor 1910 and a second wire receiving image data from image sensor 1910.

In some embodiments, the integrated computational interface device may further include a wire port in the housing located at a front side of the integrated computational interface device opposite the first side of the protective cover, the wire port being configured for receiving a wire extending from a wearable extended reality appliance. Such a wire port may, for example, enable connection of the wearable extended reality appliance in a manner so that the wire does not interfere with the keyboard and/or the input device during use. Having the wire port in the front side may be preferred to having the wire port in a left side or right side of the integrated computational interface device, for example to avoid disturbance of a hand of the user by the wire (of disturbance of the wire by the hand) while interacting with the keyboard and/or the input device. Furthermore, the wire port may be located in the middle or nearly in the middle of the front side (for example, at most 1 inch from the middle, at most 2 inches from the middle, at most 3 inches from the middle, at least one inch from both the left and the right edges of the front side, at least two inches from both the left and the right edges of the front side, at least 3 inches from both the left and the right edges of the front side, at least 5 inches from both the left and the right edges of the front side, closer to the middle than to any one of the left and the right edges of the front side, and so forth). In some embodiments, as previously described, the wire may be any type of wire suitable for providing power and/or data between the integrated computational interface device and the wearable extended reality appliance. For example, the wire may be a Universal Serial Bus (USB) type wire with appropriate connectors for the wire port and the wearable extended reality appliance if the wire is detachable from the integrated computational interface device and/or the wearable extended reality appliance. In some embodiments, the wire may extend from any part of the wearable extended reality appliance. In some embodiments, the wire may be fixedly attached to the wearable extended reality appliance or may be detachable from the wearable extended reality appliance. In some embodiments, the wire may be fixedly attached to the integrated computational interface device or may be detachable from the integrated computational interface device.

Referring back to FIG. 15, housing 1502 may include a wire port 1524 which may be configured to receive a wire 1526 extending from a wearable extended reality appliance 1528. FIG. 15 shows wearable extended reality appliance 1528 as a pair of smart glasses, but wearable extended reality appliance 1528 may include other forms (e.g., a pair of goggles). The form of wearable extended reality appliance 1528 does not alter operation of the embodiment shown in FIG. 15.

The at least one image sensor may in general include any number of image sensors. In some embodiments, the at least one image sensor may include at least a first image sensor and a second image sensor. In some embodiments, the first image sensor and the second image sensor may be located proximate to each other. In some embodiments, the first image sensor and the second image sensor may be contained in a same image sensor housing. In some embodiments, the first image sensor and the second image sensor may be separated from each other. In some embodiments, the first image sensor and the second image sensor may be contained in separate image sensor housings.

In some embodiments, in the second folding configuration, a field of view of at least one of the image sensors may be configured to capture an image (at least a partial image) of the user using the device. For example, given expected distances between a user and the interface device, the image sensor may be configured so that its field of view is tailored primarily to portions of the user relevant to operation of disclosed embodiments. For example, in some embodiments, in the second folding configuration, a first field of view of the first image sensor may be configured to capture a face of the user while the user types on the keyboard. Again, the protective cover may be constructed so that the image sensor may be angled upward toward an expected location of a user. In another example, in the second folding configuration, a first field of view of the first image sensor may be configured to capture a face of the user while the user physically interacts with the input device.

In some embodiments, the image sensors may be configured such that, when one of the image sensors is configured to capture an image of the user's face, another image sensor may be configured to capture another view of the user. For example, an image of one or both of the user's hands on the keyboard. Thus the cover may support one image sensor angled to the expected location of a user's face while a second image sensor in the same cover (or at another location on the housing) may be angled to capture the user's hand movements on the keyboard. For example, in some embodiments, in the second folding configuration, a second field of view of the second image sensor may be configured to capture an image of the hands of the user while the user types on the keyboard. In another example, in the second folding configuration, the second field of view of the second image sensor may be configured to capture an image of the hands of the user while the user physically interacts with the input device. In some embodiments, the first field of view and the second field of view may at least partially overlap. In some embodiments, the first field of view and the second field of view may not overlap.

Figure 20:
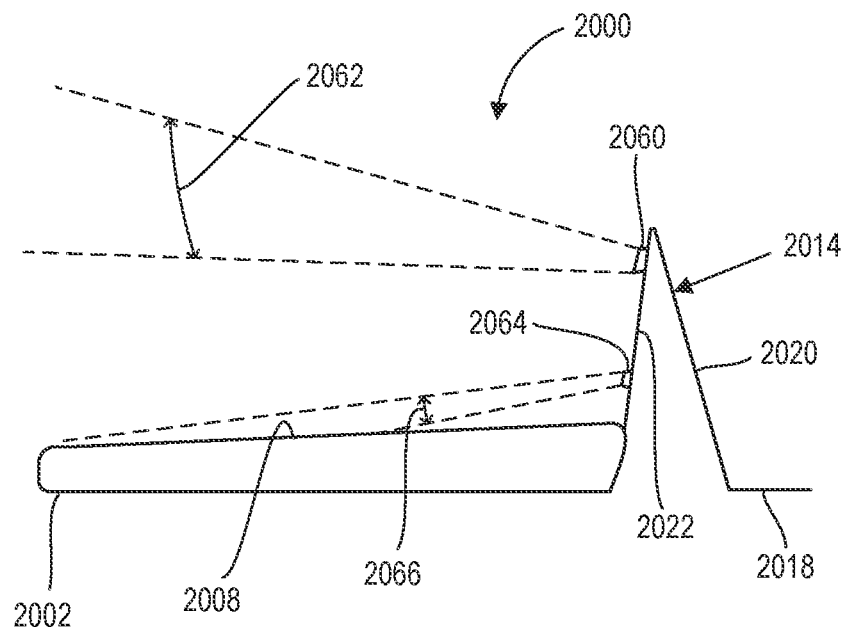
FIG. 20 is a side view of a fifth exemplary embodiment of an integrated computational interface device.

FIG. 20 is a right side view of a fifth exemplary embodiment of an integrated computational interface device 2000. FIG. 20 is an exemplary representation of just one embodiment, and it is to be understood that some illustrated elements might be omitted and others added within the scope of this disclosure. For ease of description, elements shown in FIG. 20 that are similar to elements shown in FIG. 15 are referenced with similar reference numerals. For example, integrated computational interface device 2000 may include housing 2002 similar to housing 1502, and so forth. In some examples, computational interface device 2000 may include elements of computational interface devices 1500, 1600, 1700, 1800, 2100, and 2200 that are not described herein in relation to computational interface device 2000 and/or that are not shown in FIG. 20.

Integrated computational interface device 2000 may include a foldable protective cover 2014. Foldable protective cover 2014 may include multiple sectors, such as a first sector 2018, a second sector 2020, and a third sector 2022. Sectors 2018, 2020, and 2022 may enable foldable protective cover 2014 to stand in the second folding configuration, as shown in FIG. 20.

Third sector 2022 of foldable protective cover 2014 may include a first image sensor 2060 having a first field of view 2062 and a second image sensor 2064 having a second field of view 2066. First field of view 2062 may enable first image sensor 2060 to capture one or more images of a face of a user of integrated computational interface device 2000. Second field of view 2066 may enable second image sensor 2064 to capture one or more images of hands of the user while the user types on keyboard 2008.

In some embodiments, the at least one image sensor may be connected to at least one gimbal configured to enable the user to change an angle of the at least one image sensor without moving the protective cover. The gimbal may be a pivoted support that enables the at least one image sensor to rotate about an axis, thereby changing the angle of the at least one image sensor. In some embodiments, the gimbal may be implemented as a ball and socket joint to enable the at least one image sensor to be rotated within a 360° range. In some embodiments, the gimbal may be implemented as a pin joint to enable the at least one image sensor to be rotated within one degree of freedom (i.e., either side-to-side or up-and-down). In some embodiments, other types of mechanical joints or connectors may be implemented to enable the at least one image sensor to be angled within one or more degrees of freedom. In some embodiments, the at least one image sensor may be contained in an image sensor housing that may be connected to the at least one gimbal. Changing the angle of the at least one image sensor may also change the field of view of the at least one image sensor. In some embodiments, the gimbal may enable the at least one image sensor to move side-to-side, up-and-down, or within a 360° range.

Figure 21:
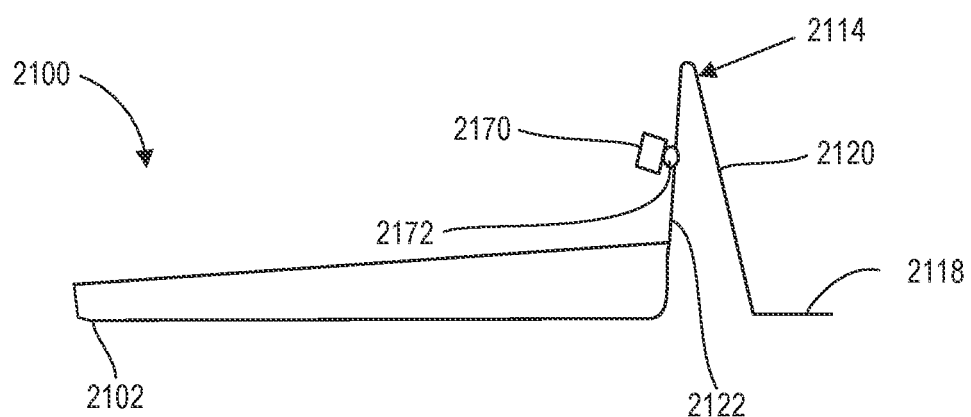
FIG. 21 is a side view of a sixth exemplary embodiment of an integrated computational interface device.

FIG. 21 is a right side view of a sixth exemplary embodiment of an integrated computational interface device 2100. FIG. 21 is an exemplary representation of just one embodiment, and it is to be understood that some illustrated elements might be omitted and others added within the scope of this disclosure. For ease of description, elements shown in FIG. 21 that are similar to elements shown in FIG. 15 are referenced with similar reference numerals. For example, integrated computational interface device 2100 may include housing 2102 similar to housing 1502, and so forth. In some examples, computational interface device 2100 may include elements of computational interface devices 1500, 1600, 1700, 1800, 2000, and 2200 that are not described herein in relation to computational interface device 2100 and/or that are not shown in FIG. 21.

Integrated computational interface device 2100 may include a foldable protective cover 2114. Foldable protective cover 2114 may include multiple sectors, such as a first sector 2118, a second sector 2120, and a third sector 2122. Sectors 2118, 2120, and 2122 may enable foldable protective cover 2114 to stand in the second folding configuration, as shown in FIG. 21.

Third sector 2122 of foldable protective cover 2114 may include an image sensor 2170 mounted on a gimbal 2172. Gimbal 2172 may be configured to enable the user of integrated computational interface device 2100 to change an angle of image sensor 2170 without moving foldable protective cover 2114.

In some embodiments, the integrated computational interface device may further include a holder in the non-key region of the housing (or in the non-input region of the housing). As previously described, in some embodiments, the holder may be a depression that extends below a plane of at least a portion of the housing or may rest entirely above the surface of the housing. In some embodiments, the holder may include one or more structural features to selectively engage with one or more items such as writing instruments, wires or cables, dongles, papers (i.e., to permit the holder to function like a copy stand), goggles, glasses, or other items that the user may wish to easily access or store.

In some embodiments, the holder may be configured for selective engagement with and disengagement from a wearable extended reality appliance. As previously described, in some embodiments and shown for example in FIGS. 6-12B, structural features of the holder may be configured to selectively engage with the wearable extended reality appliance such that the wearable extended reality appliance may be snap-fit, force-fit, or pressure-fit into at least a portion of the holder.

In some embodiments, when the wearable extended reality appliance is selectively engaged with the housing via the holder, the wearable extended reality appliance may be connected to and may be transportable with the keyboard (or with the input device). As previously described, in some embodiments, when the wearable extended reality appliance is selectively engaged with the housing via the holder, the wearable extended reality appliance may be transportable with the housing by being securely connected to the housing via the holder.

In some embodiments, the first folding configuration may be associated with two encasing modes. In some embodiments, in a first encasing mode, when the wearable extended reality appliance is engaged with the housing via the holder, the protective cover may overlie the wearable extended reality appliance and the keyboard. As previously described, in some embodiments in the first encasing mode, the protective cover may provide bump, shock, or impact protection to the keyboard and/or the housing and/or the wearable extended reality appliance when the wearable extended reality appliance is selectively engaged with the holder. In some embodiments, when in the first encasing mode, the protective cover may form a three-dimensional shape extending above an upper surface of the housing to form a compartment for selectively enclosing the wearable extended reality appliance. In some embodiments, in a first encasing mode, when the wearable extended reality appliance is engaged with the housing via the holder, the protective cover may overlie the wearable extended reality appliance and the input device.

In some embodiments, in the first encasing mode of the first folding configuration, a distance of the at least one image sensor from the keyboard may be between 2 centimeters (cm) and 5 cm. In some embodiments, the three-dimensional shape formed by the protective cover in the first folding configuration may elevate the at least one image sensor above the keyboard. In some embodiments, the at least one image sensor may be closer to the keyboard than 2 cm. In some embodiments, the at least one image sensor may be farther from the keyboard than 5 cm. In some embodiments, in the first encasing mode of the first folding configuration, a distance of the at least one image sensor from the input device may be between 2 cm and 5 cm.

In some embodiments, in a second encasing mode, when the wearable extended reality appliance is disengaged from the housing, the protective cover may overlie the keyboard (or the input device). In some embodiments, in the second encasing mode, the protective cover may lie substantially flat across an upper surface of the housing such that the protective cover is proximate to the keyboard (or the input device). In some embodiments, the flexible sections of the protective cover may enable the protective cover to form both the first encasing mode and the second encasing mode. In some embodiments, in the second encasing mode of the first folding configuration the distance of the at least one image sensor from the keyboard may be between 1 millimeter (mm) and 1 cm. In some embodiments, when the protective cover is in the second encasing mode, it may lie substantially flat across the upper surface of the housing such that the at least one image sensor may be located close to the keyboard. In some embodiments, the at least one image sensor may be closer to the keyboard than 1 mm. In some embodiments, the at least one image sensor may be farther from the keyboard than 1 cm. In some embodiments, in the second encasing mode of the first folding configuration, the distance of the at least one image sensor from the input device may be between 1 mm and 1 cm.

In some embodiments, in the second folding configuration, the distance of the at least one image sensor from the keyboard may be between 4 cm and 8 cm. As previously described, when the protective cover is in the second folding configuration, the at least one image sensor may be positioned to face the user of the integrated computational interface device. In some embodiments, the at least one image sensor may be closer to the keyboard than 4 cm. In some embodiments, the at least one image sensor may be farther from the keyboard than 8 cm. In some embodiments, in the second folding configuration, the distance of the at least one image sensor from the input device may be between 4 cm and 8 cm.

In some embodiments, the protective cover may include a notch configured to hold the wearable extended reality appliance in the first folding configuration when the wearable extended reality appliance is selectively engaged with the housing. In some embodiments, the notch may be an indentation in the first external layer of the protective cover that faces the housing when the protective cover is in the first folding configuration. In some embodiments, the at least one image sensor may be positioned in the notch. In some embodiments, the notch may be located on a protrusion from the surface of the protective cover that faces the housing when the protective cover is in the first folding configuration. For example, the protrusion may be an image sensor housing as previously described and the notch may include one or more indentations in the image sensor housing.

Figure 22:
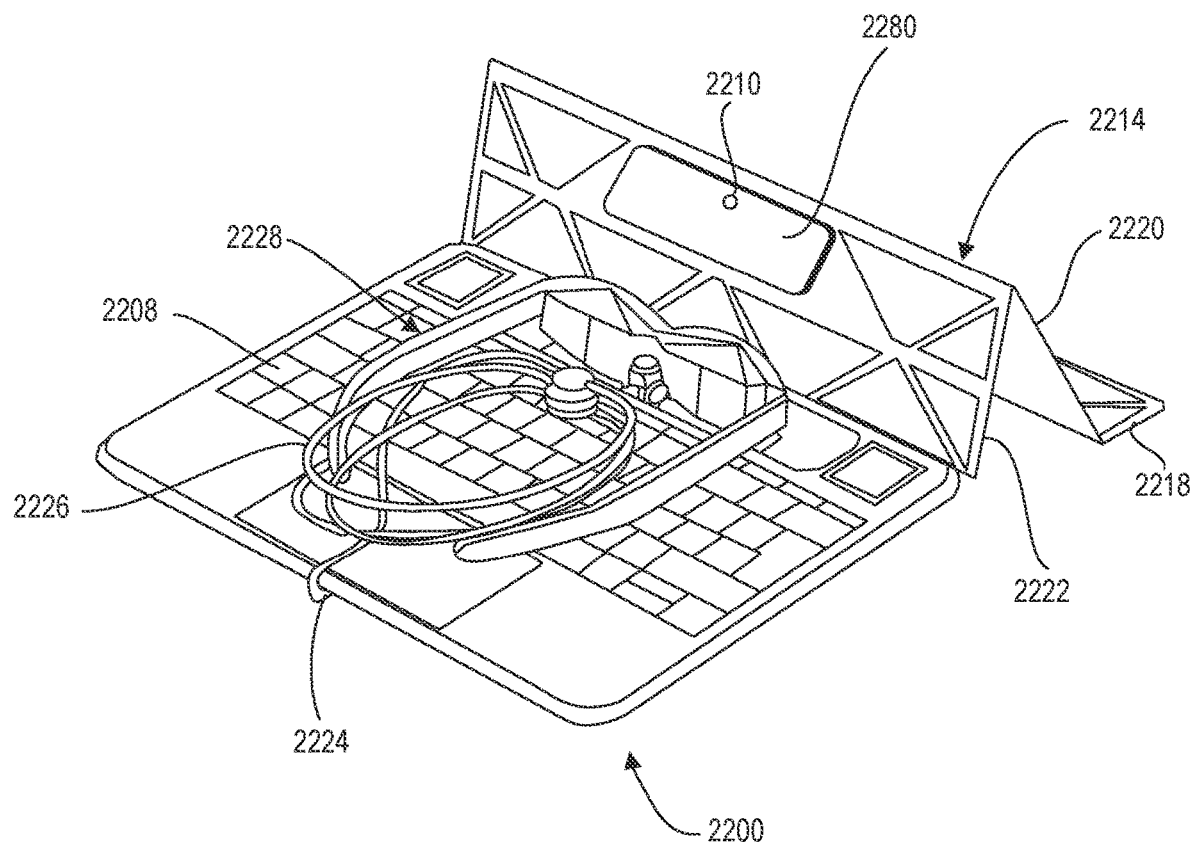
FIG. 22 is a front perspective view of a seventh exemplary embodiment of an integrated computational interface device.

FIG. 22 is a front perspective view of a seventh exemplary embodiment of an integrated computational interface device 2200. FIG. 22 is an exemplary representation of just one embodiment, and it is to be understood that some illustrated elements might be omitted and others added within the scope of this disclosure. For ease of description, elements shown in FIG. 22 that are similar to elements shown in FIG. 15 are referenced with similar reference numerals. For example, integrated computational interface device 2200 may include keyboard 2208 similar to keyboard 1508, wire port 2224 similar to wire port 1524, and so forth. In one example, computational interface device 2200 may be linked with wire 2226 similar to wire 1526, and so forth. In some examples, computational interface device 2200 may include elements of computational interface devices 1500, 1600, 1700, 1800, 2000, and 2100 that are not described herein in relation to computational interface device 2200 and/or that are not shown in FIG. 22.

Integrated computational interface device 2200 may include a foldable protective cover 2214. Foldable protective cover 2214 may include multiple sectors, such as a first sector 2218, a second sector 2220, and a third sector 2222. Sectors 2218, 2220, and 2222 may enable foldable protective cover 2214 to stand in the second folding configuration, as shown in FIG. 22.

Third sector 2222 of foldable protective cover 2214 may include a notch 2280 configured to accommodate an upper portion of wearable extended reality appliance 2228 when foldable protective cover 2214 is in the first folding configuration such that wearable extended reality appliance 2228 fits at least partially within notch 2280. Notch 2280 may be three-dimensional in that it may extend into sector

2222. While notch 2280 is shown in FIG. 22 as having a rectangular shape, notch 2280 may be in different shapes to accommodate at least a portion of wearable extended reality appliance 2228 when foldable protective cover 2214 is in the first folding configuration.

Image sensor 2210 may be positioned in notch 2280 such that when foldable protective cover 2214 is in the second folding configuration, an optical axis of image sensor 2210 may generally face a user of integrated computational interface device 2200. In some embodiments, image sensor 2210 may be flush with a surface of notch 2280 such that image sensor 2210 does not extend beyond notch 2280 and when foldable protective cover 2214 is in the first folding configuration, image sensor 2210 does not contact wearable extended reality appliance 2228.

In some embodiments, a case for an integrated computational interface device may include at least one image sensor and a foldable protective cover incorporating the at least one image sensor, wherein the protective cover may be configured to be manipulated into a plurality of folding configurations. The at least one image sensor and the foldable protective cover were previously described in greater detail. These elements are configured and function in a similar manner as that previously described.

In some embodiments, the case may be connected to the integrated computational interface device. As an example, the case may be connected to the integrated computational interface device by one or more magnets. In some embodiments, one or more magnets may be provided in the case and the integrated computational interface device may include a ferromagnetic material to enable interaction with the magnets such that the case may be connected to the integrated computational interface device. As another example, the integrated computational interface device may include a ferromagnetic material and the case may include one or more magnets to connect the integrated computational interface device and the case.

As another example, the case may be attached or coupled to the integrated computational interface device by a hinge mechanism. Any type of hinge mechanism known in the art may be used. Although not a requirement, in some embodiments, the hinge mechanism may be made of a flexible material, with a first edge of the flexible material fixedly attached to the case and a second edge, opposite the first edge, fixedly attached to the integrated computational interface device. In some embodiments, the hinge mechanism may include one or more knuckles (e.g., rigid or semi-rigid loop structures) connected to and extending away from the case, one or more knuckles connected to and extending away from the integrated computational interface device, and a pin inserted through all of the knuckles to create the hinge, such that at least the protective cover may rotate or pivot around the pin. When assembled together prior to inserting the pin, the knuckles of the case and the knuckles of the integrated computational interface device may be aligned or interleaved.

In some embodiments, the integrated computational interface device may be insertable into at least a portion of the case. For example, the case may include a lower portion that fits around a lower portion of a housing of the integrated computational interface device. In some embodiments, the lower portion of the case may be separated from the protective cover. In some embodiments, the lower portion of the case may be connected to the protective cover. In some embodiments, the lower portion of the case may be made of a rigid material, such as plastic. In some embodiments, the lower portion of the case may be made of a flexible material, such as fabric, neoprene, or other elastomeric material that may stretch over the lower portion of the housing.

In some embodiments, in a first folding configuration, the protective cover is configured to encase a housing of the integrated computational interface device having a key region and a non-key region. The housing, the key region, the non-key region, and the first folding configuration were previously described in connection with other embodiments. These elements are configured and function in a similar manner as that previously described. In some embodiments, in a first folding configuration, the protective cover is configured to encase a housing of the integrated computational interface device having an input region and a non-input region.

In some embodiments, in a second folding configuration, the protective cover is configured to stand in a manner that causes an optical axis of the at least one image sensor to generally face a user of the integrated computational interface device while the user types on a keyboard associated with the key-region. The configuration of the protective cover in the second folding configuration and the optical axis of the at least one image sensor were previously described in connection with other embodiments. These elements are configured and function in a similar manner as that previously described. In some embodiments, in a second folding configuration, the protective cover is configured to stand in a manner that causes an optical axis of the at least one image sensor to generally face a user of the integrated computational interface device while the user physically interacts with an input device associated with the input region.

Some disclosed embodiments may involve changing display of virtual content based on temperature. Virtual content may include any information as defined elsewhere in this disclosure. Changing display of virtual content may refer to modifying or altering in some way one or more characteristics associated with displayed virtual content. Such characteristics may include color scheme, opacity, intensity, brightness, frame rate, display size, virtual object type, or any other parameters that may affect how a user views the virtual content presented to the user.

In some embodiments, the virtual content may include text inputted by a keyboard connectable to the wearable extended reality appliance. A keyboard may include a panel of keys that may allow a user to input one or more alphanumeric characters that may include words, phrases, sentences, paragraphs, or other textual matter. In addition to inputting text, the keyboard may include one or more keys that may allow the user to input numbers, symbols, or keyboard strokes configured by the user. This content may also be displayed as a virtual object that is part of displayed virtual content.

Virtual content may include one or more virtual objects. For example, virtual content may be a document or a video. As part of the presented virtual content, a virtual object associated with the virtual object may be a search bar, task bar, brightness adjustment bar or any other element. In one example illustrated in FIG. 1, virtual content may include virtual display 112 and/or virtual widgets 114A, 114B, 114C, 114D, and 114E.

The keyboard may be connected to the wearable extended reality appliance via a wire 108 (see FIG. 1) or wirelessly through Bluetooth or other wireless protocol. When the wearable extended reality appliance user enters text or another command via the keyboard, the text may show up via a virtual screen 112 (see FIG. 1) that is displayed close to the user. The text may also show up via a physical screen or other physical object depending on the wearable extended reality appliance user's preference and the user's environment. By way of example, FIG. 1 illustrates a keyboard 104 that may be connected to a wearable extended reality appliance 110.

Some disclosed embodiments may include displaying virtual content via a wearable extended reality appliance, wherein during the displaying of the virtual content, heat is generated by at least one component of the wearable extended reality appliance. A virtual reality appliance, as described elsewhere in this disclosure includes electronics and optics for displaying augmented content to a wearer of the appliance. For example, such an appliance may include a frame, at least one lens, one or more heat-emitting light sources configured to project images on the at least one lens, one or more processing devices, one or more wireless communication devices, and/or other devices (e.g., resistors, inductors, capacitors, diodes, semiconductor devices, or other circuitry) that may be necessary for the operation of the wearable extended reality appliance. At least some of the components of the wearable extended reality appliance may generate heat. For example, components like light emitting sources, processing devices, wireless communication devices, resistors, inductors, capacitors, diodes, and/or other circuitry may generate heat during operation of the wearable extended reality appliance. Because of such heat generation, when the wearable extended reality appliance is used continuously, there may be a risk of overheating of one or more components of the wearable extended reality appliance, or a risk of reaching a maximal allowed working temperature of the wearable extended reality appliance, for example, due to regulatory requirements, to avoid risk of harm to the user, and/or to preserve the life of the components. One possible solution may include turning off one or more components of the wearable extended reality appliance to reduce the amount of heat generated, thereby reducing the risk of overheating or reaching the maximal allowed working temperature of the wearable extended reality appliance. However, if the light sources in the wearable extended reality appliance were to be turned-off to permit cool-down, the wearable extended reality appliance would lose functionality. In one example, a processing device included in the wearable extended reality appliance may be configured to render virtual content for presentation, and if this processing device were to be turned-off to permit cool-down, the wearable extended reality appliance would lose functionality. In another example, a communication device included in the wearable extended reality appliance may be configured to receive virtual content for presentation, and if the communication device were to be turned-off to permit cool-down, the wearable extended reality appliance would lose functionality. In yet another example, a memory device included in the wearable extended reality appliance may be configured to store and provide virtual content for presentation, and if the memory device were to be turned-off to permit cool-down, the wearable extended reality appliance would lose functionality. Accordingly, other methods of reducing the risk of overheating or reaching the maximal allowed working temperature of the wearable extended reality appliance without loss of functionality are disclosed herein.

In some embodiments, the heat may be generated (at least partly) by a plurality of heat-emitting light sources included in the wearable extended reality appliance, and the operations performed by the at least one processor further include modulating a set of working parameters of at least one of the heat-emitting light sources. As discussed above, a wearable extended reality appliance consistent with embodiments of the present disclosure may include one or more light sources. Such light sources may be powered via one or more power sources (e.g., a battery) that may supply electrical energy in the form of a voltage and/or current. Part of the electrical energy may be converted into light by the light sources. Some or all of the electrical energy supplied to the light sources may be dissipated as heat. Thus, the amount of heat dissipated by the light source may depend on one or more parameters such as current, voltage, power, and/or duration of time for which electrical power is supplied to the light source. Accordingly, the amount of heat dissipated by the light source may be reduced by modulating one or more of these parameters (e.g., voltage, current, duration of time,) associated with the electrical energy supplied to the light source. Modulating the one or more parameters may involve adjusting some or all parameters. In some embodiments, modulating the one or more parameters may involve reducing values of all the parameters. In some embodiments, modulating the one or more parameters may involve reducing values of some parameters while maintaining the values of the other parameters or increasing the values of the other parameters. For example, the amount of heat dissipated by the light source may be reduced by reducing a total amount of electrical power supplied to the light source. As another example, the amount of heat dissipated by the light source may be reduced by maintaining the amount of electrical power being supplied to the light source while reducing a duration for which the electrical power is supplied to the light source. By way of another example, the amount of heat dissipated by the light source may be reduced by reducing some or all of voltage, current, or electrical power being supplied to one or more of the heat-emitting light sources. In another example, the amount of heat dissipated by the light source may be reduced by pulsing the voltage, current, or electrical power being supplied to one or more of the heat-emitting light sources. In this example, the voltage, current, or power supplied to the heat-emitting light sources may be turned on or off for a period of time as configured by the wearable extended reality appliance user. In some examples, the set of display settings of at least one of the heat-emitting light sources may include at least one of presentation resolution, frame rate, brightness, opacity, display size, or a color scheme. In one example, the presentation resolution may be reduced to reduce the heat generated by the plurality of heat-emitting light sources. In another example, the presentation frame rate may be reduced to reduce the heat generated by the plurality of heat-emitting light sources. In yet another example, the brightness may be reduced to reduce the heat generated by the plurality of heat-emitting light sources. In an additional example, the opacity may be reduced to reduce the heat generated by the plurality of heat-emitting light sources. In yet another example, the display size may be reduced to reduce the heat generated by the plurality of heat-emitting light sources. In an additional example, a color scheme of a presented virtual content may be changed to a favorable color scheme to reduce the heat generated by the plurality of heat-emitting light sources.

In some embodiments, heat may be generated by at least one processing device included in the wearable extended reality appliance. One or more processors may be included in the wearable extended reality appliance, for example to render virtual content for presentation (for example, from a model, from a three-dimensional model, etc.), to control data communication, to analyze input captured using one or more sensors included in the wearable extended reality appliance (such as images and/or videos captured using one or more image sensors included in the wearable extended reality appliance, motion data captured using one or more motion sensors, positioning data captured using one or more positioning sensors), to interpret various inputs (e.g., gestures, textual inputs, and/or audio inputs) to display or share virtual content, or for any other purpose in furtherance of the functionality of the appliance. A processor may include numerous (e.g., millions or billions of) microscopic transistors, which may be used to amplify or switch electrical signals and power. When performing certain commands, such as displaying virtual content, these transistors may either enable electrical signals to pass through them or may block the signals. When a transistor resists the flow of electricity, heat is generated within the processing device. The more complicated the command, the more electricity flows through the processor, more transistors may be used to perform the command, and as a result more heat may be generated. For example, less heat may be generated by the processing device when a document with only text is to be displayed, and more heat may be generated when a video is to be displayed or when a three-dimensional model is rendered for presentation.

Some disclosed embodiments may include modulating a set of working parameters of the at least one processing device, the set of working parameters of the at least one processing device including at least one of voltage, current, power, clock speed, or number of active cores associated with the at least one processing device. Accordingly, the amount of heat generated by the processing device may be reduced by reducing one or more of the voltage or current associated with the electrical energy supplied to the processing device, by reducing a total amount of electrical power supplied to the processing device, by reducing a duration for which the voltage, current, or electrical power is supplied to the processing device, by reducing a clock speed, or by limiting a number of active cores in the processing device. In one example, the rendering resolution and/or frame rate may be reduced to reduce the burden on the processing device and thereby reduce the heat generated by the processing device. In another example, the frequency of analysis of data captured using one or more sensors included in the wearable extended reality appliance may be reduced, to thereby reduce the heat generated by the processing device.

Clock speed of a processing device may refer to a number of pulses per second generated by an oscillator that sets the timing at which various transistors in the processing device may be switched on or off. Clock speed may be generally used as an indicator of a processor's speed. Reducing the clock speed may help reduce the rate at which one or more transistors in the processing device are switched on/off, which in turn may reduce the amount of heat generated by the processing device.

Active cores in a processing device may refer to the number of processing units within a processor. Each core may include numerous transistors which, as described above, generate heat based on how complicated a particular task is. The more cores a processor has, the more tasks the processor is capable of completing simultaneously. However, one or more of these cores may be temporarily deactivated. Temporarily deactivating a core results in little to no heat being generated by that core, which in turn may help reduce the amount of heat being generated as a whole by the processing device.

In some embodiments, heat is generated by at least one wireless communication device included in the wearable extended reality appliance. As discussed elsewhere in this disclosure the wearable extended reality appliance may include a wireless communication device. In order to communicate with other devices in a network, the wireless communication device may transform incoming electrical energy into radiofrequency (RF) energy. The wireless communication device may emit the RF energy. The wireless communication device may include a transmitter, an encoder, and a receiver, which include electronic components such as transistors and resistors. Operation of some or all of these wireless communication device components may dissipate some of the electrical energy and/or the RF energy as heat.

In other embodiments, when heat is generated by at least one wireless communication device included in the wearable extended reality appliance, processor operations may further include modulating a set of working parameters of the at least one wireless communication device, the set of working parameters of the wireless communication device including at least one of signal strength, bandwidth or amount of transmitted data.

Signal strength may refer to the transmitter power output as received by a reference antenna at a distance from the transmitting antenna. Here, the transmitting antenna may be a first wearable extended reality appliance sharing content, and the receiving antenna would be a second wearable extended reality appliance receiving the shared content. Bandwidth may refer to the maximum capacity of a wireless communications link to transmit data over a network connection in a given amount of time. In the context of some embodiments, bandwidth may refer to the amount of data that may be transmitted by multiple wearable extended reality appliances in a single network. The amount of transmitted data may refer to the amount of data that a single wearable extended reality appliance may present or share in the form of virtual content. Modulating these parameters may involve reducing the signal strength, bandwidth, or amount of transmitted data so as to reduce the amount of power used to transform electrical energy into RF energy. Because the amount of power used to transform the electrical energy is reduced, the amount of heat generated by the wireless communication device may also be also reduced.

Figure 23:
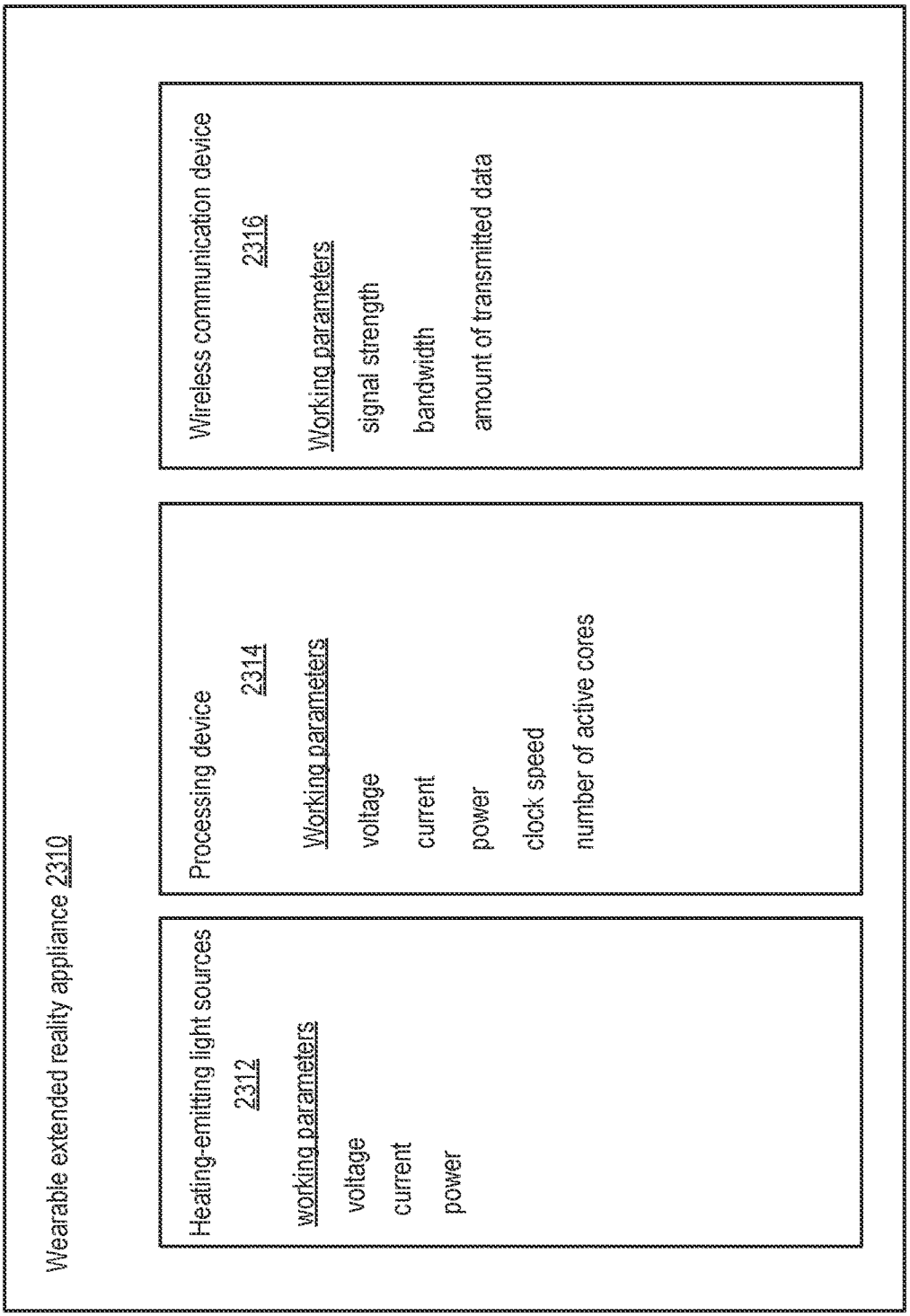
FIG. 23 is a block diagram illustrating exemplary working parameters portions of a wearable extended reality appliance, consistent with some disclosed embodiments.

By way of example, FIG. 23 is a block diagram illustrating a wearable extended reality appliance 2310 that may include one or more heat-emitting light sources 2312, one or more processing devices 2314, one or more wireless communication devices 2316, and/or other electrical and/or mechanical devices as described above. As described herein, heat-emitting light source 2312 may have working parameters including but not limited to voltage, current, and/or power. The processing device 2314 may have working parameters including but not limited to voltage, current, power, clock speed, and/or number of active cores. The wireless communication device 2316 may have working parameters including but not limited to signal strength, bandwidth, and/or the amount of transmitted data.

Some disclosed embodiments may include receiving information indicative of a temperature associated with the wearable extended reality appliance. Information indicative of a temperature may refer to a numerical value that represents a temperature, or any other temperature indicator. In some embodiments, the numerical value may be a temperature value, for example, as measured in ° C., ° F., or in any other temperature units. Alternatively, the information may be a measurement of a physical characteristic that indicates a change in temperature. For example, the information may include a value of a parameter such as voltage, current, resistance, power, or any other physical characteristic that changes with temperature and is therefore representative of a temperature. In some embodiments, the wearable extended reality appliance frame may include a temperature sensor capable of determining a value of a temperature associated with the wearable extended reality appliance. The temperature sensor associated with the wearable extended reality appliance may be one of a variety of temperature sensors. For example, the temperature sensor may be a thermocouple, a resistance temperature detector (RTD), a thermistor, or a semiconductor based integrated circuit.

Some disclosed embodiments may include determining a need to change display settings of the virtual content based on the received information. As discussed above, one or more of the wearable extended reality appliance components such as light source, processing device, and wireless communication device, may generate heat during use. When the wearable extended reality appliance becomes too hot, it may not operate as efficiently. Moreover, excessive heating of the wearable extended reality appliance may reduce the life of the appliance. Additionally, overheating may cause one or more components of the wearable extended reality appliance to fail and/or reaching the maximal allowed working temperature of the wearable extended reality appliance may injure the wearable extended reality appliance user. Other embodiments may include determining a need to change display settings of the virtual content not based on the received information indicative of the temperature associated with the wearable extended reality appliance, for example, based on user input, based on environmental situation, based on time, and/or any other temperature information not associated with the wearable extended reality appliance.

Each component has working parameters, as described above, that may be modulated to reduce an amount of heat being generated by the wearable extended reality appliance. Additionally or alternatively, modifying one or more virtual content display settings may also reduce the temperature associated with the wearable extended reality appliance. Modifying the one or more virtual content display settings may cause one or more working parameters of the light source, the processor, and/or wireless communication device to be modulated, thereby reducing an amount of heat generated by the wearable extended reality appliance, which in turn may reduce the associated temperature. For example, reducing a brightness of displayed virtual content may involve reducing one or more of a current, voltage, and/or a power that is delivered to the heat-emitting light source, thus reducing the temperature of that component. Other settings that may be modified to reduce the temperature may include, for example, brightness, opacity, display size, resolution, rendering details, frame rate, or a color scheme being used for the display. Modifying one or more of these parameters may involve reducing one or more of a current, a voltage, and/or a power that is delivered to the heat-emitting light source, thus reducing the temperature of that component. Such modifications may be based on either the content being displayed (e.g., a video or document) and/or the state of the component (i.e., the heat-emitting light source is overheating).

Some disclosed embodiments may include changing display settings of the virtual content when the temperature associated with the wearable extended reality appliance reaches a threshold associated with the extended reality. In some disclosed embodiments may include changing display settings of the virtual content before the temperature associated with the wearable extended reality appliance reaches a threshold associated with the extended reality appliance. Display settings that may be changed include those associated with heat generation, such as brightness, and displayed frames per second, or any of the settings discussed above. The need to change display settings of the virtual content may be determined based on a threshold temperature. The threshold temperature may refer to a maximum temperature above which a particular component may be expected to operate inefficiently or fail. Additionally or alternatively, the threshold temperature may refer to a temperature at or above which a reliability or working life of a component may be reduced by a predetermined amount. For example, the threshold temperature may be associated with a reduction in working life of a component by 25%, 50%, 75% or any other amount. Additionally or alternatively, the threshold temperature may be set by a manufacturer of the wearable extended reality appliance, by a regulatory entity, and/or any organization that would set a specific threshold temperature for a specific purpose. For example, some organizations may have different presentation needs compared to other organizations, and may set a maximum threshold temperature accordingly. Additionally or alternatively, the threshold temperature may be associated with a safety issue, such as a safety standard or a safety range of temperatures for head mounted devices. In one example, a processor associated with some disclosed embodiments may determine that one or more display settings must be changed when a temperature associated with the wearable extended reality appliance is at or above the threshold temperature. In other examples, a current temperature associated with the wearable extended reality appliance may indicate a likelihood that the wearable extended reality appliance will reach the threshold associated with the wearable extended reality appliance, for example, if a current working load continues for a selected time period and/or if a typical working load will take place for a selected time period, and in response the display settings of the virtual content may be changed before the temperature associated with the wearable extended reality appliance reaches the threshold associated with the wearable extended reality appliance. In one example, an ongoing trajectory of the temperature associated with the wearable extended reality appliance over time may be analyzed to determine the likelihood that the wearable extended reality appliance will reach the threshold associated with the extended reality appliance, (e.g., if a current working load continues for a selected time period, and/or if a typical working load will take place for a selected time period) for example using an extrapolation algorithm, regression model, and/or any other data analysis algorithm.

In some embodiments, the threshold associated with the wearable extended reality appliance may be between 33 and 40 degrees Celsius. In other examples, the threshold associated with the wearable extended reality appliance may be below 33 degrees Celsius or above 40 degrees Celsius. In some examples, a value of the temperature threshold may be configured for different types of users. For example, there may be a different temperature threshold for a child as opposed to an appliance configured for an adult.

In some embodiments, the threshold temperature may be configured based on preferences of a user of the wearable extended reality appliance. The temperature threshold for different users may be configured based on the skin sensitivity of a particular user. For example, a child or more elderly user may have more sensitive skin than a typical adult. As a result, a younger or elderly user may configure the temperature threshold to be relatively lower that the threshold temperature selected by a typical adult user. As another example, a user may prefer a higher temperature threshold when the ambient temperature is low as compared to when the ambient temperature is high. In another example, a user may prefer a lower temperature threshold in summer and a higher temperature threshold in winter.

Some disclosed embodiments may involve determining a value for the threshold based on a user profile associated with a user of the wearable extended reality appliance. A user profile may include one or more characteristics of a particular user. The user profile may be configured in a variety of ways, and the at least one processor may determine a threshold temperature accordingly. For example, a user may input data such as age, gender, preferred use of the appliance, how often he or she uses the appliance, and/or whether the user prefers performance (i.e., operating at higher temperatures) or comfort (i.e., typically operating at cooler temperatures). Based on the inputted data, and/or data received from other wearable extended reality appliance users, the processor may determine the appropriate temperature threshold. In one example, based on a user profile of a younger user who prefers peak performance and uses the appliance often, the threshold temperature may be closer to 40 degrees Celsius. In another example, based on a user profile of an older user who prefers comfort and only uses the appliance occasionally, the threshold temperature may be closer to 33 degrees Celsius. The user profile may be updated by the user at any time. In some other examples, a value for the threshold may not be based on a user profile associated with a user of the wearable extended reality.

Some disclosed embodiments may include determining a display settings change for the virtual content regardless of a user of the wearable extended reality appliance and/or of a user profile associated with the user of the wearable extended reality appliance. For example, the change may be based on the current displayed content, on manufacturer presetting, on configuration files associated with the wearable extended reality appliance (rather than the user), regulatory requirements, and/or any other outside factors.

Some disclosed embodiments may include determining a display settings change for the virtual content based on a user profile associated with a user of the wearable extended reality appliance. While the above embodiment involves determining a threshold temperature based on a user profile, this embodiment involves changing the display settings themselves based on the user profile. In this embodiment, different users may have different temperature threshold preferences and/or different virtual content display preferences. The display setting preferences may refer to a user's default settings regarding color scheme, brightness, intensity, display size, or any other display setting. In this embodiment, the user profile may state that a user prefers to modify brightness in lieu of color scheme. Display setting preferences are related to the threshold temperature as included in a user's profile. For example, a user that may prefer a lower threshold temperature may decrease a brightness of the displayed virtual content as compared to a user who may prefer a higher threshold temperature, who would not change those display settings immediately.

By way of example, a wearable extended reality appliance may be configured, based on a user profile, to have a threshold temperature of 35 degrees Celsius. Thus, one or more display settings associated with the virtual content may be modified before a temperature of one or more components of the wearable extended reality appliance reaches the threshold temperature (e.g., 35-degree Celsius). Additionally, the at least one processor, based on the user profile, may modify one or more display settings, such as brightness or intensity, when a temperature of one or more components, such as the heat-emitting light source, at least one processor, or wireless communication device of the wearable extended reality appliance reaches 34 degrees Celsius.

Temperature information associated with the wearable extended reality appliance may be updated over time. The longer the wearable extended reality appliance is used, the more temperature information will be stored. The processor may receive this information either continuously or periodically. For example, there may be times of the day where the appliance is used more frequently than other times of the day. The non-transitory computer readable medium may store this data, which may be comprised of working parameter data (e.g., voltage, current, power, clock speed, and others), temperature data, time data, display settings, and the type of virtual content, i.e., a document or a video, that is displayed at certain times of the day. The processor, based on the compiled data, may predict how the wearable extended reality appliance may be used based on the time of day, and adjust the display settings accordingly. In some embodiments, the at least one processor may determine a need to change display settings before the threshold temperature is reached.

Other embodiments may include predicting peak use times based on a machine learning model or other similar algorithm. In this embodiment, test data, such as stored temperature data, feeds into the algorithm so that the model may predict when the wearable appliance will be used.

In another embodiment, the wearable extended reality appliance may predict what type of content is to be displayed at which parts of the day based on stored temperature data. For example, displaying video content may require more of a specific combination of working parameters, such as power, compared to displaying a document. In one example, displaying a video would thus cause a heat-emitting light source to generate more heat than displaying a document, therefore reaching the threshold temperature more quickly. Based on the stored temperature data as part of the non-transitory computer readable medium, the wearable extended reality appliance may predict the changes in the heat emitted from an appliance component, and preemptively adjust display settings. For example, based on the user's history, the system may predict that a video is displayed for at least 30 minutes at 8 PM and may adjust display settings accordingly.

In some embodiments, a degree of change to the display settings of the virtual content may be based on the temperature indicated by the received information. In other examples, the degree of change to the display settings of the virtual content may not be based on the temperature indicated by the received information (for example, may always be the same degree of change, may be based on a user, may be based on contextual information, may be based on the virtual content displayed, and/or any other change that is not based on received temperature information, i.e., may be based on environmental factors). Degree of change to a display setting may refer to an amount by which a particular display setting is modified. As described above, temperature information may be received by a processor associated with the wearable extended reality appliance. In some embodiments, when the received information indicates that the temperature is slightly above (e.g., a few degrees such as 1 to 5 degrees Celsius) the threshold temperature, one or more display settings may be modified accordingly. A slight modification may involve a 1% to 5% change in a display setting. For example, if the temperature threshold of a component of a user's wearable extended reality appliance is 35 degrees Celsius and the temperature sensor receives information that the component is 36 degrees Celsius, the degree of change in the display settings may in the range of 1% to 5%, depending on how the user configures the appliance. For example, the brightness of displayed virtual content may be reduced from 1% to 5%.

In some embodiments, when the temperature sensor detects that the wearable extended reality appliance temperature is significantly above the threshold temperature (e.g., greater than 5 degrees Celsius), the display settings may be more aggressively modified and/or multiple virtual elements may be modified. A more aggressive degree of change may involve modification up to a 11% to 25% or more change in display settings and may affect multiple virtual objects as part of displayed virtual content. For example, if the temperature threshold of a component of a user's wearable extended reality appliance is 35 degrees Celsius and the temperature sensor receives information that the component is 40 degrees Celsius, the display settings may be modified by 11% to 25% or more. In this example, a more aggressive modification may involve one or more of reducing the brightness of the displayed content from 11% to 25%, changing the color scheme of a portion of the displayed virtual content, and/or reducing the frame rate of displayed video content.

While some embodiments involve reducing a level of a particular display setting, such as a brightness level, different display settings themselves may produce more heat than others, and thus may be result in a greater heat reduction when modified. For example, adjusting the intensity of virtual content may have more of a heat reduction effect than changing the color scheme of the virtual content. Thus, in some embodiments, a second extended reality display parameter may be selected based on the first signal regarding a wearable extended reality appliance component's temperature. A display parameter may be a component of display settings. For example, displayed virtual content may involve multiple display settings, such as brightness, intensity, and/or frame rate. A display parameter may be brightness, or intensity, or frame rate, which together comprise display settings. In this embodiment, the at least one processor may select a more aggressive at least one extended reality display parameter for the first signal indicative of a hotter temperature, and a less aggressive at least one extended reality display parameter for a first signal indicative of a cooler temperature. In this context, the more aggressive the display parameter, the greater impact it may have on the user experience.

In some embodiments, changing the display settings of the virtual content may be based on data indicative of temperature trajectory. The temperature trajectory may be determined based on the stored temperature of the extended reality appliance. The data used to determine the temperature trajectory may be measured in a variety of different ways. In some embodiments, the temperature data may be continuously or periodically supplied from the temperature sensor and may be stored in a storage location associated with the wearable extended reality appliance. For example, the temperature data may be provided by the temperature sensor every second, every minute, every 5 minutes, every 10 minutes, or at any other desired frequency. In another example, temperature data may be provided by the temperature sensor based on incremental temperature increases, as in a stepwise function. These incremental temperature increases may be configured by the user. In this example, every time a wearable extended reality appliance component reaches a certain temperature, such as increasing from 33 degrees Celsius to 35 degrees Celsius, data may be stored in a storage location or storage device associated with the wearable extended reality appliance.

As described above, the temperature trajectory may be based on temperature information stored in the non-transitory computer readable medium over time. The temperature trajectory may be used to determine a time period during which the wearable extended reality appliance may experience peak usage. For example, a wearable extended reality appliance user may display video content at certain times of the day, thus generating more heat during those times of the day compared to other times of the day when video content is not displayed. Based on this usage data, a processor may preemptively adjust display settings at the times of day associated with peak usage when a temperature of the wearable extended reality appliance is expected to increase.

Some disclosed embodiments may include predicting a time when the wearable appliance may be inactive. This may occur by collecting data on how the appliance is historically used, and projecting how it will be used in a current for future situation. In addition to historical behavioral data, stored temperature data or a machine learning algorithm, described above, may be used to predict times where the appliance may become inactive. The processor as part of the wearable extended reality appliance may interpret such data to determine when the appliance is likely to become inactive.

In one example, the processor may analyze temperature variation over a period of time, such as a work day, to determine what times the temperature tends to be below a certain value. As stated above, the processor may employ a machine learning model or similar algorithm to perform this task. This value may typically be at or within one or two degrees Celsius of ambient temperature, because the wearable extended reality will be inactive and thus not generating heat. Additionally, the processor may determine periods of inactivity based on the power level over time. For example, periods of the day where little or no power is used may indicate that the wearable extended reality appliance is inactive. By contrast, periods of the day where the used power levels are high may indicate periods of peak use. In another example, the processor may determine periods of inactivity based on the battery life of the wearable extended reality appliance. For example, periods where the battery is depleted slowly may indicate periods of non-use, whereas periods where the battery is depleted quickly may indicate periods of peak use.

In another example, the wearable appliance may be inactive at the end of the working day, during a face-to-face meeting, or in any other scenario where the user is away from his or her workstation. The wearable extended reality appliance may predict these time periods of inactivity based on one or more of stored temperature information, stored power usage information, stored battery demand information, or stored information associated with any other working parameter of any of the components associated with the wearable extended reality appliance. Additionally, as discussed above, prior behavioral use data may be used as part of the prediction process.

Some disclosed embodiments may include changing the display settings of the virtual content when the heat generated by the wearable extended reality appliance exceeds a critical value and the predicted time exceeds a critical duration. A critical value may be a threshold amount of heat above which the temperature may exceed the threshold temperature configured by the user or the threshold temperature that determines reliability of or usable life of one more components. In one example, if the appliance is generating too much heat, such as when video content is being displayed at full brightness and intensity settings, the critical value may be reached more quickly. A critical duration may refer to the amount of time that virtual content may be displayed without any modification. In the above embodiments, critical duration may relate to the predicted duration or time of activity. Thus, when the amount of heat generated exceeds the critical value or the device is active during a predicted period of inactivity, the display settings need to be changed to prevent overheating or exceeding the threshold temperature. Indeed, when the wearable extended reality appliance is generating more heat, the critical duration may be short, and when the wearable extended reality appliance is generating less heat, the critical duration may be longer.

In the above embodiments, the at least one processor may predict the time that the wearable extended reality appliance will be inactive. If this predicted time is less than the critical duration as configured by the appliance user, i.e., the appliance is active for longer than the critical duration, the at least one processor may change the display settings in order to reduce the amount of heat generated by the wearable extended reality appliance component. If the processor does not change the display settings, the temperature of one or more components may exceed the associated threshold temperature. If the predicted time does not exceed the critical duration, however, no change in display settings is required.

Some disclosed embodiments may include maintaining current display settings when the heat generated by the wearable extended reality appliance exceeds a critical value and the predicted time is below a critical duration.

In some embodiments, display settings may not be adjusted even though excess heat is generated, given that a period of expected inactivity is imminent. For example, a wearable extended reality appliance user may be giving a presentation towards the end of a typical work day (based on the usage history). Even though the presentation would generate heat, the wearable extended reality appliance might not modify the display settings, expecting that the appliance will soon be inactive.

The at least one processor may also modify display settings based on how much battery is left in the wearable extended reality appliance. For example, presenting certain virtual content, such as a video, may require a certain amount of battery life in order to be presented without modifying any display settings. The wearable extended reality appliance may compare how much battery life is required for displaying certain content to how much battery life is left in the wearable extended reality appliance and may modify the display settings accordingly. In one example, if presenting the virtual content requires more battery life than is currently left in the appliance, the display settings may be modified.

Some disclosed embodiments may include, based on the determination that display settings need to be changed, changing the display settings of the virtual content to achieve a target temperature. For example, if the information received tends to establish that a threshold heat level will be exceeded, one or more processors might determine that display setting changes are needed.

The determined need may relate to a single display parameters or multiple display parameters, more than one of which may be modified at once. While displaying the content using the first at least one extended reality display parameter, a first signal related to one or more wearable extended reality appliance components, such as the heat-emitting light sources, processing device, or wireless communication device, may be received. This first signal may be used to determine a need to reduce the temperature of at least one wearable extended reality appliance component. In response to the need to reduce the temperature of the at least part of the wearable extended reality appliance, the content may be displayed via a wearable extended reality device using a second at least one extended reality display parameter. For example, brightness may be adjusted based on received temperature data.

In one example, two display parameters may be adjusted to reduce heat generation. The second extended reality display parameter, for example color scheme, may differ from the first extended reality display parameter, for example brightness, and the second at least one extended reality display parameter may be configured to reduce heat output of the wearable extended reality device.

In the context of some embodiments, a virtual element may refer to one or more portions or an entirety of one or more items displayed in the extended reality environment. For example, a virtual element may be a virtual object or part of a virtual object being displayed in the extended reality environment. By way of an example, when virtual content includes multiple documents, a virtual object may be one of the multiple documents. A virtual element may include the virtual object itself, e.g., the document, or it may include a portion of the virtual object, such as, the task bar, navigation pane, styles tab, or any other part of the document.

Modifying one or more of the display settings described above may reduce a temperature of the wearable extended reality appliance, and therefore bring the appliance closer to a target temperature. The target temperature may refer to a desired or preferred operating temperature of the wearable extended reality appliance. The preferred operating temperature may be configured as such to ensure peak performance, to prevent malfunctioning of the appliance, to improve reliability, to prolong the usable life of the appliance, and/or to be the most comfortable for the user.

In some embodiments, the target temperature may refer to the threshold temperature at which display settings are modified. The target temperature may be configured based on a user's preference and may differ based on the type of user. For example, the target temperature may be lower for a child, i.e., a more sensitive user, than for an adult.

For example, the wearable extended reality appliance may be displaying virtual content when a processor associated with the wearable extended reality appliance determines that a temperature of one or more components of the wearable extended reality appliance has reached a threshold temperature. In response, the processor my decrease a brightness of the content (i.e., a first extended reality display parameter). As stated above, display settings may comprise multiple extended reality display parameters. In some embodiments, one or more additional extended reality display parameters may be modified depending on the temperature of associated with the wearable extended reality appliance. For example, a color scheme or a frame rate of presented video may be modified in addition to the brightness of the presented content when the temperature of one or more components of the wearable extended reality appliance reaches or exceeds the threshold temperature.

Figure 24:
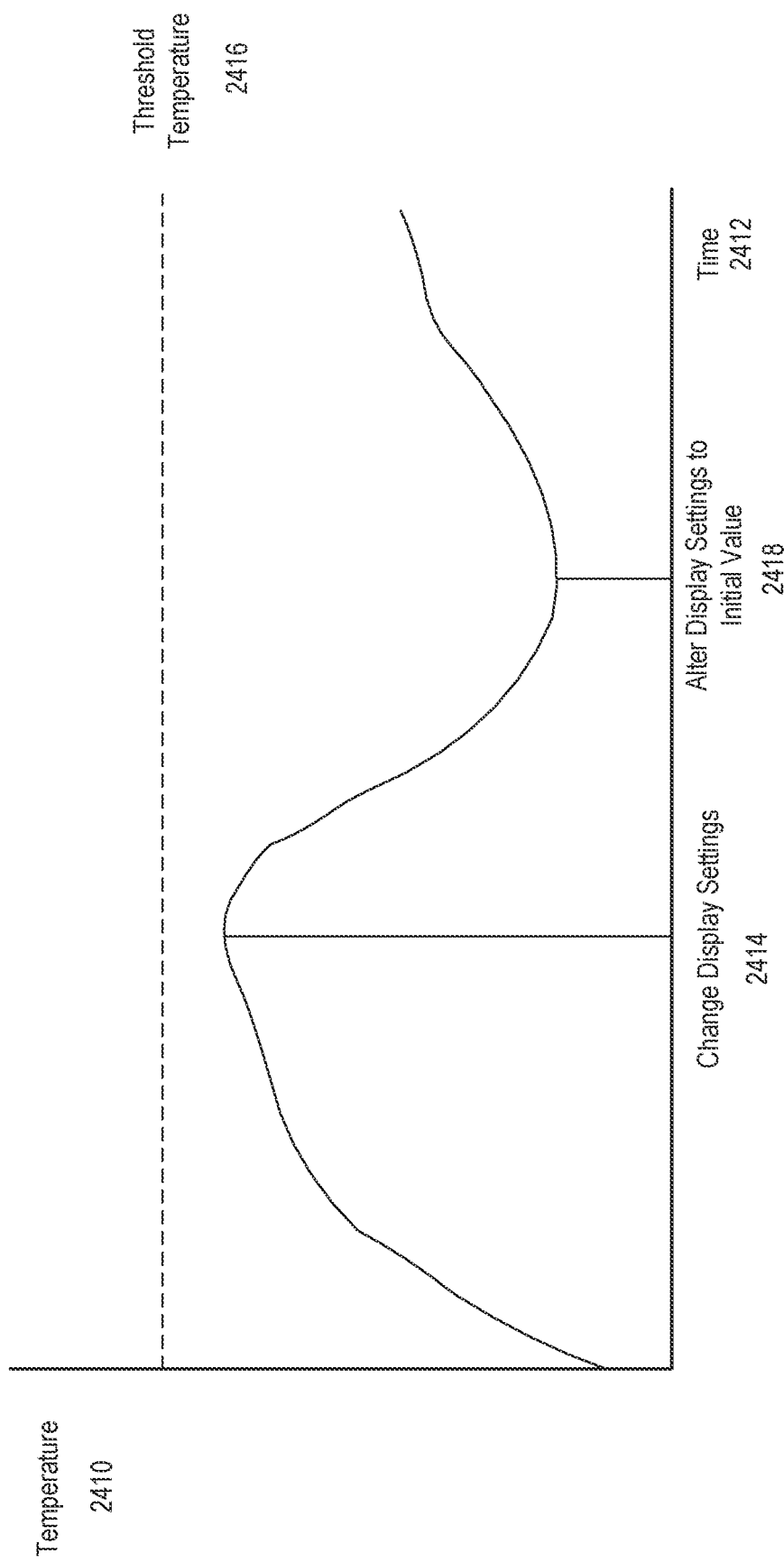
FIG. 24 is an exemplary chart illustrating variation of display settings based on the heat-emitting light source temperature over time, consistent with some disclosed embodiments.

By way of example, FIG. 24 illustrates how the temperature 2410 of the wearable extended reality appliance changes over time 2412. The appliance may be configured to change display settings 2414 to prevent the temperature from reaching a threshold temperature 2416. Further, after the temperature of the wearable extended reality appliance returns to acceptable limits, the appliance may be configured to alter display settings to the initial value 2418.

In some examples, the extended reality display parameter to be modified may be selected based on the virtual content. For example, certain visual display parameters may be modified when the virtual content includes video content, and other extended reality display parameters may be modified when the virtual content includes textual content. In this example, when video content is presented, the frame rate may be reduced, and when documents are presented, the brightness may be reduced.

Certain display parameters may require more active working parameters, i.e., may have higher power or voltage demands to display content, as compared to other display parameters. Such a more demanding extended reality display parameter may be brightness, intensity, display size, or frame rate. Other display parameters may not require as many working parameters and may include color.

Changing the display settings may occur in a many different ways. In some embodiments, changing the display settings of the virtual content may include modifying a color scheme of at least a portion of the virtual content. A color scheme may refer to a color palette of the virtual content, a color temperature, shades of one color or a subset of colors. The color scheme may be modified by changing one or more of the color palette, the color temperature, a number of available shades of a particular color, or changing the displayed colors to grayscale or black and white. Displaying virtual content in an original color scheme may use more processing power, and thus generate more heat, than displaying virtual content with a modified color scheme.

Virtual content may have a variety of different display parameters. In some embodiments, the at least one processor may be configured to modify a color scheme of some or all portions of virtual content. For example, the at least one processor may modify the color scheme associated with a first portion of virtual content displayed in an extended reality environment and/or via the wearable extended reality appliance, without modifying the color scheme of a remainder of the virtual content. As another example, for virtual content that is meant to be all in color, the at least one processor may be configured to modify a portion of the virtual content by changing its color scheme to a black and white or grayscale, while leaving a remainder of the virtual content in color until a target temperature is reached. In this example, the temperature of one or more components of the wearable extended reality appliance may be higher than a threshold temperature initially. Changing the color scheme as described above may reduce the temperature to below the threshold temperature. The color scheme for the virtual content may revert back to unmodified settings (e.g., all in color) in all portions of the virtual content once the temperature is below the threshold temperature.

The particular way in which the color scheme is modified, for example, changing a portion of the virtual content to be displayed in black and white, may be configured by the wearable extended reality appliance user. A user's preferred color scheme modification may be stored in the user's profile.

In some embodiments, changing the display settings of virtual content may include reducing the opacity value of at least a portion of the virtual content. Modifying opacity may refer to how transparent or translucent displayed virtual content appears. Virtual content displayed with higher opacity may stand out more from the surrounding environment and may allow less surrounding light to penetrate through it as compared to virtual content displayed with a relatively lower opacity. Displaying content at maximum opacity may use more processing power, and thus generate more heat, than when the opacity is modified such that the content is more translucent or transparent.

In one example, a first portion of virtual content may be displayed at a reduced opacity, and a second portion of virtual content may be displayed at an unreduced opacity. For example, when displayed at a reduced opacity, certain graphics in a presentation may appear translucent to the viewer, whereas other graphics may be displayed at their normal opacity settings. In this example, text and graphical images may be displayed as part of virtual content. Here, the text may be displayed unmodified, but the graphics may be reduced in opacity to reduce heat generation, or vice versa. In this situation, the temperature associated with one or more components of the wearable extended reality appliance may be high initially, and changing the opacity as described may reduce the temperature. Once the temperature reduces below a predetermined threshold temperature, the opacity for the virtual content may revert back to unmodified settings (e.g., no content appears translucent or transparent) in all portions of the virtual content.

The particular way in which the opacity is modified, for example, by how much opacity is reduced, may be configured by the wearable extended reality appliance user. Additionally, the particular portion of virtual content that is to be reduced in opacity may be configured by the wearable extended reality appliance user. A user's preferred opacity modification may be stored in the user's profile.

In some embodiments, changing the display settings of virtual content may also include reducing the intensity value of at least a portion of the virtual content. The term intensity may refer to how much light is generated from the displayed virtual content via the heat-emitting light source. Displaying virtual content at a user's preferred intensity may use more processing power, and thus generate more heat, than when intensity is reduced.

A first portion of virtual content may be displayed at a reduced intensity, and a second portion may be displayed at an unreduced intensity. For example, presented virtual content may comprise both text and graphics. The text may be displayed at unmodified settings, but when displayed at a reduced intensity, the graphics in the presentation may appear less bright to the viewer because the power used to present the virtual content has been reduced. In this example, the temperature is high initially, and changing the intensity as described reduces the temperature. The intensity of the virtual content may revert back to unmodified settings (e.g., normal intensity based on a user's preference) in all portions of the virtual content after the temperature falls below the threshold temperature.

The particular way in which intensity is modified, for example, by how much intensity is reduced, may be configured by the wearable extended reality appliance user. Additionally, the particular portion of virtual content that is to be reduced in intensity may be configured by the wearable extended reality appliance user. A user's preferred intensity modification may be stored in the user's profile.

Changing the display settings of virtual content may also include reducing a brightness value of at least a portion of the virtual content. The term brightness may refer to one's visual perception of how much light is emitted from the displayed content. While adjusting intensity of the displayed content involves adjusting how much light is generated by the heat-emitting light sources, adjusting brightness involves adjusting the display settings of the virtual content while the intensity remains constant. Displaying virtual content at a user's preferred brightness settings may use more processing power, and thus generate more heat, than when brightness is reduced.

In this embodiment, a first portion of virtual content may be displayed at a reduced brightness, and a second portion may be displayed at an unreduced brightness. For example, a presented virtual content may contain both text and graphics. To reduce temperature, the graphics may be displayed at a reduced brightness, but the text may be displayed unmodified, or vice versa. In this example, the temperature is high initially, and changing the brightness as described reduces the temperature. The brightness of the virtual content may revert back to unmodified settings (e.g., normal brightness based on a user's preference) in all portions of the virtual content after the temperature falls below the threshold temperature.

The particular way in which brightness is modified, for example, by how much brightness is reduced, may be configured by the wearable extended reality appliance user. Additionally, the particular portion of virtual content that is to be reduced in brightness may be configured by the wearable extended reality appliance user. A user's preferred brightness modification may be stored in the user's profile.

Changing the display settings of virtual content may also include reducing a frame rate of at least a portion of the virtual content. A frame rate may refer to a frequency at which consecutive images are displayed, especially when a video and/or animated virtual objects are displayed. The higher the frame rate, the smoother the displayed video content appears to a viewer. Displaying virtual content at an unmodified frame rate may consume more processing power, and thus generate more heat, than displaying virtual content at a reduced frame rate.

In this embodiment, a first portion of virtual content may be displayed at a reduced frame rate, and a second portion may be displayed at an unreduced frame rate. For example, when displayed at a reduced frame rate, certain presented video content may appear choppy, i.e., the motion in the video will not be as smooth. Other portions of presented video content, however, would be displayed at their normal frame rate, and will the motion will appear smooth to a viewer. In one example, the frame rate of the video may be reduced where not much is changing, such as a scene in which there is a still landscape. Here, the frame rate in the video may remain unmodified where the content is changing rapidly, such as characters walking down a crowded street. In this example, the temperature is high initially, and reducing the frame rate as described reduces the temperature. The frame rate of the virtual content may revert back to unmodified settings (e.g., video content appears smooth) in all portions of the virtual content after the temperature falls below the threshold temperature.

The particular way in which frame rate is modified, for example, by how much frame rate is reduced, may be configured by the wearable extended reality appliance user. Additionally, the particular portion of virtual content that is to be reduced in frame rate, i.e., the beginning, middle, or end portion of a video, may be configured by the wearable extended reality appliance user. A user's preferred frame rate modification may be stored in the user's profile.

Changing the display settings of virtual content may also include reducing a display size of at least a portion of the virtual content. Reducing the display size of virtual content may help reduce power consumption and thus reduces temperature. For example, larger images and videos may have larger file sizes, which may require more power for reading from memory, processing, and/or displaying. In another example, reducing the display size may allow shutting off or turning into a low power mode at least part of at least one display device included in the wearable extended reality appliance.

In this embodiment, a first portion of virtual content may be displayed at a reduced display size, and a second portion may be displayed at an unreduced display size. For example, as part of displayed virtual content, a document may be displayed at a reduced size, whereas a video file may be displayed at an unmodified size.

In one example, the portion of the virtual content may be selected based on information indicative of attention of a user of the wearable extended reality appliance. In another example, the portion of the virtual content may be selected based on degrees of necessity associated with different portions of the virtual content. In some embodiments the information indicative of attention of a user of the wearable extended reality appliance may include captured image information. In one example, the information indicative of the attention of the user may be based on a position of a cursor. In another example, the information indicative of the attention of the user may be based on a direction of the wearable extended reality appliance, i.e., where the user is directing her head. In yet another example, the information indicative of the attention of the user may be based a gaze direction of the user.

Additionally, the portion of virtual content to be reduced in size may be based on degrees of necessity associated with different portions of the virtual content. The degrees of necessity may refer to how important particular content is to a particular user. For example, presented virtual content may have a few key points that need to be explained to a viewing user of a wearable extended reality appliance, and have other supporting points that may not be as important. When configuring the wearable extended reality appliance, a user may assign each portion of presented content a value pertaining to its necessity, and the display size of the virtual content may be reduced based upon the assigned necessity value.

Figure 25:
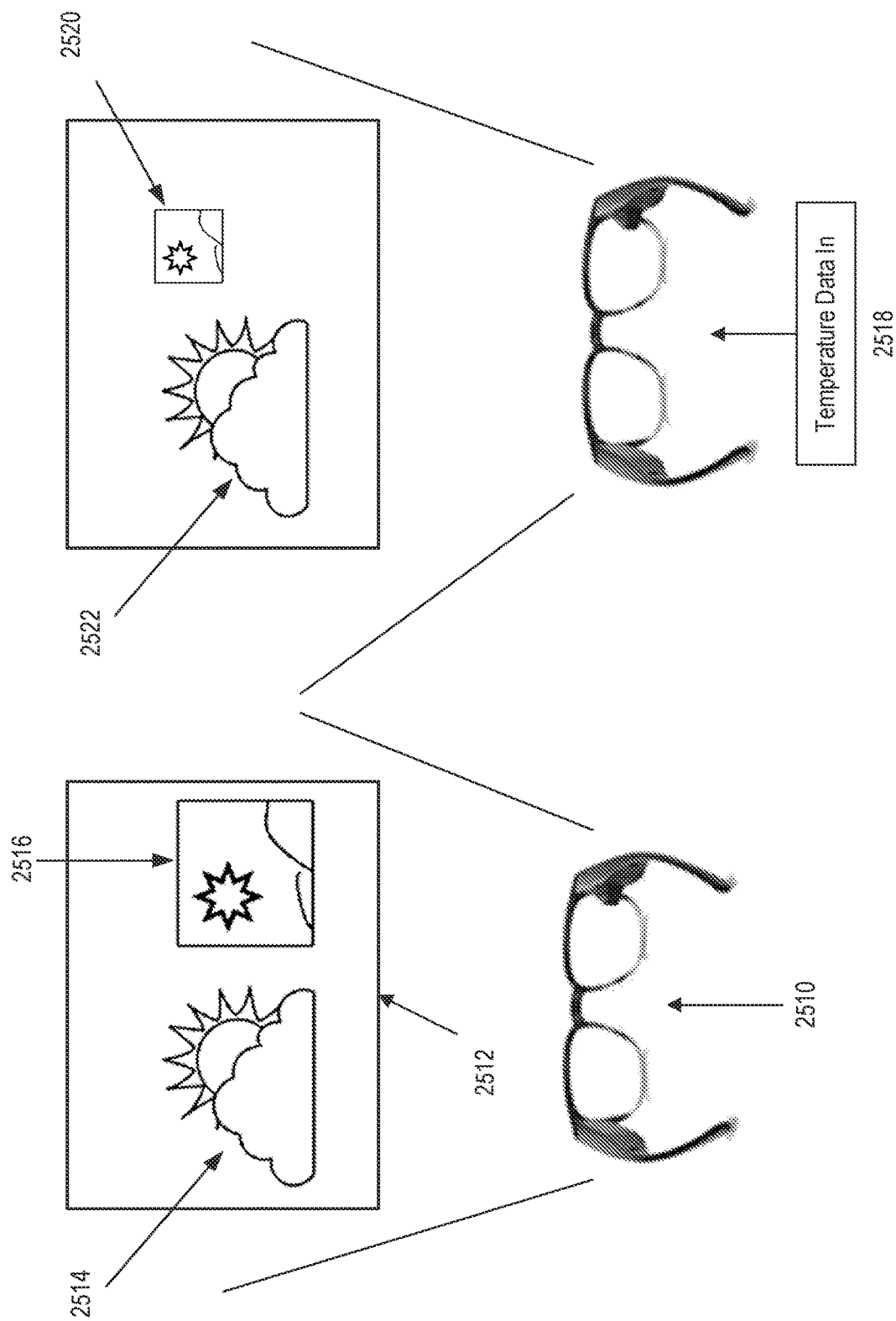
FIG. 25 illustrates an example of reducing a display size of a portion of the virtual content based on received temperature information, consistent with some disclosed embodiments.

By way of example, FIG. 25 illustrates reducing the display size of a portion of the virtual content based on received temperature information. Here, a wearable extended reality appliance 2510 presents virtual content 2512. Virtual content 2512 is comprised of virtual objects 2514 and 2516. Upon receiving temperature data 2518 and determining a need to modify virtual content display settings, the display size of the virtual content may be reduced. Here, virtual object 2520 is reduced in size version of 2516 whereas virtual object 2522 is not (i.e., virtual object 2522 is similar or identical in size to 2514).

In some embodiments, changing display settings of the virtual content includes implementing selective changes to displayed virtual objects included in the virtual content based on at least one of object type or object usage history. In the context of these embodiments, virtual object type may refer to a characteristic of displayed content. Such characteristics (or type) may include, for example, inanimate virtual content (e.g., a document), animate virtual content (e.g., a video or PowerPoint presentation), colored, grayscale, or black and white content, transparent, translucent, or opaque content, bright or dim content, stationary or moving content, reduced frame rate content, and/or large display-size content and small display-size content. Object usage history may refer to how recently the specific object was used, how frequently the object was used, how long the object was used, what time of day the object was used, for what purpose the object was used, and/or how many users used the particular virtual object.

Display parameters that may be modified based on the type of content presented, i.e., a video or document, may be configured based on a user's preference. For example, a user may prefer to display a document that is highlighted, made brighter, or zoomed in instead of modifying other display parameters. In another example, a user may prefer to slow down the frame rate of presented video content in lieu of modifying other display parameters or may prefer to automatically reduce the display size of the presented virtual content.

Additionally, display parameters may be modified based on the usage history. For example, a wearable extended reality appliance user may have previously slowed down video speeds in order to reduce heat generation. This information may be stored in the non-transitory computer readable medium associated with the wearable extended reality appliance as part of the user's profile. A processor may automatically slow down video speeds when the wearable extended reality appliance reaches the threshold temperature based on the stored usage history in the user's profile. In another example, the user may prefer to reduce display size, change the color scheme, or reduce brightness of the displayed content. For example, the presentation may include text and graphics. Based on the content presented and the user's audience, the user may prefer to reduce the display size of graphics, change the graphics to grayscale, or reduce the brightness of the graphics in order to reduce temperature, but without changing the content and meaning of the presentation. Such display parameter modification information may be stored in the non-transitory computer readable medium so that the wearable extended reality appliance may reduce heat generation based on usage history. In another example, a particular object that has not been used for a lengthy period of time may be reduced in intensity, brightness, or any other working parameter. For example, a virtual object, such as a document as part of a presentation, that has not been used for two hours may be reduced in intensity.

In some embodiments, changing the display settings of the virtual content may include removing from the virtual content at least one virtual element of a plurality of virtual elements included in the virtual content. In the context of some disclosed embodiments, a virtual element may be a virtual object or part of a virtual object. For example, if virtual content is comprised of multiple documents, a virtual object may be one of the documents. A virtual element may be the virtual object itself, e.g., the document, or may be part of the virtual object, such as the task bar, navigation pane, or styles tab. To reduce heat generation, a virtual element, such as a task bar or navigation pane, may be removed from the displayed virtual content. For example, a presented virtual content may involve a document. To reduce heat generation, the navigation pane of the document may be removed, i.e., it is not visible to the viewer.

In some embodiments, the at least one virtual element may be selected from the plurality of virtual elements based on information indicative of attention of a user of the wearable extended reality appliance. The attention of the user may be used to remove a virtual element because such data is indicative of what portions of the virtual content are crucial to conveying the meaning of the virtual content, and which are not. Information indicative of the attention of the user may be based on image data captured by the image sensor associated with the wearable extended reality appliance. In one example, the information indicative of the attention of the user may be based on a position of a cursor. In another example, the information indicative of the attention of the user may be based on a direction of the wearable extended reality appliance. In this example, a user may need to move his or her head or gaze to completely view virtual content. The image sensor may capture data related to where a user's attention is, i.e., where their head is located, and modify the virtual content accordingly. In yet another example, the information indicative of the attention of the user may be based a gaze direction of the user. In another example, the image sensor may capture gesture data. Virtual objects to which the user is pointing to may be displayed at unmodified settings, whereas virtual objects that the user does not point to may be displayed at reduced brightness, intensity, frame rate, opacity, or at a modified color.

Some disclosed embodiments may include ranking importance level of the plurality of virtual elements, and the at least one virtual element is selected from the plurality of virtual elements based on the determined level of importance. The importance level may refer to how necessary certain virtual elements are for the user to understand the presented virtual content. For example, an image may be presented as part of virtual content, but may not be necessary to understand the rest of the virtual content. The image may be assigned an importance level that is lower than the remainder of the presented virtual content. In another example, a presentation may be presented as virtual content (for example, in a presentation editing and/or viewing application) and may include slides and notes. The notes may not be as important as the slides and may therefore be assigned a lower importance level compared to the slides. By way of another example, if the virtual element is a virtual productivity application, information directly related to using the productivity application, such as documents, emails, or explanatory videos, may be assigned a high level of importance, and thus it would be a priority to display such content unmodified. In contrast, virtual elements that are not directly related to using the productivity application, such as videos playing music, open web pages, or other applications unrelated to the productivity application (or to core functions of the productivity application), may be assigned a lower level of importance. These elements may be modified in order to reduce heat generation. Additionally, if a virtual element is part of the virtual window, components that are not being used at the moment, such as a task bar, navigation pane, or styles tab, may be removed.

In some examples, ranking importance level of the plurality of virtual elements may comprise ranking importance level of the plurality of virtual elements based on a condition of the physical environment of the wearable extended reality appliance and/or an event in the physical environment of the wearable extended reality appliance. For example, when another person other than the user of the wearable extended reality appliance is present in the physical environment of the wearable extended reality appliance, virtual elements associated with the other person may be ranked higher than when the other person is not present in the physical environment of the wearable extended reality appliance. In another example, when an electrical appliance is present in the physical environment of the wearable extended reality appliance, controls associated with the electrical appliance may be ranked higher than when the electrical appliance is not present in the physical environment of the wearable extended reality appliance. In yet another example, when a person is physically approaching a user of the wearable extended reality appliance, elements associating with content sharing may be ranked higher than when no person is not physically approaching the user. In some examples, determining the present of a person and/or of an electrical appliance in the physical environment of the wearable extended reality appliance, and/or determining whether a person is physically approaching the user, may be determined based on an analysis of an image data captured using an image sensor included in the wearable extended reality appliance. The analysis may include analyzing the image data using a visual classification algorithm to one class of a plurality of alternative classes (such as 'other person present', 'no other person present', 'electrical appliance present', 'no electrical appliance present', 'person approaching the user', 'no person approaching the user', or any other combination of additional users and/or appliances).

Some disclosed embodiments may include receiving, over a period of time following implementation of the change to the display settings, updated information indicative of the temperature associated with the wearable extended reality appliance and altering at least one of the display settings to an initial value. As described above, temperature values may be received periodically, continuously, or based on set temperature increases (i.e., no information is generated unless the temperature increases one or two degrees Celsius). How the processor receives temperature values may be configured by the wearable extended reality appliance user. Thus, temperature values may be received continuously or periodically during use of the wearable extended reality appliance. For example, temperature measurements by a temperature sensor associated with the wearable extended reality appliance may indicate that the temperature of one or more components of the wearable extended reality appliance has decreased below a threshold temperature, or have decreased to a safe or stable temperature. In one example, in response, the wearable extended reality appliance may be used without any modifications to display settings. In another example, in response, at least one of the display settings may be altered to an initial value. In some embodiments, the initial value may refer to a display setting before being changed (for example, altering display settings to the initial value 2418 in FIG. 24).

In the above example, the working parameter (such as voltage, current, or power) may be remodulated by the at least one processor to an initial value after the wearable extended reality appliance has not been used. Accordingly, the initial value may refer to a display setting or to a working parameter before being changed. One example of an initial value may be a default display setting. In this example the initial value may refer to a default color, opacity, intensity, brightness, frame rate, or display size setting. The initial value of a display setting may be configured by each individual wearable extended reality appliance user.

Figure 26:
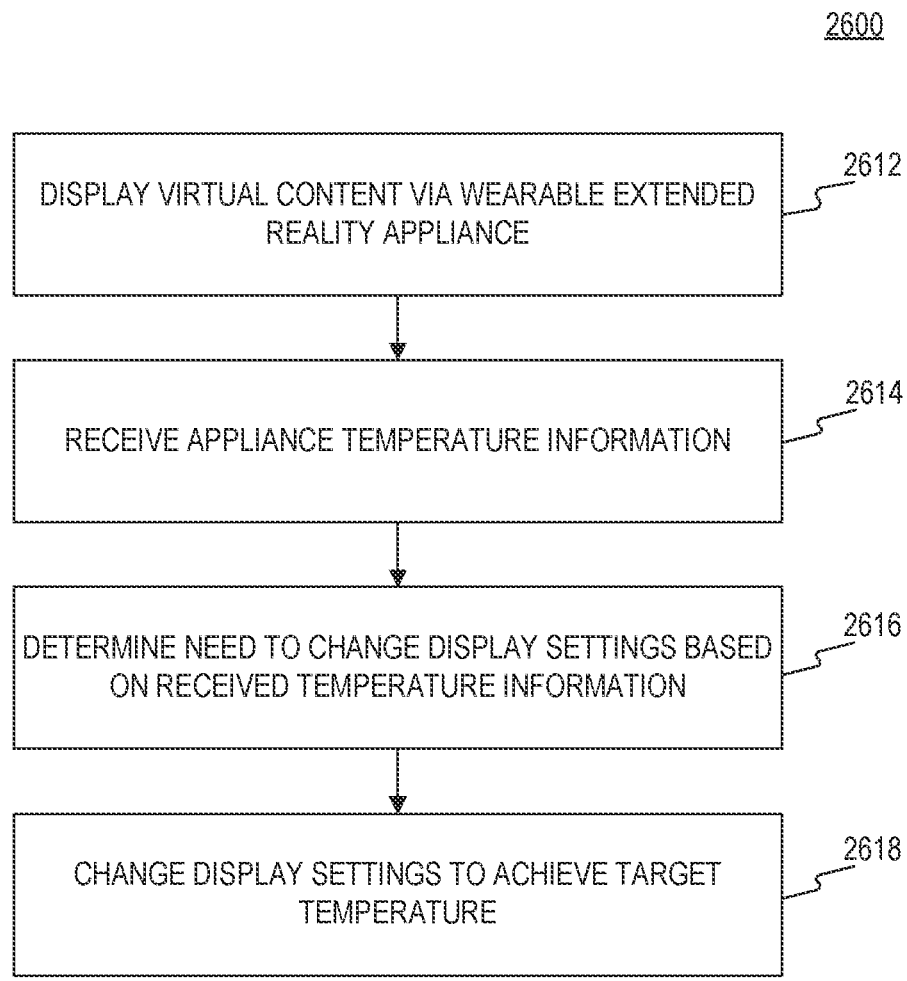
FIG. 26 is a flow chart illustrating an exemplary method for changing display settings based on a temperature of a wearable extended reality appliance, consistent with some embodiments of the present disclosure.

FIG. 26 is a flow chart illustrating an exemplary method for hanging display settings based on a temperature of a wearable extended reality appliance. Method 2600 may be performed by one or more processing devices (e.g., 360, 460, or 560) associated with input unit 202 (see FIG. 3), XR unit 204 (see FIG. 4), and/or remote processing unit 208 (see FIG. 5). The steps of the disclosed method 2600 may be modified in any manner, including by reordering steps and/or inserting or deleting steps. Method 2600 may include a step 2612 of displaying virtual content via a wearable extended reality appliance. One or more components of the wearable extended reality appliance (e.g., 412, 413, 414, 415, 417) (see FIG. 4) may generate heat while displaying the virtual content. Method 2600 may include a step 2614 of receiving temperature information associated with a wearable extended reality appliance based on the heat generation (for example, after or while step 2612 displays the virtual content). Method 2600 may include a step 2616 of determining a need to change display settings based on received temperature information. The at least one processing device (e.g., 360, 460, 560) associated with input unit 202 (see FIG. 3) may determine the need to change display settings based on received temperature information. Method 2600 may include a step 2618 of based on the determination of step 2616, changing the display settings of the virtual content to achieve a target temperature. The display settings may be changed to reach the target temperature.

Some disclosed embodiments may include systems, methods, and/or non-transitory computer readable media containing instructions that when executed by at least one processor may cause the at least one processor to perform operations for implementing hybrid virtual keys in an extended reality environment. An extended reality environment may contain real and virtual elements. A user may interact with the real and virtual elements while operating in the extended reality environment. In some embodiments, the extended reality environment may contain hybrid virtual keys. Hybrid virtual keys may include a mix of physical and virtual keys. Physical keys may represent one or more physical and/or mechanically movable keys of, for example, a keyboard. A keyboard may allow a user to input text and/or alphanumeric characters using, for example, one or more keys associated with the keyboard. Virtual keys may allow the input of text and/or alphanumeric characters and/or special purpose keys (such as command, control and/or function keys) without the need for physical keys. Virtual keys may have the same appearance as physical keys, or a different appearance, but may not have a physical, movable component. A user may interact with virtual keys through a touchscreen interface or in the extended reality environment. In some embodiments, the hybrid keys may include physical keys and virtual keys. For example, the extended reality environment may contain a physical keyboard with physical keys and a surface including virtual keys. In some embodiments, the hybrid virtual keys may correspond to number keys, letter keys, symbol keys, up/down arrows, special purpose keys (such as command, control and/or function keys), or other types of keys.

Some disclosed embodiments may include receiving, during a first time period, first signals corresponding to positions on a touch-sensitive surface of a plurality of virtual activatable elements virtually projected by a wearable extended reality appliance on the touch-sensitive surface. A touch-sensitive surface may include a surface that may generate signals in response to being touched by an object. The touch-sensitive surface may be located on one or more physical objects present in an environment of the user. For example, the touch-sensitive surface may include one or more surfaces of a physical keyboard. As one example, a touch bar or a touch pad on a physical keyboard may constitute a touch-sensitive surface. It is contemplated, however, that other portions of the keyboard, such as, sides or one or more physical keys of the keyboard may be a touch-sensitive surface. As another example, the touch-sensitive surface may include a surface of a table, desk, or any other objects in the environment of the user. An object used to touch the touch-sensitive surface may include one or more portions of a user's hand, a stylus, a pointer, or any other physical object that may be brought into contact with the touch-sensitive surface. As one example, a user may use one or more fingers, thumbs, wrist, palm, or any other portion of the user's hand to touch the touch-sensitive surface.

In some embodiments, the touch-sensitive surface may include one or more virtual activatable elements. Virtual activatable elements may include one or more widgets that may be displayed or projected onto the touch-sensitive surface. For example, virtual activatable elements may include icons, symbols, buttons, dials, check boxes, selection boxes, pull-down menus, sliders, or any other type of graphical element that may be displayed or projected onto the touch-sensitive surface. Each virtual activatable element may generate a signal or cause an action to be taken when operated or acted on by a user. For example, a user may activate a virtual activatable button element by pressing on or touching the button. As another example, a user may activate a virtual activatable slider element by using a finger to swipe upwards or downwards on the element. A virtual activatable element may generate a signal or cause a processor to take an action in response to being touched or activated by a user.

A virtual activatable element displayed or projected onto a touch-sensitive surface may be associated with a position. The position may be associated with a location of a respective virtual activatable element relative to a reference location or a reference surface. In some embodiments, the position may be determined using coordinate elements. For example, a position of a virtual activatable element may include coordinate locations or distances relative to a predetermined co-ordinate reference plane. As another example, a position of a virtual activatable element may include a condition of a button (e.g., on or off) on a touch-sensitive surface.

In some embodiments, the virtual activatable elements may be virtually projected by a wearable extended reality appliance. This projection may be seen on the touch-sensitive surface by a user wearing the wearable extended reality appliance. Further, this projection may be invisible to other people, or may be seen away of the touch-sensitive surface by other people (for example, people not using wearable extended reality appliances, people not using the particular wearable extended reality appliance, and so forth). That is, a person looking at the touch-sensitive surface without a wearable extended reality appliance would not see the virtual activatable elements on the touch-sensitive surface. A wearable extended reality appliance may be a device that is attachable to a user to provide an augmented reality (AR), virtual reality (VR), mixed reality (MR), or any immersive experience. Typical components of wearable extended reality appliances may include at least one of: a stereoscopic head-mounted display, a stereoscopic head-mounted sound system, head-motion tracking sensors (such as gyroscopes, accelerometers, magnetometers, image sensors, structured light sensors, etc.), head mounted projectors, eye-tracking sensors, and/or additional components described below. The wearable extended reality appliance may include smart glasses, headsets, or other appliances. The wearable extended reality appliance may virtually project the virtual activatable elements by providing an overlay of the virtual activatable elements on the touch-sensitive surface such that the virtual activatable elements may be displayed to a user using the wearable extended reality device.

Figure 27:
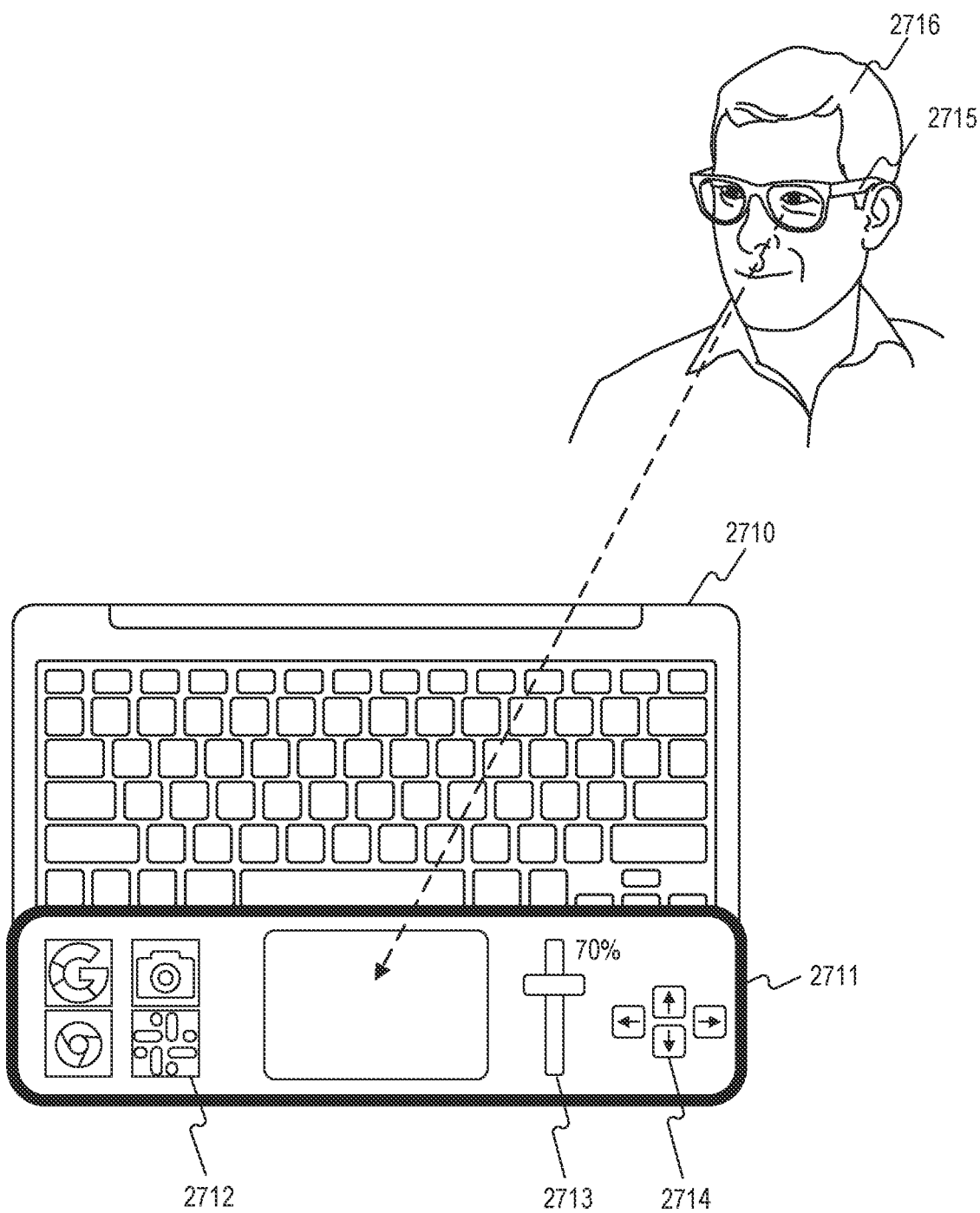
FIG. 27 illustrates an example of a wearable extended reality appliance virtually projecting onto a touch-sensitive surface, consistent with some embodiments of the present disclosure.

By way of example, FIG. 27 illustrates an example of a wearable extended reality appliance virtually projecting one or more virtual activatable elements onto a touch-sensitive surface. For example, as illustrated in FIG. 27, user 2716 may be wearing wearable extended reality appliance 2715. In some examples, wearable extended reality appliance 2715 may include smart glasses, a headset, a head-mounted display, or any other form of wearable extended reality appliance. Wearable extended reality appliance 2715 may virtually project one or more virtually activatable elements 2712, 2713, and/or 2714 onto touch-sensitive surface 2711 that may be located below keyboard 2710. The projected one or more virtually activatable elements may be visible to user 2716. In one example, the projected one or more virtually activatable elements may be invisible to other people. In another example, the projected one or more virtually activatable elements may be seen away of touch-sensitive surface 2711 by other people (for example, as a reflection over wearable extended reality appliance 2715). That is, a person looking at the touch-sensitive surface without a wearable extended reality appliance would not see the virtual activatable elements on the touch-sensitive surface.

In some embodiments, a processor may receive first signals corresponding to positions on a touch-sensitive surface during a first time period. The first time period may be a length of time during which one or more of actions may takes place. The length of time may be variable. For example, the first time period may be a few milliseconds, seconds, minutes, or any other duration of time. The first signals received by the processor may correspond to positions on a touch-sensitive surface. The first signals may represent a specific position of a virtual activatable element. The processor may receive signals indicating locations of each of the projected virtual activatable elements when the wearable extended reality appliance displays the virtual activatable elements, before the wearable extended reality appliance displays the virtual activatable elements, or after the wearable extended reality appliance displays the virtual activatable elements. For example, a wearable extended reality appliance may project a brightness adjuster scroll bar onto a touch-sensitive surface. A processor may receive a first signal indicating the brightness adjuster scroll bar is located on a right side of the touch-sensitive surface.

Figure 28:
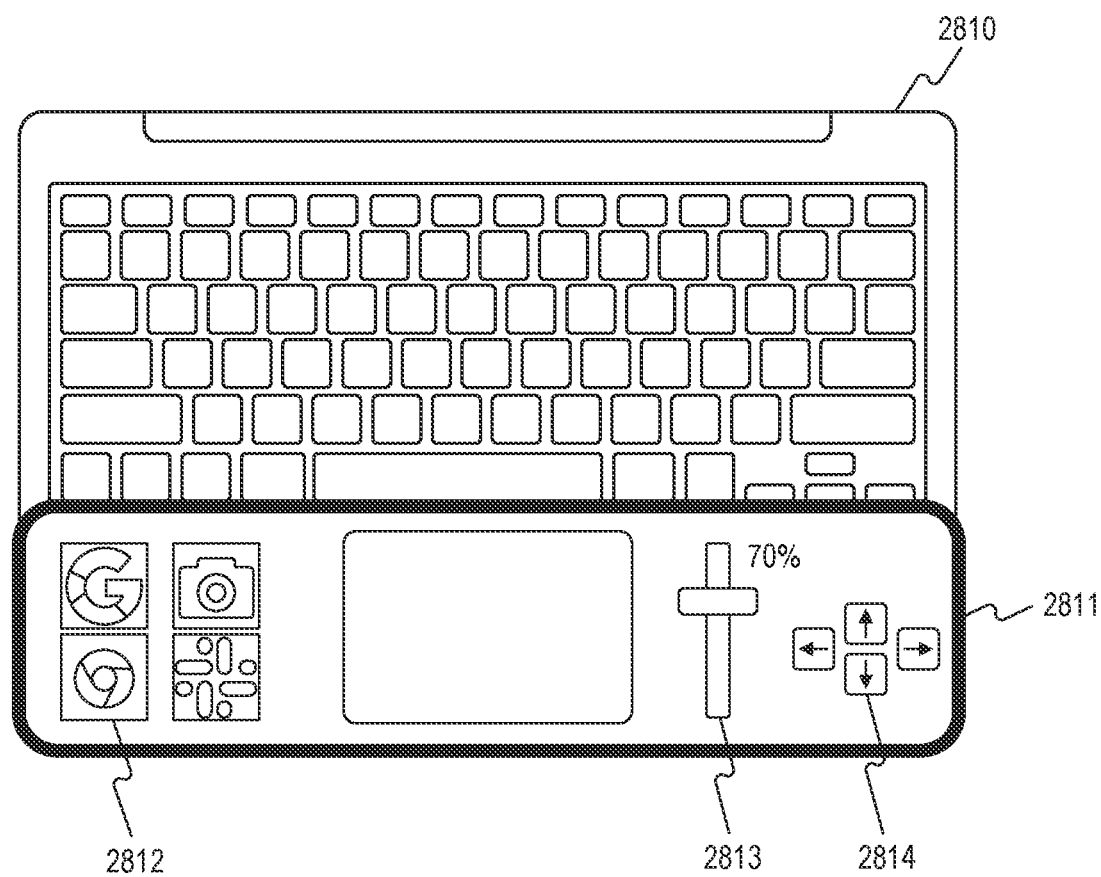
FIG. 28 illustrates an example of a keyboard and a touch-sensitive surface, consistent with some embodiments of the present disclosure.

By way of example, FIG. 28 illustrates an example of a keyboard and a touch-sensitive surface. As illustrated in FIG. 28, touch-sensitive surface 2811 may be located below keyboard 2810 but may additionally or alternatively be located elsewhere. For example, touch-sensitive surface 2811 may be located above keyboard 2810, to the left or right of keyboard 5-2-10, or be in-between physical keys of keyboard 2810. In some embodiments, touch-sensitive surface 2811 may also be located on keyboard 2810 itself. Touch-sensitive surface 2811 may include, for example, areas corresponding to one or more virtual activatable elements. For example, as illustrated in FIG. 28, the virtual activatable elements may include arrows 2814, a brightness adjustment 2813, and/or one or more icons representing one or more applications 2812. It is to be understood that touch-sensitive surface 2811 is not limited to these illustrated virtual activatable elements and may include any of several other areas corresponding to such elements as described above.

Some disclosed embodiments may include arranging the plurality of virtual activatable elements on the touch-sensitive surface based on a default arrangement previously selected by the user. Prior to performing one or more operations in an extended reality environment, a user may specify one or more locations and/or arrangements of one or more virtual activatable elements as a default arrangement. A processor may use the user-specified locations to cause the virtual activatable elements to be displayed in the default arrangement specified by the user. For example, a user may choose to arrange all of the virtual activatable elements on one side of the surface. In another example, a user may group certain virtual activatable elements together. In another example, a user may arrange the elements with the same distance between each element. By way of another example, a user may arrange the elements with different distances between each other. A user may also modify a previously specified default arrangement. For example, the user may drag one or more virtual activatable elements to one or more new locations. In some embodiments, the user may push a key to indicate a change in location of a virtual activatable element. For example, a user may push a down arrow key to indicate that the location of the virtual activatable element should be moved in a downward direction. In response to one or more user inputs, a processor may rearrange the positions of one or more of the virtual activatable elements. In some examples, default arrangement previously selected by the user may be context depended. For example, the default arrangement may specify different arrangements for different working modes of the wearable extended reality appliance (for example, one arrangement for power-saving mode and another arrangement for non-power-saving mode, one arrangement for lay-back usage mode of the wearable extended reality appliance and another arrangement for non-lay-back usage mode, one arrangement when the device is used while walking or running and a different arrangement when the device is used while standing or sitting, and so forth). In another example, the default arrangement may specify different arrangements for different virtual content consumed using the wearable extended reality appliance (for example, one arrangement when using a word processor and another arrangement when viewing a movie, one arrangement when in video conference and another arrangement when surfing the web, one arrangement when the wearable extended reality appliance is used to share content with other wearable extended reality appliances and another arrangement otherwise, and so forth). In yet another example, the default arrangement may specify different arrangements for different physical environment conditions. For example, the default arrangement may specify one arrangement for when a user of the wearable extended reality appliance is approached by another person and a different arrangement otherwise, one arrangement when the wearable extended reality appliance is used in a meeting room and another arrangement when the wearable extended reality appliance is used in a home settings, and so forth.

In some disclosed embodiments the plurality of virtual activatable elements virtually projected on the touch-sensitive surface may be a sub-set of a group of virtual activatable elements, and the sub-set may be determined based on an action of the user. The sub-set may be a proper sub-set of the group of virtual activatable elements (that is, at least one virtual activatable element of the group of virtual activatable elements is not included the sub-set). Further, the sub-set may be a non-empty sub-set (that is, at least one virtual activatable element of the group of virtual activatable elements is included in the sub-set). Some non-limiting examples of such action of the user may include usage of a particular application, using a particular function of a particular application, switching to a lay-back usage mode, switching to an airplane mode, pairing the wearable extended reality appliance with a particular device, walking, running, standing, sitting, communicating with a person in a physical vicinity of the user, entering a specific physical space, and so forth. In one example, the action of the user may be detected, for example by analyzing data received from one or more sensors and/or based on inputs received from the user, for example as described herein. Further, upon a detection of the action, the sub-set of the group of virtual activatable elements may selected. One or more of the virtual activatable elements may be grouped together in a sub-set of all virtual activatable elements being presented to a user. In some embodiments, the one or more virtual activatable elements may be grouped based on functions performed by those elements. For example, virtual activatable elements related to editing text or changing display parameters may be grouped together. In some embodiments, the one or more virtual activatable elements may be grouped based specific applications. For example, virtual activatable elements related to a presentation editing and/or viewing application may be grouped together. As another example, virtual activatable elements related to a video editing or playback application may be grouped together. In some embodiments, one or more of the virtual activatable elements may be grouped together in a sub-set based on an action taken by a user. For example, an action taken by the user may include editing a word document. The sub-set of virtual activatable elements may include options for a user to remove or add words or to change the font size and/or style. As another example, an action may include a user editing a video file. The sub-set of elements may include options for a user to delete or add audio or video clips.

In some disclosed embodiments the plurality of virtual activatable elements virtually projected on the touch-sensitive surface may be a sub-set of a group of virtual activatable elements, and the sub-set may be determined based on a physical location of the user. The sub-set may be a proper sub-set of the group of virtual activatable elements (that is, at least one virtual activatable element of the group of virtual activatable elements is not included the sub-set. Further, the sub-set may be a non-empty sub-set (that is, at least one virtual activatable element of the group of virtual activatable elements is included in the sub-set. A user may perform different types of actions in different settings. For example, different virtually activatable elements may be used when a user is in a home, office, conference room, in public, while travelling, or when the user is in other settings. The processor may contain a GPS device or an indoor positioning sensor to determine a location of the user. The processor may display a sub-set of virtual activatable elements based on the determined location. For example, when a user is physically located in his home, the processor may display a sub-set of virtual activatable elements associated with an email application. As another example, when a user is physically located in his workplace, the processor may display sub-sets of virtual activatable elements associated with document editing and/or video editing elements. In another embodiment, the sub-set of virtual activatable elements may be determined based on a physical location of at least one of the user, the wearable extended reality appliance, or the touch-sensitive surface. For example, a GPS device may be attached to the wearable extended reality appliance to determine the location of the appliance. Different sub-sets of virtual activatable elements may be projected by the wearable extended reality appliance on a touch-sensitive surface based on the location of the appliance. For example, a wearable extended reality may be located in a user's office. A sub-set of virtual activatable elements associated with document sharing may be projected based on the location. As another example, a GPS device may be attached to the touch-sensitive surface to determine a location of that surface. Different sub-sets of virtual activatable elements may be projected based on the location of the surface. For example, a touch-sensitive surface may be located in a user's home. A sub-set of virtual activatable elements associated with display changes may be projected based on the location. In the examples discussed above, the sub-sets may be proper subsets.

In some disclosed embodiments the plurality of virtual activatable elements virtually projected on the touch-sensitive surface may be a sub-set of a group of virtual activatable elements, and wherein the sub-set may be determined based on an event in an environment of the user. The sub-set may be a proper sub-set of the group of virtual activatable elements (that is, at least one virtual activatable element of the group of virtual activatable elements is not included the sub-set. Further, the sub-set may be a non-empty sub-set (that is, at least one virtual activatable element of the group of virtual activatable elements is included in the sub-set. The sub-set of virtual activatable elements may be determined based on a specific action taken by the user or a change in the user's physical or virtual environment. In some embodiments, the specific action may be an event that does not involve the user. For example, an action that may not involve the user may include another user connecting to the same extended reality environment to which the user may be connected. By way of example, when another user connects to the extended reality environment of the user, the virtual activatable elements may change to editing elements so that both users can perform editing functions. In another example, an action that may not involve the user may include another person physically approaching the user and/or physically entering a physical environment of the user. In some embodiments, a specific action that may determine the virtual activatable elements included in a sub-set may include the entrance of another person. For example, the entrance of another person may cause some virtual activatable elements to disappear from the touch-sensitive surface because the other person may not be authorized to perform functions associated with those virtual activatable elements.

In some embodiments, the event that determines the sub-set of virtual activatable elements may occur in a physical environment associated with a user. For example, entrance of another person into the user's home may be an event that may determine the sub-set of virtual activatable elements that are displayed to the user. As another example, an event occurring in the physical environment may involve a change in temperature in a user's workplace. In some embodiments, the event that determines the sub-set of virtual activatable elements may occur in a virtual environment. For example, the event may include a notification received by a user in the user's extended reality environment. A sub-set of virtual activatable elements may be selected or modified based on the notification. For example, if the notification is an email, the sub-set of virtual activatable elements may change to functions associated with an email application. As another example, if the notification is a phone call, the sub-set of virtual activatable elements may change to functions associated with a phone.

Some disclosed embodiments may include determining from the first signals the positions of the plurality of virtual activatable elements on the touch-sensitive surface. When a virtual activatable element is activated, actuated, projected by the wearable extended reality appliance, or triggered, one or more signals (such as the first signals) may be generated. A processor may receive the one or more signals and determine a position of the virtual activatable element based on the one or more signals. In some embodiments, the signal may include an indication of a position of the virtual activatable element. In one embodiment, the signal may store the position of the virtual activatable element based on the user-determined position. The signal may include position information in the form of coordinates or distances from a coordinate plane. The processer may receive the position information and may determine the position of the virtual activatable element based on the information. For example, a processor may determine the virtual activatable element is located on the left of the touch-sensitive surface, or at any position to the left of the touch-sensitive surface, based on position information received with the signal. In another embodiment, the position of each virtual activatable element may be associated with the virtual activatable element and stored in a data structure. The signal may include an identification of the virtual activatable element that may be used as an index to search the data structure to determine the position. As an example, the processor may determine the virtual activatable element is located on the right of the touch-sensitive surface, or at any location to the right of the touch-sensitive surface, based on an identification received with the signal. As another example, the processor may determine the virtual activatable element may be a slider and the position may be at either end of the slider, or at any position between the two ends. As another example, the virtual activatable element may be a dial and the position may be at any rotational angle along the dial.

In some disclosed embodiments, the positions of the plurality of virtual activatable elements on the touch-sensitive surface may be determined based on at least one of an action of the user, a physical location of the user, a physical location of the wearable extended reality appliance, a physical location of the touch-sensitive surface, or an event in an environment of the user. Different criteria may be used to determine positions (or layout) of virtual activatable elements displayed to a user. The positions of one or more of the virtual activatable elements may also be altered based on one or more criteria. For example, when a user is in an office environment, positions for displaying the virtual activatable elements may be selected so that the elements appear on more than one area. As another example, when a user is in a home environment, positions for displaying the virtual activatable elements may be selected so that the elements appear on a single area. As another example, different positions for displaying the virtual activatable elements may be determined based on an action taken by the user or an action taken by someone who is not the user. For example, a user may open an application and the positions of the virtual activatable elements may move to the left or right to create space for displaying the opened application. In some other examples, the positions of virtual activatable elements associated with a first application may be selected based on whether other applications are used. For example, when the first application is used alone, the virtual activatable elements associated with the first application may be spread across the entire touch-sensitive surface, and when the first application is used in conjunction with one or more other applications, the virtual activatable elements associated with a first application may be positioned in a selected portion of the touch-sensitive surface, while virtual activatable elements associated with the one or more other applications may be positioned on the touch-sensitive surface outside the selected portion. The portion of the touch-sensitive surface may be selected based on the first application, based on the one or more other applications, and so forth.

Some disclosed embodiments may include receiving a touch input of a user via the touch-sensitive surface, wherein the touch input includes second signals generated as a result of interactions with at least one sensor within the touch-sensitive surface. A touch-sensitive surface may contain one or more sensors to generate signals. The one or more sensors may detect or measure events or changes in an environment or may detect whether a user is touching a touch-sensitive surface. The one or more sensors may include image sensors, position sensors, pressure sensors, temperature sensors, or any other sensor capable of detecting one or more characteristics associated with the touch-sensitive surface or with an environment in which the touch-sensitive surface is located. The user may touch the surface by engaging with the touch-sensitive surface. For example, a user may apply pressure to part of the touch-sensitive surface. As another example, a user may tap, touch, press, brush, or flick part of a touch-sensitive surface. For example, the user may press the touch-sensitive surface that corresponds to a letter key. The user's engagement with the touch-sensitive surface may cause one or more sensors associated with the touch-sensitive surface to generate signals. For example, a sensor associated with the touch-sensitive surface may send a signal to the processor that a particular letter key has been touched by the user.

Figure 29:
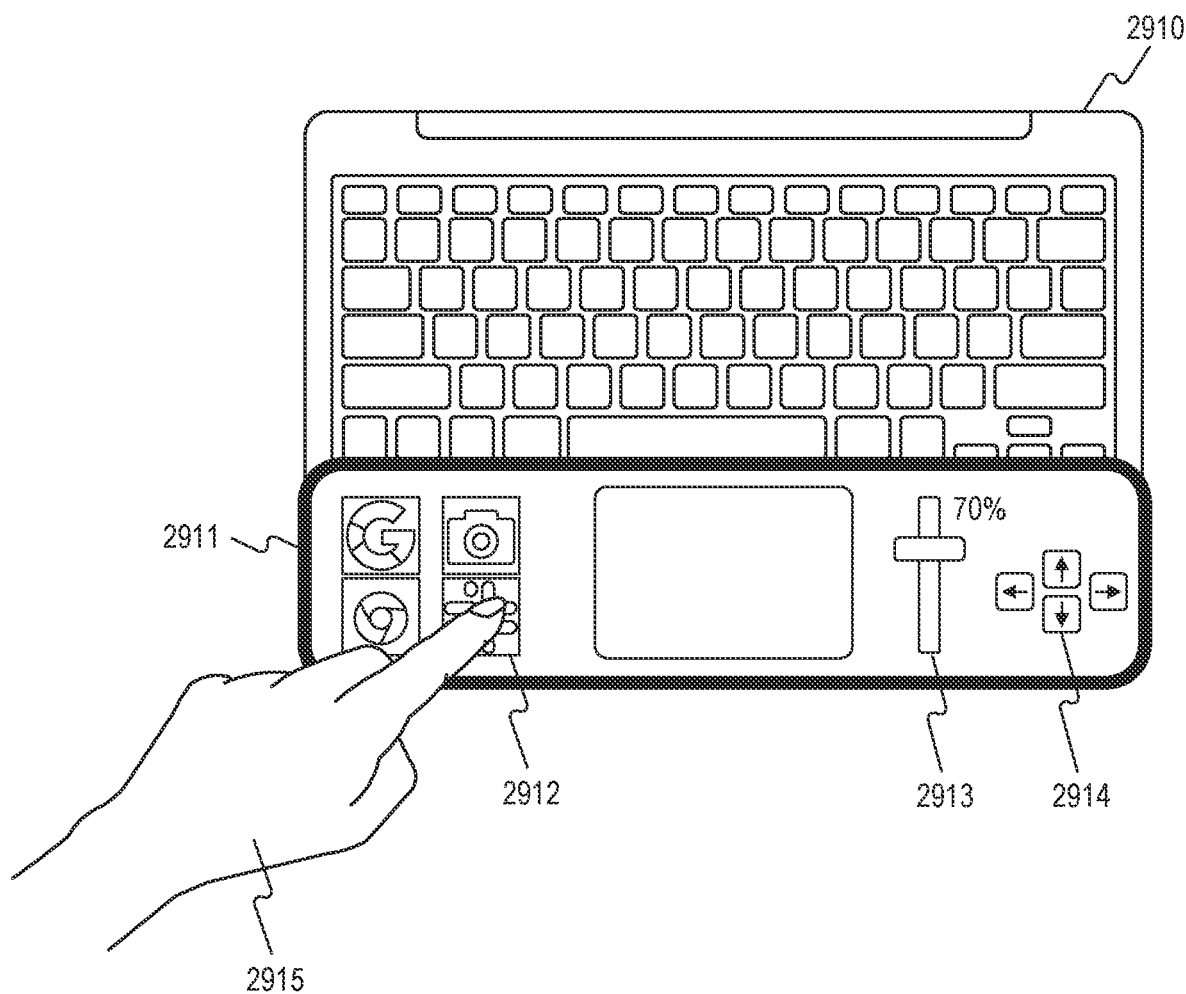
FIG. 29 illustrates an example of a user interacting with a touch-sensitive surface, consistent with some embodiments of the present disclosure.

By way of example, FIG. 29 illustrates an example of a user interacting with touch-sensitive surface. For example, as illustrated in FIG. 29, user's hand 2915 may touch an area of touch-sensitive surface 2911 on which virtual activatable element 2912 is projected. Touch-sensitive surface 2911 may be associated with keyboard 2910. User's hand 2915 may touch the area of touch-sensitive surface 2911 corresponding to virtual activatable element 2912 and a sensor may generate a signal reflecting that. The processor may receive the signal and open an application associated with virtual activatable element 2912. In another example, user's hand 2915 may touch an area of touch-sensitive surface 2911 on which virtual activatable element 2913 is projected and a sensor may generate a signal reflecting that. The processor may receive the signal and perform an action associated with virtual activatable element 2913. In another example, user's hand 2915 may touch an area of touch-sensitive surface 2911 on which virtual activatable element 2914 is projected, and a sensor may generate a signal reflecting that. The processor may receive the signal and perform an action associated with virtual activatable element 2914.

Some disclosed embodiments may include determining a coordinate location associated with the touch input based on the second signals generated as the result of the interactions with the at least one sensor within the touch-sensitive surface. As discussed above, when a user touches a touch-sensitive surface, one or more signals (e.g., second signals) may be generated by one or more sensors associated with the touch-sensitive surface. The one or more second signals may include information associated with a coordinate location of the touch input. A coordinate location may designate the position of a point relative to a given reference frame. In some embodiments, the coordinate location may be given as latitude and longitude. In other embodiments, a coordinate system (e.g., Cartesian coordinate system, polar coordinate system) may be used to determine the coordinate location. In other embodiments, a number line may be used to determine the coordinate location. The number line may include a straight horizontal line with numbers placed at even increments along the line. The numbers may correspond to a location of a touch input. For example, the user may touch a sensor in the middle of the touch-sensitive surface, which may be associated with a number 10 of a number line that may include 20 numbers. The at least one sensor may generate signals and the processor may determine that the touch input was in the middle of the touch-sensitive surface based on the signals and the number. As another example, the user may touch a sensor on the left or right of the touch-sensitive surface. The at least one sensor may generate signals and the processor may determine that the touch input was on the left or right of the touch-sensitive surface based on the signals.

Some disclosed embodiments may include comparing the coordinate location of the touch input with at least one of the determined positions to identify one of the plurality of virtual activatable elements corresponding to the touch input. The processor may compare a touch input of a user to a pre-determined position to determine which virtual activatable elements the user may be trying to trigger. The processor may compare the coordinate location to the determined position to determine if the coordinate location and determined position are the same. For example, the coordinate location of the touch input may be in the center of the touch-sensitive surface. The determined position of a slider, for example, may also be in the center of the touch-sensitive surface. The processor may compare the two locations to determine that the touch input corresponds to the user touching the slider.

Some disclosed embodiments may include causing a change in a virtual content associated with the wearable extended reality appliance, wherein the change corresponds to the identified one of the plurality of virtual activatable elements. Virtual content being displayed to a user may include one or more items displayed to the user using a wearable extended reality appliance. For example, virtual content may include virtual display screens (also referred to as virtual displays herein), widgets, documents, media items, photos, videos, virtual characters, virtual objects, extended reality environment, virtual activatable elements, and other graphical or textual content. In some embodiments, a processor may cause a change in virtual content by adjusting one or more items displayed to a user. For example, the processor may adjust the size of one or more virtual display screens. As another example, the processor may add one or more additional virtual display screens or remove one or more of the virtual display screens. As another example, a processor may play audio or display pictures to a user. The change in virtual content may be based on a virtual activatable element touched by the user and identified by the processor by comparing the coordinate location to the determined position. For example, a user may touch a virtual activatable element that corresponds to a zoom in feature. In response, the processor may change the virtual content by zooming in on the content. As another example, a user may touch a virtual activatable element that corresponds to a delete feature. In response, the processor may change the virtual content by removing an item displayed to the user. In another example, a user may touch a virtual activatable element that corresponds a particular application, and in response the processor may activate the particular application. In yet another example, a user may touch a virtual activatable element that corresponds to a particular function in a particular application, and in response the particular function may be triggered. In some examples, in response to a first identified one of the plurality of virtual activatable elements, a first change in the virtual content associated with the wearable extended reality appliance may be caused, and in response to a second identified one of the plurality of virtual activatable elements, a second change in the virtual content associated with the wearable extended reality appliance may be caused, the second change may differ from the first change. In some examples, in response to a first identified one of the plurality of virtual activatable elements, a first change in the virtual content associated with the wearable extended reality appliance may be caused, and in response to a second identified one of the plurality of virtual activatable elements, causing the first change in the virtual content associated with the wearable extended reality appliance may be avoided. In some examples, a data-structure associating virtual activatable elements with different alternative changes to the virtual content associated with the wearable extended reality appliance may be accessed based on the identified one of the plurality of virtual activatable elements to select the change in the virtual content associated with the wearable extended reality appliance.

Some disclosed embodiments may include determining a type of the touch input based on the second signals, and wherein the change in the virtual content corresponds to the identified one of the plurality of virtual activatable elements and the determined type of the touch input. The touch input may include different types of gestures performed by the user to touch the virtual activatable elements. A processor may determine the type of gesture associated with a touch input and relate the type of gesture to a specific function. The processor may also change the virtual content by performing the function of the virtual activatable element. In some embodiments, the determined type of the touch input may include, for example, a tap, a long touch, a multi-touch, a drag touch, a flick touch, a pinch-in touch, a pinch-out touch, a swipe touch, or a hovering touch. The touch input may be performed by a user's hand or part of a user's hand. For example, the touch input may be performed by a user's finger, fingertip, palm, or wrist. In some embodiments, the determined type of the touch input (e.g., gesture) may cause a change in virtual content. For example, a pinch-in type touch input may correspond to a zoom in feature. In response, the processor may cause the display to be magnified to zoom in on the virtual content. In another example, a drag type touch input may correspond to moving a virtual activatable element. In response, the processor may move the identified virtual activatable element based on the drag touch input.

In some disclosed embodiments the virtual content may include a virtual display, and the touch-sensitive surface may be located adjacent a touchpad configured for use in navigating a cursor in the virtual display. A touchpad and touch-sensitive surface may be located next to each other in an extended reality environment. A touchpad may include an area that may be used for navigating a cursor. A cursor may include an indicator that appears in the virtual display to display a selected position on the display. The cursor may identify a point on the virtual display that may be affected by a user input. For example, a user input may include a user interacting with the touchpad to move the cursor in the virtual display. As a user moves his hand, or part of his hand, on the touchpad, the cursor may move in the same manner in the virtual display. For example, the user may move his fingers to the left across the touchpad. In response, the cursor may move left in the virtual display. As another example, the user may push down on the touchpad while the cursor is hovering over an application. In response, the cursor may select an application being pointed at by the cursor based on the user pushing down on the touchpad.

In some disclosed embodiments the virtual content may include a virtual display, and the operations may further include enabling the touch-sensitive surface to navigate a cursor in the virtual display. The touch-sensitive surface may include an area that may be used for controlling a cursor. A user may interact with the touch-sensitive surface using the user's hand or part of a user's hand, such as the user's fingers, palm, or wrist. For example, a user may drag his hand over the touch-sensitive surface, causing the cursor to move in the virtual display. By way of another example, a user may move his fingers to the right across the touch-sensitive surface. In response, the cursor may move right in the virtual display. As another example, the user may push down on the touch-sensitive surface while the cursor is hovering over an application. In response, the cursor may select an application being pointed at by the cursor based on the user pushing down on the touch-sensitive surface.

Figure 30:
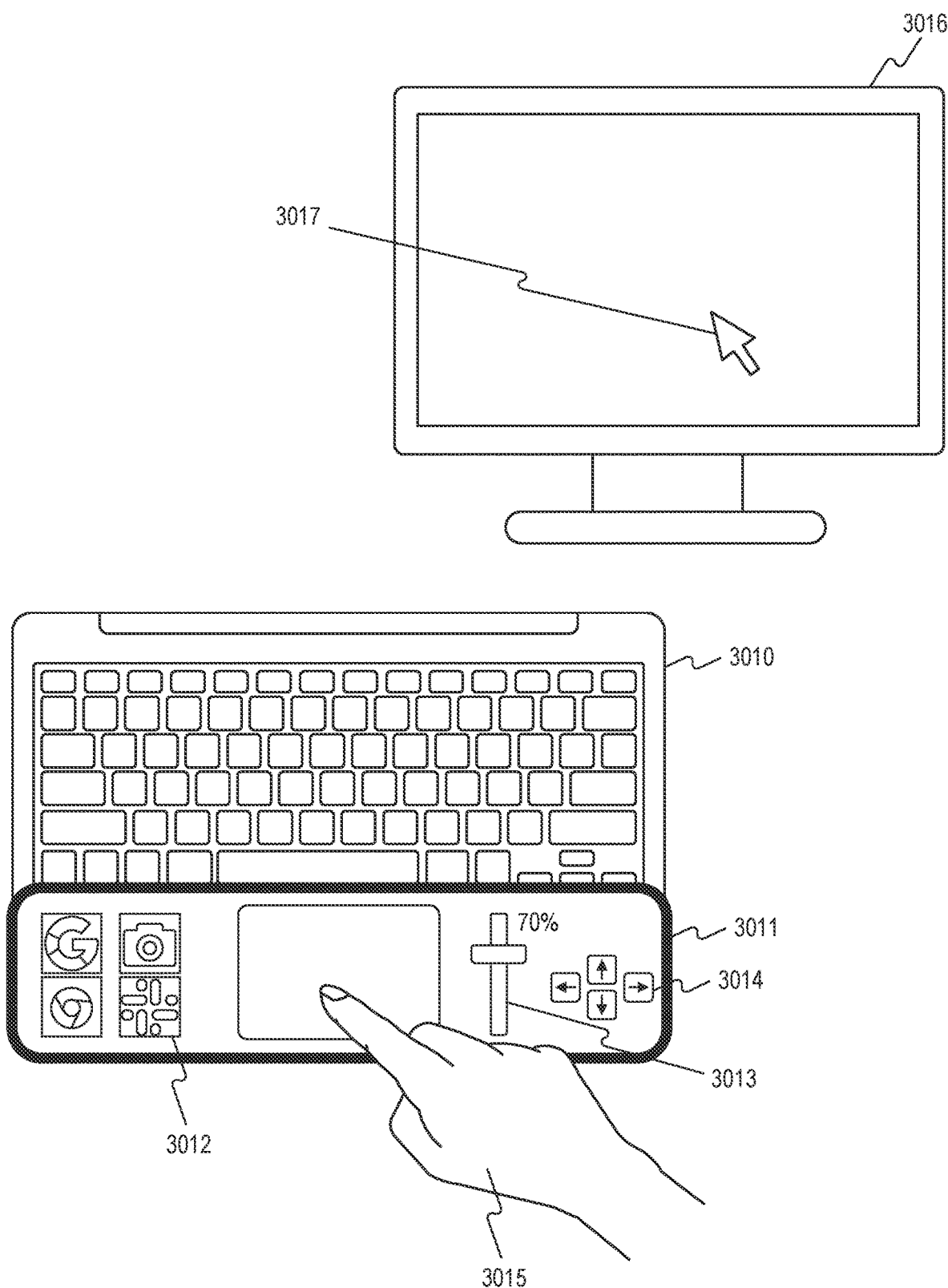
FIG. 30 illustrates an example of a user interacting with a touch-sensitive surface to navigate a cursor, consistent with some embodiments of the present disclosure.

By way of example, FIG. 30 illustrates an example of a user interacting with the touch-sensitive surface to navigate a cursor. For example, as illustrated in FIG. 30, user's hand 3015 may engage with touch-sensitive surface 3011, which may be located below keyboard 3010. Touch-sensitive surface 3011 may include areas corresponding to one or more virtual activatable elements 3012, 3013, and 3014. User's hand 3015 may engage with touch-sensitive surface 3011 to navigate cursor 3017 in virtual display 3016. For example, moving hand 3015 towards the right while touching touch-sensitive surface 3011 may cause cursor 3017 in virtual display 3016 to move towards the right.

Some disclosed embodiments may include upon detection of the touch input, opening an application and wherein causing the change in the virtual content is based on the opening of the application. A processor may receive a touch input from a user. The processor may compare the coordinate location of the touch input to determined positions of the one or more virtual activatable elements and determine that the input corresponds to a virtual activatable element associated with an application. The application may include, for example, a word processor, web browser, presentation software, video software, spreadsheet software, or any other type of application that may allow a user to perform some operations. The processor may open an application associated with a virtual activatable element based on a touch input associated with that virtual activatable element. Opening of the application may cause a change in the virtual content by altering what is seen by the user in the extended reality environment. For example, the touch input may correspond to a word application. The change in virtual content may include adjusting the virtual content to include the opened word document. In another example, the touch input may correspond to a presentation application. The change in virtual content may include adjusting the virtual content to include the opened presentation.

Some disclosed embodiments may include upon detection of the touch input, changing an output parameter; and wherein causing the change in the virtual content is based on the change in the output parameter. An output parameter may be a characteristic or feature of the virtual content. For example, an output parameter may include contrast, illumination, distance, sizing, volume, brightness, and/or one or more other parameters that affect how virtual content is displayed (for example, on a virtual display, in an extended reality environment, using the wearable extended reality appliance, and so forth). The processor may change an output parameter based on the determined position of the virtual activatable element. For example, the processor may increase or decrease a value or level associated with the output parameter based on the determined position of the virtual activatable element. An increase or decrease in a value or level associated with the output parameter may cause a change in the virtual content by adjusting what is seen by the user in the extended reality environment. For example, a change in an output parameter such as contrast may adjust a contrast of the extended reality display. In another example, a change in an output parameter may cause the processor to change the size of one or more windows in the virtual content. In some embodiments, the touch input may include the user adjusting a virtual activatable element that corresponds to a scroll bar for adjusting brightness. For example, the touch input may include the user dragging the scroll bar to the left to decrease brightness. In another example, the touch input may be the user dragging the scroll bar to the right to increase brightness. In response, the processor may cause a brightness of the extended reality display to increase or decrease based on the touch input.

Some disclosed embodiments may include deactivating at least one functionality of at least a portion of the touch-sensitive surface during a second time period when the plurality of virtual activatable elements are not projected by the wearable extended reality appliance onto the touch-sensitive surface. When the one or more virtual activatable elements are not projected by the wearable extended reality appliance onto the touch-sensitive surface, some or all portions of the touch-sensitive surface may be turned off by deactivating the functionality. When a portion of the touch-sensitive surface is turned off, even though a user may touch that portion of the touch-sensitive surface, a touch input will not be received, and the virtual content will not change. In some embodiments, such deactivation may occur during a second time period. The second time period may be a length of time during which the one or more virtual activatable elements are not projected by the wearable extended reality appliance onto the touch-sensitive surface. For example, the second time period may include a few milliseconds, seconds, minutes, or any other period of time.

Some disclosed embodiments may include deactivating at least one functionality of at least a portion of the touch-sensitive surface during a second time period when a different plurality of virtual activatable elements are projected by the wearable extended reality appliance onto the touch-sensitive surface. For example, the projection of the different plurality of virtual activatable elements during the second time period may include a projection of a new virtual activatable element at a particular portion of the touch-sensitive surface that corresponded to a specific virtual activatable element during the first time period, and deactivating the at least one functionality of the particular portion of the touch-sensitive surface may be a functionality corresponding to the specific virtual activatable element. In another example, the projection of the different plurality of virtual activatable elements during the second time period may include no projection at a particular portion of the touch-sensitive surface that corresponded to a specific virtual activatable element during the first time period, and deactivating the at least one functionality of the particular portion of the touch-sensitive surface may be a functionality corresponding to the specific virtual activatable element. Some disclosed embodiments may include maintaining the at least one functionality of the at least a portion of the touch-sensitive surface during a third time period after the first time period and before the different plurality of virtual activatable elements are projected onto the touch-sensitive surface, in the third time period the touch-sensitive surface may be outside a field-of-view of the wearable extended reality appliance and therefore the plurality of virtual activatable elements may not be projected onto the touch-sensitive surface. In one example, if the touch-sensitive surface reenters the field-of-view of the wearable extended reality appliance after the third time period and before the different plurality of virtual activatable elements are projected onto the touch-sensitive surface, the plurality of virtual activatable elements may be projected again onto the touch-sensitive surface. These embodiments may enable a blind typing (also known as touch typing) like experience using the virtual activatable elements.

Figure 31:
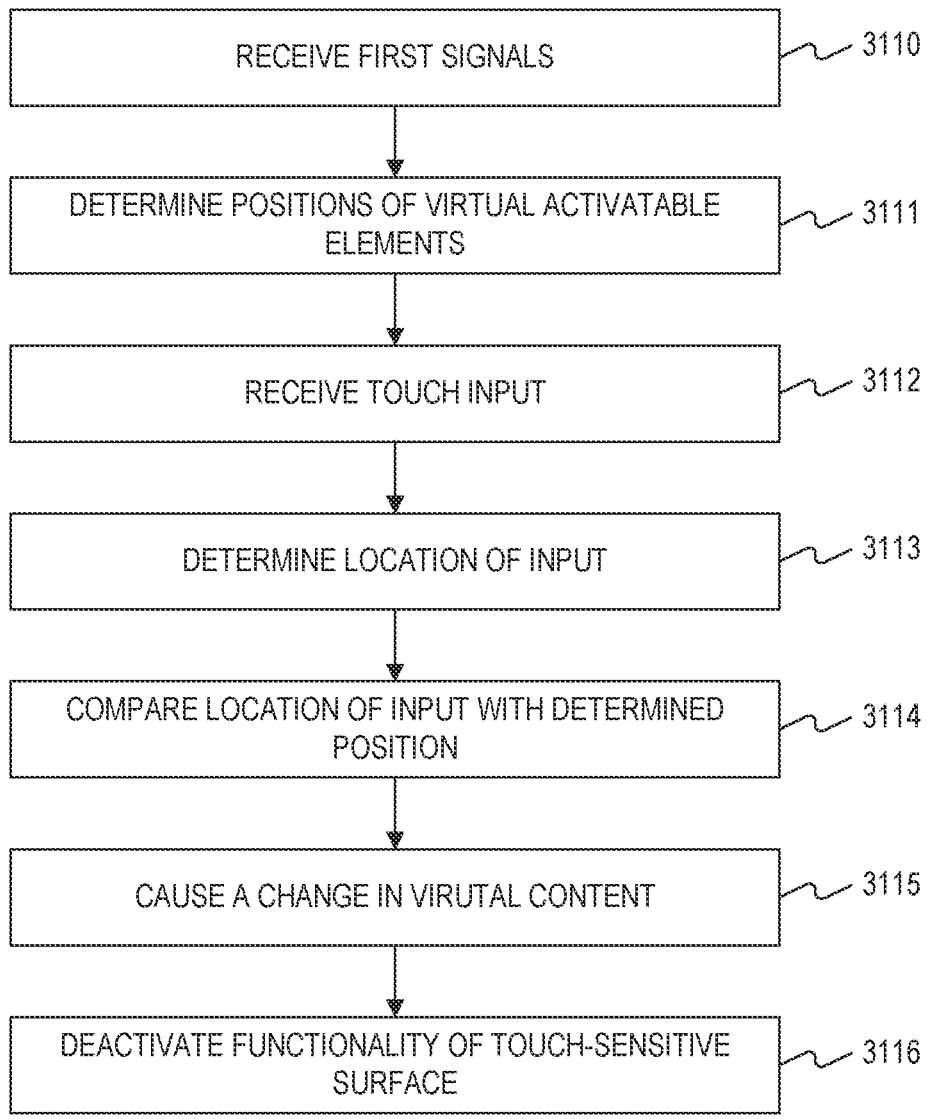
FIG. 31 illustrates a flow chart of an exemplary method for implementing hybrid virtual keys in an extended reality environment, consistent with some embodiments of the present disclosure.

FIG. 31 illustrates a flow chart of an exemplary method that may be executed by a processor to perform operations for implementing hybrid virtual keys in an extended reality environment. Method 3100 may include a step 3110 of receiving first signals corresponding to positions on a touch-sensitive surface of a plurality of virtual activatable elements virtually projected by a wearable extended reality appliance. Method 3100 may also include a step 3111 of determining position of virtual activatable elements based on the first signals. Further, method 3100 may include a step 3112 of receiving touch input of a user via the touch-sensitive surface. Method 3100 may include a step 3113 of determining location associated with the touch input based on second signals generated as a result of the interactions with at least one sensor. In one example, step 3112 and/or step 3113 may occur before, after, or simultaneously with step 3110 and/or step 3111. Method 3100 may include a step 3114 of comparing location of touch input with determined position. Method 3100 may also include a step 3115 of causing a change in virtual content. Further, in some examples method 3100 may include an optional step 3116 of deactivating functionality of touch-sensitive surface.

Some disclosed embodiments may include receiving additional signals corresponding to positions on a keyboard adjacent the touch-sensitive surface of additional virtual activatable elements virtually projected by the wearable extended reality appliance on keys of the keyboard. A keyboard may be located near the touch-sensitive surface. The keyboard may be located to the left or the right of the touch-sensitive surface. As another example, the keyboard may be located above or below the touch-sensitive surface. As another example, the keyboard may be touching or sharing a border with the touch-sensitive surface. The keyboard may contain one or more physical keys. The keyboard may also include additional virtual activatable elements in addition to the virtual activatable elements provided on the touch-sensitive surface. A wearable extended reality appliance may generate signals indicating positions associated with the additional virtual activatable elements projected onto the keyboard. For example, a keyboard may include blank keys, and additional virtual activatable elements may be projected onto the blank keys. As another example, a keyboard may include a section with no keys. Additional virtual activatable elements may be projected onto the section with no keys.

Some disclosed embodiments may include determining from the additional signals the positions of the additional virtual activatable elements on the keys of the keyboard. A signal may be received that corresponds to the position of the additional virtually activatable elements on the keyboard. The processor may determine the position of the additional virtual activatable element based on the signal. The processor may determine the position of the additional virtual activatable elements on the keyboard in the same manner in which the processor determines the position of the plurality of virtual activatable elements on the touch-sensitive surface. For example, a processor may determine the virtual activatable element is located on the left side of the keyboard. As another example, the processor may determine the virtual activatable element is located on the right side of the keyboard.

Figure 32:
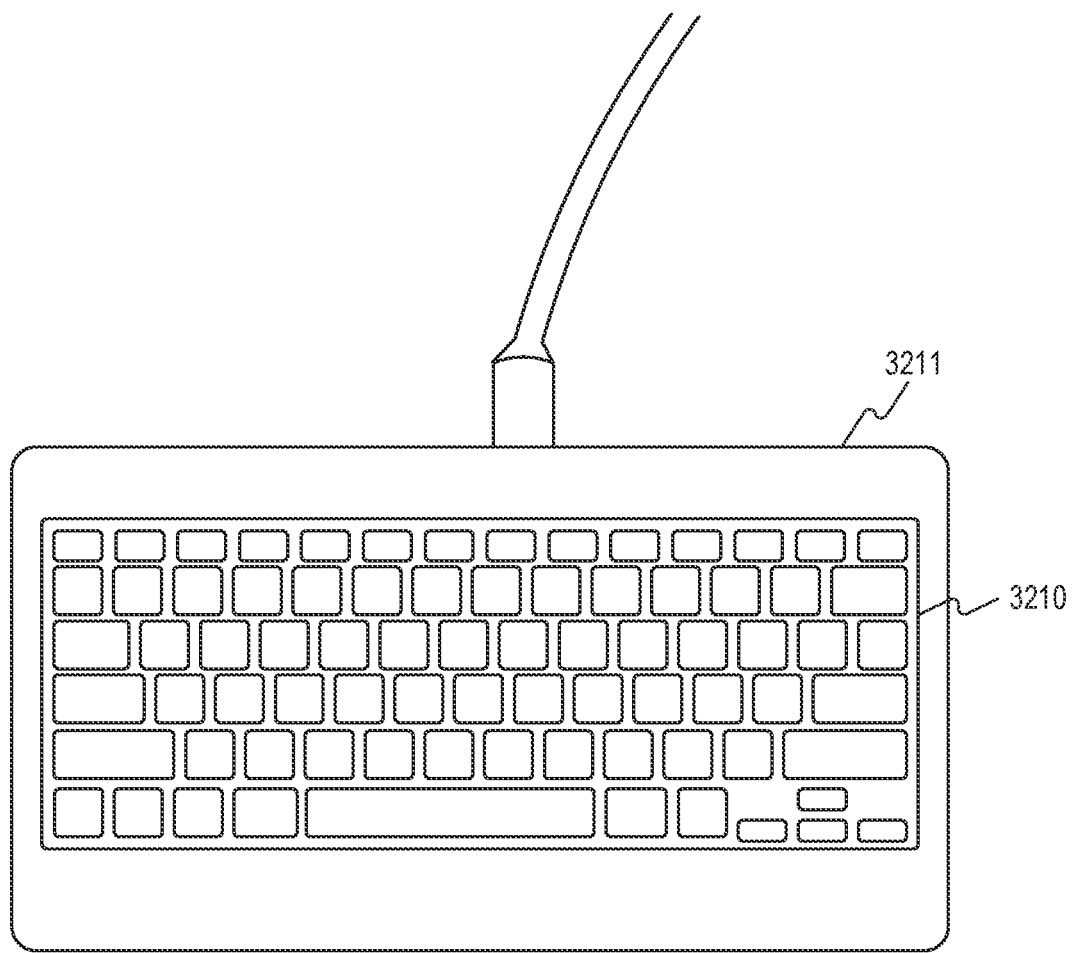
FIG. 32 illustrates an example of a keyboard with additional virtual activatable elements virtually projected onto the keys of the keyboard, consistent with some embodiments of the present disclosure.

By way of example, FIG. 32 illustrates an example of a keyboard with additional virtual activatable elements virtually projected onto the keys of the keyboard. For example, as illustrated in FIG. 32, keyboard 3211 may contain keys 3210. Virtual activatable elements may be projected onto keys 3210 of keyboard 3211.

Some disclosed embodiments may include receiving a key press input via at least one key of the keyboard. A key press input may occur when pressure is applied to a key of the keyboard. A user may apply a force to one or more keys using a user's hand or part of a user's hand. For example, a user may press down on a key using the user's finger, palm, or wrist. The pressure applied by the user to the key may generate a signal indicating that a key of the keyboard has been pressed.

Some disclosed embodiments may include identifying one of the additional virtual activatable elements corresponding to the key press input. As discussed above, a user may press a physical key on the keyboard. In some embodiments, a user may additionally or alternatively press a key and create a key press input that corresponds to a virtual activatable element. For example, one or more keys may be projected onto a keyboard and the user may perform a pressing gesture on one of the projected keys. As another example, additional virtual activatable elements may be projected on a set of physical keys and a user may perform a pressing gesture on one of the physical keys. The processor may identify which virtual activatable element the user intended to perform based on the key press input. For example, the user may push the "k" letter key, where the "k" letter key may be an additional virtual activatable element, creating a key press input. As another example, the user may push any numbered key, where the numbered key may be an additional virtual activatable element, creating a key press input.

Some disclosed embodiments may include causing a second change in the virtual content associated with the wearable extended reality appliance, wherein the second change corresponds to the identified one of the additional virtual activatable elements. The processor may cause a change (e.g., second change) in virtual content by adjusting the items displayed to a user based on, for example, the one or more key press inputs discussed above. For example, a user may press a virtual activatable element representing a caps lock key. In response, the processor may cause a change in virtual content by capitalizing text in a word document.

Some disclosed embodiments may include receiving a keyboard configuration selection and causing the wearable extended reality appliance to virtually project the additional virtual activatable elements to correspond to the selected keyboard configuration. In some embodiments, one or more keys of a physical keyboard may be blank (e.g., not be marked with any markings like letters or symbols), and those keys may not correspond to a function. Therefore, when a user presses any of those keys, there may be no corresponding change in the virtual content being displayed on the extended reality display. In contrast, when one or more virtual activatable elements are projected on the blank keys, the physical keyboard may reflect the keyboard configuration associated with the projected virtual activatable elements. Thus, for example, if the letter "K" is projected onto one of the blank keys, pressing of that key may cause the letter K to be displayed on the extended reality display. As another example, the keys of the physical keyboard may have a default function. The keys may contain physical graphics that correspond to the function. For example, a key may contain letters, numbers, or icons. Thus, for example, a keyboard may have a QWERTY or DVORAK layout and pressing one or more keys on the keyboard may cause a corresponding alphanumeric character to be represented on the extended reality display. When there is no projection onto the keyboard, the keys may maintain their default functionality. In contrast, when there is a projection by the wearable extended reality appliance, the physical keyboard may reflect the keyboard configuration as projected by the wearable extended reality appliance, and the default functionality may be turned off. For example, the default configuration of a certain key may be the letter "K". The projection of the wearable extended reality appliance may project the letter "I" onto that key of the keyboard. When the projection is active, pressing that key may cause the letter "I" to appear on the extended reality display. In contrast, when the projection is not active, pressing that same key may cause the default letter "K" to appear on the extended reality display.

Some disclosed embodiments may include selecting the additional virtual activatable elements based on at least one of a user action, a physical user location, a physical location of the wearable extended reality appliance, a physical location of the keyboard, or an event in a user environment. Different virtual activatable elements may be available based on a user action. For example, a user may open a video file, and based on the action, virtual activatable elements related to video editing may be available to the user. As another example, different virtual activatable elements may be available based on the physical location of the user, the wearable extended reality appliance, and/or the keyboard. For example, when a user is in a workplace environment, virtual activatable elements related to editing word documents may be available to a user. As another example, when a wearable extended reality appliance is located in a user's home office, virtual activatable elements related to changing display settings may be available to a user. As another example, when a keyboard is located in a public setting, virtual activatable elements related to volume adjustment may be available to a user. As another example, different virtual activatable elements may be available based on an event in a user environment. For example, a person other than the user may enter the user's environment. When a person other than a user enters the user's environment, virtual activatable elements related to sharing documents may not be available to the user.

Some disclosed embodiments may include determining whether the user is a wearer of the wearable extended reality appliance. The processor may determine that an individual wearing the wearable extended reality appliance is the same individual that may be performing operations in an extended reality environment. For example, a keyboard may include a camera. The processor may determine a user who provided input is the wearer of the wearable extended reality appliance based on image data from the camera. As another example, the wearable extended reality appliance may include a camera. The processor may determine a user who provided input is the wearer of the wearable extended reality appliance based on image data from the camera.

Some disclosed embodiments may include in response to a determination that the user is the wearer of the wearable extended reality appliance, causing the change in the virtual content associated with the wearable extended reality appliance. When the processor determines that the user providing the touch input is wearing the wearable extended reality appliance, the processor may cause a change in virtual content by adjusting the items displayed to the user based on the touch input. For example, a user who is wearing the wearable extended reality appliance may create a touch input by adjusting a display brightness scroll bar. The processor may determine that the user is wearing smart glasses based on image data from a camera and by comparing an image of wearer of the wearable extended reality appliance to an image of the user creating the input. The processor may change the virtual content based on the touch input by adjusting the brightness because the user is a wearer of the wearable extended reality appliance.

Some disclosed embodiments may include in response to a determination that the user is not the wearer of the wearable extended reality appliance, forgoing causing the change in the virtual content associated with the wearable extended reality appliance. A user who may not be wearing the wearable extended reality appliance may engage with the touch-sensitive surface. When a user not wearing the wearable extended reality appliance provides an input via the touch-sensitive surface, the processor may take no action and my not alter the displayed virtual content. The processor may determine that the user is not the wearer of the wearable extended reality appliance in the same manner the processor may determine that the user is the wearer of the wearable extended reality appliance. For example, a user may create a touch input by adjusting a volume scroll bar. The processor may determine that the user is not wearing smart glasses based on image data from a camera and by comparing an image of the wearer of a wearable extended reality appliance to an image of the user creating the input. The processor may not change the virtual content based on the touch input by not adjusting the volume because the user is not a wearer of the wearable extended reality appliance.

In some disclosed embodiments the user may be an individual other than a wearer of the wearable extended reality appliance. A touch input may be received from someone other than the wearer of the wearable extended reality appliance. The touch input may be from a user, not wearing the wearable extended reality appliance, engaging with the touch-sensitive surface. The processor may cause a change in the virtual content based on the determination that the user is not wearing the wearable extended reality appliance. For example, a user may be an individual who has permission to edit a shared word document, but the user may not be wearing a wearable extended reality appliance. The user may create a touch input that corresponds to typing in a shared word document. The processor may change the virtual content by adding the typed word into the shared word document based on the determination that the user is not wearing the wearable extended reality appliance, but the user does have editing permission.

In some disclosed embodiments the user is a wearer of a second wearable extended reality appliance and the second wearable extended reality appliance projects a second plurality of virtual activatable elements on the touch-sensitive surface. The second wearable extended reality appliance may virtually project an overlay on the touch-sensitive surface that may be displayed to the user using the second wearable extended reality device. The second wearable extended reality appliance may project virtually activatable elements in the same manner as the first wearable extended reality appliance.

Some disclosed embodiments may involve, based on the coordinate location of the touch input, determining that the touch input corresponds to a particular virtual activatable element of the second plurality of virtual activatable elements. The processor may determine that the touch input is located in a location that corresponds to a particular virtual activatable element. The processor may determine the locations of the second plurality of virtual activatable elements in the same manner as the processor determines the location of the plurality of virtual activatable elements. The particular virtual activatable element may be chosen from the second plurality of virtual activatable elements.

Some disclosed embodiments may include causing a second change in the virtual content associated with the wearable extended reality appliance, wherein the second change corresponds to the particular virtual activatable element of the second plurality of virtual activatable elements. A processor may cause a second change in virtual content by adjusting the items displayed to the user. The second change in content may be in response to a user, who may be wearing the wearable extended reality appliance, engaging with the touch-sensitive surface. For example, the processor may adjust the size of the display screens. As another example, the processor may add additional display screens or remove display screens. As another example, a processor may play audio or display pictures to a user. In some embodiments, the second change may be based on a virtual activatable element triggered by the user. For example, a user may trigger a virtual activatable element that corresponds to a zoom in feature. In response, the processor may change the virtual content by zooming in on the content. As another example, a user may trigger a virtual activatable element that corresponds to a delete feature. In response, the processor may change the virtual content by removing an item displayed to the user. In some embodiments, the second change in virtual content may be the same as the first change in virtual content. In another embodiment, the second change in virtual content may be different from the first change in virtual content. In another embodiment, the second change in virtual content may be associated with the second wearable extended reality appliance.

Hand gestures are important way of interaction with and control of extended reality systems and environments. Information about hand gestures obtained from images captured using image sensors included in wearable extended reality appliances may be insufficient. For example, when a hand is outside the field of view of the image sensors of the wearable extended reality appliance, or when the hand (or parts of the hand, such as a digit or a tip of a digit) is occluded in the field of view (for example, by another object or by other parts of the hand), identification of actions performed by the hand or of gestures may be challenging. Therefore, augmenting the images with data from other sensors, such as sensors of different types or sensors positioned elsewhere, is desired.

In some embodiments, a systems, methods, and a non-transitory computer readable medium configured for use with a keyboard and a wearable extended reality appliance combination in order to control a virtual display (or any other kind of virtual content, for example of a virtual content in an extended reality environment) is disclosed. The non-transitory computer readable medium may contain instructions that may be executed by at least one processor in order to perform operations. As discussed above, one or more input devices may be configured to allow one or more users to input information. For example, in some embodiments, a keyboard or keyboards may be used as the one or more user input devices that may be configured to allow one or more users to input information. As another example, in some embodiments, an integrated computational interface device in the form of a keyboard may be configured to allow one or more users to input information. A keyboard may allow a user to input text and/or alphanumeric characters using, for example, one or more keys associated with the keyboard.

By way of example, FIG. 33 illustrates an example of a keyboard and a wearable extended reality appliance in combination to control a virtual display, consistent with embodiments of the present disclosure. In some embodiments, virtual display 3310 may include a virtual display screen presented to a user by wearable extended reality appliance 3312. In some embodiments, keyboard 3311 may be a physical keyboard. In other examples, keyboard 3311 may be a virtual keyboard presented to a user by wearable extended reality appliance 3312. Keyboard 3311 may be separate from virtual display 3310. In some embodiments, wearable extended reality appliance 3312 may include a pair of smart glasses, a head mounted display, or any other implementation of a wearable extended reality appliance discussed herein.

Some embodiments may involve receiving, from a first hand-position sensor associated with the wearable extended reality appliance, first signals representing first hand-movements. A hand-position sensor may include any form of detector configured to determine a placement, location, pose, arrangement, orientation, movement, or any other physical characteristic of a human hand. The sensor may output location information, such as coordinates or other location-associated measurements or data. For example, in some embodiments, a sensor may detect a specific location, position, or displacement from a position. In some embodiments, the sensor may detect a location of a hand in a physical space. For example, the sensor may provide coordinate locations relative to a predetermined reference frame. As another example, the sensor may provide angular positions of the hand relative to a predetermined reference frame. A hand-position sensor may be located on the wearable extended reality appliance. For example, the hand-position sensor may be located on the wearable extended reality appliance. For example, the sensor may be located on the rim of a pair smart glasses. In some embodiments, the sensor may be located on the temple of the pair of smart glasses. In some embodiments, the sensor may be located on the lenses of the pair of smart glasses. As another example, a hand-position sensor may be located on the keyboard. In some embodiments, the sensor may be located on the one or more keys associated with the keyboard. In some embodiments, the sensor may be located in a housing of the keyboard. In some embodiments, the sensor may be located on a side of the keyboard.

In some embodiments, signals (e.g. the first signals) may represent hand-movements. Hand-movements may refer to movement of one or more portions of a user's hand, for example, movement of one or more fingers. By way of example, hand-movements may include changes in a position and/or pose of a user's fingers as the user types or enters information using a keyboard. In some embodiments, the changes in position may occur from the user's fingers interacting with the keys of a keyboard. In some embodiments, the changes in position and/or pose may occur from the user's fingers interacting with the trackpad of the keyboard. In some embodiments, the changes in position and/or pose may corresponds to the user's fingers interacting with a virtual object, such as a virtual control element, a virtual object located on a surface (such as the surface that the keyboard is placed on), a virtual object located in mid-air, and so forth. In some embodiments, the changes in position and/or pose may correspond to a gesturing of the user. As another example, hand-movements may include movement of a user's wrist, such as an up-down or side-to-side motion of a user's hand or a rolling movement of a user's wrist. It is also contemplated that hand-movements may include movement of a portion of the user's fore-arm adjacent to the user's wrist. It is further contemplated that hand-movements may also include one or more gestures made by a user with one or more fingers. For example, gestures may include placing one or more fingers on a trackpad (or any other surface) and sliding the one or more fingers horizontally or vertically to scroll, placing two or more fingers on the trackpad and pinching to zoom in or out, tapping one or more fingers on the surface, using one or more fingers to press down on the keys of the keyboard, or tapping one or more fingers on the surface while using one or more fingers to push down on the keys.

In some embodiments, first signals representing hand-movements may be received from a first sensor associated with the wearable extended reality appliance. For example, first signals may be received from a hand-position sensor associated with smart glasses. In such examples, the hand-position sensor may include, for example, an image sensor, a camera, a depth sensor, a radar, a Lidar, a sonar, or another type of location sensor. In some embodiments, the hand-position sensor may include a camera. The camera may capture a series of images of the user's hand-movements. The hand-movements may include the user's hand positioned at different locations or in different combinations. The user's hand may include one or more fingers and/or the user's wrist. The hand position-sensor may detect a change in location or position of, for example, the one or more fingers or the wrist based on the camera images. The camera may generate a signal representative of the change in location or position of one or more portions of the user's hand over time. In other examples, the camera may generate a signal in combination with a processor. In some embodiments, the hand-position sensor may include an image sensor. The image sensor may be configured to capture one or more images. The one or more images captured by the camera or the image sensor may be analyzed using a gesture recognition algorithm, a pose estimation algorithm, or a trained machine learning model to determine hand related data. The hand related data may include hand-movements, hand location, or hand poses. The first signals received from the hand-position sensor may represent first hand-movements, may represent hand location data, may represent hand identity data, or may represent hand pose data.

Figure 34:
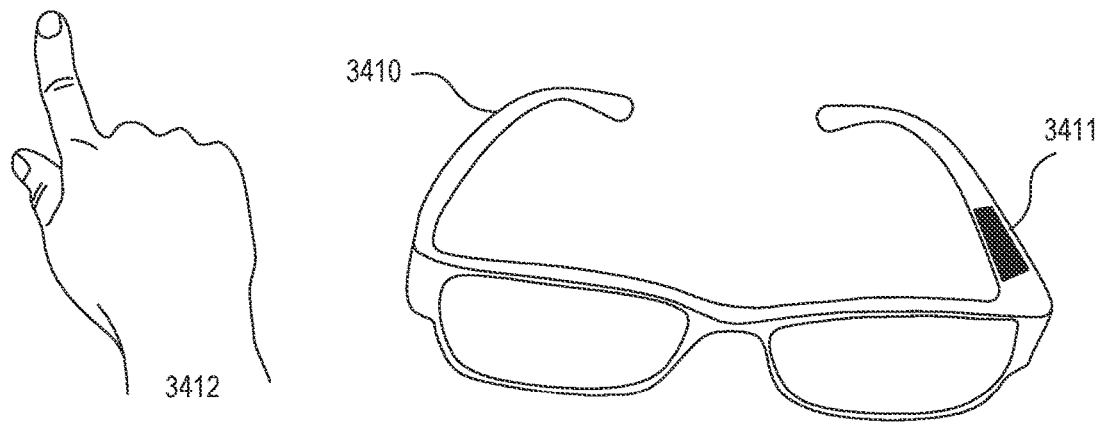
FIG. 34 illustrates an example of a first hand-position sensor associated with a wearable extended reality appliance, consistent with some embodiments of the present disclosure.

By way of example, FIG. 34 illustrates a first hand-position sensor associated with a wearable extended reality appliance. For example, as illustrated in FIG. 34, wearable extended reality appliance 3410 may include smart glasses. Wearable extended reality appliance 3410 may contain first hand-position sensor 3411. First hand-position sensor 3411 may be located anywhere on wearable extended reality appliance 3410. In some embodiments, the hand-position sensor may be located on the temple. In some embodiments, the hand-position sensor may be located on the lens. In some embodiments, the hand-position sensor may be located on the bridge. In some embodiments, the hand-position sensor may be located on the rim. Signals may be received from first hand-position sensor 3411. The signals may represent first hand-movements from hand 3412 of a user. In another example, the signals may represent a pose of hand 3412 of a user. In yet another example, the signals may represent a position of at least part of hand 3412 of a user.

In some embodiments, the first hand-movements may include an interaction with a no-feedback object. In some embodiments, one or more of the hand-movements (e.g., first hand-movements, second hand-movements) may include one or more interactions with a no-feedback object. A feedback object may include an object that provides a response to a user. The type of response provided by the feedback object may include audio feedback, tactile feedback, visual feedback, or other responses. In some embodiments, the feedback may be provided through one or more of audio output devices, textual output devices, visual output devices, or other devices. For example, audio feedback may be provided through one or more audio speakers, headsets, and/or other devices capable of producing a sound. Tactile feedback, for example, may be provided through vibrations, motions, shaking, and/or other physical sensations. Visual feedback may be provided in the form of one or more displays via a display screen, an LED indicator, an augmented reality display system, and/or other devices capable of generating a visual display of textual or graphical content. In contrast to a feedback object, a no-feedback object may not provide a response to a user when the user is using the no-feedback object. A no-feedback object may include, for example, a writing instrument (e.g. pen) or a fingertip that may write on a virtual screen projected by a wearable extended reality appliance. Other examples of no-feedback objects include non-electronic pointers, furniture, and inanimate, non-electronic objects. Portions of feedback objects may constitute no-feedback objects. For example, feedback objects have parts that do not provide feedback, and those parts may be considered no-feedback. A user may interact with a no-feedback object by touching the object with the user's hand. For example, a user may touch a wearable extended reality appliance with the user's fingers, and the wearable extended reality appliance may not provide a response to the user. In some embodiments, a no-feedback object may be or include an object (or any part of object) not configured to produce an electrical signal in response to an interaction. In some embodiments, a no-feedback object may be or include a nonreactive object (or any nonreactive part or nonreactive surface of an object).

Hand-movements may include actions including interactions with a feedback component. It is contemplated, however, that hand-movements may include actions other than interactions with a feedback component. Actions that include interactions with a feedback component may include one or more fingers of a user's hand pushing down on one or more keys of the keyboard. Interactions with a feedback component may also include, for example, a user's hand scrolling or pinching the touchpad of the keyboard. Actions other than interactions with a feedback component may include, for example, a user not engaging with the keyboard. Actions other than interactions with a feedback component may also include, for example, a user not touching a physical surface. For example, an action other than an interaction with a feedback component may include a user interacting with a virtual content (such as a virtual display) positioned in mid-air in an extended reality environment. As another example, an action other than an interaction with a feedback component may include a hand-movement outside a field of view of the wearable extended reality appliance. As another example, interactions with a feedback component may include a user's hand clicking or dragging fingers on a physical surface, such as a top surface of a desk or a table.

Some embodiments may involve receiving, from a second hand-position sensor second signals representing second hand-movements, wherein the second hand-movements include actions other than interactions with a feedback component. The second hand-position sensor may have similar structural and physical characteristics as the first hand-position sensor, and therefore the details previously described are not fully repeated. The second hand-position sensor may also be an image sensor or proximity sensor as described above. The second hand-position sensor may be located on the keyboard. The sensor may be located on one or more keys associated with the keyboard (e.g. the space bar and/or the function keys) and/or on the trackpad. The sensor may be located on either side of the keyboard and/or on the top and/or bottom of the keyboard.

It is also contemplated that the one or more signals generated by the first or second hand-position sensor may represent hand location data, hand identity data, or hand pose data. In other examples, the one or more signals generated by the first or second hand-position sensor may represent hand movement data. Hand location data may represent a relative location of a user's hand. For example, hand location data may represent a displacement of a user's hand measured relative to a specific point in space. For example, the digital signal associated with hand movement may represent a distance between a user's hand relative to the keyboard. Additionally, or alternatively, hand location data may represent an absolute location of a user's hand. For example, hand location data may be designated using a specific set of coordinate positions. Hand identity data may include information associated with a portion of a user's hand. For example, hand identity data may include position, velocity, acceleration, or other information indicating that a user's finger is performing an action. In another example, hand identity data may include position, velocity, acceleration, or other information indicating a user's wrist is performing an action. In some examples, hand identity data may be used to determine whether the hand is a hand of the user of the wearable extended reality appliance. As another example, hand identity data may be used to determine that the hand is not a hand of the user of the wearable extended reality appliance. Hand pose data may represent gestures made by a user with one or more fingers. For example, one or more digital signals generated by the first or second hand-position sensor may represent one or more gestures made by the user. Such gestures may include, for example, scrolling, pinching, tapping, and/or pressing using one or more fingers, and or other combinations of movements involving one or more fingers, wrist, and/or a forearm of the user.

In some embodiments, second signals representing hand-movements may be received from a second sensor associated with the keyboard. For example, a physical keyboard may include a sensor (an infrared proximity sensor, etc.) configured to detect movement of one or more portions of a user's hand over the keyboard. In some embodiments, the second hand-position sensor may include a proximity sensor configured to determine position of one or more portions of a user's hand when the hand is hovering over the keyboard. Inputs from such sensors may be used to provide visual indications of one or more gestures near the keyboard, for example, of gestures indicating a likelihood that a user may press a particular key or press one or more keys of a particular group of keys. For example, a depiction of a keyboard may be provided visually on a screen. A depiction of a keyboard may also be shown through a wearable extended reality appliance. The visual indication may be shown over the depiction of the keyboard. For example, one visual indication may be used to indicate a pressing of a key or of a group of keys, and another visual indication may be used to indicate a likelihood of an intention of a user to press a particular key, or indicating a likelihood of an intention of a user to press a one or more keys of a particular group of keys.

Figure 35:
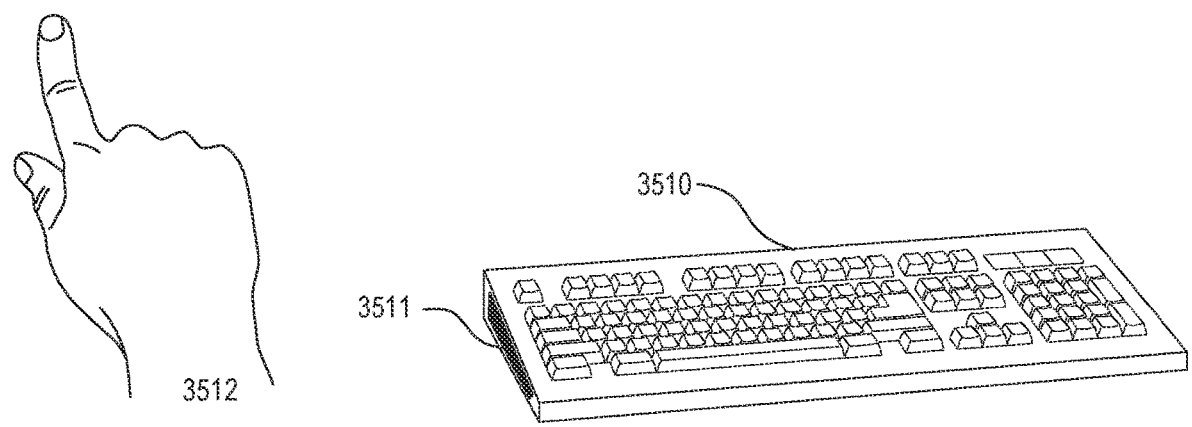
FIG. 35 illustrates an example of a second hand-position sensor associated with a keyboard, consistent with some embodiments of the present disclosure.

By way of example, FIG. 35 illustrates an example of a second hand-position sensor associated with a keyboard 3510 with second signals representing second hand-movements, consistent with some embodiments of the present disclosure. Keyboard 3510 may include second hand-position sensor 3511. Signals, representing hand-movements from hand 3512 of a user may be received from second hand-position sensor 3511.

In some embodiments, the keyboard may be located on a surface, and when located on a surface, the second hand-movements may include an interaction with the surface. In some embodiments, the surface may be a top surface of a desk. In some embodiments, the surface may be a top surface of a table. In some embodiments, the surface may be a floor. By way of example, a virtual controller or a widget may be displayed on the surface, for example by the wearable extended reality appliance. A virtual controller may include, for example, a volume bar, a brightness adjuster, or any other control that may allow a user to control a characteristic of the virtual display (or of any other kind of virtual content, for example of virtual content in an extended reality environment) or of the wearable extended reality appliance. The second signals may be analyzed to determine whether a hand is touching the surface. In response to the determination that the hand is touching the surface, an action may be performed. The actions may include controlling one or more characteristics (e.g., brightness, volume) associated with the virtual display (or with any other kind of virtual content, for example with a virtual content in an extended reality environment). In some embodiments, the keyboard may include a particular surface that may be configured to be substantially perpendicular to a first surface when the keyboard is placed on the first surface, and the second hand-position sensor may be included in the particular surface. In some embodiments, the keyboard may include at least two surfaces that are configured to be substantially perpendicular to the first surface, the at least two surfaces may include a surface closer to a space bar and a surface farther from the space bar, and the particular surface may be the surface farther from the space bar. The second hand-movements may include one or more interactions with either surface. The second hand-position sensor may include an image sensor and a field of view of the image sensor may include at least part of the surface, and therefore the processor may receive signals from the sensor representing hand-movements on either surface.

In some embodiments, at least one of the hand-position sensor may be an image sensor. The term "image sensor" is recognized by those skilled in the art and refers to any device configured to capture images, a sequence of images, videos, and so forth. Image sensors may include sensors that convert optical input into images, where optical input can be visible light (like in a camera), radio waves, microwaves, terahertz waves, ultraviolet light, infrared light, x-rays, gamma rays, and/or any other type of electromagnetic radiation. Image sensors may include 2D and 3D sensors. Examples of image sensor technologies may include: CCD, CMOS, or NMOS. 3D sensors may be implemented using different technologies, including: stereo camera, active stereo camera, time of flight camera, structured light camera, radar, range image camera, and other technologies capable of generating a display representing an object or a scene in three dimensions. The first signal may include image data in the form of one or more images captured using one or more image sensors. The one or more images may be analyzed using a machine learning model trained using training examples to determine hand related data (such as hand movements data, hand location data, hand pose data, hand-surface touch status data, and other data). Such training examples may include sample images together with corresponding hand related data indicating particular hand locations, hand poses, hand-surface touch statuses, or other data.

In some embodiments, at least one of the hand-position sensor may be a proximity sensor. The term "proximity sensor" may include any device configured to detect the presence of an object without physical contact with the object. Proximity sensors may use sound, light, infrared radiation (IR), or electromagnetic fields to detect a target.

In some embodiments, the one or more position sensors (e.g., hand position sensors) may generate one or more digital signals. The digital signals may consist of one, two, or any number of signals (e.g., first signals, second signals). Thus, for example, a first hand-position sensor may be configured to generate a first signal, which may be a digital signal. In some embodiments, the sensors may consist of one, two, or any number of sensors (e.g., first sensor, second sensor).

In some embodiments, a type of the second hand-position sensor differs from a type of the first hand-position sensor. As discussed above, there may be many different types of hand-position sensors. It is contemplated that in some embodiments, different types of hand-position sensors may be associated with different components of some disclosed embodiments. Different types of hand-position sensors may be selected so that the sensors may provide different types of signals. For example, the first hand-position sensor may be an image sensor, and the second hand-position sensor may be a proximity sensor. The first hand-position sensor may include an image sensor and may be configured to generate signals representative of hand-identity data. The second hand-position sensor, however, may include a proximity sensor configured to generate signals representative of hand-location data. By way of another example, the first hand-position sensor may be a proximity sensor and the second-hand position may be an image sensor. In some embodiments, the first hand-position sensor and the second hand-position sensor may be of the same type. For example, the first hand-position sensor and the second hand-position sensor may both include image sensors. As another example, the first hand-position sensor and the second hand-position sensor may both include proximity sensors.

Figure 36:
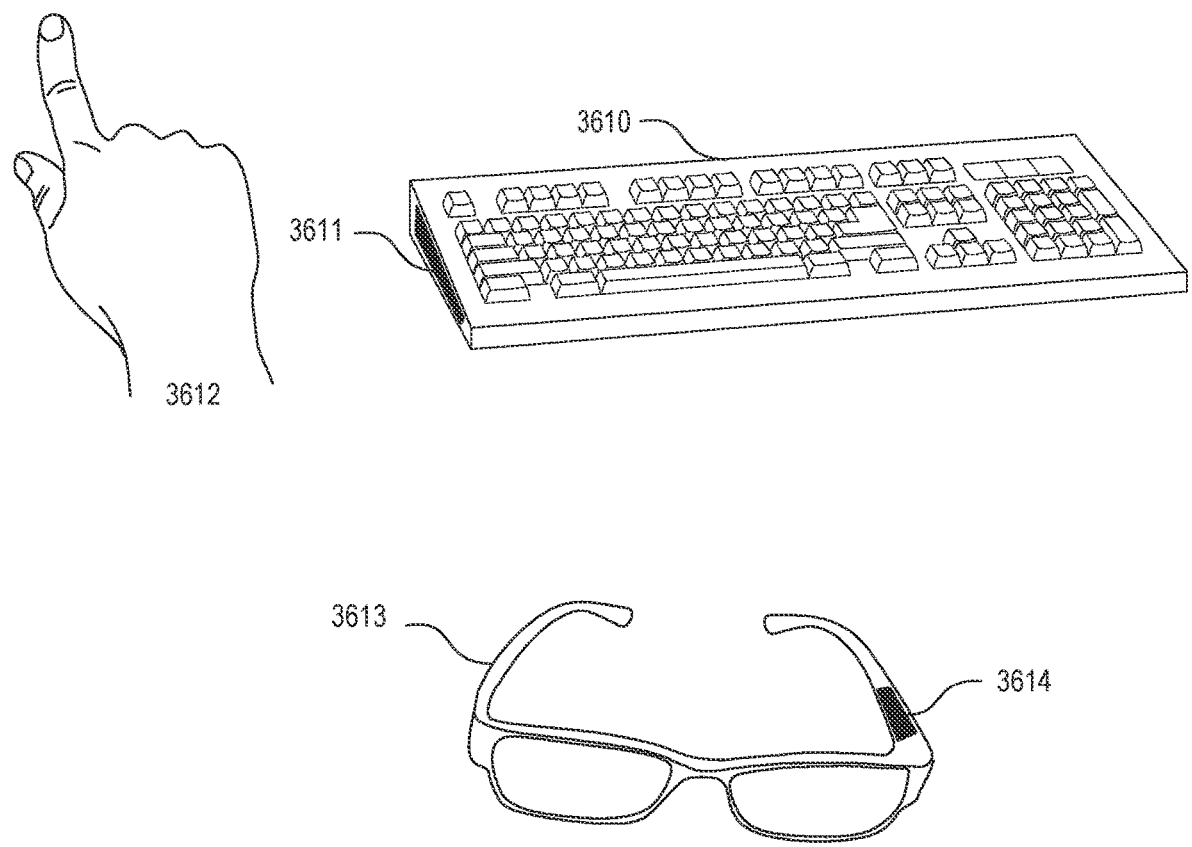
FIG. 36 illustrates an example of different types of first and second hand-position sensors, consistent with some embodiments of the present disclosure.

FIG. 36 illustrates an example configuration in which a type of second hand-position sensor differs from a type of first hand-position sensor. For example, as illustrated in FIG. 36, wearable extended reality appliance 3613 may include a pair of smart glasses. Wearable extended reality appliance 3613 may contain first hand-position sensor 3614 that may be a camera. As also illustrated in FIG. 36, keyboard 3610 may contain second hand-position sensor 3611 that may be a proximity sensor, which may be different from first hand-position sensor 3614. Second hand-position sensor 3611 may generate signals representing second hand-movements from hand 3612 of a user.

In some embodiments, the keyboard may include an associated input area, including a touch pad and keys, and wherein the operations may further include detecting the second hand-movements in the area outside the input area (for example, in an area including no keys, touchpads, trackpads, joysticks, or other forms of touch sensors). The keyboard may be configured to receive input from an input area and/or from the first hand-position sensor and the second hand-position sensor. The keyboard may include many different areas. In some embodiments, the keyboard may include one or more keys in the input area, for example including a standard keyboard such as QWERTY, Dvorak, or any other type of keyboard layout. The keyboard may include additional keys in the input area. For example, the one or more additional keys may include numeral entry keys or keys with math symbols. In some embodiments, the input area may further include a fingerprint reader. In some embodiments, the input area may include a trackpad and/or touchpad. A user may perform hand-movements that are outside of the input area associated with the keyboard. For example, the user may perform hand-movements that are not associated with the input area (for example, in an area including no keys, touchpads, trackpads, joysticks, or other forms of touch sensors). As one example, the user may touch a nonreactive surface of the keyboard or a nonreactive surface in the environment of the keyboard (such as a nonreactive surface that the keyboard is placed on). In another example, the user's hand-movements may occur in an area that is not near any portion of the keyboard.

Figure 37:
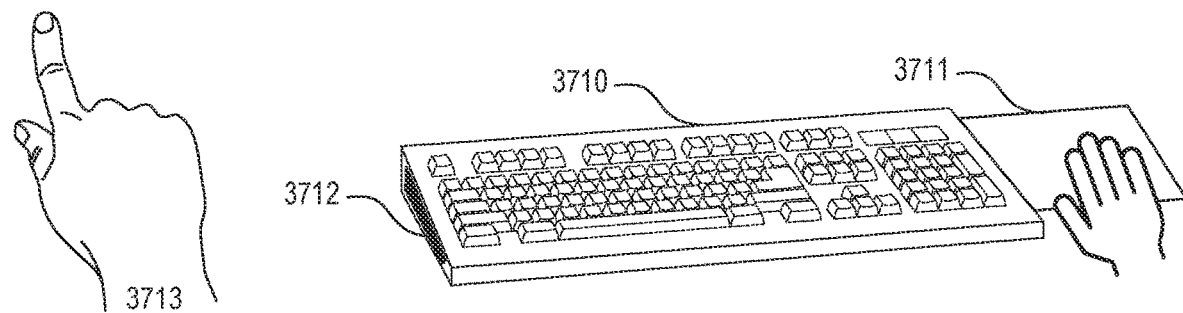
FIG. 37 illustrates an example of a keyboard that includes an associated input area including a touch pad and keys, consistent with some embodiments of the present disclosure.

By way of example, FIG. 37 illustrates an example of a keyboard that includes an associated input area including a touch pad and keys. For example, as illustrated in FIG. 37, keyboard 3710 may include input area including keys and touchpad 3711. Keyboard 3710 may be configured to receive input from one or more keys and/or touchpad 3711. In some embodiments, keyboard 3710 may include second hand-position sensor 3712. Second hand-position sensor may generate signals representing second hand-movements of hand 3713 of a user. As illustrated in FIG. 37, hand 3713 of a user may produce hand-movements that are in an area outside of the input area (not involving the keys and/or touchpad 3711). For example, hand 3713 may be making a gesture without touching any portion of keyboard 3710.

Some embodiments may involve controlling the virtual display (or any other kind of virtual content, for example virtual content in an extended reality environment) based on first and second signals. As used in this disclosure, controlling the virtual display may include altering an appearance or content of the virtual display. For example, the at least one processor may control the virtual display by adjusting one or more display settings. Adjusting one or more display settings may include, for example, adjusting the brightness, color temperature, sound, size of windows, fonts, resolution, pixel size, location, orientation, and so forth. Altering an appearance or content of the virtual display may include, for example, deleting or adding new windows, moving windows on or off the screen, or adding or deleting elements from the display. In some embodiments, the virtual display may be controlled based on the first and/or second signals. The processor may receive the first and/or second signals from one or more sensors associated, for example, with a keyboard or with a wearable extended reality appliance. Based on the received signals, the processor may control the virtual display (or any other kind of virtual content, for example controlling virtual content in an extended reality environment). For example, a processor may determine that a signal representing a hand-movement includes a user attempting to zoom in on the virtual display. The processor may determine that the hand-movement represents a zooming motion based on the user's hand gestures. The processor may control the virtual display by zooming in on a window based on the signals representing the hand-movement.

Some embodiments may involve controlling the virtual display based on the first signals and the second signals when a certainty level associated with at least of one of the first hand-movements or the second hand-movements is above a threshold. A certainty level may refer to a probability or degree of confidence in the determination that a user's hand moved in some manner. In some embodiments, the certainty level may be based on a magnitude of a distance or an angle by which some or all portions of the user's hand move from an initial position. For example, a sensor may be configured to detect a hand-movement only when a magnitude of the hand-movement (e.g., distance or angle by which the hand moved) is greater than a threshold magnitude. For example, the sensor may detect a hand movement, when a position of a user's hand changes by 1 mm, 5 mm, 10 mm, or any other desired unit of length. As another example, the sensor may detect a hand movement, when a user's hand is rotated by an angle of 1°, 5°, 10°, or any other desired angle. When the sensor determines that the hand-movements are below the threshold magnitude, the sensor may not generate a signal. When the hand-movement exceeds the threshold magnitude (e.g., 1 mm, 5 mm, 10 mm, or 1°, 5°, 10°), the sensor may generate and send a signal representing a hand-movement to the processor.

Some embodiments may involve analyzing the second signals to identify a first portion of the second signals associated with low ambient movements and a second portion of the second signals associated with high ambient movements. In one example, ambient movements may be or include movements of objects other than a hand (or other than the hand of the user). In some examples, a machine learning model may be trained using training examples to identify low and high ambient movements of signals. An example of such training example may include a sample portion of a signal, together with a label indicating whether the sample portion corresponds to low ambient movements or to high ambient movements. The trained machine learning model may be used to analyze the second signals and identify the first portion of the second signals associated with low ambient movements and the second portion of the second signals associated with high ambient movements. In some examples, an entropy of a portion of the second signals may be calculated, and the calculated entropy of the portion of the second signals may be compared with a selected threshold to determine whether the portion of the second signals corresponds to low ambient movements or to high ambient movements. In one example, the selected threshold may be selected based on a duration of time corresponding to the portion of the second signals. In another example, the selected threshold may be selected based on a distance of the hand from the second hand-position sensor corresponding to the portion of the second signals. In some examples, the virtual display (or any other kind of virtual content, for example virtual content in an extended reality environment) may be controlled based on the first signals, the second signals, and the identification of the first portion and the second portion of the second signals. For example, the virtual display (or any other kind of virtual content, for example virtual content in an extended reality environment) may be controlled based on the first signals and the first portion of the second signals, regardless of the second portion of the second signals. In another example, a different weight may be assigned to the first and second portions of the second signals, and the control of the virtual display may be based on the first signals and on a weighted function of the two portions of the second signals. In some examples, the weights may be selected based on an amount of ambient movement associated with each portion.

Some embodiments may further involve determining three-dimensional positions of at least part of a hand based on the first signals and the second signals and controlling the virtual display (or of any other kind of virtual content, for example controlling virtual content in an extended reality environment) based on the determined three-dimensional positions of the at least part of the hand. Three-dimensional positions may refer to coordinate locations relative to a set of coordinate axes. For example, a processor may determine a position and/or orientation of a part of a user's hand using three coordinate values (i.e. x, y, z) with reference to a set of Cartesian coordinate axes. As another example, a processor may determine the position and/or orientation of a part of the user's hand using polar coordinate values including a radius and two different planes perpendicular to each other. In some embodiments, the three-dimensional position may include a position of a user's finger, wrist, or any other part of the hand. The processor may receive signals based on the hand-movements of a user to determine where at least part of the user's hand is located relative to a reference location or relative to a predetermined set of coordinate axes. The processor may determine which part of the hand is performing a specific motion. For example, the processor may determine whether the fingers, the wrist, or any other portion of the user's hand is performing a specific movement. The processor may control the virtual display (or any other kind of virtual content, for example controlling virtual content in an extended reality environment) based on the specific motion. For example, a processor may determine that a thumb and forefinger are pinching together to perform a zoom in motion. The processor may zoom in on the virtual display based on the zoom-in motion.

In some embodiments, controlling the virtual display based on the first and second signals may involve controlling a first portion of the virtual display based on the first signals and controlling a second portion of the virtual display based on the second signals. A virtual display may include, for example, one or more objects, textual displays, graphical displays, windows, or icons. The processor may be configured to control one or more of these items (e.g., first portion of virtual display) based on signals received from the first sensor. The processor may also be configured to control other of the items (e.g., second portion of virtual display) based on signals received from the second sensor. In some embodiments, the first signals and second signals may represent different hand-movements or characteristics associated with the user's hand. For example, the at least one processor may determine that a hand is the hand of the user based on the first signals. The at least one processor may also determine that the user's hand is touching a surface based on the second signals. As another example, the at least one processor may determine that the user's hand is performing a certain gesture based on the second signals. Based on these determinations, for example, the at least one processor may control a first portion of a virtual display based on the first signals and a second portion of the virtual display based on the second signals. For example, the at least one processor may determine that a hand is the hand of the user and may give the hand permission to interact with the virtual display. For example, the at least one processor may select a window as a first portion of the virtual display based on the first signals. The processor may select a window as the first portion based on the user's hand touching a surface that represents a window. The processor may adjust the size of the window as the second portion of the virtual display based on the second signals. The processor may adjust the size of the window as the second portion based on the user's hand performing a gesture that represents a zoom in or out motion. As another example, the hand movement detected by the wearable extended reality appliance may control an input for a widget. The hand movement detected by the keyboard may control an input for another widget. In some embodiments, the first signals and second signals may represent the same hand-movements. For example, the at least one processor may determine that a user's hand is touching a surface based on the first signals. The at least one processor may further determine that the user's hand is touching the same surface based on the second signals. Based on these determinations, for example, the at least one processor may control a first and second portion of the virtual display by selecting a window, based on the first and second signals.

In some embodiments, the first portion and the second portion partially overlap. Thus for example, at least some part of each of the two portions of the virtual display that may be controlled based on the first and second signals may occupy the same positions on the virtual display. For example, the first and second signals may be analyzed to determine that a user's hand is touching a surface. A processor may determine that the first and second portion of the virtual display relate to a window in the virtual display. The first portion and the second portion may include the same window in the virtual display. As another example, a processor may determine that the first and second portion of the virtual display relate to two windows. The two windows may include portions that partially overlap. For example, a portion of one window may be overtop of a portion of another window.

In some embodiments, the first portion and the second portion are non-overlapping. For example, the first signals may be analyzed to determine that a user's hand is touching a surface. The second signals may be analyzed to determine that a user's hand is touching a key of the keyboard. The processor may control a first portion of the virtual display based on the first signals. For example, the processor may select a window as the first portion of the virtual display. One or more portions of the virtual display outside the selected window may form the second portion of the virtual display. The processor may control a second portion of the virtual display based on the second signals. For example, the processor may display text in the second portion of the virtual display outside the window selected based on the first signals in response to one or more keys selected by the user's hand.

In some embodiments, when at least one of the first hand-movements and the second hand-movements are detected by the second hand-position sensor and undetected by the first hand-position sensor, the operations may further include controlling the virtual display (or any other kind of virtual content, for example controlling virtual content in an extended reality environment) based only on the second signals. For example, at least one of the first hand-movements or the second hand-movements may be detected by the second hand-position sensor but may remain undetected by the first hand-position sensor. As one example, this may occur when the second hand-movements are outside a field of view of the first hand-sensor or when a portion of a user's hand is outside a field of view of the first hand-sensor. Although the second hand-movements may not be detectable by the first hand-sensor, they may be detected by the second hand-sensor. In such situations, the at least one processor may be configured to control the virtual display based only on the second signals.

In some embodiments, a keyboard may include a plurality of keys and operations may involve analyzing the second signals to determine a user intent to press a particular key of the plurality of keys and causing the wearable extended reality appliance to provide a virtual indication representing the particular key based on the determined user intent. For example, a processor may use the second signals to identify a key that a user may intend to press out of a plurality of keys. The processor may determine a user intent to press a particular key based on the proximity of the user's hand to a key. In another example, a processor may determine a user intent to press a particular key based on movement of a user's hand around a particular key. Based on the user intent, the processor may provide a sign to the user. The sign may indicate what key the user was planning to press out of the plurality of keys. The sign may be a visual indication. The visual indication may be provided through audio, visual, or tactile means. The visual indication may be provided through a sign, symbol, icon, letter, or graphical image. In another example, the visual indication may be provided by playing a sound file or through other audio cues.

In some embodiments, the keyboard may include a plurality of keys, and operations may involve analyzing the second signals to determine a user intent to press at least one of the group of keys out of the plurality of keys causing the wearable extended reality appliance to provide a virtual indication representing the group of keys based on the determined user intent. For example, a processor may be unable to determine a specific key that a user intends to press based on analysis of the second signals received from the second sensor. In some examples, the processor may be unable to determine a specific key because of the proximity of the user's hand to multiple keys. The processor may determine that the user intended to press at least one key out of a group of keys. The processer may determine the user intent based on proximity of certain keys. In another example, the processer may determine user intent based on the likelihood of certain keys being used together. For example, the processor may be able to determine words that the user is typing and determine the user intent based on letters that are likely to be used together to create the determined words. As another example, the group of keys may be keys that have similar functions. As another example, the group of keys may be keys that are located near each other. In response to the processor being unable to determine the user intent, the processor may display the group of keys to the user. The display may be through a visual indication. The visual indication may be provided through audio, visual, or tactile means as discussed above.

In some embodiments, when the wearable extended reality appliance is unconnected to the keyboard, operations may further involve controlling the virtual display (or any other kind of virtual content, for example controlling virtual content in an extended reality environment) based only on the first signals. For example, the wearable extended reality appliance may be separate from the keyboard. The wearable extended reality appliance may be physically or electronically separate from the keyboard. The wearable extended reality appliance may be physically separated from the keyboard when there is no mechanical element, such as a wire or cable or any other mechanical structure, attaching the appliance to the keyboard. The wearable extended reality appliance may be electronically separated from the keyboard when there is no exchange of data or communication between the appliance and the keyboard. In some embodiments, the wearable extended reality appliance may be wirelessly connected to the keyboard. The wearable extended reality appliance and the keyboard may be located in different areas. When the wearable extended reality appliance is separated from the keyboard, a user may be able to move freely in a space. The wearable extended reality appliance may also be used between two or more different users.

Some embodiments may further involve analyzing the second signals to determine that a hand is touching a part of a physical object associated with a virtual widget, analyzing the first signals to determine whether the hand belongs to a user of the wearable extended reality appliance, in response to a determination that the hand belongs to the user of the wearable extended reality appliance, executing an action associated with the virtual widget, and in response to a determination that the hand does not belong to the user of the wearable extended reality appliance, forgoing performing the action associated with the virtual widget. In using the system, a user may interact with a physical object. The physical object may be an article located in the physical space around the user. The physical space may include a table, chair, keyboard, or appliance that is within reach of the user. For example, a physical object may be a pen, pointer, a keyboard, or any object that a user may be able to hold. The physical object may be linked to a widget. A widget may be a module (physical or virtual) on the interface of a device that allows the user to perform a function. A module may include a window, icon, image, or other graphic object displayed on the virtual display. The processor may determine that the hand touching the physical object may belong to the user of the wearable extended reality appliance. When the hand does belong to the user, the processor may perform an action based on the user's interaction with the physical object. The action may control the virtual display. For example, when the user's hand performs a pinching motion, the processor may adjust the size of the widget. When the hand does not belong to the user, the processor may not perform an action, even if the user interacts with the physical object.

Some embodiments may further involve analyzing the second signals to determine a location where the hand is touching the physical object and using the determined location to select the action associated with the virtual widget. For example, the physical object may contain different locations that relate to different actions. A physical object may contain locations on the top, bottom, front, back, left side or right side of the object. For example, the top of the physical object may associate to a delete function. As another example, the bottom of the physical object may associate to an add function. The hand-position sensor may generate signals representing the location of where the user's hand is touching the physical object. The processor may associate the location with an action. In one example, the operations may perform the action in response to a first determined location. In another example, the operations may forgo performing the operation in response to a second determined location.

Some embodiments may further involve determining an orientation of the keyboard and adjusting display settings associated with the virtual display based on the orientation of the keyboard. An orientation may be a position in physical or virtual space. An orientation may also be a spatial relationship relative to another object in physical or virtual space. The determination of the orientation may be based on the first signals, the second signals, or data from other sensors. In some embodiments, first signals representing first hand-movements may determine an orientation of the keyboard. For example, first signals may represent a user's hand typing on a keyboard. The first signals may determine an orientation of the keyboard based on the one or more keys pressed by the user's hand. In another embodiment, second signals representing second hand-movements may determine the orientation of the keyboard. For example, second signals may represent the user's hand scrolling on a trackpad of the keyboard. The second signals may determine an orientation of the keyboard based on where a trackpad is located on the keyboard. For example, the trackpad may be located adjacent to a bottom edge of the keyboard. A trackpad may additionally or alternatively be located adjacent to a top edge of the keyboard. In some embodiments, a trackpad may additionally or alternatively be located on a left or right side of the keyboard. In some embodiments, one or more display settings associated with the virtual display may be adjusted based on a determined orientation of the keyboard. For example, the processor may determine, based on the determined orientation, that the virtual display should be oriented in a certain way relative to the keyboard. For example, when the virtual display is not in a certain position with the keyboard, the processor may move the windows on the display setting to be in a position with the keyboard.

In some embodiments, the wearable extended reality appliance may be selectively connectable to the keyboard via a connector located on a side closest to the space bar. The wearable extended reality appliance may be attached or detached to the keyboard via a connector. A connector may be any type of mechanical fastener for attaching the wearable extended reality appliance to the keyboard. In some embodiments, the connector may include a retractable cable connectable to the wearable extended reality appliance. The connector may also include a rigid cable. The connector may be placed at a side of the keyboard. For example, the connector may be located adjacent to a top edge of the keyboard, adjacent to a bottom edge of the keyboard, on a side farthest from the spacebar, or in any other portion of the keyboard. The connector may be located on a side closest to the space bar to prevent interference with other items in the user's physical space. When the wearable extended reality appliance may be connectable to a keyboard via a connector, the wearable extended reality appliance may be secured to the keyboard. The wearable extended reality appliance may not be at risk of being separated from the keyboard. When the wearable extended reality appliance may be connectable to a keyboard, the appliance may also send signals to the keyboard.

Figure 38:
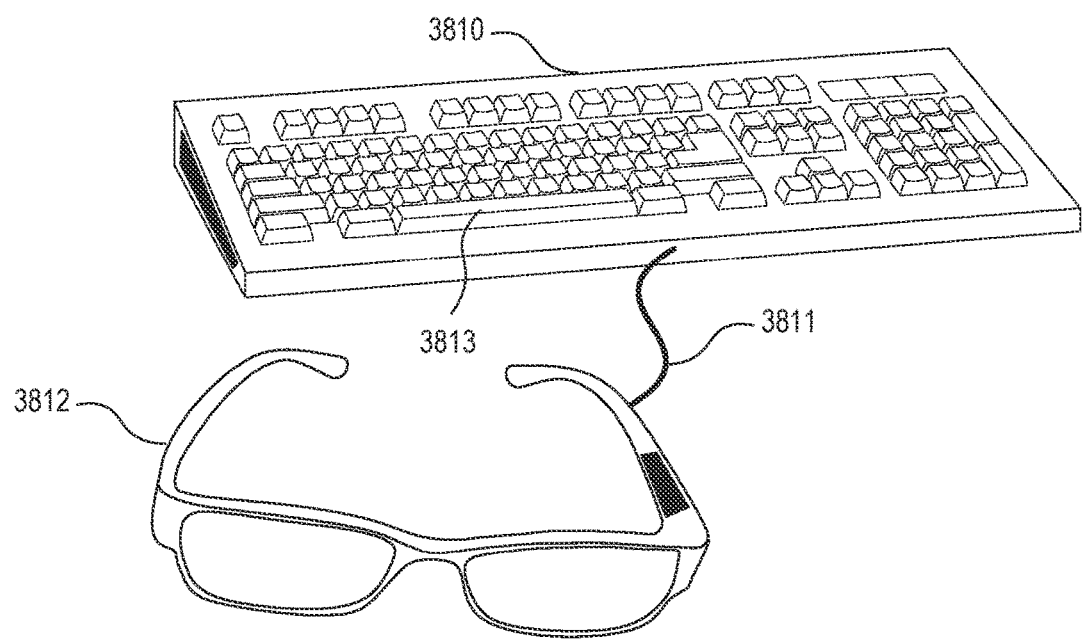
FIG. 38 illustrates an example of a wearable extended reality appliance selectively connectable to a keyboard via a connector, consistent with some embodiments of the present disclosure.

By way of example, FIG. 38 illustrates a wearable extended reality appliance selectively connectable to a keyboard via a connector. For example, as illustrated in FIG. 38, wearable extended reality appliance 3812 may include a pair of smart glasses. Wearable extended reality appliance 3812 may be selectively connectable to keyboard 3810 via connector 3811. Connector 3811 may be located on a side closest to space bar 3813.

Some disclosed embodiments may include a non-transitory computer readable medium for integrating a moveable input device with a virtual display projected via a wearable extended reality appliance. In some embodiments, when a user moves a moveable input device (e.g., a keyboard) while a wearable extended reality appliance (e.g., smart glasses) is in use, the virtual display projected through the wearable extended reality appliance may change to reflect the change in orientation and/or position of the moveable input device.

Some disclosed embodiments may relate to non-transitory computer readable medium containing instructions for integrating a moveable input device with a virtual display projected via a wearable extended reality appliance, the computer readable medium containing instructions that when executed by at least one processor cause the at least one processor to perform various steps. Non-transitory computer readable medium may refer to any type of physical memory on which information or data readable by at least one processor can be stored as discussed herein. Examples include Random Access Memory (RAM), Read-Only Memory (ROM), volatile memory, nonvolatile memory, hard drives, CD ROMs, DVDs, flash drives, disks, any other optical data storage medium, any physical medium with patterns of holes, a PROM, an EPROM, a FLASH-EPROM or any other flash memory, NVRAM, a cache, a register, any other memory chip or cartridge, and networked versions of the same. As used in this context, integrating may include, for example, joining, incorporating, or using any other method of combining one thing with another so they become a whole.

A moveable input device may include any physical device that may allow a user to provide one or more inputs, and which includes at least a portion that is movable from an initial position to an alternate position. The disclosed moveable input device may be configured to provide data to a computational device as discussed herein. The data provided to the computational device may be in a digital format and/or in an analog format. Some examples of the moveable input device may include a button, a key, a keyboard, a computer mouse, a touchpad, a touchscreen, a joystick, or another mechanism from which input may be received. For example, in some embodiments, a user may provide one or more inputs via a moveable input device by pressing one or more keys of a keyboard. As another example, a user may provide one or more inputs via a moveable input device by changing a position of a joystick by linear or rotational motion of the joystick. By way of another example, a user may provide one or more inputs via a moveable input device by performing one or more gestures (e.g., pinch, zoom, swipe, or other finger movements) while touching a touchscreen.

A wearable extended reality appliance may include any type of device or system that may be worn by or attached to a user for enabling the user to perceive and/or interact with an extended reality environment. The extended reality appliance may enable the user to perceive and/or interact with an extended reality environment through one or more sensory modalities. Some non-limiting examples of such sensory modalities may include visual, auditory, haptic, somatosensory, and olfactory. One example of the extended reality appliance is a virtual reality appliance that enables the user to perceive and/or interact with a virtual reality environment. Another example of the extended reality appliance is an augmented reality appliance that enables the user to perceive and/or interact with an augmented reality environment. Yet another example of the extended reality appliance is a mixed reality appliance that enables the user to perceive and/or interact with a mixed reality environment.

Consistent with one aspect of the disclosure, the extended reality appliance may be a wearable device, such as a head-mounted device, for example, smart glasses, smart contact lens, headsets, or any other device worn by a human for purposes of presenting an extended reality to the human. Typical components of wearable extended reality appliances may include at least one of: a stereoscopic head-mounted display, a stereoscopic head-mounted sound system, head-motion tracking sensors (such as gyroscopes, accelerometers, magnetometers, image sensors, structured light sensors, etc.), head mounted projectors, eye-tracking sensors, and additionally components described below. Consistent with another aspect of the disclosure, the extended reality appliance may be a non-wearable extended reality appliance. Specifically, the non-wearable extended reality appliance may include multi-projected environment appliances.

A virtual display may refer to any type of data representation that may be displayed by the extended reality appliance to the user as discussed herein. The virtual display may include a virtual object, inanimate virtual display, animate virtual display configured to change over time or in response to triggers, virtual two-dimensional content, virtual three dimensional content, a virtual overlay over a portion of a physical environment or over a physical object, a virtual addition to a physical environment or to a physical object, a virtual promotion content, a virtual representation of a physical object, a virtual representation of a physical environment, a virtual document, a virtual character or persona, a virtual computer screen, a virtual widget, or any other format for displaying information virtually. Consistent with the present disclosure, the virtual display may include any visual presentation rendered by a computer or a processing device. In one embodiment, the virtual display may include a virtual object that is a visual presentation rendered by a computer in a confined region and configured to represent an object of a particular type (such as an inanimate virtual object, an animate virtual object, virtual furniture, a virtual decorative object, virtual widget, or other virtual representation). The rendered visual presentation may change to reflect changes to a status object or changes in the viewing angle of the object, for example, in a way that mimics changes in the appearance of physical objects. In another embodiment, the virtual display may include a virtual computer screen configured to display information. In some examples, a virtual display may be a virtual object mimicking and/or extending the functionality of a physical display screen. For example, the virtual display may be presented in an extended reality environment (such as a mixed reality environment, an augmented reality environment, a virtual reality environment, etc.), for example using an extended reality appliance (such as a wearable extended reality appliance). In one example, a virtual display may present content produced by a regular operating system that may be equally be presented on a physical display. In one example, a textual content entered using a keyboard (for example, using a physical keyboard, using a virtual keyboard, etc.) may be presented on a virtual display in real time as the textual content is typed. In one example, a cursor may be presented on a virtual display, and the cursor may be controlled by a pointing device (such as a physical pointing device, a virtual pointing device, a computer mouse, a joystick, a touchpad, a physical touch controller, and so forth). In one example, one or more windows of a graphical user interface operating system may be presented on a virtual display. In one example, content presented on a virtual display may be interactive, that is, it may change in reaction to actions of users. In one example, a presentation of a virtual display may include a presentation of a screen frame, or may include no presentation of a screen frame.

Some disclosed embodiments may involve receiving motion signals associated with the moveable input device, the motion signals reflecting physical movement of the moveable input device. As used in this context, motion signals may include, for example, one or more values that represent a change in position, orientation, angle, direction, arrangement, configuration, speed, acceleration, or any other measure of relative position. As used in this context, physical movement may refer to a change of position, elevation, orientation, or rotation of the moveable input device. In some examples, motion signals of the moveable input device (e.g., a keyboard) may be received by a processor which may reflect physical movement of the moveable input device. For example, the processor may receive one or more motion signals that reflect a physical change in position or orientation from memory, from an external device outputting data, from values captured using a sensor (e.g., an image sensor capturing a picture of the physical change), or any other similar process of analyzing data. Non-limiting examples of physical movement may include, for example, a user displacing the keyboard by one inch, one foot, one yard, or by any other distance, a user rotating the keyboard by 1°, 10°, 90°, 180°, 270°, 360°, or by any other angle, a user pressing any key on the keyboard, a user tilting any one side of the keyboard in any direction, or any other change in place, position, orientation, or rotation. For example, a wearable extended reality appliance's (e.g., smart glasses) processor may receive motion signals that may include a series of values representing a change in position or orientation from the keyboard reflecting a rotation, displacement, translation, or any other change in a position or orientation of some or all portions of the keyboard.

Figure 45A:
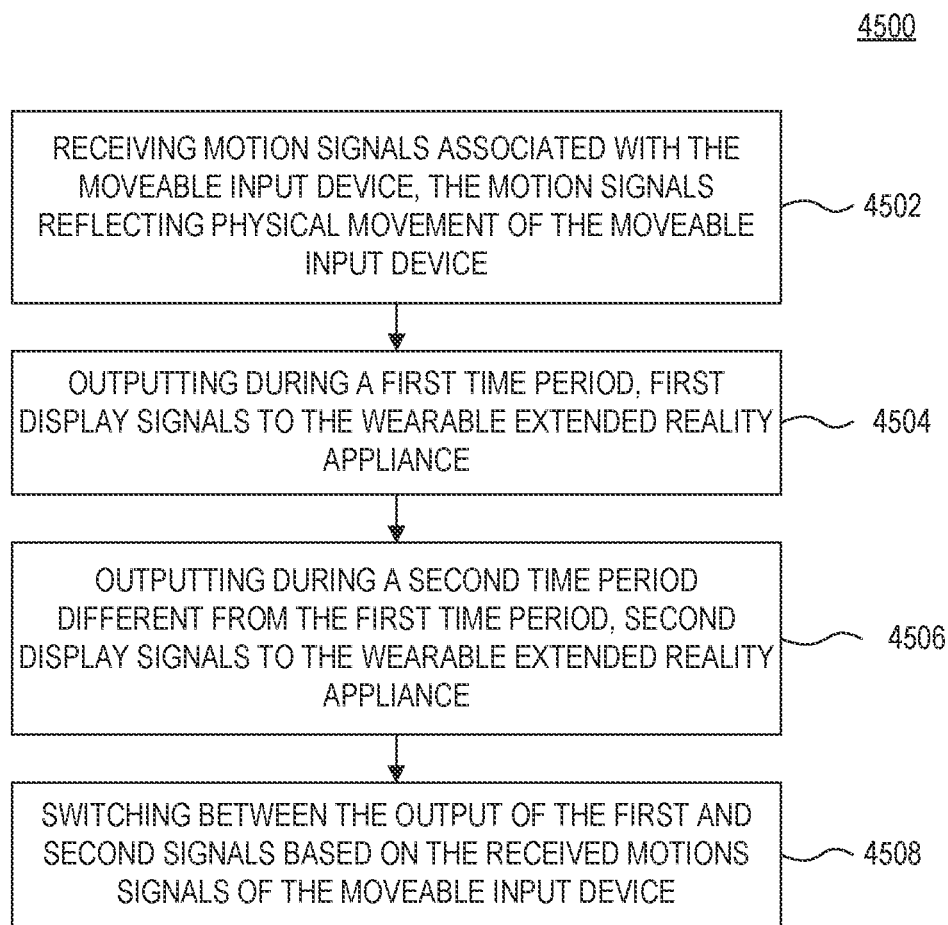
FIG. 45A illustrates an exemplary process for integrating a moveable input device with a virtual display projected via a wearable extended reality appliance, consistent with some embodiments of the present disclosure.

FIG. 45A illustrates an exemplary set of instructions 4500 to be executed by at least one processor for integrating a moveable input device 3902 with a virtual display 4112 projected via a wearable extended reality appliance (e.g., smart glasses). In some embodiments, the operations may be configured to include step 4502 for receiving motion signals associated with the moveable input device 3902 (e.g., a keyboard), the motion signals reflecting physical movement of the moveable input device. For example, the wearable extended reality appliance's processor may receive motion signals that may include a series of values representing a change in position or orientation, from the moveable input device 3902, for example reflecting rotation of the moveable input device 3902 by a particular angle (such as an angle smaller than 30°, an angle larger than 30°, 90°, etc.), reflecting displacement of the moveable input device 3902, and so forth.

Consistent with some disclosed embodiments, the motion signals of the moveable input device may be determined based on an analysis of data captured using at least one sensor associated with the input device. The at least one sensor may include, for example, a detector, instrument, or other device which measures a physical property of the moveable input device. The physical property measured by the at least one sensor may include a change in position, a velocity, an acceleration, a change in resistance, or a change in any other physical property associated with the moveable input device. According to some embodiments, an analysis of data may refer to a central processing unit (e.g., a processor) executing a sequence of stored instructions (e.g., a program) which takes inputs from the moveable input device, process the inputs, and output the results to an output device.

Advantageously, in some embodiments, a wearable extended reality appliance may include one or more sensors. The one or more sensors may include one or more image sensors (e.g., configured to capture images and/or videos of a user of the appliance or of an environment of the user), one or more motion sensors (such as an accelerometer, a gyroscope, a magnetometer, or any other similar sensor), one or more positioning sensors (such as GPS, outdoor positioning sensor, indoor positioning sensor, or any other similar sensor), one or more temperature sensors (e.g., configured to measure the temperature of at least part of the appliance and/or of the environment), one or more contact sensors, one or more proximity sensors (e.g., configured to detect whether the appliance is currently worn), one or more electrical impedance sensors (e.g., configured to measure electrical impedance of the user), one or more eye tracking sensors, such as gaze detectors, optical trackers, electric potential trackers (e.g., electrooculogram (EOG) sensors), video-based eye-trackers, infra-red/near infra-red sensors, passive light sensors, or any other technology capable of determining where a human is looking or gazing.

In some embodiments, the motion signals associated with the moveable input device may be based on an analysis of the data captured from a motion sensor. For example, a vision or image sensor may capture a plurality of images of the moveable input device. A processor associated with the vision or image sensor may be configured to analyze the images and determine that a position or orientation of some or all portions of the moveable input device has changed.

Consistent with some disclosed embodiments, the motion signals associated with the moveable input device may be determined based on an analysis of images of the moveable input device. As discussed above, an image may refer to a frame, group of pixels, figure, illustration, photograph, picture, digital data representing any of the foregoing, or other similar representation of the external form of an animate or inanimate object, person, or thing. Some non-limiting examples of an image of the moveable input device may include data output from an image sensor of the moveable input device, data derived from image sensor data, a picture (e.g., one or more frames) of the moveable input device, or a plurality of digital representations of the moveable input device. For example, an analysis of one or more images (e.g., data analysis) of the moveable input device may be used to determine the motion signals associated with the moveable input device, for example using an ego-motion algorithm, using visual object tracking algorithm, and so forth. An image sensor may capture one or more images of the moveable input device with each image containing data gathered by counting pixels. Thus, one image may be compared against another image to see where and how many pixels the two or more images contain to determine a difference which may be used to determine the motion signals associated with the moveable input device. This comparison of a sequence of one or more images may be used to determine, for example, a change in position, rotation, orientation, or other similar physical movement by the moveable input device. Advantageously, in some embodiments, the analysis may take into account whether the image is a photograph or picture of a keyboard or another moveable input device to determine the motion signals. For example, the images of the moveable input device may be captured using at least one image sensor included in a wearable extended reality appliance. In one example, visual tags configured to enable the detection of the moveable input device in the images may be attached to the moveable input device. In one example, the moveable input device may include light emitters configured to emit light configured to enable the detection of the moveable input device. The one or more light emitters may be configured to emit visible light, infrared light, near-infrared light, ultraviolet light, or light or electromagnetic waves of any wavelength or frequency.

Figure 39:
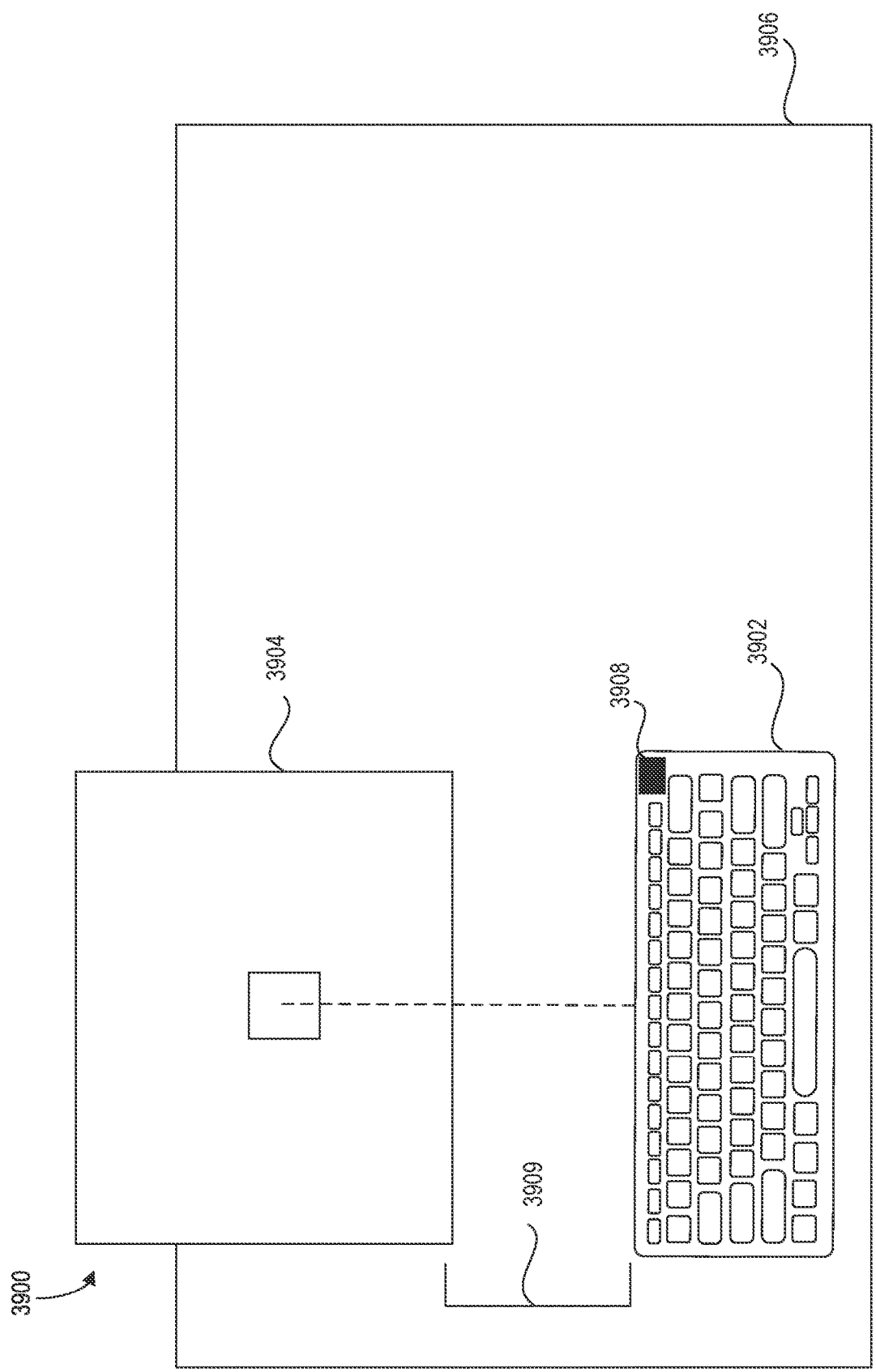
FIG. 39 illustrates an exemplary virtual display with a moveable input device at a first time period, consistent with some embodiments of the present disclosure.
Figure 40:
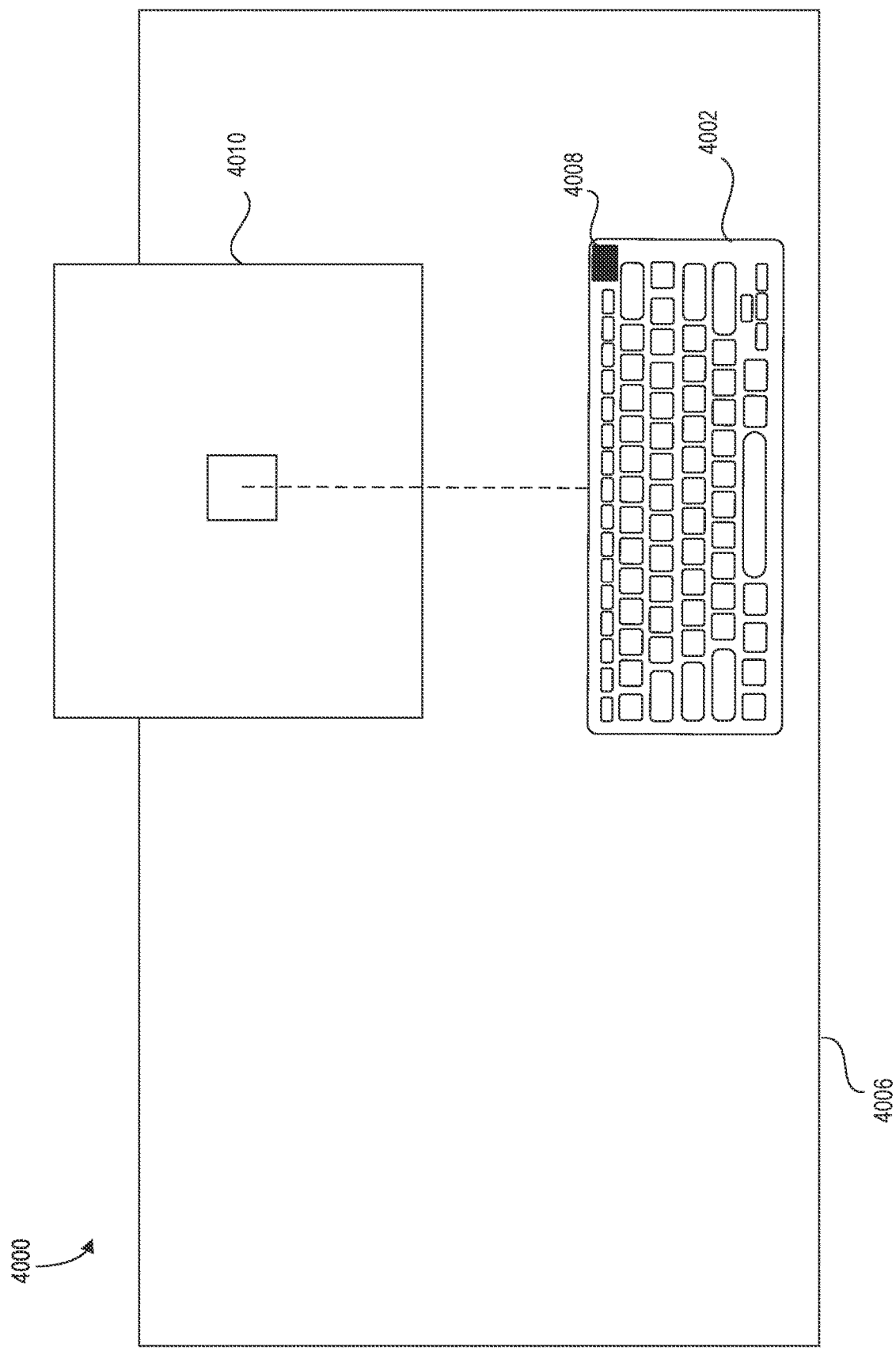
FIG. 40 illustrates an exemplary virtual display with a moveable input device at a second time period, consistent with some embodiments of the present disclosure.

By way of example, FIG. 40 depicts a scene 4000 with a moveable input device 4002, optionally with at least one sensor 4008, and a second virtual display 4010 at a different time, position, and orientation than the scene 3900 in FIG. 39. In one example, moveable input device 4002 may be placed on or in proximity to surface 4006. In one example, moveable input device 4002 may be the same input device as moveable input device 3902 at different points in time, first virtual display 3904 may be the same virtual display as second virtual display 4010 at different points in time, and/or surface 3906 may be the same surface as surface 4006 at different points in time. Some embodiments may be configured wherein the motion signals associated with the moveable input device 4002 (e.g., a keyboard) are determined based on an analysis of images of the moveable input device 4002. For example, an imaging sensor external to moveable input device 4002 (such as an image sensor included in a wearable extended reality appliance presenting virtual display 4010, an image sensor included in or mounted to surface 4006, an image sensor in an environment of moveable input device 4002, and so forth) may take an image of the moveable input device 3902 at a time, orientation, and position and take a different image of the moveable input device 4002 at a different time, orientation, and position and the processor may compare the differences in the two images to determine the motion signals, for example using a visual object tracking algorithm. Advantageously, a wearable extended reality appliance (e.g., smart glasses) may include a sensor (e.g., an imaging sensor) which may take an image or multiple images of the moveable input device 3902 at a time, orientation, and position and take a different image or images of the moveable input device 4002 at a different time, orientation, and position and the processor may compare the differences in the two images to determine the motion signals, for example using a visual object tracking algorithm. In other examples, the at least one sensor 4008 may be an imaging sensor configured to capture images from an environment of moveable input device 3902 at different points in time, and the captured images may be analyzed to determine the motion signals, for example using an ego-motion algorithm.

The vision or image sensor may generate signals representative of the change in position of the one or more portions of the moveable input device. By way of another example, at least one sensor 4008 may be an accelerometer, and data captured using the accelerometer may be analyzed to determine velocities or accelerations of one or more portions of the moveable input device. A processor associated with the accelerometer may be configured to analyze the measured velocities and/or accelerations and determine a change in a position and/or an orientation associated with one or more portions of the moveable input device. The accelerometer may generate signals representative of the change in velocity or acceleration of the one or more portions of the moveable input device. In another example, the one or more sensors may include a light source, such as a light-emitting diode, and/or a light detector, such as an array of photodiodes, to detect movement relative to a surface. A processor associated with a light sensor may be configured to use a beam of light to detect the presence or absence of an object associated with one or more portions of the moveable input device, and/or to determine the position and/or orientation of one or more portions of the moveable input device. The light sensor may emit a light beam (e.g., visible or infrared) from its light-emitting element and a reflective-type photoelectric sensor may be used to detect the light beam reflected from a target. For example, the light source may be part of an optical mouse sensor (also known as non-mechanical tracking engine) aimed towards a surface that moveable input device is placed on (such as a surface), and the motion of moveable input device may be measured with respect to the surface.

By way of example, FIG. 39 illustrates an exemplary scene 3900 including a moveable input device 3902, a first virtual display 3904, and a surface 3906. Moveable input device 3902 may include at least one sensor 3908 associated with the moveable input device 3902. The motion signals of the moveable input device 3902 (e.g., a keyboard) may be determined based on an analysis of data captured using at least one sensor 3908 (e.g., a motion sensor, image sensor, accelerometer, gyroscope, an optical mouse sensor, etc.) associated with the moveable input device 3902.

Consistent with some disclosed embodiments, the motion signals may be indicative of at least one of tilt movement, roll movement, and lateral movement of the moveable input device. By way of example, the motion signals may represent a tilt, a roll, or a lateral movement or change in an angle of a moveable input device relative to a horizontal, vertical, diagonal, or other plane. As used in this disclosure, tilt may refer to an act of changing physical location or position by an angle, inclination, slant, or other movement into a sloped location or position. As used in this disclosure, roll may refer to a gyration, rotation, spin, or another type of movement in a particular direction by turning over and over on an axis. As used in this disclosure, lateral may refer to forward-backward, sidewards, sideways, or any other type of movement in a single plane. For example, motion signals of the moveable input device may be received by a processor by way of receiving values that reflect a physical change in position, orientation, angle, or any other determination of the relative position of the moveable input device. By way of example, the moveable input device may tilt when the motion signals are representative of values reflecting a change of the moveable input device's position by 1°, 5°, 10°, −1°, −5°, −10°, or any other angle compared to a horizontal, vertical, diagonal, or other plane. By way of example, the moveable input device may roll when the motion signals are representative of values reflecting a change of the moveable input device about a fixed point, a point of rotation, by 1°, 5°, 10°, −1°, −5°, −10°, or any other angle compared to the point of rotation.

Figure 41:
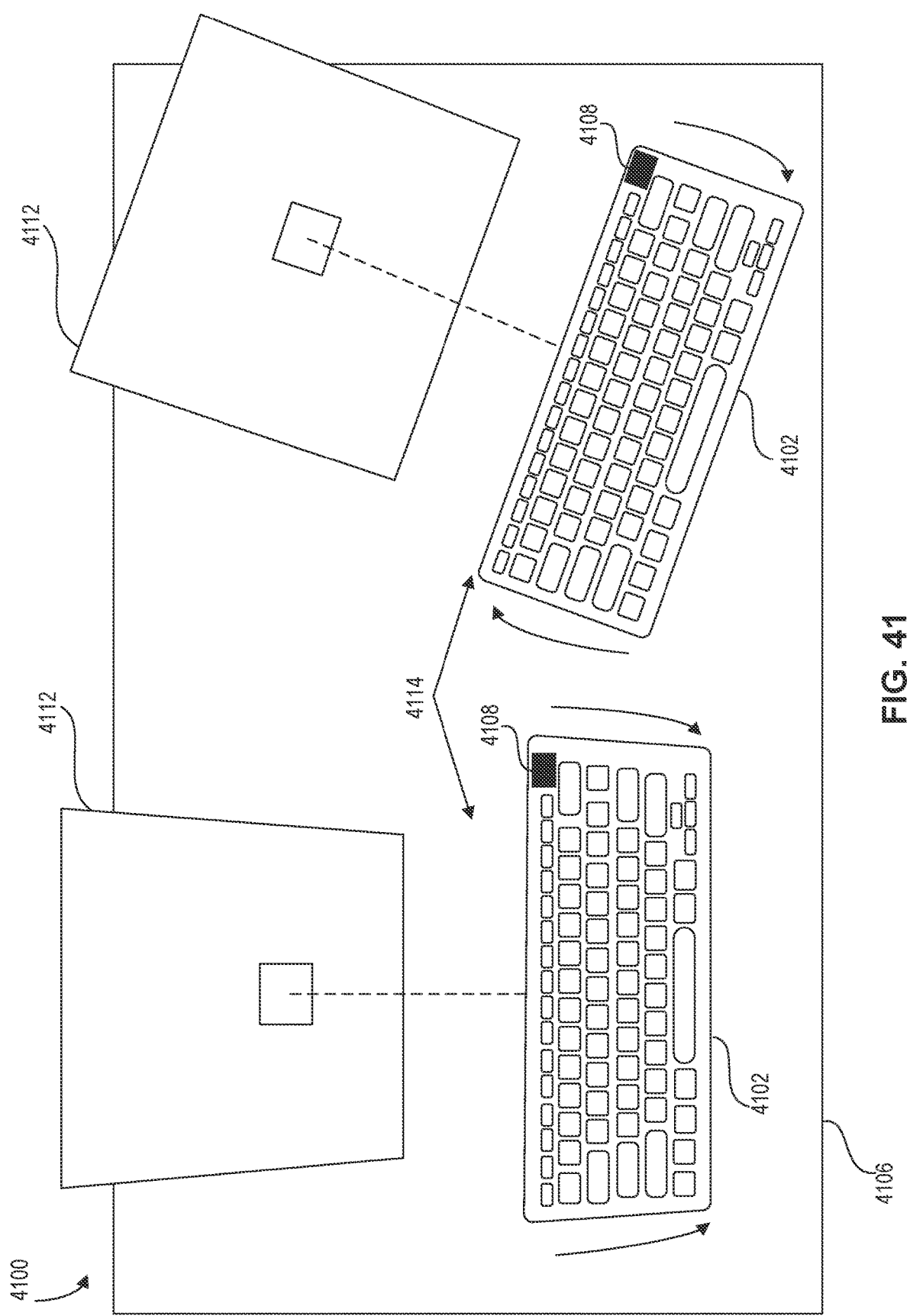
FIG. 41 illustrates an exemplary virtual display and a type of movement of a moveable input device, consistent with some embodiments of the present disclosure.

By way of example, FIG. 41 depicts a scene 4100 with a moveable input device 4102 (optionally with at least one sensor 4108 associated with the moveable input device 4102), a virtual display 4112, and a surface 4106. FIG. 41 also depicts two different non-limiting examples of a movement 4114 of the moveable input device 4102 (e.g., a keyboard). The left part of the scene in FIG. 3 illustrates the moveable input device 4102 moving 4114 (e.g., tilting) by a positive angle compared to a horizontal plane (that is parallel to the surface 4106). The right part of the scene in FIG. 3 illustrates the moveable input device 4102 moving 4114 (e.g., rotating) clockwise about a point of rotation in the center of the moveable input device 4102. Additionally, some embodiments may be configured wherein the motion signals may be indicative of at least one of tilt movement 4114, roll movement, and lateral movement of the moveable input device 4102.

Some disclosed embodiments may involve changing a size of the virtual display based on the received motion signals associated with the moveable input device. As used in this context, changing the size of a virtual display may include, for example, adjusting, modifying, or transforming a height, a width, a surface area, or any other dimension of the virtual display. Changing the size of the virtual display may additionally or alternatively include, for example, adjusting, modifying, or transforming angular relationships between different sides or features of the virtual display. In some embodiments, changing the size may include modifying some or all dimensions of the virtual display, using the same or different proportion or scaling factor. Some non-limiting examples may include changing the size of a virtual display by increasing or decreasing its height or width by one or more millimeters, one or more inches, one or more feet, or one or more of any other unit of length. Other non-limiting examples may include changing the size of the virtual display by increasing or decreasing its relative proportion (e.g., a ratio of two dimensions) by any type of ratio. For example, changing the size of the virtual display may include decreasing its height and width based on received motion signals associated with the moveable input device when the motion signals indicate that the moveable input device is moving through a doorway or into smaller space than the first position or orientation. As another example, changing the size of the virtual display may include increasing its height and width based on received motion signals associated with the moveable input device when the motion signals indicate that the moveable input device is moving out of a doorway or into a larger space than a first position or first orientation (a first position or first orientation different than another position or orientation). In one example, in response to first received motion signals (for example, corresponding to a motion larger than a selected threshold), the size of the virtual display may be changed, and in response to second received motion signals (for example, corresponding to a motion smaller than the selected threshold), changing the size of the virtual display may be withheld. In another example, the size of the virtual display after the change may be selected as a function of a motion corresponding to the received motion signals (for example, a function of a magnitude of the motion, a function of a direction of the motion, a function of a smoothness of the motion, and so forth).

Figure 43:
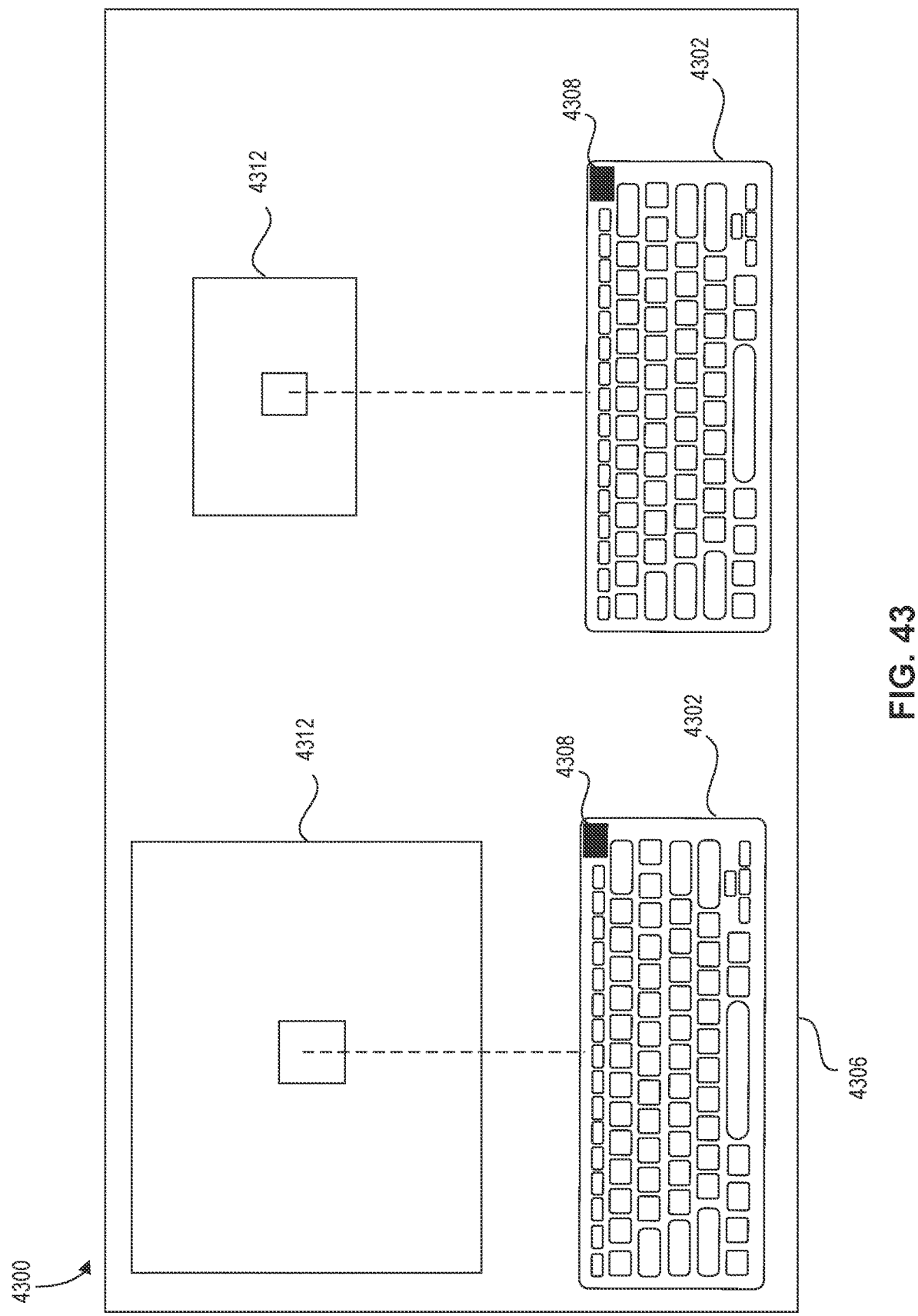
FIG. 43 illustrates a change in the size of an exemplary virtual display based on motion signals associated with a moveable input device, consistent with some embodiments of the present disclosure.

By way of example, FIG. 43 depicts a change in the size of a virtual display 4312 with a moveable input device 4302 (e.g., a keyboard, optionally with at least one sensor 4308 associated with the moveable input device 4302) and the virtual display 4312. For example, the steps may be configured to change the size of the virtual display 4312 by decreasing its relative proportion (e.g., a ratio of two dimensions) based on received motion signals associated with the moveable input device 4302 as depicted by FIG. 43.

Some disclosed embodiments may involve outputting during a first time period, first display signals to the wearable extended reality appliance. As used in this context, outputting may refer to sending a signal to a wearable extended reality appliance or to any display device. Display signals may include, for example, analog or digital electrical signals that may cause a display device to present content in the form of a virtual or digital representation. The virtual or digital representation may include, for example, one or more still or moving images, text, icons, video, or any combination thereof. The graphical display may be two-dimensional, three-dimensional, holographic, or may include various other types of visual characteristics. The at least one processor may cause one or more analog or digital signals to be generated and transmitted to a display device for presenting the graphical display for viewing by a user. In some embodiments, the display device may include a wearable extended reality appliance. For example, the at least one processor may cause one or more analog or digital signals to be generated and transmitted to the display device for presenting a movie, an emoji, a video, a text, or any combination thereof.

In some embodiments, the first display signals may be configured to cause the wearable extended reality appliance to virtually present content in a first orientation. As used in this context, virtually presenting content may include, for example, portraying, depicting, or rendering subject matter, material, or substance that may be computer-generated, computerized, simulated, digital, or generated using software instructions. For example, the first orientation may be determined as an angular position in relation to a particular position and a particular direction (for example, of a surface, of an object, of a coordinate system, of a surface that a moveable input device is placed on, of a coordinate system of a virtual environment, and so forth). The at least one processor may be configured to transmit display signals to cause a display device to present text, one or more pictures, a screenshot, a media clip, or other textual or graphical subject matter in a first orientation. The first orientation may include positioning the displayed content at any desired angle relative to reference axes or planes. For example, textual content may be displayed so that it is aligned horizontally with a surface of a table or a floor to enable a user to read the text. As another example, an image may be displayed so that it is inclined at a desired angle relative to the horizontal surface of a table of a floor. In one example, display signals (such as the first display signals, the second display signals, etc.) may include a depiction of the virtual display corresponding to a particular orientation (such as the first orientation, the second orientation, etc.), for example, a depiction in an image, a depiction in a video, and so forth. In such example, the wearable extended reality appliance may present the depiction included in the display signals. In one example, display signals (such as the first display signals, the second display signals, etc.) may include a spatial transformation corresponding to a particular orientation (such as the first orientation, the second orientation, and so forth). Some non-limiting examples of such spatial transformations may include a translation transformation, a rotation transformation, a reflection transformation, a dilation transformation, an affine transformation, a projective transformation, and so forth. In such example, the spatial transformation may be applied to a depiction of the virtual display to obtain a transformed depiction of the virtual display corresponding to the particular orientation, and the wearable extended reality appliance may present the transformed depiction of the virtual display. In one example, display signals (such as the first display signals, the second display signals, etc.) may include an indication of a desired orientation for the virtual display (for example, an indication of an angle, an indication of positions of particular points of the virtual display in an extended reality environment, and so forth). In such case, the indication of the desired orientation (such as the first orientation, the second orientation, and so forth) may be used to transform a depiction of the virtual display to obtain a transformed depiction of the virtual display corresponding to the desired orientation, and the wearable extended reality appliance may present the transformed depiction of the virtual display.

By way of example, exemplary set of instructions 4500 illustrated by FIG. 45A may include step 4504 wherein a processor outputs during a first time period, first display signals to a wearable extended reality appliance (e.g., smart glasses), the first display signals being configured to cause the wearable extended reality appliance to virtually present content in a first orientation as a first virtual display 3904 at a first time period.

Consistent with some disclosed embodiments, the motion signals may be configured to reflect physical movement of the moveable input device relative to a surface on which the moveable input device is placed during the first time period. A surface may include, for example, an exterior, top, side, external, outward, or an outside part or uppermost layer of an animate or inanimate object. Placing a moveable input device on a surface may include, for example, putting down, setting down, laying down, or positioning the moveable input device on the surface. By way of example, the moveable input device may be configured to be placed on a surface and the motion signals may be configured to reflect physical movement of the moveable input device relative to the surface on which the moveable input device is placed. In one example, the surface may be the top of a desk or table. Advantageously, the motion signals may be configured to reflect physical movement or movements (e.g., rotating, displacing, tilting) of the moveable input device (e.g., a keyboard) relative to the surface of the desk or table on which the moveable input device may be placed during a first time period.

Figure 42:
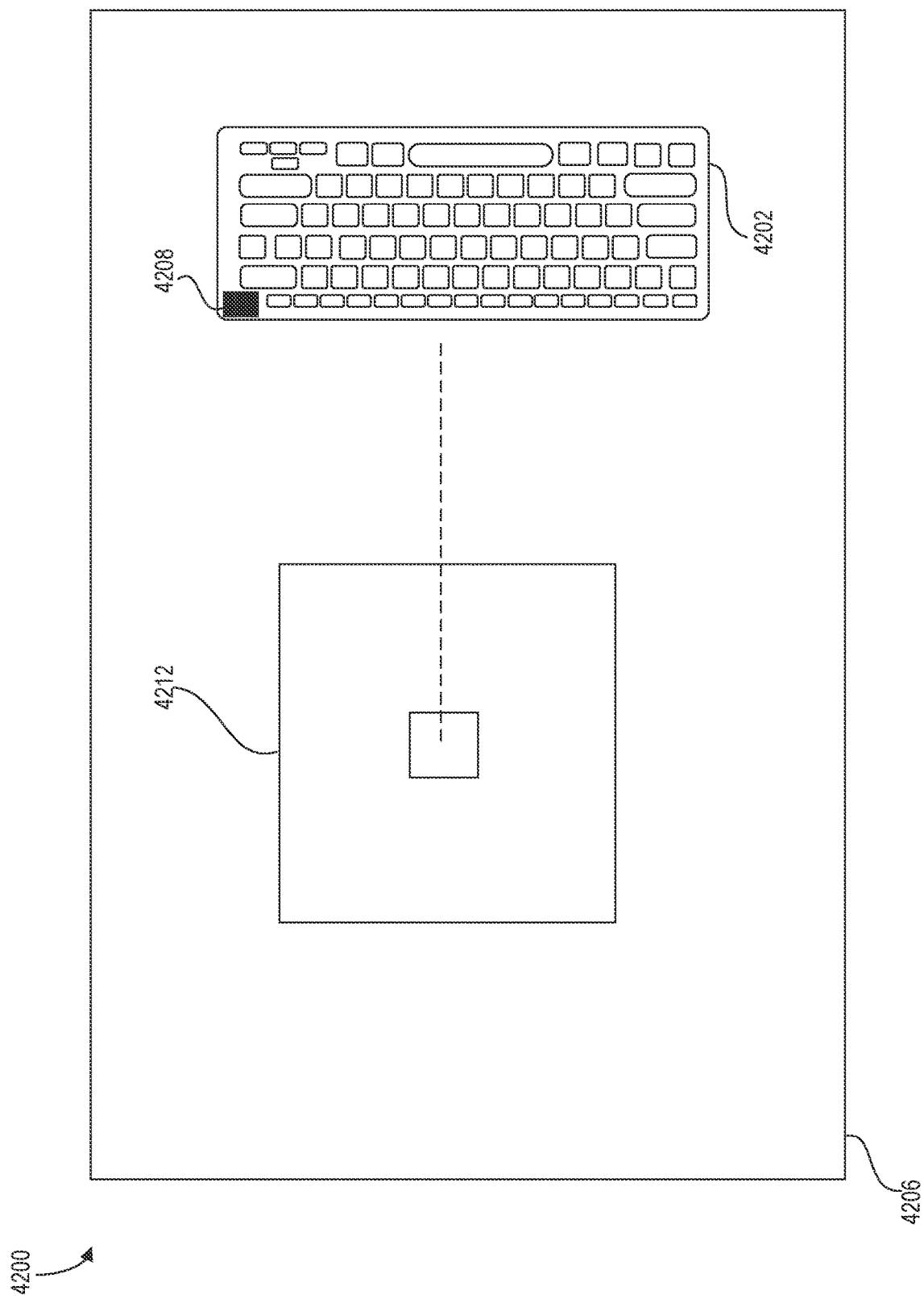
FIG. 42 illustrates an exemplary virtual display in a first orientation relative to a moveable input device before a first time period, consistent with some embodiments of the present disclosure.

By way of example, FIG. 39 illustrates reflected motion signals of the physical orientation and/or position of the moveable input device 3902 (e.g., a keyboard) relative to a surface 3906 on which the moveable input device 3902 is placed during a first time period. In FIG. 39, the moveable input device 3902 is depicted on the front-left of the surface (e.g., a desk). In FIG. 40, the moveable input device 4002 is depicted on the front-right of the surface. In FIG. 41, the motion signals reflect two physical movements 4114 (e.g., a tilt or a rotation) of the moveable input device 4102 relative to the surface 4106 (e.g., tilt by a positive angle compared to a horizontal plane that is parallel to the surface 4106 or clockwise rotation about a point of rotation in the center of the moveable input device 4102) on which the moveable input device 4102 is placed during the first time period. In FIG. 42, the moveable input device 4202 (optionally with at least one sensor 4208 associated with the moveable input device 4202) is depicted on the right side of the surface. In one example, moveable input device 4202 may be the same input device as moveable input device 3902 and moveable input device 4002 at different points in time, virtual display 4212 may be the same virtual display as first virtual display 3904 and second virtual display 4010 at different points in time, and/or surface 4206 may be the same surface as surface 3906 and surface 4006 at different points in time.

Some disclosed embodiments may involve determining the first orientation based on an orientation of the moveable input device before the first time period. An orientation of the moveable input device, as used in this context, may include at least one of a rotation, displacement, translation, location or a position. For example, the first orientation may be determined as an angular position in relation to a particular position and a particular direction, the particular position and/or the particular direction may be selected based on an orientation of the moveable input device before the first time period. In some embodiments, the first orientation may be determined during some portion of or of the first time period, before the first time period, and so forth. In some other examples, the first orientation may be determined based on an orientation of the moveable input device during the first time period. For example, a first orientation may be determined as an angular position in relation to a particular position and a particular direction, the particular position and/or the particular direction may be selected based on an orientation of the moveable input device during the first time period. Likewise, the second orientation may be determined based on an orientation of the moveable input device before the second time period, during the second time period, during the first time period, and so forth.

By way of example, FIG. 39 illustrates sensor 3908 (e.g., a motion sensor) that may generate one or more motion signals reflecting a position and/or orientation of moveable input device 3902 (e.g., a keyboard) during a first time period. Consistent with some disclosed embodiments, the at least one processor may further be configured to determine a first orientation of a first virtual display 3904 based on an orientation of the moveable input device 3902 before or during the first time period.

Consistent with some disclosed embodiments, the at least one processor may be configured to perform steps that may include outputting during a second time period different from the first time period, second display signals to the wearable extended reality appliance. A second time period may refer to a time period different than the first time period and second display signals refer to display signals different than the first display signals. The second display signal may include analog or digital signals different than the first display signal.

In some embodiments, the second display signals may be configured to cause the wearable extended reality appliance to virtually present the content in a second orientation different from the first orientation. That is, if the first orientation corresponds to one or more of a particular rotation, displacement, translation, or particular position rotation, displacement, translation, or particular position, the second orientation may correspond to at least one of a rotation, displacement, translation, and/or particular position that differs in at least some respect from the first orientation, For example, the second orientation may be determined as an angular position in relation to a particular position and a particular direction (for example, of a surface, of an object, of a coordinate system, of a surface that a moveable input device is placed on, of a coordinate system of a virtual environment, and so forth). The at least one processor may be configured to transmit display signals to cause a display device to present text, one or more pictures, a screenshot, a media clip, or other textual or graphical subject matter in a second orientation. The second orientation may include positioning the displayed content at any desired angle relative to reference axes or planes. For example, textual content may be displayed so that it is aligned horizontally with a surface of a table or a floor to enable a user to read the text. As another example, an image may be displayed so that it is inclined at a desired angle relative to the horizontal surface of a table of a floor. For example, the second display signals may be configured to cause the wearable extended reality appliance to virtually present the content in the second orientation different from a first orientation and/or in a second position different from a first position.

By way of example, FIG. 40 may illustrate a moveable input device 4002 (e.g., a keyboard) and a second virtual display 4010 at a second time period different than first virtual display 3904 at a first time period as shown in FIG. 39. By way of example, exemplary set of instructions 4500 illustrated by FIG. 45A may include step 4506 wherein a processor outputs during a second time period different from the first time period, second display signals to a wearable extended reality appliance (e.g., smart glasses), the second display signals being configured to cause the wearable extended reality appliance to virtually present the content in a second orientation as a second virtual display 4010 different from a first orientation as a first virtual display 3904.

Consistent with some disclosed embodiments, the motion signals may be received after the first time period and before the second time period. For example, the motion signals may be received at a time after a first time period and before a second time period. That is the motion signals may be received at a time that lies between the first and second time periods. In another example, the motion signals may be received during the first time period. In yet another example, the motion signals may be received during the second time period. In an additional example, the motion signals may be received before the first time period and the second time period. In one example, the first time period may be earlier than the second time period. In another example, the first time period may be later than the second time period. Consistent with other disclosed embodiments, the at least one processor may be configured to perform steps that may include enabling the wearable extended reality appliance to receive additional motion signals during the second time period, thereby enabling the wearable extended reality appliance to continuously adjust a virtual presentation of the content. As used in this context, additional motion signals may refer to signals received in addition to the other received motion signals, and may be received together with or separately from the other motion signals. Continuously adjusting in this context may refer to a series of adjustments (e.g., changes calibrations, and/or adaptions) in a time period. The continuous adjustments may be discrete individual adjustments that occur in a sequence, with or without intervening interruptions. In some embodiments, additional motion signals may be received during the second time period thus enabling the wearable extended reality appliance to continuously adjust a virtual presentation of content. For example, during the second time period, the wearable extended reality appliance (e.g., smart glasses) may receive additional motion signals to continuously adjust (e.g., change the size, change the type, change any other aspect) of the virtual presentation of the content. By way of another example, continuously adjusting the virtual presentation of content may take into account other physical or virtual objects in a space (e.g., when a user walks with a moveable input device the position and/or orientation of the content will change to avoid obstacles such as walls, persons, and other virtual or physical objects).

In some examples, an indication that a physical object may be located at a particular location in an environment of an input device may be received. In some examples, image data captured using an image sensor included in a first wearable extended reality appliance may be received. For example, the image data may be received from the image sensor, from the first wearable extended reality appliance, from an intermediate device external to the first wearable extended reality appliance, from a memory unit, and so forth. The image data may be analyzed to detect the physical object in the particular location in the environment. In another example, radar, LIDAR or sonar sensors may be used to detect the presence of the physical object at the particular location in the environment. In some examples, the second orientation may be selected based on the physical object being located in the particular location. In one example, the second orientation may be selected such that the virtually presented content, when presented in the second orientation, does not appear to collide with the physical object. In another example, the second orientation may be selected such that the virtually presented content, when presented in the second orientation, is not hidden (completely or partly) by the physical object to a user of the wearable extended reality appliance (for example, based on the location of the wearable extended reality appliance). In one example, a ray casting algorithm may be used to determine that the virtually presented content presented at a specific orientation is hidden by the physical object to the user of the wearable extended reality appliance. Further, the second display signals may be based on the selection of the second perspective of the scene.

Consistent with some disclosed embodiments, the at least one processor may be configured to perform steps that may include switching between the output of the first display signals and the output of the second display signals based on the received motions signals of the moveable input device. As used in this context, switching may refer to shifting, transitioning, modifying, altering, or changing in any other way between two or more items such as things, objects, positions, orientations, signals, events, or virtual displays. In some embodiments, switching between an output of a first display signal or first display signals and an output of a second display signal or second display signals may be based on received motions signals of a moveable input device (e.g., a keyboard). The received motion signals may reflect physical movement of some or all portions of the moveable input device such that a change in position, place, orientation, rotation, or other similar change in position. The at least one processor may be configured to switch or not switch between the output of first display signals and the output of second display signals. Alternatively, the received motion signals may reflect absence of physical movement of some or all portions of the moveable input device. The at least one processor may be configured to switch or not switch between the output of the first display signal or first display signals and the output of the second display signal or second display signals based on the received motion signals. For example, the received motion signals of the moveable input device may have a wearable extended reality device (e.g., smart glasses) switch from the output of the first display signal or first display signals to the output of the second display signal or second display signals. Additionally, or alternatively, the received motion signals of the moveable input device may have the wearable extended reality device switch from the output of the second display signal or second display signals to the output of the first display signal or first display signals. In one example, for example while outputting the first display signals, in response to a first received motion signals of the moveable input device, the steps may include switching from the output of the first display signals to the output of the second display signals, and in response to a second received motion signals of the moveable input device, switching from the output of the first display signals to the output of the second display signals may be withheld. In another example, for example while outputting the second display signals, in response to a third received motion signals of the moveable input device, the steps may include switching from the output of the second display signals to the output of the first display signals, and in response to a fourth received motion signals of the moveable input device, switching from the output of the second display signals to the output of the first display signals may be withheld. In some examples, the second display signals may be determined based on the received motion signals. For example, in response to one received motion signals of the moveable input device, first values may be selected for the second display signals, and in response to a different received motion signals of the moveable input device, second values may be selected for the second display signals, the second values may differ from the first values. In some examples, the second orientation may be determined based on the received motion signals. For example, in response to one received motion signals of the moveable input device, a first angle of the second orientation may be selected, and in response to a different received motion signals of the moveable input device, a second angle of the second orientation may be selected, the second angle may differ from the first angle.

By way of example, exemplary set of instructions 4500 illustrated by FIG. 45A may include step 4508 wherein a processor switches between the output of the first and second display signals based on received motion signals of a moveable input device 3902.

Some disclosed embodiments may involve switching between the output of the first display signals and the output of the second display signals when the physical movement of the moveable input device is greater than at least one threshold. As mentioned above the at least one threshold may refer to a reference or limit value, or level, or a range of reference or limit values or levels. In operation, when an amount of physical movement of the moveable input device exceeds the at least one threshold (or is below it, depending on a particular use case), the at least one processor may follow a first course of action and, when the amount of physical movement of the moveable input device is below it (or above it, depending on the particular use case), the at least one processor may follow a second course of action. The value of the at least one threshold may be predetermined or may be dynamically selected based on various considerations. Some non-limiting examples may include the at least one threshold to be a predetermined value of physical movement by one millimeter displacement, one inch displacement, one foot displacement, or any other amount of displacement. As another example, the at least one threshold may be a predetermined value of angular movement of 1°, 5°, 10°, −1°, −5°, −10°, or any other angle. When the amount of movement of the moveable input device is greater than or equal to the at least one threshold, the at least one processor may switch between an output of a first display signal or first display signals and an output of a second display signal or second display signals, and when the amount of movement of the moveable input device is less than or equal to the at least one threshold, switching between an output of a first display signal or first display signals and an output of a second display signal or second display signals may be withheld. In another example, when the amount of movement of the moveable input device is less than or equal to the at least one threshold, the at least one processor may switch between an output of a first display signal or first display signals and an output of a second display signal or second display signals.

In some embodiments, the at least one threshold may be a combination of one or more of a tilt threshold, a roll threshold, and/or a lateral movement threshold. In some embodiments the at least one threshold may include at least one threshold of a tilt, roll, or a lateral movement threshold. Alternatively, the at least one threshold may be configured to require at least two or all three movements: a tilt, a roll, and a lateral movement threshold. For example, when the at least one threshold is configured to be only a tilt threshold, then if the moveable input device (e.g., a keyboard) is tilted by physical movement, a processor may switch between an output of a first display signal or first display signals and an output of a second display signal or second display signals or between the output of the second display signal or second display signals and the output of the first display signal or first display signals.

In some embodiments, the at least one threshold may be selected based on a distance of the virtual display from the moveable input device during the first time period. As used in this context, distance may refer to a length, size, space, span, width, or any amount of space between two things. In one example, the at least one threshold may be a function of the distance of the virtual display from the moveable input device during the first time period. Some non-limiting examples of such function may include linear function, non-linear function, polynomial function, monotonic function, monotonically increasing function, logarithmic function, continuous function, non-continuous function, and so forth. In one example, the function may be selected based on at least one of the wearable extended reality appliance, a user of the wearable extended reality appliance, the moveable input device, a type of a surface that the moveable input device is placed on, one or more dimensions of a surface that the moveable input device is placed on, or whether or not the moveable input device is placed on a surface. In some other examples, the at least one threshold may be a function of the distance of the virtual display from the moveable input device during the first time period and an angle between the virtual display from the moveable input device during the first time period.

By way of example, FIG. 39 illustrates a distance 3909 between a first display 3904 and a moveable input device 3902. In some embodiments, at least one threshold may be selected based on the distance 3909 of the first virtual display 3904 from the moveable input device 3902 (e.g., a keyboard) during a first time period.

In some embodiments, the at least one threshold may be selected based on an orientation of the virtual display from the moveable input device during the first time period. For example, the at least one threshold may be selected based on an orientation (e.g., upright, upside down, parallel, perpendicular, or any other orientation) and/or a position (e.g., a middle, a corner, a side, a face, or any other position) of the virtual display with respect to a moveable input device (e.g., a keyboard) during a first time period. For example, the at least one threshold may be set to a higher value (e.g., one orientation and/or position of the moveable input device may require a larger threshold level than a different orientation and/or position) based on the orientation and/or position of the virtual display being upside down compared to upright or the virtual display being in the corner of a surface (e.g., a desk) compared to being in the middle of the desk. Alternatively, the at least one threshold may be set to a lower value (e.g., one orientation and/or position of the moveable input device may require a smaller threshold level than a different orientation and/or position) based on the orientation and/or position of the virtual display being upright compared to upside down or the virtual display being in the middle compared to being in the corner of the surface.

By way of example, FIG. 42 illustrates scene 4200 with a virtual display 4212 at an orientation and position at a first time period. In some embodiments, at least one threshold may be selected based on an orientation and/or position of the virtual display 4212 (e.g., rotated 90° and at a side of a surface 4206) during the first time period.

In some embodiments, at least one threshold is selected based on a type of the content. In some examples, content type may include images, text, symbols, codes, mixed media, or any other information presented, regardless of form. By way of example, the at least one threshold may be assigned a higher value when the content is textual as opposed to pictorial. As another example, the at least one threshold may be assigned a lower value when the content is a multi-media type content as opposed to being textual or pictorial. In some examples, content type may include private and public content. By way of example, the at least one threshold may be assigned a higher value when the content is public as opposed to private.

Consistent with some disclosed embodiments, the moveable input device may be configured to be placed on a surface and a value of the at least one threshold may be based on a type of the surface. As used in this context, type of surface may refer to a kind, variety, classification, dimensions, or other category having common characteristics. Some non-limiting examples of types of surfaces may include a table, a desk, a bed, a floor, a counter, a wall, and any other object having a surface. Other examples may include types of surfaces that are temporary (e.g., a dining table) and/or fixed (e.g., an office desk). For example, the moveable input device (e.g., a keyboard) may be configured to be placed on the surface of an office desk and a higher value of the at least one threshold may be based on the type of surface (e.g., the office desk). Alternatively, the moveable input device may be configured to be placed on the surface of a dining table and a lower value of the at least one threshold may be based on the type of surface (e.g., the dining table). For example, a higher value for the at least one threshold may be associated with the office desk, a fixed surface, because of the desk's inherent qualities (e.g., a greater shear force or greater resistance for physical movement of the moveable input device compared to a temporary surface). Another example may include a lower value for the at least one threshold associated with the dining table, a temporary surface, because of the dining table's inherent qualities (e.g., a lower shear force or lower resistance for physical movement of the moveable input device compared to a fixed surface). Additionally, or alternatively, the at least one threshold, when based on a type of surface, may be configured to have a lower or higher value because of temporariness of using the moveable input device on that particular surface (e.g., the moveable input device may be used more frequently on an office desk compared to a dining table). In one example, the at least one threshold may be a function of at least one dimension of the surface. Some non-limiting examples of such function may include linear function, non-linear function, polynomial function, monotonic function, monotonically increasing function, logarithmic function, continuous function, non-continuous function, and so forth.

By way of example, FIG. 39 illustrates a first virtual display 3904, a moveable input device 3902, and a surface 3906. In one example, the moveable input device 3902 may be placed on the surface 3906 (e.g., a surface of a desk) and a value of the at least one threshold may be based on the type of the surface. For example, the moveable input device 3902 may be placed on a temporary surface 3906 (e.g., a dining table) or a fixed surface 3906 (e.g., an office desk) and a threshold value may be assigned based on the type of surface.

Consistent with some disclosed embodiments, the wearable extended reality appliance may be configured to be paired with multiple moveable input devices and the first orientation may be determined based on default virtual display configurations associated with one of the multiple moveable input devices paired with the wearable extended reality appliance. As used in this context, multiple moveable input devices may refer to two, three, more than one, more than two, more than three, numerous, various, or several moveable input devices as discussed herein. Some non-limiting examples may include a wearable extended reality appliance paired with two moveable input devices, three moveable input devices, four moveable input devices, or any number of moveable input devices. When a wearable extended reality appliance is paired with more than one moveable input device, a first orientation of the virtual content may be determined based on a default virtual display configuration associated with any one of or more than one of the moveable input devices paired with the wearable extended reality appliance. For example, the wearable extended reality appliance (e.g., smart glasses) may be configured to be paired with multiple moveable input devices (e.g., a keyboard and a mouse) and the first orientation may be determined based on default virtual display configurations associated with either the keyboard or the mouse paired with the wearable extended reality appliance. Advantageously, different moveable input devices may be associated with different default virtual display configurations. For example, the default virtual display configuration for a mouse may be set with a virtual display on a user's right-hand side, with any type of color and/or font scheme for the virtual content, with a smaller display size, or any other predetermined configuration associated with a mouse. Other examples may include the default virtual display configuration for a keyboard which may be set with a virtual display directly in front of the user's view, with any type of color and/or font scheme for the virtual content, an automated introductory voice message (e.g., one welcoming the user), with a larger display size, or any other predetermined configuration or configurations associated with a keyboard.

Figure 44:
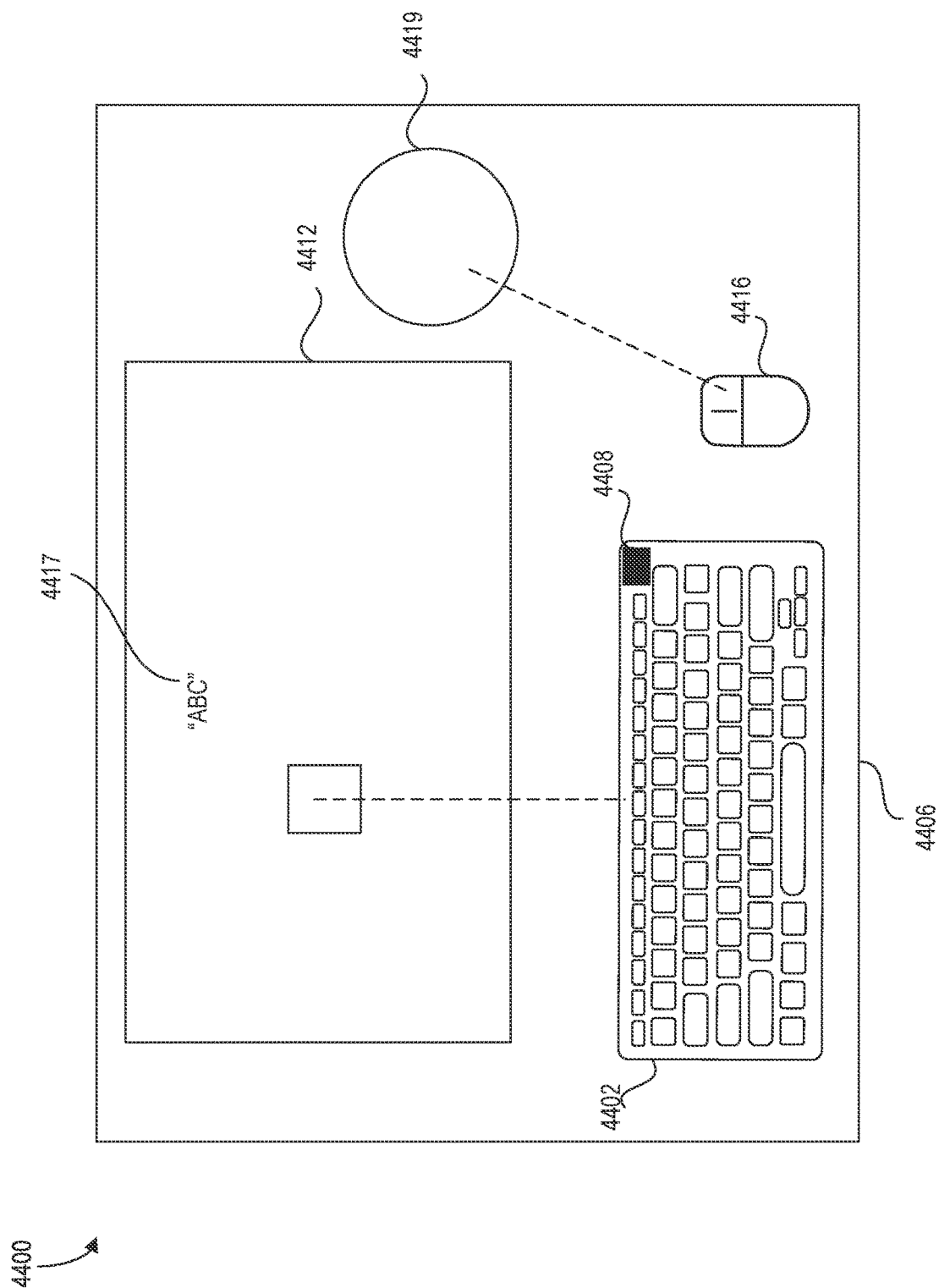
FIG. 44 illustrates an exemplary virtual display configured to enable visual presentation of textual input entered using a moveable input device, consistent with some embodiments of the present disclosure.

By way of example, FIG. 44 illustrates a scene 4400 with a moveable input device 3902 with at least one sensor 4408 associated with the moveable input device 4402, a virtual display 4412, a surface 4406, a second moveable input device 4416 at a time period, and a virtual display 4419 associated with the second moveable input device 4416. Some embodiments may be configured wherein a wearable extended reality appliance (e.g., smart glasses) may be paired with multiple moveable input devices (the moveable input device 4402 (e.g., a keyboard) and the second moveable input device 4416 (e.g., a mouse)) and the first orientation may be determined based on default virtual display 4112 configurations associated with one of the multiple moveable input devices paired with the wearable extended reality appliance.

Consistent with some disclosed embodiments, content may be a virtual display configured to enable visual presentation of textual input entered using the moveable input device. As used in this context, textual input may refer to any word, character, or string of characters entered into a system by a user or other device. Some non-limiting examples of textual input may include "HELLO," "HI," "A," "Hello World," "ABC," or any other combination of letters, words, or punctuation marks. For example, a virtual display may be configured to display textual input (e.g., "HELLO," "HI," "A," "Hello World.") entered using a moveable input device (e.g., a keyboard), for example in a user interface, in a text editor, and so forth.

Some disclosed embodiments may involve providing a visual indication outside the virtual display of textual input entered using the moveable input device when the virtual display is outside a field of view of the wearable extended reality appliance. As used in this context, visual indication may refer to any visual sign, indicator, mark, signal, or other sign or piece of information that indicates something. A field of view may refer to a line of sight, a line of vision, a peripheral field, a peripheral vision, or extent of an observable world that is seen at any given moment. Some non-limiting examples of a field of view may include a 210-degree forward-facing horizontal arc, 150 degrees, 60 degrees, 45 degrees, and so forth. Some non-limiting examples of a visual indication may include a "!," "WARNING," "Outside field of view,", a blinking light, a graphical symbol, or any other similar textual or graphical symbol, picture, video, or word. For example, a user may use a moveable input device (e.g., a keyboard) and enter textual input and when a virtual display (e.g., a screen) is outside a field of view (e.g., 210-degree forward-facing horizontal arc) of a wearable extended reality appliance (e.g., smart glasses), the at least one processor may cause the wearable extended reality appliance to display a symbol "!" as a visual indication outside the virtual display. In one example, when the moveable input device is in the field of view of the wearable extended reality appliance, the at least one processor may cause the wearable extended reality appliance to provide the visual indication over the moveable input device. In one example, when the moveable input device is in the field of view of the wearable extended reality appliance and the virtual display is outside the field of view of the wearable extended reality appliance, the at least one processor may cause the wearable extended reality appliance to provide the visual indication over the moveable input device. In one example, when both the moveable input device and the virtual display are outside the field of view of the wearable extended reality appliance, the at least one processor may cause the wearable extended reality appliance to provide the visual indication outside the virtual display and not over the moveable input device.

FIG. 45A illustrates an exemplary method 4500 for integrating a moveable input device with a virtual display projected via a wearable extended reality appliance. Method 4500 may be performed by one or more processing devices (e.g., 360, 460, or 560) associated with input unit 202 (see FIG. 3), XR unit 204 (see FIG. 4), and/or remote processing unit 208 (see FIG. 5). The steps of the disclosed method 4500 may be modified in any manner, including by reordering steps and/or inserting or deleting steps. Method 4500 may include a step 4502 of receiving motion signals associated with the moveable input device. The motion signals may reflect physical movement of the moveable input device. Method 4500 may include a step 4504 of outputting during a first time period, first display signals to the wearable extended reality appliance. The first display signals may be configured to cause the wearable extended reality appliance to virtually present content in a first orientation. Method 4500 may include a step 4506 of outputting during a second time period, second display signals to the wearable extended reality appliance. The second display signals may be configured to cause the wearable extended reality appliance to virtually present content in a second orientation different from the first orientation. Method 4500 may include a step 4508 of switching between the output of the first and second display signals based on the received motion signals of the moveable input device.

Figure 45B:
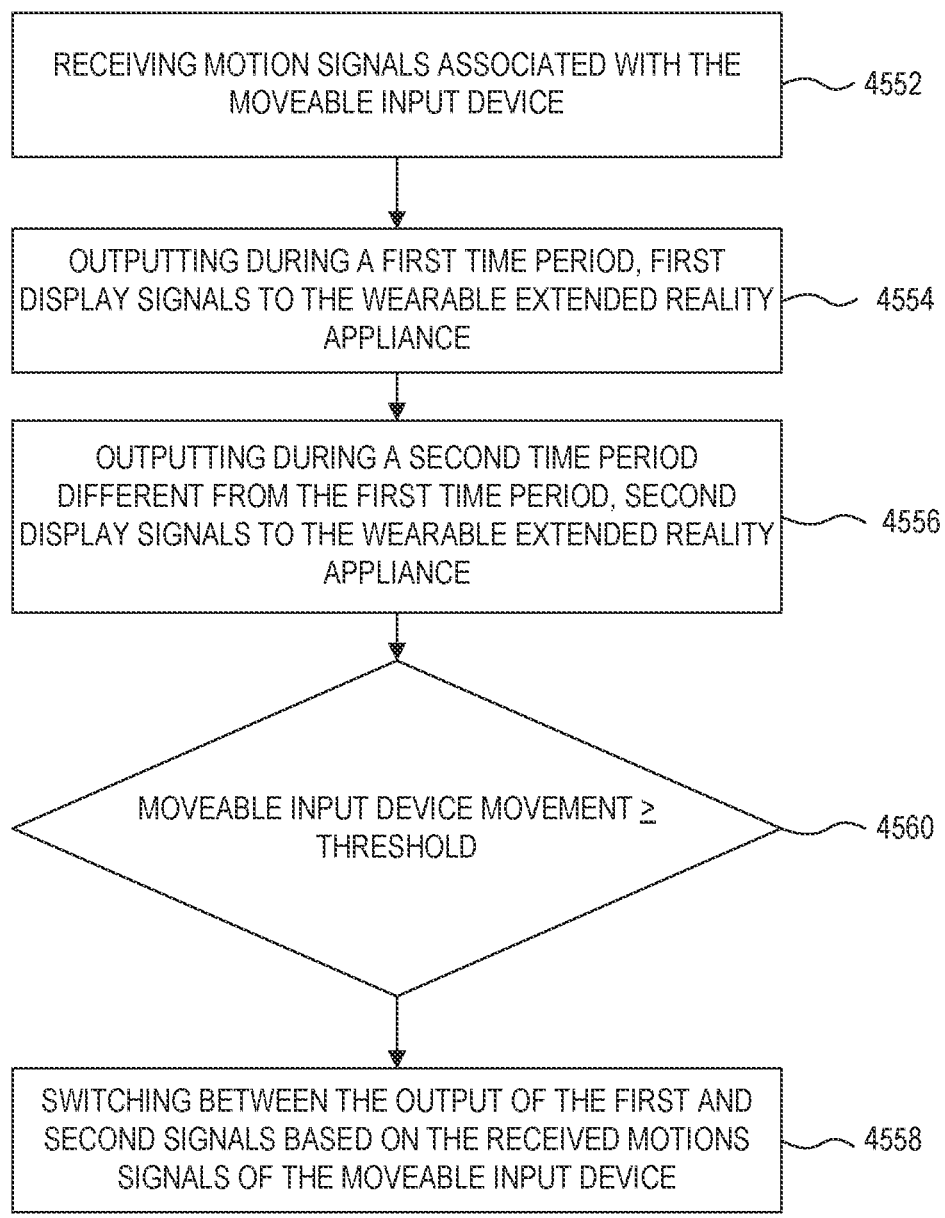
FIG. 45B illustrates another exemplary process for integrating a moveable input device with a virtual display projected via a wearable extended reality appliance, consistent with some embodiments of the present disclosure.

FIG. 45B illustrates another exemplary process for integrating a moveable input device with a virtual display projected via a wearable extended reality appliance. Method 4550 may be performed by one or more processing devices (e.g., 360, 460, or 560) associated with input unit 202 (see FIG. 3), XR unit 204 (see FIG. 4), and/or remote processing unit 208 (see FIG. 5). The steps of the disclosed method 4550 may be modified in any manner, including by reordering steps and/or inserting or deleting steps. Method 4550 may include a step 4552 of receiving motion signals associated with the moveable input device. The motion signals may reflect physical movement of the moveable input device. Method 4550 may include a step 4554 of outputting during a first time period, first display signals to the wearable extended reality appliance. The first display signals may be configured to cause the wearable extended reality appliance to virtually present content in a first orientation. Method 4550 may include a step 4556 of outputting during a second time period, second display signals to the wearable extended reality appliance. The second display signals may be configured to cause the wearable extended reality appliance to virtually present content in a second orientation different from the first orientation. Method 4550 may include a step 4560, if the moveable input device's movement is greater than the at least one threshold, then step 4558, may be performed wherein the step switches between the output of the first and second display signals based on the received motion signals of the moveable input device.

While ordinary extended reality appliances may present virtual objects to users, it may be desirable to extend a physical keyboard to a surrounding surface using a wearable extended reality appliance. This type of extended display may allow a user to interact with the keyboard beyond its physical limits. Additionally, maintaining a spatial orientation between the physical keyboard and its corresponding virtual keyboard may allow a user to continue interaction with the virtual keyboard when the user needs to move the physical keyboard without confusing the user. The following disclosure describes various systems, methods, and non-transitory computer readable media for virtually extending a physical keyboard.

A physical keyboard may include one or a combination of QWERTY keyboards (e.g., mechanical keyboards, membrane keyboards, flexible keyboards) or other types of computer keyboards (e.g., Dvorak and Colemak), a chorded keyboard, a wireless keyboard, a keypad, a key-based control panel, or another array of control keys, vision input devices, or any other mechanism for inputting text that is provided in physical form. A physical form may include an object that is tangible, palpable, concrete, or in any other manner has a material, as opposed to a virtual or transitory, existence.

Virtually extending a physical keyboard may involve copying, duplicating, continuing, developing, enhancing, augmenting, supplementing, connecting, associating, attaching, relating, affixing, correlating, coupling, tagging, interfacing, or in any other way linking the physical keyboard to a virtual environment. A virtual environment may include a simulated and non-physical environment that provides a user with the perception of being present in an environment that does not physically exist. For example, virtually extending a physical keyboard may involve duplicating the form of a physical keyboard in a virtual environment. As another example, virtually extending a physical keyboard may involve associating an object in the virtual environment with the physical keyboard.

Some disclosed embodiments may include receiving image data from an image sensor associated with a wearable extended reality appliance, the image data representing a keyboard placed on a surface. An image sensor may be included in any of the devices or systems in the present disclosure and may be any device capable of detecting and converting optical signals in the near-infrared, infrared, visible, and ultraviolet spectrums into electrical signals. Examples of image sensors may include digital cameras, phone cameras, semiconductor Charge-Coupled Devices (CCDs), active pixel sensors in Complementary Metal-Oxide-Semiconductor (CMOS), or N-type metal-oxide-semiconductor (NMOS, Live MOS). The electrical signals may be used to generate image data. Consistent with the present disclosure, the image data may include pixel data streams, digital images, digital video streams, data derived from captured images, and data that may be used to construct one or more 3D images, a sequence of 3D images, 3D videos, or a virtual 3D representation.

Consistent with one aspect of the disclosure, the extended reality appliance may be a wearable device, such as a head-mounted device including, for example, smart glasses, smart contact lens, headsets or any other device worn by a human for purposes of presenting an extended reality to the human. Other wearable extended reality appliances may include a holographic projector or any other device or system capable of providing an augmented reality (AR), virtual reality (VR), mixed reality (MR), or any immersive experience. Typical components of wearable extended reality appliances may include at least one of: a stereoscopic head-mounted display, a stereoscopic head-mounted sound system, head-motion tracking sensors (such as gyroscopes, accelerometers, magnetometers, image sensors, structured light sensors, etc.), head mounted projectors, eye-tracking sensors, and any other device that may be coupled to a wearable device.

A surface may include an area, exterior, side, top, plane, face, shell, cover, or any other outside part or upper boundary of an object or body. In one example, a surface may be the top of a table on which the keyboard is placed. In another example, a surface may be a lap of a user of a keyboard, such that the keyboard is placed on the lap of the user. The surface may encompass an area that is bigger than, smaller than, or equal to an area of the keyboard. In one example, the surface may be a top of a table. In some embodiments, the top of the table may be smaller than the keyboard. In other embodiments, the top of the table may be larger than the keyboard. In yet other embodiments, the top of the table may be the same size as the keyboard. The surface may include a single, continuous surface or any combination of a plurality of surfaces. For example, the surface may include a top of a first table that adjoins a top of a second table. As an example, in FIG. 47, the surface 4710 is depicted as the top of a table.

Some disclosed embodiments may include determining that the keyboard is paired with the wearable extended reality appliance. Pairing the keyboard with the wearable extended reality appliance may involve coupling, uniting, linking, affixing, conjoining, interfacing, joining, or in any other way connecting the keyboard to the wearable extended reality appliance. The pairing between the keyboard and the wearable extended reality appliance may include any or a combination of one or more of a wired or wireless pairing. A pairing may include either a wired pairing or a wireless pairing. A wired pairing may utilize coaxial cables, Ethernet, or any other channel that transmits information over a wired connection between the keyboard and the wearable extended reality appliance. A wireless pairing may utilize WiFi, Bluetooth™, or any other channel that transmits information without a wired connection between the keyboard and the wearable extended reality appliance. In another example, the pairing may utilize indirect communication between the keyboard and the wearable extended reality appliance, for example through an additional computerized system and/or a communication network. The additional computerized system may control an extended reality environment presented through the wearable extended reality appliance. In yet another example, the pairing of the keyboard with the wearable extended reality appliance may include a configuration that causes text typed using the keyboard to be presented via the wearable extended reality appliance, for example in a virtual display presented via the wearable extended reality appliance, for example in a text editor and/or in a user interface presented on the virtual display.

Determining that the keyboard is paired with the wearable extended reality appliance may involve detecting signals from a proximity, pressure, light, ultrasonic, position, photoelectric, motion, force, electrical, contact, non-contact, or any other type of sensor. In some examples, determining that the keyboard is paired with the wearable extended reality appliance may be based on a detection of the keyboard in an image captured by an image sensor included in the wearable extended reality appliance. In some examples, determining that the keyboard is paired with the wearable extended reality appliance may be based on a detection of a visual code associated with the keyboard in an image captured by an image sensor included in the wearable extended reality appliance. In some examples, determining that the keyboard is paired with the wearable extended reality appliance may be based on a detection of a light emitted by a light emitter included in the keyboard in a data captured by a sensor included in the wearable extended reality appliance.

Some disclosed embodiments may include receiving an input for causing a display of a virtual controller in conjunction with the keyboard. An input may involve a user input or a sensor input or a data input. In some embodiments, the input may be a user input, or one in which a user enters an input through an input device. The input device may include any physical device configured to receive input from a user or an environment of the user, and to provide the data to a computational device. The data provided to the computational device may be in a digital format and/or in an analog format. In one embodiment, the input device may store the input received from the user in a memory device accessible by a processing device, and the processing device may access the stored data for analysis. In another embodiment, the input device may provide the data directly to a processing device, for example, over a bus or over another communication system configured to transfer data from the input device to the processing device. In some examples, the input received by the input device may include key presses, tactile input data, motion data, position data, direction data, or any other data for supply for computation. Some examples of the input device may include a button, a key, a keyboard, a computer mouse, a touchpad, a touchscreen, a joystick, or another mechanism from which input may be received. In other embodiments, the input may be a sensor input, or one in which sensor data is used as an input to the system. The sensor data may include data from any or a combination of a position sensor, pressure sensor, temperature sensor, force sensor, vibration sensor, photoelectric sensor, or any other type of device that can measure any attribute of an environment. In some other examples, the input for causing the display of the virtual controller in conjunction with the keyboard may be received from an external device, may be received from a memory unit (for example, from a configuration file), and so forth.

Figure 46:
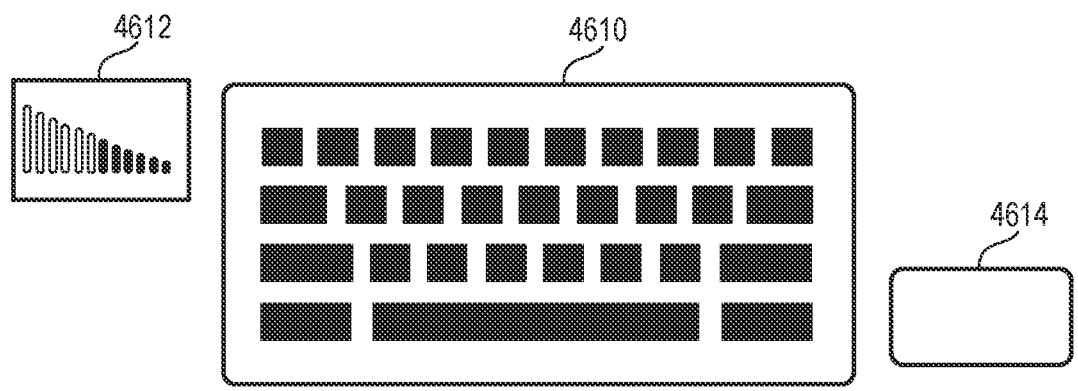
FIG. 46 illustrates an example of a keyboard and a virtual controller, consistent with some embodiments of the present disclosure.

A virtual controller may include a simulated non-physical controller which provides to the user the perception of interacting with a controller that is not physically present. The virtual controller may include any one or a combination of a button, a key, a keyboard, a computer mouse, a touchpad, a trackpad, a touchscreen, a joystick, a button, a slider, a dial, a keypad, a numeric keypad, or another mechanism that may be manipulated by a user in a virtual environment. In some embodiments, the virtual controller may be of the same form as the physical keyboard. In other embodiments, the virtual controller may be of a different form from the physical keyboard. FIG. 46 shows an example of a virtual controller, consistent with some embodiments of the present disclosure. The virtual controller may include a virtual keyboard 4610, a virtual volume bar 4612, and a virtual touch pad 4614.

Some disclosed embodiments may include displaying, via the wearable extended reality appliance, the virtual controller in a first location on the surface, wherein in the first location, the virtual controller has an original spatial orientation relative to the keyboard. A spatial orientation may include a location, position, distance, angle, placement, alignment, inclination, or any other indication of a direction of an object relative to another object. For example, FIG. 47 shows a virtual controller 4716 displayed in a first location 4718 on a surface 4710, such that the virtual controller has an original spatial orientation 4720 relative to the keyboard 4712 that is placed on a first keyboard location 4714 on the surface 4710.

Some disclosed embodiments may include detecting a movement of the keyboard to a different location on the surface. Detecting the movement of the keyboard may involve detecting signals from a sensor that senses proximity, pressure, light, ultrasonic, position, photoelectric, motion, force, electric fields, contact, non-contact, or any other detectable characteristic. In one example, detecting the movement of the keyboard may include detecting the movement by analyzing images using a visual object tracking algorithms (for example, by analyzing images captured using an image sensor included in the wearable extended reality environment). The detection of the movement of the keyboard may be implemented using other sensors and/or techniques, as described herein. In some embodiments, the detection may include detecting any amount of motion of the keyboard on the surface. In other embodiments, the detection may include detecting a movement of the keyboard to a different location beyond a threshold movement amount.

Some disclosed embodiments may include, in response to the detected movement of the keyboard, presenting the virtual controller in a second location on the surface, wherein in the second location, a subsequent spatial orientation of the virtual controller relative to the keyboard corresponds to the original spatial orientation. A subsequent spatial orientation that corresponds to the original spatial orientation may include a spatial orientation that shares the same or a similar location, position, angle, placement, alignment, inclination, or any other indication of a direction of the virtual controller relative to the keyboard. For example, FIG. 47 shows a virtual controller 4716 displayed in a first location 4718 on a surface 4710, such that the virtual controller has an original spatial orientation 4720 relative to the keyboard 4712 that is placed on a first keyboard location 4714 on the surface 4710. When the keyboard 4712 is moved to a different keyboard location 4722 on the surface 4710, the virtual controller 4716 is presented in a second location 4724 on the surface 4710, wherein a subsequent spatial orientation 4720 of the virtual controller 4716 relative to the keyboard 4712 corresponds to the original spatial orientation 4720. In this example, the keyboard 4712 was moved to a different keyboard location 4722 by horizontal movement.

As another example, FIG. 48 shows a virtual controller 4816 displayed in a first location 4818 on a surface 4810, such that the virtual controller has an original spatial orientation 4820 relative to the keyboard 4812 that is placed on a first keyboard location 4814 on the surface 4810. When the keyboard 4812 is moved to a different keyboard location 4822 on the surface 4710, the virtual controller 4816 is presented in a second location 4824 on the surface 4810, wherein a subsequent spatial orientation 4820 of the virtual controller 4816 relative to the keyboard 4812 corresponds to the original spatial orientation 4820. In this example, the keyboard 4812 was moved to a different keyboard location 4822 by rotational movement.

Furthermore, the portion of the virtual controller 4816 that moves with the keyboard 4812 may depend on the portions of the virtual controller 4816 that are docked to the keyboard 4812. Docking may involve anchoring, joining, uniting, connecting, or in any other way linking a portion of the virtual controller with the keyboard. For example, the virtual controller shown in FIG. 46 may include a virtual keyboard 4610, a virtual volume bar 4612, and a virtual touch pad 4614, all of which are docked to a keyboard. In this example, the virtual keyboard 4610, a virtual volume bar 4612, and a virtual touch pad 4614 will move in response to the movement of the keyboard. However, an undocked object, such as an object next to the virtual volume bar 4612 may not move in response to the movement of the keyboard.

In some examples, before the detection of the movement of the keyboard to the different location on the surface, detecting a hand movement of a particular movement type at the first location may trigger a particular action while detecting a hand movement of the particular movement type at the second location may not trigger the particular action. Further, after the detection of the movement of the keyboard to the different location on the surface, detecting a hand movement of the particular movement type at the second location may trigger the particular action while detecting a hand movement of the particular movement type at the first location may not trigger the particular action. In one example, the particular action may include changing a presentation parameter associated with a user interface element based on the detected hand movement, for example as described below. In one example, the particular action may include changing a location of a virtual cursor based on the detected hand movement, for example as described below.

In some embodiments, the virtual controller may be a user interface element, and some disclosed embodiments may include detecting a hand movement at the second location, and changing a presentation parameter associated with the user interface element based on the detected hand movement. A user interface element may include a volume bar, a touch pad, or any other point of interaction between a user and the virtual controller. A hand movement may include a touch of the hand with the surface, a click of the hand on the surface, a double click on the surface, a drag of a finger on the surface, a drag of two fingers on the surface, and any other interaction of any finger or other portion of the hand with the surface. A presentation parameter may include orientation, size, location, position, angle, color, dimension, volume, or any other perceivable condition of a presented object. In some embodiments, the change to the presentation parameter may be based on the type of the hand movement and/or on a parameter of the hand movement (such as duration, distance, etc.). For example, in response to a user dragging their finger vertically upward on a virtual volume bar, the volume of the presented scene may be increased, and the volume may be increased in proportion to the amount the user vertically drags their finger on the virtual bar. In other embodiments, the presentation parameter may be selected from a plurality of alternative presentation parameters based on the type of the hand movement. For example, the user interface element may be a touch pad, and single-finger hand movements may be used to adjust a size of a portion of a presented scene, while double-finger movements may be used to adjust an orientation of the portion of the presented scene.

In some embodiments, the virtual controller may be a virtual track pad and some disclosed embodiments may include detecting a hand movement in the second location, and changing a location of a virtual cursor based on the detected hand movement. A virtual track pad may include any type of virtual interface that translates the position and/or motion of any portion of a hand of a user in order to change the location the virtual cursor. A hand movement may include a touch of the hand with the surface, a click of the hand on the surface, a double click on the surface, a drag of a finger on the surface, a drag of two fingers on the surface, and any other interaction of any finger or other portion of the hand with the surface. For example, a user may drag a finger from left to right in the second location of the surface, and the virtual cursor may be moved from left to right on the virtual track pad in response to this detected hand movement. As another example, a user may draw a circle with a finger in a clockwise motion in the second location of the surface, and the virtual cursor may be moved in a clockwise manner on the virtual track pad in response to this detected hand movement.

In some embodiments, the received input may include image data from the image sensor associated with the wearable extended reality appliance, and some disclosed embodiments may include determining from the image data values characterizing the original spatial orientation of the virtual controller relative to the keyboard. For example, the image data may be analyzed to select the first location on the surface, and thereby determining the values characterizing the original spatial orientation of the virtual controller relative to the keyboard. In another example, the image data may be analyzed to select the values characterizing the original spatial orientation of the virtual controller relative to the keyboard, and the first location on the surface may be selected based on the selected values. In one example, in response to a first image data, first values characterizing the original spatial orientation of the virtual controller relative to the keyboard may be selected, and in response to a second image data, second values characterizing the original spatial orientation of the virtual controller relative to the keyboard may be selected, the second values may differ from the first values. In one example, a convolution of at least part of the image data may be calculated to obtain a result value of the calculated convolution. Further, in response to a first result value of the calculated convolution, first values characterizing the original spatial orientation of the virtual controller relative to the keyboard may be selected, and in response to a second result value of the calculated convolution, second values characterizing the original spatial orientation of the virtual controller relative to the keyboard may be selected, the second values may differ from the first values. In another example, the values characterizing the original spatial orientation of the virtual controller relative to the keyboard may be a function of the result value of the calculated convolution. In some examples, a machine learning model may be trained using training examples to select values characterizing spatial orientations for virtual controllers relative to physical keyboards from images of the physical keyboards. An example of such training example may include an image of a sample physical keyboard and an indication of a type of a sample virtual controller, together with a label indicating a value characterizing a desired spatial orientation for the sample virtual controller relative to the sample physical keyboard. The trained machine learning model may be used to analyze the image data received from the image sensor associated with the wearable extended reality appliance to determine the values characterizing the original spatial orientation of the virtual controller relative to the keyboard. In some examples, a machine learning model may be trained using training examples to select locations for virtual controllers based on images of physical keyboards. An example of such training example may include a sample image of a sample physical keyboard and an indication of a type of a sample virtual controller, together with a label indicating a desired location for the sample virtual controller relative to the sample physical keyboard. The trained machine learning model may be used to analyze the image data received from the image sensor associated with the wearable extended reality appliance to determine the first location on the surface. Some disclosed embodiments may further include the values characterizing a distance between the virtual controller and the keyboard. In other examples, the values may characterize an angle between the virtual controller and the keyboard, an elevation between the virtual controller and the keyboard, a size ration (or different) between the virtual controller and the keyboard, and so forth.

Some disclosed embodiments may include using the received input to determine at least one of at least one of distance of the virtual controller from the keyboard, an angular orientation of the virtual controller relative to the keyboard, a side of the keyboard on which the virtual controller is located, or a size of the virtual controller. In one example, in response to a first input, a first distance of the virtual controller from the keyboard may be selected, and in response to a second input, a second distance of the virtual controller from the keyboard may be selected, the second distance may differ from the first distance. In one example, in response to a first input, a first angular orientation of the virtual controller relative to the keyboard may be selected, and in response to a second input, a second angular orientation of the virtual controller relative to the keyboard may be selected, the second angular orientation may differ from the first angular orientation. In one example, in response to a first input, a first side of the keyboard to locate the virtual controller at may be selected, and in response to a second input, a second side of the keyboard to locate the virtual controller may be selected, the second side may differ from the first side. In one example, in response to a first input, a first size for the virtual controller may be selected, and in response to a second input, a second size for the virtual controller may be selected, the second size may differ from the first size. In some examples, a machine learning model may be trained using training examples to select properties for placement of virtual controllers (such as distance from a keyboard, an orientation relative to the keyboard, a side of the keyboard to place the virtual controller at, a size of the virtual controller, etc.) from inputs. An example of such training example may include a sample input and an indication of a type of a sample virtual controller, together with a label indicating desired properties for a placement of the sample virtual controller. The trained machine learning model may be used to analyze the input and determine the at least one of the distance of the virtual controller from the keyboard, the angular orientation of the virtual controller relative to the keyboard, the side of the keyboard on which the virtual controller is to be located, or the size of the virtual controller.

In some embodiments, the keyboard may include a detector and detecting the movement of the keyboard may be based on an output of the detector. A detector may include a passive infrared sensor, a microwave sensor, an area reflective sensor, an ultrasonic sensor, a vibration sensor, or any other type of device that may be used to measure a movement of an object. An output of the detector used to detect the movement of the keyboard may include a temperature, reflection, distance, vibration, or any other indication of a movement of an object. For example, the detector may be an ultrasonic motion sensor, and the movement of the keyboard may be detected based on reflections that are measured via pulses of ultrasonic waves. In one example, the detector may be an indoor positioning sensor, and the output of the detector may be a position of the keyboard. In another example, the detector may include an image sensor, images captured using the image sensor may be analyzed using an egomotion algorithm to detect movement of the keyboard. In yet another example, the detector may include an optical mouse sensor (also known as non-mechanical tracking engine) aimed towards a surface that the keyboard is placed on, and the output of the detector may be indicative of the movement of the keyboard with respect to the surface.

Some disclosed embodiments may include detecting the movement of the keyboard based on data obtained from the image sensor associated with the wearable extended reality appliance. For example, the image sensor may be a complementary metal oxide semiconductor (CMOS) sensor designed to measure the distance to an object via the time-of-flight (TOF) method, and the image data from the CMOS sensor may be used to determine a distance between the virtual controller and the keyboard using the TOF method. In this example, the measured distance between the virtual controller and the keyboard using the TOF method may be used to detect a movement of the keyboard. In one example, the data obtained from the image sensor associated with the wearable extended reality appliance may be analyzed using a visual object tracking algorithm to detect movement of the keyboard.

In some embodiments, the wearable extended reality appliance may be configured to pair with a plurality of differing keyboards, and these embodiments may include receiving a keyboard selection, choosing the virtual controller from among a plurality of choices based on the received keyboard selection, and displaying the virtual controller based on the keyboard selection. For example, a data-structure associating different keyboards with different selection of virtual controller may be accessed based on the received keyboard selection to choose the virtual controller from among the plurality of choices. In some embodiments, displaying the virtual controller based on the keyboard selection may further include accessing data indicative of a plurality of surfaces, identifying a specific surface out of the plurality of surfaces on which the keyboard is placed, and selecting which virtual controller to display based on the identified surface. For example, a data-structure associating different surfaces with different selection of virtual controller may be accessed based on the specific surface to select which virtual controller to display. A plurality of differing keyboards may include keyboards that are distinct from one another by type, number, or size. A keyboard selection may include a selection of a keyboard based on a user input or an automatic input.

A user input may include a click, tap, swipe, or any interaction with any element of a system usable with some disclosed embodiments in order to select a keyboard from a plurality of differing keyboards. For example, a user may be presented with a choice between a keyboard with 30 keys and a keyboard with 50 keys, and the user may select the keyboard with 30 keys by pressing a button on the keyboard with 30 keys to pair the keyboard with the wearable extended reality appliance. As another example, with the same choice of keyboards, a keyboard selection may be accomplished by the user clicking on virtual image of the selected keyboard presented by the wearable extended reality appliance.

An automatic input may include an automated selection of a keyboard from a plurality of differing keyboards based on a compatibility of a type of keyboard with a type of interaction or virtual controller desired. For example, a user may be presented with a choice between a keyboard without a volume bar and a keyboard with a volume bar, and the wearable extended reality appliance may automatically select the keyboard with the volume bar for pairing when a scene presented by the wearable extended reality appliance includes sound that a user may want to adjust.

In some embodiments, a keyboard selection may be based on a combination of a user input and an automatic input, such that a selection of a keyboard from a plurality of differing keyboards is based on both an automatic selection a keyboard based on a compatibility of a type of keyboard with a type of interaction or virtual controller desired and confirmation of the selection based on user input. For example, a user may be presented with a choice between a keyboard without a volume bar and a keyboard with a volume bar, and the wearable extended reality appliance may automatically select the keyboard with the volume bar for pairing when a scene presented by the wearable extended reality appliance includes sound that a user may want to adjust. The user may then confirm this automatic selection by clicking on a virtual confirmation button presented by the wearable extended reality appliance.

Some disclosed embodiments may include analyzing the image data to determine that a surface area associated with the second location is defect-free; in response to the determination that the surface area associated with the second location is defect-free, causing the wearable extended reality appliance to virtually present the virtual controller in the second location; analyzing the image data to determine that the surface area associated with the second location includes a defect; and in response to the determination that the surface area associated with the second location includes a defect, causing the wearable extended reality appliance to perform an action for avoiding presentation of the virtual controller in the second location. A defect may include a crack, deformity, flaw, irregularity, blot, discoloration, kink, mark, patch, speck, stain, taint, rough spot, weak spot, or any other imperfection on the surface. Adjusting the presentation of the virtual controller based on whether or not the surface area associated with the second location is defect-free may be desirable to ensure that the presentation of the virtual controller is not deformed or otherwise flawed because of a defect in the background. For example, the image data may be analyzed to determine that a surface area associated with the second location is free of stains. If it is determined that the surface area associated with the second location is free of stains, the wearable extended reality appliance may virtually present the virtual controller in the second location. However, if it is determined that the surface area associated with the second location contains a stain, the wearable extended reality appliance may perform an action for avoiding presentation of the virtual controller in the second location. Additionally, the determination of whether a surface area associated with the second location is defect-free may include a tolerance for defects within a certain threshold dimension. For example, a stain with a width less than 5 millimeters may be classified as defect-free, allowing the wearable extended reality appliance to virtually present the virtual controller in the second location, while a stain with a width greater than or equal to 5 millimeters may be classified as a defect, allowing the wearable extended reality appliance may perform an action for avoiding presentation of the virtual controller in the second location.

In some embodiments, the action for avoiding presentation of the virtual controller in the second location includes virtually presenting the virtual controller on another surface area in a third location proximate the second location. Another surface area in a third location proximate the second location may include any area in a location that at least partially avoids presentation of the virtual controller in the second location. For example, when a defect is detected in the surface area associated with the second location, the wearable extended reality appliance may virtually present the virtual controller to the right or left of the defect.

In some embodiments, the action for avoiding presentation of the virtual controller in the second location may include providing a notice via the wearable extended reality appliance, the notice indicating that the second location is unsuitable for displaying the virtual controller. The notice may include any or a combination of an alarm, a beep, a text box, a color change, or any other audio, visual, haptic, or any type of sensory indication perceivable by a user of the wearable extended reality appliance. For example, when a defect is detected in the surface area associated with the second location, the wearable extended reality appliance may virtually present a virtual blacked-out object to the user in the shape of the virtual controller.

Some disclosed embodiments may include analyzing the image data to determine that the second location is edge-free; in response to the determination that the second location is edge-free, causing the wearable extended reality appliance to virtually present the virtual controller in the second location; analyzing the image data to determine that the second location includes an edge; and in response to the determination that the second area includes an edge, causing the wearable extended reality appliance to perform an action for avoiding presentation of the virtual controller in the second location. An edge may include a boundary, brink, corner, end, fringe, line, lip, margin, outskirt, perimeter, rim, side, threshold, tip, verge, bend, bound, brim, contour, curb, frame, periphery, or any other outer limit of the surface. Adjusting the presentation of the virtual controller based on whether or not the surface area associated with the second location is edge-free may be desirable in order to ensure that the presentation of the virtual controller is not deformed or otherwise flawed because of an object or background that exists beyond an edge of the surface. For example, the image data may be analyzed to determine that a surface area associated with the second location is free of corners. If it is determined that the surface area associated with the second location is free of corners, the wearable extended reality appliance may virtually present the virtual controller in the second location. However, if it is determined that the surface area associated with the second location contains a corner, the wearable extended reality appliance may perform an action for avoiding presentation of the virtual controller in the second location to avoid contamination of the presented virtual image with objects that lie beyond the boundary of the surface, such as shoes, rubbish, or other distracting items.

In some embodiments, the action for avoiding presentation of the virtual controller in the second location includes virtually presenting the virtual controller at a third location proximate the second location. Another surface area in a third location proximate the second location may include any area in a location that at least partially avoids presentation of the virtual controller in the second location. For example, when a right corner is detected in the surface area associated with the second location, the wearable extended reality appliance may virtually present the virtual controller to the left of the detected corner.

In some embodiments, the action for avoiding presentation of the virtual controller in the second location includes providing a notice via the wearable extended reality appliance, wherein the notice indicates that the second location is unsuitable for displaying the virtual controller. The notice may include any or a combination of an alarm, a beep, a text box, a color change, or any other audio, visual, haptic, or any type of sensory indication perceivable by a user of the wearable extended reality appliance. For example, when a corner is detected in the surface area associated with the second location, the wearable extended reality appliance may virtually present a virtual blacked-out object to the user in the shape of the virtual controller.

Some disclosed embodiments may include analyzing the image data to determine that the second location is free of physical objects; in response to the determination that the second location is free of physical objects, causing the wearable extended reality appliance to virtually present the virtual controller in the second location; analyzing the image data to determine that the second location includes at least one physical object; and in response to the determination that the second location includes at least one physical object, causing the wearable extended reality appliance to perform an action for avoiding control-hampering interference of the physical object with the virtual controller. A physical object may include a pencil, paper, phone, or any other body on the surface that is not an integral element of the surface itself. Adjusting the presentation of the virtual controller based on whether or not the surface area associated with the second location is free of physical objects may be desirable to ensure that the presentation of the virtual controller is not deformed or otherwise flawed because of a distracting object in the background, as well as avoiding a control-hampering interference of the physical object with the virtual controller. A control-hampering interaction of the physical object with the virtual controller may include any communication or action with the physical object that would impede or obstruct a communication or action with the virtual controller. For example, the image data may be analyzed to determine that a surface area associated with the second location is free of phones. If it is determined that the surface area associated with the second location is free of phones, the wearable extended reality appliance may virtually present the virtual controller in the second location. However, if it is determined that the surface area associated with the second location contains a phone, the wearable extended reality appliance may perform an action for avoiding control-hampering interference of the phone with the virtual controller to avoid causing confusion between interactions of the user with the phone and interactions of the user with the virtual controller.

In some embodiments, the action for avoiding presentation of the virtual controller in the second location includes virtually presenting the virtual controller on a surface of the physical object. This type of action may be desirable when the physical object is of a type that would not correspond with a significant control-hampering interaction of the physical object with the virtual controller. For example, the physical object may be a paper that the user would not interact with in the same way that a user would interact with a virtual keyboard, since the user would not be typing on the paper. In this example, the action for avoiding control-hampering interference of the paper with the virtual controller may be virtually presenting the virtual controller on a surface of the paper. Similar to other embodiments, the action may also include providing a notice via the wearable extended reality appliance, the notice indicating that the object may affect interactions with the virtual controller. The notice may include any or a combination of an alarm, a beep, a text box, a color change, or any other audio, visual, haptic, or any type of sensory indication perceivable by a user of the wearable extended reality appliance. For example, when a phone is detected in the surface area associated with the second location, the wearable extended reality appliance may virtually present a virtual blacked-out object to the user in the shape of the virtual controller.

Some disclosed embodiments may include analyzing the image data to determine a type of the surface at the first location; selecting a first size for the virtual controller based on the type of the surface at the first location; presenting the virtual controller in the first location on the surface in the first size; analyzing the image data to determine a type of the surface at the second location; selecting a second size for the virtual controller based on the type of the surface at the second location; and presenting the virtual controller in the second location on the surface in the second size. A type of the surface may include a color, size, texture, friction coefficient, or any other aspect of the surface. In one example, adjusting the size of the virtual controller based on the type of the surface at a given location may be desirable to ensure that the virtual controller fits within the space. For example, the surface may be a non-rectangular top of a table, the top having differing widths at different locations. In this example, the image data may be analyzed to determine a size of the surface at the first location to be 5 feet in width and selecting a 5-foot width for the virtual controller based on the 5-foot width of the surface at the first location. The virtual controller in this example may be presented in the first location on the surface with a 5-foot width. The presentation of the virtual controller in this example may further include analyzing the image data to determine a size of the surface at the second location to be 3 feet and selecting a 3-foot width for the virtual controller based on the 3-foot width of the surface at the second location. In this example, the virtual controller may be presented in the second location on the surface with a 3-foot width. In another example, adjusting the size of the virtual controller based on the type of the surface at a given location may be desirable to ensure adjustment of the size of the virtual controller to a tactile response when interacting with the surface. For example, when a friction coefficient of the surface is larger, the size of the virtual controller may be smaller. In some examples, a visual classification algorithm may be used to analyze a part of the image data corresponding to a location on a surface (such as the first location, the second location, etc.) and classify it to one of a plurality of alternative classes, each class may correspond to a type of a surface, and thereby determining the type of the surface at the first location and/or at the second location. Further, in response to a first determined type of the surface at the first location, one size may be determined as the first size for the virtual controller, and in response to a second determined type of the surface at the first location, a different size may be determined as the first size for the virtual controller. Further, in response to a third determined type of the surface at the second location, one size may be determined as the second size for the virtual controller, and in response to a fourth determined type of the surface at the second location, a different size may be determined as the second size for the virtual controller.

Some disclosed embodiments may include a system for virtually extending a physical keyboard, the system comprising: at least one processor configured to: receive image data from an image sensor associated with a wearable extended reality appliance, the image data representing a keyboard placed on a surface; determine that the keyboard is paired with the wearable extended reality appliance; receive an input for causing a display of a virtual controller in conjunction with the keyboard; display, via the wearable extended reality appliance, the virtual controller in a first location on the surface, wherein in the first location, the virtual controller has an original spatial orientation relative to the keyboard; detect a movement of the keyboard to a different location on the surface; in response to the detected movement of the keyboard, present the virtual controller in a second location on the surface, wherein in the second location, a subsequent spatial orientation of the virtual controller relative to the keyboard corresponds to the original spatial orientation.

Figure 49:
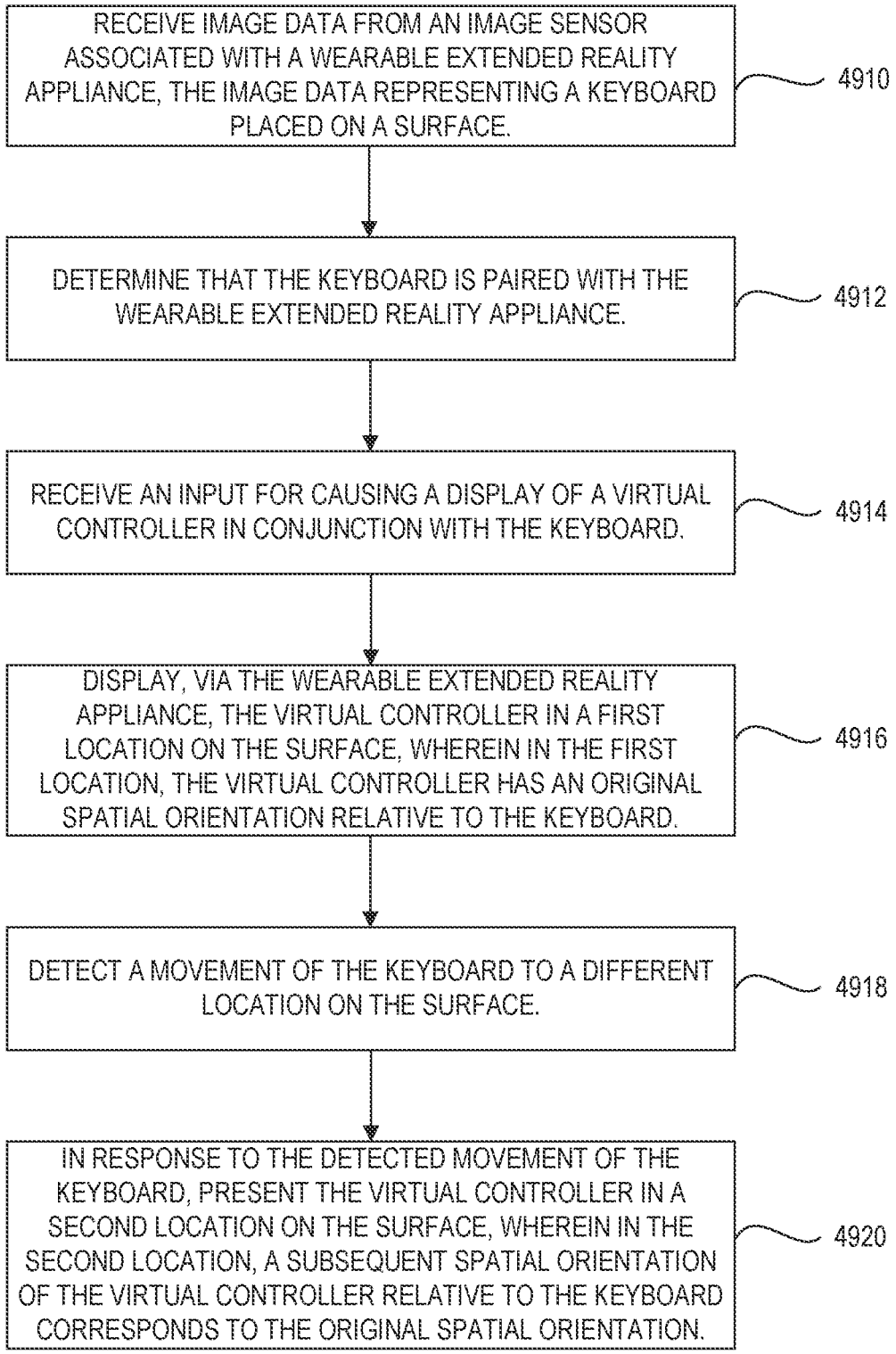
FIG. 49 is a block diagram of an exemplary process for virtually extending a physical keyboard, consistent with some embodiments of the present disclosure.

Some disclosed embodiments may involve methods for virtually extending a physical keyboard. FIG. 49 illustrates an exemplary method 4900 for virtually extending a physical keyboard, consistent with some embodiments of the present disclosure. As shown in step 4910, the method 4900 may involve receiving image data from an image sensor associated with a wearable extended reality appliance, the image data representing a keyboard placed on a surface. The method 4900 may also involve determining that the keyboard is paired with the wearable extended reality appliance, as shown in step 4912. Step 4914 shows that the method 4900 may also involve receiving an input for causing a display of a virtual controller in conjunction with the keyboard. The method 4900 may also involve displaying, via the wearable extended reality appliance, the virtual controller in a first location on the surface, wherein in the first location, the virtual controller has an original spatial orientation relative to the keyboard, as shown in step 4916. The method 4900 may further include detecting a movement of the keyboard to a different location on the surface, as shown in step 4918. As shown in step 4920, the method 4900 may also include, in response to the detected movement of the keyboard, presenting the virtual controller in a second location on the surface, wherein in the second location, a subsequent spatial orientation of the virtual controller relative to the keyboard corresponds to the original spatial orientation.

Virtual content may be consumed differently when users are at different mobility statuses. For example, virtual content may be consumed differently when users are stationary (for example, staying at the same place, lying down, sitting, standing, etc.) and when users are moving (for example, moving from one place to another, walking, running, etc.). When consuming virtual content in an extended reality environment and/or via a wearable extended reality appliance, the virtual content may interfere with safe and/or efficient movement in a physical environment. For example, the virtual content may hide or obscure elements of the physical environment, the virtual content may attract the attention of the user from elements in the physical environment, and so forth. Therefore, when users are moving, it may be desired to limit the presentation of the virtual content to minimize the interference of the virtual content with the movement. On the other hand, when the users are stationary, it may be desired to avoid such limitations to increase involvement, efficiency, and/or immersion of the users. It is therefore desired to have different presentations of virtual content when the users are stationary and when the users are moving. Manually switching between the different presentations may be burdensome. Further, users might avoid switching and therefore risk injuries while moving. It is therefore desired to switch between the different presentations automatically based on the mobility status of the user.

Some disclosed embodiments may include a non-transitory computer readable medium containing instructions that when executed by at least one processor cause the at least one processor to perform operations for coordinate virtual content display with mobility status. Virtual content may include a virtual object, inanimate virtual content, animate virtual content configured to change over time or in response to triggers, virtual two-dimensional content, virtual three dimensional content, a virtual overlay over a portion of a physical environment or over a physical object, a virtual addition to a physical environment or to a physical object, a virtual promotion content, a virtual representation of a physical object, a virtual representation of a physical environment, a virtual document, a virtual character or persona, a virtual computer screen (also referred to as a virtual display herein), a virtual widget, or any other format for displaying information virtually. Consistent with the present disclosure, the virtual content may include any visual presentation rendered by a computer or a processing device. In one embodiment, the virtual content may include a virtual object that is a visual presentation rendered by a computer in a confined region and configured to represent an object of a particular type (such as an inanimate virtual object, an animate virtual object, virtual furniture, a virtual decorative object, virtual widget, or other virtual representation). The rendered visual presentation may change to reflect changes to a status object or changes in the viewing angle of the object, for example, in a way that mimics changes in the appearance of physical objects.

Mobility status may include a position, angle, location, speed, acceleration, activity level, activity type, or any indication of a movement or lack of movement. For example, mobility status may include a walking status, a walking speed, or a walking acceleration. As another example, mobility status may include a sedentary status or a period of being sedentary. Coordinating virtual content display with mobility status may include associating, relating, correlating, coupling, modifying, controlling, or in any other way linking a display of virtual content with mobility status. For example, coordinating virtual content display with mobility status may include displaying certain kinds of virtual content when a specific mobility status is present. As another example, coordinating virtual content display with mobility status may include displaying virtual content for a specified period of time when a specific mobility status is present. In yet another example, coordinating virtual content display with mobility status may include showing or hiding certain portions of a virtual content display when a specific mobility status is present. In an additional example, coordinating virtual content display with mobility status may include changing a property of the presentation of the virtual content display based on the mobility status, such as size, position, opacity, brightness, and so forth.

Some disclosed embodiments may include accessing rules associating a plurality of user mobility statuses with a plurality of display modes for presenting virtual content via a wearable extended reality appliance. A rule may include a command, direction, formula, guide, model, direction, procedure, specification, or any other principle that governs a state or an action. Accessing a rule may include obtaining, gathering, fetching, referencing, or in any other way obtaining, examining, or retrieving a rule. For example, a rule may be accessed from a database by querying for that rule. In some examples, the query may be triggered by a condition being met. In other examples, the query may be triggered by a user. In one example, accessing one or more rules may include accessing computer instructions defining an algorithm corresponding to the one or more rules. In another example, accessing one or more rules may include accessing a data-structure associating mobility statuses with display modes that is configured to enable retrieval of a display mode based on a mobility status (such as a map data-structure, a dictionary data-structure, and so forth). A user mobility status may include a position, angle, location, speed, acceleration, activity level, activity type, or any indication of a movement or lack of movement of a user, as opposed to any such indication of another object. For example, a user mobility status may include a walking status, a walking speed, or a walking acceleration of a user. As another example, mobility status may include a sedentary status of a user or a period of a user being sedentary. A display mode may include a color, brightness, opacity, angle, perspective, visibility, region of display, size of display, indication of types of objects shown, number of objects shown, or any other visual aspect of a display. For example, a display mode may include a document being presented with no information obscured. In another example, a display mode may include a document being presented with some portions obscured by blurring and other portions unobscured. In yet another example, a first display mode may include a presentation of virtual content (such as a particular virtual object) in a first size and at a first region, and a second display mode may include a presentation of the same virtual content (for example, the particular virtual object) in a second size (that may be different from the first size) and at a second region (that may be different from the first region).

In some embodiments, the accessed rules may associate display modes with user mobility statuses that include at least two of a sitting status, a standing status, a walking status, a running status, a cycling status, or a driving status. A sitting status may include a status of a user sitting at a chair, sitting in a car, sitting on the floor, or any other status associated with the user being seated on any surface. A standing status may include a status of a user standing up straight, reaching up, stretching, or any other status associated with the user having or maintaining an upright or nearly upright position, supported by the user's feet. A walking status may include a status of a user hiking, jaunting, parading, stepping, strolling, sauntering, striding, or any other status associated with the user moving along on foot. A running status may include a status of a user racing, rushing, spurting, darting, dashing, jogging, sprinting, or any other status associated with the user moving along on foot at a speed that is faster than walking. A cycling status may include a status of a user riding a cycle, sitting on a cycle, riding an exercise cycle, or sitting on an exercise cycle. It is to be understood that a cycle may include any number of wheels. For example, a cycle may include a uni-cycle, a bicycle, a tricycle, or any other type of cycle. A driving status may include a status of a user driving a vehicle, sitting in a vehicle, starting a vehicle, or any other status associated with the user interacting with any type of motor vehicle.

In some embodiments, the accessed rules may associate user mobility statuses with the plurality of display modes that include at least two of a working mode, an entertainment mode, a sport activity mode, an active mode, a sleep mode, a tracking mode, a stationary mode, a private mode, or a public mode. A working mode may be a display mode including a display involving documents, spreadsheets, messages, assignments, or any other information that may be relevant to any activity involving mental or physical effort done to achieve a purpose or result. An entertainment mode may be a display mode including a display involving television, movies, images, games, or any other information that may be relevant to any activity involving either providing or being provided with amusement or enjoyment. A sport activity mode may be a display mode including a display involving a game, athletic data, team statistics, player statistics, or any other information that may be relevant to any activity including physical exertion and skill in which an individual or team competes against another or others. An active mode may be a display mode including a display involving fitness statistics, heart rate, metabolism, speed, personal records, height, weight, or any other information that may be relevant to any activity requiring physical effort that may be carried out to sustain or improve health and fitness. A sleep mode may be a display mode including a display involving sleep duration, sleep cycles, sleep conditions, sleep disorders, or any other information that may be relevant to any activity involving the natural state of rest during which an individual's eyes are closed and the individual becomes unconscious. A tracking mode may be a display mode including a display involving a fitness tracker, a heart rate meter, a weather tracker, or any other information that may be relevant to following the course of any type of information. A stationary mode may be a display mode including a display involving a television program, a movie, documents, or any other type of information that may be appropriate or desirable for a user in a seated or otherwise sedentary position. A private mode may be a display mode including a display involving blurred, blacked out, or otherwise obscured portions, or any other type of information that is presented in a way to limit its access or use to one particular person or group of people. A public mode may be a display mode including a display involving unobscured portions, widely available information, websites, or any other type of information that pertains to or is able to be accessed by anyone.

In some embodiments, each of the plurality of display modes may be associated with a specific combination of values of a plurality of display parameters, and the operations may further include receiving input from the user to adjust values of display parameters associated with at least one display mode. A display parameter may include any value or data associated with a visual presentation, In some embodiments, the plurality of display parameters may include at least some of an opacity level, a brightness level, a color scheme, a size, an orientation, a resolution, displayed functionalities, or a docking behavior. For example, a private display mode may be associated with a specific combination of values for an opacity level and a brightness level, so that in a private display mode, the displayed information may not be highly visible. Receiving input from the user may include any user interaction with any physical device configured to receive input from a user or an environment of the user, and to provide the data to a computational device. The data provided to the computational device may be in a digital format and/or in an analog format. In one embodiment, the input device may store the input received from the user in a memory device accessible by a processing device, and the processing device may access the stored data for analysis. In another embodiment, the input device may provide the data directly to a processing device, for example, over a bus or over another communication system configured to transfer data from the input device to the processing device. In some examples, the input received by the input device may include key presses, tactile input data, motion data, position data, direction data, or any other data for supply for computation. Some examples of the input device may include a button, a key, a keyboard, a computer mouse, a touchpad, a touchscreen, a joystick, or another mechanism from which input may be received. Adjusting values of the display parameters may include increasing, decreasing, replacing, removing, or in any other way modifying the values. For example, receiving input from the user to adjust values of display parameters may include the user typing into a keyboard a value of five to replace a zoom value of four associated with the display, wherein the modification would result in a more zoomed-in display.

Some disclosed embodiments may include receiving first sensor data from at least one sensor associated with the wearable extended reality appliance, the first sensor data may be reflective of a mobility status of a user of the wearable extended reality appliance during a first time period. Sensor data reflective of a mobility status of the user may include a position, location, angle, speed, acceleration, elevation, heart rate, or any other information obtainable by any device that detects or measures a physical property associated with a movement or a lack of movement. For example, sensor data reflective of a mobility status may include a speed measurement that reflects a user moving at that measured speed. In another example, sensor data reflective of a mobility status may include a measurement of a change in location that reflects a user moving from one location to another. As another example, sensor data reflective of a mobility status may include a heart rate measurement indicating that a user is exercising, or a heart rate measurement indicating that a user is sedentary. A time period may include a cycle, date, duration, span, stretch, term, interval, or any extent of time. For example, sensor data reflective of a mobility status of a user of the wearable extended reality appliance during a first time period may include an average measurement of speed over thirty seconds that indicates whether the user moved by a significant amount, or whether the user merely had a brief spurt of movement.

Some disclosed embodiments may include, based on the first sensor data, determining that during the first time period the user of the wearable extended reality appliance is associated with a first mobility status. Such an association may be accomplished through any means of linking information, such as referencing a data structure, database, or a lookup table that correlates sensor data with mobility status. For example, the first sensor data may include an average measurement of speed of three miles per hour over ten minutes, which may be associated with a walking mobility status. In another example, the first sensor data may include a heart rate measurement of 150 beats per minute, which may be associated with an exercise mobility status. In some examples, a machine learning model may be trained using training examples to determine mobility statues associated with users of wearable extended reality appliances from sensor data. An example of such training example may include a sample sensor data captured using a sample wearable extended reality appliance, together with a label indicating a mobility status associated with a user of the sample wearable extended reality appliance in a time period corresponding to capturing of the sample sensor data. In one example, the trained machine learning model may be used to analyze the first sensor data and determine that during the first time period the user of the wearable extended reality appliance is associated with the first mobility status. In another example, the trained machine learning model may be used to analyze the second sensor data (described below) and determine that during the second time period (described below) the user of the wearable extended reality appliance is associated with the second mobility status (described below).

Some disclosed embodiments may include implementing at least a first accessed rule to generate a first display of the virtual content via the wearable extended reality appliance associated with the first mobility status. A display of the virtual content may include a full or partial presentation of the virtual content. For example, a first display of the virtual content may include a full, unobscured document. In another example, a first extended reality display of the virtual content may include a document with certain portions obscured by blurring and other portions unobscured. A display of the virtual content may also include any portion or all of a virtual object, virtual screen (also referred to as virtual display herein), or virtual scene presented in any color, shape, dimension, perspective, or any other type of visible attribute of an object. For example, a display of the virtual content may include a virtual tree in its original size. In another example, a display of the virtual content may include a zoomed-in virtual tree. Implementing an accessed rule to generate a display of the virtual content via the wearable extended reality appliance associated with the first mobility status may include referencing the rule in any way, such as via a lookup table or as described above, that associates a display mode with the first mobility status, and presenting a presentation of the virtual content that is based on the display mode via the wearable extended reality appliance. For example, when the first mobility status is determined to be walking, the processor may reference a lookup table to identify a rule that correlates a walking status with a display mode of a virtual content away from a direction of movement of the user. In such an embodiment, the processor may display the virtual content via the wearable extended reality appliance in a region that is not in the direction of movement of the user.

Some disclosed embodiments may include receiving second sensor data from the at least one sensor, the second sensor data being reflective of the mobility status of the user during a second time period. The second sensor data reflective of a mobility status of the user may be received in a manner similar to that discussed above for the first sensor data. The second sensor data may be of a similar type to the first sensor data. For example, both the first sensor data and the second sensor data may include a speed measurement. The second sensor data may also be of a different type than the first sensor data. For example, the first sensor data may include a speed measurement, while the second sensor data may include a heart rate measurement. The second time period may have characteristics similar to the first time period discussed above. For example, sensor data reflective of a mobility status of a user of the wearable extended reality appliance during a second time period may include an average measurement of speed over thirty seconds that indicates whether the user moved by a significant amount, or whether the user merely had a brief spurt of movement. The second time period may be similar in duration to the first time period. For example, both the first time period and the second time period may be ten minutes. The second time period may also include a different duration than the first time period. For example, the first time period may be five minutes, while the second time period may be fifteen minutes.

Some disclosed embodiments may include based on the second sensor data, determining that during the second time period the user of the wearable extended reality appliance is associated with a second mobility status. Such an association may be accomplished through similar linking means as discussed above for the first sensor data. The second mobility status may be similar to the first mobility status. For example, the first mobility status and the second mobility status may both be a walking status. Alternatively, the second mobility status may be different from the first mobility status. For example, the first mobility status may be a sitting status, while the second mobility status may be a standing status.

Some disclosed embodiments may include implementing at least a second accessed rule to generate a second display of the virtual content via the wearable extended reality appliance associated with the second mobility status, wherein the second display of the virtual content may differ from the first display of the virtual content. A second display of the virtual content may be accomplished in a manner similar to that discussed above for the first display of the virtual content. Implementing an accessed rule to generate a display of the virtual content via the wearable extended reality appliance associated with the second mobility status may include referencing the rule in any way, such as a lookup table or as described above, that associates a display mode with the second mobility status, and presenting a presentation of the virtual content that is based on the display mode via the wearable extended reality appliance. For example, when the second mobility status is determined to be sitting, the processor may reference a lookup table to identify a rule that correlates a sitting status with a display mode of a virtual content in front of the user. In such an embodiment, the processor may display the virtual content in a region that is in front of the user. A second display of the virtual content may differ from the first display of the virtual content in terms of portions shown, color, dimension, perspective, angle, region of presentation, opacity, size, or any other visual aspect of the virtual content. For example, a first display of the virtual content may include a color image, while a second display of the virtual content may include a black and white image. In another example, a first display of the virtual content may include a moving scene, while a second display of the virtual content may include a still scene. In yet another example, a first display of the virtual content may include presenting the virtual content away from a direction of motion of the user, while a second display of the virtual content may include presenting the virtual content in all directions. In an additional example, a first display of the virtual content may include presenting the virtual content with one opacity, while a second display of the virtual content may include presenting the virtual content with a different opacity. In an additional example, a first display of the virtual content may include presenting the virtual content in a first size, while a second display of the virtual content may include presenting the virtual content in a different size.

In some examples, the second time period may be later than the first time period. Further, implementing the at least second accessed rule to generate the second display of the virtual content via the wearable extended reality appliance may comprise causing the display of the virtual content to gradually transition from the first display associated with the first mobility status to the second display associated with the second mobility status. For example, the virtual content may comprise a plurality of elements, and the gradually transition may comprise transitioning specific elements from the first display associated with the first mobility status to the second display associated with the second mobility status when the user is not interacting with the specific elements, and withholding transitioning specific elements from the first display associated with the first mobility status to the second display associated with the second mobility status when the user is interacting with the specific elements. In another example, the virtual content may comprise a plurality of elements, and the gradually transition may comprise transitioning specific elements from the first display associated with the first mobility status to the second display associated with the second mobility status when the specific elements are outside a field of view (for example, of the user, of the wearable extended reality appliance, etc.), and withholding transitioning specific elements from the first display associated with the first mobility status to the second display associated with the second mobility status when the specific elements are in the field of view.

FIGS. 50A to 50D illustrate examples of various virtual content displays coordinated with different mobility statuses, consistent with some embodiments of the present disclosure. As illustrated in FIG. 50A, when a user is in a sitting mobility status 5010, a first display 5012 of the virtual content may be presented. For example, when a user is sitting, the wearable extended reality appliance may present virtual content that may be more appropriate to view or interact with in a sitting position, such as a document for viewing or editing. As illustrated in FIG. 50B, when a user is in a standing mobility status 5014, a second display 5016 of the virtual content may be presented. For example, when a user is standing, the wearable extended reality appliance may present virtual content that may be more appropriate to view or interact with in a standing position, such as a notification of a message. As illustrated in FIG. 50C, when a user is in a walking mobility status 5018, a third display 5020 of the virtual content may be presented. For example, when a user is walking, the wearable extended reality appliance may present virtual content that may be more appropriate to view or interact with in a walking position, such as a step counter. As illustrated in FIG. 50D, when a user is in a running mobility status 5022, a fourth display 5024 of the virtual content may be presented. For example, when a user is running, the wearable extended reality appliance may present virtual content that may be more appropriate to view or interact with in a running position, such as heart rate dynamics of the user while the user is running.

In some embodiments, when a user is in a sitting mobility status 5010, a first display of the virtual content may be presented. For example, when a user is sitting, the wearable extended reality appliance may present the virtual content (such as a virtual document) in an orientation or a location appropriate for viewing or interaction in a sitting position, such as in front of the user, for example at or near an eye level of the user. Further, when a user is in a standing mobility status 5014, a second display of the virtual content may be presented. For example, when a user is standing, the wearable extended reality appliance may present the virtual content (such as the virtual document) in an orientation or a location appropriate to viewing or interaction in a standing position, such as in front of the user, for example at or below an eye level of the user. Further, when a user is in a walking mobility status 5018 or in a running mobility status 5022, a third display of the virtual content may be presented. For example, when a user is walking, the wearable extended reality appliance may present the virtual content (such as the virtual content) in an orientation or a location appropriate to viewing or interaction in a walking position, such as away from a moving direction of the user, and/or significantly below an eye level of the user.

In some embodiments, when a user is in a sitting mobility status 5010, a first display of the virtual content may be presented. For example, when a user is sitting, the wearable extended reality appliance may present the virtual content (such as a virtual display) in a size and/or with an opacity appropriate for viewing or interaction in a sitting position, for example in a large size and/or with high opacity. Further, when a user is in a walking mobility status 5018 or in a running mobility status 5022, a second display of the virtual content may be presented. For example, when a user is walking or running, the wearable extended reality appliance may present the virtual content (such as the virtual display)

in a size and/or with an opacity appropriate to viewing or interaction in a walking or running position, such as in a smaller size and/or with a lower opacity than when the user is sitting.

Some disclosed embodiments may include determining the mobility status of the user during the first time period based on the first sensor data and history data associated with the user, and determining the mobility status of the user during the second time period based on the second sensor data and the history data. History data may include data that was previously acquired by the processor either automatically or through user input. Data that was previously acquired by the processor automatically may include data that was saved by the processor because it met a certain condition sufficient for acquisition. For example, the processor may be configured to save as history data, any sensor data that is similar to sensor data indicative of a certain mobility status, to better train the processor, for example via a machine learning algorithm, to identify sensor data that may indicate that mobility status. Data that was previously acquired by the processor through user input may include data that was entered into the processor by the user interacting with a mouse, touch pad, keyboard, or any other device capable of converting user interaction into information that may be saved by the processor. For example, a user may associate certain sensor data with an exercise status that the processor does not automatically associate with an exercise status. In such an example, the user may enter that sensor data to be associated with an exercise status as history data, so that in the future, the processor may associate that sensor data with an exercise status. The use of history data in this way may be desirable due to mobility differences between different users. For example, for some users, a certain speed may be associated with a running mobility status, while for another user, the same speed may be associated with a walking mobility status. The history data may include any information regarding or measured from a user, a sensor, a wearable extended reality device, a device connected to or used with a wearable extended reality device, or any information that may be input into the processor. For example, the history data may include a user identification, such as the name, weight, or height of the user. In other examples, the history data may include details of the wearable extended reality appliance being used by the user, such as a device type, a device model number, or a device configuration.

In some embodiments, the at least one sensor may include an image sensor within the wearable extended reality appliance, and the operations may further include analyzing image data captured using the image sensor to identify a switch between the first mobility status and the second mobility status. An image sensor may include a charge coupled device (CCD), complementary metal oxide semiconductor (CMOS), or any other device that detects and conveys information related to an image. Image data may include pixel information, image size, resolution, depth of field, type of objects, number of objects, and any other information that may be related to an image. A switch between the first mobility status and the second mobility status may include a change in speed, position, posture, activity, location, or any other transition between the first mobility status and the second mobility status. For example, a CCD device in a camera incorporated into the wearable extended reality appliance may detect a user in a first mobility status where the user is standing, and determine that the mobility status has switched to a second mobility status of walking based on a change in objects that the CCD device detects in an image. Additionally, or alternatively, for example, the CCD device may determine a change in the mobility status based on a change in a speed or an acceleration of one or more objects detected in the image. In one example, the image data may be classified using a binary visual classification algorithm to one of two alternative classes, 'switching between mobility statuses' and 'no switch between mobility statuses', and thereby identify the switch in the mobility status. In another example, the image data may be classified using a multiclass classifier to one of three or more alternative classes, one of the alternative classes may correspond to no switch in mobility status, and any other class of the alternative classes may correspond to a switch from one particular class to another particular class (for example, 'from sitting to walking', 'from standing to sitting', 'from walking to running', and so forth). In yet another example, the image data may be analyzed using an ego-motion algorithm to measure an amount of movement of the at least one image sensor within the wearable extended reality appliance (and therefore an amount of movement of the wearable extended reality appliance), and the identification of the switch between the first mobility status and the second mobility may be based on the amount of motion (for example, based on a result of a comparison of the amount of motion with a selected threshold, or as described below).

In some embodiments, the at least one sensor may include at least one motion sensor included in a computing device connectable to the wearable extended reality appliance, and the operations may further include analyzing motion data captured using the at least one motion sensor to identify a switch between the first mobility status and the second mobility status. A motion sensor may include a passive infrared sensor, a microwave sensor, an area reflective sensor, an ultrasonic sensor, a vibration sensor, an accelerometer, or any other type of device that may be used to measure a movement of an object or surface. In another example, a motion sensor may include an image sensor, and image data captured using the image sensor may be analyzed using an ego-motion algorithm and/or a visual localization algorithm to determine the motion. Motion data may include position, distance, dimension, angle, speed, acceleration, rotation, or any other information regarding a movement of an object or surface. A switch between the first mobility status and the second mobility status may include a change in speed, position, posture, activity, location, or any other transition between the first mobility status and the second mobility status. For example, an infrared sensor incorporated into a housing of the wearable extended reality appliance may detect a user in a first mobility status where the user is standing, and determine that the mobility status has switched to a second mobility status of walking based on a change in speed detected by the infrared sensor. The motion sensor may be connectable to the wearable extended reality appliance in a plurality of ways. In certain embodiments, the motion sensor may be incorporated within the wearable extended reality appliance. In other embodiments, the motion sensor may be connected to the wearable extended reality appliance by a wired connection. In yet other embodiments, the motion sensor may be connected to the wearable extended reality appliance by a wireless connection. A wireless connection may utilize WiFi, Bluetooth™, or any other channel that transmits information without a wired connection between the motion sensor and the wearable extended reality appliance. For example, the wearable extended reality appliance may be a smartphone that is wirelessly paired via Bluetooth™ to an ultrasonic sensor.

Some disclosed embodiments may include during the first time period displaying a certain virtual object in a working mode and during the second time period displaying the certain virtual object in a sport activity mode. A virtual object may include a visual presentation rendered by a computer and configured to represent an object of a particular type, such as an inanimate virtual object, an animate virtual object, virtual furniture, a virtual decorative object, virtual widget, or other virtual representation. For example, a virtual object may include a virtual window, and the extended reality display may include a first virtual window including a document and a second virtual window including statistics of a sports team for which the user plays. In a working mode, the first virtual window including the document may be presented on top of the second virtual window including statistics of the sports team. In a sport activity mode, the first virtual window including the document may be underneath the second virtual window including statistics of the sports team. In another example, in a working mode the virtual object may be located at a fixed location in the extended reality environment and may not move from that location due to small movements of the wearable extended reality appliance, while in the sport activity mode the virtual object may be configured to move in the extended reality environment with the movements of the wearable extended reality appliance.

Some disclosed embodiments may include during the first time period displaying a certain virtual object in an active mode and during the second time period displaying the certain virtual object in a sleep mode. Displaying the virtual object in an active or sleep mode during different time periods may be desirable to present a display that is better suited for the given time period. In some time periods, a user may be more likely to be in an active mode, such as during the day, when the user is not in a lying position, and so forth. During such times, it may be desirable to present the virtual object in a mode that is consistent with being active during the day. In other time periods, a user may be more likely to be in a sleep mode, such as during the night, when the user is in a lying position, and so forth. During such times, it may be desirable to present the virtual object in a mode that is consistent with sleeping during the night. For example, the virtual object may include a virtual clock. In an active mode, the virtual clock may be displayed with a maximum brightness so that the user can see the clock well while moving around. In a sleep mode, the virtual clock may be displayed with a minimum brightness, so that the clock does not disrupt the user's sleep.

Some disclosed embodiments may include during the first time period displaying a certain virtual object in a private mode and during the second time period displaying the certain virtual object in a public mode. Displaying the virtual object in a private or public mode during different time periods may be desirable to preserve privacy of the information presented through the virtual object during times where it is appropriate. In some time periods, a user may be more likely to be in a private setting, such as home. During such times, it may be desirable to present the virtual object in a mode that is consistent with viewing at home. In other time periods, a user may be more likely to be in a public setting, such as the mall or a park. During such times, it may be desirable to present the virtual object in a mode that is consistent with viewing among individuals that do not have access to private information contained in the virtual object. For example, the virtual object may include a virtual document containing portions intended for access only by the user and portions intended for access by anyone. In a private mode, the virtual document may be presented with the entire document unobscured. In a public mode, the virtual document may be presented with the portions intended for access only by the user obscured by blurring, blacking out, or by using any other manner of preventing its access by anyone other than the user.

In some embodiments, generating the first display associated with the first mobility status includes using a first display mode for displaying a first virtual object and using a second display mode for displaying a second virtual object. Associating a display mode with each virtual object in the display may be desirable to present virtual objects with characteristics that are appropriate for the type of the virtual object. Some virtual objects may be better suited for a private display mode, such as a document containing sensitive, private information. Other virtual objects may be better suited for a public display mode, including information that a user would like to share with someone else freely, such as the time. It may be undesirable to associate a single display mode with both of these virtual objects because either the private document would become publicized, or the user would not be able to share the time information with someone else. Therefore, it may be desirable to associate a display mode with each virtual object in the display. The first display mode and the second display mode may be similar. For example, both the first display mode and the second display mode may be in color. In another example, both the first display mode and the second display mode may be unobscured. Alternatively, the first display mode and the second display mode may be of differing types. For example, the first virtual object may be a clock and the second virtual object may be a photo. In this example, the clock may be displayed in a first display mode in color and the photo may be displayed in a second display mode in black and white. In another example, the first virtual object may be a calendar and the second virtual document may be a private document. In this example, the calendar may be displayed in a first display mode that is unobscured, and the private document may be displayed in a second display mode that is blurred out.

Some disclosed embodiments may include during the first time period displaying the first virtual object in a public mode and the second virtual object in a private mode. For example, the first virtual object may be a virtual document and the second virtual object may be a virtual ball. This type of display may be desirable during a time period where the user may need to access both private and public information, while the user is in a public location, such as a mall or a park. By providing for one virtual object to be displayed in a public mode and another to be displayed in a private mode during such a time period, the user may be able to view all of the objects they want to view without worrying about exposing any private information to others. In a public mode, the virtual document may be presented with portions that are not intended for general access being blurred or blacked out. In a private mode, the virtual ball may be displayed unobscured to the user. In another example, the first virtual object may be a virtual window of a shopping application and the second virtual object may be a virtual window of a banking application. In a public mode, the virtual window of the shopping application may be displayed with all of the items for sale presented unobscured, while any portions associated with a payment information being presented obscured by blurring or blacking out the portions. In a private mode, the virtual window of the banking application may be displayed with all of its portions unobscured.

Some disclosed embodiments may include during the second time period changing the first display mode of the first virtual object and maintaining the second display mode of the second virtual object. Changing one display mode while maintaining the other may be desirable to associate a more appropriate display mode for a virtual object during the second time period. In some time periods, a user may be more likely to have left from one location where one display mode is appropriate to another location where another display mode is more appropriate. During such times, it may be desirable to only change one display mode, while maintaining the other, so that the user does not have to view both virtual objects in the same display mode if that one display mode is not appropriate at the other location. For example, the first virtual object may be a virtual clock and the second virtual object may be a virtual calendar. During the first time period, such as when the user is at a sporting event, the virtual clock may be displayed in color and the virtual calendar may be displayed in black and white. During such a time, it may be appropriate to have a contrast between the two virtual objects and emphasize the clock, so that the user can better pay attention to time during the sporting event. In this example, during the second time period, such as when the sporting event is over or the user has returned home, the virtual clock may be displayed in black and white, as changed from the color display mode, while the virtual calendar may be maintained in a black and white display mode. During such a time, it may be appropriate to not have a contrast between the two virtual objects and to not emphasize the clock, since the user may not need to actively look at the time.

Some disclosed embodiments may include during the second time period using a third display mode for displaying the first virtual object and the second virtual object. This type of display may be desirable to present all virtual objects in a single display mode during a time when such a display is appropriate. In some time periods, the user may not want or need the various virtual objects to be presented in different display modes. Some situations where this may apply may include where the user would like the virtual objects to be in a background view relative to a physical object the user is viewing, or where the user may want to look at all of the virtual objects in the same way. The third display mode may be the same as the first display mode and the second display mode. Alternatively, the third display mode may be different from the first display mode and/or the second display mode. For example, the first virtual object may be a virtual clock and the second virtual object may be a virtual calendar. During the first time period, the virtual clock may be displayed in color and the virtual calendar may be displayed in black and white. During the second time period, the virtual clock may be displayed in black and white, as changed from the color display mode, while the virtual calendar may be maintained in a black and white display mode. In this example, during the second time period, the virtual clock and the virtual calendar may be displayed at a 50% opacity level.

In some embodiments, the accessed rules may further associate different display modes with different types of virtual objects for differing mobility statuses. As discussed above, one or more rules may associate display modes with mobility statuses. In some embodiments, the one or more rules may correlate different display modes with different types of virtual objects. A virtual object may include any visual presentation rendered by a computer in a confined region and configured to represent an object of a particular type, as described above. Different display modes may be desirable for different types of virtual objects to present the virtual objects with characteristics that may be more appropriate for that type of virtual object. Some virtual objects, such as documents or webpages, may require display modes associated with blurring or flagging certain portions of the text for privacy or highlighting applications. Other virtual objects, such as calendars or maps, may require display modes associated with different coloring schemes, dimensions, or sizes associated with displaying dates, events, or directions. It may not be desirable or efficient to have all display modes associated with all virtual objects in such situations because blurring may not apply for displaying certain calendar events, while different coloring schemes may not apply for displaying certain documents. For example, the accessed rules may associate display modes involving text size for virtual objects that include text, such as documents and spreadsheets, while the accessed rules may associate display modes involving blurring or blacking out for virtual objects that include sensitive information, such as a virtual banking application window containing a user's personal financial information.

In some embodiments, the different types of virtual objects may include at least two of: work-related virtual objects, health-related virtual objects, travel-related virtual objects, finance-related virtual objects, sport-related virtual objects, social-related virtual objects, docked virtual objects, undocked virtual objects. It may be desirable to have more than one type of virtual object so that the user of the wearable extended reality appliance may view multiple types of information in a single display, instead of having to shift to a different display to view each type of information. This may allow for a greater amount of information conveyed, as well as enabling multi-tasking among many different tasks associated with different types of virtual objects. Work-related virtual objects may include one or more of a planner, schedule, document, spreadsheet, or any other object associated with any activity involving mental or physical effort done to achieve a purpose or result. Health-related virtual objects may include one or more of a fitness tracker, a heart rate monitor, a weight monitor, a height monitor, or any other object associated with any physiological aspect. Travel-related virtual objects may include one or more of a map, ticket, traffic monitor, pass, or any other object associated with any movement from one place to another. Finance-related virtual objects may include one or more of a stock ticker, banking application, currency converter, or any other object associated with any management of money. Sport-related virtual objects may include one or more of a speed meter, a pacer, exercise tracker, or any other object associated with any activity involving physical exertion and skill in which an individual or team competes against another or others for entertainment. Social-related virtual objects may include one or more of a social media application, a messenger, a text message, a notification, or any other object associated with any creation or sharing of, or participation in networking. Docked virtual objects may include any object that is connected, tethered, linked, or otherwise bound to an area or another object. For example, a virtual keyboard may be docked to a physical keyboard, such that the virtual keyboard moves in alignment with the physical keyboard. Undocked virtual objects may include any object that is not connected, tethered, linked, or otherwise bound to an area or another object. For example, a virtual keyboard that is undocked from a physical keyboard may not move in alignment with the physical keyboard, and remain static, or move independently as the physical keyboard moves. In some situations, it may be desirable to present at least two of the different types of virtual objects. For example, when a user is working remotely while traveling, it may be desirable to display both travel-related virtual objects and work-related virtual objects, so that the user can track their travel on a map, while also working on a spreadsheet for work.

In some embodiments, each type of virtual object may be associated with a priority, and the association of different display modes with different types of virtual objects for differing mobility statuses may be based on the priorities associated with the different types of virtual objects. Associating a type of virtual object with a priority may be desirable to display certain virtual objects with more urgency, highlight, or any other type of importance as compared to other virtual objects. Some display modes may be associated with higher importance, such as increased brightness modes, while other display modes may be associated with lower importance, such as decreased brightness modes. A priority may include an arrangement, preference, order, rank, seniority, superiority, numbering, lettering, or any other condition of being regarded or treated as more important. In some embodiments, the priority may be provided by user input, similar to the user input described above. In other embodiments, the processor may automatically associate a priority with each type of virtual object based on predefined parameters, database values, or any other means of electronically associating one value with another. For example, a notification type of virtual object may be associated with a higher priority than a video type of virtual object. In this example, the higher-ranked notification type may be associated with display modes that favor presentation on top of other virtual objects, such as increased brightness, opacity, or contrast, or certain color schemes, such as a yellow tone, while the lower-ranked video type may be associated with display modes that favor presentation underneath other virtual objects, such as reduced brightness, opacity, or contrast, or certain other color schemes, such as black and white.

Some disclosed embodiments may include presenting via the wearable extended reality appliance a first virtual object associated with a first type and a second virtual object associated with a second type, wherein generating the first display associated with the first mobility status may include applying a single display mode for the first and second virtual objects, and generating the second display associated with the second mobility status may include applying differing display modes for the first and second virtual objects. This type of display may be desirable in situations where a user is going from one type of activity requiring uniform display modes, such as sitting at a desk in the user's home, to another type of activity requiring different display modes, such as walking around town. While at home, it may be desirable to present both virtual objects in a public mode where both objects are unobscured because, in the privacy of the user's home, the user may not need to be concerned about others accessing private information in one of the virtual objects. However, when the user is walking around town, it may be desirable to present the virtual objects in different display modes, where one object may be obscured and the other may be unobscured, to protect the user's information while in a public setting, while still allowing the user to view the desired information in both of the virtual objects. FIGS. 51A and 51B illustrate examples of different display modes associated with different types of virtual objects for differing mobility statuses, consistent with some embodiments of the present disclosure. In FIG. 51A, the first virtual object is a calendar application 5112 and the second virtual object is a banking application 5114. When the mobility status is stationary 5110, both the calendar application 5112 and the banking application 5114 may be displayed in a working display mode 5116, which may be an unobscured display of an application. In FIG. 51B, the same calendar application 5112 and banking application 5114 are displayed. When the mobility status is walking 5118, the calendar application 5112 may be displayed in the working display mode 5116, while the banking application 5114 may be displayed in a private display mode 5120, which may be an obscured display of an application, such as a blurred display.

Figure 52A:
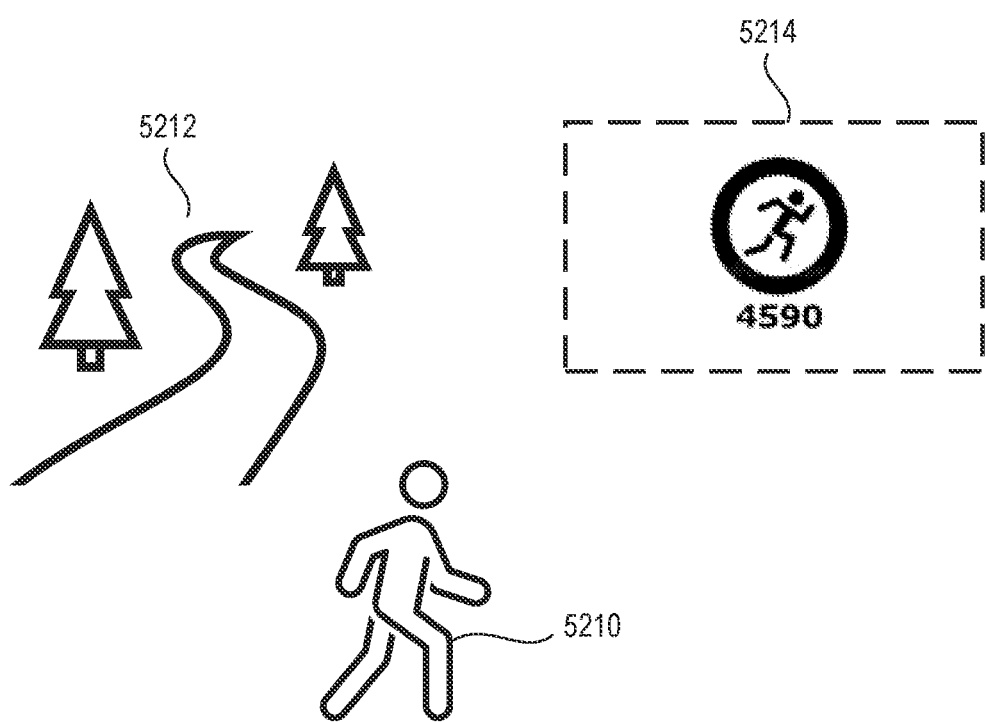
FIGS. 52A and 52B illustrate examples of different display modes associated with differing mobility statuses based on an environmental context, consistent with some embodiments of the present disclosure.
Figure 52B:
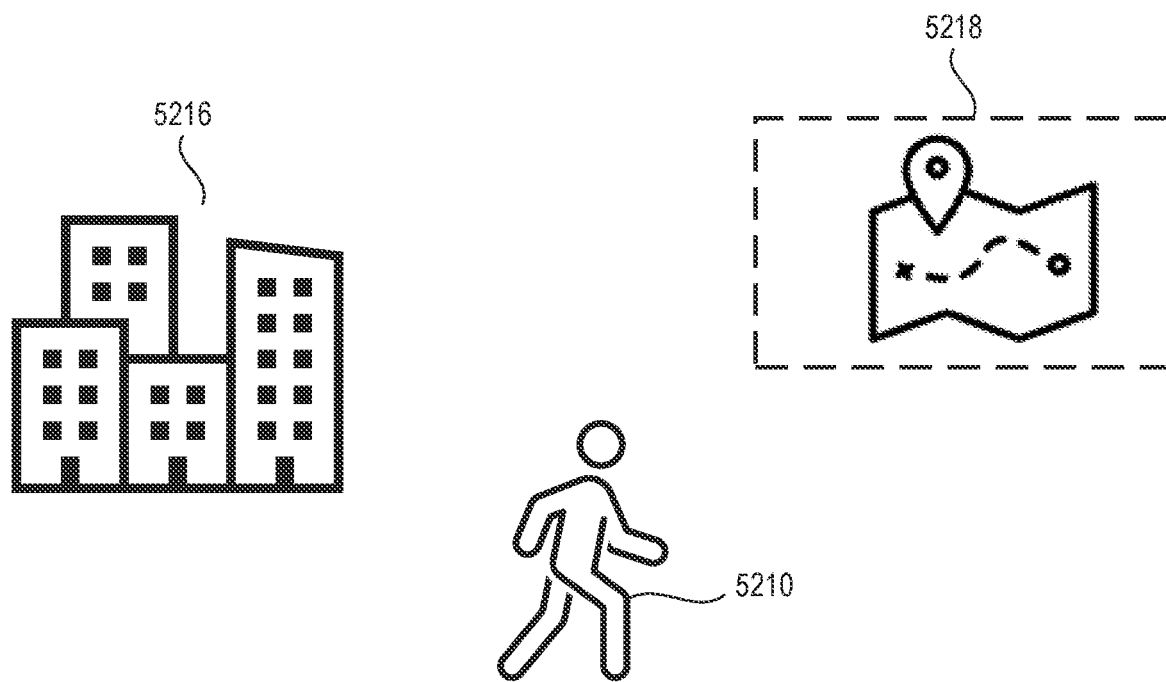

In some embodiments, the accessed rules may further associate the plurality of user mobility statuses with a plurality of display modes based on an environmental context. An environmental context may include a climate, habitat, setting, situation, status, surrounding, ambiance, background, circumstance, context, locale, neighborhood, scenery, terrain, territory, land, structure, or any other fact or condition associated with a location of a user. Associating the user mobility statuses with display modes based on an environmental context may be desirable to make the display more efficient. By associating the display modes based on the environmental context, only the display modes that are appropriate for that environmental context may be used, instead of all of the possible display modes, which may improve processor efficiency and speed. This may be desirable in situations where certain display modes would rarely, if at all, be appropriate in a given environmental context, such as private display modes in very public locations, such as the mall. FIGS. 52A and 52B illustrate examples of different display modes associated with differing mobility statuses based on an environmental context, consistent with some embodiments of the present disclosure. In FIG. 52A, when a walking mobility status 5210 is determined, an environmental context of a park location 5212 may cause the walking mobility status 5210 to be associated with a first display mode 5214 in the form of a step counter, to help the user who may be on a hike in the park. In FIG. 52B, an environmental context of a city location 5216 may cause the walking mobility status 5210 to be associated with a second display mode 5218 in the form of a map, to help the user navigate around the city. In another example, when a walking mobility status is determined, an environmental context of nearby obstacles may cause the walking mobility status to be associated with a first display mode in the form of removing all virtual objects from the direction of movement of the user (for example, remove completely from presentation, remove to the side, etc.), while an environmental context of no nearby obstacles may cause the walking mobility status to be associated with a second display mode in the form of showing virtual objects in the direction of movement of the user with low opacity. In yet another example, when a siting status is determined, an environmental context of nearby people may cause the sitting mobility status to be associated with a first display mode in the form of partial immersion, while an environmental context of no nearby people may cause the sitting mobility status to be associated with a second display mode in the form of full immersion.

In some embodiments, the environmental context is based on at least one of a location of the wearable extended reality appliance, an orientation of the wearable extended reality appliance, or a current time. It may be desirable to have the environmental context be based on location, orientation, or time because these factors are indications of a surrounding of a user. A location of the wearable extended reality appliance may provide information regarding whether a user is in an outdoor, indoor, private, public, important, or non-important place. An orientation of the wearable extended reality appliance may provide information regarding whether the user is moving, a direction in which the user is moving, and whether the user is moving toward another location that might require another type of display mode. A location of the wearable extended reality appliance may include an area, district, locale, neighborhood, part, point, region, site, or any other indication of a position of the wearable extended reality appliance. The location of the wearable extended reality appliance may be determined based on user input or data from any device capable of detecting information that can be used to determine such a position. For example, the environmental context maybe determined to be the home of the user based on a specific address derived from Global Positioning System (GPS) data acquired from a GPS sensor. In another example, the same environmental context of the home of the user may be determined based on a user input of the address, such as the user typing the address into a keyboard associated with the at least one processor. An orientation of the wearable extended reality appliance may include a direction, angle, location, tilt, slope, or any other indication of a relative position of the wearable extended reality appliance. The orientation of the wearable extended reality appliance may be determined based on user input or data from any device capable of detecting information that can be used to determine such a relative position. For example, the environmental context may be determined to be sunny based on an eastern direction determined from GPS data acquired from a GPS sensor. In another example, the same sunny environmental context of the eastern direction may be based on a user input, such as the user typing that the user is facing a sunny direction into a keyboard associated with the at least one processor. A current time may include a date, day, hour, second, month, occasion, season, term, week, year, duration, interval, span, or any other indication of a present time. The current time may be determined based on user input or data from any device capable of detecting information that can be used to determine such a present time. For example, the environmental context maybe determined to be 8 PM based on a measurement of light by an optical sensor or a clock measurement. In another example, the same environmental context of 8 PM may be based on a user input, such as the user typing that the time is 8 PM into a keyboard associated with the at least one processor.

In some embodiments, the environmental context is determined based on an analysis of at least one of image data captured using an image sensor included in the wearable extended reality appliance or audio data captured using an audio sensor included in the wearable extended reality appliance. An image sensor may include a charge coupled device (CCD), complementary metal oxide semiconductor (CMOS), or any other device that detects and conveys information related to an image. Image data may include pixel information, image size, resolution, depth of field, type of objects, number of objects, and any other information that may be related to an image. In one example, a visual classification algorithm may be used to classify the image data to one of a plurality of alternative classes. Each class may correspond to an environmental context, and thereby the classification of the image data may determine the environmental context. In another example, the image data may be analyzed using an object detection algorithm to detect the present of objects of particular types in the environment, and the environmental context may be based on whether objects of certain types are present in the environment. The environmental context may be based on the image data using predefined parameters of image data for a given environmental context, database values of image data used for a given environmental context, or any other means of electronically linking one value with another. For example, the environmental context may be determined to be a city based on the number of buildings detected in an image. In another example, the environmental context may be determined to be night time based on darkness measured from light data detected in an image. In yet another example, the environmental context may be determined to be a private location based on a low-light condition, as measured by light data detected in an image. An audio sensor may include an acoustic sensor, pressure sensor, microphone, or any other device that detects the presence or intensity of sound waves and converts it into electrical signals. Audio data may include pressure, volume, tone, pitch, or any other indication of any information associated with a sound. The environmental context may be based on the audio data using predefined parameters of audio data for a given environmental context, database values of audio data used for a given environmental context, or any other means of electronically linking one value with another. For example, the environmental context may be determined to be a public location based on a high volume or sound level, as detected by a microphone. In another example, the environmental context may be determined to be a private location, based on a low volume or sound level, as detected by a microphone. In yet another example, the environmental context may be determined to be a concert based on music detected in the audio data.

In some embodiments, the environmental context may be based on at least one action of at least one individual in an environment of the wearable extended reality appliance. An action may include walking, standing, sitting, reading, speaking, singing, running, or any other process of doing something to achieve an aim. An individual in an environment of the wearable extended reality appliance may include any person within a specified distance of the wearable extended reality appliance. It may be desirable to base the environmental context on such an individual to protect the privacy of certain information that a user of the wearable extended reality appliance may not want to share with others. It may also be desirable to base the environmental context on such an individual to improve processor efficiency and speed by only associating certain display modes with certain individuals. For instance, some individuals may rarely, if ever, need to know health information. This may include co-workers or shop attendants. Therefore, it would be inefficient to associate health-related display modes with a given environmental context based on the presence of such an individual, and it may be desirable to only associate health-related display modes with a given environmental context based on the presence of a doctor, nurse, or any other individual who would need that type of information. For example, the processor may be configured such that an environment of the wearable extended reality appliance is any area within a ten-foot radius of the wearable extended reality appliance. In this example, only the actions of people within that ten-foot radius may be considered to determine an environmental context. In another example, some individuals may be identified to have access to certain sensitive information in a given environment. When those individuals are in an environment of the wearable extended reality appliance, more public display modes such as improved brightness and contrast, may be used. When other individuals not including those identified individuals are in the environment, more private display modes, such as reduced brightness and contrast, may be used.

In some embodiments, the environmental context may be based on objects in an environment of the wearable extended reality appliance. Objects in an environment of the wearable extended reality appliance may include any item or surface within a specified range of the wearable extended reality appliance. Basing the environmental context on such objects may be desirable because certain objects may be associated with specific locations. For instance, desks may be associated with workplaces, while trees may be associated with parks. For example, the processor may be configured such that an environment of the wearable extended reality appliance is any area within a five-foot radius of the wearable extended reality appliance. In this example, only objects within that five-foot radius may be considered to determine an environmental context. When the user is in an environment with home objects such as kitchen appliances, plants, photographs, clothes, sofas, or beds, the environmental context may be determined to be a home environment. In such an example, the available display modes may include those associated with private locations, such as a home. Such display modes may include those having increased brightness and contrast, or unobscured text. When the user is in an environment with shop objects such as a cash register, clothes racks, display tables, or jewelry, the environmental context may be determined to be a shop environment. In such an example, the available display modes may include those associated with public locations, such as a shop. Such display modes may include those having reduced brightness and contrast, or obscured text.

Figure 53:
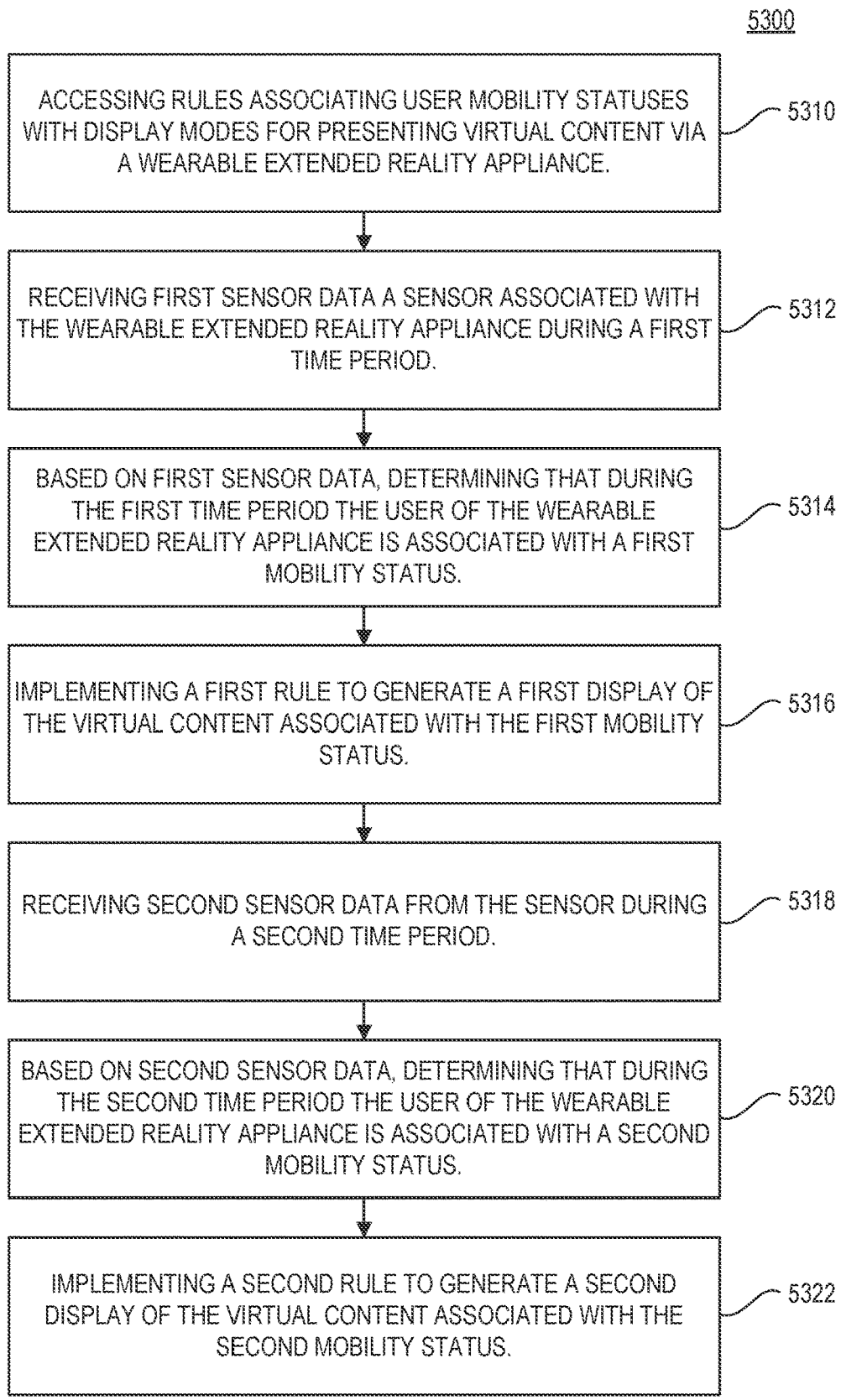
FIG. 53 is a flowchart of an exemplary method for coordinating virtual content display with mobility status, consistent with some embodiments of the present disclosure.

Some embodiments may include a method for coordinating virtual content display with mobility status. FIG. 53 is a flowchart of an exemplary method 5300 of coordinating virtual content display with mobility status, consistent with some embodiments of the present disclosure. Method 5300 may include a step 5310 of accessing rules associating a plurality of user mobility statuses with a plurality of display modes for presenting virtual content via a wearable extended reality appliance. Method 5300 may include a step 5312 of receiving first sensor data from at least one sensor associated with the wearable extended reality appliance, the first sensor data being reflective of a mobility status of a user of the wearable extended reality appliance during a first time period. Method 5300 may include a step 5314 of based on the first sensor data, determining that during the first time period the user of the wearable extended reality appliance is associated with a first mobility status. Method 5300 may include a step 5316 of implementing at least a first accessed rule to generate a first display of the virtual content via the wearable extended reality appliance associated with the first mobility status. Method 5300 may include a step 5318 of receiving second sensor data from the at least one sensor, the second sensor data being reflective of the mobility status of the user during a second time period. Method 5300 may include a step 5320 of based on the second sensor data, determining that during the second time period the user of the wearable extended reality appliance is associated with a second mobility status. Method 5300 may include a step 5322 of implementing at least a second accessed rule to generate a second display of the virtual content via the wearable extended reality appliance associated with the second mobility status, wherein the second display of the virtual content differs from the first display of the virtual content.

Some embodiments may include a system for coordinating display of virtual content with mobility status, the system comprising: at least one processor configured to: access rules associating a plurality of user mobility statuses with a plurality of display modes for presenting virtual content via a wearable extended reality appliance; receive first sensor data from at least one sensor associated with the wearable extended reality appliance, the first sensor data being reflective of a mobility status of a user of the wearable extended reality appliance during a first time period; based on the first sensor data, determine that during the first time period the user of the wearable extended reality appliance is associated with a first mobility status; implement at least a first accessed rule to generate a first display of the virtual content via the wearable extended reality appliance associated with the first mobility status; receive second sensor data from the at least one sensor, the second sensor data being reflective of the mobility status of the user during a second time period; based on the second sensor data, determine that during the second time period the user of the wearable extended reality appliance is associated with a second mobility status; and implement at least a second accessed rule to generate a second display of the virtual content via the wearable extended reality appliance associated with the second mobility status, wherein the second display of the virtual content differs from the first display of the virtual content.

Docking virtual objects to physical objects may provide important capabilities in an extended reality environment. For example, the docked virtual objects may provide information related to a physical object, and/or may extend or adjust functionality of a physical object that has some functionality. Docking the virtual objects to the physical object, and thereby causing the virtual object to move with the physical object under certain conditions, may maintain a spatial association or relation between the physical object and the virtual objects. Furthermore, in embodiments where the physical object is an input device (such as a keyboard), and the docked virtual objects are configured to provide users with additional ways to provide input, maintaining the spatial association between the physical object and the virtual objects may be necessary for enabling touch typing (also known as blind typing), or other kinds of interactions based on constant special relations among elements. Some virtual objects may have functionality that depend on their adjacentness to a physical surface. For example, a physical surface may provide tactile feel to a user using a virtual slider. Therefore, when removing the physical object from a physical surface associated with virtual objects adjacent to the physical surface and docked to the physical object (at least while the physical object is moving on the surface), it may be desirable to adjust the virtual objects to function away from a physical surface, to undock from the physical object (for example, a wearable extended reality appliance user may leave the virtual objects adjacent to the physical surface), and/or to remove the virtual objects from the extended reality environment.

Some disclosed embodiments may include systems, methods, and non-transitory computer readable media, containing instructions that when executed by at least one processor cause the at least one processor to perform operations for modifying display of virtual objects docked to a movable input device. Modifying display of virtual objects may include changing visual properties such as color scheme, opacity, intensity, brightness, frame rate, display size, and/or virtual object type. Additionally, some virtual objects may be displayed and others may be hidden depending on the location of the movable input device, i.e., whether the input device is on a supporting surface or not.

A movable input device may refer to any input device that may be moved, for example by a user of an extended reality environment, such as a virtual or a physical device that a user of a wearable extended reality appliance may employ to send a command to the wearable extended reality appliance. The movable input device may be any portable device that a user can easily (i) move on a supporting surface, and/or (ii) remove and transfer from the supporting surface to a different location or orientation. In some examples, the movable input device may be a physical movable input device, such as a physical keyboard, a physical computer mouse, a physical touchpad, a physical joystick, and/or a physical game controller. In some examples, the movable input device may be a virtual movable input device, such as a virtual keyboard, a virtual slider, and/or a combination or a virtual keyboard and a virtual slider. By way of example, as illustrated in FIG. 2, input devices such as keyboard 104 or mouse 106 may be movable input devices. Keyboard 104 and mouse 106 are movable input devices because each can be moved from its current location or orientation to a new location or orientation. For example, keyboard 104 or mouse 106 may be moved towards the left or right from its current location. In another example, keyboard 104 may be rotated about an axis perpendicular to the figure such that keyboard 104 is oriented at an angle of, for example, thirty degrees from its initial orientation. In yet another example, keyboard 104 may be removed from the top surface of table 102. In an additional example, keyboard 104 may be moved on the top surface of table 102 to a new location on the top surface of table 102.

Some disclosed embodiments may include receiving image data from an image sensor associated with a wearable extended reality appliance, and the image data may represent an input device placed at a first location on a supporting surface.

An image sensor may be included in any of the devices or systems in the present disclosure and may be any device capable of detecting and converting optical signals in the near-infrared, infrared, visible, and/or ultraviolet spectrums into electrical signals. Examples of image sensors may include digital cameras, phone cameras, semiconductor Charge-Coupled Devices (CCDs), active pixel sensors in Complementary Metal-Oxide-Semiconductor (CMOS), or N-type metal-oxide-semiconductor (NMOS, Live MOS). The electrical signals may be used to generate image data. Consistent with the present disclosure, the image data may include pixel data streams, digital images, digital video streams, data derived from captured images, and data that may be used to construct one or more 3D images, a sequence of 3D images, 3D videos, or a virtual 3D representation.

Image data may be used to represent where the input device has been placed on the supporting surface. For example, the image sensor may determine, based on captured image data, where the movable input device is located, and what portion of the surrounding area is a supporting surface. Color data, as captured by the image sensor via a Bayer-filter sensor, a Foveon X3 sensor, and/or a 3CCD sensor, may be used to determine which portion of the image is the movable input device, and which portion of the image is the supporting surface. In some embodiments, the image sensor may have a built-in processing unit, which is capable of machine learning. In this embodiment, the image sensor compiles and stores image data over time and may determine which portion of the image data is a keyboard and which is a supporting surface from the compiled data. In some embodiments, the image sensor may also capture image data and later send that data to the at least one processor associated with the wearable extended reality appliance to be analyzed further, i.e., determine whether the movable input device has been moved to second location as part of the support surface, or has been removed from the support surface.

A supporting surface may be any solid surface on which a user may place a movable input device, such as a keyboard, a mouse, or a joystick. In one example, the supporting surface may be a flat, even surface. In other examples, the supporting surface may be an uneven surface and may include defects, cracks, and/or dust. Examples of supporting surfaces may include a surface of a desk, a table, a floor surface, or any other surface of an object on which the movable input device may be placed.

In some embodiments, the image sensor may be included in the wearable extended reality appliance. An image sensor may be said to be included in the wearable extended reality appliance if at least a portion of the image sensor or its associated circuitry is located within a housing of the appliance, is located on the appliance, or is otherwise connectable to the appliance. Some types of sensors that may be included in the wearable extended reality appliance are digital cameras, phone cameras, semiconductor Charge-Coupled Devices (CCDs), active pixel sensors in Complementary Metal-Oxide-Semiconductor (CMOS), or N-type metal-oxide-semiconductors (NMOS, Live MOS). Light may be captured and converted to electrical signals, which may be used to generate image data. In order to accurately capture image data, the image sensor may be connected to the lens of the wearable extended reality appliance. The image sensor may also be part of the bridge of the wearable extended reality appliance connecting the two lenses together. In this embodiment, the image sensor may be able to accurately capture images based on where the user of the wearable extended reality appliance is looking.

In some embodiments, the image sensor may be included in the input device connectable to the wearable extended reality appliance. An input device may be any hardware configured to send information or control signals to the appliance. Non-limiting examples of input devices include keyboards, touchpads, mice, dedicated controllers, or personal devices (cell phones, tablets, smart watches, or other wearables) paired with the extended reality appliance. The types of sensors that may be included as part of the input device may be any of the sensors described earlier in the specification. In some embodiments, the image sensor may be included in the center of the input device, the edges of the input device, or anywhere else along the length of the input device that may capture accurate image data. An image sensor may detect changes in light, i.e., when a user lifts the movable input device off the supporting surface, that may reflect a removal movement. The image sensor may also be included in a plane transverse to the moveable input device. The image sensor may capture gestures, and/or different colored images to determine the location of the movable input device and the supporting surface.

In some embodiments, the movable input device may include at least thirty keys and a touch sensor, and excludes a screen configured to present media content. The movable input device may include any number of keys. For example, the movable input device may include 10, 20, 30, 40, or any number of keys that may allow a user to provide one or more inputs. In some embodiments, the input device may include thirty or more keys that may include alphanumeric characters, directional keys, functional keys, keys adjusting brightness and sound, keys related to performing shortcuts (e.g., copy and paste, cut and paste, or print), keys related to describing the alphanumeric characters (e.g., exclamation point, apostrophe, period), and/or keys related to performing functions (e.g., addition, multiplication, or equals symbols). In some embodiments, the keyboard may also be configured for languages that do not use alphanumeric characters, such as those that use logographic characters.

In some embodiments, the input device may exclude a screen configured to present media content. A screen configured to present media content may include any type of display capable of presenting text, images, animation, or videos. Examples of screens configured to present media content may include a computer monitor, a TV screen, a tablet, and/or a phone screen. In one embodiment, a screen configured to present media content may have, but is not limited to, a screen size greater than 5 centimeters, 10 centimeters, 25 centimeters, or 50 centimeters; a screen with image resolution greater than 400×300 pixels, greater than 600×400 pixels, or greater than 800×600 pixels, a screen capable of displaying more than two colors, or a screen configured to play a video stream. In this embodiment, the movable input device does not include any a physical screen configured to present media content fixedly connected to it. To present content, a user of the movable input device may use the wearable extended reality appliance to present a virtual object or connect the movable input device to a separate standalone physical screen, for example, a television in proximity to the input device.

Some disclosed embodiments may involve causing the wearable extended reality appliance to generate a presentation of at least one virtual object in proximity to the first location. A virtual object may include a virtual inanimate object, virtual animate object, two-dimensional virtual object, three-dimensional virtual object, virtual input object, virtual widgets, or any of the other representations described herein as virtual objects. A virtual object may also allow adjustment of visual properties (for example, of virtual content, of the extended reality environment, of the virtual object, or of other virtual objects in the extended reality environment), such as a brightness scale, volume adjustment bar, task bar, or navigation pane. The user of the wearable extended reality appliance may use gestures to interact with these virtual objects to modify the virtual content. Virtual content may be displayed via the wearable extended reality appliance, and virtual objects may be part of the virtual content or may be associated with the virtual content. For example, virtual content may be a document or a video. Virtual objects as part of (or associated with) that specific virtual content may be volume or brightness settings, or a navigation pane for the document. Furthermore, a virtual object may be two-dimensional or three-dimensional. More than two virtual objects may be paired with one another. For example, one virtual object may be a video. Two additional virtual objects that may be paired with this virtual object may be a brightness adjustment bar and/or a volume adjustment bar.

Proximity may refer to a distance between the movable input device and the presented virtual object. The virtual object may be presented adjacent to the movable input device so that the user of the wearable extended reality appliance can easily view and edit the virtual object. The distance between the input device and the presented virtual object, i.e., the proximity between the presented virtual object and the movable input device, may be configured by the user. For example, one user may prefer to present virtual content further away from the movable input device, such as at a distance of half a meter, whereas other users may prefer to present virtual content closer to the movable input device, such as at a distance within twenty centimeters. In some examples, the virtual object may be presented adjacent to the movable input device, at a selected relative position and orientation to the moveable input device, so that the user of the wearable extended reality appliance can easily locate and interact with the virtual object even when not looking at the virtual object (for example, in a touch typing usage) or when the virtual object is not presented to the user (for example, when it is outside the field of view of the wearable extended reality appliance).

Some disclosed embodiments may involve docking the at least one virtual object to the input device. Docking may refer to associating a virtual object with the input device. This may occur by connecting a virtual object to a physical object such that the two move together in tandem. That is, the virtual object's position and/or orientation may be connected to the position of the other object position and/or orientation. In one example, a virtual display screen (also referred to as a 'virtual display' or a 'virtual screen' herein) may be docked to a physical keyboard and moving the physical keyboard may cause the docked display screen to move. In another example, a virtual input element may be docked to a physical keyboard adjacent to a physical surface that the physical keyboard is placed on, and moving the physical keyboard on the physical surface may cause the docked virtual input element to move on the physical surface.

In some embodiments, virtual objects may be docked with other virtual objects. In some examples, virtual objects may be two-dimensional. Some non-limiting examples of such two-dimensional virtual objects may include a task pane, volume or brightness adjustment bar, or document. In some other examples, virtual objects may be three-dimensional. Some non-limiting examples of such three-dimensional objects may include a presentation or scale model of a project. In one example, two-dimensional virtual objects may be docked with three-dimensional virtual objects and vice-versa. In another example, two-dimensional virtual objects may be docked with two-dimensional virtual objects, and/or three-dimensional virtual objects may be docked with three-dimensional virtual objects.

In some examples, a user of a wearable extended reality appliance may undock a virtual object from a physical object or undock a virtual object from another virtual object. For example, the user may do so by issuing a textual command via the movable input device, by issuing a voice command, by making a hand gesture, using a virtual cursor, or by any other means. For example, the user may undock by performing an action that may be captured by an image sensor. The image sensor may be associated with the wearable extended reality appliance and may be located on either lens, the bridge connecting the two lenses of the wearable extended reality appliance, or any other location where the sensor may capture accurate image information. The image sensor may also be included in the input device connectable to the wearable extended reality appliance. The action may be recognized in the image data captured using the image sensor, for example by analyzing the image data using a visual action recognition algorithm, and the undocking may be triggered based on the recognition of the action.

Figure 54:
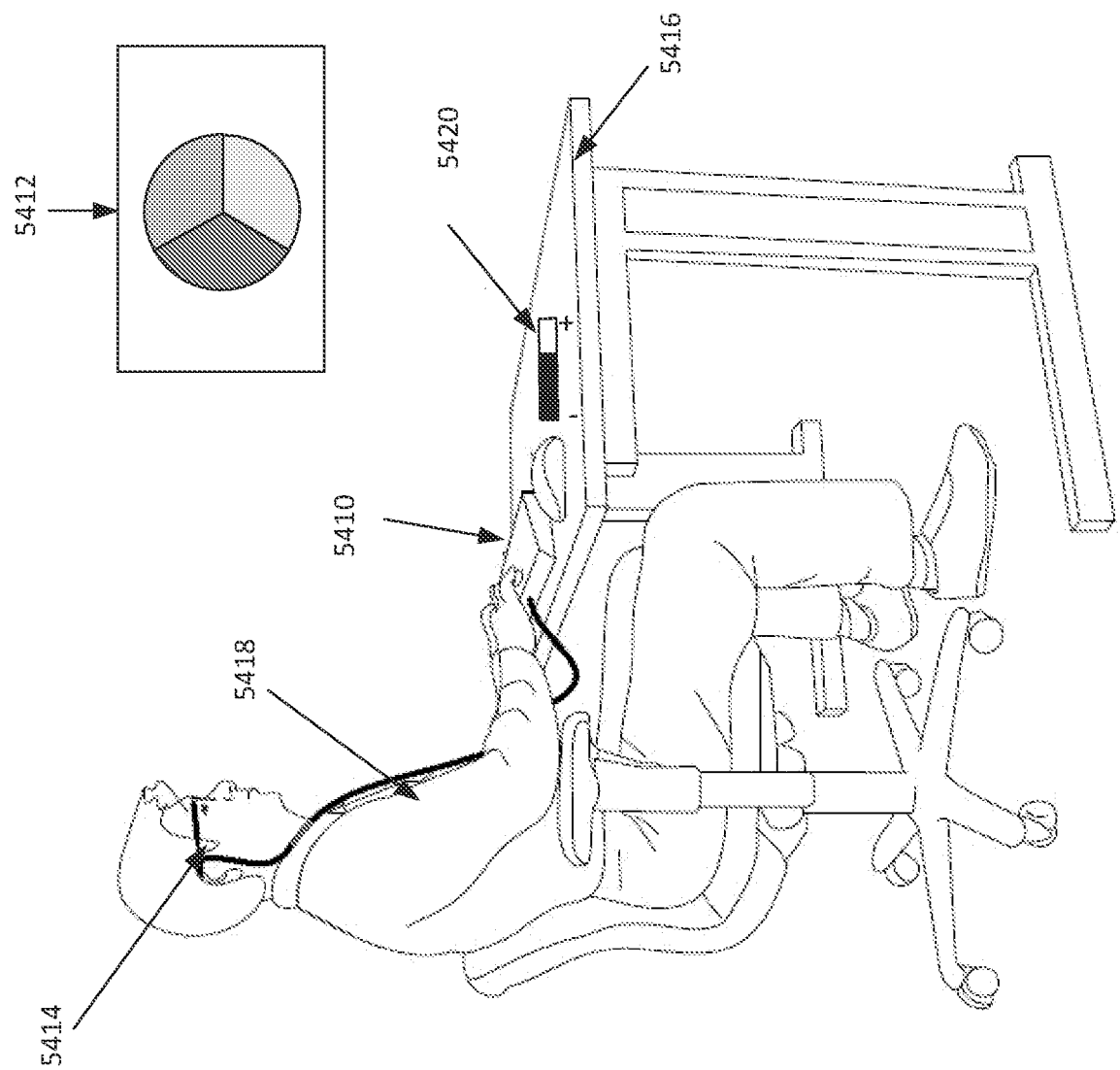
FIG. 54 generally illustrates a docking concept, consistent with some disclosed embodiments.

By way of example, FIG. 54 depicts a virtual object 5420 (for example, a volume adjustment bar or brightness adjustment bar) docked to a movable input device 5410. Here, an image sensor associated with the wearable extended reality appliance 5414 may detect, through captured image data, that input device 5410 is placed at a first location on support surface 5416. In one example, user 5418 of wearable extended reality appliance 5414 may initiate a command to dock virtual object 5420 to the movable input device 5410, and as a result virtual object 5420 may be presented in proximity to the first location. Because the movable input device 5410, and virtual object 5420, are docked, the presented virtual object may move in tandem with the movable input device. A second virtual object 5412, such as a virtual display screen, may also be displayed in addition to first virtual object 5420. In one example, second virtual object 5412 may also be docked to movable input device 5410 and may therefore move in tandem with the movable input device (although second virtual object 5412 may be far from the first location). In another example, second virtual object 5412 may not be docked to movable input device 5410, and therefore movement of movable input device 5410 may not trigger an automatic movement of second virtual object 5412.

In some embodiments, processor operations may further include docking a first virtual object to the input device, the first virtual object being displayed on a first virtual plane overlying the support surface. A virtual plane may refer to a flat surface (on which a straight line joining any two points on it may wholly lie) or to a non-flat surface. In this context, all content displayed on a virtual plane may be displayed in association with the surface, e.g., the content may appear flat to a viewer or may appear to be associated with a common surface. Alternatively, a virtual plane may be a curved surface and content may be displayed along the plane of the curved surface. A virtual plane may be considered virtual if it is employed in connection with an extended reality display or an extended reality environment, regardless of whether the plane is visible. Specifically, a virtual plane may be displayed in color or with texture so that it may be visible to a wearer of an extended reality appliance, or the virtual plane may be invisible to the eye, but might become perceptible when visible objects are located in the virtual plane. In one example, a virtual plane may be illustrated with virtual grid lines in an extended reality environment. A virtual plane may include, for example, a flat surface, a non-flat surface, a curved surface, or a surface having any other desired configuration. The first virtual plane may overlie the support surface, that is, it may appear on top of or transverse to the support surface. In one example, the first virtual plane may be parallel to or nearly parallel to the support surface, meaning that there is a zero-degree angle or a small angle (for example, below 1 degree, below 5 degrees, below 10 degrees, and/or below 20 degrees) between the virtual plane and the support surface. A virtual object, such as a volume or brightness adjustment bar, may be docked with the movable input device such that the movable input device is placed on the support surface, the first virtual plane overlies the support surface, and the first virtual plane and the virtual object may be in the same plane.

In some embodiments, processor operations may further include docking a second virtual object to the input device, wherein the second virtual object is displayed on a second virtual plane transverse to the first virtual plane. A second virtual plane is a plane that may be presented at a different angle to the first virtual plane and the supporting surface. The second virtual plane may be displayed transverse to the first virtual plane so that presented content is more visible to the user of the wearable extended reality appliance. Additionally, because the first and second virtual objects are docked, the two virtual objects may move together. In this embodiment, the second virtual object may be displayed at a right angle or at a non-zero angle (such as an angle between 10 and 170 degrees, between 30 and 150 degrees, between 45 and 135 degrees, between 60 and 120 degrees, between 85 and 95 degrees, between 46 and 89 degrees, and/or between 91 and 134 degrees) to the first displayed content. For example, a first virtual object, a volume or brightness adjustment bar or navigation pane, may be presented by the wearable extended reality appliance. The second virtual object, such as a virtual display screen, may be displayed transversely so that it may be easier for the user of the wearable extended reality appliance to interact with the first virtual object and to better view the second virtual object.

By way of example, FIG. 54 shows an example of a second virtual object, a virtual screen presenting virtual content 5412, presented in one plane and an example of a first virtual object, volume or brightness adjustment bar, presented in another plane transverse to the first plane.

Some disclosed embodiments may include determining that the input device is in a second location on the support surface. Determining that the input device is in the second location may involve using image analysis to detect the input device and the second location and determining that they correspond. In another example, determining that the input device is in the second location may involve using visual object detection algorithm to analyze image data to detect the input device at a particular location on the support surface, thereby identifying the second location on the support surface. The at least one processor, based on image data captured by the image sensor, may determine that the input device is in a second location on the support surface. For example, the processor, based on data captured by the image sensor, may determine that colors and/or textures in the area surrounding the movable input device have not changed, indicating that the movable input device is still located on the support surface. In some embodiments, the second location on the support surface may refer to a location that differs from the first location, but is still in the same plane on the same support surface. For example, the support surface may be a desk, table, floor surface, or other flat or non-flat solid surface. In this example, the second location may be one that is directly right or left (or at another particular direction) of the first location. The at least one processor, based on image data captured by the image sensor included in the wearable extended reality appliance, may determine that the movable input device has changed location via analysis of captured image data, for example using a visual object tracking algorithm.

The image sensor may also be included in the input device connectable to the wearable extended reality appliance. In some embodiments, the image sensor may be located within the movable input device. In some embodiments, the processor associated with the wearable extended reality appliance may determine that the movable input device has moved from a first location to a second location based on an analysis of image data captured using the image sensor included in the movable input device using an ego-motion algorithm.

In another embodiment, the image sensor may be included in a plane transverse to the movable input device. In this example, the image sensor may capture color, light, texture or defining features that may assist in describing the environment surrounding the movable input device. In this embodiment, the image sensor may capture sequential images. These images will differ from one another, for example (at least partly) due to the user is moving the movable input device from a first location on a supporting surface to a second location. The sequential images may be analyzed using an object tracking algorithm to determine that the input device moved to the second location on the support surface.

In some embodiments, determining that the input device is in a second location on the support surface may be based on a position of the input device determined using one or more positioning sensors included in the input device. In some embodiments, determining that the input device is in a second location on the support surface may be based on a movement of the input device from the first location. In some examples, the movement of the input device may be determined using one or more movement sensors included in the input device, such as motion sensor 373 (see FIG. 3).

In some embodiments, processor operations may further include detecting at least one of a movement of the input device on the support surface or a removal movement of the input device from the support surface based on an analysis of the image data. In some examples, visual classification algorithm may be used to analyze image data received from an image sensor and classify the image data to one class of three alternative classes, 'no movement of the input device', 'movement of the input device on the support surface' and 'removal movement of the input device from the support surface', thereby detecting the movements. In one example, the visual classification algorithm may be a machine learning classification algorithm trained using training examples to classify images and/or videos to one of the three classes. An example of such training example may include a sample image and/or a sample video of a sample input device, together with a label indicating to which of the three classes the training example corresponds. In some examples, a visual object tracking algorithm may be used to analyze image data received from an image sensor external to the input device (for example, in the wearable extended reality appliance) and to track the input device in the image data to thereby obtain motion information. Further, the motion information may be analyzed to determine whether the image data corresponds to no movement of the input device (for example, integral of the movement vectors is zero or small), to a movement of the input device on the support surface (for example, integral of the movement vectors is on or parallel to the support surface), or to a removal movement of the input device from the support surface (for example, integral of the movement vectors is at a non-zero angle to the support vector). In some examples, an ego-motion algorithm may be used to analyze image data received from an image sensor included in the input device and determine the motion of the input device. Further, the motion may be analyzed to determine whether the image data corresponds to no movement of the input device (for example, integral of the movement vectors is zero or small), to a movement of the input device on the support surface (for example, integral of the movement vectors is on or parallel to the support surface), or to a removal movement of the input device from the support surface (for example, integral of the movement vectors is at a non-zero angle to the support vector).

In some embodiments, processor operations may further include detecting at least one of a movement of the input device on the support surface or a removal movement of the input device from the support surface based on an analysis of motion data received from at least one motion sensor associated with the input device. The movable input device may include its own motion sensor that outputs data and from which a determination of movement may be made. Further, the motion information may be analyzed to determine whether the motion corresponds to no movement of the input device (for example, the integral of the movement vectors is zero or small), to a movement of the input device on the support surface (for example, the integral of the movement vectors is on or parallel to the support surface), or to a removal movement of the input device from the support surface (for example, the integral of the movement vectors is at a non-zero angle to the support vector).

Some disclosed embodiments may involve determining that the input device is in the second location, and subsequently updating the presentation of the at least one virtual object such that the at least one virtual object appears in proximity to the second location. Determining that the input device is in the second location may be accomplished in a manner similar to the previously described determination associated with the first location. For example, at least one processor associated with the wearable extended reality appliance may determine that the movable input device is in a second location based on captured image data, captured motion data, or both. In one example, based on captured image data and/or motion data, the at least one processor may determine that the movable input device is in a second location and no longer moving. In another example, based on captured image data and/or motion data, the at least one processor may determine that the movable input device is in a second location and continues to move. After the processor determines that the input device is in a second location on the support surface, the wearable extended reality appliance may continue to present the virtual content it was presenting at the first location. In one example, the presented virtual content may not appear until the movable input device is stationary at a second location. For example, when a user wishes to slide the movable input device across a supporting surface, the virtual object may not be presented until the input device is stationary at the second location, as determined by the image sensor and/or the motion sensor. In another example, the presented virtual content may appear to be moving with the movable input device from a position in proximity to the first location to a position in proximity to the second location. In yet another example, the presented virtual content may continue to appear in proximity to the first location until the movable input device is stationary at a second location. In some examples, a user may configure the wearable extended reality appliance to begin to present the virtual object when the motion sensor as part of the movable input device, or the image sensor as part of the wearable extended reality appliance detects that the input device is slowing down or nearing a standstill. The at least one processor, based on captured image data, may determine that the input device is slowing down or nearing a standstill by comparing sequential images to one another. When the processor determines that the movable input device is nearing a standstill, the processor may resume presenting virtual content from the first location. In the motion sensor example, the processor, based on captured position and/or orientation data from the motion sensor, may determine that the movable input device is nearing the second location if the angle between the movable input device and the support surface is nearing zero. The wearable extended reality appliance may present content at the second location when the angle between the bottom of the movable input device and the support surface is less than five degrees.

Figure 55B:
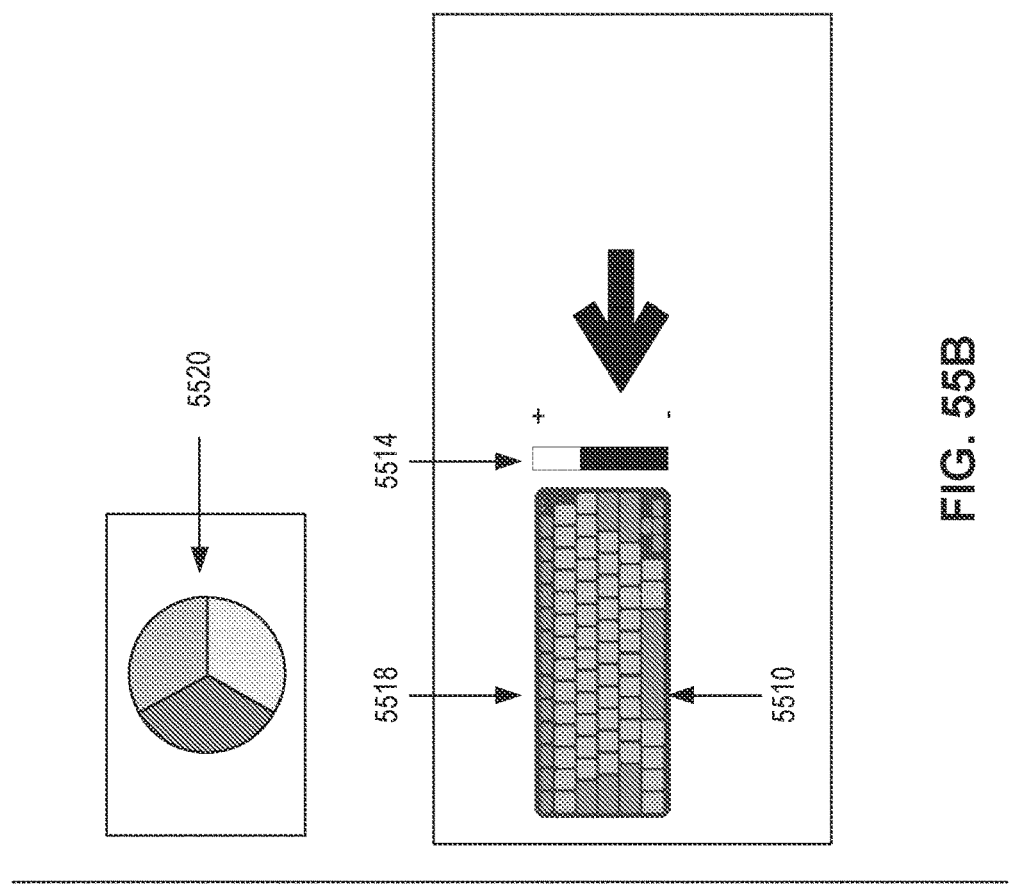
FIG. 55B is an exemplary illustration of a keyboard docked with a virtual object at a second location on a supporting surface, consistent with some disclosed embodiments.
Figure 55A:
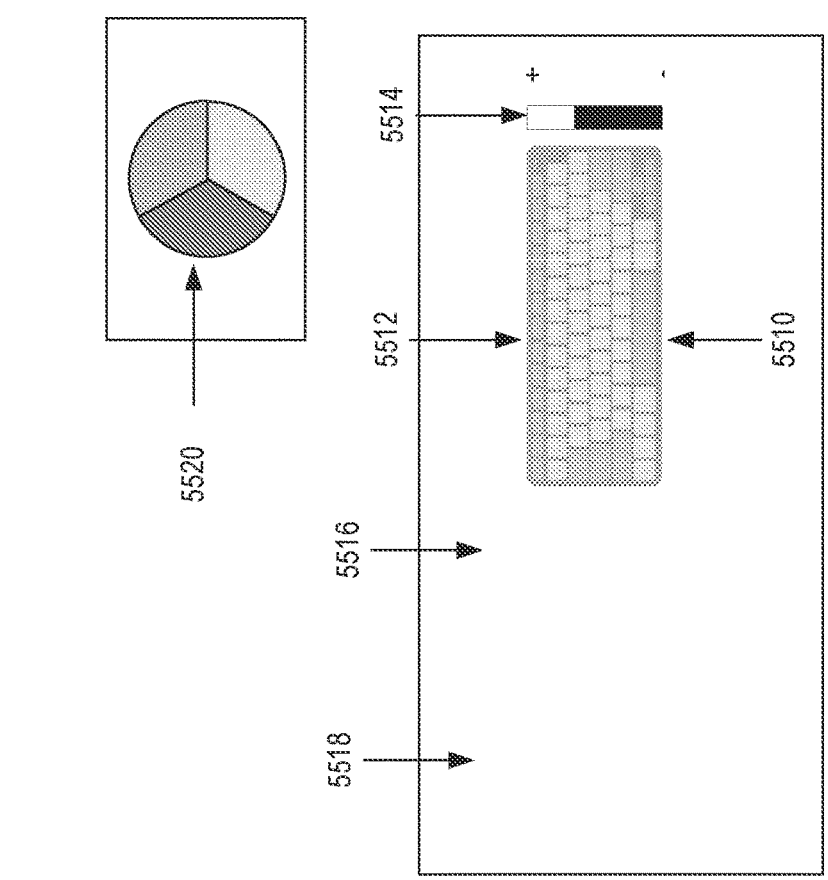
FIG. 55A is an exemplary illustration of a keyboard docked with a virtual object at a first location on a supporting surface, consistent with some disclosed embodiments.

By way of example, in FIG. 55A, a user of a wearable extended reality appliance may move the input device 5510 from a first location 5512, where it is docked to a first virtual object 5514 on support surface 5516 to second location 5518. A second virtual object 5520, positioned away of support surface 5516, may also be docked with input device

5510. For example, the second virtual object 5520 may be comprised of a graph or chart, and the first virtual object 5514 may be an interactive virtual tool used to adjust the brightness of the graph or chart. As shown in FIG. 55B, the wearable extended reality appliance, in response to determining that the input device 5510 is in a second location 5518, updates the virtual object presentation such that the first virtual object 5514 appears in proximity to the second location 5518 on support surface 5516, and second virtual object 5520 moves with the input device 5510 away of support surface 5516. In some examples, other virtual objects (not shown in FIGS. 55A and 55B), such as virtual widgets, may be docked to second virtual object 5520, and may thereby move with the second virtual object 5520 when the second virtual object 5520 moves.

In some embodiments, wherein the input device is placed on the first location on the supporting surface, and the at least one virtual object has original spatial properties relative to the input device, processor operations may further include maintaining the original spatial properties of the at least one virtual object relative to the input device where the input device is in the second location. Spatial properties may include any characteristic or parameter reflective of the object's position in an environment. For example, two objects or items may have spatial properties relative to each other. When one of the two objects is moved, there may be a desire to maintain the same special properties for the other item, such that the second item moves with the first and in the new orientation, the relative spatial properties remain substantially the same. In one example, this may enable a user using touch typing (also known as blind typing) to use interactive virtual tool (e.g., first virtual object 5514) without looking at it, based on the spatial properties of virtual object 5520 relative to the input device 5510. In some other examples, a user of a wearable extended reality appliance may move an input device from a first location on a supporting surface, such as a desk or table, to a second location on the same supporting surface. When the movable input device is at or near the second location, a virtual object may be presented, and may be comprised of a first virtual object docked with a second virtual object. The presented virtual object's properties may be configured by the user, and may include color scheme, opacity, intensity, brightness, frame rate, display size, and/or virtual object type settings. When presenting virtual content, a main goal may be to maintain the uniformity of the presented virtual content when moving the input device from location to location. To achieve this goal, the spatial properties of the presented virtual object may remain the same.

In some embodiments, the original spatial properties may include at least one of a distance of the at least one virtual object from the input device, an angular orientation of the at least one virtual object relative to the input device, a side of the input device on which the at least one virtual object is located, or a size of the at least one virtual object relative to the input device. The original spatial properties may include a distance of the at least one virtual object from the input device. It may be desirable to keep the presented virtual content and the associated virtual objects at the same distance from the input device at the second location as it was in the first location. The user may configure his or her preferred presentation distance relative to the movable input device. For example, a user may prefer to present virtual content twenty-five centimeters away from the movable input device. When the user moves the input device from a first location to a second location, it may be desirable for the user to maintain the original spatial properties so that he or she does not have to get re-oriented with the presentation, and/or that other users do not get confused with a changing presentation.

In some embodiments, the original spatial properties may include an angular orientation of the at least one virtual object relative to the input device. It may be desirable to keep the presented virtual content and the associated virtual objects at the same angular orientation at the second location as it was at the first location. For example, it may be disruptive if virtual content was presented at a completely different angle at the second location as it was at the first location and may confuse other users of wearable extended reality appliances who are viewing the content, for example, if the content was displayed upside down.

In some embodiments, the original spatial properties may include a side of the input device on which the at least one virtual object is located. It may be desirable to display the virtual content on the same side of the input device at the first location as the second location so that users do not have to reorient themselves when viewing presented content. If virtual content is displayed at a location behind the movable input device, it may be disruptive and confusing to other users of other wearable extended reality appliances viewing the content.

In some embodiments, the original spatial properties may include the size of the at least one virtual object relative to the input device. It may be desirable to keep presented virtual content and associated virtual objects at the same size at the second support surface location as they were at the first support surface location. For example, keeping the presented virtual content at the same size between locations ensures that all text and graphics, as part of the virtual content, are presented at the same size so that other viewers of the content are able to clearly view and understand the presented content.

Some disclosed embodiments may include determining that the input device is in a third location removed from the support surface. The third location determination may be accomplished in a manner similar the prior description of the first and second location. In one example, it may be determined that the third location is removed from the support surface by geometrically measuring the distance between the input device and the support surface. In some embodiments, the image sensor associated with the wearable extended reality appliance may determine that the input device has been removed from the support surface based on captured image data. In some embodiments, the motion sensor associated with the movable input device may determine that the input device has been removed from the support surface.

In some embodiments, modifying the presentation of the at least one virtual object in response to the determination that the input device is removed from the support surface may include continuing to present the at least one virtual object on the support surface. The processor associated with the wearable extended reality appliance may determine that the user has removed the input device from the support surface via captured image data, captured motion data, or both. When the user removes the input device from the support surface the virtual object being presented by the wearable extended reality appliance may not disappear. Instead, the virtual object may remain visible to the user of the wearable extended reality appliance. This may be useful in situations when the user wishes to move the input device but does not want to cause any disruptions when presenting a virtual object. For example, the user may be moving the input device to a different location so that the virtual object is more visible to other viewers. In this example, the user of the wearable extended reality appliance may desire to continue presenting the at least one virtual object without any disruptions. In some embodiments, after the input device is removed from the support surface, the spatial properties of the presented virtual object may remain identical to what they were before the input device was removed, or they may change.

In some embodiments, processor operations may further include determining a typical location of the input device on the support surface and presenting the at least one virtual object in proximity to the typical location when the input device is removed from the support surface. The typical location may be a location where the user prefers to place the movable input device and may be determined, for example, based on historical position and orientation data captured by the motion sensor. The typical location may also be determined based on the historical location of the movable input device as captured by the image sensor associated with the wearable extended reality appliance. The image sensor may, over time, capture image data representing a position and/or orientation of the input device. Based on that captured image data, the at least one processor may be able to predict typical locations on the support surface where the user of the wearable extended reality appliance prefers to present a virtual object. In some embodiments, the at least one processor may use a machine learning algorithm or similar algorithm to predict a typical location. The machine learning embodiments may receive training data including, for example, historical placement data and frequency with which the input device is placed at each location. The machine learning algorithm may be trained using the training data. The trained machine learning model may determine a typical location for placement of the input device. The typical location or data relating to it may be stored in a data structure and retrieved by the processor when needed. In some embodiments, the typical location may be manually configured by the user. For example, if a user typically uses the wearable extended reality appliance while at a desk or table in a conference room, that user may manually configure a particular part of that desk or table as the typical location to present virtual content.

In response to the determination that the input device is removed from the surface, some embodiments may include modifying the presentation of the at least one virtual object. In one example, modifying the presentation may include altering a location or orientation of a virtual object, for example in relation to the input device or to another object. In another example, modifying the presentation may include altering an opacity, a color scheme or a brightness of the presentation of the at least one virtual object. For example, the opacity may be reduced, the brightness may be increased, and/or any other parameter may be increased or decreased. In some examples, modifying the presentation may include altering a size of the at least one virtual object. In other examples, modifying the presentation may include modifying the appearance of the at least one virtual object in any possible way. The processor may determine that an input device has been removed from a supporting surface based on either captured image data and/or captured motion data. In response, the presented virtual object may be modified. Presentation of a virtual object may be modified in a myriad of ways by altering one or more parameters associated with the virtual object. Such parameters may include, for example, the color scheme, opacity, intensity, brightness, frame rate, display size, and/or virtual object type may be modified. Typically, a modification of one or more of these parameters may involve reducing or increasing that parameter, e.g., reducing or increasing brightness or display size. In another example, multiple virtual objects may be presented. Modifying the presentation of the virtual objects may involve removing one of the virtual objects, or, when the input device is removed from the support surface, undocking a first and second virtual object from one another. In some examples, image data captured using an image sensor included in the wearable extended reality appliance may be analyzed to select a modification to the presentation of the at least one virtual object. For example, the image data may be analyzed to determine ambient illumination conditions, and the modification may be selected based on the determined ambient illumination conditions. In another example, the image data may be analyzed to detect a presence of other people in the environment (for example using a person detection algorithm), in response to a determination that other people are present, a first modification may be selected (for example, reducing size and opacity), and in response to a determination the no other person is present, a second modification may be selected (for example, reducing opacity while increasing size).

Figure 56A:
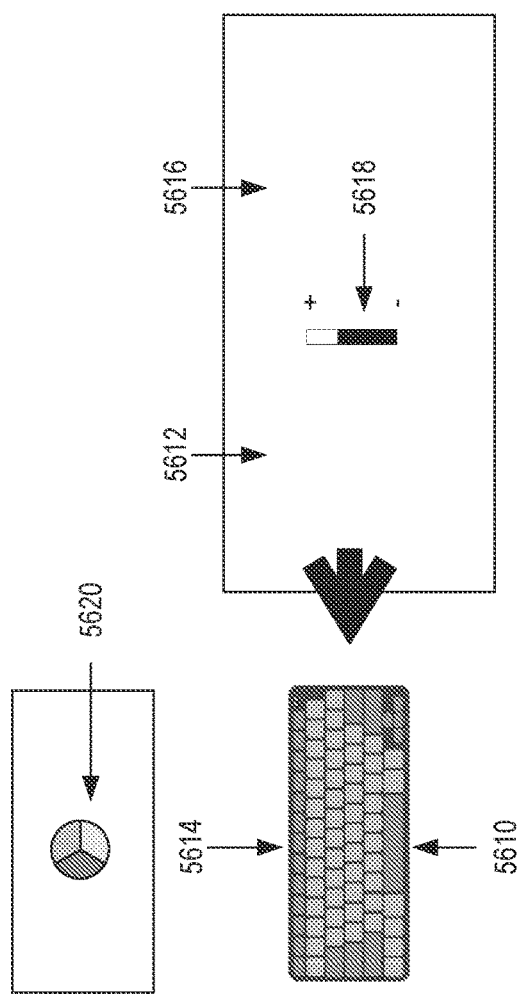
FIG. 56A is an exemplary illustration of a keyboard being moved from a location on a supporting surface to a location that is not on a supporting surface, wherein one or more presented virtual objects are modified, consistent with some disclosed embodiments.

By way of example, FIG. 56A illustrates moving the input device 5610 from a second location 5612 on the supporting surface to a third location 5614 removed from the supporting surface 5616. Removing the input device 5610 from the supporting surface may cause the at least one virtual object to be modified. Here, first virtual object 5618 and second virtual object 5620 were previously docked to the input device. However, when the input device is removed from support surface 5616, the second virtual object 5620 may be reduced in display size, and first virtual object 5618 may undock from the input device and stay on support surface 5616.

In some embodiments, modifying the presentation of the at least one virtual object in response to the determination that the input device is removed from the support surface may include causing the at least one virtual object to disappear. When a user of a wearable extended reality appliance wishes to move from place to place, it may be desirable for the virtual object to disappear when the input device is removed from the supporting surface, for example, when the virtual object may no longer be useful. In another example, the user may wish to continue presenting the at least one virtual object, but may need to move to another location far away from the first location to do so. Such a location may include a different conference room, a colleague's office, or a different room in one's home. Some embodiments may allow the at least one virtual object to disappear when the input device is removed from the supporting surface so that it may reappear when the input device is placed on a different supporting surface at a later time. Additionally, causing at least one virtual object to disappear may reduce battery consumption and heat generation in the wearable extended reality appliance because the user is no longer actively presenting during the time that the input device is being moved from one location to another.

In another embodiment, when the user removes the movable input device from the supporting surface, a first virtual object may become undocked from a second virtual object. When the objects become undocked from one another, the second virtual object may no longer automatically move from location to location with the first virtual object. One or both of the objects may disappear, depending on how the user of the wearable extended reality appliance configures the appliance. The user of the wearable extended reality appliance may also configure a virtual object to disappear based on virtual object type. For example, the task bar, navigation pane, or volume or brightness bar may automatically disappear when the appliance user removes the input device from the supporting surface.

Figure 56B:
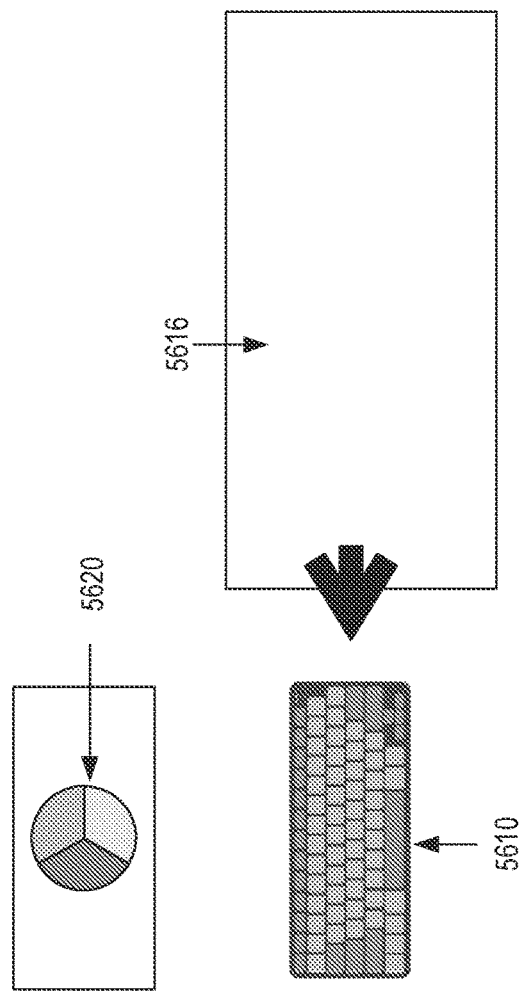
FIG. 56B is an exemplary illustration of a keyboard being moved from a location on a supporting surface to a location that is not on a supporting surface, wherein one or more presented virtual objects disappear, consistent with some disclosed embodiments.

By way of example, as illustrated in FIG. 56B, when movable input device 5610 is removed from the support surface 5616, first virtual object 5618 (shown in FIG. 56A) may disappear completely and second virtual object 5620 may be displayed unaltered. In other embodiments, second virtual object 5620 may disappear and first virtual object 5618 may stay visible, or in further embodiments, both first virtual object 5618 and second virtual object 5620 may disappear.

In some embodiments, processor operations may further include receiving input indicating a desire of a user of the wearable extended reality appliance to interact with the at least one virtual object while the input device is in the third location and causing the at least one virtual object to reappear. A user's desire to interact with the at least one virtual object in the third location may occur in a myriad of ways. For example, the user of the wearable extended reality appliance may issue a voice command to interact with the at least one virtual object. Such a voice command may include commands such as "present virtual object," "modify virtual object," "undock virtual objects," or any other command that suggests an interaction between the user of the wearable extended reality appliance and the and the virtual content. The voice command may be received by audio input 433 (see FIG. 4). The unique voice command may be configured by the user of the wearable extended reality appliance and may differ between different users. In another embodiment, the appliance user may move a virtual cursor in order to interact with the at least one virtual object. In this example, the at least one processor may recognize the virtual cursor movement as a desire to interact with the at least one virtual object. In lieu of a virtual cursor, a joystick input, touch pad input, gesture input, or game controller input may be used. In some embodiments, the user of the wearable extended reality appliance may click on an icon to present the at least one virtual object. The cursor, joystick, touch pad, or game controller may be configured as part of the input interface 430 (see FIG. 4). In another embodiment, the desire to interact with the at least one virtual object may be determined through captured image data via the image sensor. This captured image data may involve hand movements or gestures, head nods or gestures, or any other body movement that may signal a desire to interact with the at least one virtual object, and may be configured by the user of the wearable extended reality appliance. The data may be gesture input 431 (see FIG. 4). In this example, an appliance user may wave his or her hand to signal an intent to interact with the at least one virtual object. In response, the virtual object may reappear on the virtual screen in proximity to the user of the wearable extended reality appliance. In another embodiment, the desire to interact with the at least one virtual object may be based on data other than captured image, voice, or cursor data. For example, the wearable extended reality appliance may determine that a user may desire to interact with the at least one virtual object based on calendar data. Calendar data may refer to any data that is relevant to a user's tasks for the day. For example, a user may have multiple meetings scheduled for the day. The user of the wearable extended reality appliance may need to present at least one virtual object at each of these meetings. The wearable extended reality appliance may be able to determine based on the user's schedule that the user may desire to interact with a virtual object. In this example, calendar data may indicate that the user of the wearable extended reality appliance has a meeting on a Wednesday (or other workday), and that he or she needs to present a pie chart or other graphical content during the meeting. The wearable extended reality appliance, based on that data, may automatically present that content, and the user does not need to manifest an additional intent to interact with the virtual object. In another example, the wearable extended reality appliance may determine that the user wishes to interact with the at least one virtual object based on stored usage data. Stored usage data may refer to data that shows one or more times at which the user has presented at least one virtual object. The stored data may also include the day of the week that the user presented the at least one virtual object. Based on the stored usage data, the wearable extended reality appliance may be able to predict when the user wishes to interact with the at least one virtual object. The processor associated with the wearable extended reality appliance may predict user interactions based on a machine learning model or similar algorithm. In this embodiment, training data, including, for example, calendar data and information about one or more virtual objects in association with the calendar data may be used to train a machine learning model. The trained machine learning model may determine a user's intent to interact with a virtual object based on a time of day or other calendar information.

In some embodiments, modifying the presentation of the at least one virtual object in response to the determination that the input device is removed from the support surface may include changing at least one visual property of the at least one virtual object. A visual property may include any characteristic impacting perception.

In some embodiments, the at least one visual property may include at least one of a color scheme, an opacity level, an intensity level, a brightness level, a frame rate (when video content is presented), a display size, an orientation, and/or virtual object type. Any one of these or other visual properties may be increased, reduced or otherwise altered. For example, a display size or brightness level may be increased or reduced in response to the determination that the input device has been removed from the support surface. By way of example, FIG. 56A shows a second virtual object 5620 reduced in display size after the input device 5610 has been removed from support surface 5616.

The user of the wearable extended reality appliance may configure which visual property to modify based on the virtual object that is presented. In this embodiment, whenever a particular virtual object type (e.g., document, video, or graph) is presented, it may be assigned to a default visual property to be modified. For example, if a user is presenting a chart or a graph, the user may decide to reduce the brightness in lieu of the orientation, such that a viewer may still understand the main point of the chart of graph. In another example, if a user of a wearable extended reality appliance is presenting a photograph or drawing, the user may decide to reduce display size instead depending on the user's preference. In another embodiment, visual property to be modified may be based off the previous modification the user made. For example, a user may present a chart or a graph, and modify the brightness settings of those presented virtual objects. The visual data (e.g., a brightness or other visual setting) may be stored in a memory associated with the wearable extended reality appliance, input device, or a remote server. When the user decides to present similar content at a later time, the at least one processor may adjust brightness before other visual properties based on the visual data stored in the memory. In yet another embodiment, the at least one processor may predict which visual property to modify based on stored data, a machine learning model, or another similar algorithm.

In some embodiments, modifying the presentation of the at least one virtual object in response to the determination that the input device is removed from the support surface may include presenting a minimized version of the at least one virtual object. A minimized version may be a representation that is altered in at least one dimension. Virtual objects may be minimized when either the image sensor associated with the wearable extended reality appliance, or the motion sensor associated with the movable input device detects that the input device is removed from the support surface. Minimized objects may refer to the virtual objects in icon form. For example, a user may be presenting a text document in a text editor or a presentation in a presentation viewing application. When these documents are minimized, a viewing user will only see the icon representing these programs displayed. Such virtual objects may be minimized because the wearable appliance user is likely no longer actively presenting, so the virtual objects may be minimized in order reduce battery consumption and to reduce heat generation in the wearable extended reality appliance. Virtual objects may also be minimized when a user is not actively presenting to others, but is using a program via a virtual screen. In one example, a user may privately be using a messaging application to message colleagues. While not actively presenting content to others, the user may be still using the movable input device to interact with the virtual screen, and thus when the movable input device is removed, the messaging application will be minimized such that the user only sees the icon. In one example, the at least one virtual object may be an application, such as a chatting app or a messaging app. When the input device is placed on the supporting surface, the app may be opened, and the user may see recent chats and messages. However, when the keyboard is removed from the supporting surface, the application may be automatically minimized to an icon. The user may still be able to receive messages and notifications, but the complete messages may not be shown unless the input device is placed on a supporting surface. In another example, the virtual object may be a displayed video. When the input device is removed from the supporting surface, the video may be minimized and may automatically pause the video content. When the input device, after being removed from the supporting surface, is placed back on the supporting surface, the video content may resume playing at the original display settings.

In some embodiments, processor operations may further include receiving input reflective of a selection of the minimized version of the at least one virtual object and causing the at least one virtual object to be presented in an expanded view. An expanded view may include any presentation where at least one dimension is increased. In some embodiments, the presented virtual object may be minimized after the input device is removed from the supporting surface. The user of the wearable extended reality appliance may select the minimized virtual object and present it in an expanded view. Additionally, input reflective of a selection of the minimized version of the at least one virtual object may arise in a myriad of ways. For example, the user may type a command into input unit 202 (see FIG. 3), instructing the processor to expand the minimized application. In another example, the input may be pointer input 331 (see FIG. 3) selecting the minimized application and clicking on the application icon to expand it. In a further example, input may be a voice command included in audio input 433 (see FIG. 4) instructing the processor to expand the minimized icon. Such voice commands may be configured by the user of the wearable extended reality appliance. In yet another example, the input may be in the form of captured image data via as gesture input 431 (see FIG. 4). In this example, the input may be in the form of a hand wave or gesture, a head nod, or any other bodily movement that the wearable extended reality appliance may interpret as a command to expand the minimized application.

Figure 57:
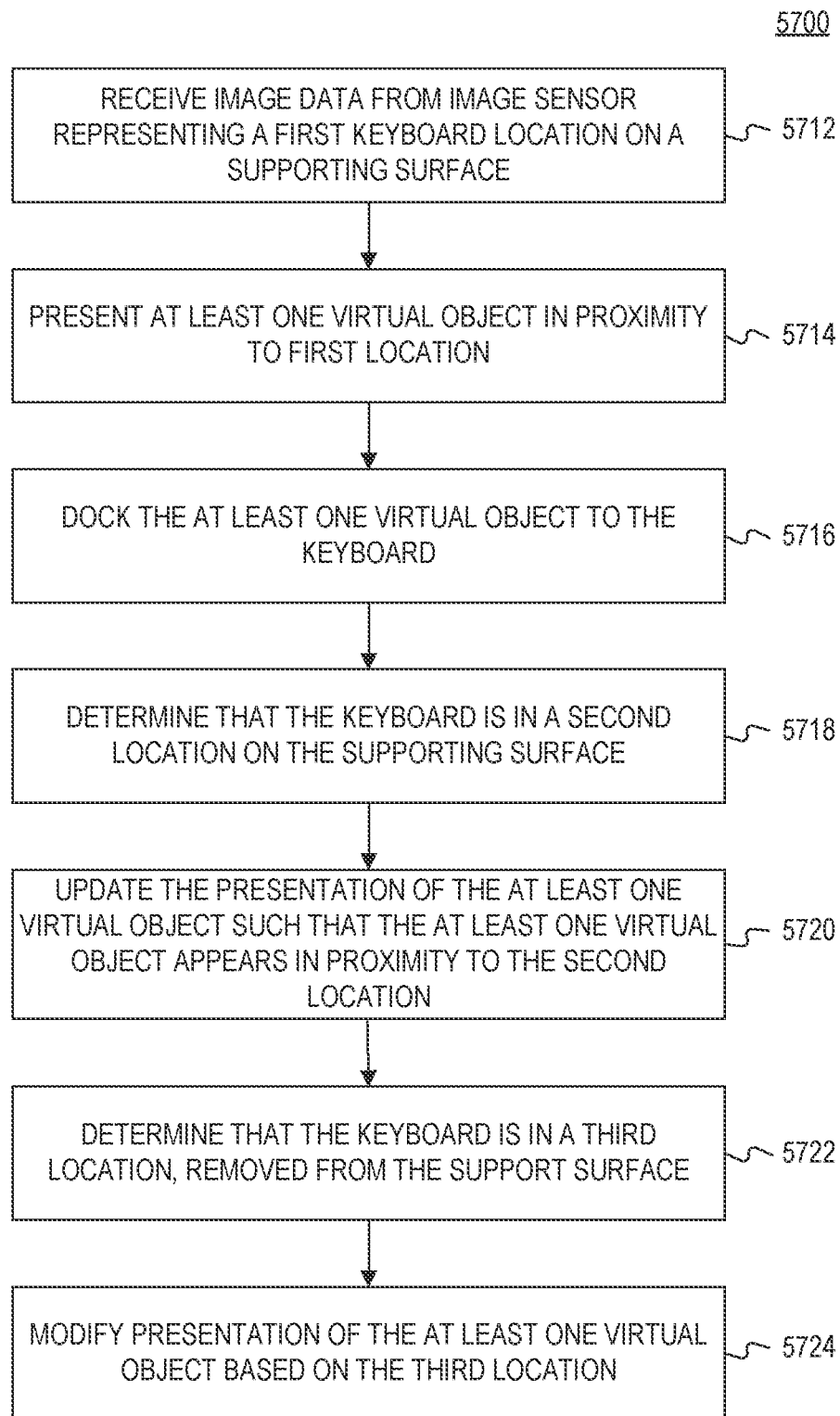
FIG. 57 is a flow chart illustrating an exemplary method for evolving docking based on detected keyboard positions, consistent with some disclosed embodiments.

FIG. 57 is a flow chart illustrating an exemplary method 5700 for modifying display of virtual objects docked to a movable input device, based on the movable input device's location. Method 5700 may be performed by one or more processing devices (e.g., 360, 460, or 560) associated with input unit 202 (see FIG. 3), XR unit 204 (see FIG. 4), and/or input interface 330, 430 (see FIGS. 3 and 4). The steps of the disclosed method 5700 may be modified in any manner, including by reordering steps and/or inserting or deleting steps. Method 5700 may include a step 5712 of receiving image data from the image sensor 472 (see FIG. 4) associated with XR unit 204, the image data representing an input device placed at a first location on a supporting surface. Method 5700 may also include a step 5714 of causing the wearable extended reality appliance to generate a presentation of at least one virtual object in proximity to the first location. The at least one processor 460, as illustrated in step 5716, may dock the at least one virtual object to the input device, e.g., keyboard 104 (see FIG. 1). Method 700 may include a step 5718 that involves the at least one processor associated with XR unit 204 (see FIG. 4) determining that the input device (e.g., keyboard 104) is in a second location on the supporting surface. The processor 460 (see FIG. 4) may perform a step 5720 that, in response to a determination that the input device is in a second location, involves updating the presentation of the at least one virtual object such that the at least one virtual object appears in proximity to the second location. Method 5700 may include a step 5722 wherein the processor associated with the wearable extended realty appliance 204 (see FIG. 4) determines that the input device is in a third location removed from the support surface. Method 5700 may include a step 5724 involving, in response to the determination that the input device is removed from the support surface, modifying the presentation of the at least one virtual object based on the third keyboard location.

Some disclosed embodiments may include systems, methods and/or non-transitory computer readable media containing instructions that when executed by at least one processor may cause the at least one processor to perform operations for docking virtual objects to virtual display screens in an extended reality environment. A virtual object may be any non-physical item that appears in the extended reality environment. The virtual object may include a visual presentation rendered by a computer in a confined region and configured to represent an object of a particular type (such as an inanimate virtual object, an animate virtual object, virtual furniture, a virtual decorative object, virtual widget, or other virtual representation). For example, the virtual object may include a widget, documents, presentations, media items, photos, videos, virtual characters, and other objects. The virtual object may appear when a user is wearing a wearable extended reality appliance. An example of a virtual display screen (also referred to as a "virtual display" or a "virtual screen" herein) may include virtual display screen 112 described above, and may include a virtual object mimicking and/or extending the functionality of a physical display screen, as described above. An extended reality environment may be an environment that is accessed by means of a computer. For example, the extended reality environment may be accessed when the user is wearing the wearable extended reality appliance. Docking virtual objects may include connecting, tethering, linking or otherwise joining at least two objects. A docked virtual object's position and/or orientation may be connected to the position and/or orientation of another object's position and/or orientation. For example, docked virtual objects may move together with the objects they are docked to. As another example, a virtual object may be docked to a virtual display screen and moving the virtual display screen may cause the docked virtual object to move.

In some embodiments, the at least one virtual object may include a dedicated widget virtually representing a phone of a user of the wearable extended reality appliance. A widget may be a module, application, or interface that allows a user to access information or perform a function, and appearing in a defined area of an extended reality environment. A dedicated widget may be a module, application, or interface (or an icon or other representation linked to the module, application or interface) that provides specific information or performs a specific functions. For example, a dedicated widget may be a phone application that allows a user to perform the functions of a phone. A user may be able to dial a phone number or create a text message using the dedicated widget. In one example, the widget may present a replica of the phone display screen in the extended reality environment.

Figure 58:
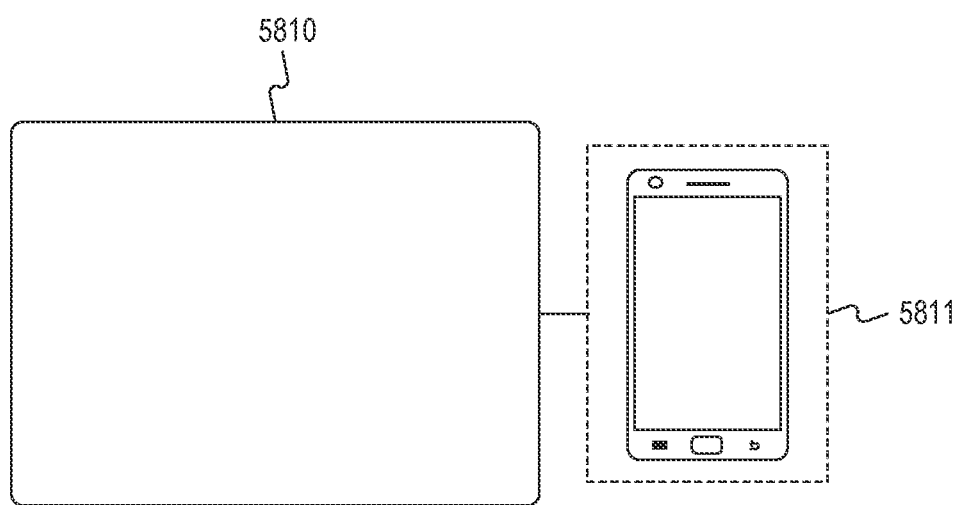
FIG. 58 illustrates an example of a virtual display and a docked virtual object representing a phone of a user, consistent with some embodiments of the present disclosure.

By way of example, FIG. 58 illustrates an example of a virtual display and a docked virtual object representing a phone of a user, consistent with some embodiments of the present disclosure. As illustrated in FIG. 58, virtual object 5811 may be docked to virtual display 5810. Virtual object 5811 may represent a phone of a user. For example, virtual object 5811 may be or include a virtual widget configured to virtually represent a phone of a user of the wearable extended reality appliance.

Some disclosed embodiments may include generating virtual content for presentation via a wearable extended reality appliance, where the virtual content includes a virtual display and a plurality of virtual objects located outside the virtual display. A wearable extended reality appliance may present virtual content to a user as discussed elsewhere in this disclosure. The virtual content may include a virtual display and one or more virtual objects that may or may not be in proximity to the virtual display. For example, the virtual objects may be outside the virtual display when the virtual objects are not in the same space as the virtual display. When the virtual objects are located outside the virtual display, the virtual objects may not move with the virtual display. For example, when a user is wearing the wearable extended reality appliance and the virtual content is presented to the user, the user may move the location of the virtual display. When the user moves the location of the virtual display, the location of the virtual objects may not change because the virtual objects are located outside the virtual display.

Figure 59A:
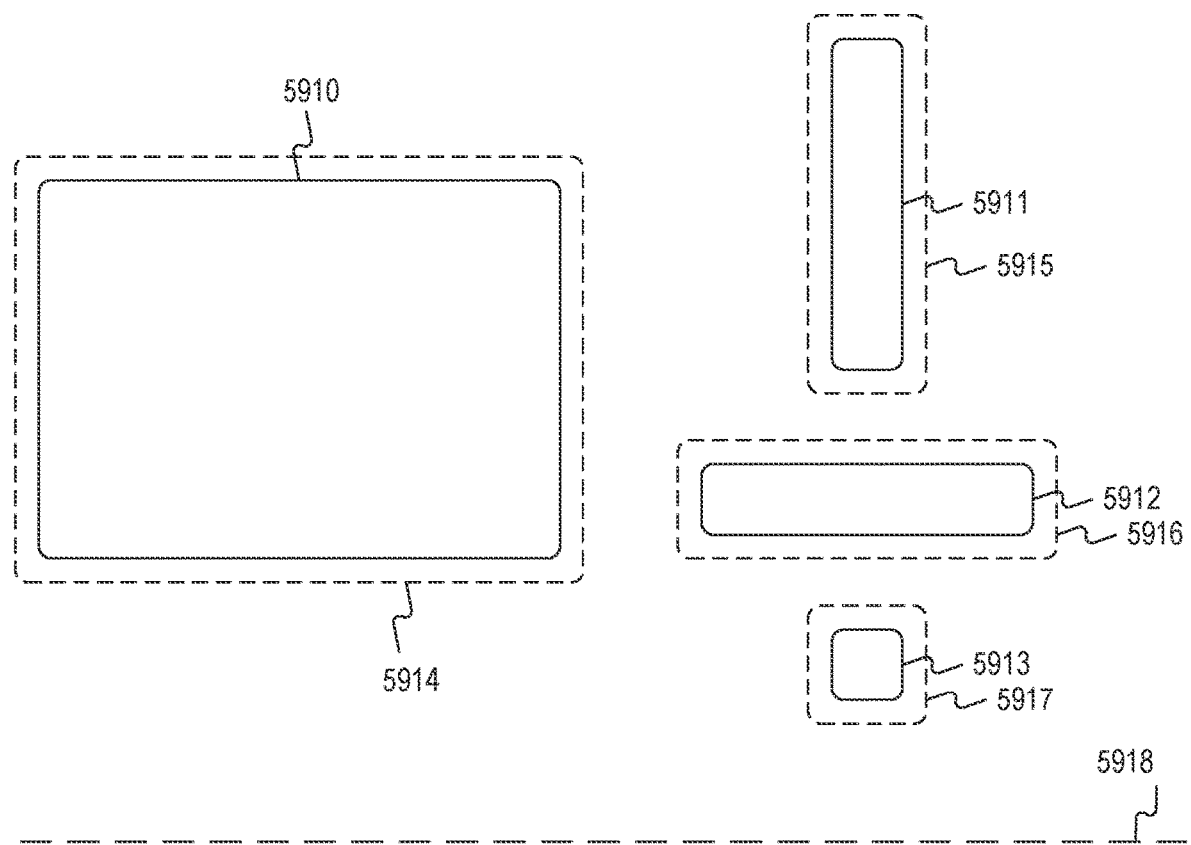
FIGS. 59A and 59B illustrate examples of a virtual display and a plurality of virtual objects located outside the virtual display before and after the virtual display changes locations, consistent with some embodiments of the present disclosure.
Figure 59B:
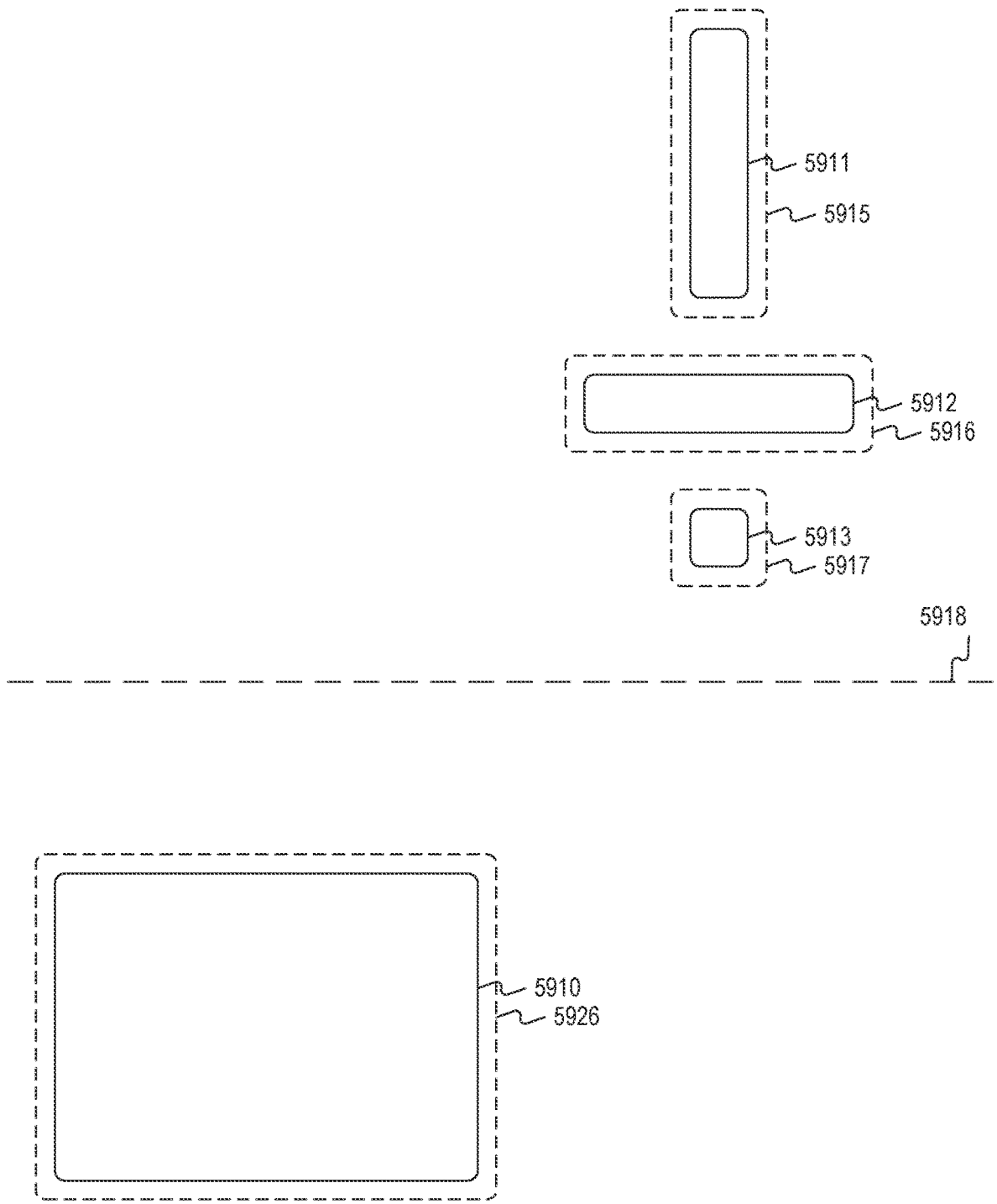

By way of example, FIGS. 59A and 59B illustrate a virtual display and a plurality of virtual objects located outside the virtual display before and after the virtual display changes locations, consistent with some embodiments of the present disclosure. As illustrated in FIG. 59A, virtual objects 5911, 5912, and 5913 may be located at locations 5915, 5916, and 5917 respectively. Virtual display 5910 may be located at location 5914. Virtual objects 5911 and 5912 and virtual display 5910 may be located above dashed line 5918. Virtual display 5910 may not be docked to virtual objects 5911, 5912, and 5913. As illustrated in FIG. 59B, virtual display 5910 may move to a new location 5926 below dashed line 5918. Virtual objects 5911, 5912, and 5913 may not move with virtual display 5910. Virtual objects 5911, 5912, and 5913 may stay in their original locations 5915, 5916, and 5917, respectively, above dashed line 5918.

Some disclosed embodiments may include receiving a selection of at least one virtual object from the plurality of virtual objects. Receiving a selection of a virtual object may include determining, setting, fixing, or picking a virtual object. A user may pick at least one virtual object from a plurality of virtual objects. The user may pick a virtual object by clicking a mouse, pressing a button, tapping a touch surface, dragging an object, highlighting an object, through hand gesture, through voice commands, or by any other means. For example, a user may pick a virtual object that represents a document from the plurality of virtual objects. As another example, a user may pick a virtual object that represents an audio file from the plurality of virtual objects. Upon picking by the user, the act of picking may cause information to be transmitted to at least one processor, and the at least one processor may there receive the selection. In other examples, receiving the selection may comprise reading the selection from memory, receiving the selection from an external device, receiving the selection from an analysis of data (such as an input data, image data, audio data, and so forth), determining the selection based on one or more rules, and so forth.

In some embodiments, the at least one virtual object selected from the plurality of virtual objects may include a first virtual object displayed on a first surface and a second virtual object displayed on a second surface that at least partially coincides with the first surface. In one example, the first and/or the second surfaces may include one or more exterior surfaces of any physical object such as a table, a desk, a cupboard, an end table, an arm of a chair, or any other object present in the user's physical environment. In one example, the first and/or the second surfaces may be virtual surfaces. In another example, one of the first and/or the second surfaces may be a virtual surface, and the other may be a physical surface. The first virtual object and the second virtual object may be projected onto different surfaces. For example, the first surface may be a physical surface that a keyboard is placed on and the second surface may be a virtual surface. The two surfaces may intersect in a straight or a curved line.

In some embodiments, the first surface may be substantially perpendicular to a ground surface and the second surface may be substantially parallel to the ground surface. In one example, a ground surface may be any horizontal surface, relative to a gravity direction, at or near ground level. For example, a ground surface may be a surface that includes a floor. The first and second surface may be arranged relative to the ground surface. For example in some embodiments, the first surface may be oriented perpendicular to the ground surface, whereas the second surface may be oriented parallel to the ground surface. In some embodiments, the first and second surface may each be inclined at a different angle relative to the ground surface.

Some disclosed embodiments may include changing plane cursor movement between the first and second surfaces. A cursor (also referred to as a 'virtual cursor' herein) may include an indicator that appears in the extended reality display to display a selected position on the extended reality environment, as described above. The cursor may identify a point on the extended reality environment that may be affected by a user input. Plane cursor movement may refer to a movement of the within a two-dimensional plane in response to the user input. The cursor may move between a first and second surface. For example, the first surface may be a top surface of a table and the second surface may be a virtual surface.

Some disclosed embodiments may include docking the at least one virtual object to the virtual display. At least one virtual object out of the one or more virtual objects located outside the virtual display may be docked to the virtual display in the manner described earlier. Docking of the one or more virtual objects to the virtual display may allow the one or more objects and the display to move together. For example, when a user moves the virtual display in the extended reality environment, the docked one or more virtual objects may move with the virtual display. In some examples, docking a virtual object to the virtual display may include adding the virtual object to a data-structure of virtual objects docked to the virtual display (such as a list, a set, a database, and so forth). When the virtual display moves, the data-structure may be accessed to determine which virtual objects needs to be moved with the virtual display. In one example, undocking the virtual object from the virtual display may include removing the virtual object from the data-structure. In some examples, docking a first virtual object to a second virtual object may include adding the first virtual object to a data-structure of virtual objects docked to the second virtual object (such as a list, a set, a database, and so forth). When the second virtual object moves, the data-structure may be accessed to determine which virtual objects needs to be moved with the second virtual object. In one example, undocking a first virtual object from a second virtual object may include removing the first virtual object from the data-structure.

Figure 60A:
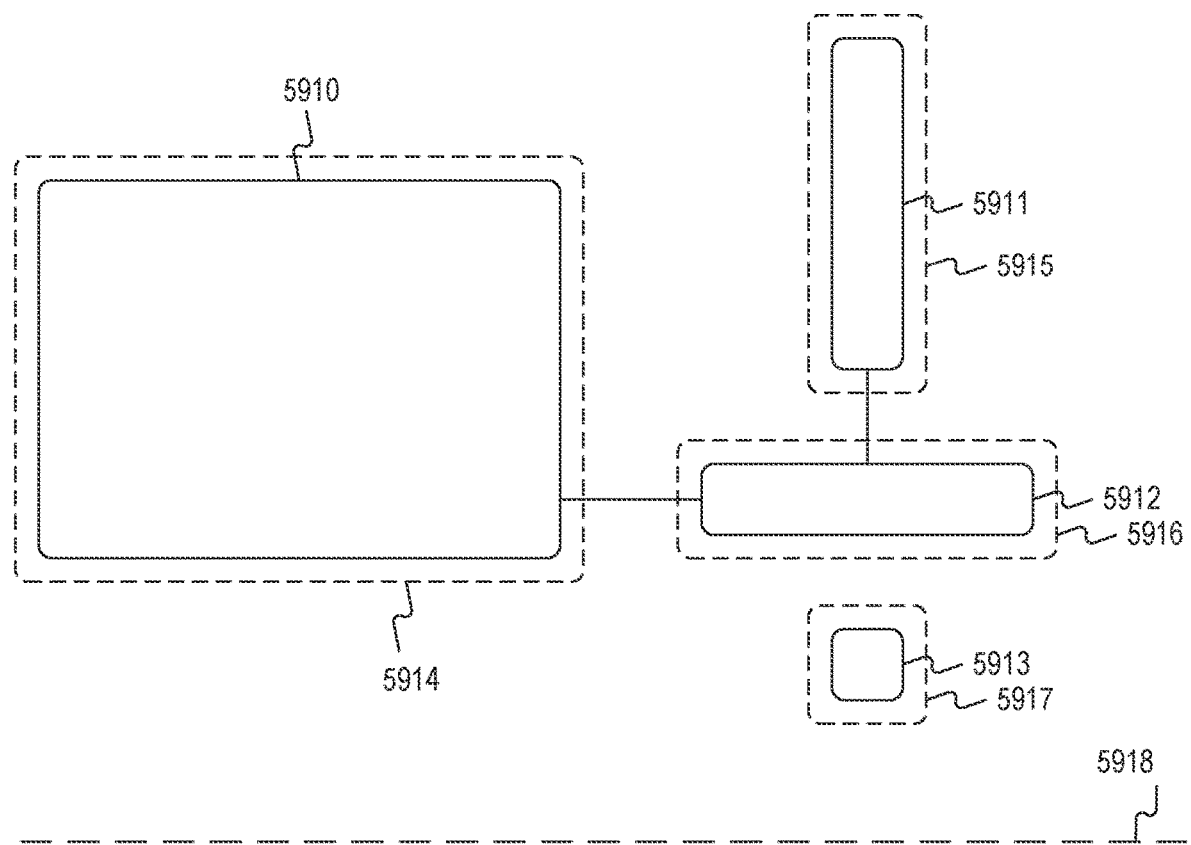
FIGS. 60A and 60B, illustrate examples of a virtual display and a plurality of virtual objects docked to the virtual display and to other virtual objects before and after the virtual display changes locations, consistent with some embodiments of the present disclosure.
Figure 60B:
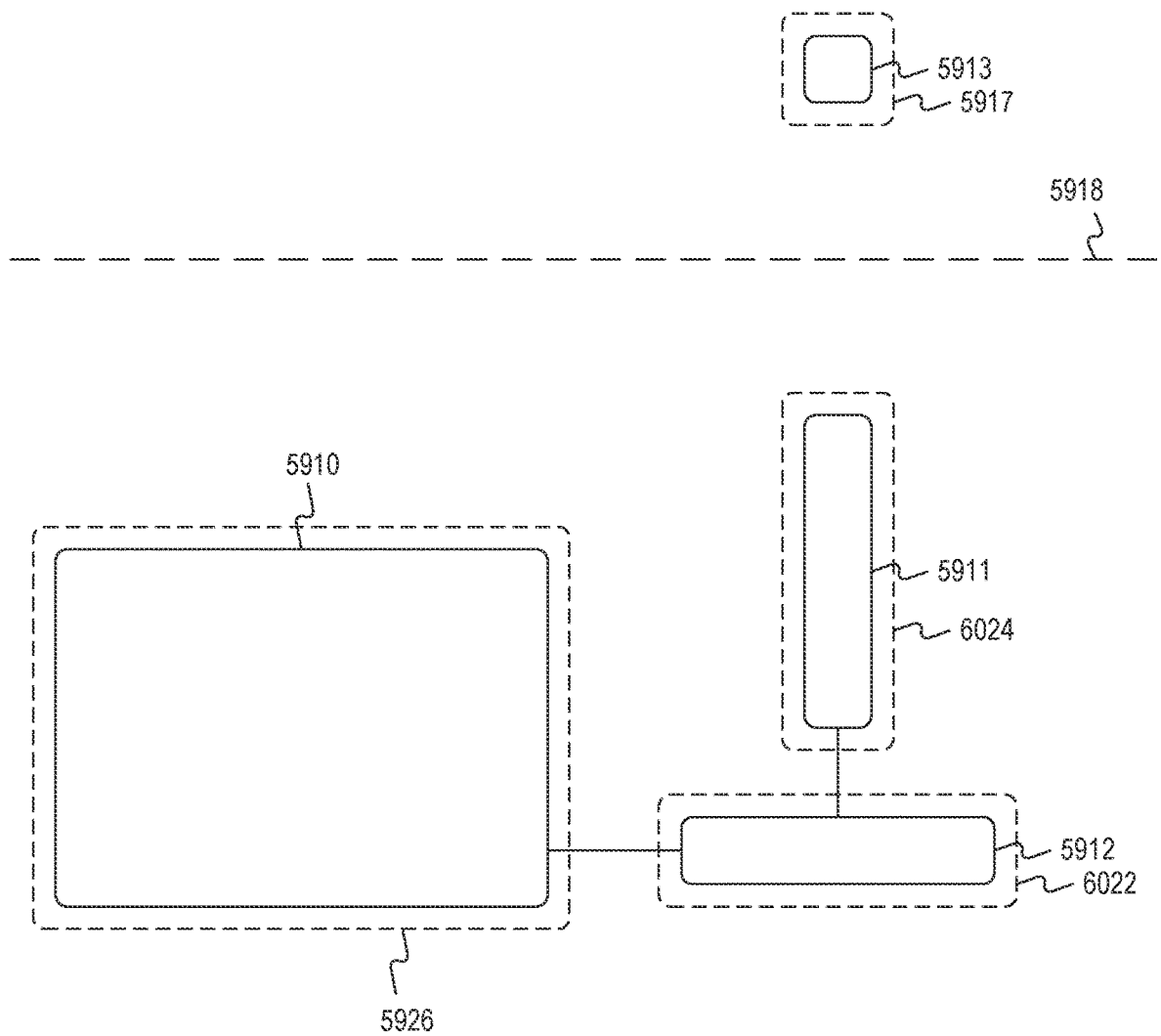

By way of example, FIGS. 60A and 60B illustrate an example of a virtual display and a plurality of virtual objects docked to the virtual display. As illustrated in FIG. 60A, virtual display 5910 may be located at location 5914. Virtual objects 5911 and 5912 may be located at locations 5915 and 5916, respectively. Virtual object 5913 may be located at location 5917. Virtual objects 5911, 5912, and 5913 and virtual display 5910 may be located above dashed line 5918. Virtual display 5910 may be docked to virtual object 5912, and virtual object 5912 may be docked to virtual object 5911, as illustrated in FIG. 60A with a solid line connecting virtual display 5910 and virtual object 5912 and a solid line connecting virtual objects 5912 and 5911. It is understood that these solid lines may not actually exist, but are only used to illustrate the docking. Such solid lines, or other visual indications of docking, may or may not be presented in the extended reality environment. Virtual object 5913 may not be docked to any other object or to virtual display 5910. As illustrated in FIG. 60B, the location of virtual display 5910 may move to a new location 5926, below dashed line 5918. Virtual objects 5911 and 5912 that are docked with virtual display 5910 (directly, as in the case of virtual object 5912, or indirectly, as in the case of virtual object 5911 that is docked to virtual object 5912 and therefore is indirectly docked to the virtual display) may also move to new locations 6024 and 6022, respectively, below dashed line 5918. Virtual object 5913 that is not docked with virtual display 5910 (directly or indirectly), however, may remain in same location 5917, above dashed line 5918.

In some embodiments, a duration of association between the at least one virtual object and the virtual display may be time-dependent. The duration of association between the at least one virtual object and the virtual display may represent a period of time for which the at least one virtual object may remain docked to the virtual display. The period of time may be one or more seconds, minutes, hours, or any other length of time. For example, the at least one virtual object and the virtual display may only be connected for thirty seconds. During the thirty seconds, the virtual object and the virtual display may move together. After expiry of the thirty seconds, the virtual object may not move when the virtual display moves, and the virtual display may not move when the virtual object moves. As another example, the at least one virtual object and the virtual display may only be connected for five minutes. During the five minutes, the virtual object and the virtual display may move together. After expiry of the five minutes, the virtual object may not move when the virtual display moves, and the virtual display may not move when the virtual object moves Some disclosed embodiments may include moving the at least one virtual object with the virtual display during a first time period, in response to a change in the location of the virtual display during the first time period and dissociating the at least one virtual object from the virtual display during a second time period different from the first time period, in response to a second change in the location of the virtual display during the second time period. The at least one virtual object and the virtual display may be docked together for a certain time period. During the first time period, the at least one virtual object and the virtual display may move together. When the first time period is over and the second time period begins, the at least one virtual object and the virtual display may not be docked together. During the second time period, the at least one virtual object may not move with the virtual display. For example, during the second time period, a user may provide an input to move the virtual display. The virtual display may move based on the input and not move the at least one virtual object. The at least one virtual object may remain in the same location.

In some embodiments, docking the at least one virtual object to the virtual display may open a communications link between the at least one virtual object (or a module controlling the at least one virtual object, such as a software program, a computing device, a smartphone, a cloud platform, etc.) and the virtual display (or a module controlling the virtual display, such as an operating system, a computing device, a cloud platform, etc.) for exchanging data, and wherein the operations may further include retrieving data from the at least one virtual object (or the associated module) via the communications link and displaying the retrieved data on the virtual display. Docking may include creating a communications link between at least two objects (or between the associated modules). A communications link may be a connection between two or more object (or between the associated modules) that may allow a transfer of information, data, or commands from one object to another. The virtual object and virtual display may transfer data between each other via the communications link. The data associated with the virtual object may be transferred to the virtual display and displayed to a user. The data may be audio, visual, text, or other types of data. For example, the virtual object may contain audio files. The audio files may be transferred to the virtual display through the communication link. The audio files may be used to play audio in association with the virtual display. As another example, the virtual object may contain document files. The document files may be transferred to the virtual display through the communication link. The document files may be displayed on the virtual display so a user can read, edit, or change other functions of the document files. As another example, the virtual object may contain image files that may be transferred to the virtual display through the communications link and displayed on the virtual display.

Some disclosed embodiments may include receiving an input indicative of an intent to change a location of the virtual display without an expression of an intent to move the at least one virtual object, after docking the at least one virtual object to the virtual display. A user may decide to move the virtual display without exhibiting an intent to move the virtual object. An intent of a user of the first wearable extended reality appliance to move the virtual display may be determined based on an input by the user. Such an input may include interaction with one or more objects via a touch-screen interface, a mouse, a gesture, a voice command, or any other type of interactive element. For example, the intent to move the virtual object may be determined when the user provides an input to change a location of the virtual display. The location may be determined relative to a set of coordinate axes, for example, by using three coordinate values with reference to a set of Cartesian or polar coordinate axes. As another example, the intent to move the virtual object may be determined when the user provides an input to change a location of the virtual display via a keyboard. The user may push the arrow keys on the keyboard to indicate an intent to move the virtual display to the left, right, up and/or down. As another example, the user may drag the virtual display (for example, with a hand gesture, with a virtual cursor, etc.) to any direction (such as left, right, up and/or down) to indicate an intent to move the virtual display. As another example, the user may use a touchpad and move the user's fingers to the left, right, up and/or down on the touchpad to indicate an intent to move the virtual display. The user may select the virtual display when using the input devices (for example with a virtual cursor, with a hand gesture, with a voice command, etc.), without selecting one or more of the virtual objects. The lack of selection of the one or more virtual objects when using the input devices may indicate a lack of an expression of an intent to move the virtual object. As an even further example, a rule may define an intent of the user. For example, if the virtual object is docked to a physical device (such as a physical input device), an intent may have already been conveyed via the docking and a movement of the physical device. Alternatively, if no docking occurred, the intent may be conveyed through the absence of that docking. Intent may also be inferred by the system. For example, if, without a predetermined time prior to movement, a user was working with a particular object, the system might infer the user's desire to move the object when the display moves. This functionality can be implemented through rules executed by the at least one processor.

Some disclosed embodiments may include changing the location of the virtual display in response to the input. A virtual display may move through a virtual space to change positions or locations. A change in location may occur when a virtual display may be moved from its original position or location. As stated above, the input may indicate an intent to move the virtual display from the display's current position. The user may indicate the intent to change location through an input device. The virtual display may be moved by any amount of distance in any direction based on the received input. For example, the virtual display may be moved left, right, up and/or down. As one example, the user may push the left arrow button on a keyboard. In response, the virtual display may be moved to the left of the virtual display's original position. As another example, the user may move a mouse to the right. In response, the virtual display may be moved to the right of the virtual display's original position. As another example, the user may use a touchpad and move the user's fingers up along the touchpad. In response, the virtual display may be moved up relative to the virtual display's original position.

Some disclosed embodiments may include docking the virtual display to a physical object. A virtual object may be docked to a physical object in the same manner as described above for docking a virtual object to another virtual object. A physical object may include a keyboard, mouse, pen, input device, computing device, or any other object in the user's physical environment. By way of example, a virtual object may be docked to a physical keyboard and moving the physical keyboard may cause the docked virtual object to move. In some embodiments, a virtual display may be docked to a physical object. When the virtual display has been docked to a physical object, movement of the physical object may cause a movement of the virtual display together with one or more virtual objects.

After docking the virtual display to the physical object, some embodiments may further include analyzing image data captured by the wearable extended reality appliance to determine a movement of the physical object. The wearable extended reality device may include an image sensor to capture image data. The image data may be processed to detect a movement of the physical object, for example using a visual object tracking algorithm.

Some disclosed embodiments may include changing the locations of the virtual display and the at least one virtual object in response to the determined movement of the physical object. In response to a determination that the physical object has moved, a location of the virtual display and one or more virtual objects may be altered. For example, analysis of the image data captured by the wearable extended reality appliance, for example using a visual object tracking algorithm, may indicate that the physical object has moved in a leftward direction. In response, the virtual display and one or more virtual objects may also move in the leftward direction. As another example, analysis of the image data captured by the wearable extended reality appliance may indicate that the physical object has move in a rightward direction. In response, the virtual display and the one or more virtual objects may also move in a rightward direction.

Figure 61A:
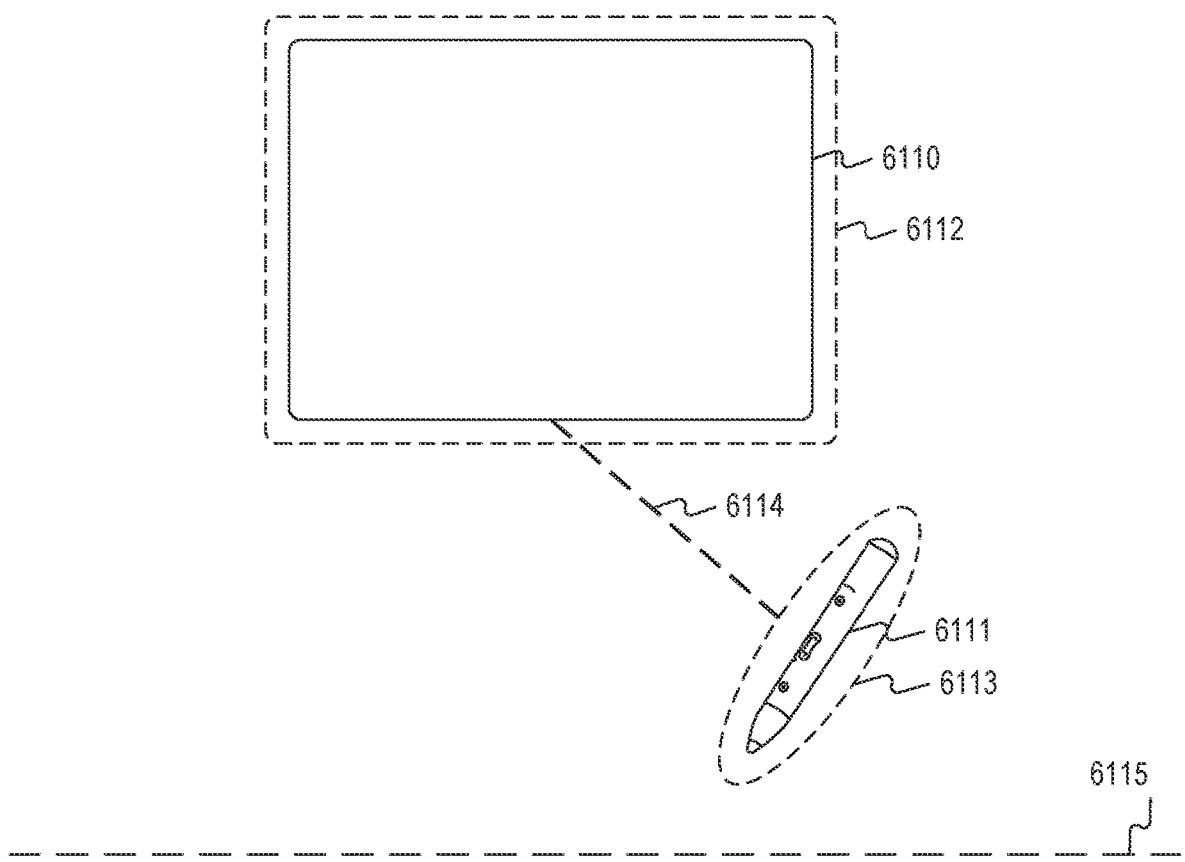
FIGS. 61A and 61B, illustrate examples of a virtual display and a physical object, consistent with some embodiments of the present disclosure.
Figure 61B:
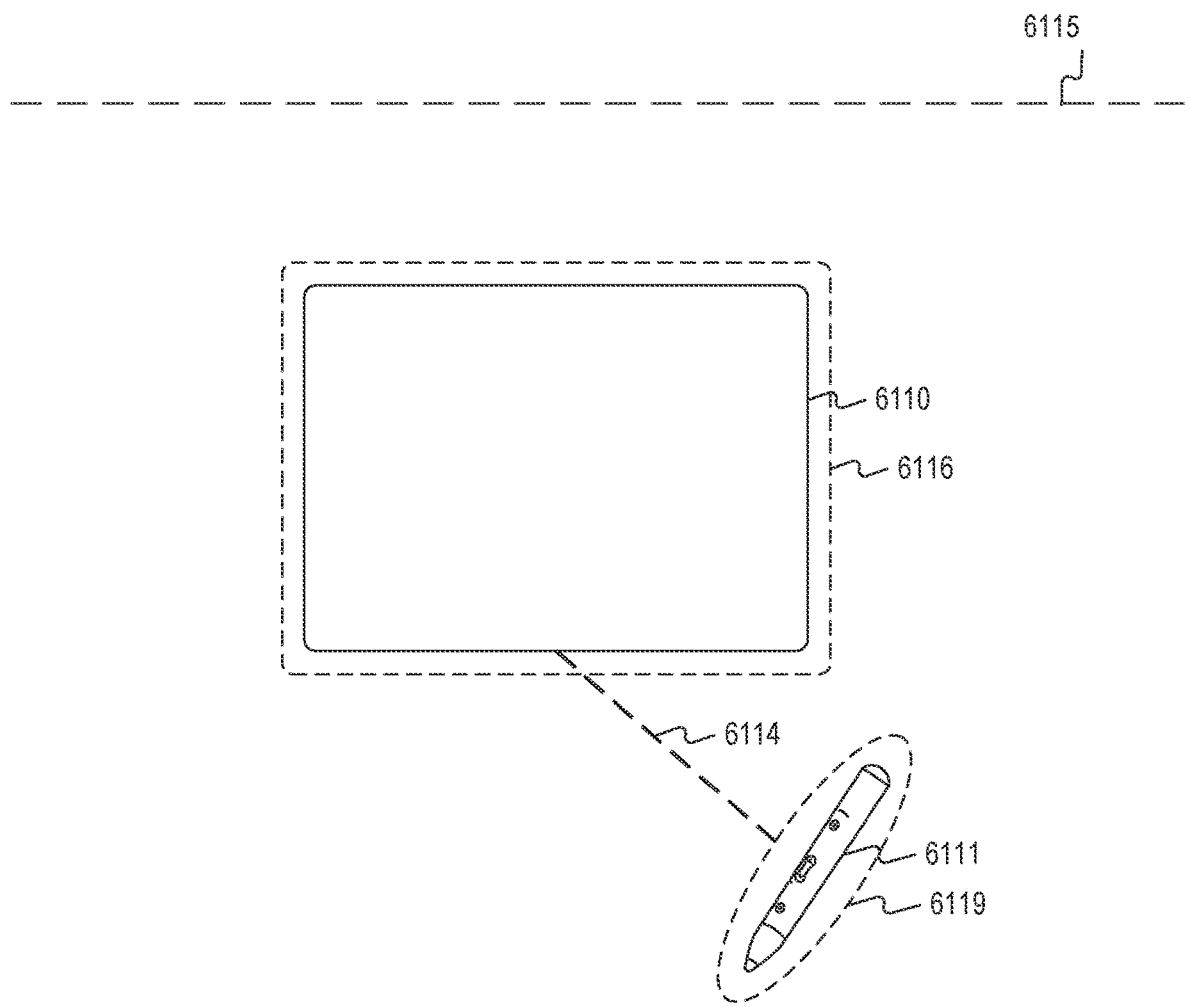

By way of example, FIGS. 61A and 61B illustrate an example of a virtual display docked to a physical object and movements of the virtual display in response to movements of the physical object, consistent with some embodiments of the present disclosure. As illustrated in FIG. 61A, virtual display 6110 may be located at location 6112. Physical object 6111 may be located at location 6113. Physical object 6111 and virtual display 6110 may be located above dashed line 6115. Virtual display 6110 may be docked to physical object 6111 through docking connection 6114. As illustrated in FIG. 61B, physical object 6111 may be moved to new location 6119 below dashed line 6115, for example by a user. Virtual display 6110 may also be moved to new location 6116, below dashed line 6115, for example automatically based on docking connection 6114.

Some disclosed embodiments may include avoiding changing the locations of the virtual display and the at least one virtual object when the determined movement of the physical object is smaller than a selected threshold. A movement of a physical object by a user may not be sufficient to indicate an intent to change a location of the physical object and/or the virtual display. For example, in some embodiments, whether or not to move the virtual display and one or more objects may be determined based on a distance by which the user moves a physical object docked to the virtual display. A threshold distance may be selected to determine when the user's intent is not to change the location of the physical object. By way of example, the threshold distance may be a one or more millimeter, one or more centimeters, one or more inches, or any other desired distance. In one example, a threshold distance may be set to 1 centimeter. In this example, when a user moves a physical object by 0.5 centimeters, a virtual display and/or at least one virtual object docked to the physical object may not change locations because the movement of the physical object is less than the threshold. As another example, when a user moves the physical object by 1.5 centimeters, under the same threshold requirements, the virtual display and/or at least one virtual object docked to the physical object may change locations because the movement of the physical object exceeds the threshold.

In some embodiments, the threshold may be selected based on the type of physical object, a user's preference, a user setting, a type of movement of the physical object, the virtual display, content displayed on the virtual display, the wearable extended reality appliance, or another parameter. In some embodiments, the user may set the threshold to a specific length of time. The length of time may be 1 second, 2 seconds, 5 seconds, or any other amount of time. For example, the location of the virtual display and one or more virtual objects may be changed only when the movement of the physical object lasts longer than 2 seconds. As another example, the user may set the threshold to a specific distance. For example, the user may indicate that the location of the virtual display and the at least one virtual object may change if the distance the physical object travels is over 2 inches.

In some embodiments, docking of the virtual display to the physical object may take place before the docking of the at least one virtual object to the virtual display. Multiple objects and devices may be docked to other objects and devices. When multiple objects and devices are docked together, all of the objects and devices may move together. At least one virtual object may be docked to the virtual display while the virtual display is docked to the physical object. A docking of the virtual display to the physical object may happen first, followed by the docking of the virtual object to the virtual display. In some embodiments, one or more virtual objects may be docked to the virtual display before docking the virtual display to the physical object.

Some disclosed embodiments may include receiving input for undocking the virtual display from the physical object, and automatically undocking the at least one virtual object from the virtual display. An input may be received from a user to initiate an undocking process. For example, the user may use an input device to initiate undocking. The user may click a button to initiate undocking. As another example, the user may also drag the virtual display away from the physical object in the extended reality environment to initiate undocking. In response to the input received from the user, the virtual display may be undocked (e.g., disconnected) from the physical object. One or more virtual objects previously docked to the virtual display may be automatically disconnected from the virtual display when the virtual display is disconnected from the physical object, and one or more separate inputs to undock the one or more virtual objects may not be needed. Objects may not move together as a result of the undocking. For example, the virtual display may be docked to a pen and at least one virtual object, such as a phone display, may be docket to the virtual display. The user may click a button to initiate undocking and the virtual display may undock from the pen. Then the phone display may undock from the virtual display. A user may move the pen, and the virtual display and the at least one virtual object may not move as a result of the undocking.

In some embodiments, the physical object may be an input device, and the operations may further include changing the orientations of the virtual display and the at least one virtual object in response to the determined movement of the physical object. As described above, the physical object may be an input device such as keyboard, mouse, pen, track ball, microphone, or other input device. The physical object may be moved by a user and in response, the relative position of the virtual display and the at least one virtual object may be adjusted. For example, a user may rotate a keyboard by 90 degrees. The position of the virtual display and the at least one virtual object may be adjusted so the virtual display and the object are also rotated by 90 degrees.

Some disclosed embodiments may include analyzing image data captured by the wearable extended reality appliance to detect a real world event at least partly occluded by at least the virtual display and a particular virtual object of the plurality of virtual objects, the particular virtual object differs than the at least one virtual object. A real world event may include any non-virtual occurrence in a vicinity of the extended wearable reality appliance. For example, a real world event may include a person and/or persons entering the space of a user. As another example, a real world event may include movement of objects and/or people towards or away from the user. As another example, a real world event may include movement of the user towards or away from people. The wearable extended reality appliance, or an external computing device, may detect a real world event based on an analysis of the image data received from an image sensor included in the wearable extended reality appliance, for example using a visual event detection algorithm. For example, the wearable extended reality appliance or the external computing device may detect a person walking, people organizing in a group, or any other event taking place around the user. The real world event may be partially or fully occluded from view of the user by the presentation of the virtual display and/or the particular virtual object via the wearable extended reality appliance. For example, a person may enter behind a virtual display, and the user may not be able to see the person because the virtual display may block the user's view. As another example, an object may be moved so that the object is behind a virtual object. The user may not be able to see the object because the virtual object may block the user's view. In order for the user to see the real world event, the virtual display and the particular virtual object may be moved.

Some embodiments may include, in response to the detection of the real world event at least partly occluded by at least the virtual display and the particular virtual object, moving the virtual display and the at least one virtual object in a first direction, and moving the particular virtual object in a second direction, the second direction may differ from the first direction. The virtual display and the at least one virtual object may move in a direction that is away from the real world event. The virtual display, at least one virtual object, and a particular object may move in the same direction or in different directions, depending on, for example, an amount of space available in the extended reality environment for displaying the virtual display, one or more virtual objects, and/or the particular object at one or more new locations. For example, a virtual display, at least one virtual object, and a particular object may all move to the left to prevent occlusion of a real world event. As another example, the particular virtual object may move in a second direction that is also away from the real world event. In another example, the particular object may move in a different direction than the virtual display and the virtual objects. For example, the real world event may be obscured by the virtual display and the virtual objects. The virtual display and the at least one virtual object may move in a rightward direction and the particular virtual object may move in a leftward direction to prevent occlusion of the real world event. By way of another example, information on the virtual display may reorient to locations other than those overlapping with the real world occurrence so as to permit viewing of the real world occurrence.

Some disclosed embodiments may include displaying text entered using the input device in the virtual display. The input device may include an interface that allows a user to create text. A user may create text by typing on a keyboard, using a stylus, writing on a touchpad, using speech to text conversion or any other way of creating text. The text created using the input device may appear on the virtual display. For example, the input device may be a keyboard. The user may push a "K" key on the keyboard and the text, "K", may appear on the virtual display. As another example, the input device may be a microphone. The user may speak into the microphone and say "Hello" and the text, "Hello" may appear on the virtual display.

In some embodiments, changing the location of the virtual display, may cause the at least one virtual object to move with the virtual display as a result of the docking of the at least one virtual object to the virtual display. The location of the virtual display may be moved any distance in any direction. The docked virtual object may move the same distance and/or a proportional distance in the same direction as the virtual display. For example, an input may be received from the user indicative of an intent to move the virtual display to the right. The virtual display may move to the right of the virtual display's original position and the virtual object may also move to the right of the virtual object's original position by the same amount or by a different amount. In another example, the at least one virtual object may be moved to a position that preserves a spatial relation (such as direction, distance, orientation, and so forth) between the at least one virtual object and the virtual display. In some embodiments, a physical object may be detected in a particular area of the environment. For example, the physical object may be detected by analyzing image data captured using an image sensor, for example using an object detection algorithm. The image sensor may be included in the wearable extended reality appliance, in an input device, in a computing device, and so forth. In another example, the physical object may be detected using radar, Lidar, sonar, and so forth. Further, to preserve the spatial relation between the at least one virtual object and the virtual display, the at least one virtual object may need to be moved to the particular area. In response to the detection of the physical object in the particular area, the movement of the at least one virtual object to the particular area may be avoided. In one example, the movement of the at least one virtual object in response to the change in the location of the virtual display may be avoided, and the at least one virtual object may be left in its original position. In another example, the at least one virtual object may be moved to an alternative area of the environment in response to the change in the location of the virtual display and the detection of the physical object in the particular area.

Some disclosed embodiments may include causing the at least one virtual object to move from a first location to a second location, wherein a spatial orientation of the at least one virtual object relative to the virtual display in the second location corresponds to an original spatial orientation of the at least one virtual object relative to the virtual display in the first location. Spatial orientation may refer to relative positions. For example, a position of a first object relative to a second object may refer to one or more distances and/or directions of the first object relative to the second object. Spatial orientation may be measured by distances, rotational angles, or both. Spatial orientation may be determined in a two-dimensional or a three-dimensional space. As discussed above, a virtual object may move when it is docked to a virtual display and the virtual display moves. After the virtual object and virtual display have moved from their first location, the space between the virtual object and the virtual display may remain the same at the second location. The virtual object may occupy the same position and/or angular orientation relative to the virtual display. For example, the virtual display may be moved to the left of the first location. The virtual object may also be moved to the left of the first location. The virtual object may stay the same distance from the virtual display in the second location as in the first location. As another example, the virtual object may be oriented at an angle of 90 degrees relative to the virtual display. The virtual display may be turned to the right direction. The virtual object may also be turned so that the object may still be oriented at an angle of 90 degrees relative to the virtual display.

Some disclosed embodiments may include receiving a selection of an additional virtual object from the plurality of virtual objects. In addition to the first virtual object, the user may select another (e.g., a second) virtual object using an input device as previously described. Other disclosed embodiments may also include docking the additional virtual object to the at least one virtual object. As discussed above, virtual objects may be docked to virtual displays or to other virtual objects. The second or additional virtual object may be docked to the first virtual object and/or to the virtual display in a manner similar to the docking described earlier. After docking the additional virtual object to the at least one virtual object, additional embodiments may include receiving a second input, the second input is indicative of a second intent to change the location of the virtual display without an expression of an second intent to move either the at least one virtual object or the additional virtual object. As stated above, the user may use an input device to create an intent to move the virtual display without attempting to move the additional virtual object. For example, a user may use a mouse to drag and move the virtual display but may not move the additional virtual object.

Some disclosed embodiments may include changing the location of the virtual display in response to the second input. The second input may be one of the types of inputs discussed earlier with regard to the first input.

In some embodiments, changing the location of the virtual display, may cause the at least one virtual object and the additional virtual object to move with the virtual display as a result of the docking of the at least one virtual object to the virtual display and the docking of the additional virtual object to the at least one virtual object. The at least one virtual object and the additional virtual object may move in response to the change in location of the virtual display. For example, at least one virtual object may be docked to a virtual display and an additional virtual object may be docked to the at least one virtual object. A user may use a mouse to drag and move the virtual display in an upward direction. The first virtual object and the additional virtual object may also be moved in an upward direction since the virtual objects are docked to the virtual display. The location of the virtual display may be moved any distance in any direction. The docked at least one virtual object and the additional virtual object may move the same distance and/or a proportional distance in the same direction as the virtual display. For example, an input may be received from the user indicative of an intent to move the virtual display to the right. The virtual display may move to the right of the virtual display's original position. The at least one virtual object and the additional virtual object may also move to the right of the at least one virtual object's original position and the additional virtual object's original position by the same amount or by a different amount.

Figure 62A:
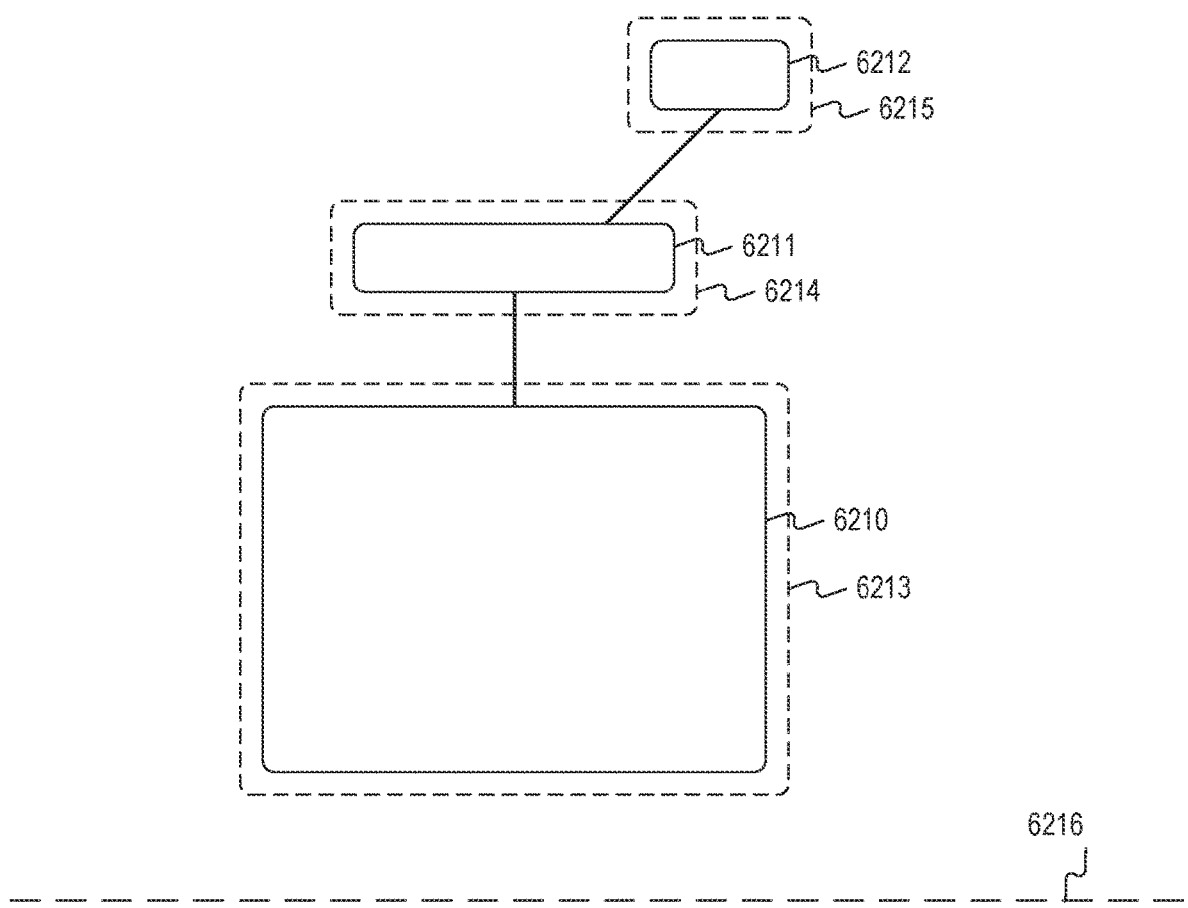
FIGS. 62A and 62B, illustrate examples of a virtual display and a plurality of virtual objects before and after the virtual display changes locations, consistent with some embodiments of the present disclosure.
Figure 62B:
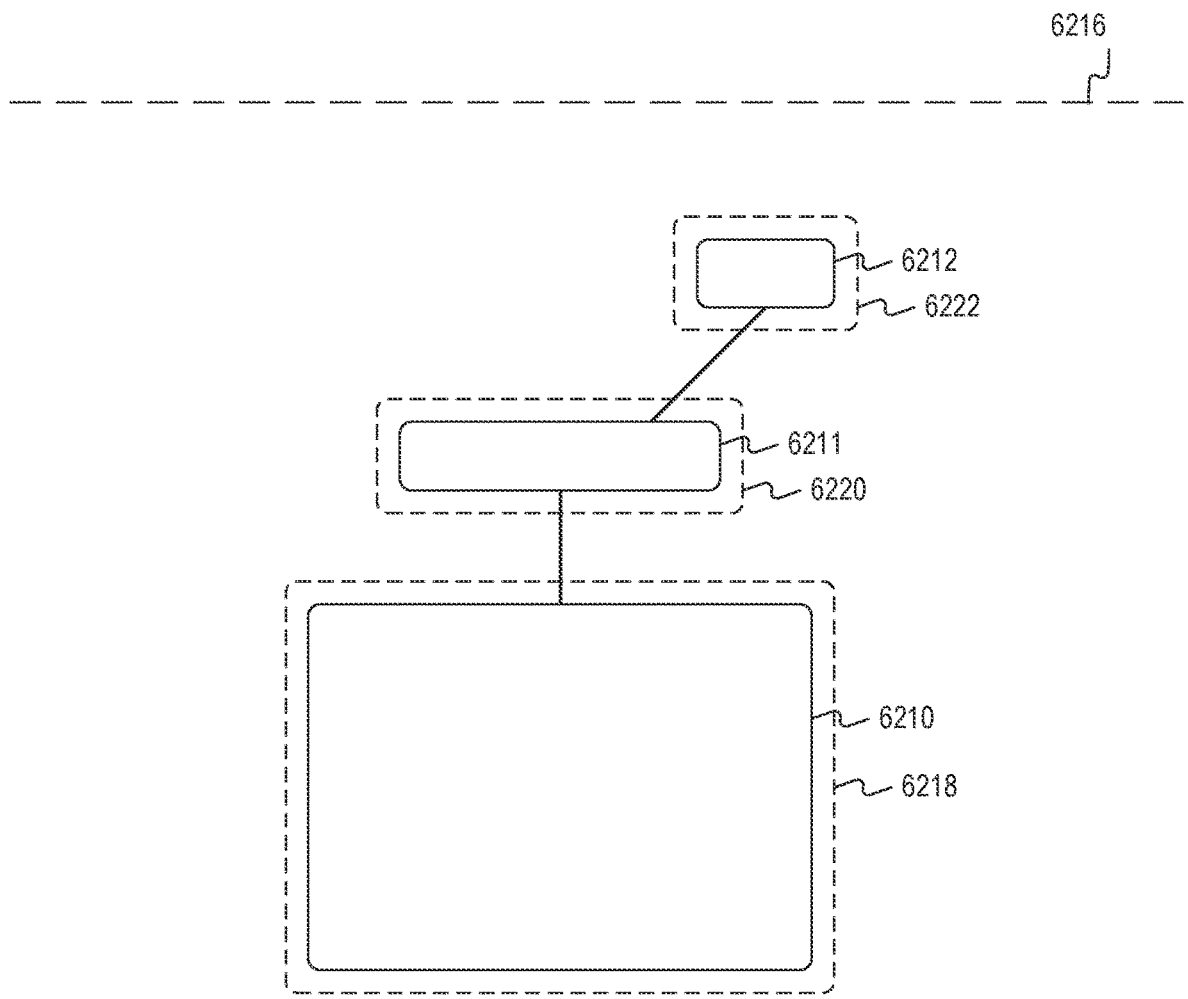

By way of example, FIGS. 62A and 62B illustrate an example of a virtual display and a plurality of virtual objects and illustrate changes in locations of one or more of the virtual objects when the virtual display changes locations, consistent with some embodiments of the present disclosure. As illustrated in FIG. 62A, virtual display 6210 may be located at location 6213. Virtual object 6211 may be located at location 6214 and may be docked to virtual display 6210, as illustrated by the solid line connecting the two. Virtual object 6212 may be located at location 6215 and may be docked to virtual object 6211, as illustrated by the solid line connecting the two. It is understood that these solid lines may not actually exist, but are only used to illustrate the docking. Such solid lines, or other visual indications of docking, may or may not be presented in the extended reality environment. Virtual objects 6211 and 6212 and virtual display 6210 may be located above dashed line 6216. As illustrated in FIG. 62B, virtual display 6210 may be moved to new location 6218, below dashed line 6216. Virtual object 86211 may also move to new location 6220 below dashed line 6216, based on the docking between virtual object 6211 and virtual display 6210. Similarly, virtual object 6212 may also move to new location 6222 below dashed line 6216, based on the docking between virtual object 6211 and virtual object 6212.

In some embodiments, selectively moving the at least one virtual object with the virtual display may be geolocation-dependent. The location of the user may impact how the system responds. Responses may differ for example when the user is in a private space such as an office, verses a public space. Or a response may differ based on whether the user is in a private office versus a conference room. Thus, the at least one virtual object may move with the virtual display based on a geographical location. The geographical location may be based on the GPS coordinates of the user or other location-based detection such as indoor locating technology based on WiFi or other signals. GPS coordinates may use latitude and longitude to determine the location of the user, the wearable extended reality appliance, or any other component of the system. The movement may be geolocation-dependent for privacy or security reasons. For example, the user may be in the home of the user. The at least one virtual object may move with the virtual display because the user is at home. As another example, the wearable extended reality appliance may be in the office of the user. The at least one virtual object may move with the virtual display because the wearable extended reality appliance is in a user's office. As another example, the user may be in a public space. The at least one virtual object may not move with the virtual display because the user is in a public setting and the user may not want the virtual objects to be viewable in public.

Some disclosed embodiments may include causing the at least one virtual object to move with the virtual display upon detection of the wearable extended reality appliance at a first geolocation and disassociating the at least one virtual object from the virtual display upon detection of the wearable extended reality appliance at a second geolocation, different from the first geolocation. When the wearable extended reality appliance is at a first geographical location, the at least one virtual object and the virtual display may move together. When the wearable extended reality appliance is at a second geographical location, the at least one virtual object and the virtual display may not move together. The first geographical location may be in a private setting, while the second geolocation may be in a public setting. For example, the wearable extended reality appliance may be located in the office of the user. When the wearable extended reality appliance is in the office of the user the at least one virtual object may move in the same direction as the virtual display. For example, the user may use a mouse to drag the virtual display in a right direction. The at least one virtual object may also be moved in a right direction. As another example, the wearable extended reality appliance may be located in a public space. While in the public space, the at least one virtual object may not be associated with the virtual display. Therefore, if a user moves a virtual display, the at least one virtual object may not move in the same direction as the virtual display. For example, if the user moves the virtual display in a downward direction, the at least one virtual object will stay in the same position.

After docking the at least one virtual object to the virtual display, some embodiments may include, receiving a first user-initiated input for triggering a change in the location of the virtual display and for triggering a change in the location of the at least one virtual object, receiving a second user-initiated input for triggering a change in the location of the virtual display, wherein the second user-initiated input excludes a trigger for a change in the location of the at least one virtual object, changing the location of the virtual display and the at least one virtual object in response to the first user-initiated input, and changing the location of the virtual display and the at least one virtual object in response to the second user-initiated input. A user may provide a first user-initiated input that is directed to changing the position of both the virtual display and the at least one virtual object. For example, the user may select both the virtual display and the at least one virtual object with a mouse, and then drag both with the mouse to change positions. The user may also provide a second user-initiated input that is directed only to the virtual display. The location of both the virtual display and the at least one virtual object may be changed based on the first and second user-initiated input. For example, the user may use an input device to provide a user-initiated input. The input device may be a keyboard, mouse, touchpad, or other device. The user may use the input device to trigger a change in location by using the device to move the virtual display. For example, the user may provide a first input by using a mouse to click and drag the virtual display and the virtual object. The location of the virtual display and the virtual object may change based on the location of where the mouse drags the virtual display and the virtual object. For example, the mouse may drag the virtual display and the virtual object in the left direction, and the virtual display and the virtual object may move in the left direction. As another example, the mouse may drag the virtual display and the virtual object in an upward direction, and the virtual display and the virtual object may move in the upward direction. As another example, a user may use a touchpad to create a second user-initiated input by clicking and dragging only the virtual display in a downward direction. The virtual object may also move in a downward direction since the virtual object may be docked to the virtual display, even though the second user-initiated input may not be directed to the virtual object.

By way of example, FIGS. 62A and 62B illustrate a virtual display and a virtual object moving as a result of a second-user initiated input. Virtual display 6210 may move from location 6213 in FIG. 62A to location 6218 in FIG. 62B, based on a user clicking and dragging virtual display 6210 using a mouse. The user may be excluding a change in location of virtual objects 6211 and 6212 by not clicking and dragging virtual objects 6211 and 6212. Virtual objects 6211 and 6212 may move to new locations 6220 and 6222 in FIG. 62B because virtual objects 6211 and 6212 are docked with virtual display 6210.

Some disclosed embodiments may include receiving a third user-initiated input that triggers a change in the location of the at least one virtual object but excludes change in the location of the virtual display, and changing the location of the virtual display and the at least one virtual object in response to the third user-initiated input. A user may provide a third user-initiated input that is directed to changing the position of only the at least one virtual object. The user-initiated input, as described above, may create a change in the location of the virtual display and the at least one virtual object when the virtual display and the virtual object are docked together. The third user-initiated input may be of one or more of the types of input described earlier in connection with the first user-initiated input. For example, a mouse may drag the at least one virtual object in a downward direction, and the at least one virtual object may be moved in a downward direction. The virtual display may also move in the same downward direction as the at least one virtual object.

By way of example, FIGS. 60A and 60B illustrate a virtual display moving as a result of a third user-initiated input. Virtual object 5912 may move from location 5916 to location 6022 in FIG. 60B based on a user clicking and dragging virtual object 5912 using a mouse. The user may be excluding a change in location of virtual display 5910 by not clicking and dragging virtual display 5910. Virtual display 5910 and virtual object 5911 may move to new locations 5926 and 6024 in FIG. 60B because virtual display 5910 and virtual object 5911 are docked to virtual object 5912.

Some disclosed embodiments may include displaying the virtual display on a first virtual surface and displaying the at least one virtual object on a second surface that at least partially coincides with the first surface. A virtual surface may be a surface that exists in an extended reality environment. The virtual surface may have any shape. For example, the virtual surface may have a square, rectangular, circular, or other shape. The virtual surface may also not have a defined shape. There may be a single virtual surface or multiple virtual surfaces. The virtual display and the at least one virtual object may be projected onto different virtual surfaces. The virtual display may be projected onto a first virtual surface and the at least one virtual object may be projected onto a second virtual surface. The first and second virtual surfaces may have portions that partially or fully overlap, touch, or intersect with each other. For example, the first virtual surface may be a touchpad and the second virtual surface may be a keyboard. The touchpad may have an edge that touches an edge of the keyboard.

Figure 63:
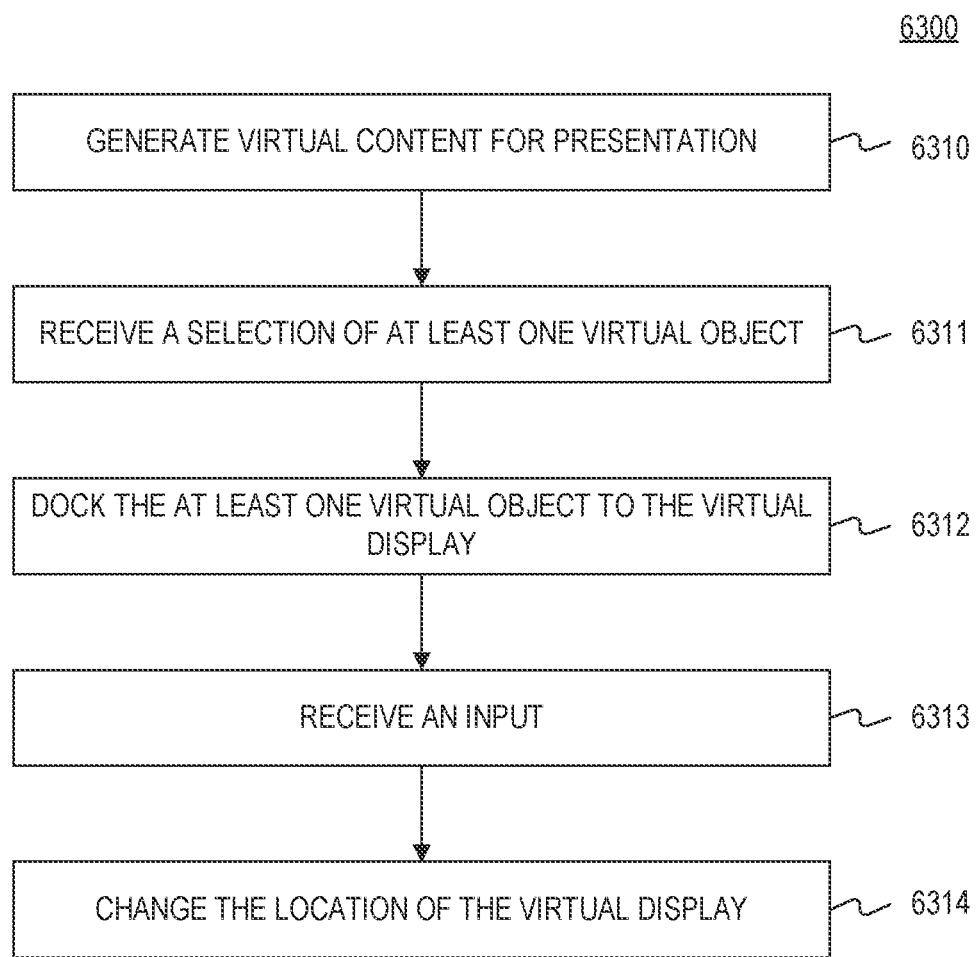
FIG. 63 illustrates a flow chart of an exemplary method for docking virtual objects to virtual display screens, consistent with some embodiments of the present disclosure.

FIG. 63 illustrates a flow chart of an exemplary method that may be executed by a processor to perform operations for docking virtual objects to virtual display screens in an extended reality environment. Method 6300 may include a step 6310 of generating virtual content for presentation via a wearable extended reality appliance, where the virtual content includes a virtual display and a plurality of virtual objects located outside the virtual display. Method 6300 may also include a step 6311 of receiving a selection of at least one virtual object from the plurality of virtual objects. Method 6300 may also include a step 6312 of docking the at least one virtual object to the virtual display. Further, method 6300 may include a step 6313 of receiving an input indicative of an intent to change a location of the virtual display. Method 6300 may also include a step 6314 of changing the location of the virtual display in response to the input, and wherein changing the location of the virtual display causes the at least one virtual object to move with the virtual display.

A virtual working environment may include a plurality of virtual objects and physical objects. Physical objects may include articles such as keyboards, computer mice, trackpads, physical screens, or any other physical object. Virtual objects may include items such as virtual screens, or virtual objects displayed on a virtual screen. A virtual object may, for example, virtually represent something physical. Avatars, icons, simulations, graphical representations are just a few examples of items that may be virtual objects (virtual items). The virtual objects and the physical objects may be associated with virtual planes. That is, some types of objects may be depicted in alignment with a virtual plane. Theoretically, virtual planes may extend infinitely in any direction. A set of virtual objects and a physical object may all be located in a first plane and may be docked to each other. Docking may involve a form of linking whereby movement of an object docked to another may cause that other object to move. Thus, for example, movement of a physical object may trigger movement of the associated docked set of virtual objects in the first plane. Alternatively, or additionally, a set of virtual objects may be docked to a physical object (e.g., a keyboard). The set of virtual objects and the physical object may be located on different virtual planes. Movement of the physical object may trigger movement of the associated docked set of virtual objects, regardless of whether they are located in a common plane.

Some disclosed embodiments may involve implementing selective virtual object display changes. Display changes may include changing how something may be visually presented to a user. For example, display changes may include changing size, moving location, orientation, adjusting brightness and/or color, changing resolution, and/or any other visually perceptible alterations. The display changes may be applied to some but not all virtual objects. Virtual objects may exist in an extended reality environment. A virtual object may appear when a user interacts with that extended reality environment. For example, a virtual object may include virtual display screens, widgets, documents, presentations, media items, photos, videos, virtual characters, scroll bars, adjusters, and other objects. A user may be able to view, move, rotate, flip, squeeze, enlarge, modify, and/or interact with virtual objects, in order to achieve functionalities, such as altering, examining or moving the virtual objects. A visual presentation of a virtual object may be changed. For example, a user may adjust the size of a virtual object. As another example, a user may rearrange the locations of one or more virtual objects. A user may be selective in executing virtual object display changes, for example by choosing to change some virtual objects but not others, by selecting a type or another parameter of a change, and so forth. For example, a user may choose to move one virtual object but keep the location of another virtual object the same. As another example, a user may choose to adjust the brightness of one virtual object but not adjust the brightness of a different virtual object. In yet another example, a user may select a direction of movement or a new location for a virtual object when moving the virtual object.

Some disclosed embodiments may involve generating an extended reality environment via a wearable extended reality appliance, the generated extended reality environment may include a first virtual plane associated with a physical object and a second virtual plane associated with an item, the second virtual plane may extend in a direction transverse to the first virtual plane. In one example, generating the extended reality environment may comprise presenting at least part of the extended reality environment to a user of the wearable extended reality appliance. A virtual plane may be a dimensional surface that may be used to represent the surface of an article, and which may extend beyond boundaries of that article, depending on design choice. Multiple virtual planes (for example, two, three, more than three, more than ten, infinity, or any other number of virtual planes) may exist and may extend in multiple different directions. A virtual plane may be considered virtual if it is employed in connection with an extended reality display or an extended reality environment, regardless of whether the plane is visible. Specifically, a virtual plane may be displayed in color or with texture so that it may be visible to a wearer of an extended reality appliance, or the virtual plane may be invisible to the eye, but might become perceptible when visible objects are located in the virtual plane. In one example, a virtual plane may be illustrated with virtual grid lines in an extended reality environment. A virtual plane may include, for example, a flat surface, a non-flat surface, a curved surface, or a surface having any other desired configuration. For example, a virtual plane may be a flat two-dimensional surface, a curved two-dimensional surface, an even two-dimensional surface, a homogenous two-dimensional surface, a non-homogenous two-dimensional surface, and so forth. A physical object and an item may exist in the same virtual plane or in separate virtual planes. For example, a first virtual plane may be a virtual plane of the physical object (e.g., a top surface of a table or desk) and the virtual plane may extend horizontally. In another example, a first virtual plane may be a virtual plane associated with a physical surface that the physical object is placed on (e.g., a keyboard placed on a top surface of a table or desk) and the virtual plane may extend to one or more directions. As another example, a second virtual plane may be a virtual plane of the item (e.g., a virtual display screen, a virtual control plane, a physical item, etc.) and the virtual plane may extend vertically.

Virtual planes that exist together in an extended reality environment may extend across each other. That is, virtual planes may intersect each other. Virtual planes in an extended reality environment may also extend in the same direction and never cross each other. Virtual planes may also extend across (or intersect) with two or more other virtual planes at the same or different angles. For example, a second virtual plane may transverse a first virtual plane by extending across the first virtual plane at a right angle. As another example, a first virtual plane may extend across a second virtual plane at a 75° angle. As another example, a first virtual plane may extend in a horizontal direction and a second virtual plane may also extend in a horizontal direction, so the two planes never extend across each other.

Figure 64:
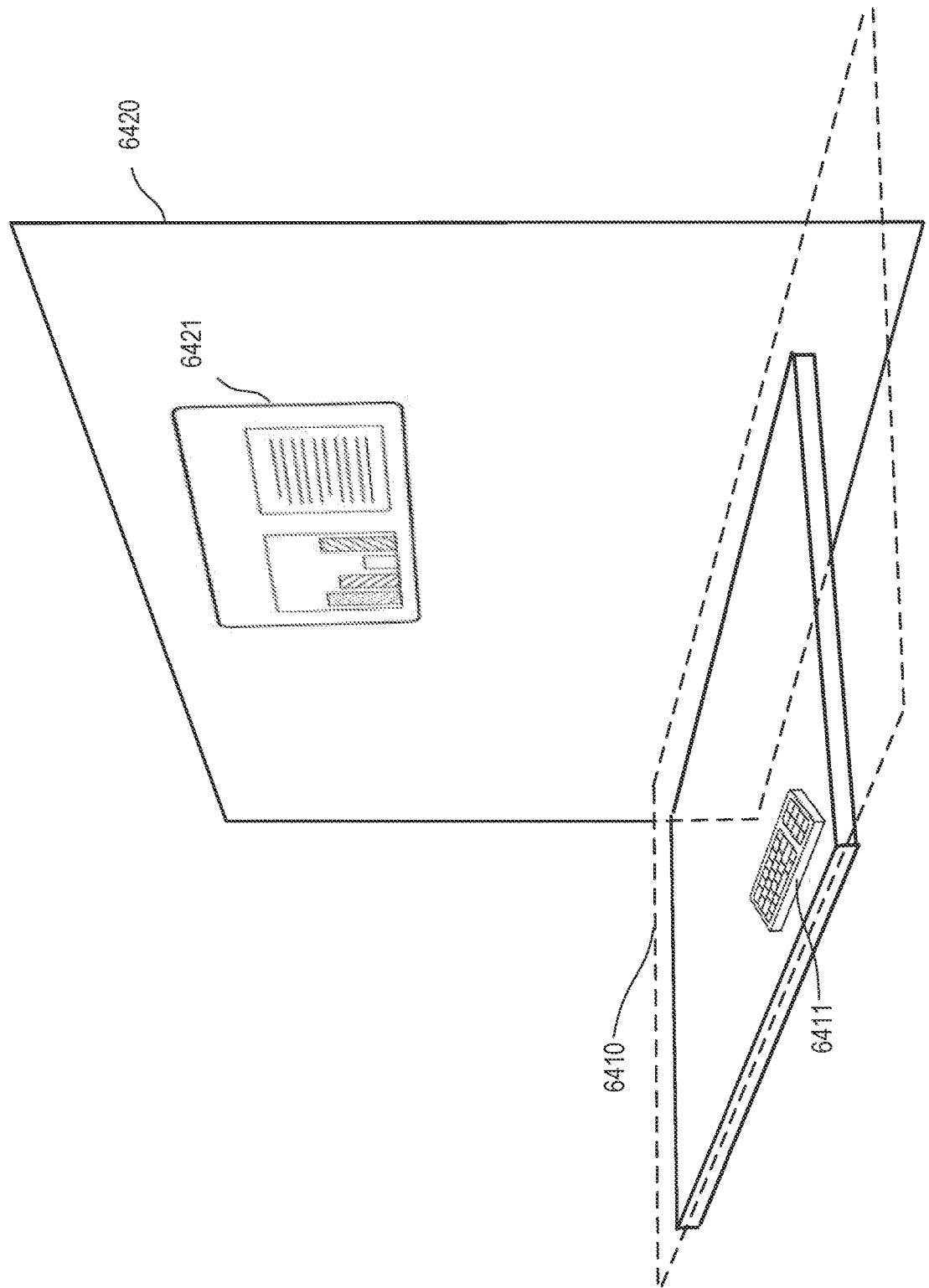
FIG. 64 illustrates an example of a physical object in a first plane and an item in a second plane, consistent with some embodiments of the present disclosure.

By way of example, FIG. 64 illustrates an example of a physical object in a first plane and an item in a second plane, consistent with some embodiments of the present disclosure. In some embodiments, first virtual plane 6410 may exist in an extended reality space. Physical object 6411 may be associated with first virtual plane 6410. Second virtual plane 6420 may also exist in the extended reality space and extend in a direction transverse to first virtual plane 6410. Item 6421, which may be virtual or physical, may be associated with second virtual plane 6420.

In some embodiments, the first virtual plane may be flat and the second virtual plane may be curved. In another example, the first virtual plane may be flat and the second virtual plane may be flat. In yet another example, the first virtual plane may be curved and the second virtual plane may be flat. In another example, the first virtual plane may be curved and the second virtual plane may be curved. A flat virtual plane may be a flat surface in which a straight line between any two points on the virtual plane lies wholly within or on that surface. For example, a first virtual plane may extend along a horizontal plane and movement of a first set of virtual objects in the first virtual plane may occur in a two-dimensional space. A curved plane may be a curved surface in which a straight line between at least one pair of two points on the virtual plane lies outside the surface. A curved plane may extend in a three-dimensional space. For example, a second virtual plane may extend along a curved path and movement of a first set of virtual objects in the first virtual plane may occur in a three-dimensional space.

In some embodiments, the physical object may be located on a physical surface with the first virtual plane extending beyond dimensions of the physical surface. A physical surface may be a surface of a physical object present in the user's environment. For example, a physical surface may be a desk, table, chair, dresser, couch, bookshelf, countertop, or any other surface. A physical object may be positioned on a physical surface. A first virtual plane may represent the space a physical object occupies and may extend past the boundaries of a physical surface. As another example, a physical object may be located on a desk in a room and a virtual plane may coincide with an upper surface of the desk and extend past the end of the desk to the walls of the room. By way of another example, a physical object may be located on a table in an office and a virtual plane may coincide with an upper surface of the table and extend past the end of the table to a window in the room.

Some disclosed embodiments may involve accessing a first instruction for docking a first set of virtual objects in first positions associated with the first virtual plane. Docking, in this context, may include connecting, tethering, linking or otherwise joining a virtual object to a particular position on a virtual plane. Docking may ensure that the objects stay in the particular position on the virtual plane when the virtual plane moves. In one example, instructions may be a set of commands or rules for performing a task or an action. In another example, instructions may include any information configured to cause a desired action. Instructions may be provided to a processor to execute the instructions to perform the task—in this case linking one or more objects to particular locations, which, in some embodiments may be defined by coordinates. Accessing an instruction, for example by the processor, may include at least one of: receiving the instruction, reading the instructions from memory, receiving the instruction from an external device, determining the instruction by analyzing data, receiving the instruction from a user (for example, through a user interface, through gestures, through voice commands, etc.), and so forth. For example, an instruction may be to associate a coordinate on a virtual plane with a particular object, for example in a data-structure. Instructions may define the rules for how the docking should take place. Thus, a first set of instructions may define that a virtual object may be docked to a virtual plane in a specific position. The virtual plane may move, and the docked virtual object may also move with the virtual plane, to ensure that the virtual object stays in the same position on the virtual plane. One or more virtual objects (for example, one virtual object, at least two virtual objects, at least three virtual objects, at least ten virtual objects, etc.) may make up a set of virtual objects. A set of virtual objects may be docked to the same position on a virtual plane, or each object may be docked to a different position. For example, a set of virtual objects may be docked in a position that may be three inches to the left of a physical object and on a virtual plane associated with the physical object. As another example, a set of virtual objects may be docked in a position that may be two centimeters up from a physical object and on a virtual plane associated with the physical object. In some embodiments, one or more objects in the set of virtual objects may be docked to different positions on the virtual plane. Thus for example, a first virtual object may be docked at a coordinate to the left of a physical object and a second virtual object may be docked at a coordinate to the right of the physical object.

Some disclosed embodiments may involve accessing a second instruction for docking a second set of virtual objects in second positions associated the second virtual plane. The second instruction may have characteristics similar to those described above for the first instruction. A second set of virtual objects, like the first set of virtual objects, may include one or more virtual objects. A second set of virtual objects may be docked to the same position or to different positions in the same manner as described above with respect to the first set of virtual objects. For example, a second set of virtual objects may be docked in a position that may be three inches to the left of an item and on a virtual plane associated with the item. As another example, a second set of virtual objects may be docked in a position that may be two centimeters up from an item and on a virtual plane associated with the item.

Some disclosed embodiments may involve receiving a first input associated with a movement of the physical object. Movement of a physical object may include changing locations or orientations within a physical space. For example, movement may include a change in distance, position, elevation, angular orientation, or any other type of movement. A physical object may move as a result of a user's actions. For example, a user may move a physical object five inches to the right on a table. In some examples, receiving the first input may include at least one of reading the first input from memory, receiving the first input from an external device, or capturing the first input using a sensor. The movement of the physical object may be detected by an image sensor and which constitute an input that may be received by one or more processors. In other words, signals from an image sensor may be analyzed, for example using visual object tracking algorithm, to determine that the physical object was moved in a certain direction by a certain distance, and/or that the physical object was rotated in a certain direction.

In some embodiments, the physical object may be a computing device and the first input may include motion data received from at least one motion sensor associated with the computing device. A computing device may be an electronic device controlled by a digital processing unit. For example, a computing device may include a smart phone, a laptop computer, a tablet, a desktop computer, a hand-held computer, a wearable computer, or any other type of computing device. The computing device may contain a motion sensor. A motion sensor may be an electronic device designed to detect and measure linear and/or angular movement. Movement of a computing device as detected by the motion sensor may be collected as motion data, and the motion data may be received as the first input. For example, a smart phone may be moved to the left in a physical space. A motion sensor may store the leftward movement of the smart phone as a first input. A motion sensor may be located anywhere on a computing device. For example, a motion sensor may be located on a side of a laptop computer. As another example, a motion sensor may be located on a top portion of a laptop computer. As another example, a motion sensor may be located on a bottom portion of a laptop computer.

Some disclosed embodiments may involve analyzing the motion data to determine if the movement of the physical object is greater than a threshold, causing the change in the display of the first set of virtual objects when the movement of the physical object is greater than the threshold, and maintaining the display of the first set of virtual objects when the movement of the physical object is less than the threshold. A threshold may be the magnitude or intensity of a parameter that must be exceeded for a certain reaction. The threshold may be based on distance, speed, rotation angle, acceleration, force, or any other parameter. The threshold may be pre-determined, may be set by a user, or may be determined based on current state of the system or of the environment. For example, the threshold may be based on a type of the physical object, on a size of the physical object, on a distance between the physical object and the second virtual plane, on a type of a physical surface that the physical object is placed on, on a size of a physical surface that the physical object is place on, on a distance between the physical object and a user, and so forth. Motion data may be analyzed to detect motion and determine if the movement is greater than, equal to, or smaller than the threshold. In some cases, a movement of a physical object may be relatively small (e.g., less than the threshold) and as a result there may be no change in the display of a first set of virtual objects. That is, the first set of virtual objects may be maintained in their respective positions on the virtual plane. Alternatively, movement of a physical object may be relatively large (e.g., greater than or equal to the threshold) and as a result the display of a first set of virtual objects may change. That is, the first set of virtual objects may be moved from their positions in response to the movement of the physical object. For example, when a threshold is set to five centimeters and a physical object is moved by only three centimeters, a display of a first set of virtual objects may not be changed because the distance by which the physical object is moved is lower than the threshold. As another example, if a user in this scenario were to move the physical object eight centimeters, a display of a first set of virtual objects may be changed because the distance by which the physical object moved exceeds the threshold.

In some embodiments, the physical object is an inanimate object and the first input may include image data received from an image sensor associated with the wearable extended reality appliance. An inanimate object may be an object that is unable to move on its own. For example, an inanimate may be a keyboard, a chair, a writing utensil, a notebook, or any other object not capable of changing its position or orientation without being subjected to some external stimulus. A wearable extended reality appliance may contain an image sensor to store images of the physical object. An image sensor may be an electronic device configured to capture an optical image and convert that optical image into an electronic signal. An image sensor may be attached to any part of a wearable extended reality appliance, as described above. Images and/or videos of a physical object may be captured by the image sensor and provided as image data. In some embodiments, the first input may include image data of the physical object captured by the image sensor.

Some disclosed embodiments may involve analyzing the image data to determine if the movement of the physical object was prompted by a user of the wearable extended reality appliance, causing the change in the display of the first set of virtual objects when the movement of the physical object was prompted by the user, and maintaining the display of the first set of virtual objects when the movement of the physical object was not prompted by the user. A user of the wearable extended reality appliance may prompt movement of a physical object by physically pushing and/or pulling the physical object and changing the physical object's location, position, orientation, or any other by moving the physical object in any other way. Alternatively, a person, other than the user, may also prompt movement of a physical object in the same manner. An image sensor may capture images of a person moving the physical object. The images may be analyzed to determine if the person who moved the physical object is a user of a wearable extended reality appliance. In one example, this may occur by analyzing physical human body characteristics of the hands or other associated body parts of the mover captured by an image sensor, and comparing those characteristics with stored characteristics of the user. One such mechanism may be facial or hand recognition. Facial or hand recognition technology may use known computer algorithms to pick specific, distinctive details of a user's face or hands, which may be compared to stored details of other faces and/or hands that have been collected in a database. In another example, a binary visual classification algorithm may be used to analyze the images of a person moving the physical object and classy it to one of two classes, 'movement of the physical object was prompted by the user of the wearable extended reality appliance' or 'movement of the physical object was not prompted by the user of the wearable extended reality appliance'. Such binary visual classification algorithm may be obtained by training a machine learning model using training examples. In one example, a user of a wearable extended reality appliance may move a physical object. Image data obtained by the image sensor may be analyzed to determine whether the user moved the physical object. When it is determined that the physical object was moved by the user, a display of a first set of virtual objects may be changed based on the user's actions. That is, the first set of virtual objects may also be moved based on the user's actions. As another example, an individual not wearing the wearable extended reality appliance may move a physical object, or the physical object may otherwise move not due an action of the user wearing the wearable extended reality appliance. Image data obtained by the image sensor may be analyzed to determine whether the user moved the physical object. When it is determined that the physical object was moved by someone other than the user (or that the physical object was not moved by the user), a display of a first set of virtual objects may not be changed. That is, the first set of virtual objects may not be moved based on the movement of the physical object by someone other than the user of the wearable extended reality appliance (or based on the movement of the physical object not being by the user of the wearable extended reality appliance).

In response to receiving the first input, some disclosed embodiments may involve, causing a change in a display of the first set of virtual objects in a manner corresponding the movement of the physical object while maintaining the second set of virtual objects in the second positions. Causing a change in a display may include changing how the virtual objects are visually presented to a user, for example via the wearable extended reality appliance. For example, a change in display may include a change in location, a change in visual properties, such as size, brightness, saturation, orientation, opacity, intensity, graphical theme, color scheme, and/or other display changes. A first set of virtual objects may be located on a same virtual plane as a physical object and a second set of virtual objects may be located on a different virtual plane. The physical object may change locations on the virtual plane and create an input (e.g., via signals from a motion sensor or an image sensor). A display of a first set of virtual objects may be changed based on the input. A display of a second set of virtual objects may not be changed. For example, a physical object may move three feet to the right in the first virtual plane. A first set of virtual objects may also move three feet to the right in the first virtual plane, while the second set of virtual objects may not move in the second virtual plane.

Figure 65:
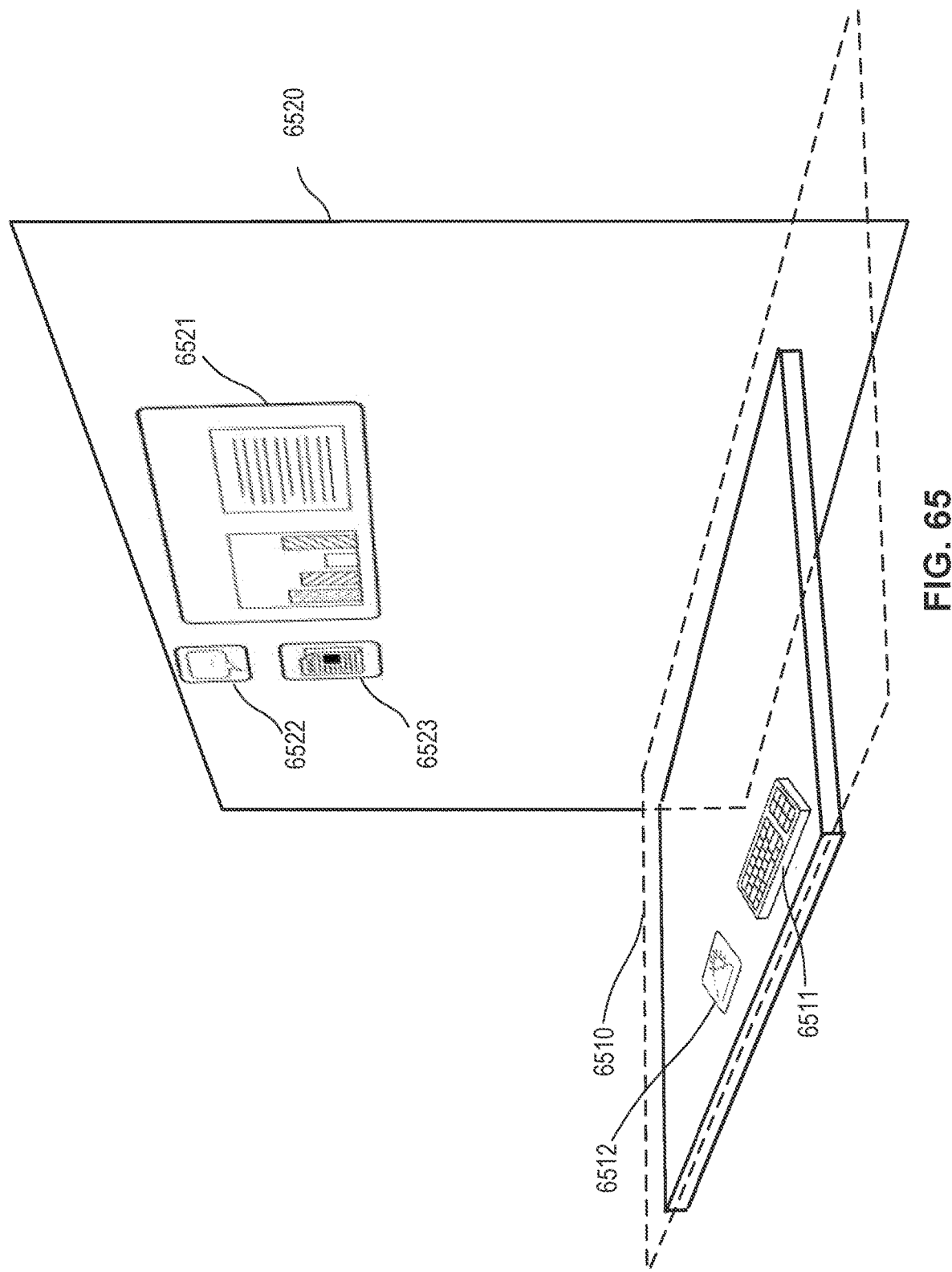
FIG. 65 illustrates an example of virtual objects docked to positions in a virtual plane prior to movement of the physical object, consistent with some embodiments of the present disclosure.

By way of example, FIG. 65 illustrates an example of virtual objects docked to positions in a virtual plane prior to movement of the physical object, consistent with some embodiments of the present disclosure. In some embodiments, physical object 6511 and first set of virtual objects 6512 may be associated with first virtual plane 6510. First set of virtual objects 6512 may be docked to positions on first virtual plane 6510. Item 6521 and second set of virtual objects 6522 and 6523 may be associated with second virtual plane 6520. Second set of virtual objects 6522 and 6523 may be docked to positions on second virtual plane 6520.

Figure 66:
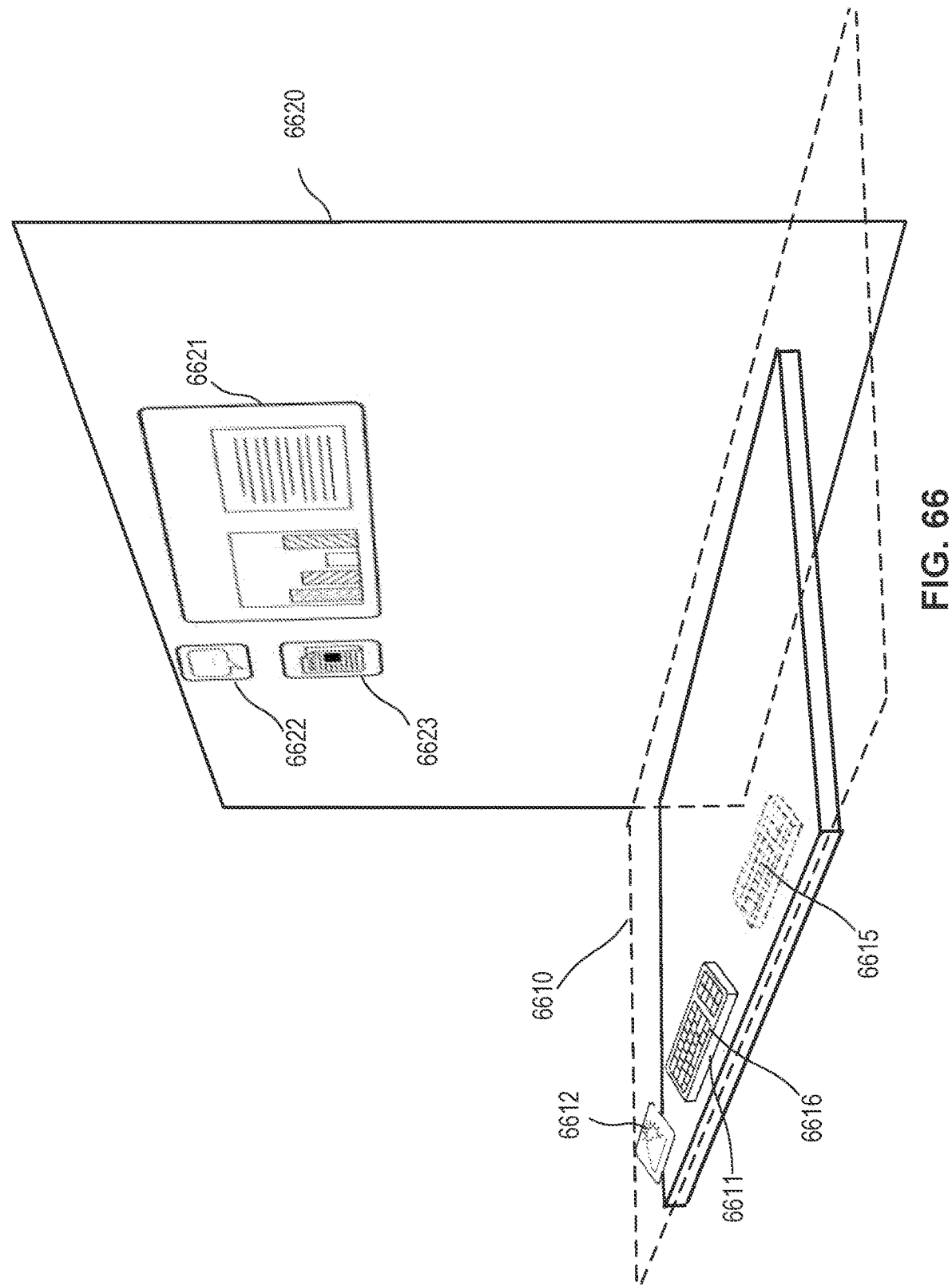
FIG. 66 illustrates an example of a movement of a physical object and virtual objects, consistent with some embodiments of the present disclosure.

By way of example, FIG. 66 illustrates an example of a movement of a physical object and virtual objects relative to the situation illustrated in FIG. 65, consistent with some embodiments of the present disclosure. In some embodiments, physical object 6611 and first set of virtual objects 6612 may be associated with first virtual plane 6610. First set of virtual objects 6612 may be docked to positions on first virtual plane 6610. Item 6621 and second set of virtual objects 6622 and 6623 may be associated with second virtual plane 6620. Second set of virtual objects 6622 and 6623 may be docked to positions on second virtual plane 6620. Physical object 6611 may be moved from its original position (shown as 6515) to a new position (shown as 6616). First set of virtual objects 6612 (may be moved to correspond with the movement of physical object 6611. However, second set of virtual objects 6622 and 6623 may not move.

In some embodiments, when the physical object is moved to a new location determined to be separated from the physical surface on which the physical object was originally located, the display of the first set of virtual objects may be updated to appear in proximity to the new location but with a modified display of the virtual objects. For example, if an original location of a physical object was a surface of a conference room table in a first plane, and the new location is a surface of a side table in a second plane, the virtual objects may both move to an associated location with the side table (e.g., a movement proportional to the movement of the physical object), and also change in appearance. For example, the change in planes may necessitate a perspective change to be reflected in the virtual objects. In another example, the new position of the virtual objects in different illumination conditions may necessitate an opacity or a brightness change. In yet another example, partial occlusions of the virtual objects in the extended reality environments may necessitate a partial rendering of the virtual objects. Thus, not only will the virtual objects move to a new location, but their appearances in the new location may differ from their prior appearances. In some embodiments, a new location may no longer be on a physical surface. A display of the virtual objects may be changed even if the new location is no longer on the same physical surface. For example, a physical object may be located on a desk before being moved. After being moved, the physical object may be located on a chair. A first set of virtual objects may also be moved to be located in an associative manner with the chair.

In some embodiments, modifying the display of the first set of virtual objects includes at least one of causing the first set of virtual objects to disappear, changing at least one visual property of the first set of virtual objects, or displaying a minimized version of the first set of virtual objects. Modifying a display may include implementing a change in visual property, appearance, or other visual characteristics associated with the display. A visual property may be the characteristic appearance of an object. Visual characteristics may include size, orientation, opacity, intensity, graphical theme, color scheme, alignment, spacing, and/or other parameters that may control the display. For example, a display may be modified by completing removing (e.g., deleting) a first set of virtual objects from an extended reality environment. As another example, a size of a first set of virtual objects may be decreased. As another example, a brightness of a first set of virtual objects may be adjusted.

Some disclosed embodiments may involve receiving a second input associated with a movement of the item. In some examples, receiving the second input may include at least one of reading the second input from memory, receiving the second input from an external device, or capturing the second input using a sensor. An item may be moved in the same manner as a physical object described above. For example, an item (such as a physical item, a virtual item, an icon, an avatar or a widget) may be moved three inches in an upward direction. Similar to a first input, a movement of the item may constitute a second input that may be received by one or more processors. In one example, the item may be a virtual item in an extended reality environment, and the second input may be received from a wearable extended reality appliance presenting the item, from a computerized system coordinating the extended reality environment, from a computerized system controlling the presentation of the item via one or more wearable extended reality appliances, and so forth.

In some embodiments, the item is a virtual object and the second input includes pointing data received from an input device connectable to the wearable extended reality appliance. Pointing data may include data used to identify a location. Such data may include, for example, coordinate locations, distances and/or angular positions relative to a particular reference axis or plane. A user may identify a point using an input device. An input device may be configured to allow one or more users to input information. For example, a user may identify a point (e.g., a location) by touching a touchpad, controlling a keyboard, moving a computer mouse, using a touchscreen, through hand gestures, through voice commands, or by any other means. For example, an item may be a virtual screen. A user may drag the virtual screen with a virtual cursor controlled by a computer mouse, may push or pull the virtual screen with hand gestures, etc., and in response a second input that may be received by one or more processors associated with some disclosed embodiments.

Some disclosed embodiments may involve analyzing the pointing data to identify cursor actions indicative of a desired movement of the virtual object, and causing the change in the display of the second set of virtual objects in a manner corresponding with the desired movement of the virtual object. A cursor may be a movable indicator that identifies a point. Cursor actions may involve a user controlling a cursor to identify a point by hovering over the point, clicking on the point, dragging the point, or any other action that may cause the appearance and/or position of the point to be altered. Cursor actions may be analyzed to determine that the user may wish to select and move a virtual object. In response, a display of a second set of virtual objects may be changed relative to a movement of a virtual object by a user. For example, an item may be a virtual screen and a second set of virtual objects may be widgets. A user may move the virtual screen by dragging the screen using a cursor. In response, a second set of virtual objects may also move in the direction of movement of the screen. A movement of the second set of virtual objects may be in proportion to a movement of the item. For example, an item may be moved five inches, and a second set of virtual objects may be moved five inches.

In some embodiments, the item may be a virtual object and the second input may include image data received from an image sensor associated with the wearable extended reality appliance. Image data associated with a virtual object may be captured by an image sensor in the same manner as described above with respect to the image data of the physical object. An image sensor may capture an image or a video, and the second input may include the image or video, or may be based on an analysis of the image or video. For example, the item may be a word document moved to the left six inches by virtue of a user's gesture interaction with the word document. A gesture may be any body movement (e.g., head, eyes, hand). An image sensor may capture the gesture and a processor may interpret the gesture as an indication of the six inch leftward movement. That indication determined by the processor may constitute a second input.

Some disclosed embodiments may involve analyzing the image data to identify hand gestures indicative of a desired movement of the virtual object, and causing the change in the display of the second set of virtual objects in a manner corresponding with the desired movement of the virtual object. As alluded to in the preceding paragraph, a gesture may be a movement of a user's hand, or part of a user's hand, that may indicate or express an intention to cause an action. Such gestures may include, for example, scrolling, pinching, tapping, and/or pressing using one or more fingers, and or other combinations of movements involving one or more fingers, wrist, and/or a forearm of the user. An image sensor may create images of a user performing hand gestures. Images may be analyzed to determine if a user may be attempting to perform a specific movement with the virtual object. Images may be compared to collected images to determine a hand gesture of a user. Collected images may be stored and accessed by the processor and compared using a machine learning module, segmentation, pattern matching, or other techniques. The images may be compared to look for similar hand motions. For example, an image of a user's hand gesture may include a user's fingers swiping left. The image may be compared to a collected image of fingers swiping left that corresponds to a desired movement of moving an object to the left. Based on the comparison, it may be determined that the user is attempting to move the object to the left. Specific hand gestures may relate to specific movements. For example, a scrolling gesture may indicate that a user may be trying to move a virtual object up or down. As another example, a pinching gesture may indicate that a user may be trying to zoom in on a virtual object. Based on a gesture, a display of a second set of virtual objects may change. For example, a user may use a pinching gesture to indicate a desire to zoom in on a virtual object. In response, the second set of virtual objects may be displayed in a zoomed in or magnified form.

In response to receiving the second input, some disclosed embodiments may involve, causing a change in a display of the second set of virtual objects in a manner corresponding the movement of the item while maintaining the first positions of the first set of virtual objects. A change in a display of the second set of virtual objects may be made in a manner similar to the change in display of the first set of virtual objects described above. A second set of virtual objects may be located on a same virtual plane as an item and a first set of virtual objects may be located on a different virtual plane. The item may change locations on the virtual plane and create an input. A display of a second set of virtual objects may be changed based on the second input while a display of a first set of virtual objects may not be changed. For example, when an item is moved three feet to the right in the second virtual plane, a second set of virtual objects may also move three feet to the right in the second virtual plane, while the first set of virtual objects may not move in the first virtual plane.

Figure 67:
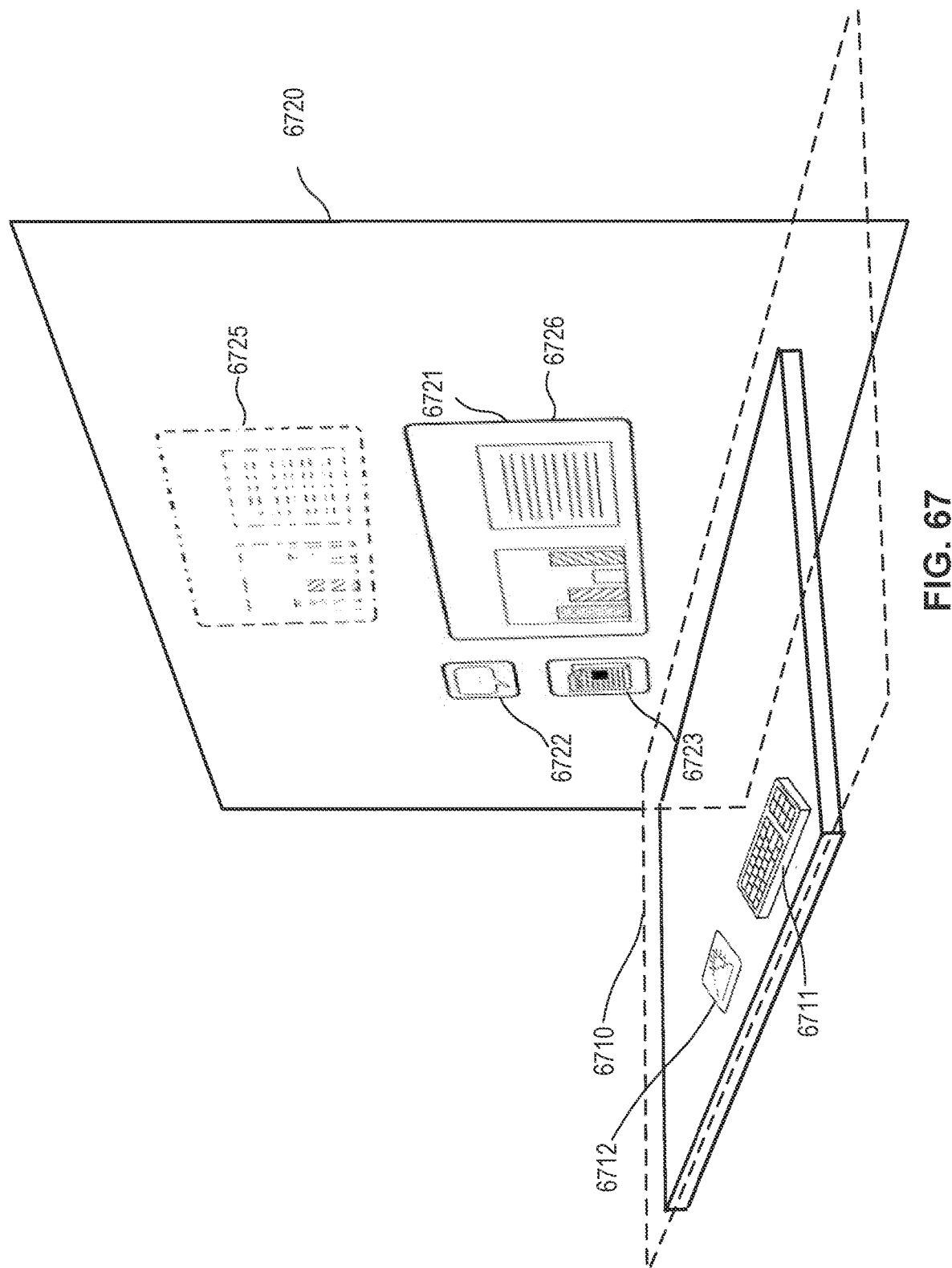
FIG. 67 illustrates an example of a movement of an item and virtual objects, consistent with some embodiments of the present disclosure.

By way of example, FIG. 67 illustrates an example of a movement of an item and virtual objects relative to the situation illustrated in FIG. 65, consistent with some embodiments of the present disclosure. In some embodiments, physical object 6711—and first set of virtual objects 6712 may be associated with first virtual plane 6710. For example, first set of virtual objects 6712 may be docked to first virtual plane 6710. Item 6721 and second set of virtual objects 6722 and 6723 may be associated with second virtual plane 6720. For example, second set of virtual objects 6722 and 6723 may be docked to second virtual plane 6720. Item 6721 may be moved from its original position (shown as 6725) to a new position (shown as 6726). Second set of virtual objects 6722 and 6723 may be moved to correspond with the movement of item 6721. However, first set of virtual objects 6712 may not move.

In some embodiments, causing the change in the display of the first set of virtual objects in response to receiving the first input may include moving the first set of virtual objects in the manner corresponding the movement of the physical object, and causing the change in the display of the second set of virtual objects in response to receiving the second input includes moving the second set of virtual objects in the manner corresponding the movement of the item. As described above, a first set of virtual objects may move locations in proportion to a movement of a physical object. As also described above, a second set of virtual objects may move locations in proportion to a movement of an item. For example, a physical object may be moved three inches to the left of the physical object's original position. In response, a first set of virtual objects may also move three inches to the left of the first set of virtual object's original position. As another example, an item may move three inches to the right of the item's original position. In response, a second set of virtual objects may also move three inches to the right of the second set of virtual object's original position.

In some embodiments, causing the change in the display of the first set of virtual objects in response to receiving the first input may include changing at least one visual property of the first set of virtual objects, and causing the change in the display of the second set of virtual objects in response to receiving the second input includes changing at least one visual property of the second set of virtual objects. A visual property may be a characteristic appearance of an object as described above, and as provided in examples, above. A change in display may include a change in visual property. For example, a physical object may move three inches to the left of the physical object's original position. In response, a first set of virtual objects may reduce in size. As another example, an item may move three inches to the right of the item's original position. In response, a second set of virtual objects may increase in size. Or, a movement of a virtual object may result in a re-rendering of the object to reflect a new perspective of the object associated with the new location.

In some embodiments, the item may be a virtual object and the movement of the virtual object includes a modification in at least one of dimensions or an orientation of the virtual object, and wherein the operations further include changing at least one of dimensions or orientations of the second set of virtual objects in a manner corresponding the modification of the virtual object. Changes in dimension and orientation may include changing physical characteristics of an item or a virtual object. Dimensions of an item or a virtual object may be modified by changing the length, breadth, depth, height, or other dimensions of the item. Orientation of an item or a virtual object may be modified by changing the relative position of the item or virtual object, respectively. A second set of virtual objects may be modified in the same way as an item. For example, a length of an item may be decreased. In response, respective lengths of a second set of virtual items may also be decreased. As another example, an orientation of an item may be modified to be facing a north direction. In response, the second set of virtual items may also be modified to be facing the north direction.

In some embodiments, the extended reality environment may include a virtual object associated with the first virtual plane and docked to the item. A virtual object may be docked to an item as described above. A virtual object may be located in a first virtual plane of a physical object. For example, a first virtual plane may be a virtual plane extending in a horizontal direction. A virtual object may be located on a first virtual plane and also located in a horizontal direction. A virtual object may be connected to an item located in a second virtual plane.

In response to receiving the first input, some disclosed embodiments may involve causing the change in the display of the first set of virtual objects in a manner corresponding the movement of the physical object while maintaining a position of a display of the virtual object. A corresponding change may, for example, include a proportional change in terms of distance, or a perspective change in terms of vantage point. When movement of the physical object is detected, a corresponding movement of the first set of virtual objects may be affected by the processor. However, another virtual object may remain unchanged in its position. In other words, the positions of only a docked set of virtual objects may change positions in response to the physical object movement, while an undocked virtual object (or virtual objects docked to something other than that physical object) remain in place.

In response to receiving the second input, some disclosed embodiments may involve causing the change in the display of the second set of virtual objects and changing the display of the virtual object in a manner corresponding the movement of the item. Similar to the description above, since the second set of virtual objects are docked to the item (the movement of which constitutes the second input) the display of the second set of virtual objects change when the associated item moves. The change in the display of the second set of virtual objects may be proportional to the change in the movement of the item, as described earlier.

In some embodiments, the extended reality environment may include a virtual object associated with the second virtual plane and docked to the physical object. A virtual object may be docked to a physical object as described above. A virtual object may be located in a second virtual plane of an item. For example, a second virtual plane may be a virtual plane extending in a vertical direction. A virtual object may be located on a second virtual plane and located in a vertical direction. A virtual object may be connected to a physical object in a first virtual plane.

Some disclosed embodiments may involve, in response to receiving the first input, causing the change in the display of the first set of virtual objects and a change in a display of the virtual object in a manner corresponding the movement of the physical object. A first set of virtual objects and a virtual object may be located in different virtual planes. A display of a first set of virtual objects may be changed based on a movement of a physical object in a first virtual plane. A virtual object may be docked to the physical object and also move in the second virtual plane. Movement of the virtual object may be in the same manner as the physical object described above. For example, the physical object may move five inches. The first set of virtual objects may also move 5 inches. The virtual object may also move five inches due to the virtual object being docked with the physical object.

Some disclosed embodiments may involve, in response to receiving the second input, causing the change in the display of the second set of virtual objects in a manner corresponding the movement of the item while maintaining a position of the display of the virtual object. Since the virtual object is not docked to the item, when the second input is received, only the display of the docked second set of virtual objects may change, while the display of the undocked virtual object may not change. Similar to the description above, the virtual object may be located in the second virtual plane and docket to the physical object. The item and the second set of virtual objects may also be located in the second virtual plane. The item may move and cause a change in the second set of virtual objects, but may not cause a change in the virtual object. For example, an item may move five inches in an upward direction. The second set of virtual objects may also move five inches in an upward direction. The virtual object may not move due to the virtual object being docked with the physical object.

In some examples, an indication that a physical element is located at a particular location in the extended reality environment may be received. In some examples, image data captured using an image sensor included in the wearable extended reality appliance may be received. For example, the image data may be received from the image sensor, from the wearable extended reality appliance, from an intermediate device external to the wearable extended reality appliance, from a memory unit, and so forth. The image data may be analyzed to detect the physical element in the particular location in the extended reality environment. In another example, radar, Lidar or Sonar sensors may be used to detect the presence of the physical element at the particular location in the extended reality environment. In some examples, the change in the display of the second set of virtual objects in the manner corresponding the movement of the item may be selected based on the physical element being located in the particular location. In one example, maintaining the position of a particular virtual object of the second set of virtual objects on the second virtual plane may cause the particular virtual object to collide with the physical element, and in response the particular virtual object may be moved to a new position (for example, on the second virtual plane, outside the second virtual plane, etc.) so that the new position of the particular virtual object does not collide with the physical element, or the docking of the particular virtual element to the second virtual plane may be canceled or withheld. In another example, maintaining the position of the particular virtual object on the second virtual plane may cause the particular virtual object to be at least partly hidden by the physical element (which may be determined using ray casting algorithm), and in response the position of the particular virtual object on the second virtual plane may be changed so that at the new position the particular virtual object is not hidden (fully or partially) by the physical element, or the docking of the particular virtual element to the second virtual plane may be canceled or withheld.

Figure 68:
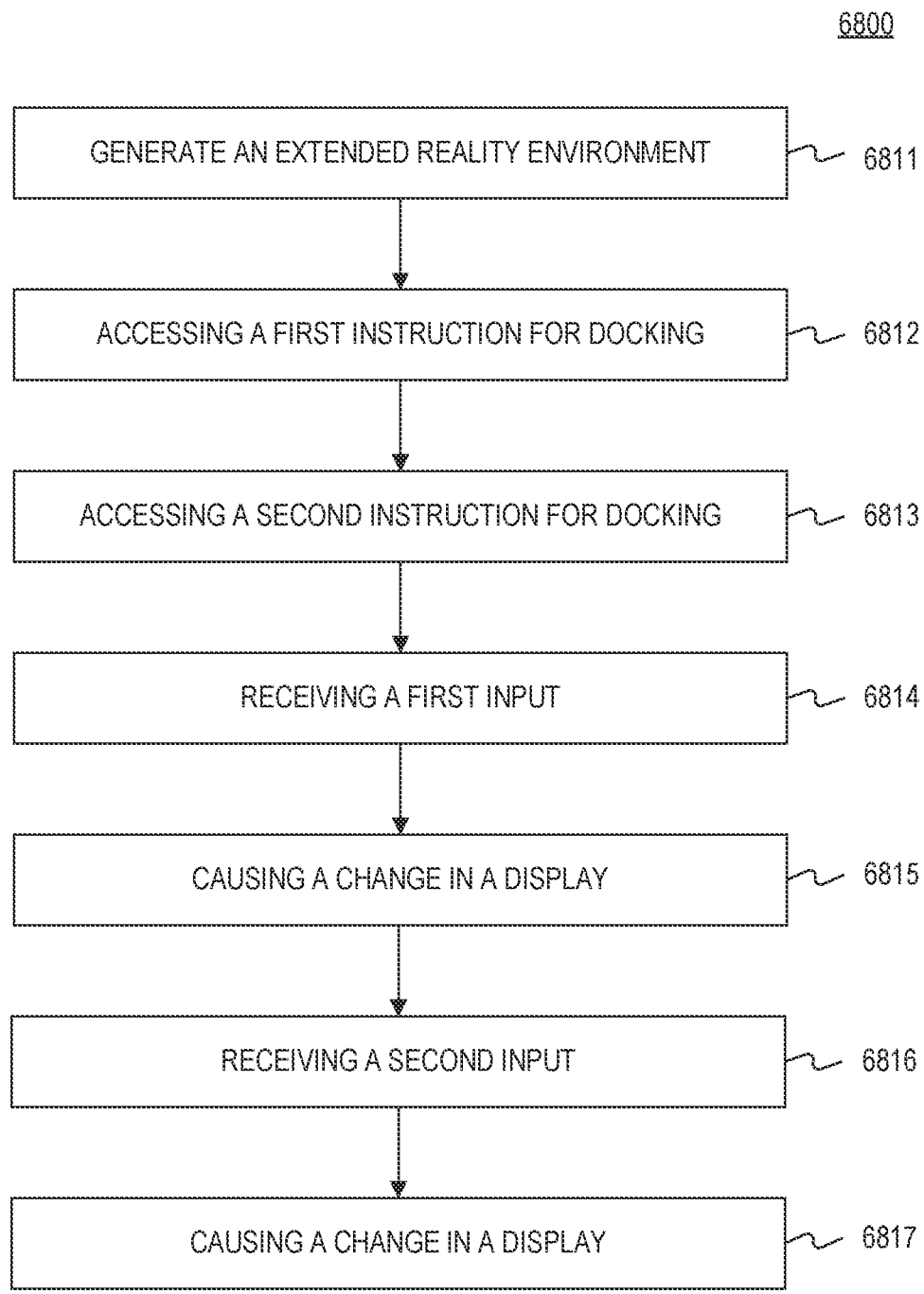
FIG. 68 illustrates a flow chart of an exemplary method that may be executed by a processor to perform operations for implementing selective virtual object display changes, consistent with some embodiments of the present disclosure.

FIG. 68 illustrates a flow chart of an exemplary method 6800 that may be executed by a processor to perform operations for implementing selective virtual object display changes. Method 6800 may include a step 6811 of generating an extended reality environment, wherein the environment includes a first virtual plane associated with a physical object and a second virtual plane associated with an item, the second virtual plane extending in a direction transverse to the first virtual plane. Method 6800 may also include a step 6812 of accessing a first instruction for docking a first set of virtual objects in first positions associated with the first virtual plane. Further, method 6800 may include a step 6813 of accessing a second instruction for docking a second set of virtual objects in second positions associated with the second virtual plane. Method 6800 may include a step 6814 of receiving a first input associated with a movement of the physical object. Method 6800 may include a step 6815 of causing a change in a display of the first set of virtual objects while maintaining the second set of virtual objects in second positions. Method 6800 may also include a step 6716 of receiving a second input associated with a movement of the item. Further, in some examples, method 6800 may include an optional step 6817 of causing a change in a display of the second set of virtual objects while maintaining the first positions of the first set of virtual objects.

Some embodiments involve determining a display configuration for presenting virtual content. Determining a display configuration may include determining operating parameters and instructions for configuring a display of virtual content. Consistent with these embodiments and as described below, the display configuration may be determined based on retrieved display settings associated with a particular input device and a value of at least one use parameter. The display configuration may include, for example, instructions related to the perspective from which virtual content is presented (e.g., viewing angle, size, position, and/or aspect ratio), instructions related to the presentation of virtual screens (e.g., a number of virtual screens, a size of a virtual screen, an orientation of a virtual screen, or a configuration of a border of a virtual screen), instructions related to the appearance of the virtual content (e.g., an opacity of the virtual content, a color scheme of the virtual content, or a brightness level of the virtual content), instructions related to the type of content being displayed (e.g., an operating system for the virtual content, a selection of startup applications, a selection of startup virtual objects, or a placement of the selected startup virtual objects in an extended reality environment), instructions related to the distance from the wearable extended reality appliance for presenting the virtual content and/or any other parameter relating to layout or configuration. Additional disclosure and examples of the display configuration are described below in greater detail.

Presenting the virtual content based on a display configuration may include displaying virtual content to a wearer of an extended reality appliance, according to determined display settings. In an example, presenting the virtual content based on a display configuration may include at changing default display settings. For example, changing least one or more of: the number of virtual screens, the color scheme, the operating system, the brightness level, the opacity level, the startup virtual objects, or other default display settings. In addition, the presentation may include the display of one or more applications, one or more operating systems, and/or one or more virtual objects which may be placed at one or more locations of the virtual content.

In some embodiments, the virtual content presented by the wearable extended reality appliance may include one or more virtual objects, such as virtual screens. A virtual screen (also referred to as a 'virtual display' or a 'virtual display screen' herein) may be a virtual object mimicking and/or extending the functionality of a physical display screen, as described above. In one example, each virtual screen may present a plurality of user interface elements, such as virtual windows, virtual widgets, or virtual cursors. In some embodiments, each virtual screen may be configured to display text, visual media, or applications, such as, webpages, videos, pictures, video games, file browsers, email clients, or web browsers. Consistent with aspects of the present disclosure, the presentation of the virtual content may be configured by display settings, for example, the default display settings.

Some embodiments may involve receiving image data from an image sensor associated with a wearable extended reality appliance. An image sensor may capture image data of the user's environment. In an example, the image sensor may be built in to the wearable extended reality appliance, for example, in the form of an integrated camera. In another example, the image sensor may be external to the wearable reality appliance, for example, an external webcam in communication with the wearable extended reality appliance. The image data may include, for example, an image of a physical area indicative of the user's visual field including representations of one or more animate or inanimate objects present in the visual field. Receiving image data may include a transfer of image data from an image sensor to a processing device. In one embodiment, a remote server (e.g., server 210 as depicted in FIG. 2) may receive the image data from the image sensor, and a wearable extended reality appliance may receive the image data from the remote server. Additionally, or alternatively, an input device (e.g., keyboard 104 as depicted in FIG. 1, or an input device integrated with a computing device) may receive the image data from the image sensor, and the wearable extended reality appliance may receive the image data from the input device. In some embodiments, the image data may be transmitted over a wireless network, such as Wi-Fi, Bluetooth, near-field communication, or cellular networks. In some embodiments, the image data may be transmitted over a wired network, such as LAN, or a USB connection.

In some embodiments, the wearable extended reality appliance may be configured to be paired with multiple input devices. Paring the wearable extended reality appliance with an input device may include establishing a relationship using a pairing mechanism between the wearable extended reality appliance with the input device. Upon pairing the input device to the wearable extended reality appliance, a user may modify the virtual content displayed by the wearable extended reality appliance using the input device. A paired connection may be a wired or wireless connection established between the wearable extended reality appliance and multiple input devices. In some embodiments, pairing a particular input device may include using a verification code for each input device to establish the connection. In an example, a particular input device may be an input device from among the multiple input devices. In an example, the wearable extended reality appliance may be paired with multiple input devices over a wireless network, such as Wi-Fi, Bluetooth, near-field communication, or cellular networks, or over a wired network, such as LAN, or a USB connection. In an example, the wearable extended reality appliance may be paired with multiple input devices over a wired network, such as LAN, or via USB connections.

The multiple input devices may include any type of physical devices configured to receive input from a user or an environment of the user, and to provide the data to a processing device associated with the wearable extended reality appliance. For example, the multiple input devices may include at least two or more of: keyboards, mice, styluses, controllers, touchscreens, or other devices that facilitate human-computer interaction. In some embodiments, the multiple input devices may include at least a first input device and a second input device. The first and second input devices may be of a same type, for example, the first and second input devices may both be keyboards. Alternatively, the first and second may be of differing types, for example, the first input device may be a keyboard, and the second input device may be a stylus. In some embodiments, the first and second input devices may be visually similar. For example, both the first and second input devices may have the similar color, dimensions, patterns, or other similar visual identifiers.

In some embodiments, each input device may be associated with default display settings. Default display settings may include one or more preconfigured values that define a configuration or state of a user interface. In some embodiments, default display settings may be stored on memory associated with each of the multiple input devices. In some embodiments, each input device may include default display settings unique to the input device's manufacturer or model. In some embodiments, the default display settings may be stored on memory on a remote server. Consistent with the example above, the first and second input devices may be associated with different default display settings. For example, the first input device may be associated with first default display settings, and the second input device may be associated with second default display settings. In one instance, at least some of the first default display settings may be different from the second default display settings.

In some embodiments, the default display settings may include a default distance from the wearable extended reality appliance for presenting the virtual content. The default distance may be a value, a set of values, or a range within virtual content may be presented to a user. Example default distances for presenting virtual content may include a range of distances between 0.5 meters (m) and 7 m. In one example, when the default distance is configured to be 1 m, the virtual content may initially be displayed at 1 m from the wearable extended reality appliance, and even when the wearable extended reality appliance moves the distance between the wearable extended reality appliance and the virtual content remains 1 m. In another example, the virtual content may initially be displayed at 1 m from the wearable extended reality appliance, but when the wearable extended reality appliance moves the distance between the wearable extended reality appliance and the virtual content changes accordingly.

In some embodiments, the default display settings may include at least one of a default number of virtual screens, a default size of a virtual screen, a default orientation of a virtual screen, or a default configuration of a border of a virtual screen. The default number of virtual screens may be a default or preconfigured number of virtual screens simultaneously displayed on startup or at a later time. An example number of virtual screens may include a number in a range between 1 and 5 virtual screens. A greater number of virtual screens is also contemplated. The default size of a virtual screen may be a default or preconfigured diagonal dimension of a virtual screen. Example virtual screen sizes may be a range of dimensions between 6" and 300". In some embodiments, the default size may be different for each virtual screen. The default orientation may a default or preconfigured orientation of each virtual screen. Example default orientations include portrait or landscape orientations. In an example, each virtual screen may have a different default orientation. In some embodiments, the default orientation of each virtual screen may be rotated by an offset from a portrait or landscape orientation. For example, a default orientation may be rotated by 30, 45, or 60 degrees from an initial orientation, such as a landscape orientation. In other embodiment, the default orientation of each virtual screen may be indicative of the pitch angle, the yaw angle, and roll angle of each virtual screen. In example, the default number of screens may be two, the default size of the first virtual horizontal screen is 40" and the default size of the second virtual screen in 20".

In some embodiments, the default display settings may include a default selection of an operating system for the virtual content. The default selection of an operating system may be a default or preconfigured selection of one or more operating systems associated with the wearable extended reality appliance. Examples of operating systems may include Microsoft Windows®, Apple MacOS®, Android®, Linux®, UNIX®, and more. In some embodiments, the default selection may be based on operating system stability, user's preference, application compatibility, or boot order. In some embodiments, each virtual screen may present a different operating system.

In some embodiments, the default display settings may include a default selection of startup applications. The default selection of startup applications may be a selection of one or more startup applications. Example startup applications include operating system processes, such as, a kernel, window manager, or network drivers. Additionally, or alternatively, example startup applications may include programs, such as, web browsers, word processors, email clients, chat clients, weather widgets, messaging widgets, other virtual widgets, or other executable applications. In some embodiments, each virtual screen may present a different startup application.

In some embodiments, the default display settings may include a default selection of startup virtual objects. The default selection of startup virtual objects may be a selection of one or more virtual objects. Example virtual objects include, virtual cursors, virtual windows, virtual widgets, applications, or other virtual user interface elements. In some embodiments, each virtual screen may present a different virtual object. In other embodiments, the virtual objects may be presented outside the virtual screen. As illustrated in FIG. 1, virtual widgets 114A-114D may be displayed next to virtual screen 112 and virtual widget 114E may be displayed on table 102. The default selection of startup virtual objects may include a selection of the type of virtual objects and their initial placement in the extended reality environment.

In some embodiments, the default display settings may include a default placement of the selected startup virtual objects in an extended reality environment. The default placement of the startup virtual objects may be a preconfigured arrangement or location of one or more startup virtual objects within extended reality environment, e.g., within each virtual screen. Example placements include a specific coordinate, proximity to a virtual screen boundary, or a center of the virtual screen. In some embodiments, the default placement of the startup virtual objects may be relative to a location of a physical object (e.g., keyboard 104) or relative to a location of the wearable extended reality appliance. For example, virtual widget 114E may be default placed right to keyboard 104 and on the same surface.

In some embodiments, the default display settings may include a default opacity of the virtual content. The opacity of the virtual content may be a measure of translucency of the virtual content. The default opacity may be between a range from 1% to 100%. In one example, 100% opacity may represent an opacity value of the virtual content where less than 10% of environmental light passes through the virtual content. In another example, 100% opacity may represent an opacity value of the virtual content where less than 5% of environmental light passes through the virtual content. In another example, 1% opacity may represent an opacity value of the virtual content where greater than 90% of environmental light passes through the virtual content. In some embodiments, the default opacity may be different for each virtual object of the virtual content.

In some embodiments, the default display settings may include a default color scheme of the virtual content. A default color scheme may be a preconfigured coordinated selection of colors for aesthetic or informational appeal. A default color scheme may be at least one of: monochromatic, achromatic, complementary, split-complementary, analogous, triadic, tetradic, or polychromatic. In some embodiments, the default color scheme may be selected to overcome a user's visual impairment. In some embodiments, each color scheme may include one or more color palettes. In some embodiments, the default color scheme may be different for each virtual object of the virtual content.

In some embodiments, the default display settings may include a default brightness level of the virtual content. The default brightness may be a preconfigured luminance value. The default brightness may be a value between a range from 1% to 100%. In some embodiments, the default brightness may be a value between a range from 10 nits to 2000 nits. In an example, 100% brightness may correspond to about 2000 nits. In another example, 100% brightness may correspond to about 200 nits. In an example 1% brightness may correspond with 10 nits. In another example, 1% brightness may correspond to 40 nits. In some embodiments, the default brightness may be different for each virtual object of the virtual content.

In some embodiments, the default display settings may be retrieved from the memory. The memory that stores the default display settings may be included in any of the component of system 200 depicted in FIG. 2. For example, the default display settings may be retrieved from server 210, via a download over communications network 214. In some embodiments, the default display settings may be retrieved from the memory of input unit 202 via a direct wireless connection, such as an NFC or Bluetooth connection, between the wearable extended reality appliance and input unit 202. In yet another example, the default display settings may be retrieved from the memory of input unit 202 via a wired connection, such as a USB or LAN connection, between the wearable extended reality appliance and input unit 202. In some embodiments, the default display settings may be retrieved from memory associated with XR unit 204.

Some embodiments may involve analyzing the image data to detect a particular input device placed on a surface. The analysis of image data may include any image processing methods disclosed herein. For example, the analysis of image data may include at least one of: object detection, image segmentation, object recognition, or pattern recognition. Consistent with aspects of the present disclosure, detecting the particular input device may involve performing a lookup in a repository of input devices to identify which input device is currently being used by the user of the wearable extended reality appliance. The repository of input devices may refer to a data storage containing, for example, a table of input devices (e.g., input devices associated with the user of the wearable extended reality appliance) and corresponding default display settings associated with the particular input device. For example, each input device indicated in the table may have a corresponding default display setting stored in the table. In one example, the repository may be implemented based on or in a similar manner as data structure 212. In another embodiment, the analysis may include identify, in the image data, the surface on which the particular input device is placed. A surface may be a physical surface, such as a table, floor, countertop, coaster, tablemat, mousepad, or other surfaces capable of accommodating an input device. The type of surface on which the particular input device is placed may change the default display settings. For example, when keyboard 104 is placed on a work desk the wearable extended reality appliance may present virtual content according to a first display configuration, and when keyboard 104 is placed on a kitchen counter the wearable extended reality appliance may present virtual content according to a second display configuration Some embodiments may involve analyzing the image data to identify an object in a vicinity of the particular input device. In a manner similar to identifying the particular input device and the surface on which it is placed, the image data may be analyzed to identify other objects. The other objects may be physical objects such as, other input devices, coffee mugs, computing devices, mobile devices, QR code, barcodes, light emitters, markers, or display devices. A vicinity may be a distance or radius from the particular input device to the object. Example radii or distances may be between 1 cm to 10 m. In an example, the object may be located on the particular input device. In another example, the particular input device may be placed on the object. In some examples, the image data may be analyzed using at least one of an object detection algorithm, an object recognition algorithm or a semantic segmentation algorithm to identify the object.

Some embodiments may involve determining that the particular input device is the first input device and not the second input device based on the identification of the object in the vicinity of the particular input device. In an example, the image data may include a first object within the vicinity of the particular input device, where the first object is associated with a first input device. The image data may also include a second object within a vicinity of another input device, where the second object is associated with a second input device. In a manner similar to identifying an object in the vicinity of a particular input device, discussed above, the image data may be analyzed to identify one or more objects. Upon detecting that the first object is within the vicinity of the particular input device, the particular input device may be identified as a first input device and not a second input device. For example, if a QR code is associated with a first input device and located on a keyboard, and a coffee mug associated with a second input device is within the vicinity of a tablet, the image analysis may determine that the keyboard (e.g., the particular input device) is the first input device and not the second input device. In one example, it may be known that the first input device is placed on a large desk and that the second input device is placed on a smaller desk. The object may be the desk that the particular input device is placed on. Measurements of the object (e.g., the desk that the particular input device is placed on) may be determined by analyzing the image, for example using a regression algorithm or a semantic segmentation algorithm. The determined measurements may be compared with known measurements of the large desk and the smaller desk. Based on a result of the comparison, the desk may be identified as the large desk or the small desk, and thereby the particular input device may be identified as the first input device, the second input device, or a completely different input device.

Figure 69:
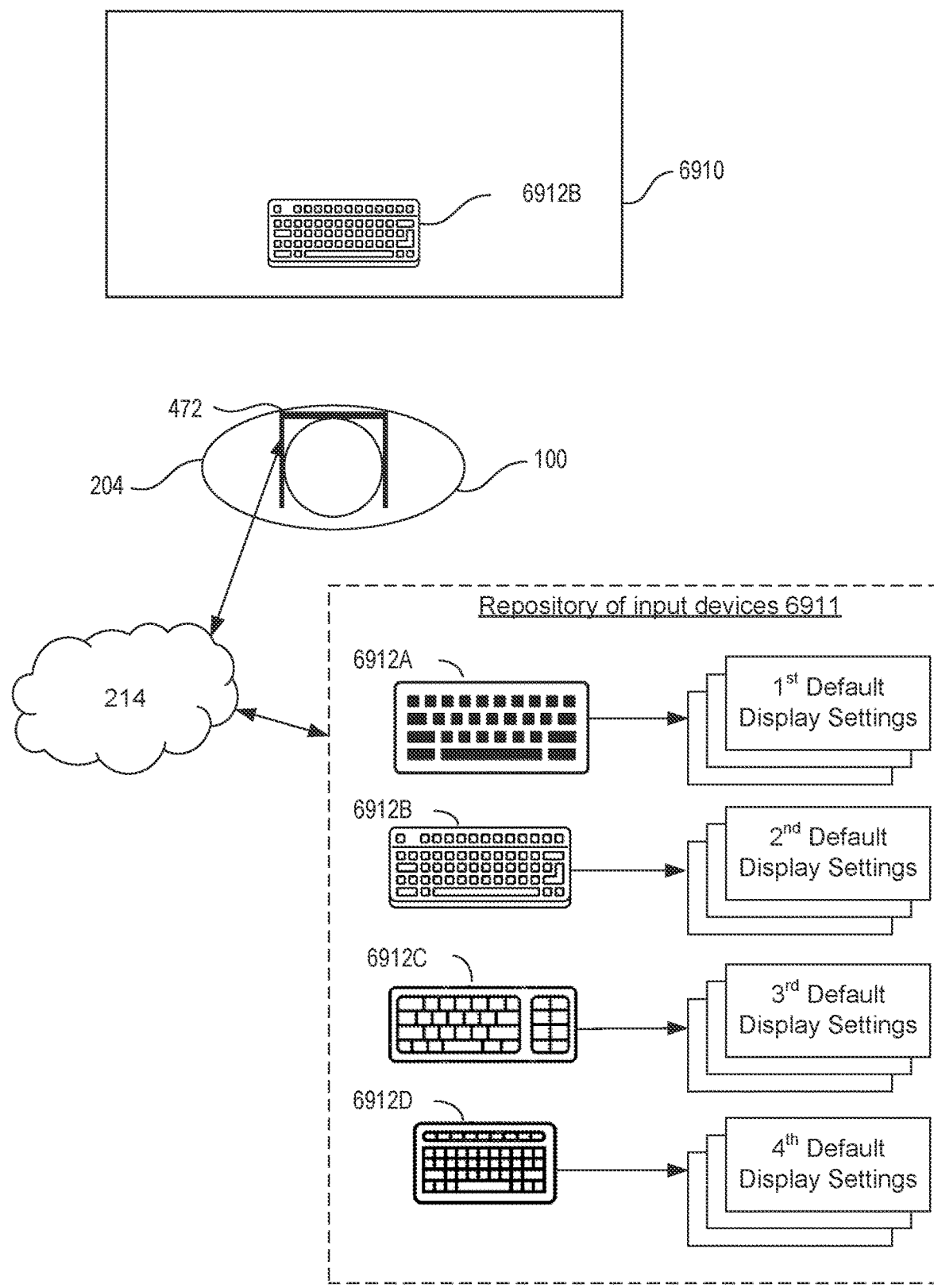
FIG. 69 shows a schematic illustrating an exemplary wearable extended reality appliance system, consistent with some embodiments of the present disclosure.

FIG. 69 is an exemplary illustration of a user using a wearable extended reality appliance. As illustrated in FIG. 69, user 100 may operate XR unit 204, which includes image sensor 472. In this example, the user 100 may wear XR unit 204 during operation. The image sensor 472 may be detect or identify a surface 6910 and an input device 6912 located on the surface 6910. The image sensor 472 may capture an image including surface 6910 and input device 6912 for analysis. A processing device of system 200 may analyze the captured image and identify the particular input device input device 6912B using repository of input devices 6911. Input device 6912B is associated with a specific set of default display settings. Repository of input devices 6911 may be accessible via communications network 214, as depicted in the figure or stored in XR unit 204.

Some embodiments may involve determining a value of at least one use parameter for the particular input device. Determining a value of use parameter may include analyzing data from one or more sensors and assigning a value to the use parameter based on the analyzed data. A use parameter may include any characterizing property of the session with wearable extended reality appliance. The use parameters may include one or more of ergonomic parameters, environmental parameters, or input device parameters. In some embodiments, ergonomic parameters may be indicative of a user's posture or behavior. Example values of ergonomic parameters may include sitting, kneeling, standing, walking, running, dancing, crawling, conversing, gaming, exercising, slouching, bending, stretching, typing, reading, or other activities. Example values of environmental parameters may include the weather, the time of day, the day of week, lighting conditions, temperature, distances to objects in the environment, noise levels, aromas, a distance between a particular input device and the wearable extended reality appliance, or other sensory parameters associated with the environment. Example values of input device parameters may include battery charge data, device identifiers, pairing status, or other device information.

In some embodiments, the value of at least one use-parameter may be determined by analyzing data received from input devices, ambient sensors, positional sensors, accelerometers, gyroscopes, microphones, image sensors, or other sensors. In an example, data from accelerometers, gyroscopes, or other positional sensors may be analyzed to determine a value of a user's posture or behavior. In an example, data from ambient sensors, image sensors, positional sensors, microphones, or other environmental sensors may be used to determine a value of an environmental parameter. In an example, data from input devices, image sensors, positional sensors, microphones, or other input device sensors may be used to determine a value of an input device parameter.

Some embodiments may involve determining the value of the at least one use parameter for the particular input device based on at least one of an analysis of the image data, data received from the particular input device, or data received from the wearable extended reality appliance. In some embodiments, the analysis of the image data in combination with data from sensors located on the wearable extended reality appliance, such as a motion sensor, environmental sensor, audio sensor, weight sensor, light sensor, distance sensor, resistive sensor, LIDAR sensor, ultrasonic sensor, proximity sensor, and/or biometric sensor, may be used to compute a distance between the wearable extended reality appliance and the particular input device. In some embodiments, the analysis of the image data in combination with data from sensors located on the particular input device, such as those listed above may be used to compute a distance between the wearable extended reality appliance and the particular input device.

In an example, proximity sensors may record distance data and an image sensor may capture image data. The analysis of the distance data and image data may be used to compute a distance between the wearable extended reality appliance and the particular input device. The distance data may be as a calibration or standard for distances derived from analysis of the image data, thereby allowing improving the accuracy of distances computed from the image data, as opposed to the image data alone.

Some embodiments may involve retrieving from memory default display settings associated with the particular input device. In one embodiment, the default display settings associated with the particular input device may be retrieved from the memory of input unit 202. For example, the default display settings may be retrieved via a direct wireless connection, such as an NFC or Bluetooth connection, between the wearable extended reality appliance and input unit 202. In yet another example, the default display settings may be retrieved from the memory of input unit 202 via a wired connection, such as a USB or LAN connection, between the wearable extended reality appliance and input unit 202. In another embodiment, the default display settings associated with the particular input device may be retrieved from memory associated with XR unit 204. In yet another embodiment, the default display settings associated with the particular input device may be retrieved from memory associated with server 210.

Some embodiments may involve determining whether the particular input device is a home keyboard or a workplace keyboard. The determination of whether the particular input device is a home keyboard or a workplace keyboard may be based on at least one of: device information, verification codes, such as the visual code or light emitter, visual appearance of the particular input device based on analysis of image data, location of the wearable extended reality appliance, time of day, day of the week, or input device utilization. A workplace keyboard may be an input device that is associated with the user's place of employment. A home keyboard may be an input device that is associated with the user's domicile. In response to a determination that the particular input device is a home keyboard, some embodiments may include retrieving from the memory first default display settings. For example, by reference to FIG. 69, input device 6912B may be determined to be a home keyboard. In response to a determination that the particular input device is a workplace keyboard, some embodiments may include retrieving from the memory second default display settings. For example, by reference to FIG. 69, keyboard 6912C may be determined to be a workplace keyboard. In some embodiments, the second default display settings differing from the first default display settings. For example, the second default display settings may include a selection of startup applications that are associated with workplace activities, such as productivity software, development software, VPN, or other workplace applications. The first default display settings may include a selection of startup applications associated with a user's domestic activities, such as video streaming services, music streaming services, smart home applications, video games, messaging services (e.g., video chat, SMS, phone calls, instant messaging), or other non-workplace applications. In some embodiments, the selections need not be mutually exclusive, in other words, some applications may overlap, such as web browsers and VPNs. In some embodiments, each selection of startup applications may be configured for a user's workplace and/or domestic activities. In some embodiments, the second default display settings may be adjusted for a user's workplace environment, which may be different from a user's domicile. For example, if a user works in a dimly lit underground research laboratory, but lives in a brightly-lit home, the brightness and opacity settings in the second default settings may differ from the first default display settings to improve visual clarity of the presented virtual content.

Some embodiments may involve determining whether the particular input device is a private keyboard or a public keyboard. The determination of whether the particular input device is a private keyboard or a public keyboard may be based on at least one of: device information, pairing codes, such as the visual code or light emitter, visual appearance of the particular input device based on analysis of image data, location of the wearable extended reality appliance, time of day, day of the week, or input device utilization. A private keyboard may be an input device that is owned by the user or associated with the user's personal property. A public keyboard may be an input device that is owned and provided by another party to the user. In some embodiments, a public keyboard may be a keyboard accessible by other users (e.g., a communal keyboard). In response to a determination that the particular input device is a private keyboard, some embodiments may include retrieving from the memory first default display settings.

In response to a determination that the particular input device is a public keyboard, some embodiments may include retrieving from the memory second default display settings.

In some embodiments, the second default display settings differing from the first default display settings.

For example, the second default display settings may include a selection of startup applications that are associated with public activities, such as productivity software, development software, communications software, VPN, or other collaboration applications. The first default display settings may include a selection of startup applications associated with a user's private activities, such as video streaming services, music streaming services, smart home applications, video games, or other non-collaborative applications. In some embodiments, the selections need not be mutually exclusive, in other words, some applications may overlap, such as web browsers or productivity software. In some embodiments, each selection of startup applications may be configured for a user's public and/or private activities. In another example, the second default display settings may be adjusted for a communal keyboard. For example, if a keyboard for a publicly accessible computer (e.g., in a public library) is detected, an automatic logoff countdown timer may be among the selection of startup applications of the second default display settings. In contrast, if a user's personal laptop keyboard is detected in a public space (e.g., a coffee shop), the automatic logoff countdown timer may not be among the selection of startup applications of the first default display settings.

Some embodiments may involve determining whether the particular input device is a keys-based keyboard or a touch screen-based keyboard. The determination of whether the particular input device is a keys-based keyboard or a touch screen-based keyboard may be based on at least one of: device information, pairing codes, such as the visual code or light emitter, visual appearance of the particular input device based on analysis of image data, location of the wearable extended reality appliance, time of day, day of the week, or input device utilization. A keys-based keyboard may be an input device that includes and utilizes physical keys as the primary means of input, for example, a traditional keyboard. A touch-based keyboard may be an input device that includes and utilizes virtual keys as the primary means of input, for example, an on-screen keyboard.

In response to a determination that the particular input device is a keys-based keyboard, some embodiments may include retrieving from the memory first default display settings. In response to a determination that the particular input device is a touch screen based keyboard, some embodiments may include retrieving from the memory second default display settings. In some embodiments, the second default display settings differ from the first default display settings. In some embodiments, the second default display settings may be adjusted for a keys-based keyboard, which may be different from a touch screen based. For example, if a keys-based keyboard is detected, the brightness and opacity settings in the first default settings may be decreased to improve visual clarity of the presented virtual content and the keys-based keyboard. In contrast, if a touchscreen-based keyboard is detected, the brightness and opacity settings in the first default settings may be increased to count for the touch screen's brightness and to improve visual clarity of the presented virtual content and the touchscreen-based keyboard.

Some embodiments involve determining a display configuration for presenting virtual content based on the value of the at least one use parameter and the retrieved default display settings. Determining the display configuration may include determining an arrangement of the presentation virtual content according to display settings and the value of the at least one use parameter, or determining a modification of the default display settings associated with the particular input device based on the value of the at least one use parameter. Accordingly, the combination of the retrieved default display settings and the value of at least one use parameter may be used to determine a display configuration. In an example, a display configuration associated with a use parameters, such as low battery status data from an input device, may include modification of some of the default display settings, for example, a changed color scheme, a modified selection of virtual objects, modified startup applications, or other modifications associated with a low battery status data on an input device. The presentation of the virtual content may be performed in a manner similar to that of presenting the virtual content, as discussed earlier.

Consistent with some embodiments, determining the display configuration may include modifying the retrieved default display settings based on the value of the at least one use parameter. For example, if a value of a use parameter indicates that an input device has a low battery, the retrieved default display settings may be modified to lower the brightness of the virtual content. In another example, if a value of a use parameter indicates that an input device has a low battery, the default display settings may be modified to present a battery monitor associated with the input device as a startup application. In another example, if a value of a use parameter indicates that the wearable extended virtual reality appliance is operating in bright lighting conditions, the retrieved default display settings may be modified to increase the opacity of the virtual content. In another example, if a value of a use parameter indicates a sitting user posture, the default display settings may be modified to present a selection a startup application associated with the user's workplace. In another example, if a value of a use parameter indicates a walking user posture, the retrieved default display settings may be modified to decrease the opacity of the virtual content, thereby allowing the user to see where they are walking.

Some embodiments may involve determining the display configuration based on the value of the at least one use parameter, the default display settings, and at least one environmental parameter. For example, if a value of a use parameter indicates a user sitting in bright light conditions, the retrieved default display settings may be modified to increase the opacity of the virtual content. In another example, if a value of a use parameter indicates that an input device has a low battery and the environmental parameter indicates that the input device is not near a charging station, the display configuration may be modified to present a battery monitor associated with the input device as a startup application.

In some embodiments, when the at least one use parameter is reflective of a distance of the particular input device from the wearable extended reality appliance, as discussed earlier, some embodiments may include determining a first display configuration when the distance is greater than a threshold. As discussed earlier, analysis of image data and sensor data of the wearable extended reality appliance may be used to determine a distance between the wearable extended reality appliance and the particular input device. When the distance is determined to be more than a threshold distance, for example one meter, away from a particular input device, the virtual content may be presented using a first display configuration. In an example, if the user walks more than 1 meter away from their workplace keyboard, the presented virtual content may be re-arranged such that work related virtual screens are not presented. Some embodiments may include determining a second display configuration when the distance is less than the threshold. When the distance is determined to be less than a threshold distance, for example one meter, away from a particular input device, the virtual content may be presented using the second display configuration. In an example, if the user walks to within one meter of their workplace keyboard, the virtual content may be re-arranged such that work related virtual screens are presented. In some embodiments, the second display configuration differs from the first display configuration as discussed above.

In some embodiments, when the at least one use parameter is reflective of a posture of a user of the wearable extended reality appliance, as discussed earlier, some embodiments may include determining a first display configuration when a first posture is identified. As discussed earlier, sensor data of the wearable extended reality appliance may be used to determine one or more postures of a user wearing the wearable extended reality appliance. When a first posture is identified, for example sitting, the virtual content may be presented using a first display configuration. In an example, if the user is identified as sitting at a workplace, virtual content may be arranged such that work related virtual screens and applications are presented.

Some embodiments include determining a second display configuration when a second posture is identified. When a second posture is identified, the virtual content may be presented according to a second display configuration. In an example, if the user is identified as conversing (e.g., in a conversation), virtual content may be re-arranged such that work related virtual screens and applications are not presented. In some embodiments, the second display configuration differs from the first display configuration, as discussed earlier.

In some embodiments, when the at least one use parameter is reflective of a type of the surface on which the particular input device is placed, as discussed earlier, some embodiments may include determining a first display configuration when a first type of the surface is identified. When a first type of surface is identified, the virtual content may be presented using the determined first display configuration. In an example, a user places their keyboard on a bed, virtual content may be arranged such that entertainment related virtual screens and applications are presented.

Some embodiments may involve determining a second display configuration when a second type of surface is identified. When a second type of surface is identified, the virtual content may be presented using the determined second display configuration. In an example, if a user places their keyboard on a desk, virtual content may be arranged such that productivity related virtual screens and applications are presented. In some embodiments, the second display configuration differs from the first display configuration, as discussed earlier.

In some embodiments, when the at least one use parameter is reflective of battery-charge data associated with the particular input device, as discussed earlier, some embodiments, may include determining a first display configuration when the particular input device operates on batteries. When battery charge data indicates that the particular input device is in a discharging state (e.g., running on battery power or not connected to an external power source), the virtual content may be presented using the determined first display configuration. In an example, if the wearable extended reality appliance is paired with a tablet running on battery power, virtual content may be arranged such that battery monitoring information related the tablet are included in the presentation of the virtual content.

Some embodiments may involve determining a second display configuration when the particular input device is connected to an external power source. When battery charge data indicates that the particular input device is in a charging or charged state (e.g., not running on battery power or connected to an external power source), the virtual content may be presented using the determined second display configuration. In an example, if the wearable extended reality appliance is paired with a tablet connected to a wall outlet, the virtual content may be arranged such that battery monitoring information related the tablet are not included in the presentation of the virtual content. In some embodiments, the second display configuration may differ from the first display configuration.

Some embodiments include causing a presentation of the virtual content via the wearable extended reality appliance according to the determined display configuration.

The presentation of the virtual content may be caused by the determination of a display configuration. The presentation of the virtual content according to a determined display configuration may be executed in a manner similar to presenting the virtual content, as discussed earlier. The determination of a display configuration may change the presentation of the virtual content in a variety of ways.

For example, the display configuration may arrange the virtual content such that no content is displayed in the center of the screen while a user wearing the wearable extended reality appliance is in a conversation. Additionally, environmental sensor may detect the lighting conditions and modify the display configuration to adjust the default virtual content's brightness and/or opacity included in the display settings associated with the particular input device for improved visual fidelity of the virtual content.

In another example, the display configuration may modify the virtual content such that informational map content (e.g., points of interest, business information, customer reviews, commute information) is displayed in the center of the screen while a user is walking while wearing the wearable extended reality appliance. The indication that the user is walking is use parameter and the inclusion of the informational map is change in the default display settings associated with the particular input device. Additionally, environmental sensor may detect the lighting conditions and modify the display configuration to adjust the virtual content's brightness and/or opacity for improved visual fidelity of the virtual content.

Figure 70:
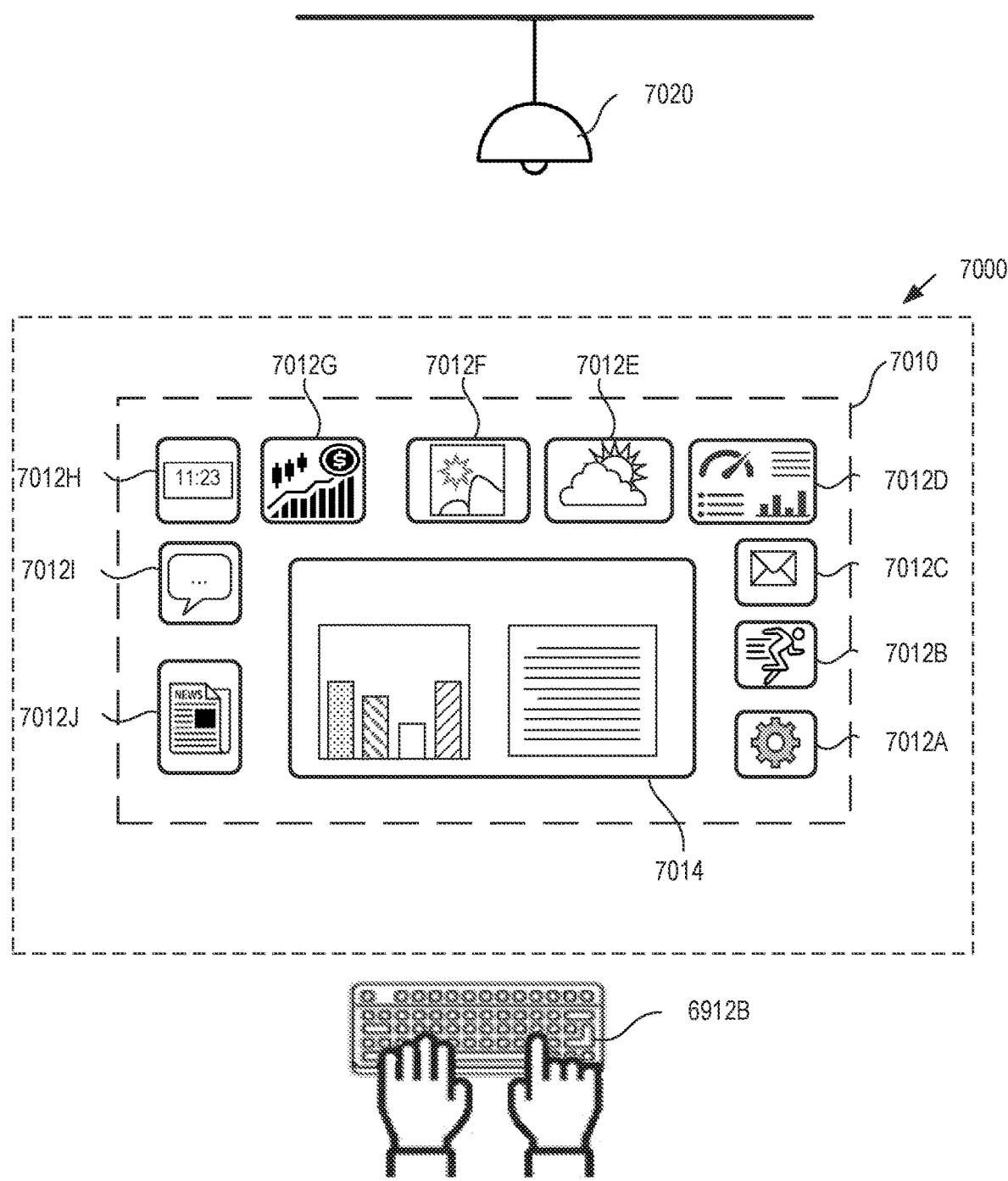
FIG. 70 shows a schematic illustrating an exemplary display configuration, consistent with some embodiments of the present disclosure.

FIG. 70 is an exemplary illustration of a display configuration presented to a user of a wearable extended reality appliance. As illustrated in FIG. 70, XR unit 204 may determine a display configuration 7000 and present virtual content 7010 based on the value of the at least one use parameter (e.g., associated with the amount of light emitted from lamp 7020) and the retrieved default display settings (e.g., associated with particular input device input device 6912B). In this example, a user sitting at their home desk with his or her home keyboard may be presented a display configuration where the virtual content 7010 includes an arrangement of widgets 7012A-7012J around an application 7014. The widgets 7012A-7012J include a settings widget 7012A, a fitness application 7012B, a mail client 7012C, a system monitor 7012D, a weather application 7012E, a photo viewer 7012F, a stock tracker 7012G, a time utility 7012H, a messaging client 7012I, and a news application 7012J.

FIG. 71 is an exemplary illustration of a display configuration presented to a user of a wearable extended reality appliance. As illustrated in FIG. 71, XR unit 204 may determine a display configuration 7100 and present virtual content 7110 based on the value of the at least one use parameter (e.g., associated with the amount of light emitted from lamp 7120) and the retrieved default display settings (e.g., associated with particular input device input device 6912A). In this example, a user sitting at their workplace desk with his or her workplace keyboard may be presented a display configuration where the virtual content 7110 includes an arrangement of widgets 7112A-7112D around an application 7114. The widgets 7112A-7112D include a settings widget 7112A, a mail client 7112B, a messaging client 7112C, and a weather utility 7112D.

Some embodiments may involve pairing the particular input device to the wearable extended reality appliance. The particular input device may include at least one of: keyboards, mice, styluses, controllers, touch screens, or other devices that facilitate human-computer interaction. The pairing may be performed in a manner similar to paring multiple devices, as discussed earlier.

Some embodiments may involve accessing stored information associating the multiple input devices with different default display settings. The stored information associating multiple input devices with different default display settings may be accessed from a remote server, via a download over a network. In some embodiments, the stored information may be accessed from the memory of the input device via a direct wireless connection, such as an NFC or Bluetooth connection, between the wearable extended reality appliance and the input device. In yet another example, the stored information may be accessed from the memory of the input device via a wired connection, such as a USB or LAN connection, between the wearable extended reality appliance and the input device. In some embodiments, the stored information may be accessed from memory associated with the wearable extended reality appliance.

Some embodiments may involve retrieving from the accessed stored information and the default display settings associated with the paired particular input device. The default display settings associated with the paired particular input device may be retrieved from the accessed stored information on a remote server, via a download over a network. In some embodiments, the default display settings associated with the paired particular input device may be retrieved from the stored information on memory of the input device via a direct wireless connection, such as an NFC or Bluetooth connection, between the wearable extended reality appliance and the input device. In yet another example, the default display settings associated with the paired particular input device may be retrieved from the stored information on memory of the input device via a wired connection, such as a USB or LAN connection, between the wearable extended reality appliance and the input device. In some embodiments, the default display settings associated with the paired particular input device may be retrieved from the stored information on memory associated with the wearable extended reality appliance.

In some embodiments, the pairing of the particular input device to the wearable extended reality appliance is based on a detection of a visual code depicted in the image data. In some embodiments, the verification code may be a visual code. The visual code may include at least one of: a barcode, QR code, an alphanumeric access code, or any other unique visual indicator. In an example, the visual code may be detected or identified using image analysis of the image data. Upon detection, the visual code may cause the wearable extended reality appliance to execute one or more instructions to enable pairing of the particular input device to the wearable extended reality appliance. In some embodiments, the visual code may be in the vicinity of the particular input device. For example, the visual code may be within a predetermined distance of the particular input device. The predetermined distance may be a range of distances between 1 mm and 2 m. In some embodiments, the visual code may be located on the particular input device. The pairing of the particular input device to the wearable extended reality appliance may be similar to that of pairing multiple input devices to the wearable extended reality appliance discussed earlier. In an example, the wearable extended reality appliance may be paired with a particular input device over a wireless network, such as Wi-Fi, Bluetooth, near-field communication, or cellular networks. In an example, the wearable extended reality appliance may be paired with a particular input device over a wired network, such as LAN, or a USB connection.

In some embodiments, the pairing of the particular input device to the wearable extended reality appliance is based on a detection of light emitted by a light emitter included in the particular input device and captured by a sensor included in the wearable extended reality appliance. A light emitter may include at least one of: a LED, IR emitter, UV light emitter, a monochromatic light emitter, an incandescent bulb, a fluorescent bulb, neon light tubes, or other artificial light emitters. Detection of the light emitter may include image analysis of image data that includes the light emitter. Upon detection, the wearable extended reality appliance may execute one or more instructions to enable pairing of the particular input device to the wearable extended reality appliance. In some embodiments, the light emitter may be in the vicinity of the particular input device. For example, the light emitter may be within a predetermined distance of the particular input device. The predetermined distance may be a range of distances between 1 mm and 2 m. In some embodiments, the light emitter may be located on the particular input device. The pairing of the particular input device to the wearable extended reality appliance may be similar to that of pairing of the particular input device to the wearable extended reality appliance is based on a detection of a visual code depicted in the image data discussed earlier.

Figure 72:
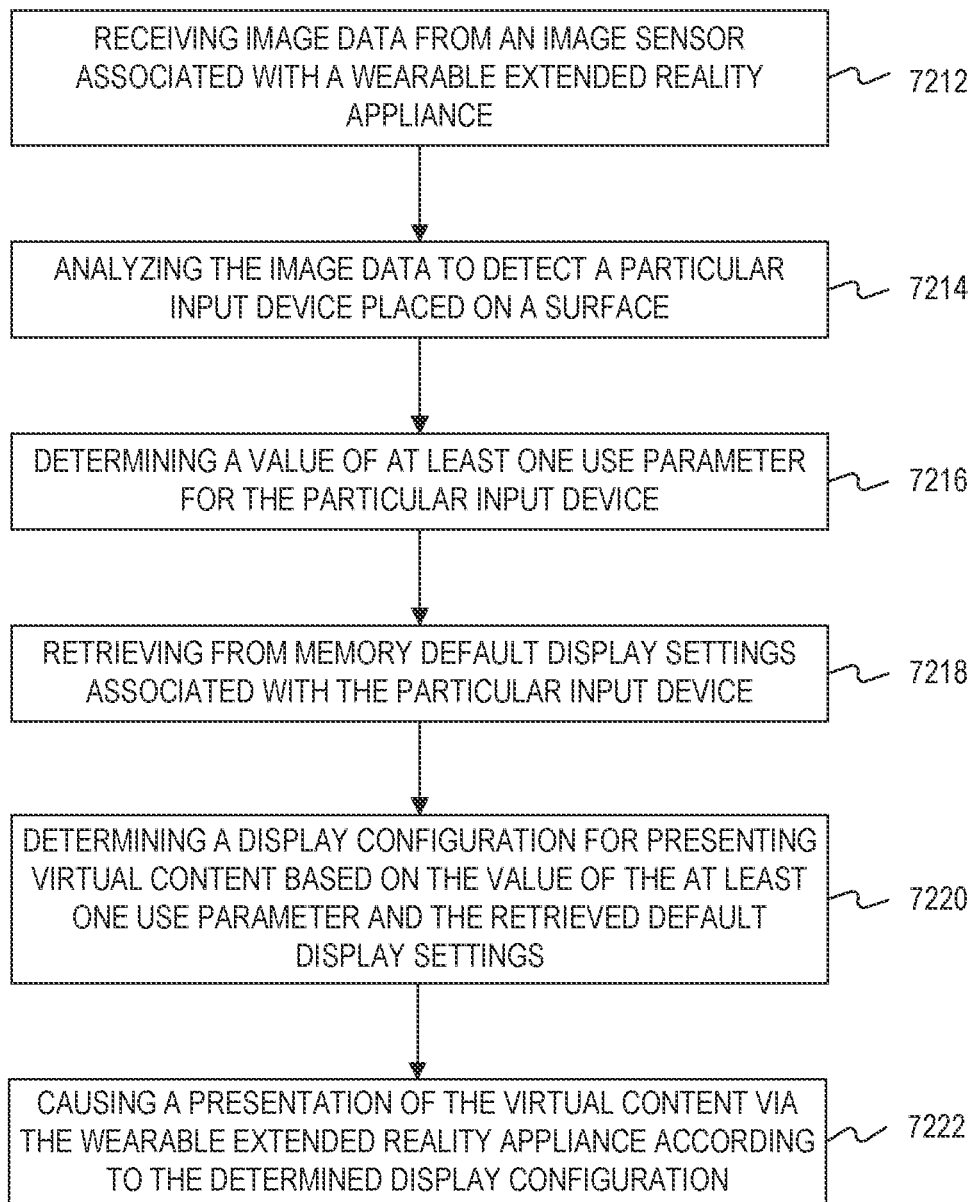
FIG. 72 shows a flowchart illustrating an exemplary process for determining a display configuration for presenting virtual content, consistent with some embodiments of the present disclosure.

FIG. 72 provides a flowchart of an example method 7200 for determining a display configuration for presenting virtual content executed by a processing device of system 200 as illustrated in FIG. 2. The processing device of system 200 may include a processor within a mobile communications device (e.g., a mobile communications device 206), a processor within a server (e.g., server 210), a processor within a wearable extended reality appliance, or a processor within an input device associated with a wearable extended reality appliance (e.g., keyboard 104). It will be readily appreciated, that various implementations are possible and that any combination of components or devices may be utilized to implement the example method. It will also be readily appreciated that the illustrated method can be altered to modify the order of steps, delete steps, or further include additional steps, such as steps directed to optional embodiments. In step 7212, method 7200 may include receiving image data from an image sensor associated with a wearable extended reality appliance. In step 7214, method 26-2-00 may include analyzing the image data to detect a particular input device placed on a surface. In step 7216, method 26-2-00 may include determining a value of at least one use parameter for the particular input device. In step 7218 method 7200 may include retrieving from memory default display settings associated with the particular input device. In step 7220, method 7200 may include determining a display configuration for presenting virtual content based on the value of the at least one use parameter and the retrieved default display settings. In step 7222, method 7200 may include causing a presentation of the virtual content via the wearable extended reality appliance according to the determined display configuration.

Some disclosed embodiments may involve augmenting a physical display with an extended reality display. A physical display may include any device capable of converting electrical signals into visual imagery. For example, a physical display may include, a screen in an information terminal display, a desktop computer display, a laptop computer display, a mobile phone display, a smartphone display, a tablet personal computer display, an information kiosk display, an ATM display, a vehicle display, a medical device display, a display of a system for financial transactions, a display of a mobile game console, a projector, a television, a display of an ultra-mobile personal computer, a wearable display, and any other physical surface on which visual information is presented.

Figure 73:
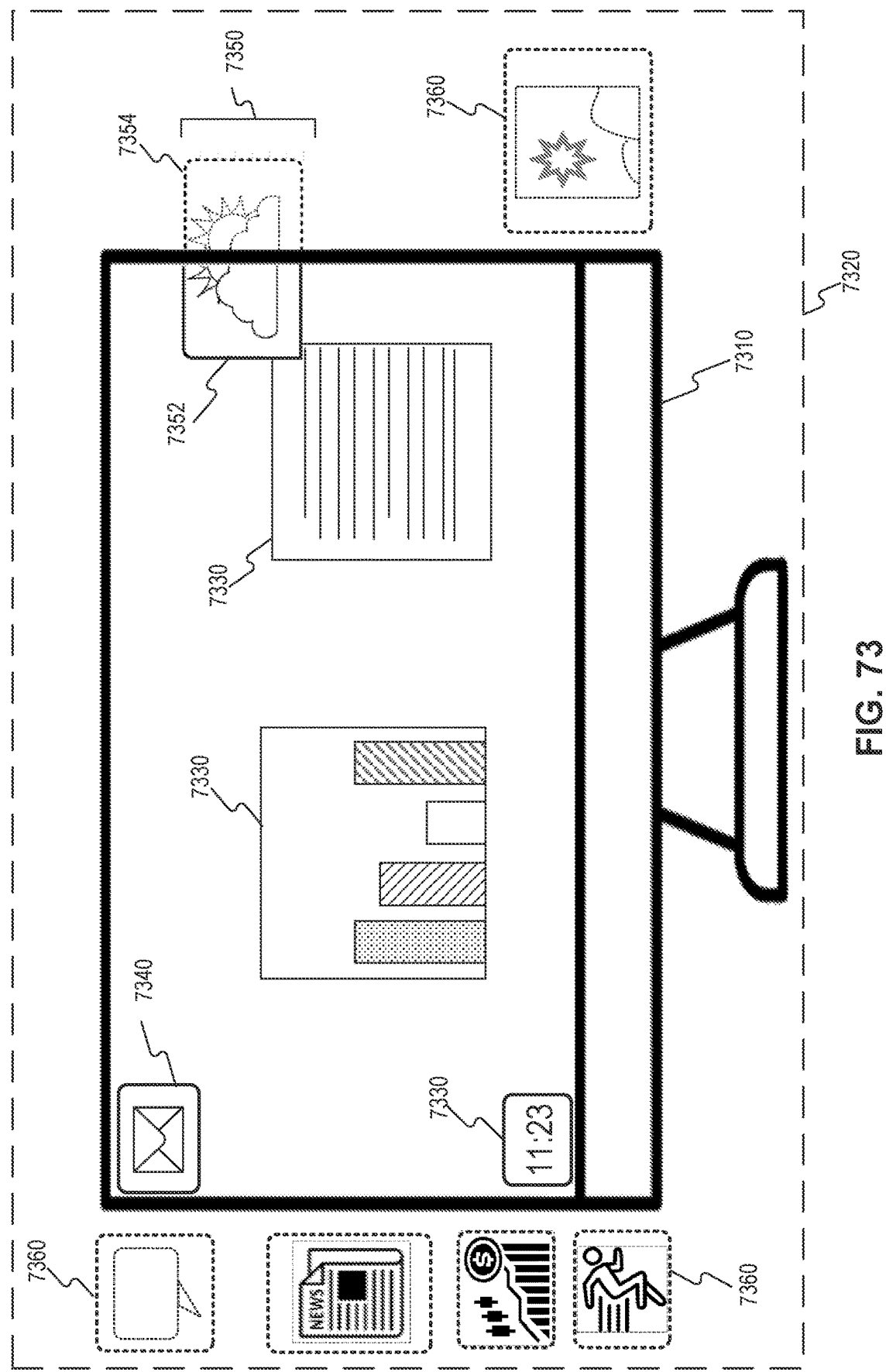
FIG. 73 illustrates examples of virtual content displayed both in an out of a computer screen, consistent with some embodiments of the present disclosure.
Figure 74:
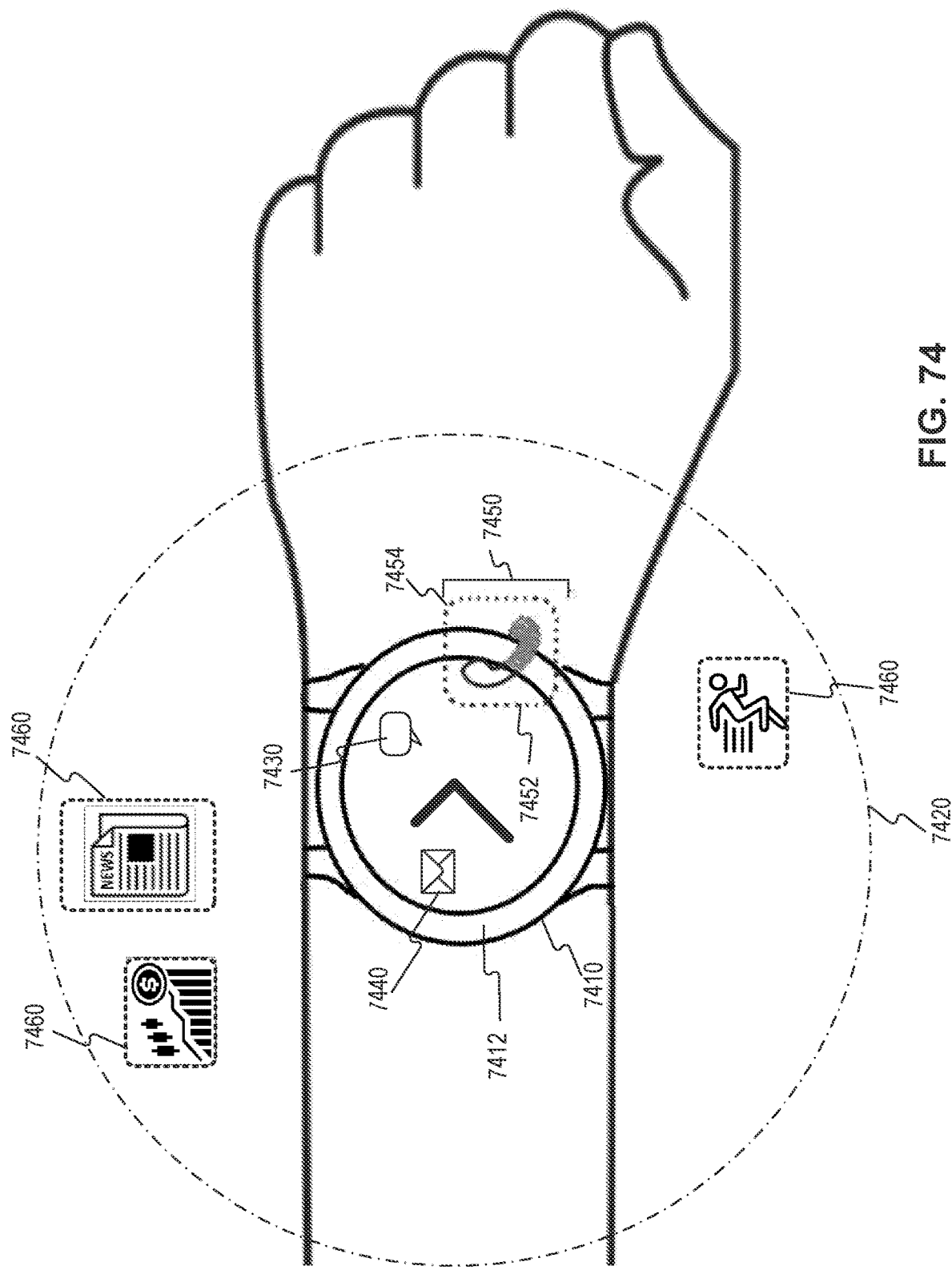
FIG. 74 illustrates examples of virtual content displayed both in an out of a smart watch, consistent with some embodiments of the present disclosure.

In some embodiments, the physical display may include, for example, a monitor using a liquid crystal display, plasma technology, cathode ray tube, light emitting diodes, holographic display, or any other type of output device that displays information in pictorial or text form. By way of example, as illustrated in FIG. 73, physical display 7310 may be in the form of a computer monitor. In another example, as illustrated in FIG. 74, physical display 7410 may be included in a smart watch.

In some embodiments, the physical display may be a part of a handheld communications device. A handheld communications device, such as a mobile communications device 206 illustrated in FIG. 2, may be a computer small enough to hold and operate in the hand. Typically, a handheld communications device may include an LCD or OLED flat screen interface, or any other display providing a touchscreen interface. The handheld communications device may also include digital buttons, a digital keyboard; and/or physical buttons along with a physical keyboard. Such devices may connect to the Internet and interconnect with other devices such as car entertainment systems or headsets via Wi-Fi, Bluetooth, cellular networks or near field communication (NFC). Handheld communications devices may include (i) Mobile computers such as a tablet computer, a netbook, a digital media player, an enterprise digital assistant, a graphing calculator, a handheld game console, a handheld PC, a laptop, a mobile internet device (MID), a personal digital assistant (PDA), a pocket calculator, a portable media player, and an ultra-mobile PC; (ii) mobile phones such as camera phones, feature phones, smartphones, and phablets, (iii) digital cameras such as a digital camcorder, a digital still camera (DSC), a digital video camera (DVC), and a front-facing camera, (iv) pagers, (v) personal navigation device (PND), (vi) wearable computers such as a calculator watch, a smartwatch, and a head-mounted display, and (vii) smart cards.

In some embodiments, the physical display may be a part of a stationary appliance. A stationary appliance may be a device that is not typically moved during operation. Stationary appliances may include desktop personal computers, televisions, refrigerators, ovens, washers, dryers, dishwashers, kiosks, automated teller machines (ATM), checkout registers, voting machines, gambling machines, and gasoline pumps.

In some embodiments, the physical display may be a part of an input device configured to generate text to be presented on the physical display. An input device may include a physical device configured to receive input from a user or an environment of the user, and to provide the data to a computational device, as described above. In an input device configured to generate text, the data may include textual data. Some non-limiting examples of input devices configured to generate text may include a physical keyboard, a virtual keyboard, a touchscreen configured to provide a virtual keyboard to a user, a microphone integrated with a computing device configured to use a speech recognition algorithm to generate text from audio captured using the microphone, and so forth. In some examples, the input device may be integrated with other electrical components, such as a computing device or a physical display, for example in a single housing. In some embodiments, the physical display may be a part of an input device configured to generate text to be virtually presented in the virtual space.

By way of example, as illustrated in FIG. 73, virtual space 7320 may provide a visual display region that may at least partially surround the physical display 7310. In another example, as illustrated in FIG. 74, virtual space 7420 may provide a visual display region that may at least partially surround the physical display 7410.

Augmenting with an extended reality display, for example, may include providing additional visual real estate on a virtual space that is beyond that of a physical display. In some embodiments, this may include, for example, virtually presenting text, images, or other information in an extended reality space (e.g., display generated by or viewable using an extended reality appliance) in addition to text, images, or other information provided on a physical display. In some embodiments, this may include, for example, moving text, images, or other information from a physical display to a virtual presentation in a virtual space outside the physical display.

Some disclosed embodiments may involve performing operations including receiving first signals representative of a first object fully presented on a physical display. In some embodiments, the first signals may be digital signals or analog signals. Digital signals may refer to a series of transmissible digital that convey information. In one example, the first signals may represent, for example, sensor data, textual data, voice data, video data, graphical data, geometric data, or any other form of data that provides perceptible information associated with the first object. In another example, the first signals may include an indication that the first object is fully presented on the physical display. In some examples, receiving the first signals may include at least one of reading the first signals from memory, receiving the first signals from an external device, receiving the first signals from a software or hardware component controlling at least part of the presentation on the physical display, or receiving the first signals from a software or hardware component controlling an extended reality environment including the virtual space.

In some embodiments, first signals may be received from an operating system controlling a physical display. First signals may be received, for example, via any electromagnetic communication that is transmitted wirelessly or via a wire, via a memory unit, via a communication bus, and so forth. An operating system may include, for example, system software that manages computer hardware, software resources, or provides any other common services for computer programs. The operating system may control, directly or indirectly, on different aspects of the physical display. For example, the operating system may control at least one of a frame rate of the physical display, a display resolution of the physical display, a color scheme of the physical display, a display brightness of the physical display, a display contrast of the physical display, or any other control parameter of the physical display. In another example, the operating system may control the content displayed by the physical display, for example by rendering the content, by providing the content (for example, through a video card, through a shared memory, through a communication cable, etc.), and so forth.

In some embodiments, first signals may be received from a pointing device associated with the wearable extended reality appliance. A pointing device may include all possible types of devices and mechanisms for inputting two-dimensional or three-dimensional information. Examples of pointing input devices may include a computer mouse, trackball, touchpad, trackpad, joystick, pointing stick, stylus, light pen, or any other physical or virtual input mechanism. For example, the clicking and dragging of a computer mouse may generate the first signal that could move an icon visible in a VR headset.

Some disclosed embodiments may involve receiving first signals representative of a first object fully presented on a physical display. In one example, the first object may be an incidence of virtual content. In some examples, the first object may be or include an element of a user interface, such as a window, an input control element, a navigation component, an information component, an icon, a widget, and so forth. In some examples, the first object may be or include at least one of text, image, video or graphical element (such as a two-dimensional graphical element, a two-dimensional projection of a three-dimensional graphical element, and so forth).

An object may be fully presented on a physical display by for example, providing the totality of the visible representation of the object within the visual boundaries of, for example, the physical display. For example, a representation of a square on a computer monitor that is fully presented, may result in the computer monitor displaying all four sides and all four corners of the square on the computer monitor.

In some embodiments, the first object may include at least one of a widget or an icon of an application. A software widget may be a task-oriented application or component. A desk accessory or applet may be example of a simple, stand-alone widget, in contrast with a more complex application such as a spreadsheet or word processor. These widgets are typical examples of transient and auxiliary applications that don not necessarily monopolize the user's attention. Additionally, graphical control elements (GUI "widgets") are examples of reusable modular components that are used together to build a more complex application, allowing programmers to build user interfaces by combining simple, smaller components. An icon may be a pictogram or ideogram displayed on a display in order to help the user navigate a computer system. The icon itself may be a quickly comprehensible symbol of a software tool, function, or a data file, accessible on the system and may be more like a traffic sign than a detailed illustration of the actual entity it represents. An icon may serve as an electronic hyperlink or file shortcut to access the program or data.

By way of example, as illustrated in FIG. 73, the first objects 7330, 7340 may be in the form of widgets 7330 or an icon 7340, respectively. As seen in FIG. 73, the first objects 7330, 7340, for example, virtual objects in the form of widgets or icons may be completely visible within the boundaries of physical display 7310. In another example, as illustrated in FIG. 74, the first objects 7430, 7440 may be in the form of a widget or an icon 7440. As seen in FIG. 74, the first object 7430, 7440, for example, in the form of the widget 7430 or the icon 7440 may be completely visible within the boundaries of physical display 7410.

Some disclosed embodiments may involve performing operations including receiving second signals representative of a second object having a first portion presented on the physical display and a second portion extending beyond a border of the physical display. The second signals, like the first signals, may be digital signals or analog signals. In one example, the second signals may represent, for example, sensor data, textual data, voice data, video data, graphical data, geometric data, or any other form of data that provides perceptible information associated with the second object. In another example, the second signals may include an indication that the second object has a first portion presented on the physical display and a second portion extending beyond a border of the physical display. In yet another example, the second signals may include information associated with the first portion and/or the second portion of the second object. In some examples, receiving the second signals may include at least one of reading the second signals from memory, receiving the second signals from an external device, receiving the second signals from a software or hardware component controlling at least part of the presentation on the physical display, or receiving the second signals from a software or hardware component controlling an extended reality environment including the virtual space. In some embodiments, the second object, like the first object, may be an incidence of virtual content. In some examples, the second object may be or include an element of a user interface, such as a window, an input control element, a navigation component, an information component, an icon, a widget, and so forth. In some examples, the second object may be or include at least one of text, image, video or graphical element (such as a two-dimensional graphical element, a two-dimensional projection of a three-dimensional graphical element, and so forth). In some embodiments, the second signals may be received from an operating system controlling the physical display, for example in a manner similar to that described above in relation to the first signals. In other embodiments, the second signals may be received from a pointing device associated with the wearable extended reality appliance, for example in a manner similar to that described above in relation to the first signals.

A first portion of an object may include, for example, a fractional part of the totality of a graphical or a visual representation of the object. This fractional part may correspond to any percentage of the second object less than one hundred percent and greater than zero percent. For example, a representation of cross may include a lower fractional part of the whole that has a T-shape within the visual boundaries of, for example, the physical display. A second portion of an object may include, for example, a remaining fractional part of the totality of the graphical or the visual representation of the object (for example, when the first portion or at least part of the first portion is subtracted out). This fractional part may correspond to any percentage of the second object less than one hundred percent and greater than zero percent. For example, a representation of cross may include a lower fractional part of the whole that has a T-shape and a remaining upper fractional part that has an inverted T-shaped. In this example, the lower T-shaped fractional part and the upper inverted T-shaped fractional part may represent the entirety of the cross-shaped whole.

By way of example, as illustrated in FIG. 73, the second object 7350 may be in the form of a widget. As seen in FIG.

73, the second object 7350 may include a first portion 7352 that is viewable within physical display 7310 and a second portion 7354 that extends beyond the boundary of physical display 7310. In another example, as illustrated in FIG. 74, the second object 7450 may be in the form of an icon 7450. As seen in FIG. 74, the second object 7450, for example, in the form of the icon 7450 may include a first portion 7452 that is viewable within physical display 7410 and a second portion 7454 that extends beyond the boundary of physical display 7410.

In some embodiments, only the first portion of an object may be presented on the physical display. In the above-described example where the second object may be a representation of cross, only part of the cross may be visible on the physical display. In this example, the cross-shaped second object may be positioned toward the top of the physical display such that only the first portion (e.g., the T-shaped fractional part) is visible on the physical display. As a result of this arrangement, the second portion may extend beyond a border of the physical display. In the above-described example where the second object may be a representation of cross, the remaining part of the cross may not be visible on the physical display. In this example, the cross-shaped second object may be positioned toward the top of the physical display such that only the second portion (e.g., the inverted T-shaped fractional part) is not visible on the physical display. In some examples, when only the first portion of the object is presented on the physical display, the second portion of the object may be invisible, may not be presented at all, may be presented in a virtual space via one or more wearable extended reality appliances (and therefore may be visible to users of the one or more wearable extended reality appliances and may be invisible to other people), may be otherwise displayed, and so forth.

In some embodiments, the second object may include at least one of a widget or an icon of an application, for example as described above in relation to the first object. By way of example, as illustrated in FIG. 73, the second object 7350 may be in the form of a widget. As seen in FIG. 73, the second object 7350 may include a first portion 7352 that is viewable within physical display 7310 and a second portion 7354 that extends beyond the boundary of physical display 7310. In another example, as illustrated in FIG. 74, the second object 7450 may be in the form of an icon 7450. As seen in FIG. 74, the second object 7450 may include a first portion 7452 that is viewable within physical display 7410 and a second portion 7454 that extends beyond the boundary of physical display 7410. As describes above, second portion 7354 and/or second portion 7454 may not be displayed at all, may be presented in a virtual space via one or more wearable extended reality appliances (and therefore may be visible to users of the one or more wearable extended reality appliances and may be invisible to other people), or may be otherwise displayed.

In some embodiments, the second object may partially overlap with the first object. The term "partially overlap" as used in this disclosure may include, at least some portion of each object virtually occupying the same location. This joint occupation of a location may result in obscuring of one or both portions of these objects. By way of example, as illustrated in FIG. 73, the second object 7350 may partially overlap first object 7330 on physical display 7310.

Some disclosed embodiments may involve performing operations including receiving third signals representative of a third object initially presented on the physical display and subsequently wholly moved beyond the border of the physical display. The third signals, like the first and second signals, may be digital signals or analog signals. In one example, the third signals may represent, for example, sensor data, textual data, voice data, video data, graphical data, geometric data, or any other form of data that provides perceptible information associated with the third object. In another example, the third signals may include an indication that the third object is initially presented on the physical display and subsequently wholly moved beyond the border of the physical display. In some examples, receiving the third signals may include at least one of reading the third signals from memory, receiving the third signals from an external device, receiving the third signals from a software or hardware component controlling at least part of the presentation on the physical display, or receiving the third signals from a software or hardware component controlling an extended reality environment including the virtual space. In some embodiments, the third object, like the first and second objects, may be an incidence of virtual content. In some examples, the third object may be or include an element of a user interface, such as a window, an input control element, a navigation component, an information component, an icon, a widget, and so forth. In some examples, the third object may be or include at least one of text, image, video or graphical element (such as a two-dimensional graphical element, a two-dimensional projection of a three-dimensional graphical element, and so forth). In some embodiments, the third signals may be received from an operating system controlling the physical display, for example in a manner similar to that described above in relation to the first signals. In some embodiments, the third signals may be received from a pointing device associated with the wearable extended reality appliance, for example in a manner similar to that described above in relation to the first signals.

In some embodiments, the third object may be initially presented on the physical display. This initial presentation may be indicative of a partial presentation or a total presentation of the third object. For example, if the third object is an internet browser window, the internet browser window may either initially be (i) completely visible on the physical display or (ii) partially visible on the physical display due to parts of the browser window that may extend beyond the borders of the physical display. In one example, the third object may be initially fully presented on a physical display and subsequently wholly moved beyond the border of the physical display. In another example, the third object may initially have one portion presented on the physical display and another portion extending beyond a border of the physical display, and may subsequently wholly moved beyond the border of the physical display.

In some embodiments, the third object may be subsequently wholly moved beyond the border of the physical display. Moving the third object wholly beyond the border of the physical display may be triggered by a user input (such as a hand gesture pushing or pulling the third object, a cursor dragging the third object, a voice command, and so forth), a reception of a communication signal, a detection of an event in the environment, or any other type of trigger. This subsequent movement may include translation from a partial presentation or a total presentation of the third object on the physical display to the absence of the third object on the physical display. In the above-described example where the third object may be an internet browser window, the internet browser window may move from being either completely visible on the physical display or partially visible on the physical display to no part of the internet browser window being visible on the physical display due to the internet browser traveling completely beyond the boundaries of the physical display.

In some embodiments, the third object may include at least one of a widget or an icon of an application, for example as described above in relation to the first object. By way of example, as illustrated in FIG. 73, the third object 7360 may be in the form of a widget. As seen in FIG. 73, the third object 7360 may have initially been in the position of the first object 7330, 7340 or the second object 7350 has relocated to a position beyond the borders of physical display 7310. In another example, as illustrated in FIG. 74, the third object 7460, for example, in the form of the icon 7460 that may have initially been in the position of the first object 7430, 7440 or the second object 7450 has relocated to a position beyond the borders of physical display 7410.

In some embodiments, the second object may partially overlap with the third object. By way of example, as illustrated in FIG. 73, the second object 7350 may partially overlap icon 7460 on physical display 7410.

In some embodiments, the first object, the second object, and the third object may be concurrently presented on the physical display and in the virtual space. By way of example, as illustrated in FIG. 73, first object 7330, 7340, the second object 7350 may partially overlap icon 7460 on physical display 7410.

In response to receipt of the second signals, some disclosed embodiments may involve causing the second portion of the second object to be presented via a wearable extended reality appliance in a virtual space while the first portion of the second object is presented on the physical display. In some embodiments, the second portion of the second object may be caused via a wearable extended reality appliance to be presented in a virtual space. This presentation may be indicative of a partial presentation of the second object. For example, if the second object is an internet browser window, a right half of the window may be visible on or within the extended reality appliance. In some embodiments, this presentation of the second portion of the second object may occur while the first portion of the second object is presented on the physical display. This presentation may be indicative of a partial presentation of the second object. In the above-described example where the second object may be an internet browser window, a left half of the window may be visible on the physical display. In this example, the boundary between the left and right portion of the internet browser window may correspond to a left border of the physical display.

By way of example, as illustrated in FIG. 73, the second object 7350 may be in the form of a widget. As seen in FIG. 73, the second object 7350 may include a first portion 7352 that is viewable within physical display 7310 and a second portion 7354 that is viewable within the virtual space 7320. In another example, as illustrated in FIG. 74, the second object 7450 may be in the form of an icon 7450. As seen in FIG. 74, the second object 7450, for example, in the form of the icon 7350 may include a first portion 7452 that is viewable within physical display 7410 and a second portion 7454 that is viewable within the virtual space 7420.

In response to receipt of the third signals, some disclosed embodiments may involve causing the third object to be wholly presented via the wearable extended reality appliance in the virtual space following the third object having been wholly presented on the physical display. In some embodiments, the third object may be caused via a wearable extended reality appliance to be wholly presented in a virtual space. This presentation may be indicative of a total presentation of the third object. For example, if the third object is an internet browser window, a totality of the window may be visible on within the extended reality appliance. In some embodiments, this presentation of the third object may occur following the third object having been wholly presented on the physical display. This presentation may be indicative of a total presentation of the third object. In the above-described example where the third object may be an internet browser window, a totality of the window may have been initially visible on within the physical display. In this example, the third object may have completely traversed a border of the physical display to become exclusively visible via the extended reality appliance.

By way of example, as illustrated in FIG. 73, the third object 7360 may be in the form of a widget located completely within the virtual space 7320. Prior to arriving at this location, the third object 7360 may have been initially located in the position of the first object 7330 that is completely within physical display 7310.

Some disclosed embodiments may involve performing further operations including receiving image sensor signals representing an image of the physical display. Image sensor signals may include digital or analog signals originating from or produced by an image sensor. In some examples, receiving the image sensor signals may include at least one of reading the image sensor signals from memory, receiving the image sensor signals from an external device, or capturing the image sensor signals using the image sensor.

Some disclosed embodiments may involve performing further operations including ascertaining a bounding edge of the physical display. A bounding edge of the physical display may refer to refer to a perimeter that bounds a portion or a totality of the physical display. Such an edge may be ascertained by calculating or determining based on image sensor data, stored coordinates, or any other information that could be used to establish the bounding edge of the physical display. In some examples, the received image sensor signals or the image may be analyzed using a template matching to ascertain a bounding edge of the physical display. In another example, the received image sensor signals or the image may be analyzed using a semantic segmentation algorithm to determine the pixels in the image corresponding to the physical display, thereby ascertaining a bounding edge of the physical display.

Some disclosed embodiments may involve registering the virtual space with the physical display based on the ascertained bounding edge. Registering the virtual space with the physical display may refer to defining the bounds of the virtual space, creating subsections of the virtual space, or any other manipulation of the virtual space that may delineate the location of the physical display. In the above example where a perimeter defining the borders of the physical display was extrapolated, that perimeter may be applied to the extended reality space to, for example, exclude the footprint of the physical display from the area within the wearable extended reality appliance that will generate images.

By way of example, as illustrated in FIG. 73, image sensor data may be used to delineate the boundaries of virtual space 7320 to exclude an area defined by the boundaries of physical display 7310. Accordingly, the third objects 7360 and second portion 7354 of the second object 7350 fall within the boundaries of the virtual space 7320 while the first objects 7340 and the first portion 7352 of the second object 7350 do not. Additionally, as illustrated in FIG. 74, image sensor data can be used to delineate the boundaries of virtual space 7420 to exclude an area defined by the boundaries of physical display 7410. Accordingly, the third objects 7460 and second portion 7454 of the second object 7450 fall within the boundaries of the virtual space 7420 while the first objects 7440 and the first portion 7452 of the second object 7450 do not.

In some embodiments, the physical display may include a frame defining the bounding edge. Some physical displays (such as computer monitors, smartphones, smartwatches, etc.) may contain a "frame" surrounding the image producing screen, while other physical displays such as some modern smartphones may have a "frameless" screen such that the screen extends completely to the edge of the device. By way of example, as illustrated in FIG. 74, physical display 7410 includes a frame in the form of a bezel 7412.

In some embodiments, causing the second portion of the second object to be presented in the virtual space may include overlaying part of the second portion of the second object atop a portion of the frame. In physical displays that contain a frame, presentation in the virtual space may overlap with that frame so as to provide a seamless transition from presentation on the screen of the physical display to the virtual space. By way of example, as illustrated in FIG. 74, the second portion 7454 of the icon 7450 overlaps with the bezel 7412.

Some disclosed embodiments may involve analyzing the image sensor signals to determine a visual parameter of the first portion of the second object as presented on the physical display. Analyzing image sensor signals to determine a visual parameter may refer to applying a software, equation, or algorithm to identify some sort of indicia relating to characteristics of a captured image. Such indicia may include brightness, contrast, color range, hue, saturation, chromatic adaptation, other color appearance phenomena, or other characteristics associated with the captured image. In the above example where a digital camera may photograph a physical display, software may be utilized to determine a brightness level of a portion of a widget disposed on the physical display. In one example, the image sensor signals or the image may be analyzed to detect a region in the image corresponding to the first portion of the second object presented on the physical display, for example using a template matching algorithm. Values of the pixels in the detected region may be analyzed, for example using a statistical function or a histogram, to determine the visual parameter.

In some embodiments, causing the second portion of the second object to be presented in the virtual space includes setting a display parameter of the second portion of the second object based on the determined visual parameter. In one example, the image of a physical display may be analyzed to determine a particular brightness level of a widget on the physical display, the brightness of the remaining part of the widget to be displayed in the virtual space may be set to match the brightness level of the portion of the widget on the physical display. Accordingly, features such as brightness or color scheme of the two portions of the widget may be matched to, for example, present a seemingly seamless presentation of the widget. By way of example, as illustrated in FIG. 74, the first portion 7452 and second portion 7454 may be displayed to have the same or similar, for example, brightness.

Some disclosed embodiments may involve performing further operations including determining that a user of the wearable extended reality appliance is walking away (or otherwise moving away) from the physical display. A determination that a user is walking (or otherwise moving) away may involve utilizing sensors associated with the wearable extended reality device to sense that a distance, angle, or orientation between the user and the physical display may be changing. In another example, positioning data or motion data of the wearable extended reality device may be analyzed (for example based on a known position of the physical display) to determine that the user is walking (or otherwise moving) away from the physical display.

In response to the determination that the user of the wearable extended reality appliance is walking (or otherwise moving) away from the physical display, some embodiments may involve presenting both the first portion and the second portion of the second object in the virtual space in a manner moving with the user while the first object remains on the physical display. Accordingly, full view of both objects may be observed completely by the user regardless of the user's movement, positioning or line of sight to the physical display. In one example, the second object may be moved to remain in the same location of a user's field of view as the user moves and the first object remains in the same location on the physical display regardless of the movement of the user. For example, as a user steps away from a physical display, the physical display may appear smaller in a user's field of view. Since (i) the second object was initially partially viewable on the physical display and partially viewable on the virtual space and (ii) the boundaries of the physical display subsequently appear to become smaller, the second portion of the second object may remain in the same location with regards to the user's field of view and the first portion of the second object may also appear next to the second portion on the virtual space due to the boundaries of the physical display appearing to fall away.

Disclosed embodiments may further involve receiving fourth signals representative of a fourth object initially presented on a first physical display, later virtually presented in extended reality, and subsequently presented on a second physical display; and in response to receipt of the fourth signals, causing the fourth object to be presented on the second physical display. The fourth signals, like the first, second, and third signals, may be digital signals or analog signals. In one example, the fourth signals may represent, for example, sensor data, textual data, voice data, video data, graphical data, geometric data, or any other form of data that provides perceptible information associated with the fourth object. In another example, the fourth signals may include an indication that the fourth object is initially presented on a first physical display, later virtually presented in extended reality, and subsequently presented on a second physical display. In some examples, receiving the fourth signals may include at least one of reading the fourth signals from memory, receiving the fourth signals from an external device, receiving the fourth signals from a software or hardware component controlling at least part of the presentation on the physical display and/or on the second physical display, or receiving the fourth signals from a software or hardware component controlling an extended reality environment including the virtual space. In some embodiments, the fourth object, like the first, second, and third objects, may be an incidence of virtual content. In some examples, the fourth object may be or include an element of a user interface, such as a window, an input control element, a navigation component, an information component, an icon, a widget, and so forth. In some examples, the fourth object may be or include at least one of text, image, video or graphical element (such as a two-dimensional graphical element, a two-dimensional projection of a three-dimensional graphical element, and so forth).

Figure 75A:
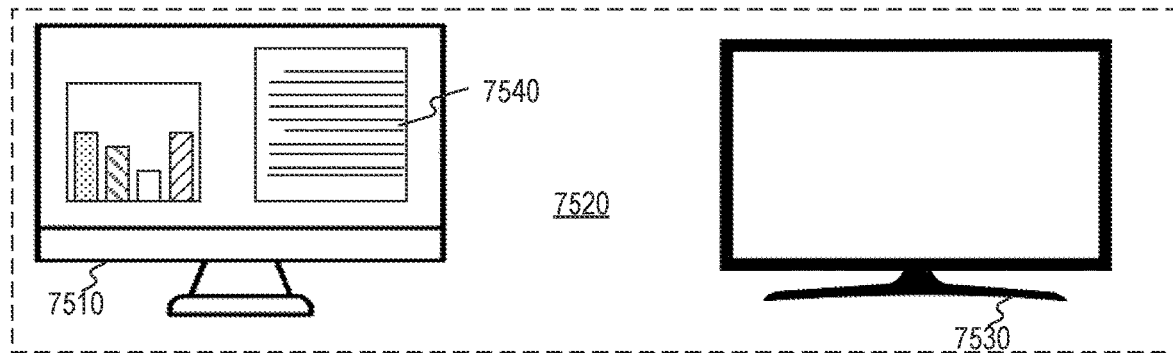
FIG. 75A-D illustrate examples of the movement of virtual content between computer screens, consistent with some embodiments of the present disclosure.
Figure 75B:
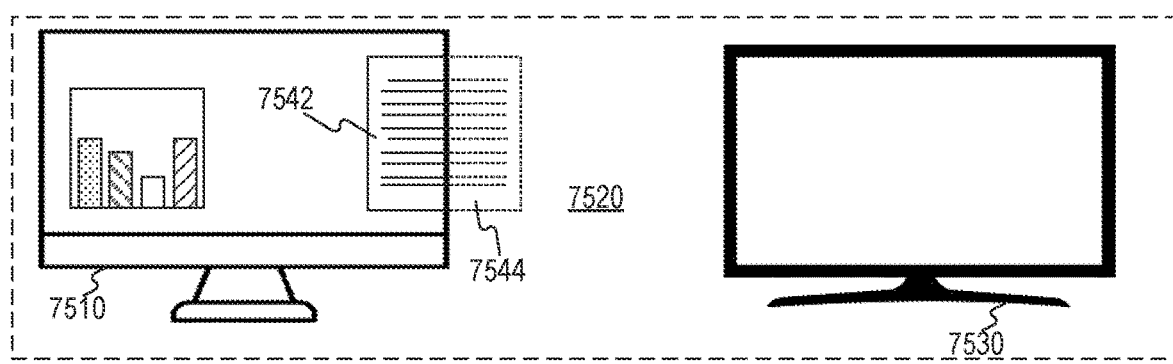
Figure 75C:
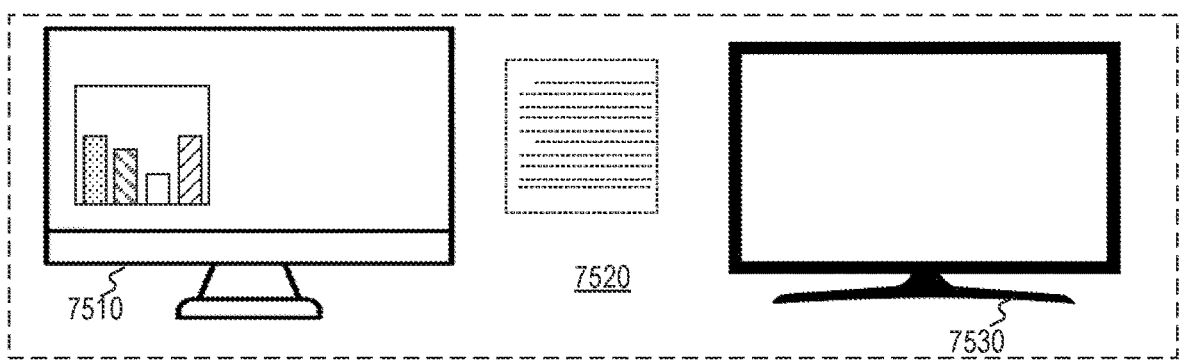
Figure 75D:
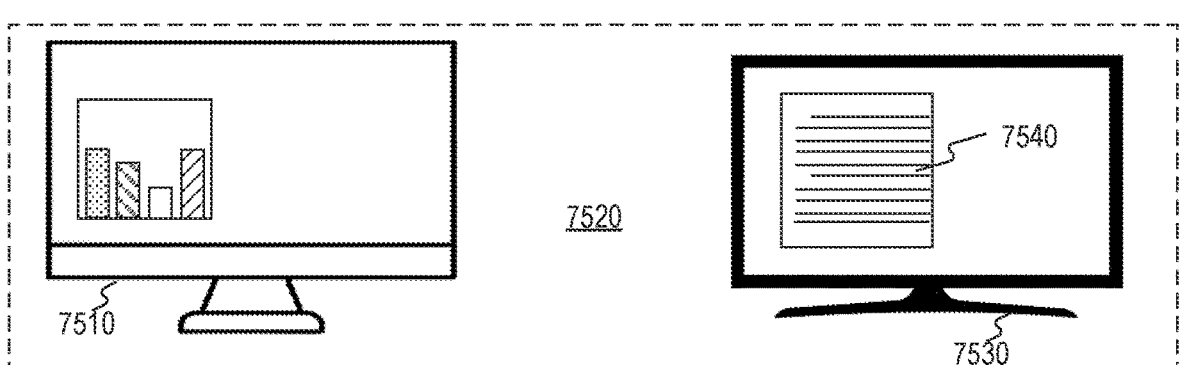

By way of example, as illustrated in FIGS. 75A-75D, a fourth object 7540 may be moved from the first physical display 7510 to the second physical display 7530 while being visible virtually in virtual space 7520 between this origin and destination. In FIG. 75A, the fourth object 7540 is presented completely on the first physical display 7510. In FIG. 75B, the fourth object 7540 is presented partially on the first physical display 7510 and partially virtually in virtual space 7520. In FIG. 75C, the fourth object 7540 is presented completely virtually in virtual space 7520. In FIG. 75D, the fourth object 7540 is presented completely on the second physical display 7530.

In some embodiments, causing the fourth object to be presented on the second physical display may include transmitting data reflective of the fourth object to a computing device associated with the second physical display. A computing device may refer to a device having at least one processor configured to execute computer programs, applications, methods, processes, or other software. Since different processing devices may control the first and second physical displays, data associated with the fourth object may be sent to the processing device associated with the second physical display so that the fourth object may be presented on the second physical display. In one example, the data may be transmitted from the device controlling the first physical display. In another example, the data may be transmitted from a centralized system controlling the extended reality environment, from the wearable extended reality appliance, or from another computerized device. In one example, the data may include at least one of an image or a video of the fourth object, a model (two-dimensional or three-dimensional) of the fourth object, a software controlling the fourth object, parameters for a software controlling the fourth object, or an indication of the fourth object.

Some disclosed embodiments may also involve receiving input signals indicative of typed text. Input signals indicative of typed text may refer to digital or analog signals representing character encoding such as those in compliance with the American Standard Code for Information Interchange (ASCII) or with another format. Such input signals may be generated or sent from a keyboard, a touchpad, or any other device capable of selecting characters.

Some disclosed embodiments may additionally involve concurrently displaying the typed text on a first display and on a second display, wherein the second display is an extended reality display area located adjacent to a keyboard. Concurrently displaying the typed text may refer to presenting the typed text simultaneously on two or more displays, duplicating the text in to each one of the two of more displays. As discussed above the term keyboard may refer to any device capable of selecting characters of text, such as a physical keyboard, a virtual keyboard, etc. In some embodiments, the first display may be the physical display. For example, the typed text may be displayed in a text editing application, in a text input element, or in any other element presented on the physical display. In some embodiments, the first display may be a virtual display other than the second display. For example, the typed text may be displayed in a text editing application, in a text input element, or in any other element presented on the virtual display.

Some disclosed embodiments may involve receiving fourth signals representative of a fourth object having a first portion and a second portion, initially the fourth object is wholly presented on the physical display. The fourth signals, like the first, second, and third signals, may be digital signals or analog signals. In one example, the fourth signals may represent, for example, sensor data, textual data, voice data, video data, graphical data, geometric data, or any other form of data that provides perceptible information. In another example, the fourth signals may include an indication that the fourth object have a first portion and a second portion, and/or that the fourth object is initially wholly presented on the physical display. In yet another example, the fourth signals may include information associated with the first portion and/or the second portion of the fourth object. In some examples, receiving the fourth signals may include at least one of reading the fourth signals from memory, receiving the fourth signals from an external device, receiving the fourth signals from a software or hardware component controlling at least part of the presentation on the physical display, or receiving the fourth signals from a software or hardware component controlling an extended reality environment including the virtual space. In some embodiments, the fourth object, like the first, second, and third objects, may be an incidence of virtual content. In some examples, the fourth object may be or include an element of a user interface, such as a window, an input control element, a navigation component, an information component, an icon, a widget, and so forth. In some examples, the fourth object may be or include at least one of text, image, video or graphical element (such as a two-dimensional graphical element, a two-dimensional projection of a three-dimensional graphical element, and so forth). This virtual content may, like the previously described objects, may be viewable in its entirety by the user. By way of example, as illustrated in FIG. 75A, the fourth object 7540 has a first portion 7542 and a second portion 7544, which are both initially presented completely on the physical display 7510.

Some disclosed embodiments may involve receiving fifth signals indicating that the fourth object is moved to a position in which the first portion of the fourth object is presented on the physical display and the second portion of the fourth object is extending beyond the border of the physical display. The fifth signals, like the first, second, third, and fourth signals, may be digital signals or analog signals. In one example, the fifth signals may include an indication that the fourth object have a first portion and a second portion, and/or that the fourth object is moved to the position in which the first portion of the fourth object is presented on the physical display and the second portion of the fourth object is extending beyond the border of the physical display. In yet another example, the fifth signals may include information associated with the first portion and/or the second portion of the fourth object. In some examples, receiving the fifth signals may include at least one of reading the fifth signals from memory, receiving the fifth signals from an external device, receiving the fifth signals from a software or hardware component controlling at least part of the presentation on the physical display, or receiving the fifth signals from a software or hardware component controlling an extended reality environment including the virtual space. By way of example, as illustrated in FIG. 75B, the first portion 7542 may remain displayed on the physical display 7510 and a second portion 7544 may extend beyond the border of the physical display 7510.

In response to the fifth signals, some embodiments may involve causing the second portion of the fourth object to be presented via the wearable extended reality appliance in the virtual space while the first portion of the fourth object is presented on the physical display. By way of example, as illustrated in FIG. 75B, the first portion 7542 may remain displayed on the physical display 7510 and a second portion 7544 may be displayed in the virtual space 7520.

Some disclosed embodiments may involve receiving sixth signals indicating that the fourth object is wholly moved beyond the border of the physical display. The sixth signals, like the first, second, third, fourth, and fifth signals, may be digital signals or analog signals. In one example, the sixth signals may include an indication that the fourth object is wholly moved beyond the border of the physical display. In some examples, receiving the sixth signals may include at least one of reading the sixth signals from memory, receiving the sixth signals from an external device, receiving the sixth signals from a software or hardware component controlling at least part of the presentation on the physical display, or receiving the sixth signals from a software or hardware component controlling an extended reality environment including the virtual space. The fourth object may, like the previously described objects, be moved from one location to another and that other location may be beyond the display boundaries of the display the content was initially presented on. By way of example, as illustrated in FIG. 75C, the fourth object 7540 has moved completely beyond the border of the physical display 7510.

In response to receipt of the sixth signals, some embodiments may involve causing the fourth object to be wholly presented via the wearable extended reality appliance in the virtual space. This fourth object may, like the previously described objects, may be viewable in its entirety by the user even after moving beyond the display boundaries of the display the content was initially presented on. By way of example, as illustrated in FIG. 75C, the fourth object 7540 has moved completely into the virtual space 7520.

Other disclosed embodiments may include a system for augmenting a physical display with an extended reality display. the system may include at least one processor configured to: receive first signals representative of a first object fully presented on a physical display; receive second signals representative of a second object having a first portion presented on the physical display and a second portion extending beyond a border of the physical display; receive third signals representative of a third object initially presented on the physical display and subsequently wholly moved beyond the border of the physical display; in response to receipt of the second signals, cause the second portion of the second object to be presented via a wearable extended reality appliance in a virtual space while the first portion of the second object is presented on the physical display; and in response to receipt of the third signals, cause the third object to be wholly presented via the wearable extended reality appliance in the virtual space following the third object having been wholly presented on the physical display.

In some examples, the extent of the virtual space may be selected based on a presence of other physical objects in the vicinity of the physical display. For example, the physical display may be adjacent to another physical display, to a wall, or any other physical objects. In one embodiment, image data captured using an image sensor (for example, an image sensor included in the wearable extended reality appliance, an image sensor external to the wearable extended reality appliance, etc.) may be analyzed to detect a physical object in the vicinity of the physical display. The image data may be analyzed using at least one of an object detection algorithm, an object recognition algorithm, a semantic segmentation algorithm, and any other relevant algorithm.

In another embodiment, radar, Lidar or sonar sensor may be used to detect a physical object in the vicinity of the physical display. For example, the virtual space may be selected so that it does not overlap with the detected physical object. The virtual space may be selected so that it does not hide at least part of the detected physical object. In yet another example, the virtual space may be selected so that it is not at least partly hidden by the detected physical object. In some examples, in response to a first type of physical object (such as a second physical display, a lamp, etc.), the virtual space may be selected so that it does not overlap with the detected physical object, and in response to a second type of the physical object (such as a wall, a vase, etc.), the virtual space may be selected so that it overlaps with the detected physical object. In one implementation, the type of the physical object may be determined using an object recognition algorithm.

Figure 76:
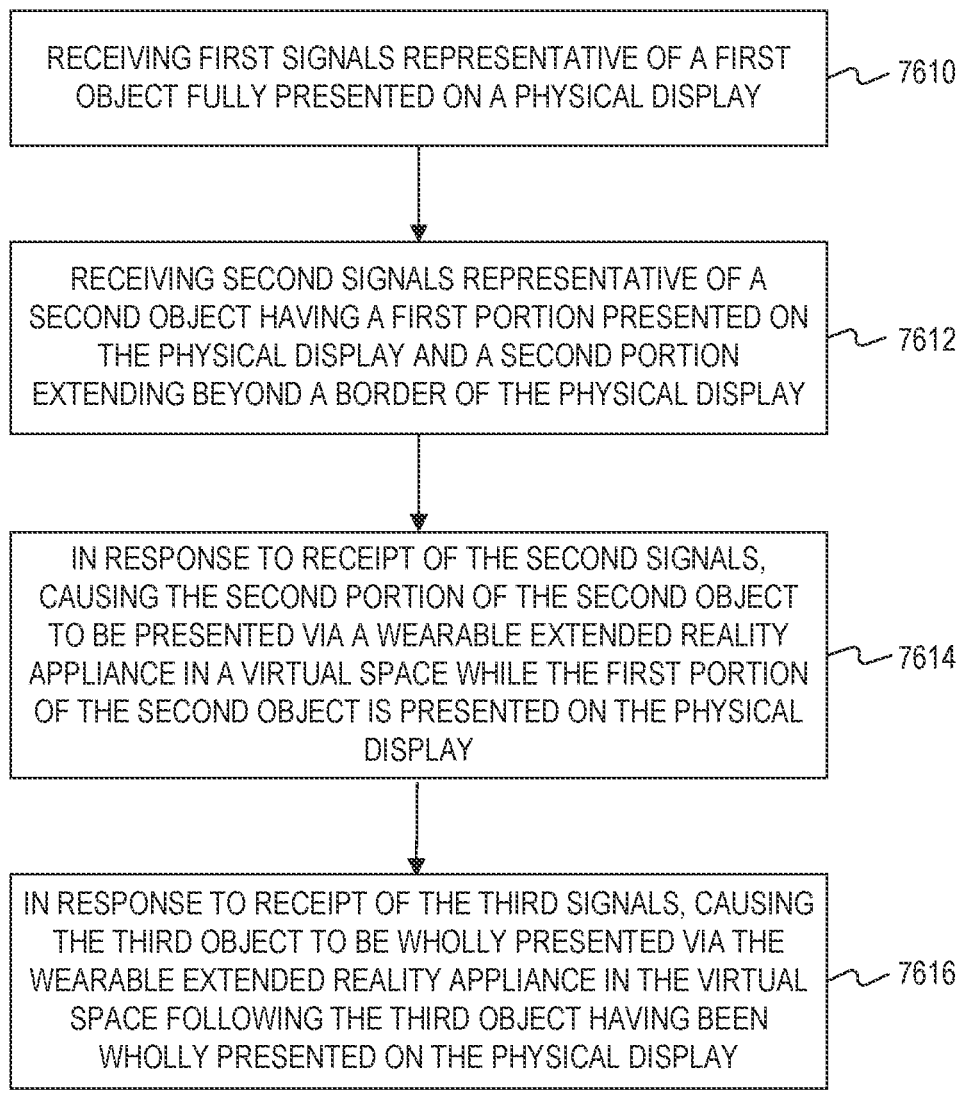
FIG. 76 is a flowchart illustrating an exemplary process for extending a working display, consistent with some embodiments of the present disclosure.

Other disclosed embodiments may include a method for augmenting a physical display with an extended reality display. By way of example, FIG. 76 shows a flowchart illustrating an exemplary method 7600 for altering a perspective of a scene, consistent with some embodiments of the present disclosure. Method 7600 may include a step 7610 of receiving first signals representative of a first object fully presented on a physical display. Method 7600 may include a step 7612 of receiving second signals representative of a second object having a first portion presented on the physical display and a second portion extending beyond a border of the physical display. Method 7600 may include a step 7614 of, in response to receipt of the second signals, causing the second portion of the second object to be presented via a wearable extended reality appliance in a virtual space while the first portion of the second object is presented on the physical display. Method 7600 may include a step 7616 of, in response to receipt of the third signals, causing the third object to be wholly presented via the wearable extended reality appliance in the virtual space following the third object having been wholly presented on the physical display.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet. The computing system can include clients and servers. A client and server are generally remote from each other and typically interact through a communication network. The relationship of client and server arises by virtue of computer programs running on the respective computers and having a client-server relationship to each other.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above-described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above-described modules/units can be combined as one module or unit, and each of the above-described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof. And other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

The invention claimed is:

1. A non-transitory computer readable medium for integrating a moveable input device with a virtual display projected via a wearable extended reality appliance, the computer readable medium containing instructions that when executed by at least one processor cause the at least one processor to perform the steps of:
receiving motion signals associated with the moveable input device, the motion signals reflecting physical movement of the moveable input device;

outputting during a first time period, first display signals to the wearable extended reality appliance, the first display signals being configured to cause the wearable extended reality appliance to virtually present content in a first orientation;

outputting during a second time period different from the first time period, second display signals to the wearable extended reality appliance, the second display signals being configured to cause the wearable extended reality appliance to virtually present the content in a second orientation different from the first orientation; and switching between the output of the first display signals and the output of the second display signals based on the received motions signals of the moveable input device.

2. The non-transitory computer readable medium of claim 1, wherein the motion signals of the moveable input device are determined based on an analysis of data captured using at least one sensor associated with the moveable input device.

3. The non-transitory computer readable medium of claim 1, wherein the motion signals associated with the moveable input device are determined based on an analysis of images of the moveable input device.

4. The non-transitory computer readable medium of claim 1, wherein the motion signals reflect physical movement of the moveable input device relative to a surface on which the moveable input device is placed during the first time period.

5. The non-transitory computer readable medium of claim 1, wherein the motion signals are indicative of at least one of tilt movement, roll movement, and lateral movement of the moveable input device.

6. The non-transitory computer readable medium of claim 1, wherein the motion signals are received after the first time period and before the second time period.

7. The non-transitory computer readable medium of claim 1, wherein the instructions are configured to enable the wearable extended reality appliance to receive additional motion signals during the second time period, thereby enabling the wearable extended reality appliance to continuously adjust a virtual presentation of the content.

8. The non-transitory computer readable medium of claim 1, wherein the steps further include determining the first orientation based on an orientation of the moveable input device before the first time period.

9. The non-transitory computer readable medium of claim 1, wherein the steps further include changing a size of the virtual display based on the received motion signals associated with the moveable input device.

10. The non-transitory computer readable medium of claim 1, wherein the steps further include switching between the output of the first display signals and the output of the second display signals when the physical movement of the moveable input device is greater than at least one threshold.

11. The non-transitory computer readable medium of claim 10, wherein the at least one threshold includes a combination of a tilt threshold, a roll threshold, and a lateral movement threshold.

12. The non-transitory computer readable medium of claim 10, wherein the moveable input device is configured to be placed on a surface and a value of the at least one threshold is based on a type of the surface.

13. The non-transitory computer readable medium of claim 10, wherein the at least one threshold is selected based on a distance of the virtual display from the moveable input device during the first time period.

14. The non-transitory computer readable medium of claim 10, wherein the at least one threshold is selected based on an orientation of the virtual display from the moveable input device during the first time period.

15. The non-transitory computer readable medium of claim 10, wherein the at least one threshold is selected based on a type of the content.

16. The non-transitory computer readable medium of claim 1, wherein the wearable extended reality appliance is configured to be paired with multiple moveable input devices and the first orientation is determined based on default virtual display configurations associated with one of the multiple moveable input devices paired with the wearable extended reality device.

17. The non-transitory computer readable medium of claim 1, wherein the content is a virtual display configured to enable visual presentation of textual input entered using the moveable input device.

18. The non-transitory computer readable medium of claim 17, wherein the steps further include providing a visual indication outside the virtual display of textual input entered using the moveable input device when the virtual display is outside a field of view of the wearable extended reality appliance.

19. A method for integrating a moveable input device with a virtual display projected via a wearable extended reality appliance, the method comprising:

receiving motion signals associated with the moveable input device, the motion signals reflecting physical movement of the moveable input device;

outputting during a first time period, first display signals to the wearable extended reality appliance, the first display signals being configured to cause the wearable extended reality appliance to virtually present content in a first orientation;

outputting during a second time period different from the first time period, second display signals to the wearable extended reality appliance, the second display signals being configured to cause the wearable extended reality appliance to virtually present the content in a second orientation different from the first; and switching between the output of the first display signals and the output of the second display signals based on the received motions signals of the moveable input device.

20. A system for integrating a moveable input device with a virtual display projected via a wearable extended reality appliance, the system comprising:

at least one processor programmed to:

receive motion signals associated with the moveable input device, the motion signals reflecting physical movement of the moveable input device;

output during a first time period, first display signals to the wearable extended reality appliance, the first display signals being configured to cause the wearable extended reality appliance to virtually present content in a first orientation;

output during a second time period different from the first time period, second display signals to the wearable extended reality appliance, the second display signals being configured to cause the wearable extended reality appliance to virtually present the content in a second orientation different from the first; and switch between the output of the first display signals and the output of the second display signals based on the received motions signals of the moveable input device.

* * * * *